US012619928B2

(12) United States Patent
Simpson

(10) Patent No.: US 12,619,928 B2
(45) Date of Patent: May 5, 2026

(54) SYSTEM AND METHOD FOR TRADING EMISSIONS UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 0 days.

(21) Appl. No.: 18/081,677

(22) Filed: Dec. 14, 2022

(65) Prior Publication Data

US 2023/0123620 A1     Apr. 20, 2023

Related U.S. Application Data

(63) Continuation-in-part of application No. 18/075,381, filed on Dec. 5, 2022, and a continuation-in-part of (Continued)

(51) Int. Cl.
　*G06Q 10/0631*　　(2023.01)
　*G06Q 50/00*　　(2024.01)

(52) U.S. Cl.
　CPC ....... *G06Q 10/06315* (2013.01); *G06Q 50/01* (2013.01)

(58) Field of Classification Search
　CPC .......................... G06Q 10/06315; G06Q 50/01

(Continued)

(56) References Cited

U.S. PATENT DOCUMENTS

| D209,710 | S | 12/1967 | Bruce |
| 4,476,954 | A | 10/1984 | Johnson et al. |

(Continued)

FOREIGN PATENT DOCUMENTS

| CN | 107341968 A | 11/2017 |
| GB | 2539556 A | 12/2016 |

(Continued)

OTHER PUBLICATIONS

"Estimating Real-Time Traffic Carbon Dioxide Emissions Based on Intelligent Transportation System Technologies" Published by IEEE (Year: 2013).*

(Continued)

*Primary Examiner* — Zeina Elchanti
(74) *Attorney, Agent, or Firm* — Pramudji Law Group PLLC; Ari Pramudji

(57) ABSTRACT

Various implementations described herein may refer to a system and method for trading emissions units. In one implementation, a method may include receiving emissions attribute data from users for emissions objects, where a respective emissions object is associated with a respective emissions output. The method may also include receiving evidence data from the users for the emissions objects, where the respective device is configured to transmit the evidence data to a distributed ledger. The method may further include determining emissions output data for the emissions objects. The method may additionally include transmitting the emissions output data to the distributed ledger. The method may also include generating emissions units for the users based on the emissions output data. The method may further include providing an emissions market platform to the users for trading the emissions units.

20 Claims, 165 Drawing Sheets

Related U.S. Application Data application No. 17/976,738, filed on Oct. 28, 2022, and a continuation-in-part of application No. 17/732,487, filed on Apr. 28, 2022, and a continuation-in-part of application No. 17/576,861, filed on Jan. 14, 2022, and a continuation-in-part of application No. 17/567,686, filed on Jan. 3, 2022, and a continuation-in-part of application No. 17/566,876, filed on Dec. 31, 2021, and a continuation-in-part of application No. 17/555,050, filed on Dec. 17, 2021, and a continuation-in-part of application No. 17/541,080, filed on Dec. 2, 2021, now Pat. No. 11,836,791, and a continuation-in-part of application No. 17/510,318, filed on Oct. 25, 2021, and a continuation-in-part of application No. 17/493,455, filed on Oct. 4, 2021, and a continuation-in-part of application No. 17/493,432, filed on Oct. 4, 2021, and a continuation-in-part of application No. 17/403,826, filed on Aug. 16, 2021, and a continuation-in-part of application No. 17/375,914, filed on Jul. 14, 2021, now Pat. No. 11,740,777, and a continuation-in-part of application No. 17/373,679, filed on Jul. 12, 2021, and a continuation-in-part of application No. 17/358,429, filed on Jun. 25, 2021, and a continuation-in-part of application No. 17/349,829, filed on Jun. 16, 2021, and a continuation-in-part of application No. 17/324,051, filed on May 18, 2021, and a continuation-in-part of application No. 17/187,792, filed on Feb. 27, 2021, now Pat. No. 11,880,883, and a continuation-in-part of application No. 17/178,174, filed on Feb. 17, 2021, now Pat. No. 11,790,382, and a continuation-in-part of application No. 17/175,689, filed on Feb. 14, 2021, now Pat. No. 11,823,090, and a continuation-in-part of application No. 17/165,813, filed on Feb. 2, 2021, and a continuation-in-part of application No. 17/082,249, filed on Oct. 28, 2020, and a continuation-in-part of application No. 17/082,254, filed on Oct. 28, 2020, and a continuation-in-part of application No. 17/069,597, filed on Oct. 13, 2020, said application No. 17/403,826 is a continuation of application No. 16/589,229, filed on Oct. 1, 2019, now abandoned, said application No. 17/976,738 is a continuation of application No. 16/556,838, filed on Aug. 30, 2019, now Pat. No. 11,555,709, application No. 18/081,677 is a continuation-in-part of application No. 16/397,685, filed on Apr. 29, 2019, and a continuation-in-part of application No. 16/380,771, filed on Apr. 10, 2019, and a continuation-in-part of application No. 16/359,841, filed on Mar. 20, 2019, and a continuation-in-part of application No. 16/357,241, filed on Mar. 18, 2019, said application No. 17/510,318 is a continuation of application No. 16/293,712, filed on Mar. 6, 2019, now Pat. No. 11,157,852, said application No. 17/493,455 is a continuation of application No. 16/290,278, filed on Mar. 1, 2019, now Pat. No. 11,138,661, said application No. 17/567,686 is a continuation of application No. 16/274,490, filed on Feb. 13, 2019, now Pat. No. 11,215,466, which is a continuation-in-part of application No. 16/258,658, filed on Jan. 27, 2019, now Pat. No. 11,035,682, said application No. 17/541,080 is a continuation of application No. 16/257,032, filed on Jan. 24, 2019, now abandoned, application No. 18/081,677 is a continuation-in-part of application No. 16/242,967, filed on Jan. 8, 2019, said application No. 17/555,050 is a continuation of application No. 16/242,981, filed on Jan. 8, 2019, now abandoned, application No. 18/081,677 is a continuation-in-part of application No. 16/239,485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, and a continuation-in-part of application No. 15/484,059, filed on Apr. 10, 2017, said application No. 17/493,432 is a continuation of application No. 15/266,326, filed on Sep. 15, 2016, now Pat. No. 11,138,827.

(60) Provisional application No. 63/290,153, filed on Dec. 16, 2021.

(58) Field of Classification Search
USPC .............................................................. 705/5
See application file for complete search history.

(56) References Cited

U.S. PATENT DOCUMENTS

| | | | |
|---|---|---|---|
| D318,073 | S | 7/1991 | Jang |
| 5,249,259 | A | 9/1993 | Harvey |
| 5,412,560 | A | 5/1995 | Dennison |
| 5,604,676 | A | 2/1997 | Penzias |
| 5,726,885 | A | 3/1998 | Klein et al. |
| 5,751,245 | A | 5/1998 | Janky et al. |
| 5,948,040 | A | 9/1999 | DeLorme |
| 5,973,619 | A | 10/1999 | Paredes |
| 6,175,831 | B1 | 1/2001 | Weinreich et al. |
| 6,240,396 | B1 | 5/2001 | Walker et al. |
| 6,285,999 | B1 | 9/2001 | Page |
| D453,945 | S | 2/2002 | Shan |
| 6,356,838 | B1 | 3/2002 | Paul |
| 6,400,996 | B1 | 6/2002 | Hoffberg |
| D460,952 | S | 7/2002 | Kataoka |
| 6,421,606 | B1 | 7/2002 | Asai et al. |
| 6,434,530 | B1 | 8/2002 | Sloane et al. |
| D468,738 | S | 1/2003 | Lin |
| D469,089 | S | 1/2003 | Lin |
| 6,609,103 | B1 | 8/2003 | Kolls |
| 6,618,062 | B1 | 9/2003 | Brown et al. |
| 6,646,659 | B1 | 11/2003 | Brown et al. |
| 6,663,564 | B2 | 12/2003 | Miller-Kovach et al. |
| 6,708,879 | B2 | 3/2004 | Hunt |
| 6,850,907 | B2 | 2/2005 | Lutnick et al. |
| 7,010,472 | B1 | 3/2006 | Vasey-Glandon et al. |
| 7,090,638 | B2 | 8/2006 | Vidgen |
| 7,373,320 | B1 | 5/2008 | Mcdonough |
| D590,396 | S | 4/2009 | Lo |
| 7,584,123 | B1 | 9/2009 | Karonis et al. |
| 7,634,442 | B2 | 12/2009 | Alvarado et al. |
| 7,680,690 | B1 | 3/2010 | Catalano |
| 7,680,770 | B1 | 3/2010 | Buyukkokten et al. |
| 7,711,629 | B2 | 5/2010 | Laurent et al. |
| 7,747,739 | B2 | 6/2010 | Bridges et al. |
| 7,756,633 | B2 | 7/2010 | Huang et al. |
| 7,788,207 | B2 | 8/2010 | Alcorn et al. |
| D628,171 | S | 11/2010 | Hakopian |
| 7,886,166 | B2 | 2/2011 | Shnekendorf et al. |
| D638,879 | S | 5/2011 | Suto |
| 7,987,110 | B2 | 7/2011 | Cases et al. |
| 8,024,234 | B1 | 9/2011 | Thomas et al. |
| 8,065,191 | B2 | 11/2011 | Senior |
| D650,385 | S | 12/2011 | Chiu |
| 8,121,780 | B2 | 2/2012 | Gerdes et al. |
| 8,249,946 | B2 | 8/2012 | Froseth et al. |
| 8,296,335 | B2 | 10/2012 | Bouve et al. |
| 8,388,451 | B2 | 3/2013 | Auterio et al. |
| 8,570,244 | B2 | 10/2013 | Mukawa |
| 8,762,035 | B2 | 6/2014 | Levine et al. |
| 8,798,593 | B2 | 8/2014 | Haney |

(56)     References Cited

U.S. PATENT DOCUMENTS

| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 3/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| 9,450,817 B1 | 9/2016 | Bahadur et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,216,367 B1 | 2/2019 | Patel |
| 10,262,289 B2 | 4/2019 | Vaananen |
| 10,395,332 B1 | 8/2019 | Konrardy et al. |
| 10,403,050 B1 | 9/2019 | Beall et al. |
| 10,408,489 B1 | 9/2019 | Trishaun et al. |
| 10,452,978 B2 | 10/2019 | Shazeer et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,832,337 B1 | 11/2020 | Floyd et al. |
| D903,657 S | 12/2020 | Catania |
| D903,658 S | 12/2020 | Catania |
| D903,659 S | 12/2020 | Catania |
| 10,872,381 B1 | 12/2020 | Leise et al. |
| D910,758 S | 2/2021 | Leong |
| 11,138,827 B2 | 10/2021 | Simpson |
| 11,183,080 B2 | 11/2021 | Wolf et al. |
| D938,375 S | 12/2021 | Zhang |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 | 1/2023 | Simpson |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,704,219 B1 | 7/2023 | Lerner et al. |
| 11,722,500 B2 | 8/2023 | Singh |
| 11,734,618 B2 | 8/2023 | Ogden |
| D1,000,137 S | 10/2023 | Shuster |
| D1,007,451 S | 12/2023 | Im |
| D1,024,065 S | 4/2024 | Kim |
| 12,001,999 B2 | 6/2024 | Simpson |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomaian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0254819 A1 | 12/2004 | Halim |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh et al. |
| 2006/0184321 A1 | 8/2006 | Kawakami |
| 2007/0005224 A1 | 1/2007 | Sutardja |
| 2007/0260723 A1 | 11/2007 | Cohen |
| 2008/0033833 A1 | 2/2008 | Senior |
| 2008/0040232 A1 | 2/2008 | Perchthaler |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195428 A1 | 8/2008 | O'Sullivan |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1 | 2/2010 | Bai et al. |
| 2010/0042453 A1 | 2/2010 | Scaramellino et al. |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0208029 A1 | 8/2010 | Marti |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2010/0318373 A1* | 12/2010 | Harris ............ G06Q 10/109 |
| | | 705/1.1 |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Ajjarapu et al. |
| 2011/0184784 A1 | 7/2011 | Rudow |
| 2011/0191248 A1 | 8/2011 | Bishop |
| 2011/0202418 A1 | 8/2011 | Kempton et al. |
| 2012/0023032 A1 | 1/2012 | Visdomini |
| 2012/0072925 A1 | 3/2012 | Jenkins et al. |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0130556 A1 | 5/2012 | Marhoefer |
| 2012/0136527 A1 | 5/2012 | McQuade |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0035973 A1 | 2/2013 | Desai et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1* | 10/2013 | Dembo ............ G06T 11/206 |
| | | 705/7.39 |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0032034 A1 | 1/2014 | Raptopoulos |

(56) References Cited

U.S. PATENT DOCUMENTS

| | | |
|---|---|---|
| 2014/0038781 A1 | 2/2014 | Foley |
| 2014/0052500 A1 | 2/2014 | Vallapuzha et al. |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0282586 A1 | 9/2014 | Shear et al. |
| 2014/0310019 A1 | 10/2014 | Blander et al. |
| 2014/0310149 A1 | 10/2014 | Singh |
| 2014/0324633 A1 | 10/2014 | Pollak et al. |
| 2014/0349672 A1 | 11/2014 | Kern et al. |
| 2014/0358431 A1 | 12/2014 | Isert et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0018969 A1 | 1/2016 | Sundarraman |
| 2016/0026253 A1 | 1/2016 | Bradski et al. |
| 2016/0034305 A1 | 2/2016 | Shear et al. |
| 2016/0041628 A1 | 2/2016 | Verma |
| 2016/0063436 A1 | 3/2016 | Coles |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0221935 A1 | 8/2016 | Jaworska-Maslanka |
| 2016/0224935 A1 | 8/2016 | Burnett |
| 2016/0225115 A1 | 8/2016 | Levy et al. |
| 2016/0253662 A1 | 9/2016 | Sriram |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307276 A1 | 10/2016 | Young |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0318325 A1 | 11/2017 | Ortiz |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2017/0373509 A1 | 12/2017 | Betzin |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0088455 A1 | 3/2018 | Cippant |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0165354 A1 | 6/2018 | Mehta et al. |
| 2018/0173742 A1 | 6/2018 | Liu et al. |
| 2018/0173800 A1 | 6/2018 | Chang et al. |
| 2018/0188715 A1 | 7/2018 | Cella et al. |
| 2018/0190026 A1 | 7/2018 | Barnett et al. |
| 2018/0209801 A1 | 7/2018 | Stentz |
| 2018/0209803 A1 | 7/2018 | Rakah |
| 2018/0238705 A1 | 8/2018 | O'Herlihy |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0180862 A1 | 6/2019 | Wisser et al. |
| 2019/0186942 A1 | 6/2019 | Rubin |
| 2019/0188450 A1 | 6/2019 | Spivack et al. |
| 2019/0202448 A1 | 7/2019 | Pal et al. |
| 2019/0204110 A1 | 7/2019 | Dubielzyk |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0259008 A1 | 8/2019 | Lindsey |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0318286 A1 | 10/2019 | Simpson |
| 2019/0324989 A1 | 10/2019 | Borochoff et al. |
| 2019/0325541 A1 | 10/2019 | Simpson |
| 2019/0333166 A1 | 10/2019 | Simpson |

(56)     References Cited

U.S. PATENT DOCUMENTS

| | | |
|---|---|---|
| 2019/0333181 A1 | 10/2019 | Simpson |
| 2019/0353499 A1 | 11/2019 | Stenneth |
| 2020/0005388 A1 | 1/2020 | Lim et al. |
| 2020/0013498 A1 | 1/2020 | Gelber |
| 2020/0027096 A1* | 1/2020 | Cooner ................. G06Q 40/04 |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0184416 A1 | 6/2020 | Javaheri |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |
| 2021/0004909 A1 | 1/2021 | Farmer et al. |
| 2021/0012278 A1 | 1/2021 | Alon et al. |
| 2021/0041258 A1 | 2/2021 | Simpson |
| 2021/0042835 A1 | 2/2021 | Simpson |
| 2021/0065100 A1 | 3/2021 | Hwang |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1 | 10/2021 | Simpson |
| 2021/0326872 A1 | 10/2021 | Robotham |
| 2021/0379447 A1 | 12/2021 | Lee |
| 2021/0382924 A1 | 12/2021 | Aaltonen et al. |
| 2022/0020073 A1 | 1/2022 | Farmer |
| 2022/0058578 A1 | 2/2022 | Javaheri |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | |
|---|---|---|
| JP | 2003177034 A | 12/2001 |
| KR | 20170078094 A1 | 12/2015 |
| WO | 9508240 A2 | 3/1995 |
| WO | 2001041084 A2 | 6/2001 |
| WO | 2013010160 A1 | 1/2013 |
| WO | 2015059691 A1 | 4/2015 |
| WO | 2015161307 A1 | 4/2015 |
| WO | 2018024844 A1 | 2/2018 |
| WO | 2019/134005 A1 | 7/2019 |
| WO | 2019183468 A1 | 9/2019 |
| WO | 2021/163675 A1 | 8/2021 |

OTHER PUBLICATIONS

PCT International Search Report and Written Opinion; PCT/US2020/027543; Jul. 1, 2020.
PCT International Search Report and Written Opinion; PCT/US2020/023223; Jun. 19, 2020.
PCT International Search Report and Written Opinion; PCT/US2020/023729; Jun. 18, 2020.
PCT International Search Report and Written Opinion; PCT/US2020/021546; Jun. 8, 2020.
PCT International Search Report and Written Opinion; PCT/US2020/018012; Apr. 21, 2020.
PCT International Search Report and Written Opinion; PCT/US2020/012208; Mar. 24, 2020.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020).
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?
Peters, et al.; Student Support Services for Online Learning Re-Imagined and Re-Invigorated: Then, Now and What's to Come; Contact North | Contact Nord; Sep. 2017.
Soccer ball-shaped drone might be the safest flying robot yet https://mashable.com/2015/12/21/soccer-ball-drone/; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205; filed Jan. 10, 1997.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool for YOur Business, https://www.reedsmith.com/-/media/files/perspectives/2007/02/freight-derivatives--a-vital-tool-for-your-business/files/freight-derivatives-- a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php, dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13 , Mar. 27, 2019.
PCT International Search Report and Written Opinion; PCT/US2021/065855; Mar. 29, 2022.
PCT International Search Report and Written Opinion; PCT/US2022/012717; Mar. 30, 2022.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.

(56)                    References Cited

OTHER PUBLICATIONS

Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
Freebeat, Smart Exercise Bike; retrieved from internet: https://www.amazon.com/Resistance-Cushioned-Detection-Altorithm-Instructors/dp/B0BZKKZ6B3/7th=1, Mar. 3, 2023; p. 1.
PCT International Search Report and Written Opinion; PCT/US2022/027077; Nov. 1, 2022.
"Impact of aircraft size and seat availability on airlines demand and market share in duopoly markets" Published by Elsevier, 2005.
PCT International Search Report and Written Opinion; PCT/US2022/052969; Mar. 21, 2023.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; Mar. 8, 2023.
EP23153137.7 European Search Report, May 24, 2023, pp. 1-10.
EP20787830.7 European Search Report, May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
EP23168879.7 European Search Report, Jul. 5, 2023, pp. 1-13.
Papa, U., & Del Core, G., "Design of Sonar Sensor Model for Safe Landing of an UAV," IEEE Metrology for Aerospace, 2015, pp. 346-350.
Karbassi, et al.; "Vehicle Route Prediction and Time of Arrival Estimation Techniques for Improved Transportation System Management" Published by IEEE; 2003, pp. 511-516.
"Node Influence Metric", Wikipedia, Nov. 6, 2020, pp. 1-5.
EP21916571 European Search Report, May 29, 2024, pp. 1-9.
Bortolini, et al.; "Fresh food sustainable distribution: cost, delivery time and carbon footprint three-objective optimization," 2016, pp. 1-12.
Aratani, Lori, "This app wants to reward you for smart commuting choices," The Washington Post, Aug. 18, 2018, pp. 1-3.
Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.
Fulldomepro, VR Aquatic Simulator with a Dome, Pub. Sep. 3 2018, https://www.youtube.com/watch?v=k_53G5DksjQ, pp. 1-2.
Randomoneh, Dome Screens & Displays, Pub. Oct. 12, 2012, https://hardforum.com/threads/dome-screens-displays, p. 1.
Borgobello, Bridget, TOOB Personal Dome Screen Revamped, Pub. Jan. 12, 2012, https:// newatlas.com/toob-earth-personal-dome-screen/21082, p. 1.
Asghari, et al; "Price-aware Real-time Ride-sharing at Scale—An Auction-based Approach", Oct. 31, 2016, SIGSPACIAL'16: Proceedings of the 24th ACM SIGSPATIAL International Conference on Advances in Geographic Information Systems, Article No. 3, pp. 1-10.
EP22740218.7 Extended European Search Report, Nov. 12, 2024, pp. 1-29.
EP23153137.7 Exam Report (Communication pursuant to Article 94(3) EPC), Mar. 5, 2025, pp. 1-11.
Valdes, J. J., et al.; (Sep. 2007). Virtual reality high dimensional objective spaces for multi-objective optimization: An improved representation. In 2007 IEEE Congress on Evolutionary Computation (pp. 4191-4198). IEEE., pp. 1-11.

Valdes, J. J.,et al.; (2007). Multi-objective evolutionary optimization for constructing neural networks for virtual reality visual data mining: Application to geophysical prospecting. Neural networks, 20(4), pp. 498-508.
Zhao, et al., Deshpande, P. M., Naughton, J. F., & Shukla, A (Jun. 1998). Simultaneous optimization and evaluation of multiple dimensional queries. In Proceedings of the 1998 Acm Sigmod international conference on Management of data (pp. 271-282).
A. Lazarus et al., Multimodal Behavior Therapy. Berlin, Germany: Springer, 1976.
B. P. Yuhas, M. H. Goldstein, and T. J. Sejnowski, "Integration of acoustic and visual speech signals using neural networks," IEEE Commun. Mag., vol. 27, No. 11, pp. 65-71, Nov. 1989.
W. Guo, J. Wang, and S. Wang, "Deep multimodal representation learning: A survey," IEEE Access, vol. 7, pp. 63373-63394, 2019.
L. Wu, S. L. Oviatt, and P. R. Cohen, "Multimodal integration—a statistical view," IEEE Trans. Multimedia, vol. 1, No. 4, pp. 334-341, Dec. 1999.
J. Shang, T. Ma, C. Xiao, and J. Sun, "Pre-training of graph augmented transformers for medication recommendation," 2019, arXiv:1906.00346.
K. Gavrilyuk, R. Sanford, M. Javan, and C. G. Snoek, "Actor transformers for group activity recognition," inProc. IEEE Conf. Comput. Vis. Pattern Recognit., 2020, pp. 836-845.
Beltagy, M. E. Peters, and A. Cohan, "Longformer: The long-document transformer," 2020, arXiv:2004.05150.
D. Shin, Z. Ren, E. B. Sudderth, and C. C. Fowlkes, "3D scene reconstruction with multi-layer depth and epipolar transformers," in Proc. IEEE Int. Conf. Comput. Vis., 2019, pp. 2172-2182.
P. Xu et al., "SketchMate: Deep hashing for million-scale human sketch retrieval," in Proc. IEEE Conf. Comput. Vis. Pattern Recognit., 2018, pp. 8090-8098.
K. Gupta, J. Lazarow, A. Achille, L. Davis, V. Mahadevan, and A. Shrivastava, "LayoutTransformer: Layout generation and completion with self-attention," 2020, arXiv:2006.14615.
T. Hastie, R. Tibshirani, J. H. Friedman, and J. H. Friedman, The Elements of Statistical Learning: Data Mining, Inference, and Prediction, vol. 2. Berlin, Germany: Springer, 2009.
C. Zhang, Z. Yang, X. He, and L. Deng, "Multimodal intelligence: Representation learning, information fusion, and applications," IEEE J. Sel. Topics Signal Process., vol. 14, No. 3, pp. 478-493, Mar. 2020.
C. Sun, A. Myers, C. Vondrick, K. Murphy, and C. Schmid, "VideoBERT: A joint model for video and language representation learning," in Proc. IEEE Int. Conf. Comput. Vis., 2019, pp. 7463-7472.
N. Carion, F. Massa, G. Synnaeve, N. Usunier, A. Kirillov, and S. Zagoruyko, "End-to-end object detection with transformers," in Proc. Eur. Conf. Comput. Vis., 2020, pp. 213-229.
J. Devlin, M.-W. Chang, K. Lee, and K. Toutanova, "BERT: Pretraining of deep bidirectional transformers for language understanding," 2018, arXiv:1810.04805.
Vaswani et al., "Attention is all you need," in Proc. Int. Conf. Neural Inf. Process. Syst., 2017, pp. 5998-6008.
T. Baltruaitis, C. Ahuja, and L.-P. Morency, "Multimodal machine learning: A survey and taxonomy." IEEE Trans. Pattern Anal. Mach. Intell., vol. 41, No. 2, pp. 423-443, Feb. 2019.
Cai, et al.; Incorporating Visual Information in Audio Based Self-Supervised Speaker Recognition; IEEE/ACM Transactions on Audio, Speech and Language Processing; vol. 30; pp. 1422-1435; Mar. 2, 20224.
Saulle, Rosella, et al., "Cost and Cost-Effectiveness of the Mediterranean Diet: Results of a Systematic Review," www.mdpi.com/journal/nutrients, Nutrients 2013, 5, pp. 4566-4586.
Garamvolgyi et al.; Towards_Model-Driven_Engineering_of_Smart_Contracts; IEEE/IFIP; pp. 134-139; 2018.
Khan et al; "A Distri buted-Ledger Consortium Model for Collaborative_Innovation" ; IEEE pp. 29-37; 2017.
Meiklejohn S.; Top Ten Obstacles along Distributed Ledgers Path to Adoption; UCL; pp. 13-19; 2017.
Muttavarapu et al.; Distributed_Ledger_for_Spammers_Resume; IEEE; 9 pages, 2018.

(56) References Cited

OTHER PUBLICATIONS

Nikonowicz, et al., "Virtual Power Plants", Published by Open Acess Journal, 2012, pp. 135-149.

S. Pramanik, P. Agrawal, and A. Hussain, "OmniNet: A unified architecture for multi-modal multi-task learning," Jul. 3, 2020 v2 , arXiv:1907.07804.

R. Akula, S. Gella, Y. Al-Onaizan, S.-C. Zhu, and S. Reddy, "Words aren't enough, their order matters: On the robustness of grounding visual referring expressions," 2020, arXiv:2005.01655.

R. Child, S. Gray, A. Radford, and I. Sutskever, "Generating long sequences with sparse transformers," 2019, arXiv:1904.10509.

Y. Xian, C. H. Lampert, B. Schiele, and Z. Akata, "Zero-shot learning-A comprehensive evaluation of the good, the bad and the ugly," IEEE Trans. Pattern Anal. Mach. Intell., vol. 41, No. 9, pp. 2251-2265, Sep. 2019.

Owens and A. A. Efros, "Audio-visual scene analysis with selfsupervised multisensory features," inProc. Eur. Conf. Comput. Vis., 2018, pp. 639-658.

T. Chen and R. R. Rao, "Audio-visual integration in multimodal communication," Proc. IEEE, vol. 86, No. 5, pp. 837-852, May 1998.

N. Li, S. Liu, Y. Liu, S. Zhao, and M. Liu, "Neural speech synthesis with transformer network," in Proc. AAAI Conf. Artif. Intell., 2019, pp. 6706-6713.

M. Chen, Y. Li, Z. Zhang, and S. Huang, "TVT: Two-view transformer network for video captioning," in Proc. 10th Asian Conf. Mach. Learn., 2018, pp. 847-862.

X. Lin, C. Ding, J. Zeng, and D. Tao, "GPS-Net: Graph property sensing network for scene graph generation," in Proc. IEEE Conf. Comput. Vis. Pattern Recognit., 2020, pp. 3743-3752.

W. Hao, C. Li, X. Li, L. Carin, and J. Gao, "Towards learning a generic agent for vision-and-language navigation via pre-training," in Proc. IEEE Conf. Comput. Vis. Pattern Recognit., 2020, pp. 13134-13143.

S. Ren, K. He, R. Girshick, and J. Sun, "Faster R-CNN: Towards realtime object detection with region proposal networks," in Proc. Int. Conf. Neural Inf. Process. Syst., 2015, pp. 91-99.

Y.-H. H. Tsai, S. Bai, P. P. Liang, J. Z. Kolter, L.-P. Morency, and R. Salakhutdinov, "Multimodal transformer for unaligned multimodal language sequences," in Proc. Conf. Assoc. Comput. Linguistics, 2019, pp. 6558-6569.

J. Lin, A. Yang, Y. Zhang, J. Liu, J. Zhou, and H. Yang, "InterBERT: Vision-and-language interaction for multi-modal pretraining," 2020, arXiv:2003.13198.

D. Tran, H.Wang, L. Torresani, J. Ray, Y. LeCun, and M. Paluri, "A closer look at spatiotemporal convolutions for action recognition," inProc. IEEE Conf. Comput. Vis. Pattern Recognit., 2018, pp. 6450-6459.

S. Xie, C. Sun, J. Huang, Z. Tu, and K. Murphy, "Rethinking spatiotemporal feature learning for video understanding," 2017, arXiv:1712.04851.

L. Zhou, Y. Zhou, J. J. Corso, R. Socher, and C. Xiong, "End-to-end dense video captioning with masked transformer," in Proc. IEEE Conf. Comput. Vis. Pattern Recognit., 2018, pp. 8739-8748.

X. Wang, R. Girshick, A. Gupta, and K. He, "Non-local neural networks," in Proc. IEEE Conf. Comput. Vis. Pattern Recognit., 2018, pp. 7794-7803.

J. L. Ba, J. R. Kiros, and G. E. Hinton, "Layer normalization," 2016, arXiv:1607.06450.

S. Ioffe and C. Szegedy, "Batch normalization: Accelerating deep network training by reducing internal covariate shift," in Proc. Int. Conf. Mach. Learn., 2015, pp. 448-456.

K. He, X. Zhang, S. Ren, and J. Sun, "Deep residual learning for image recognition," in Proc. IEEE Conf. Comput. Vis. Pattern Recognit., 2016, pp. 770-778.

J. Malmaud, J. Huang, V. Rathod, N. Johnston, A. Rabinovich, and K. Murphy, "What's Cookin'? Interpreting cooking videos using text, speech and vision," 2015, arXiv:1503.01558.

L. Zhou, C. Xu, and J. J. Corso, "Towards automatic learning of procedures from web instructional videos," in Proc. AAAI Conf. Artif. Intell., 2018, pp. 7590-7598.

D. Kiela et al., The hateful memes challenge: Detecting hate speech in multimodal memes, 2020, arXiv:2005.04790.

Miech, D. Zhukov, J.-B. Alayrac, M. Tapaswi, I. Laptev, and J. Sivic, "HowTo100M: Learning a text-video embedding by watching hundred million narrated video clips," in Proc. IEEE Int. Conf. Comput. Vis., 2019, pp. 2630-2640.

Das et al., "Visual dialog," in Proc. IEEE Conf. Comput. Vis. Pattern Recognit., 2017, pp. 1080-1089.

R. Krishna, K. Hata, F. Ren, L. Fei-Fei, and J. C. Niebles, "Densecaptioning events in videos," in Proc. IEEE Int. Conf. Comput. Vis., 2017, pp. 706-715.

V. Ordonez, G. Kulkarni, and T. Berg, "Im2Text: Describing images using 1 million captioned photographs," in Proc. Int. Conf. Neural Inf. Process. Syst., 2011, pp. 1143-1151.

R. Krishna et al., "Visual genome: Connecting language and vision using crowdsourced dense image annotations," Int. J. Comput. Vis., vol. 123, pp. 32-73, 2017.

S. Antol et al., "VQA: Visual question answering," in Proc. IEEE Int. Conf. Comput. Vis., 2015, pp. 2425-2433.

T.-Y. Lin et al., "Microsoft COCO: Common objects in context," in Proc. Eur. Conf. Comput. Vis., 2014, pp. 740-755.

P. Sharma, N. Ding, S. Goodman, and R. Soricut, "Conceptual captions: A cleaned, hypernymed, image alt-text dataset for automatic image captioning," in Proc. Conf. Assoc. Comput. Linguistics, 2018, pp. 2556-2565.

H. Luo et al., "UniVL: A unified video and language pre-training model for multimodal understanding and generation," 2020, arXiv:2002.06353.

D. Qi, L. Su, J. Song, E. Cui, T. Bharti, and A. Sacheti, "ImageBERT: Cross-modal pre-training with large-scale weak- supervised image-text data," 2020, arXiv:2001.07966.

Z. Huang, Z. Zeng, B. Liu, D. Fu, and J. Fu, "Pixel-BERT: Aligning image pixels with text by deep multi-modal transformers," 2020, arXiv:2004.00849.

X. Li et al., "Oscar: Object-semantics aligned pre-training for vision-language tasks," in Proc. Eur. Conf. Comput. Vis., 2020, pp. 121-137.

J. Lu, V. Goswami, M. Rohrbach, D. Parikh, and S. Lee, "12-in-1: Multitask vision and language representation learning," in Proc. IEEE Conf. Comput. Vis. Pattern Recognit., 2020, pp. 10434-10443.

L. Zhou, H. Palangi, L. Zhang, H. Hu, J. Corso, and J. Gao, "Unified vision-language pre-training for image captioning and VQA," in Proc. AAAI Conf. Artif. Intell., 2020, pp. 13041-13049.

C. Alberti, J. Ling, M. Collins, and D. Reitter, "Fusion of detected objects in text for visual question answering," 2019, arXiv:1908.05054.

G. Li, N. Duan, Y. Fang, M. Gong, and D. Jiang, "Unicoder-VL: A universal encoder for vision and language by cross- modal pre-training," in Proc. AAAI Conf. Artif. Intell., 2020, pp. 11336-11344.

C. Sun, F. Baradel, K. Murphy, and C. Schmid, "Learning video representations using contrastive bidirectional transformer," 2019, arXiv:1906.05743.

Y.-C. Chen et al., "UNITER: Universal image-text representation learning," in Proc. Eur. Conf. Comput. Vis., 2020, pp. 104-120.

W. Su et al., "VL-BERT: Pre-training of generic visual-linguistic representations," 2019, arXiv:1908.08530.

L. H. Li, M. Yatskar, D. Yin, C.-J. Hsieh, and K.-W. Chang, "VisualBERT: A simple and performant baseline for vision and language," 2019, arXiv:1908.03557.

H. Tan and M. Bansal, "LXMERT: Learning cross-modality encoder representations from transformers," 2019, arXiv:1908.07490.

J. Lu, D. Batra, D. Parikh, and S. Lee, "VILBERT: Pretraining taskagnostic visiolinguistic representations for vision-and-language tasks," 2019, arXiv:1908.02265.

Z. Yang, Z. Dai, Y. Yang, J. Carbonell, R. R. Salakhutdinov, and Q. V. Le, "XLNet: Generalized autoregressive pretraining for language understanding," in Proc. Int. Conf. Neural Inf. Process. Syst., 2019, Art. No. 517.

(56)              References Cited

OTHER PUBLICATIONS

Z. Dai, Z. Yang, Y. Yang, J. Carbonell, Q. V. Le, and R. Salakhutdinov, "Transformer-XL: Attentive language models beyond a fixed-length context," 2019, arXiv:1901.02860.

Radford, K. Narasimhan, T. Salimans, and I. Sutskever, "Improving language understanding by generative pre-training," 2018. [Online]. Available: https://s3-us-west-2.amazonaws.com/openai-assets/research-covers/language-unsupervised/language_understanding_ paper.pdf.

M. Lewis et al., "BART: Denoising sequence-to-sequence pre-training for natural language generation, translation, and comprehension," 2019, arXiv:1910.13461.

Y. Li et al., "BEHRT: Transformer for electronic health records," Sci. Rep., vol. 10, 2020, Art. No. 7155.

Chen, M., et al.; What may visualization processes optimize ?. IEEE transactions on visualization and computer. 2015, pp. 1-10.

Meneghini, et al.; Information to the Eye of the Beholder: Data Visualization for Many-Objective Optimization; Institute for polymers and Composites, University of Minho, 2018, pp. 1-9.

Franco, et al.; "Road vehicle emission factors development: A review" Published by Elsevier (Year: 2013); pp. 84-97.

Silverman, "New App Will Let You Buy Or Sell A Parking Space In Nyc", Cbs News, Jul. 20, 2011; https://www.cbsnews.com/newyork/news/new-app-will-let-you-buy-or-sell-a-parking-space/ (Year: 2011).

* cited by examiner

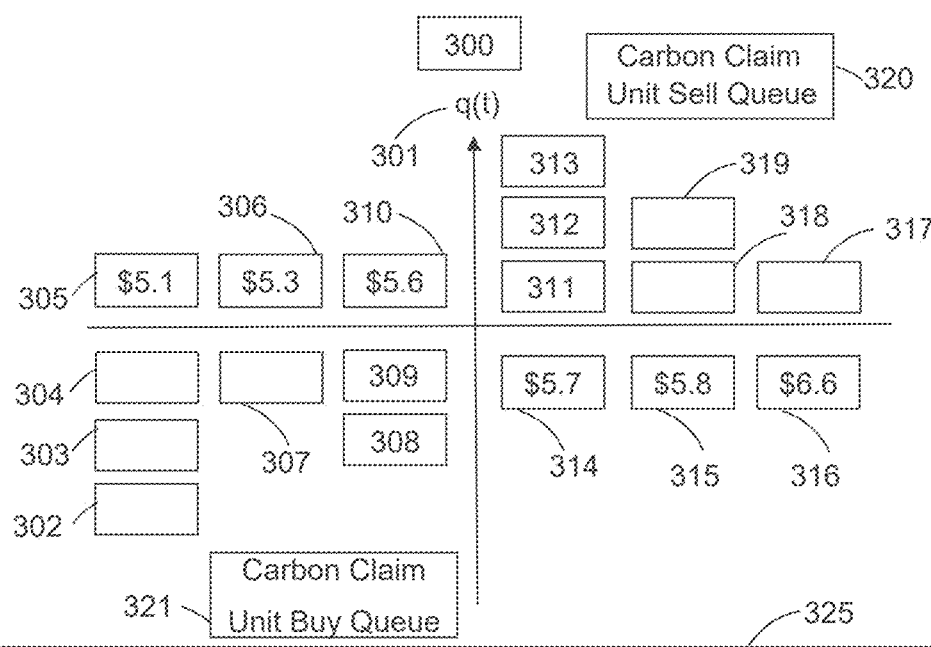
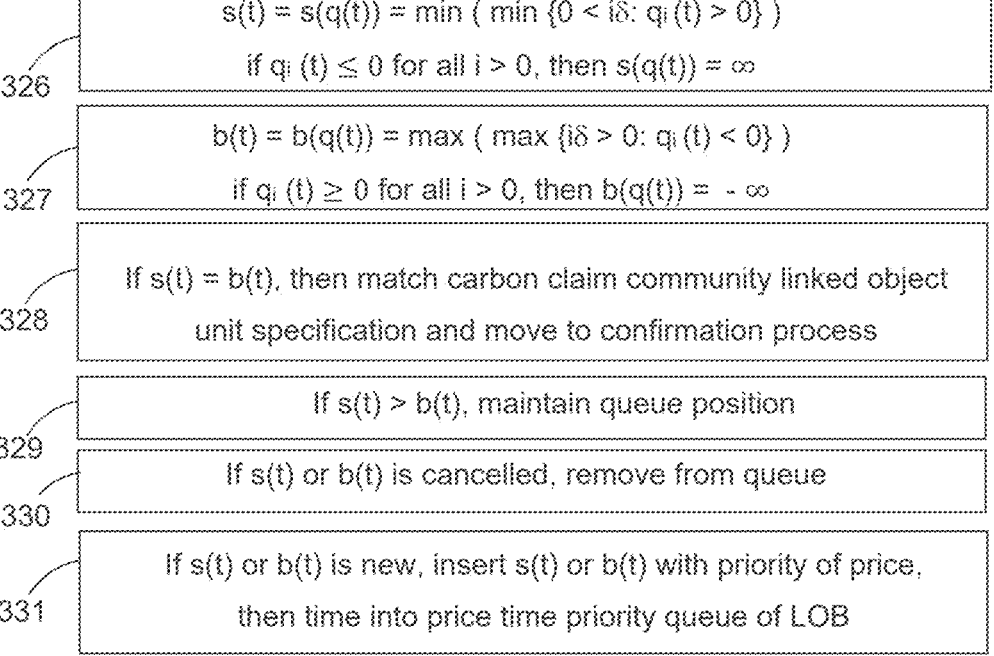
FIG. 3

Figure 16:
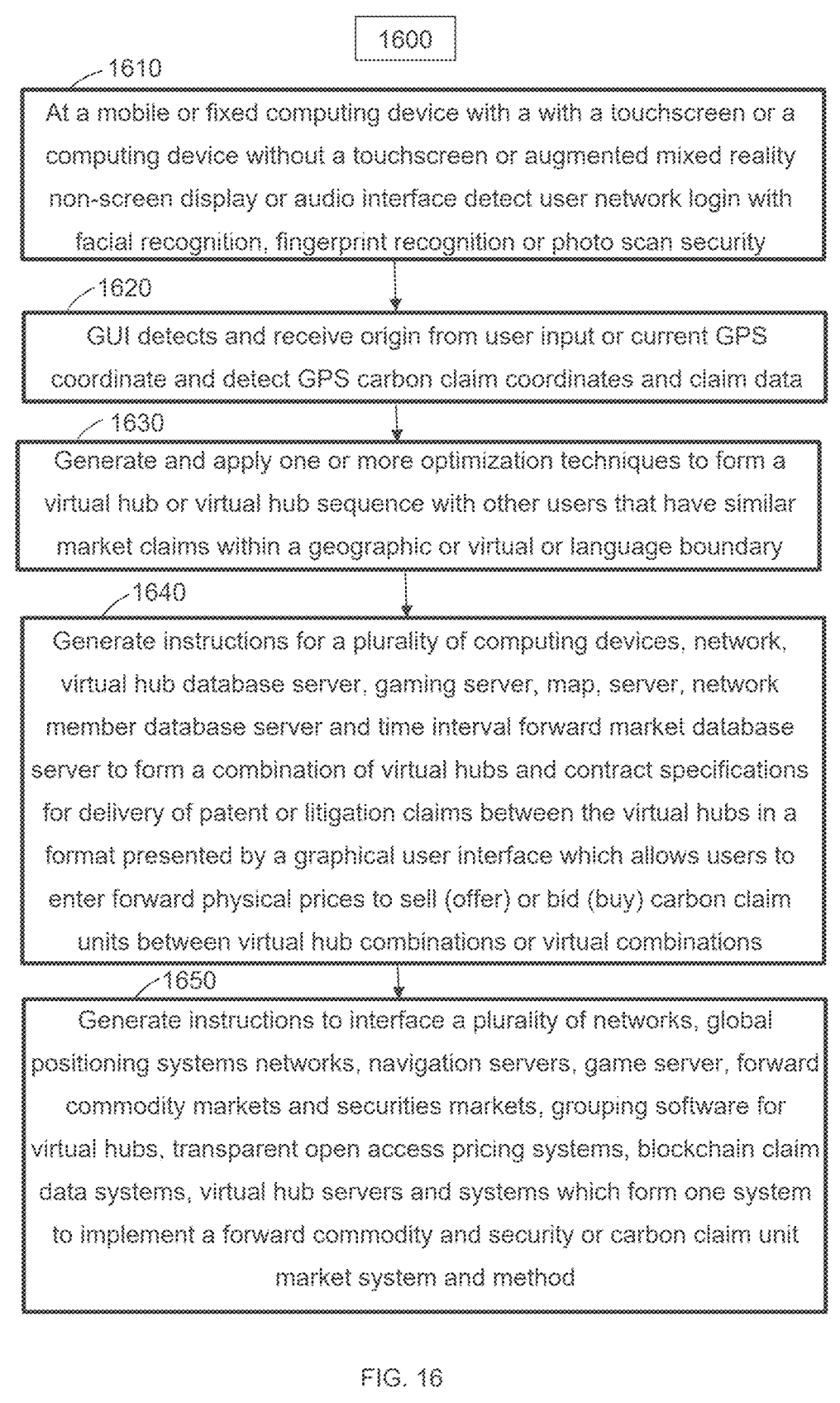

1600

1610

At a mobile or fixed computing device with a with a touchscreen or a computing device without a touchscreen or augmented mixed reality non-screen display or audio interface detect user network login with facial recognition, fingerprint recognition or photo scan security

1620

GUI detects and receive origin from user input or current GPS coordinate and detect GPS carbon claim coordinates and claim data

1630

Generate and apply one or more optimization techniques to form a virtual hub or virtual hub sequence with other users that have similar market claims within a geographic or virtual or language boundary

1640

Generate instructions for a plurality of computing devices, network, virtual hub database server, gaming server, map, server, network member database server and time interval forward market database server to form a combination of virtual hubs and contract specifications for delivery of patent or litigation claims between the virtual hubs in a format presented by a graphical user interface which allows users to enter forward physical prices to sell (offer) or bid (buy) carbon claim units between virtual hub combinations or virtual combinations

1650

Generate instructions to interface a plurality of networks, global positioning systems networks, navigation servers, game server, forward commodity markets and securities markets, grouping software for virtual hubs, transparent open access pricing systems, blockchain claim data systems, virtual hub servers and systems which form one system to implement a forward commodity and security or carbon claim unit market system and method

Figure 25:
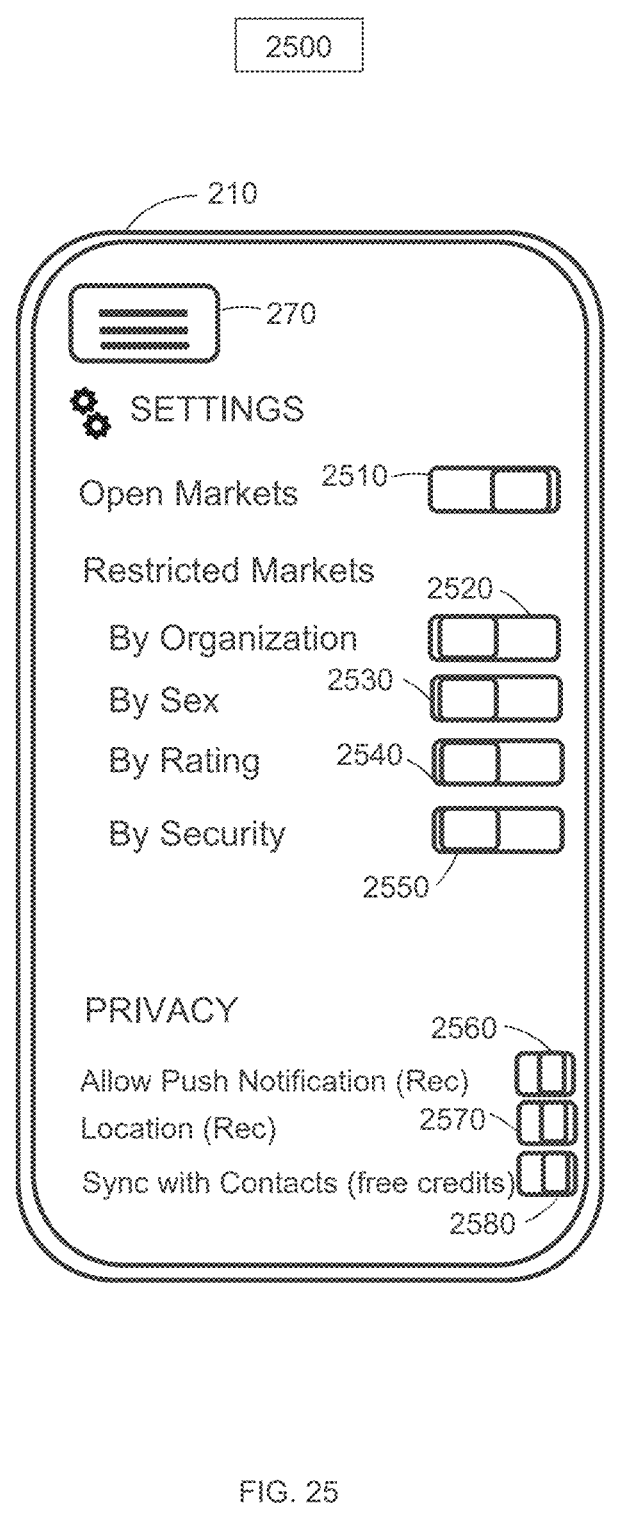

⚙ SETTINGS

Open Markets    2510

Restricted Markets

2520

By Organization

By Sex    2530

By Rating    2540

By Security

2550

PRIVACY

2560

Allow Push Notification (Rec)

Location (Rec)    2570

Sync with Contacts (free credits)

Figure 40:
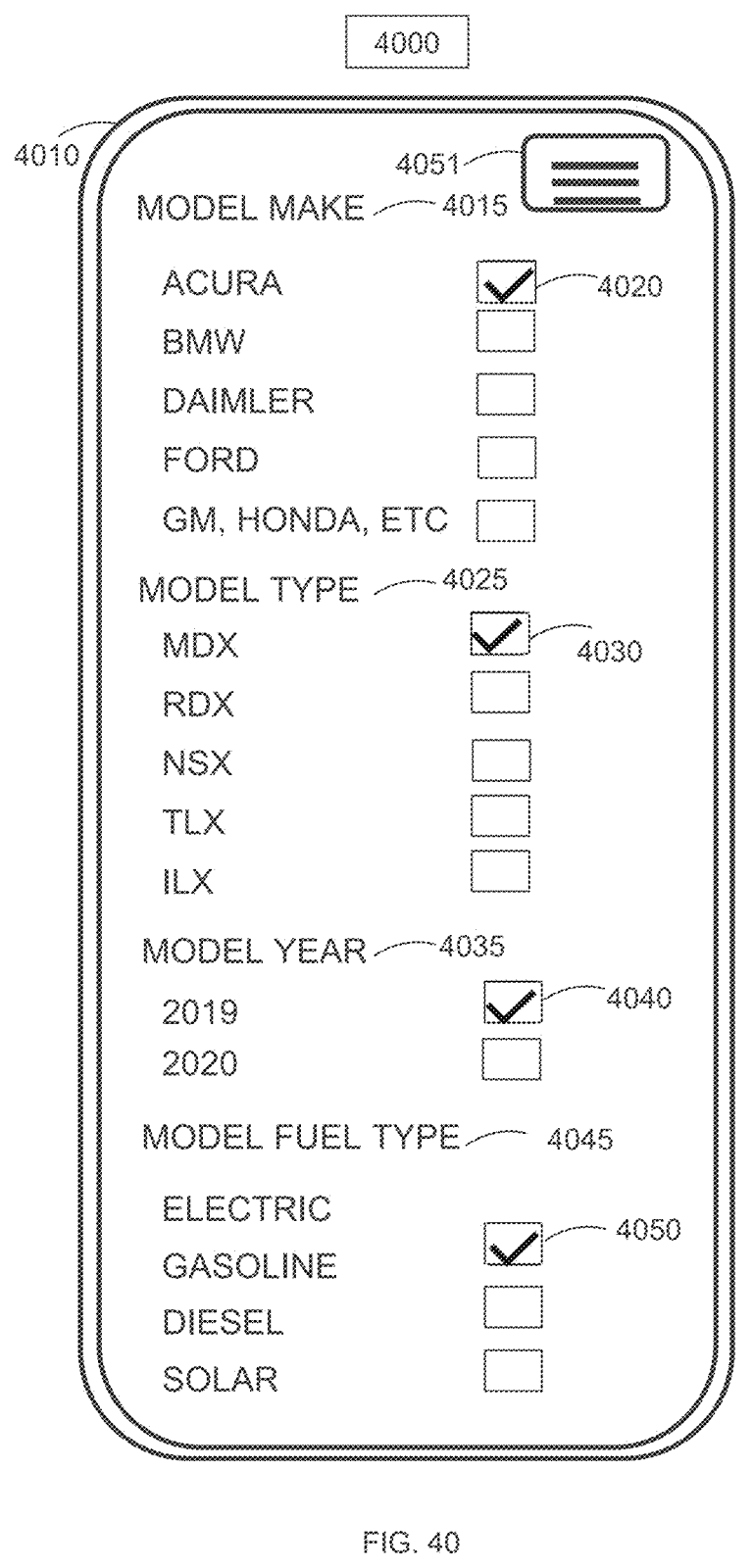

MODEL MAKE — 4015

ACURA          ☑ — 4020
BMW            ☐
DAIMLER        ☐
FORD           ☐
GM, HONDA, ETC ☐

MODEL TYPE — 4025

MDX            ☑ 4030
RDX            ☐
NSX            ☐
TLX            ☐
ILX            ☐

MODEL YEAR — 4035

2019           ☑ — 4040
2020           ☐

MODEL FUEL TYPE — 4045

ELECTRIC
GASOLINE       ☑ — 4050
DIESEL         ☐
SOLAR          ☐

Figure 52:
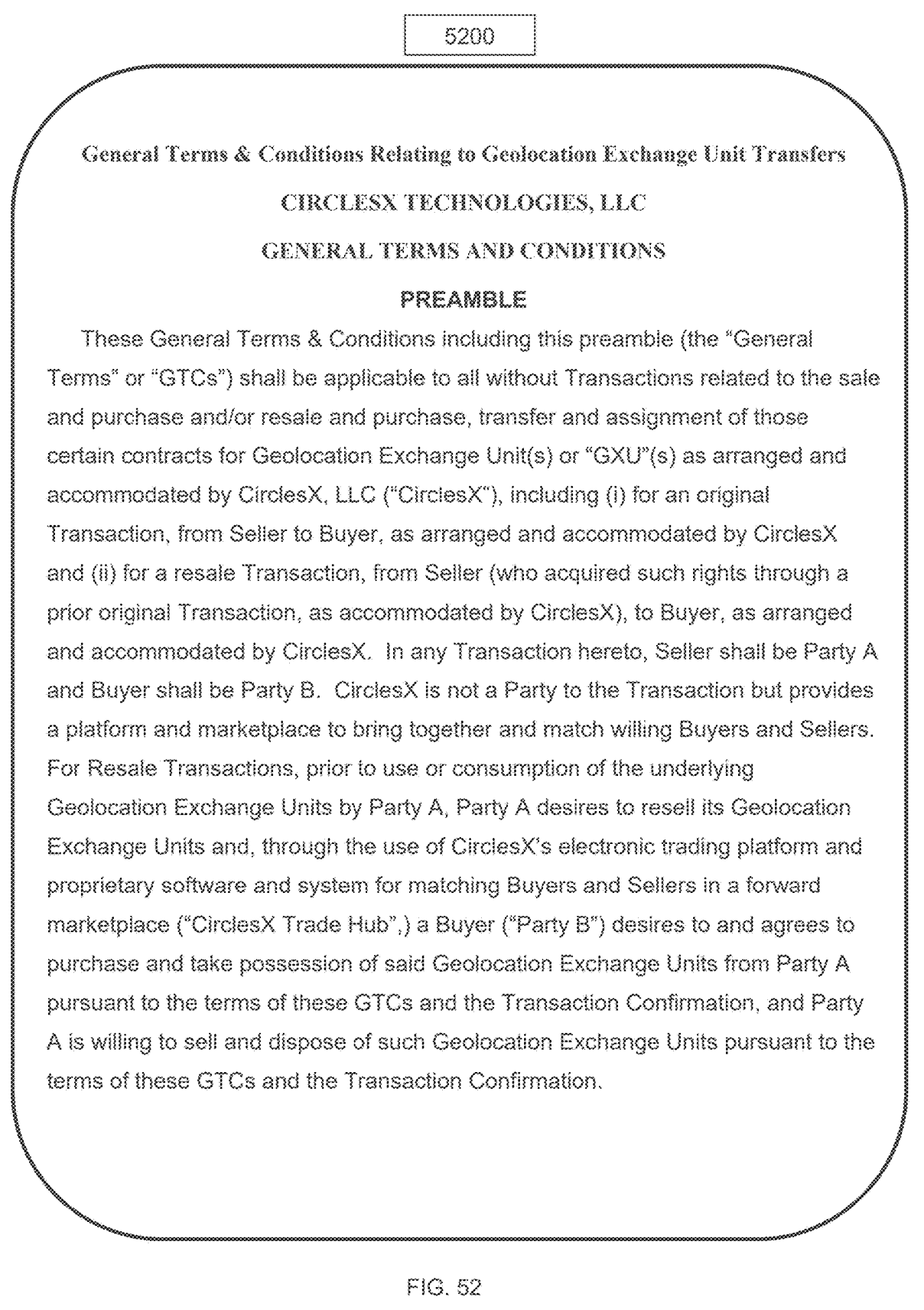

General Terms & Conditions Relating to Geolocation Exchange Unit Transfers

CIRCLESX TECHNOLOGIES, LLC

GENERAL TERMS AND CONDITIONS

PREAMBLE

These General Terms & Conditions including this preamble (the "General Terms" or "GTCs") shall be applicable to all without Transactions related to the sale and purchase and/or resale and purchase, transfer and assignment of those certain contracts for Geolocation Exchange Unit(s) or "GXU"(s) as arranged and accommodated by CirclesX, LLC ("CirclesX"), including (i) for an original Transaction, from Seller to Buyer, as arranged and accommodated by CirclesX and (ii) for a resale Transaction, from Seller (who acquired such rights through a prior original Transaction, as accommodated by CirclesX), to Buyer, as arranged and accommodated by CirclesX. In any Transaction hereto, Seller shall be Party A and Buyer shall be Party B. CirclesX is not a Party to the Transaction but provides a platform and marketplace to bring together and match willing Buyers and Sellers. For Resale Transactions, prior to use or consumption of the underlying Geolocation Exchange Units by Party A, Party A desires to resell its Geolocation Exchange Units and, through the use of CirclesX's electronic trading platform and proprietary software and system for matching Buyers and Sellers in a forward marketplace ("CirclesX Trade Hub",) a Buyer ("Party B") desires to and agrees to purchase and take possession of said Geolocation Exchange Units from Party A pursuant to the terms of these GTCs and the Transaction Confirmation, and Party A is willing to sell and dispose of such Geolocation Exchange Units pursuant to the terms of these GTCs and the Transaction Confirmation.

Figure 53:
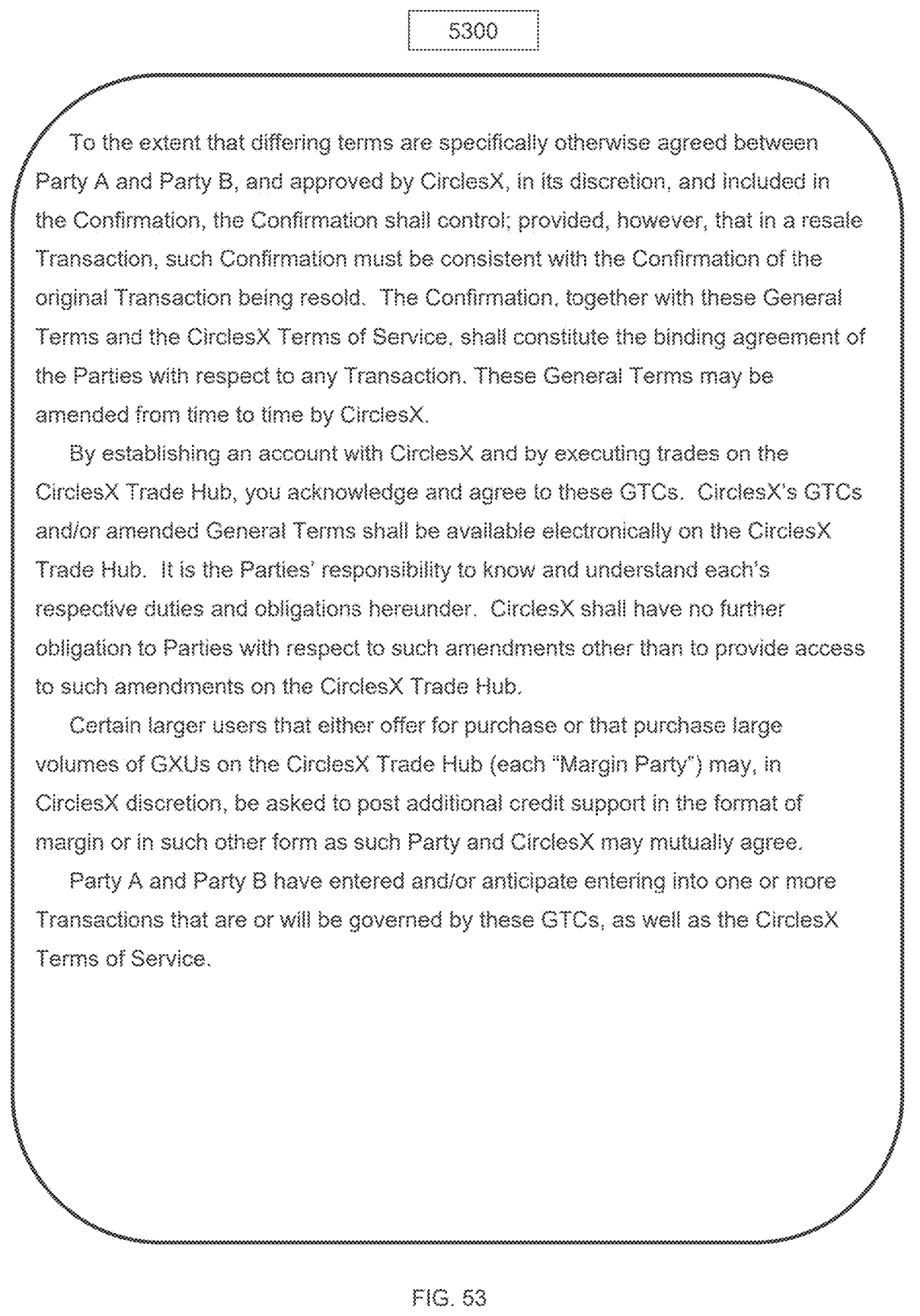

To the extent that differing terms are specifically otherwise agreed between Party A and Party B, and approved by CirclesX, in its discretion, and included in the Confirmation, the Confirmation shall control; provided, however, that in a resale Transaction, such Confirmation must be consistent with the Confirmation of the original Transaction being resold. The Confirmation, together with these General Terms and the CirclesX Terms of Service, shall constitute the binding agreement of the Parties with respect to any Transaction. These General Terms may be amended from time to time by CirclesX.

By establishing an account with CirclesX and by executing trades on the CirclesX Trade Hub, you acknowledge and agree to these GTCs. CirclesX's GTCs and/or amended General Terms shall be available electronically on the CirclesX Trade Hub. It is the Parties' responsibility to know and understand each's respective duties and obligations hereunder. CirclesX shall have no further obligation to Parties with respect to such amendments other than to provide access to such amendments on the CirclesX Trade Hub.

Certain larger users that either offer for purchase or that purchase large volumes of GXUs on the CirclesX Trade Hub (each "Margin Party") may, in CirclesX discretion, be asked to post additional credit support in the format of margin or in such other form as such Party and CirclesX may mutually agree.

Party A and Party B have entered and/or anticipate entering into one or more Transactions that are or will be governed by these GTCs, as well as the CirclesX Terms of Service.

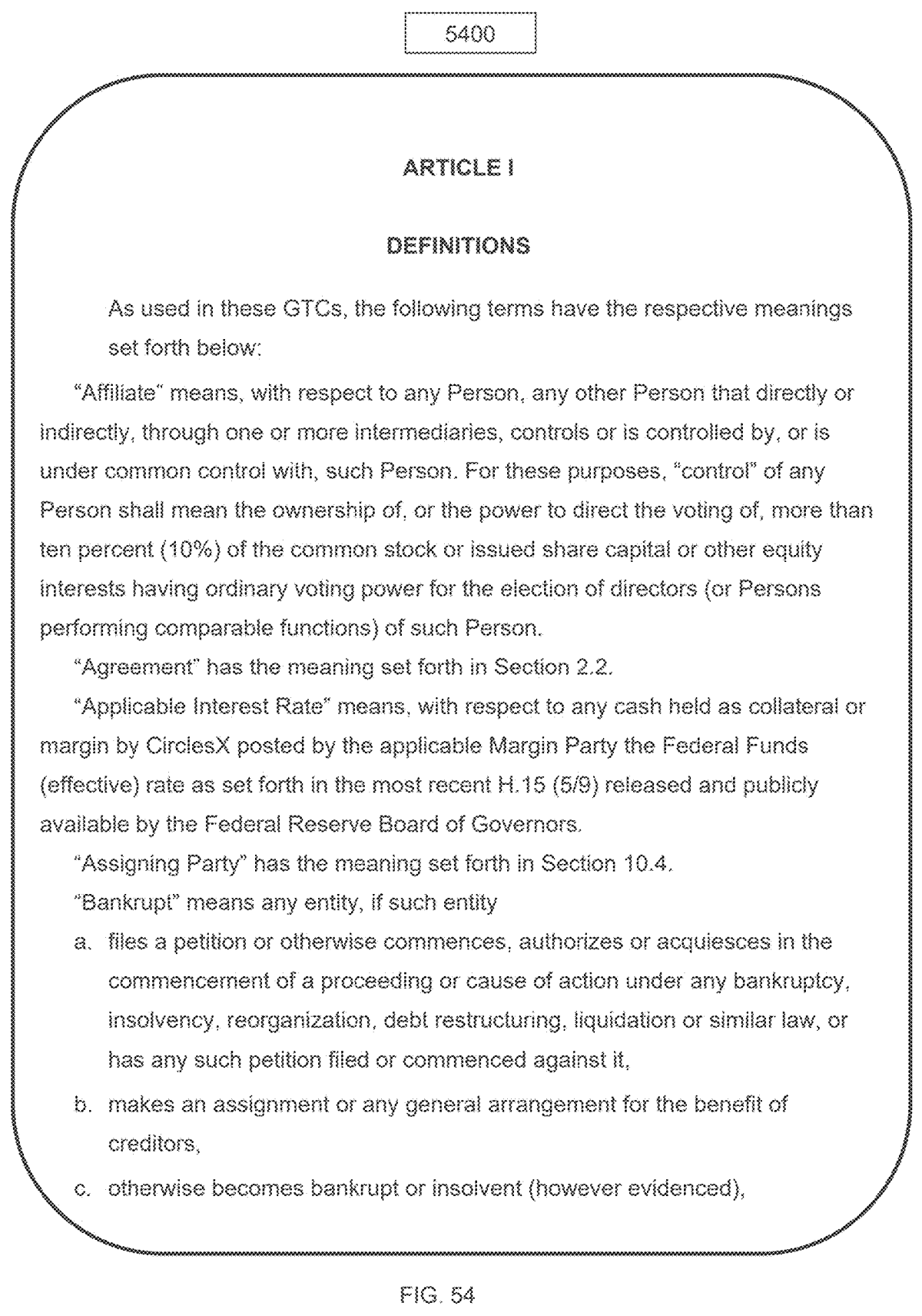

ARTICLE I

DEFINITIONS

As used in these GTCs, the following terms have the respective meanings set forth below:

"Affiliate" means, with respect to any Person, any other Person that directly or indirectly, through one or more intermediaries, controls or is controlled by, or is under common control with, such Person. For these purposes, "control" of any Person shall mean the ownership of, or the power to direct the voting of, more than ten percent (10%) of the common stock or issued share capital or other equity interests having ordinary voting power for the election of directors (or Persons performing comparable functions) of such Person.

"Agreement" has the meaning set forth in Section 2.2.

"Applicable Interest Rate" means, with respect to any cash held as collateral or margin by CirclesX posted by the applicable Margin Party the Federal Funds (effective) rate as set forth in the most recent H.15 (5/9) released and publicly available by the Federal Reserve Board of Governors.

"Assigning Party" has the meaning set forth in Section 10.4.

"Bankrupt" means any entity, if such entity a. files a petition or otherwise commences, authorizes or acquiesces in the commencement of a proceeding or cause of action under any bankruptcy, insolvency, reorganization, debt restructuring, liquidation or similar law, or has any such petition filed or commenced against it, b. makes an assignment or any general arrangement for the benefit of creditors, c. otherwise becomes bankrupt or insolvent (however evidenced),

FIG. 54

5500 c. otherwise becomes bankrupt or insolvent (however evidenced), d. has a liquidator, administrator, receiver, trustee, conservator or similar official appointed with respect to it or any substantial portion of its property or assets, or e. is generally unable to pay its debts as they fall due.

Figure 55:
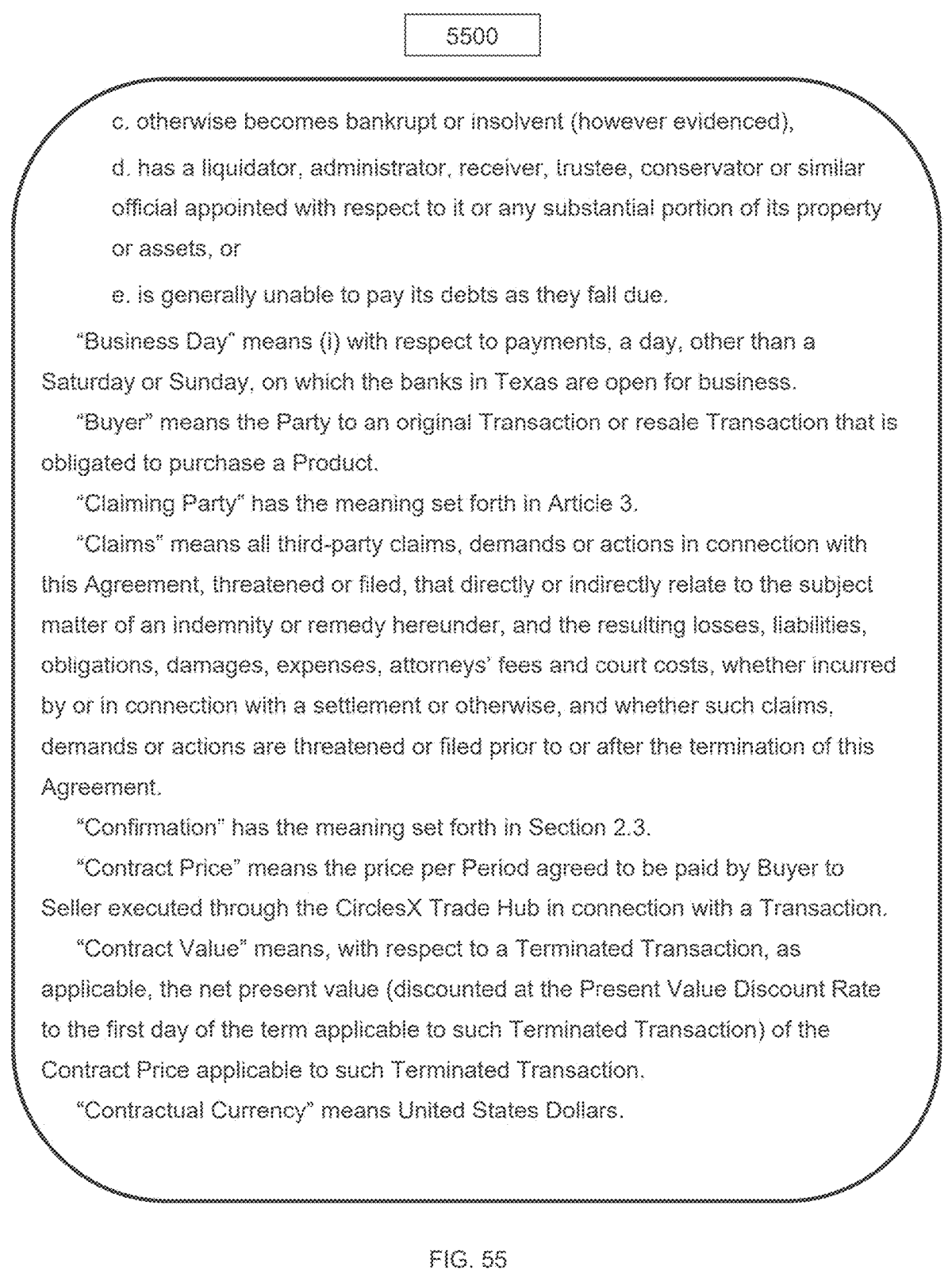

"Business Day" means (i) with respect to payments, a day, other than a Saturday or Sunday, on which the banks in Texas are open for business.

"Buyer" means the Party to an original Transaction or resale Transaction that is obligated to purchase a Product.

"Claiming Party" has the meaning set forth in Article 3.

"Claims" means all third-party claims, demands or actions in connection with this Agreement, threatened or filed, that directly or indirectly relate to the subject matter of an indemnity or remedy hereunder, and the resulting losses, liabilities, obligations, damages, expenses, attorneys' fees and court costs, whether incurred by or in connection with a settlement or otherwise, and whether such claims, demands or actions are threatened or filed prior to or after the termination of this Agreement.

"Confirmation" has the meaning set forth in Section 2.3.

"Contract Price" means the price per Period agreed to be paid by Buyer to Seller executed through the CirclesX Trade Hub in connection with a Transaction.

"Contract Value" means, with respect to a Terminated Transaction, as applicable, the net present value (discounted at the Present Value Discount Rate to the first day of the term applicable to such Terminated Transaction) of the Contract Price applicable to such Terminated Transaction.

"Contractual Currency" means United States Dollars.

Figure 56:
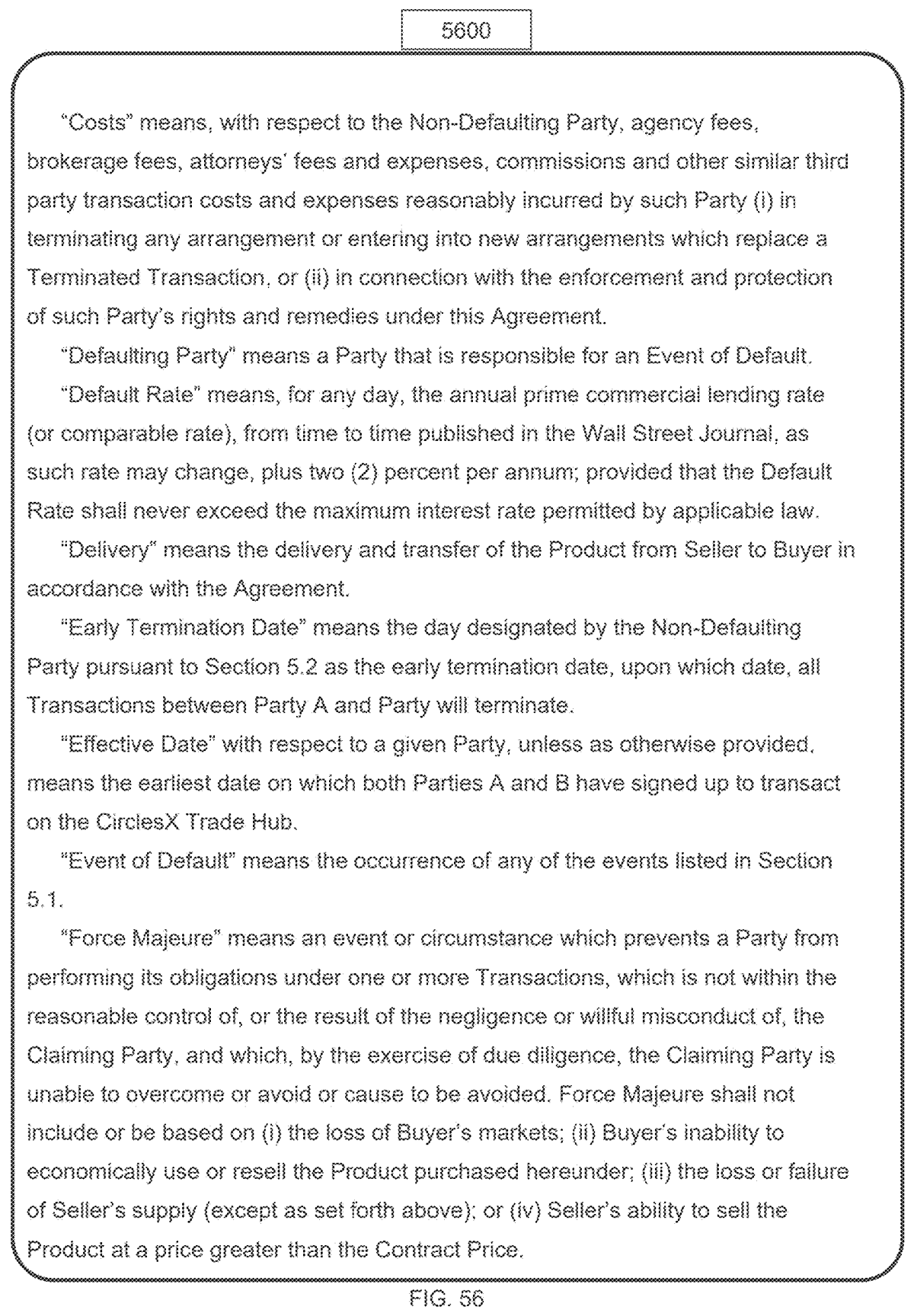

"Costs" means, with respect to the Non-Defaulting Party, agency fees, brokerage fees, attorneys' fees and expenses, commissions and other similar third party transaction costs and expenses reasonably incurred by such Party (i) in terminating any arrangement or entering into new arrangements which replace a Terminated Transaction, or (ii) in connection with the enforcement and protection of such Party's rights and remedies under this Agreement.

"Defaulting Party" means a Party that is responsible for an Event of Default.

"Default Rate" means, for any day, the annual prime commercial lending rate (or comparable rate), from time to time published in the Wall Street Journal, as such rate may change, plus two (2) percent per annum; provided that the Default Rate shall never exceed the maximum interest rate permitted by applicable law.

"Delivery" means the delivery and transfer of the Product from Seller to Buyer in accordance with the Agreement.

"Early Termination Date" means the day designated by the Non-Defaulting Party pursuant to Section 5.2 as the early termination date, upon which date, all Transactions between Party A and Party will terminate.

"Effective Date" with respect to a given Party, unless as otherwise provided, means the earliest date on which both Parties A and B have signed up to transact on the CirclesX Trade Hub.

"Event of Default" means the occurrence of any of the events listed in Section 5.1.

"Force Majeure" means an event or circumstance which prevents a Party from performing its obligations under one or more Transactions, which is not within the reasonable control of, or the result of the negligence or willful misconduct of, the Claiming Party, and which, by the exercise of due diligence, the Claiming Party is unable to overcome or avoid or cause to be avoided. Force Majeure shall not include or be based on (i) the loss of Buyer's markets; (ii) Buyer's inability to economically use or resell the Product purchased hereunder; (iii) the loss or failure of Seller's supply (except as set forth above); or (iv) Seller's ability to sell the Product at a price greater than the Contract Price.

"GTCs" has the meaning set forth in the Preamble.

"Independent Amount" means with respect to a Margin Party, the amount determined by CirclesX as appropriate in its commercially reasonable discretion is warranted under the circumstances, or if no amount is specified, zero.

"Letter(s) of Credit" means one or more irrevocable, transferable standby letters of credit issued by a U.S. commercial bank or a foreign bank with a U.S. branch having a credit rating of at least A- by S&P and A3 by Moody's, in a form acceptable to the Party in whose favor the letter of credit is issued. Costs of a Letter of Credit shall be borne by the applicant for such Letter of Credit.

"Margin Party" shall have the meaning ascribed to it in the introductory paragraphs hereof.

"Non-Defaulting Party" means the Party that is not a Defaulting Party.

"Option" means the right but not the obligation to enter into a Transaction.

"Option Buyer" means the Party specified as the purchaser of an Option.

"Option Seller" means the Party specified as the seller of an Option.

"Party" or "Parties" means Party A and Party B, individually or collectively, as applicable and their respective permitted successors or assigns. For the avoidance of doubt, in providing access to the CirclesX Trade Hub, CirclesX shall not be considered a Party for purposes of these GTCs with respect to a Transaction.

"Party B" has the meaning set forth in the Transaction Confirmation.

"Payment Date" means, with respect to a Transaction, the Trade Date of such Transaction with payment made through the CirclesX Trade Hub and settlement made by CirclesX pursuant to the Terms of Service.

"Performance Assurance" means collateral (other than the Independent Amount, if any) in the form of either cash, Letter(s) of Credit, or other security acceptable to CirclesX with respect to Margin Parties.

Figure 58:
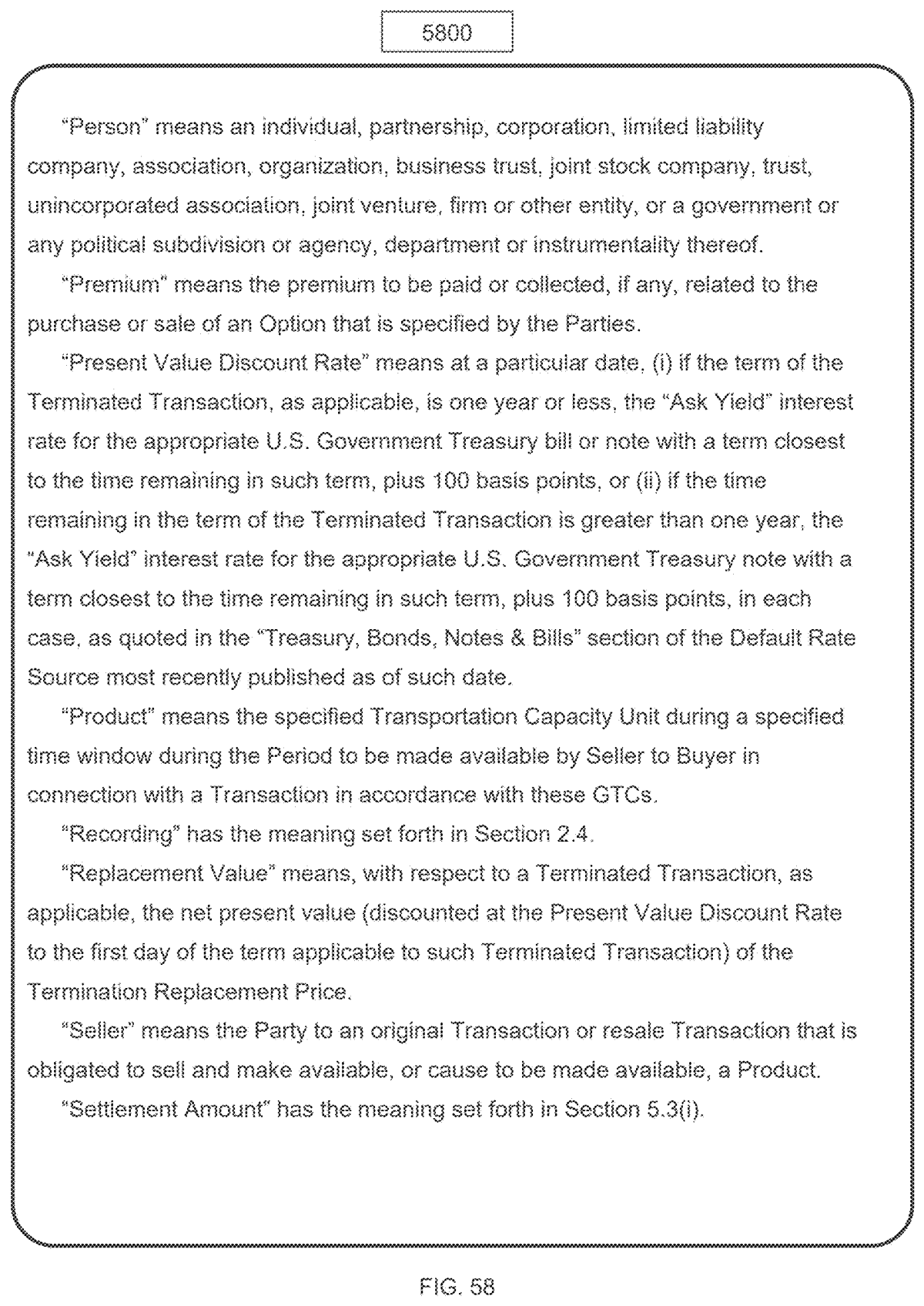

"Person" means an individual, partnership, corporation, limited liability company, association, organization, business trust, joint stock company, trust, unincorporated association, joint venture, firm or other entity, or a government or any political subdivision or agency, department or instrumentality thereof.

"Premium" means the premium to be paid or collected, if any, related to the purchase or sale of an Option that is specified by the Parties.

"Present Value Discount Rate" means at a particular date, (i) if the term of the Terminated Transaction, as applicable, is one year or less, the "Ask Yield" interest rate for the appropriate U.S. Government Treasury bill or note with a term closest to the time remaining in such term, plus 100 basis points, or (ii) if the time remaining in the term of the Terminated Transaction is greater than one year, the "Ask Yield" interest rate for the appropriate U.S. Government Treasury note with a term closest to the time remaining in such term, plus 100 basis points, in each case, as quoted in the "Treasury, Bonds, Notes & Bills" section of the Default Rate Source most recently published as of such date.

"Product" means the specified Transportation Capacity Unit during a specified time window during the Period to be made available by Seller to Buyer in connection with a Transaction in accordance with these GTCs.

"Recording" has the meaning set forth in Section 2.4.

"Replacement Value" means, with respect to a Terminated Transaction, as applicable, the net present value (discounted at the Present Value Discount Rate to the first day of the term applicable to such Terminated Transaction) of the Termination Replacement Price.

"Seller" means the Party to an original Transaction or resale Transaction that is obligated to sell and make available, or cause to be made available, a Product.

"Settlement Amount" has the meaning set forth in Section 5.3(i).

Figure 59:
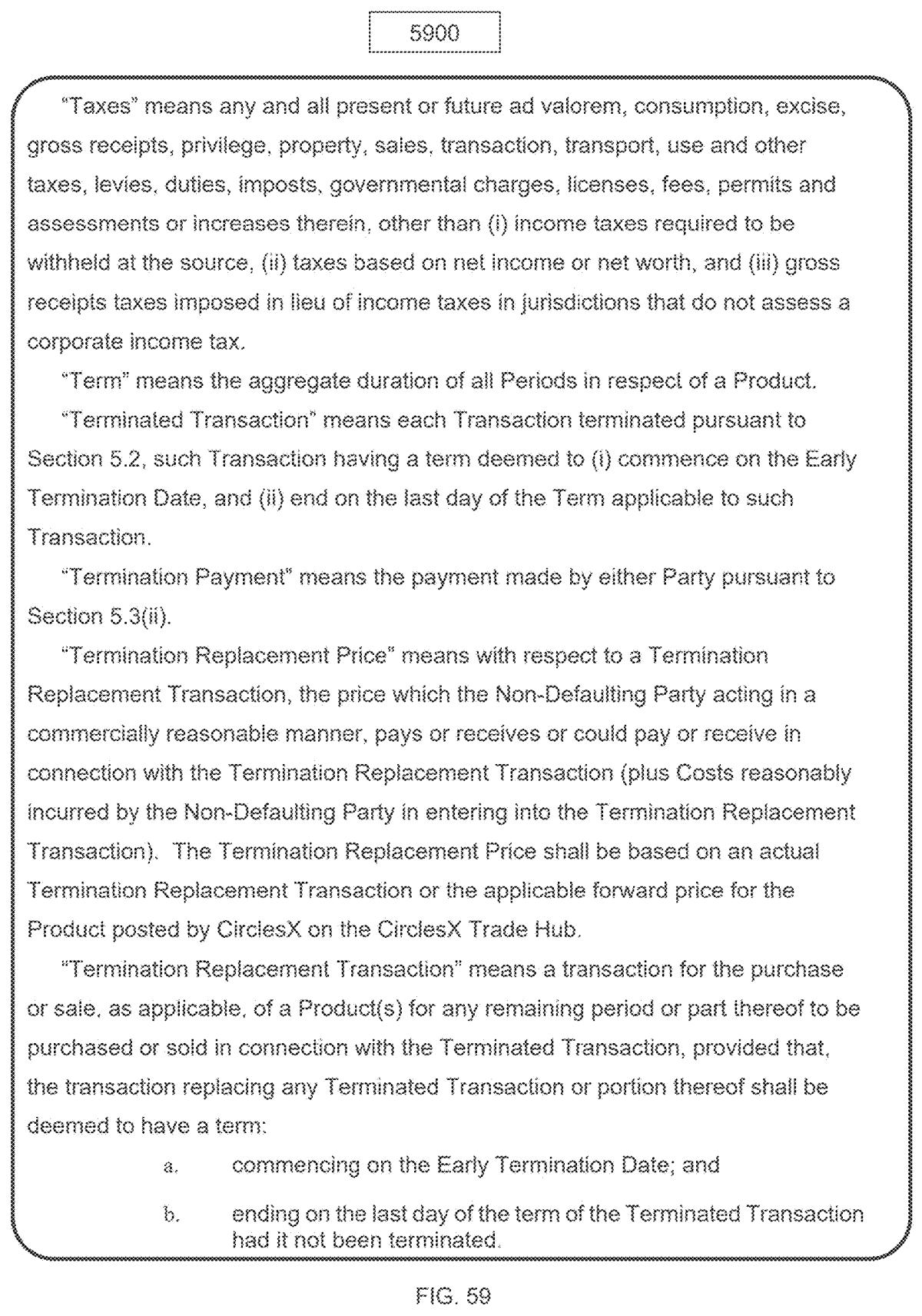

"Taxes" means any and all present or future ad valorem, consumption, excise, gross receipts, privilege, property, sales, transaction, transport, use and other taxes, levies, duties, imposts, governmental charges, licenses, fees, permits and assessments or increases therein, other than (i) income taxes required to be withheld at the source, (ii) taxes based on net income or net worth, and (iii) gross receipts taxes imposed in lieu of income taxes in jurisdictions that do not assess a corporate income tax.

"Term" means the aggregate duration of all Periods in respect of a Product.

"Terminated Transaction" means each Transaction terminated pursuant to Section 5.2, such Transaction having a term deemed to (i) commence on the Early Termination Date, and (ii) end on the last day of the Term applicable to such Transaction.

"Termination Payment" means the payment made by either Party pursuant to Section 5.3(ii).

"Termination Replacement Price" means with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction). The Termination Replacement Price shall be based on an actual Termination Replacement Transaction or the applicable forward price for the Product posted by CirclesX on the CirclesX Trade Hub.

"Termination Replacement Transaction" means a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:

a.     commencing on the Early Termination Date; and b.     ending on the last day of the term of the Terminated Transaction had it not been terminated.

Figure 60:
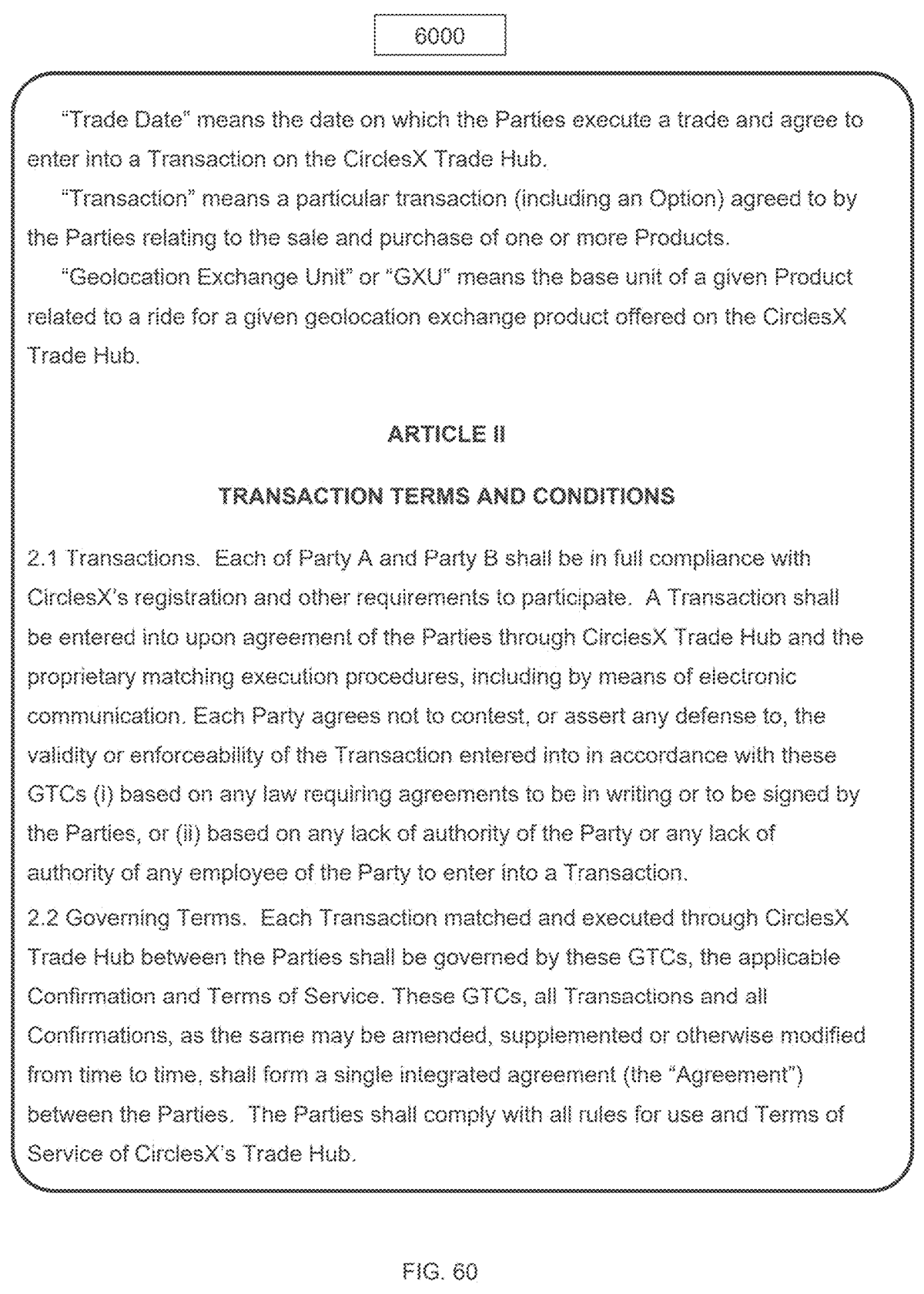

"Trade Date" means the date on which the Parties execute a trade and agree to enter into a Transaction on the CirclesX Trade Hub.

"Transaction" means a particular transaction (including an Option) agreed to by the Parties relating to the sale and purchase of one or more Products.

"Geolocation Exchange Unit" or "GXU" means the base unit of a given Product related to a ride for a given geolocation exchange product offered on the CirclesX Trade Hub.

ARTICLE II

TRANSACTION TERMS AND CONDITIONS 2.1 Transactions.  Each of Party A and Party B shall be in full compliance with CirclesX's registration and other requirements to participate.  A Transaction shall be entered into upon agreement of the Parties through CirclesX Trade Hub and the proprietary matching execution procedures, including by means of electronic communication. Each Party agrees not to contest, or assert any defense to, the validity or enforceability of the Transaction entered into in accordance with these GTCs (i) based on any law requiring agreements to be in writing or to be signed by the Parties, or (ii) based on any lack of authority of the Party or any lack of authority of any employee of the Party to enter into a Transaction.

2.2 Governing Terms.  Each Transaction matched and executed through CirclesX Trade Hub between the Parties shall be governed by these GTCs, the applicable Confirmation and Terms of Service. These GTCs, all Transactions and all Confirmations, as the same may be amended, supplemented or otherwise modified from time to time, shall form a single integrated agreement (the "Agreement") between the Parties.  The Parties shall comply with all rules for use and Terms of Service of CirclesX's Trade Hub.

Figure 61:
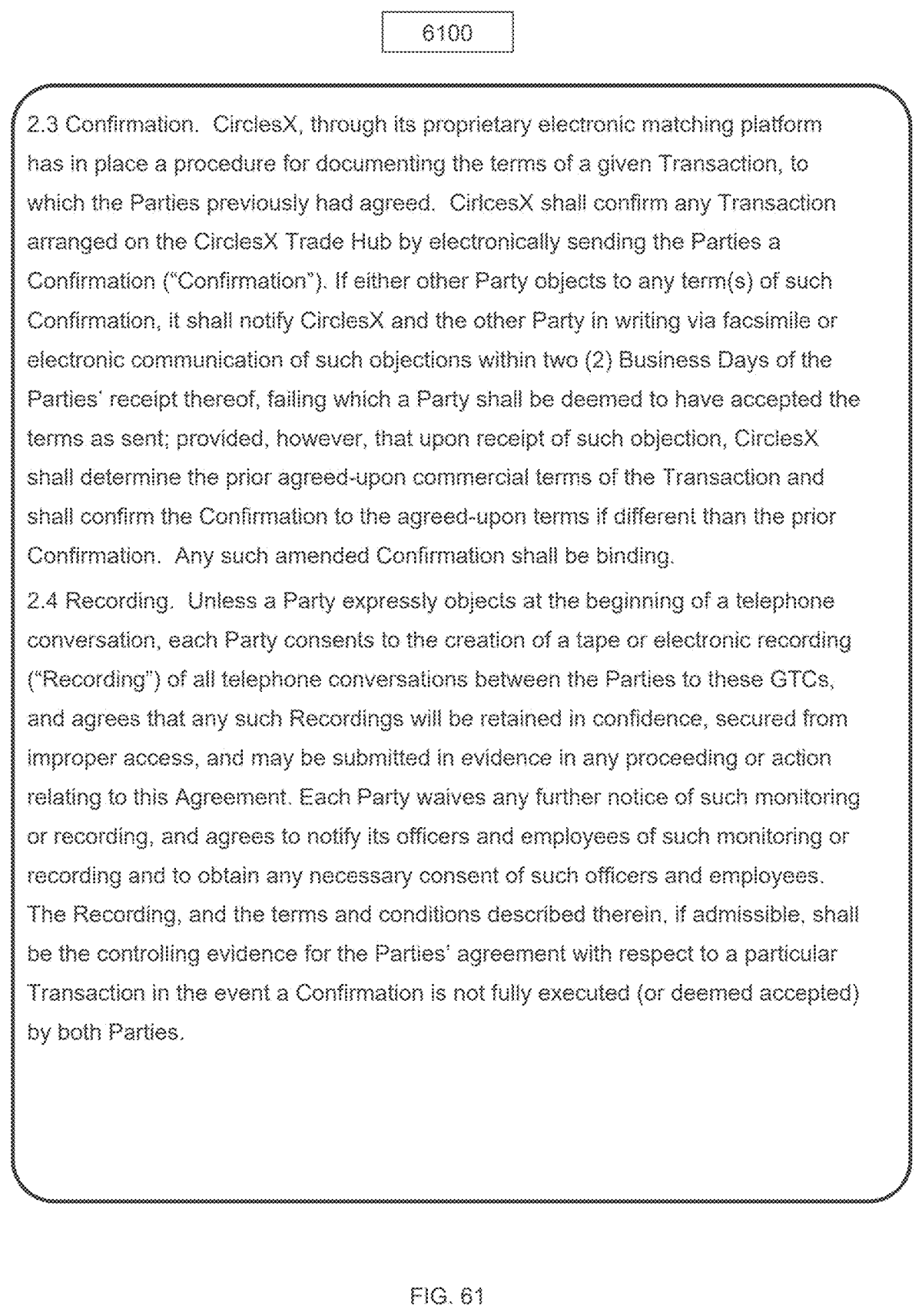

2.3 Confirmation. CirclesX, through its proprietary electronic matching platform has in place a procedure for documenting the terms of a given Transaction, to which the Parties previously had agreed. CirlcesX shall confirm any Transaction arranged on the CirclesX Trade Hub by electronically sending the Parties a Confirmation ("Confirmation"). If either other Party objects to any term(s) of such Confirmation, it shall notify CirclesX and the other Party in writing via facsimile or electronic communication of such objections within two (2) Business Days of the Parties' receipt thereof, failing which a Party shall be deemed to have accepted the terms as sent; provided, however, that upon receipt of such objection, CirclesX shall determine the prior agreed-upon commercial terms of the Transaction and shall confirm the Confirmation to the agreed-upon terms if different than the prior Confirmation. Any such amended Confirmation shall be binding.

2.4 Recording. Unless a Party expressly objects at the beginning of a telephone conversation, each Party consents to the creation of a tape or electronic recording ("Recording") of all telephone conversations between the Parties to these GTCs, and agrees that any such Recordings will be retained in confidence, secured from improper access, and may be submitted in evidence in any proceeding or action relating to this Agreement. Each Party waives any further notice of such monitoring or recording, and agrees to notify its officers and employees of such monitoring or recording and to obtain any necessary consent of such officers and employees. The Recording, and the terms and conditions described therein, if admissible, shall be the controlling evidence for the Parties' agreement with respect to a particular Transaction in the event a Confirmation is not fully executed (or deemed accepted) by both Parties.

Figure 62:
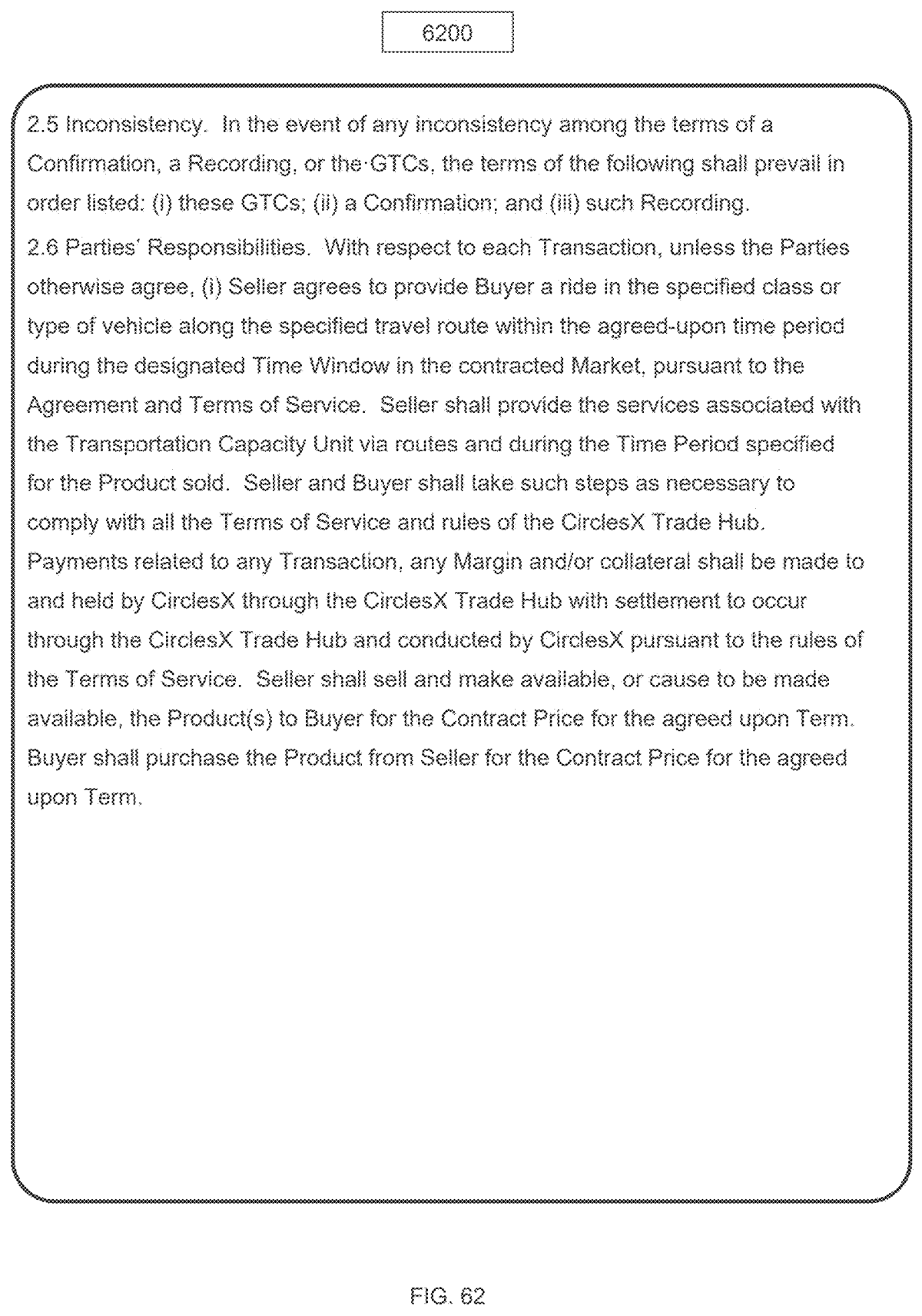

2.5 Inconsistency. In the event of any inconsistency among the terms of a Confirmation, a Recording, or the·GTCs, the terms of the following shall prevail in order listed: (i) these GTCs; (ii) a Confirmation; and (iii) such Recording.

2.6 Parties' Responsibilities. With respect to each Transaction, unless the Parties otherwise agree, (i) Seller agrees to provide Buyer a ride in the specified class or type of vehicle along the specified travel route within the agreed-upon time period during the designated Time Window in the contracted Market, pursuant to the Agreement and Terms of Service. Seller shall provide the services associated with the Transportation Capacity Unit via routes and during the Time Period specified for the Product sold. Seller and Buyer shall take such steps as necessary to comply with all the Terms of Service and rules of the CirclesX Trade Hub. Payments related to any Transaction, any Margin and/or collateral shall be made to and held by CirclesX through the CirclesX Trade Hub with settlement to occur through the CirclesX Trade Hub and conducted by CirclesX pursuant to the rules of the Terms of Service. Seller shall sell and make available, or cause to be made available, the Product(s) to Buyer for the Contract Price for the agreed upon Term. Buyer shall purchase the Product from Seller for the Contract Price for the agreed upon Term.

Figure 63:
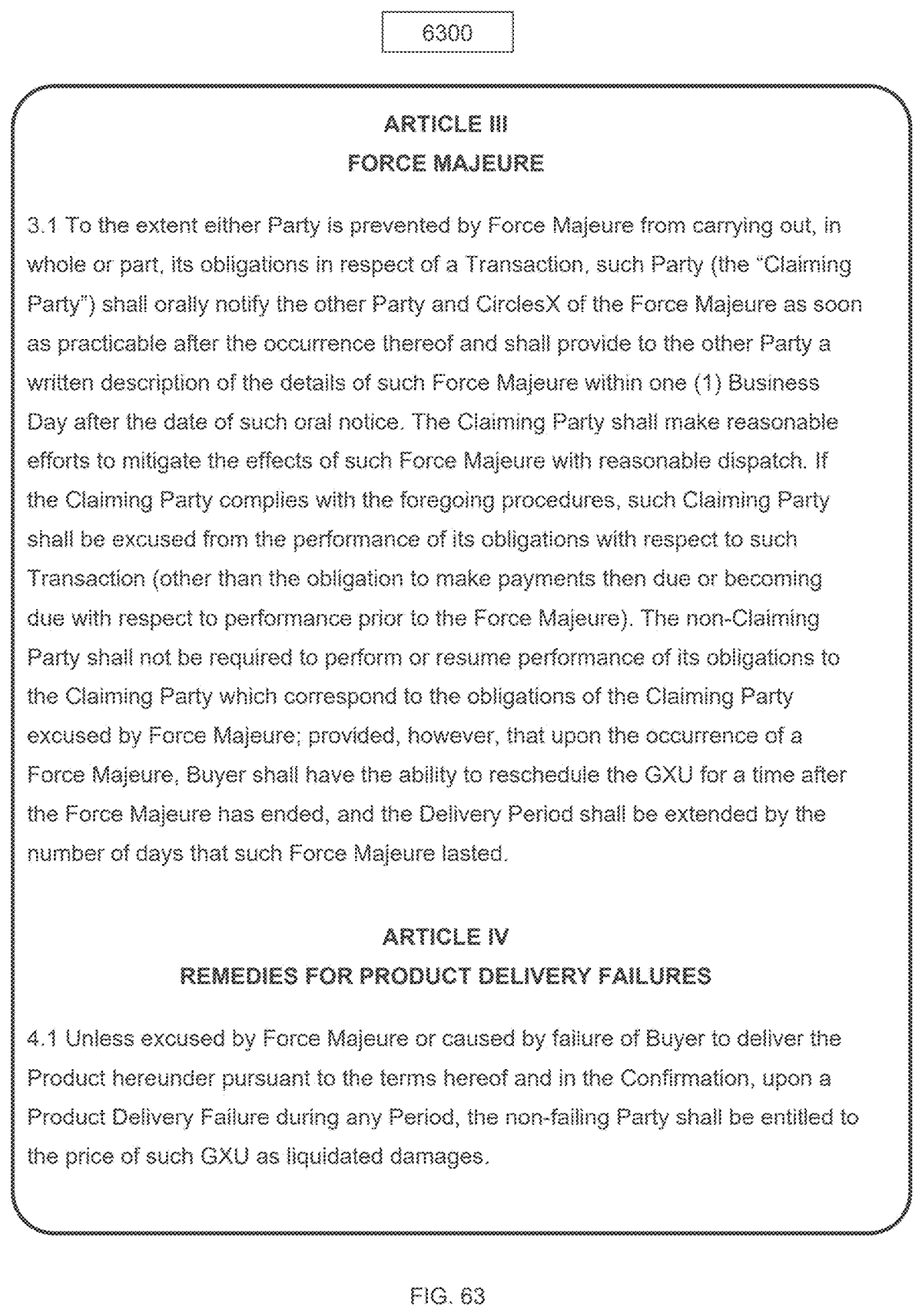

ARTICLE III
FORCE MAJEURE 3.1 To the extent either Party is prevented by Force Majeure from carrying out, in whole or part, its obligations in respect of a Transaction, such Party (the "Claiming Party") shall orally notify the other Party and CirclesX of the Force Majeure as soon as practicable after the occurrence thereof and shall provide to the other Party a written description of the details of such Force Majeure within one (1) Business Day after the date of such oral notice. The Claiming Party shall make reasonable efforts to mitigate the effects of such Force Majeure with reasonable dispatch. If the Claiming Party complies with the foregoing procedures, such Claiming Party shall be excused from the performance of its obligations with respect to such Transaction (other than the obligation to make payments then due or becoming due with respect to performance prior to the Force Majeure). The non-Claiming Party shall not be required to perform or resume performance of its obligations to the Claiming Party which correspond to the obligations of the Claiming Party excused by Force Majeure; provided, however, that upon the occurrence of a Force Majeure, Buyer shall have the ability to reschedule the GXU for a time after the Force Majeure has ended, and the Delivery Period shall be extended by the number of days that such Force Majeure lasted.

ARTICLE IV
REMEDIES FOR PRODUCT DELIVERY FAILURES 4.1 Unless excused by Force Majeure or caused by failure of Buyer to deliver the Product hereunder pursuant to the terms hereof and in the Confirmation, upon a Product Delivery Failure during any Period, the non-failing Party shall be entitled to the price of such GXU as liquidated damages.

Figure 64:
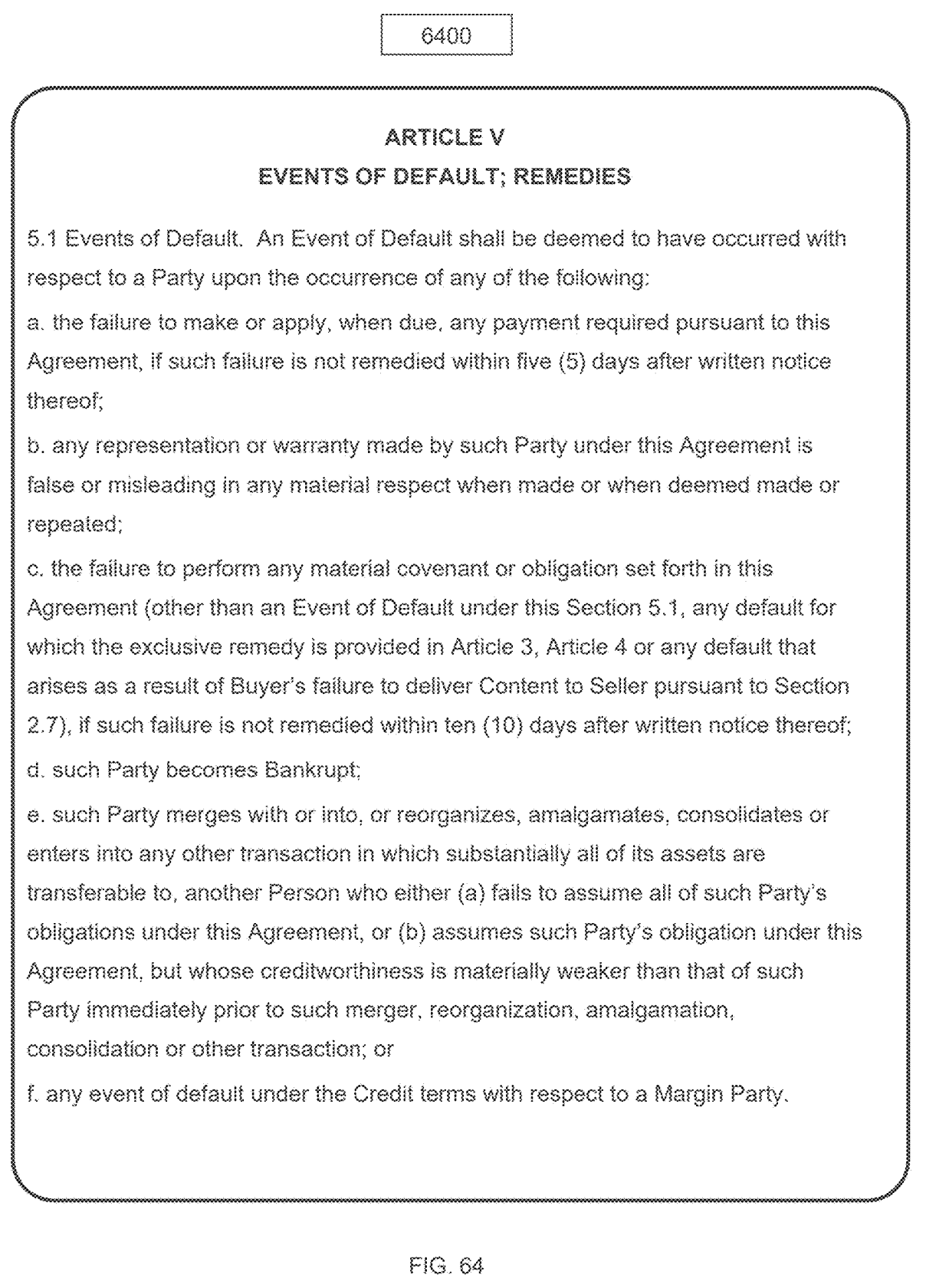

ARTICLE V

EVENTS OF DEFAULT; REMEDIES

5.1 Events of Default. An Event of Default shall be deemed to have occurred with respect to a Party upon the occurrence of any of the following:

a. the failure to make or apply, when due, any payment required pursuant to this Agreement, if such failure is not remedied within five (5) days after written notice thereof;

b. any representation or warranty made by such Party under this Agreement is false or misleading in any material respect when made or when deemed made or repeated;

c. the failure to perform any material covenant or obligation set forth in this Agreement (other than an Event of Default under this Section 5.1, any default for which the exclusive remedy is provided in Article 3, Article 4 or any default that arises as a result of Buyer's failure to deliver Content to Seller pursuant to Section 2.7), if such failure is not remedied within ten (10) days after written notice thereof;

d. such Party becomes Bankrupt;

e. such Party merges with or into, or reorganizes, amalgamates, consolidates or enters into any other transaction in which substantially all of its assets are transferable to, another Person who either (a) fails to assume all of such Party's obligations under this Agreement, or (b) assumes such Party's obligation under this Agreement, but whose creditworthiness is materially weaker than that of such Party immediately prior to such merger, reorganization, amalgamation, consolidation or other transaction; or f. any event of default under the Credit terms with respect to a Margin Party.

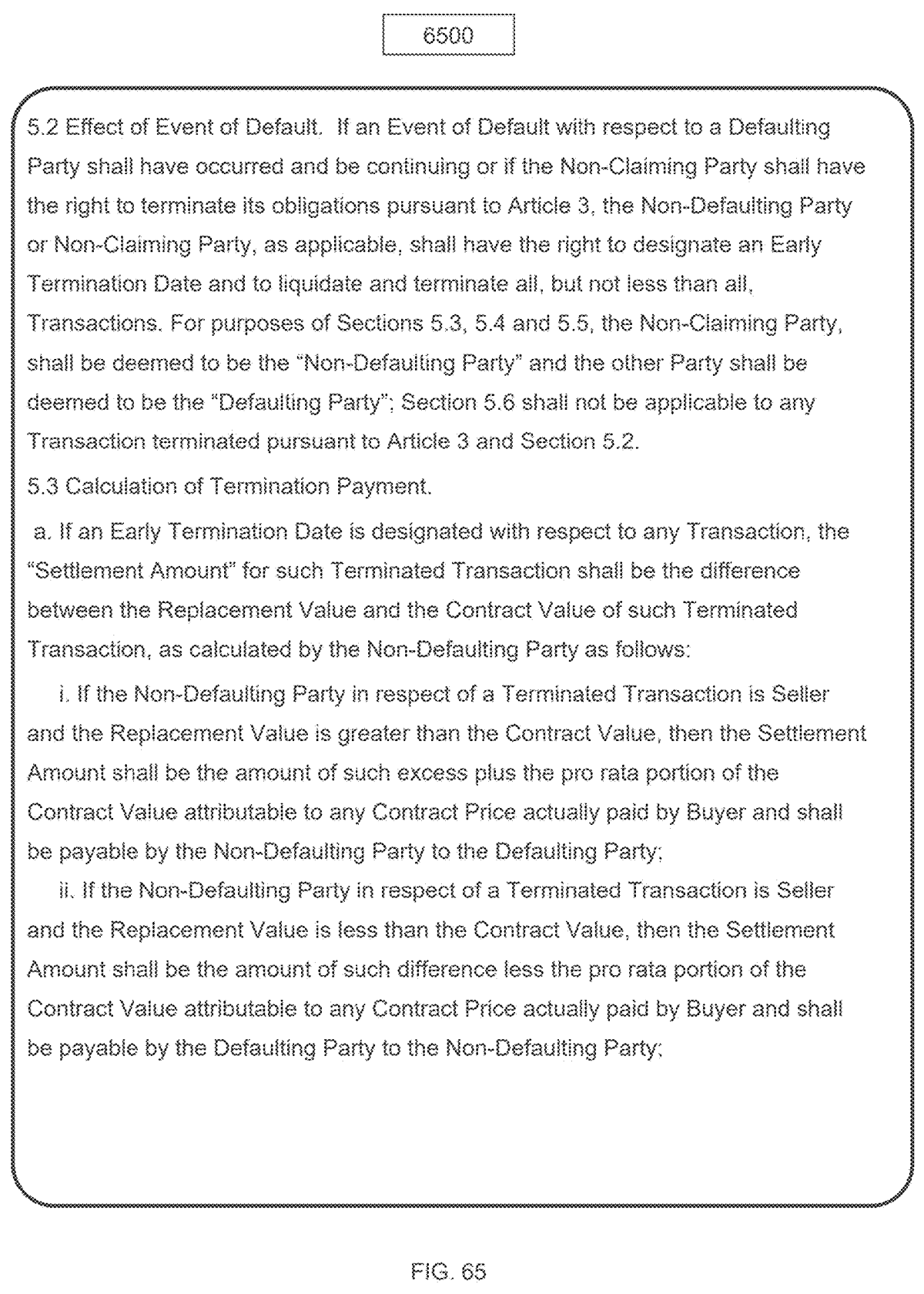

5.2 Effect of Event of Default. If an Event of Default with respect to a Defaulting Party shall have occurred and be continuing or if the Non-Claiming Party shall have the right to terminate its obligations pursuant to Article 3, the Non-Defaulting Party or Non-Claiming Party, as applicable, shall have the right to designate an Early Termination Date and to liquidate and terminate all, but not less than all, Transactions. For purposes of Sections 5.3, 5.4 and 5.5, the Non-Claiming Party, shall be deemed to be the "Non-Defaulting Party" and the other Party shall be deemed to be the "Defaulting Party"; Section 5.6 shall not be applicable to any Transaction terminated pursuant to Article 3 and Section 5.2.

5.3 Calculation of Termination Payment.

a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

FIG. 65

6600 iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

Figure 66:
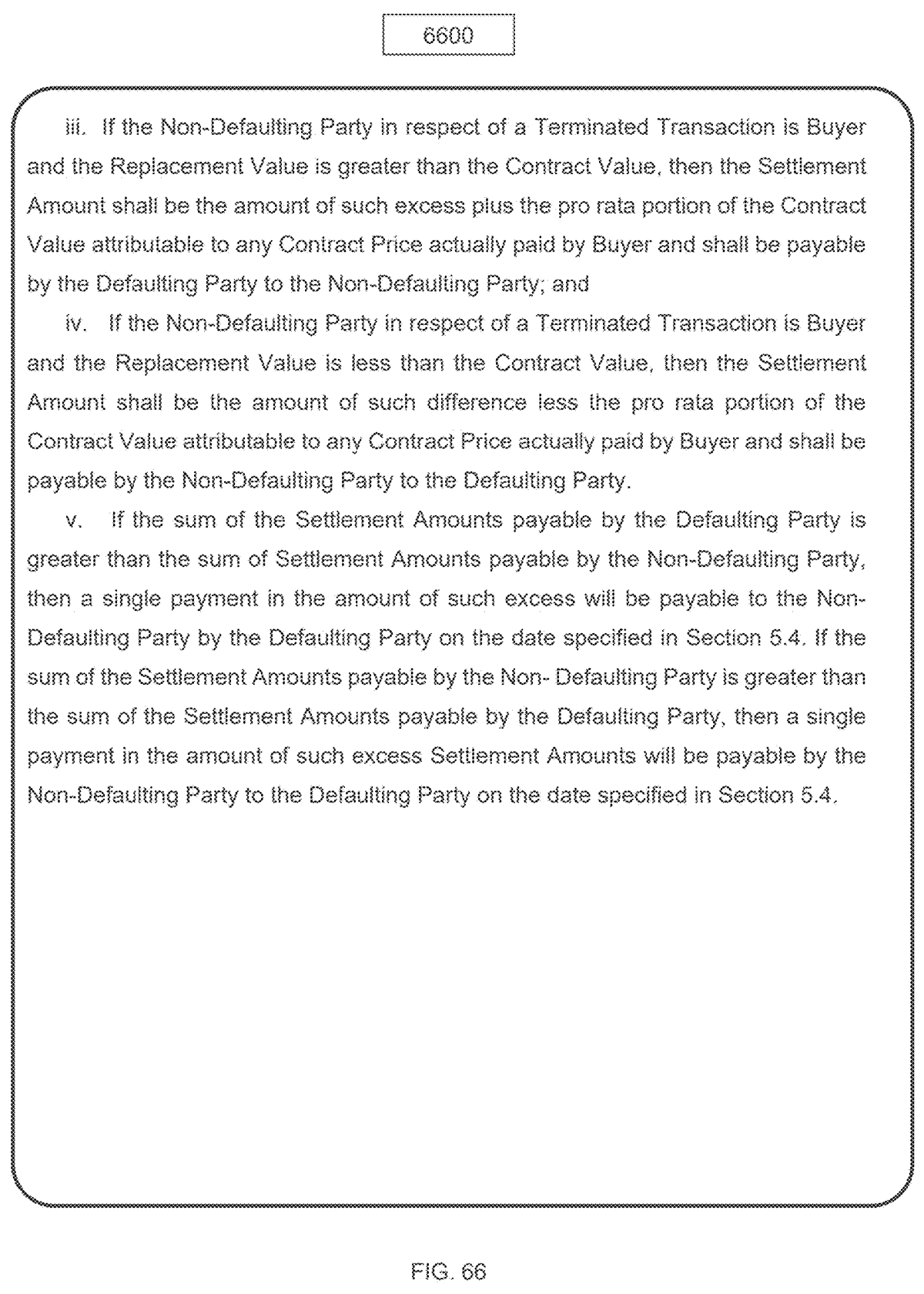

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non- Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section 5.4.

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and CirclesX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and CirclesX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and CirclesX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and CirclesX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

5.6 Closeout Setoff. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the CirclesX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash.

ARTICLE VI

PAYMENT 6.1 Payments and Billings. All monthly payments and invoices shall be governed and will occur according to the CirclesX Terms of Service, unless otherwise specified herein. For the avoidance of doubt, payments for GXU Transactions shall occur online and provided to CirclesX for ultimate payment to the appropriate Party; provided, however, that payments associated with the early termination of a Transaction shall be invoiced and paid directly between the Parties. All payments shall be made in United States Dollars.

Figure 70:
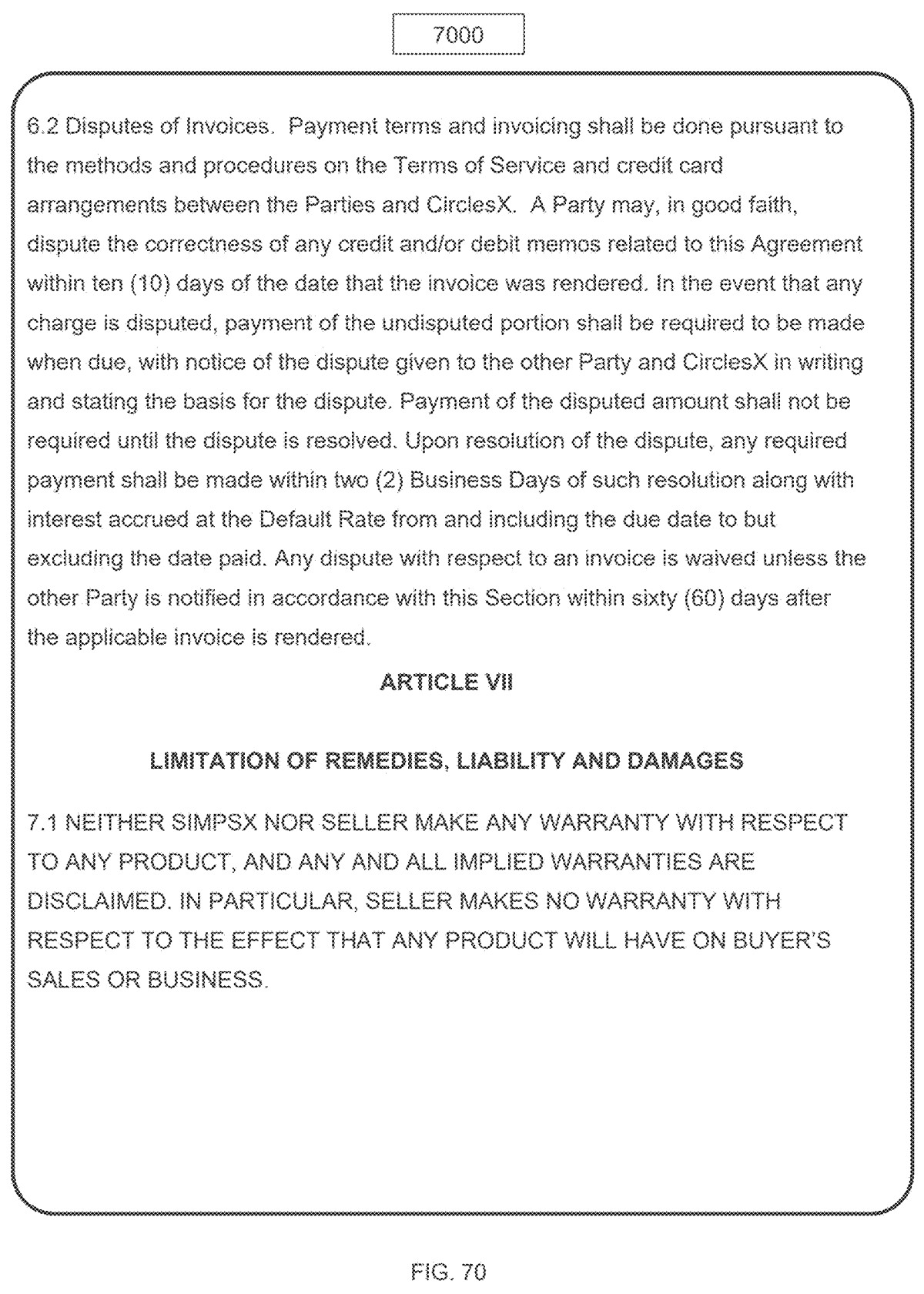

6.2 Disputes of Invoices.  Payment terms and invoicing shall be done pursuant to the methods and procedures on the Terms of Service and credit card arrangements between the Parties and CirclesX.  A Party may, in good faith, dispute the correctness of any credit and/or debit memos related to this Agreement within ten (10) days of the date that the invoice was rendered. In the event that any charge is disputed, payment of the undisputed portion shall be required to be made when due, with notice of the dispute given to the other Party and CirclesX in writing and stating the basis for the dispute. Payment of the disputed amount shall not be required until the dispute is resolved. Upon resolution of the dispute, any required payment shall be made within two (2) Business Days of such resolution along with interest accrued at the Default Rate from and including the due date to but excluding the date paid. Any dispute with respect to an invoice is waived unless the other Party is notified in accordance with this Section within sixty (60) days after the applicable invoice is rendered.

ARTICLE VII

LIMITATION OF REMEDIES, LIABILITY AND DAMAGES 7.1 NEITHER SIMPSX NOR SELLER MAKE ANY WARRANTY WITH RESPECT TO ANY PRODUCT, AND ANY AND ALL IMPLIED WARRANTIES ARE DISCLAIMED. IN PARTICULAR, SELLER MAKES NO WARRANTY WITH RESPECT TO THE EFFECT THAT ANY PRODUCT WILL HAVE ON BUYER'S SALES OR BUSINESS.

Figure 71:
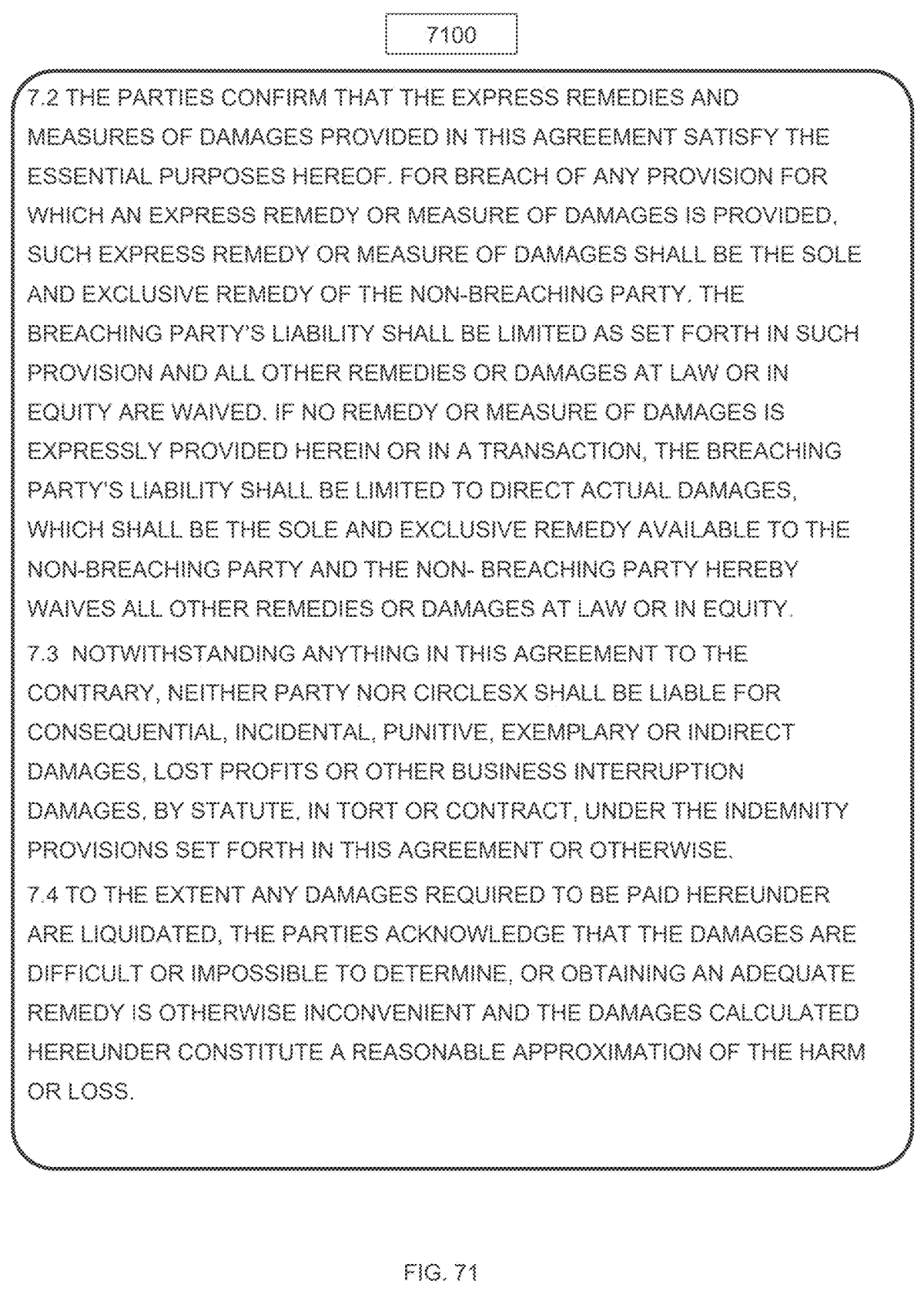

7.2 THE PARTIES CONFIRM THAT THE EXPRESS REMEDIES AND MEASURES OF DAMAGES PROVIDED IN THIS AGREEMENT SATISFY THE ESSENTIAL PURPOSES HEREOF. FOR BREACH OF ANY PROVISION FOR WHICH AN EXPRESS REMEDY OR MEASURE OF DAMAGES IS PROVIDED, SUCH EXPRESS REMEDY OR MEASURE OF DAMAGES SHALL BE THE SOLE AND EXCLUSIVE REMEDY OF THE NON-BREACHING PARTY. THE BREACHING PARTY'S LIABILITY SHALL BE LIMITED AS SET FORTH IN SUCH PROVISION AND ALL OTHER REMEDIES OR DAMAGES AT LAW OR IN EQUITY ARE WAIVED. IF NO REMEDY OR MEASURE OF DAMAGES IS EXPRESSLY PROVIDED HEREIN OR IN A TRANSACTION, THE BREACHING PARTY'S LIABILITY SHALL BE LIMITED TO DIRECT ACTUAL DAMAGES, WHICH SHALL BE THE SOLE AND EXCLUSIVE REMEDY AVAILABLE TO THE NON-BREACHING PARTY AND THE NON- BREACHING PARTY HEREBY WAIVES ALL OTHER REMEDIES OR DAMAGES AT LAW OR IN EQUITY.

7.3  NOTWITHSTANDING ANYTHING IN THIS AGREEMENT TO THE CONTRARY, NEITHER PARTY NOR CIRCLESX SHALL BE LIABLE FOR CONSEQUENTIAL, INCIDENTAL, PUNITIVE, EXEMPLARY OR INDIRECT DAMAGES, LOST PROFITS OR OTHER BUSINESS INTERRUPTION DAMAGES, BY STATUTE, IN TORT OR CONTRACT, UNDER THE INDEMNITY PROVISIONS SET FORTH IN THIS AGREEMENT OR OTHERWISE.

7.4 TO THE EXTENT ANY DAMAGES REQUIRED TO BE PAID HEREUNDER ARE LIQUIDATED, THE PARTIES ACKNOWLEDGE THAT THE DAMAGES ARE DIFFICULT OR IMPOSSIBLE TO DETERMINE, OR OBTAINING AN ADEQUATE REMEDY IS OTHERWISE INCONVENIENT AND THE DAMAGES CALCULATED HEREUNDER CONSTITUTE A REASONABLE APPROXIMATION OF THE HARM OR LOSS.

Figure 72:
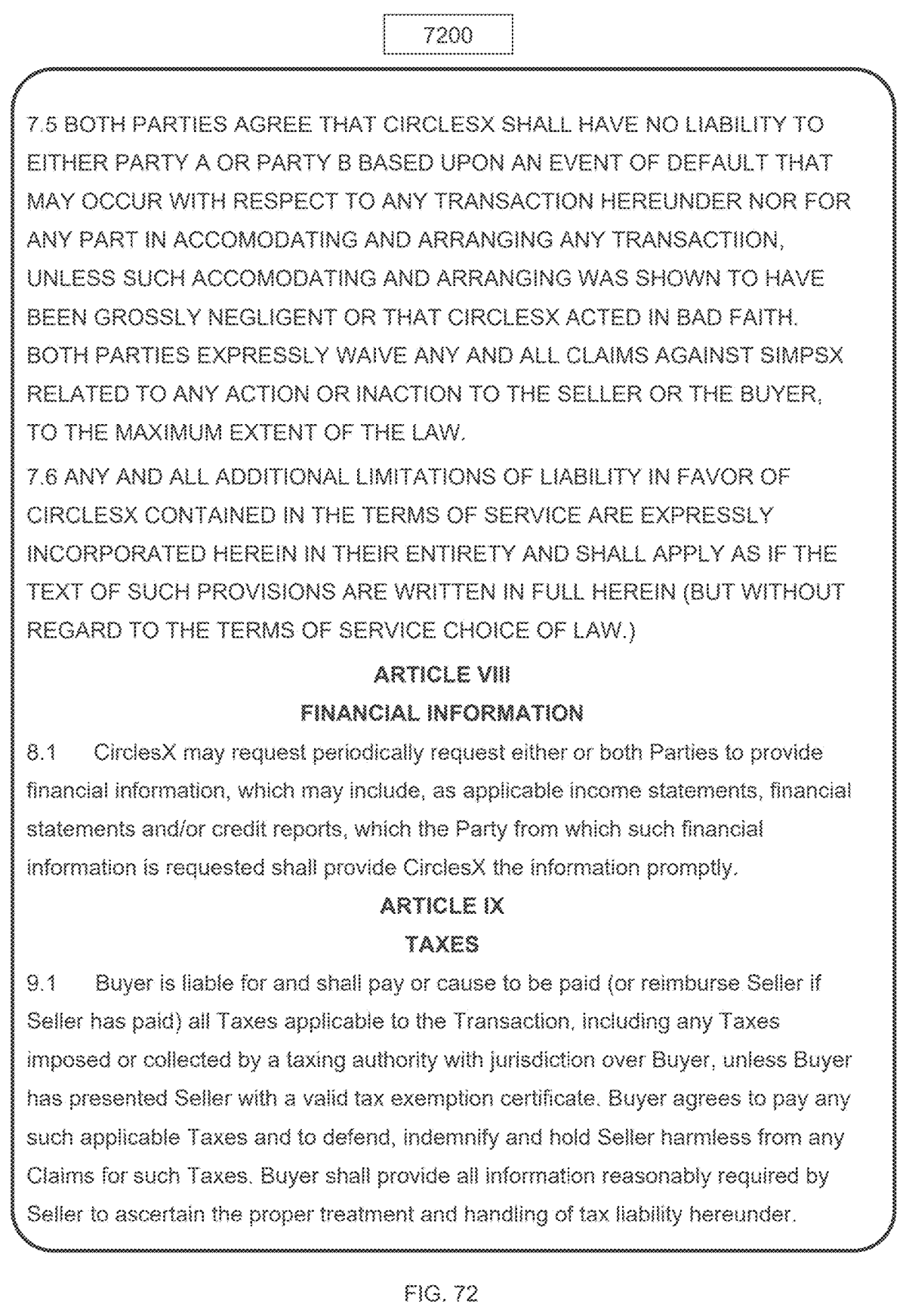

7.5 BOTH PARTIES AGREE THAT CIRCLESX SHALL HAVE NO LIABILITY TO EITHER PARTY A OR PARTY B BASED UPON AN EVENT OF DEFAULT THAT MAY OCCUR WITH RESPECT TO ANY TRANSACTION HEREUNDER NOR FOR ANY PART IN ACCOMODATING AND ARRANGING ANY TRANSACTIION, UNLESS SUCH ACCOMODATING AND ARRANGING WAS SHOWN TO HAVE BEEN GROSSLY NEGLIGENT OR THAT CIRCLESX ACTED IN BAD FAITH. BOTH PARTIES EXPRESSLY WAIVE ANY AND ALL CLAIMS AGAINST SIMPSX RELATED TO ANY ACTION OR INACTION TO THE SELLER OR THE BUYER, TO THE MAXIMUM EXTENT OF THE LAW.

7.6 ANY AND ALL ADDITIONAL LIMITATIONS OF LIABILITY IN FAVOR OF CIRCLESX CONTAINED IN THE TERMS OF SERVICE ARE EXPRESSLY INCORPORATED HEREIN IN THEIR ENTIRETY AND SHALL APPLY AS IF THE TEXT OF SUCH PROVISIONS ARE WRITTEN IN FULL HEREIN (BUT WITHOUT REGARD TO THE TERMS OF SERVICE CHOICE OF LAW.)

ARTICLE VIII

FINANCIAL INFORMATION 8.1     CirclesX may request periodically request either or both Parties to provide financial information, which may include, as applicable income statements, financial statements and/or credit reports, which the Party from which such financial information is requested shall provide CirclesX the information promptly.

ARTICLE IX

TAXES 9.1     Buyer is liable for and shall pay or cause to be paid (or reimburse Seller if Seller has paid) all Taxes applicable to the Transaction, including any Taxes imposed or collected by a taxing authority with jurisdiction over Buyer, unless Buyer has presented Seller with a valid tax exemption certificate. Buyer agrees to pay any such applicable Taxes and to defend, indemnify and hold Seller harmless from any Claims for such Taxes. Buyer shall provide all information reasonably required by Seller to ascertain the proper treatment and handling of tax liability hereunder.

ARTICLE X

CREDIT SUPPORT 10.1  Credit Protection.  If at any time and from time to time during the term of this Agreement (and whether or  not an Event of Default has occurred), CirclesX determines in its discretion that the financial condition of a Margin Client has materially changed so as to increase the likelihood of an Event of Default or of its ability to meet its payment obligations hereunder to the other Party or CirclesX, then CirclesX, on any Business Day, may request that such Party provide Performance Assurance in an amount of up to the amount CirclesX estimates would be due from such Party upon the occurrence of an Event of Default  and early termination of all such Party's Transactions hereunder less any Performance Assurance already held by CirclesX from such Party. Such Performance Assurance shall be delivered to CirclesX within two (2) Business Days after the date of such request.

10.2  Grant of Security Interest/Remedies.  To secure its obligations under these GTCs and, to the extent either or both Parties deliver Performance Assurance hereunder, each Party (a "Pledger") hereby grants to CirclesX (as Secured Party and/or as collateral agent for such other Party) and the other Party (collectively, the "Secured Party") a present and continuing security interest in, and lien on (and right of setoff against), and assignment of, all such Performance Assurance and any and all proceeds resulting therefrom or the liquidation thereof, whether now or hereafter held by, on behalf of, or for the benefit of, such Secured Party, and each Party agrees to take such action as the other Party reasonably requires in order to perfect the Secured Party's first- priority security interest in, and lien on (and right of setoff against), such Performance Assurance and any and all proceeds resulting therefrom or from the liquidation thereof.  Any Secured Party (other than CirclesX) appoints to the extent necessary CirclesX as its collateral agent.

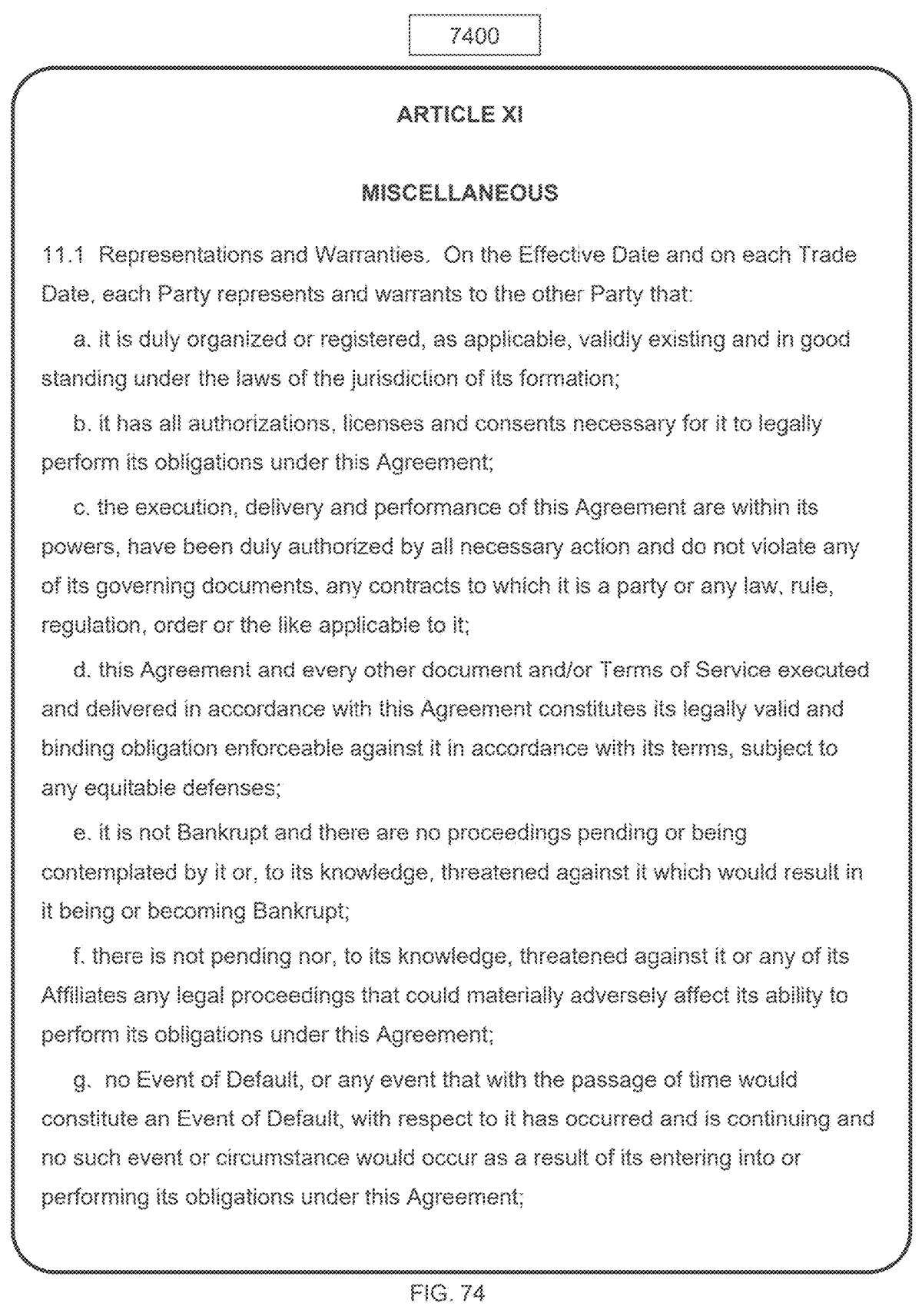

ARTICLE XI

MISCELLANEOUS 11.1  Representations and Warranties.  On the Effective Date and on each Trade Date, each Party represents and warrants to the other Party that:

a. it is duly organized or registered, as applicable, validly existing and in good standing under the laws of the jurisdiction of its formation;

b. it has all authorizations, licenses and consents necessary for it to legally perform its obligations under this Agreement;

c. the execution, delivery and performance of this Agreement are within its powers, have been duly authorized by all necessary action and do not violate any of its governing documents, any contracts to which it is a party or any law, rule, regulation, order or the like applicable to it;

d. this Agreement and every other document and/or Terms of Service executed and delivered in accordance with this Agreement constitutes its legally valid and binding obligation enforceable against it in accordance with its terms, subject to any equitable defenses;

e. it is not Bankrupt and there are no proceedings pending or being contemplated by it or, to its knowledge, threatened against it which would result in it being or becoming Bankrupt;

f. there is not pending nor, to its knowledge, threatened against it or any of its Affiliates any legal proceedings that could materially adversely affect its ability to perform its obligations under this Agreement;

g.  no Event of Default, or any event that with the passage of time would constitute an Event of Default, with respect to it has occurred and is continuing and no such event or circumstance would occur as a result of its entering into or performing its obligations under this Agreement;

FIG. 74

7500 h. it is acting for its own account, has made its own independent decision to enter into this Agreement and as to whether this Agreement is appropriate or proper for it based upon its own judgment, is not relying upon the advice or recommendations of the other Party in so doing, and is capable of assessing the merits of and understanding, and understands and accepts, the terms, conditions and risks of this Agreement;

Figure 75:
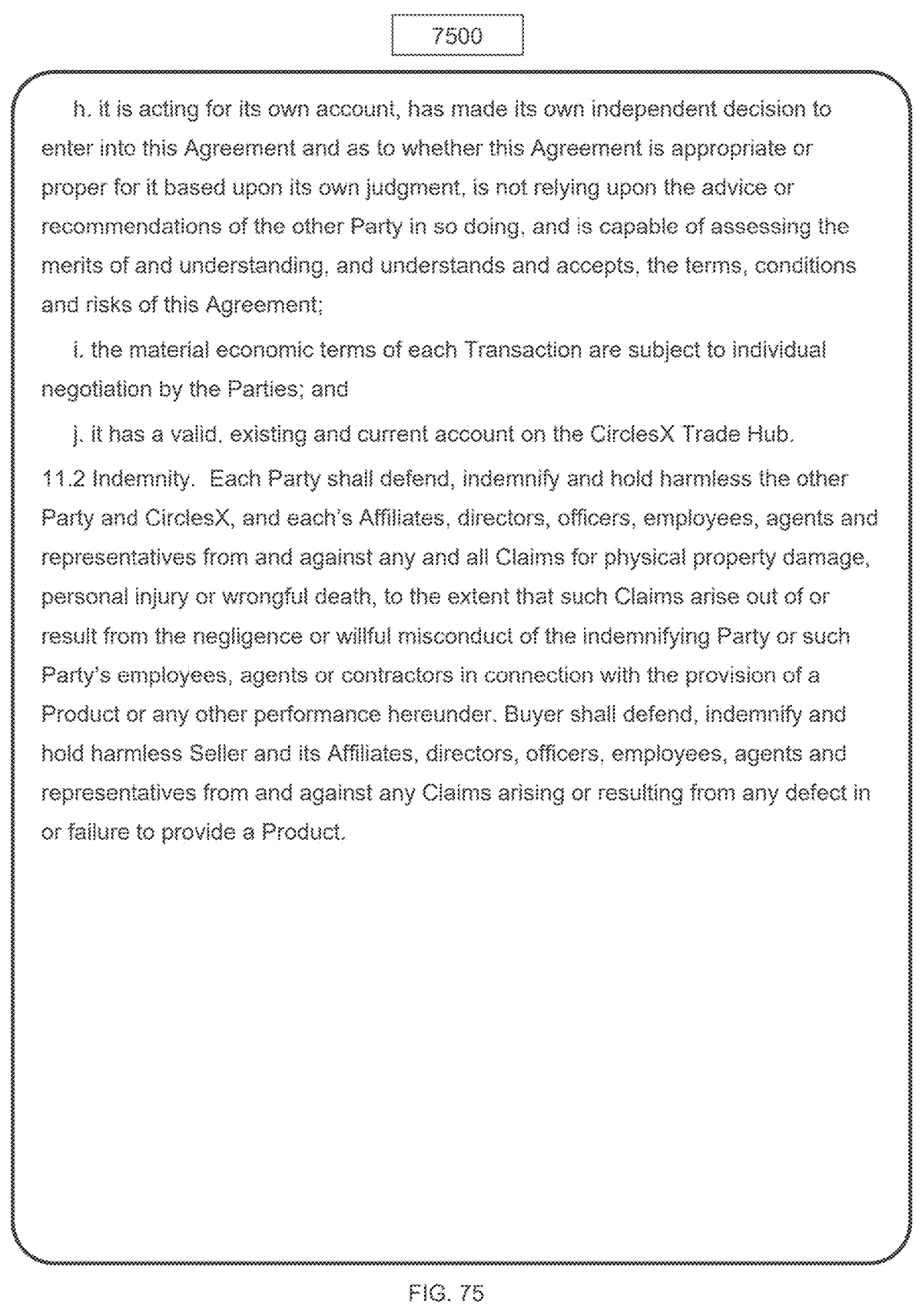

i. the material economic terms of each Transaction are subject to individual negotiation by the Parties; and j. it has a valid, existing and current account on the CirclesX Trade Hub.

11.2 Indemnity. Each Party shall defend, indemnify and hold harmless the other Party and CirclesX, and each's Affiliates, directors, officers, employees, agents and representatives from and against any and all Claims for physical property damage, personal injury or wrongful death, to the extent that such Claims arise out of or result from the negligence or willful misconduct of the indemnifying Party or such Party's employees, agents or contractors in connection with the provision of a Product or any other performance hereunder. Buyer shall defend, indemnify and hold harmless Seller and its Affiliates, directors, officers, employees, agents and representatives from and against any Claims arising or resulting from any defect in or failure to provide a Product.

Figure 76:
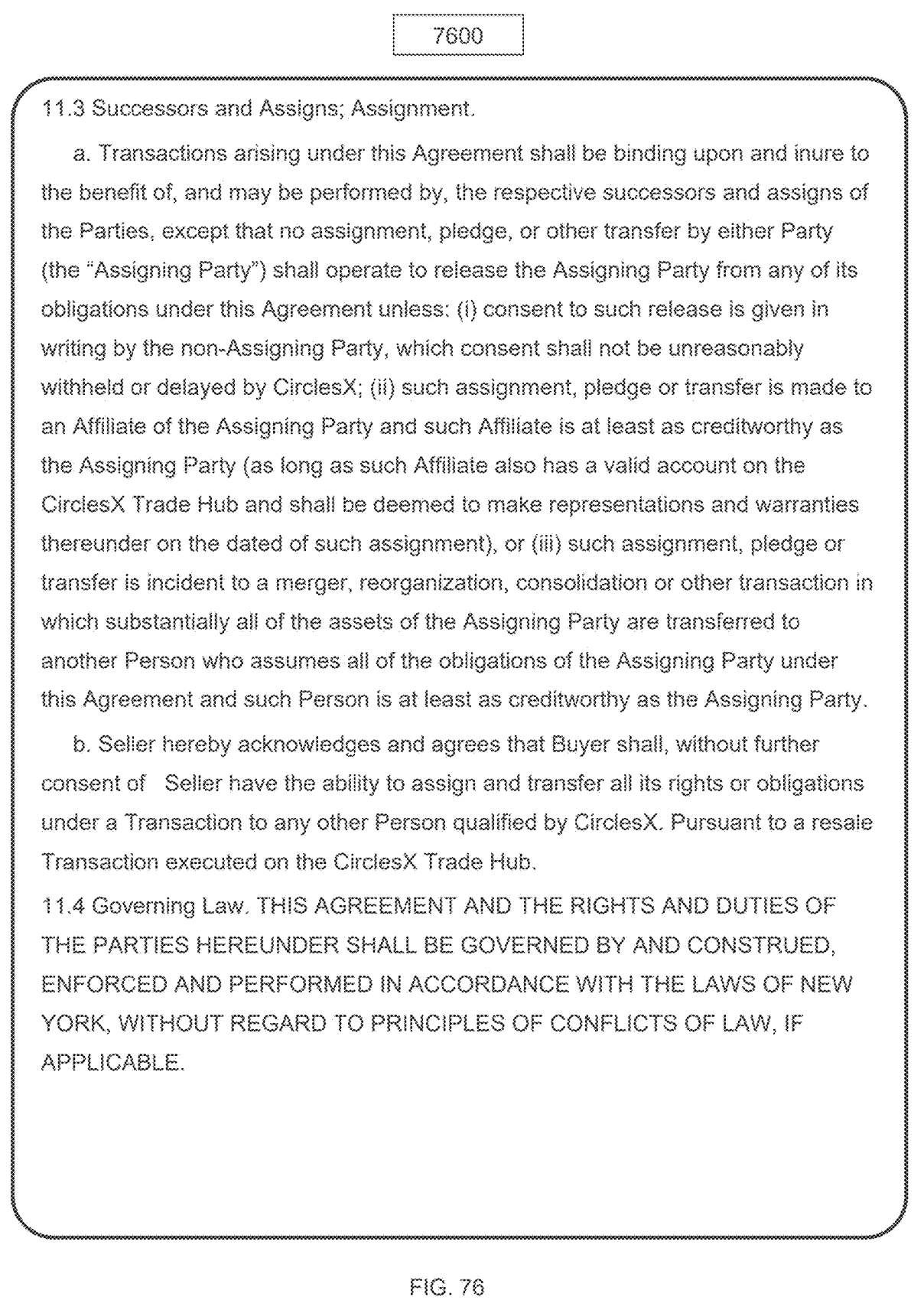

11.3 Successors and Assigns; Assignment.

a. Transactions arising under this Agreement shall be binding upon and inure to the benefit of, and may be performed by, the respective successors and assigns of the Parties, except that no assignment, pledge, or other transfer by either Party (the "Assigning Party") shall operate to release the Assigning Party from any of its obligations under this Agreement unless: (i) consent to such release is given in writing by the non-Assigning Party, which consent shall not be unreasonably withheld or delayed by CirclesX; (ii) such assignment, pledge or transfer is made to an Affiliate of the Assigning Party and such Affiliate is at least as creditworthy as the Assigning Party (as long as such Affiliate also has a valid account on the CirclesX Trade Hub and shall be deemed to make representations and warranties thereunder on the dated of such assignment), or (iii) such assignment, pledge or transfer is incident to a merger, reorganization, consolidation or other transaction in which substantially all of the assets of the Assigning Party are transferred to another Person who assumes all of the obligations of the Assigning Party under this Agreement and such Person is at least as creditworthy as the Assigning Party.

b. Seller hereby acknowledges and agrees that Buyer shall, without further consent of   Seller have the ability to assign and transfer all its rights or obligations under a Transaction to any other Person qualified by CirclesX. Pursuant to a resale Transaction executed on the CirclesX Trade Hub.

11.4 Governing Law. THIS AGREEMENT AND THE RIGHTS AND DUTIES OF THE PARTIES HEREUNDER SHALL BE GOVERNED BY AND CONSTRUED, ENFORCED AND PERFORMED IN ACCORDANCE WITH THE LAWS OF NEW YORK, WITHOUT REGARD TO PRINCIPLES OF CONFLICTS OF LAW, IF APPLICABLE.

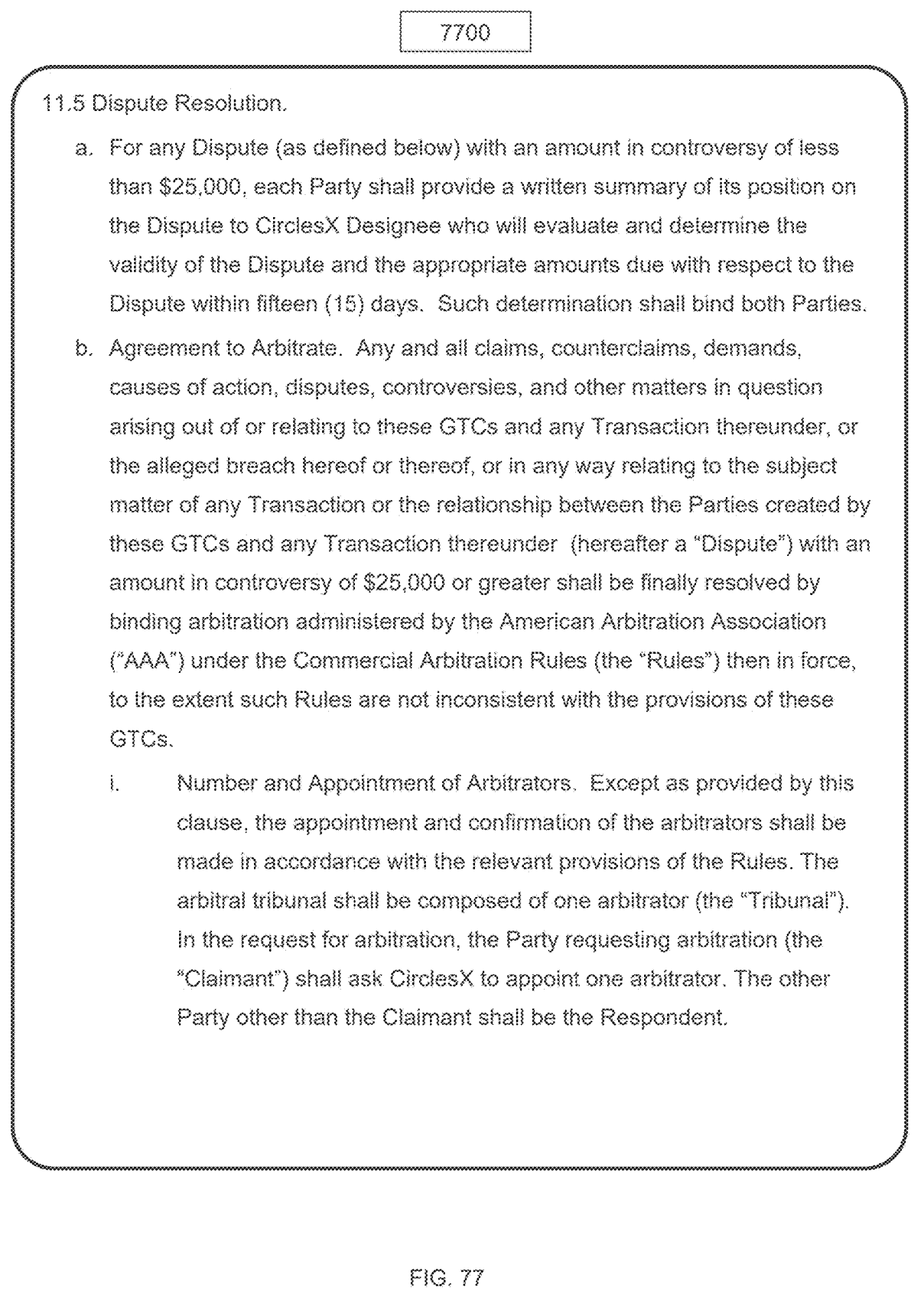

11.5 Dispute Resolution.

a. For any Dispute (as defined below) with an amount in controversy of less than $25,000, each Party shall provide a written summary of its position on the Dispute to CirclesX Designee who will evaluate and determine the validity of the Dispute and the appropriate amounts due with respect to the Dispute within fifteen (15) days. Such determination shall bind both Parties.

b. Agreement to Arbitrate. Any and all claims, counterclaims, demands, causes of action, disputes, controversies, and other matters in question arising out of or relating to these GTCs and any Transaction thereunder, or the alleged breach hereof or thereof, or in any way relating to the subject matter of any Transaction or the relationship between the Parties created by these GTCs and any Transaction thereunder (hereafter a "Dispute") with an amount in controversy of $25,000 or greater shall be finally resolved by binding arbitration administered by the American Arbitration Association ("AAA") under the Commercial Arbitration Rules (the "Rules") then in force, to the extent such Rules are not inconsistent with the provisions of these GTCs.

i. Number and Appointment of Arbitrators. Except as provided by this clause, the appointment and confirmation of the arbitrators shall be made in accordance with the relevant provisions of the Rules. The arbitral tribunal shall be composed of one arbitrator (the "Tribunal"). In the request for arbitration, the Party requesting arbitration (the "Claimant") shall ask CirclesX to appoint one arbitrator. The other Party other than the Claimant shall be the Respondent.

FIG. 77

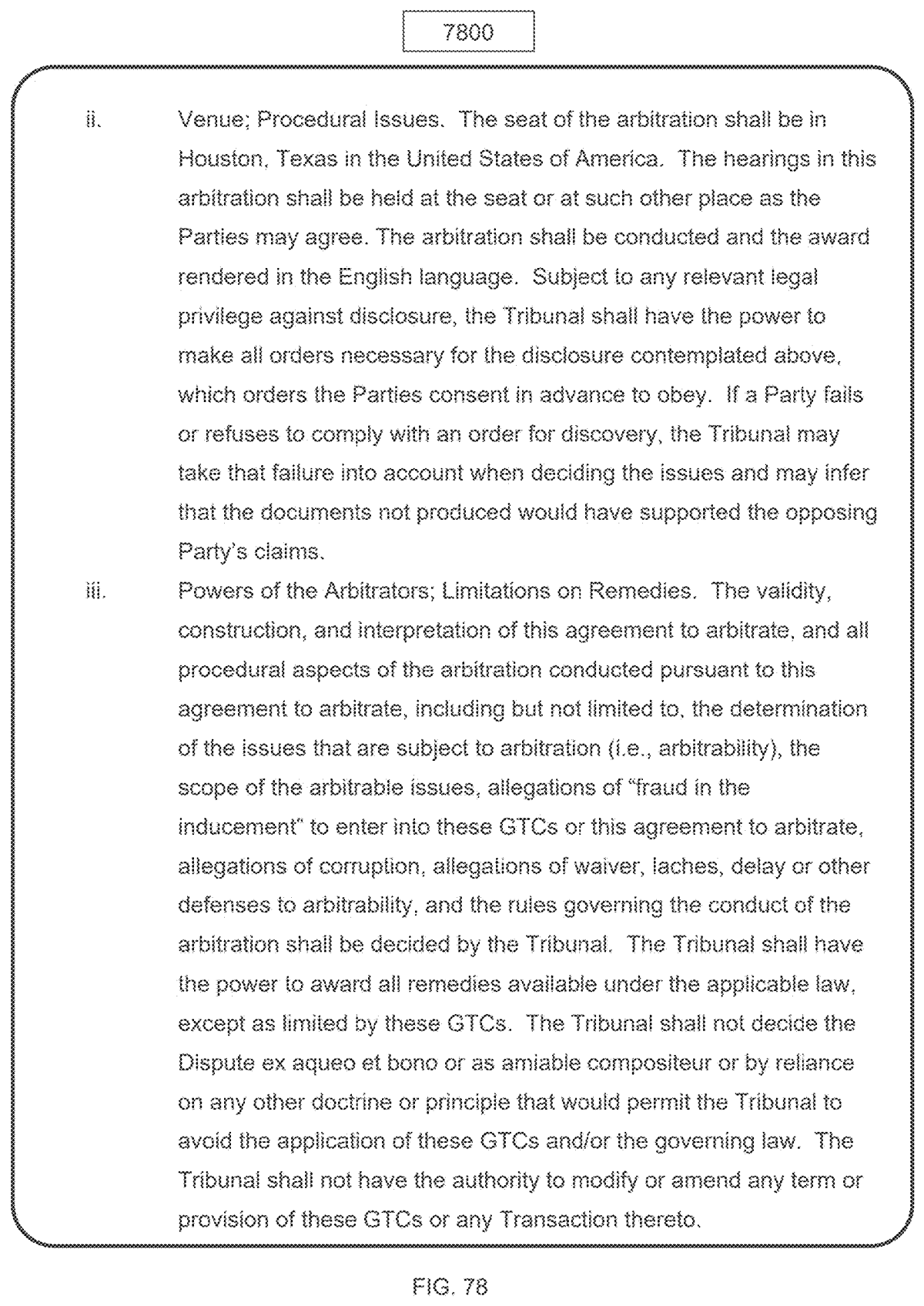

7800 ii.    Venue; Procedural Issues.  The seat of the arbitration shall be in
Houston, Texas in the United States of America.  The hearings in this
arbitration shall be held at the seat or at such other place as the
Parties may agree.  The arbitration shall be conducted and the award
rendered in the English language.  Subject to any relevant legal
privilege against disclosure, the Tribunal shall have the power to
make all orders necessary for the disclosure contemplated above,
which orders the Parties consent in advance to obey.  If a Party fails
or refuses to comply with an order for discovery, the Tribunal may
take that failure into account when deciding the issues and may infer
that the documents not produced would have supported the opposing
Party's claims.

iii.    Powers of the Arbitrators; Limitations on Remedies.  The validity,
construction, and interpretation of this agreement to arbitrate, and all
procedural aspects of the arbitration conducted pursuant to this
agreement to arbitrate, including but not limited to, the determination
of the issues that are subject to arbitration (i.e., arbitrability), the
scope of the arbitrable issues, allegations of "fraud in the
inducement" to enter into these GTCs or this agreement to arbitrate,
allegations of corruption, allegations of waiver, laches, delay or other
defenses to arbitrability, and the rules governing the conduct of the
arbitration shall be decided by the Tribunal.  The Tribunal shall have
the power to award all remedies available under the applicable law,
except as limited by these GTCs.  The Tribunal shall not decide the
Dispute ex aqueo et bono or as amiable compositeur or by reliance
on any other doctrine or principle that would permit the Tribunal to
avoid the application of these GTCs and/or the governing law.  The
Tribunal shall not have the authority to modify or amend any term or
provision of these GTCs or any Transaction thereto.

FIG. 78

7900 iv. Arbitration Awards. The award shall be final and binding on the Parties and may be confirmed in, and judgment upon the award entered by, any court having jurisdiction over the Parties. The Tribunal's award shall be entitled to all of the protections and benefits of a final judgment as to any Dispute, including compulsory counterclaims, that were or could have been presented to the Tribunal, and shall be final and binding on the Parties and non-appealable to the maximum extent permitted by law.

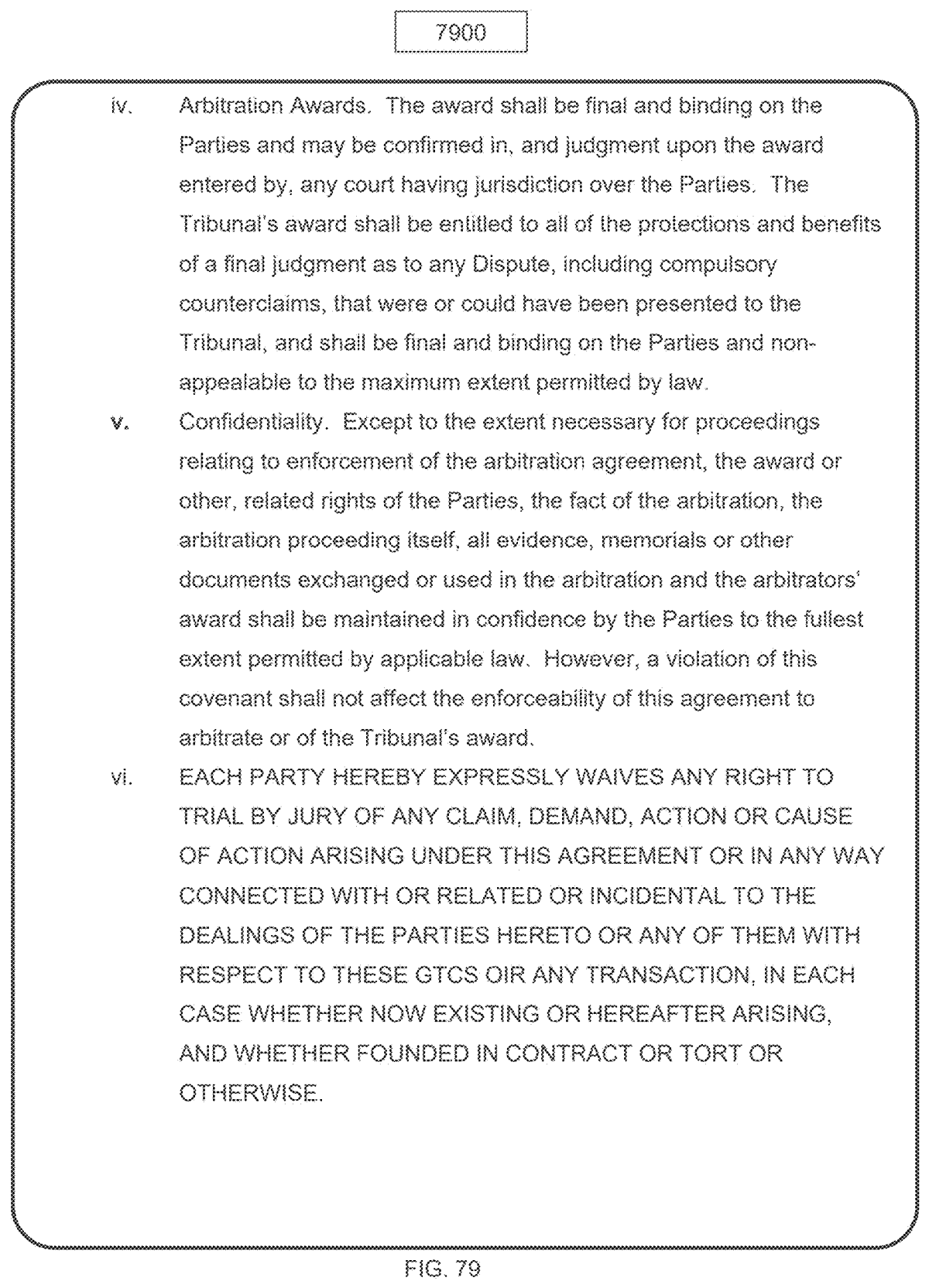

v. Confidentiality. Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law. However, a violation of this covenant shall not affect the enforceability of this agreement to arbitrate or of the Tribunal's award.

vi. EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

FIG. 79

8000 iv.    Arbitration Awards.  The award shall be final and binding on the Parties and may be confirmed in, and judgment upon the award entered by, any court having jurisdiction over the Parties.  The Tribunal's award shall be entitled to all of the protections and benefits of a final judgment as to any Dispute, including compulsory counterclaims, that were or could have been presented to the Tribunal, and shall be final and binding on the Parties and non-appealable to the maximum extent permitted by law.

Figure 80:
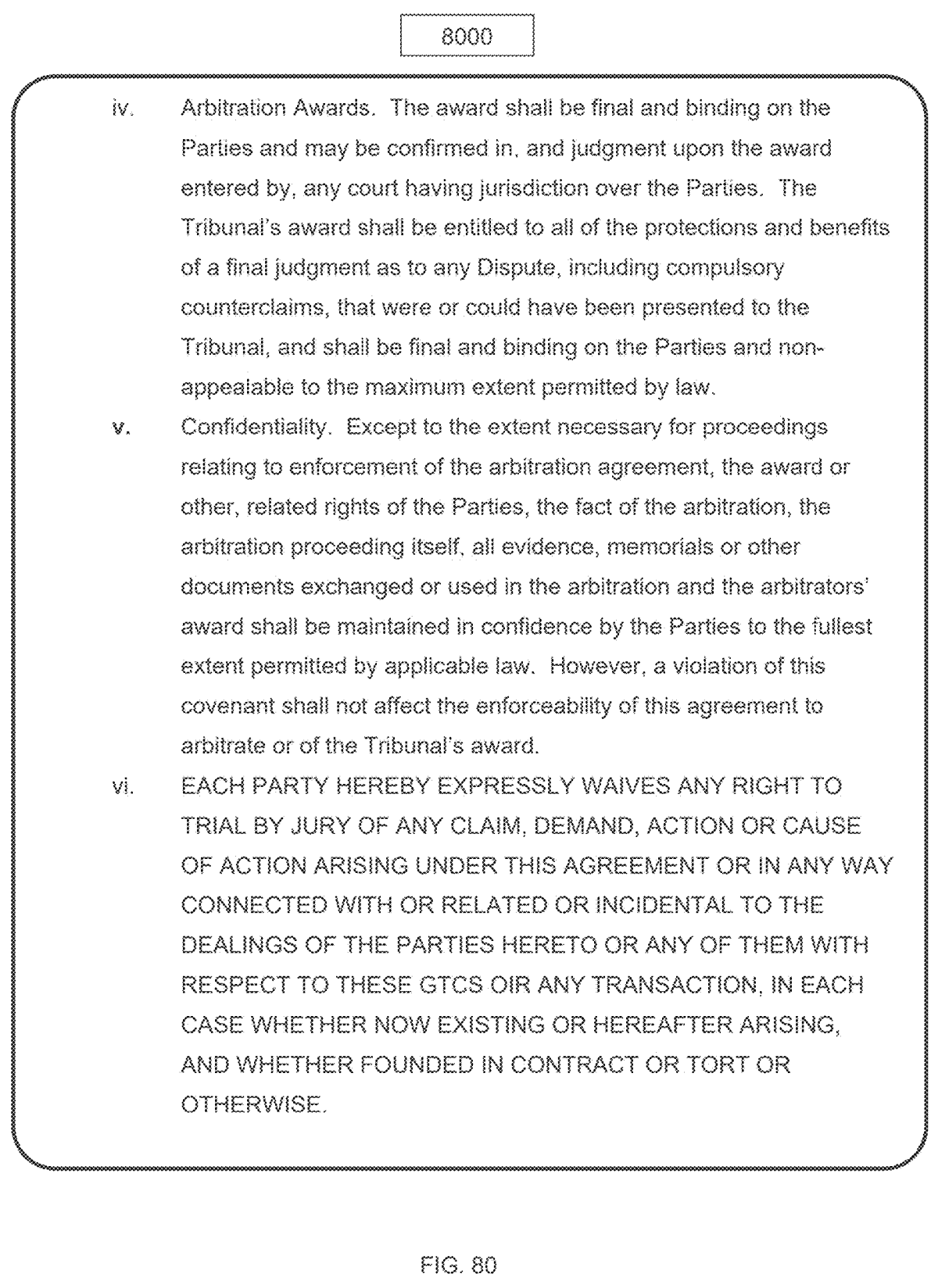

v.    Confidentiality.  Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law.  However, a violation of this covenant shall not affect the enforceability of this agreement to arbitrate or of the Tribunal's award.

vi.    EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

Figure 81:
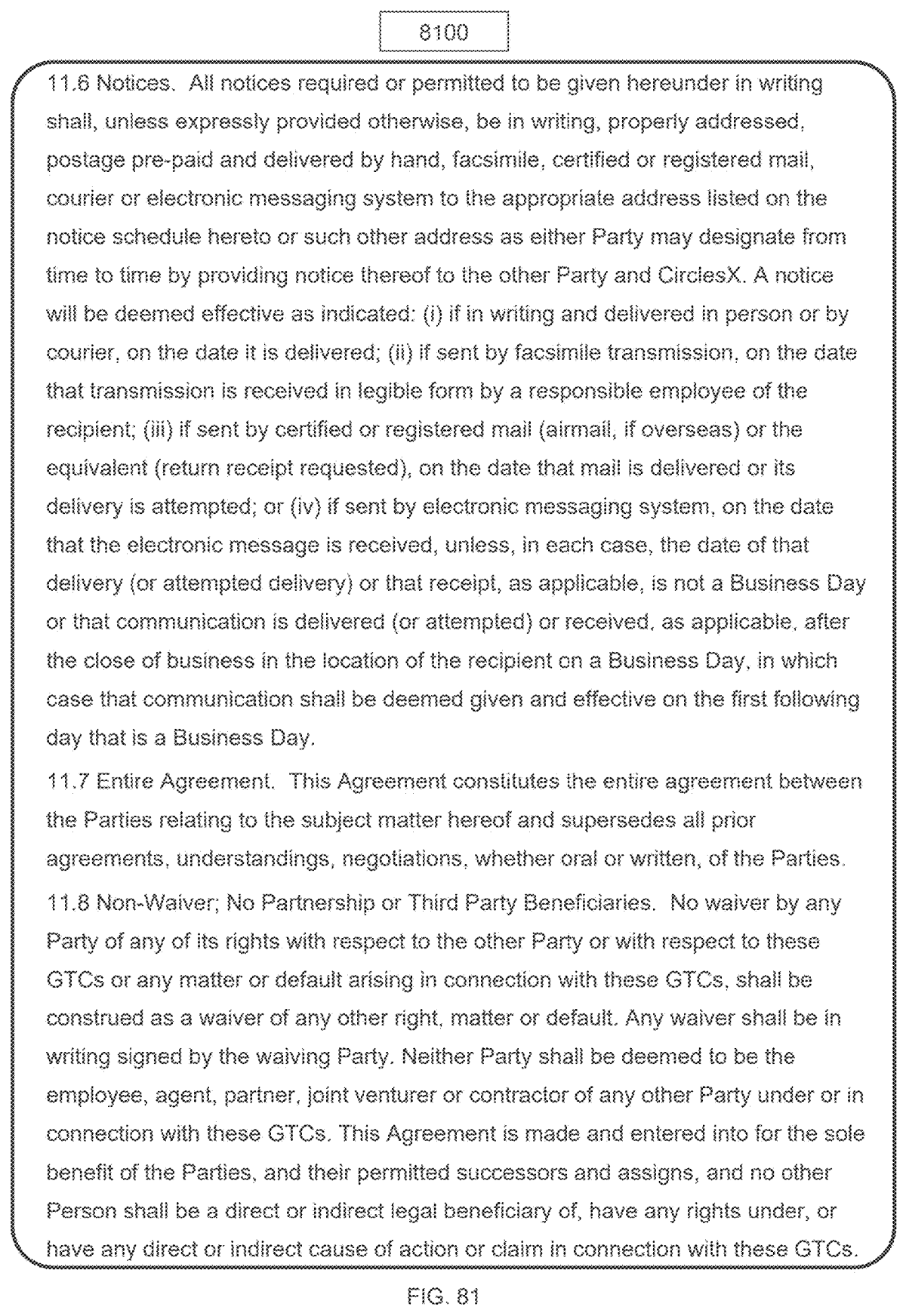

11.6 Notices.  All notices required or permitted to be given hereunder in writing shall, unless expressly provided otherwise, be in writing, properly addressed, postage pre-paid and delivered by hand, facsimile, certified or registered mail, courier or electronic messaging system to the appropriate address listed on the notice schedule hereto or such other address as either Party may designate from time to time by providing notice thereof to the other Party and CirclesX. A notice will be deemed effective as indicated: (i) if in writing and delivered in person or by courier, on the date it is delivered; (ii) if sent by facsimile transmission, on the date that transmission is received in legible form by a responsible employee of the recipient; (iii) if sent by certified or registered mail (airmail, if overseas) or the equivalent (return receipt requested), on the date that mail is delivered or its delivery is attempted; or (iv) if sent by electronic messaging system, on the date that the electronic message is received, unless, in each case, the date of that delivery (or attempted delivery) or that receipt, as applicable, is not a Business Day or that communication is delivered (or attempted) or received, as applicable, after the close of business in the location of the recipient on a Business Day, in which case that communication shall be deemed given and effective on the first following day that is a Business Day.

11.7 Entire Agreement.  This Agreement constitutes the entire agreement between the Parties relating to the subject matter hereof and supersedes all prior agreements, understandings, negotiations, whether oral or written, of the Parties.

11.8 Non-Waiver; No Partnership or Third Party Beneficiaries.  No waiver by any Party of any of its rights with respect to the other Party or with respect to these GTCs or any matter or default arising in connection with these GTCs, shall be construed as a waiver of any other right, matter or default. Any waiver shall be in writing signed by the waiving Party. Neither Party shall be deemed to be the employee, agent, partner, joint venturer or contractor of any other Party under or in connection with these GTCs. This Agreement is made and entered into for the sole benefit of the Parties, and their permitted successors and assigns, and no other Person shall be a direct or indirect legal beneficiary of, have any rights under, or have any direct or indirect cause of action or claim in connection with these GTCs.

Figure 82:
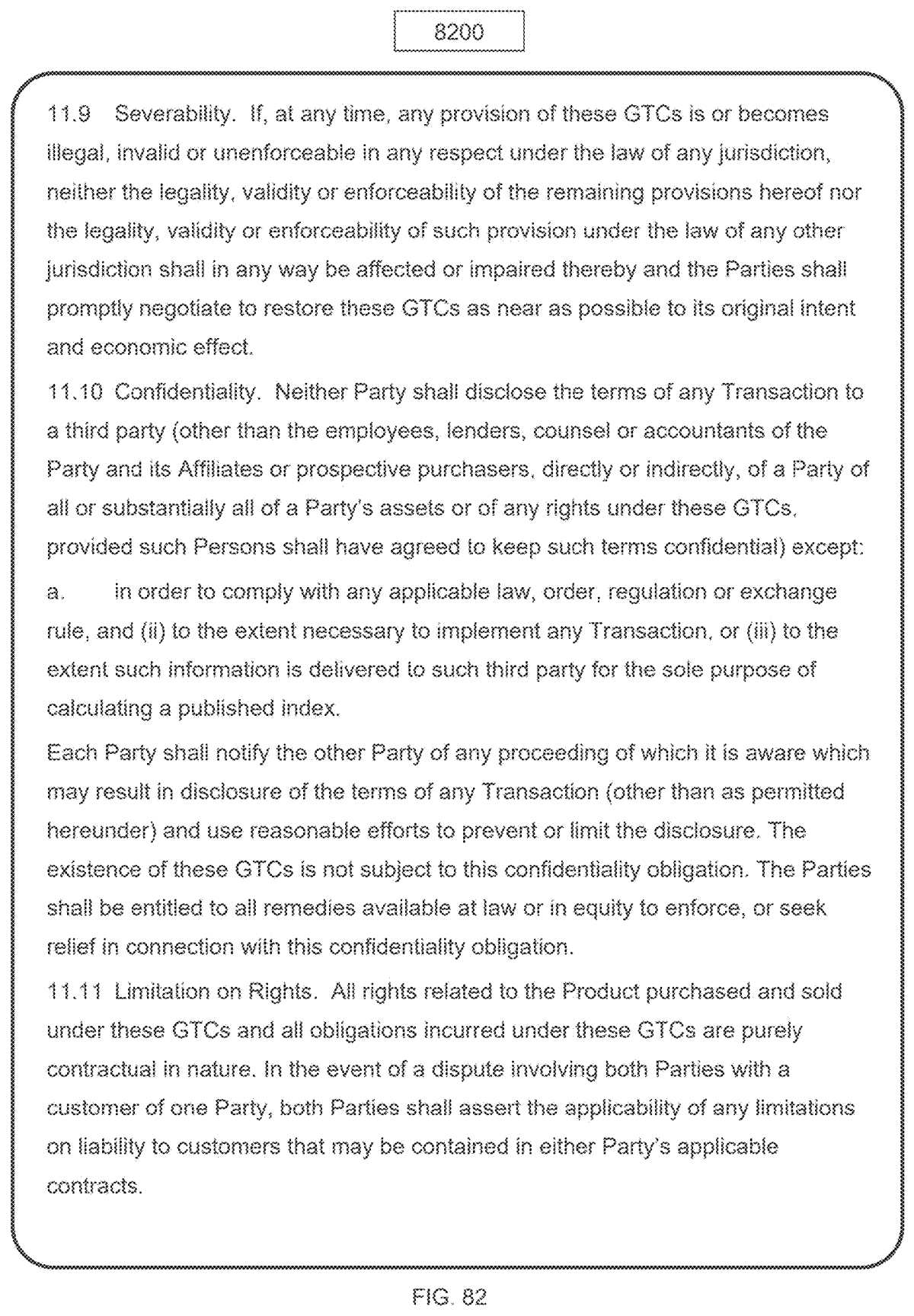

11.9    Severability.  If, at any time, any provision of these GTCs is or becomes illegal, invalid or unenforceable in any respect under the law of any jurisdiction, neither the legality, validity or enforceability of the remaining provisions hereof nor the legality, validity or enforceability of such provision under the law of any other jurisdiction shall in any way be affected or impaired thereby and the Parties shall promptly negotiate to restore these GTCs as near as possible to its original intent and economic effect.

11.10  Confidentiality.  Neither Party shall disclose the terms of any Transaction to a third party (other than the employees, lenders, counsel or accountants of the Party and its Affiliates or prospective purchasers, directly or indirectly, of a Party of all or substantially all of a Party's assets or of any rights under these GTCs, provided such Persons shall have agreed to keep such terms confidential) except:

a.       in order to comply with any applicable law, order, regulation or exchange rule, and (ii) to the extent necessary to implement any Transaction, or (iii) to the extent such information is delivered to such third party for the sole purpose of calculating a published index.

Each Party shall notify the other Party of any proceeding of which it is aware which may result in disclosure of the terms of any Transaction (other than as permitted hereunder) and use reasonable efforts to prevent or limit the disclosure. The existence of these GTCs is not subject to this confidentiality obligation. The Parties shall be entitled to all remedies available at law or in equity to enforce, or seek relief in connection with this confidentiality obligation.

11.11  Limitation on Rights.  All rights related to the Product purchased and sold under these GTCs and all obligations incurred under these GTCs are purely contractual in nature. In the event of a dispute involving both Parties with a customer of one Party, both Parties shall assert the applicability of any limitations on liability to customers that may be contained in either Party's applicable contracts.

Figure 83:
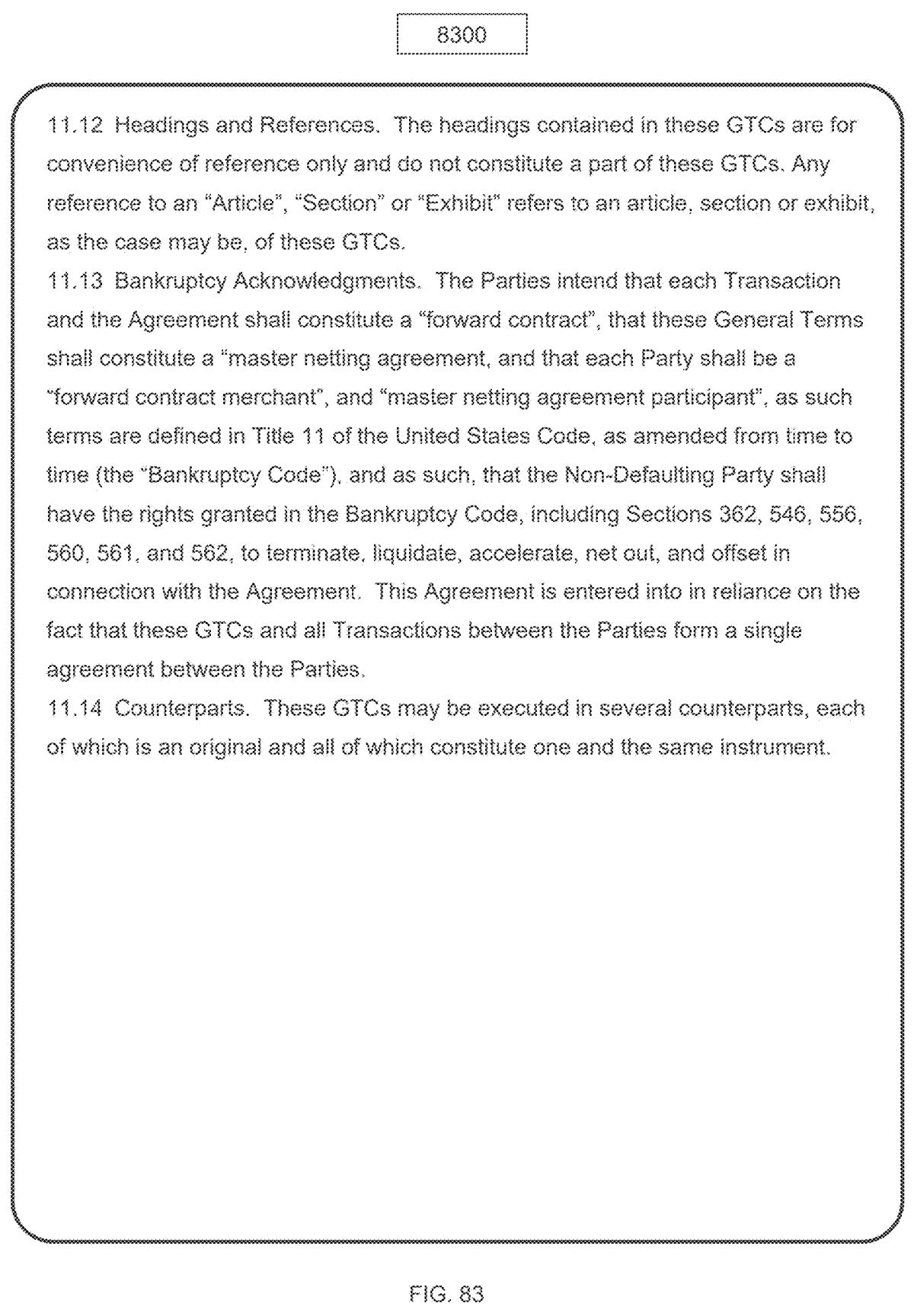

11.12 Headings and References. The headings contained in these GTCs are for convenience of reference only and do not constitute a part of these GTCs. Any reference to an "Article", "Section" or "Exhibit" refers to an article, section or exhibit, as the case may be, of these GTCs.

11.13 Bankruptcy Acknowledgments. The Parties intend that each Transaction and the Agreement shall constitute a "forward contract", that these General Terms shall constitute a "master netting agreement, and that each Party shall be a "forward contract merchant", and "master netting agreement participant", as such terms are defined in Title 11 of the United States Code, as amended from time to time (the "Bankruptcy Code"), and as such, that the Non-Defaulting Party shall have the rights granted in the Bankruptcy Code, including Sections 362, 546, 556, 560, 561, and 562, to terminate, liquidate, accelerate, net out, and offset in connection with the Agreement. This Agreement is entered into in reliance on the fact that these GTCs and all Transactions between the Parties form a single agreement between the Parties.

11.14 Counterparts. These GTCs may be executed in several counterparts, each of which is an original and all of which constitute one and the same instrument.

NOTICE

| Notices and Correspondence: | Notices and Correspondence: |
|---|---|
| Attn: _____ | Attn: _____ |
| Phone No.: _____ | Phone No.: _____ |
| Fax No.: _____ | Fax No.: _____ |
| Payments: | Payments: |
| Attn: _____ | Attn: _____ |
| Phone: _____ | Phone: _____ |
| Fax: _____ | Fax: _____ |
| Bank: _____ | Bank: _____ |
| Account No.: _____ | Account No.: _____ |
| ABA Routing No.: _____ | ABA Routing No.: _____ |
| Scheduling Matters: | Scheduling Matters: |
| Attn: _____ | Attn: _____ |
| Phone No.: _____ | Phone No.: _____ |
| Fax No.: _____ | Fax No.: _____ |
| Cell No.: _____ | Cell No.: _____ |
| Email: _____ | Email: _____ |

Figure 85:
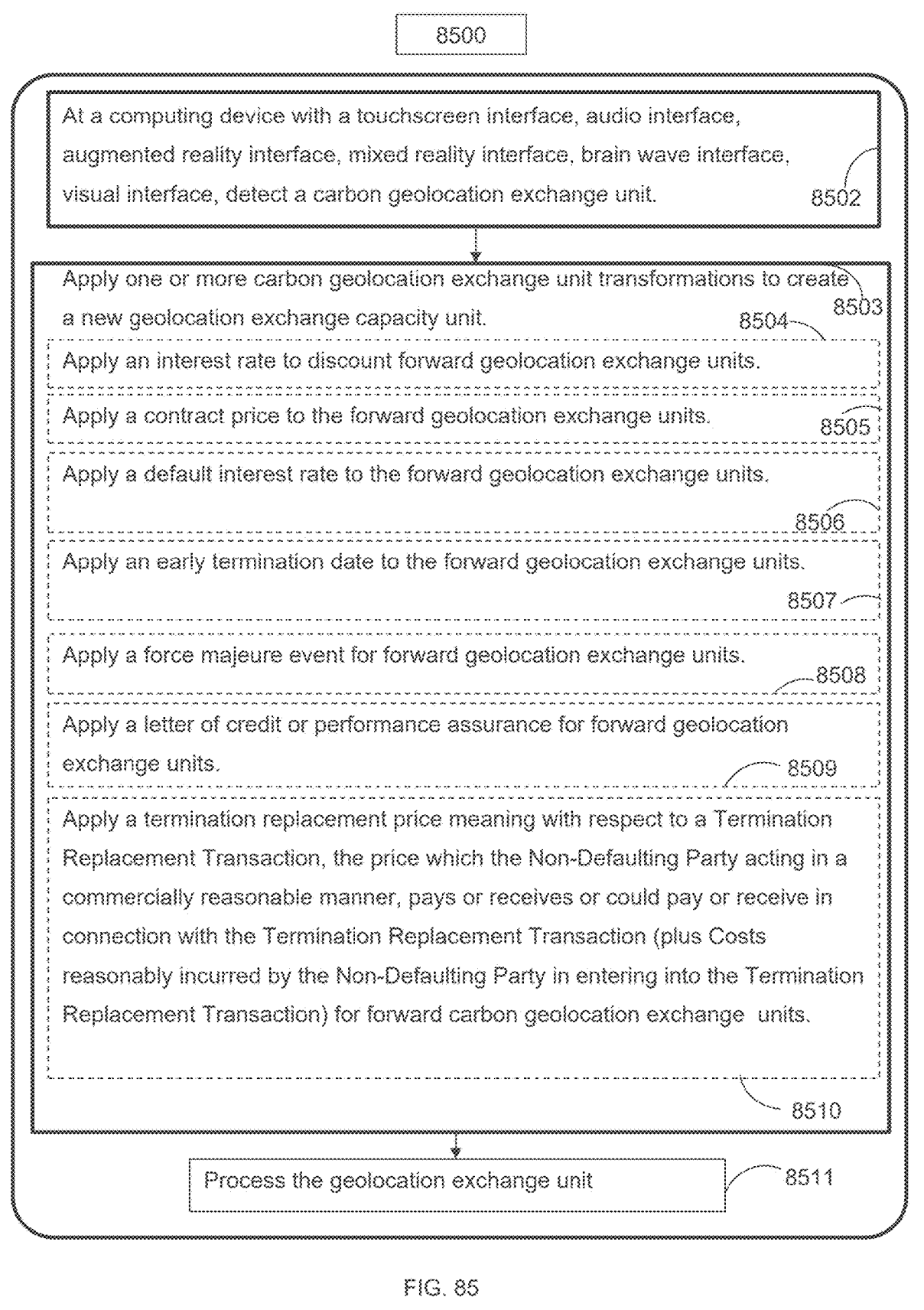

At a computing device with a touchscreen interface, audio interface, augmented reality interface, mixed reality interface, brain wave interface, visual interface, detect a carbon geolocation exchange unit.    8502

Apply one or more carbon geolocation exchange unit transformations to create a new geolocation exchange capacity unit.    8504    8503

Apply an interest rate to discount forward geolocation exchange units.

Apply a contract price to the forward geolocation exchange units.    8505

Apply a default interest rate to the forward geolocation exchange units.    8506

Apply an early termination date to the forward geolocation exchange units.    8507

Apply a force majeure event for forward geolocation exchange units.    8508

Apply a letter of credit or performance assurance for forward geolocation exchange units.    8509

Apply a termination replacement price meaning with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction) for forward carbon geolocation exchange units.    8510

Process the geolocation exchange unit    8511

Figure 86:
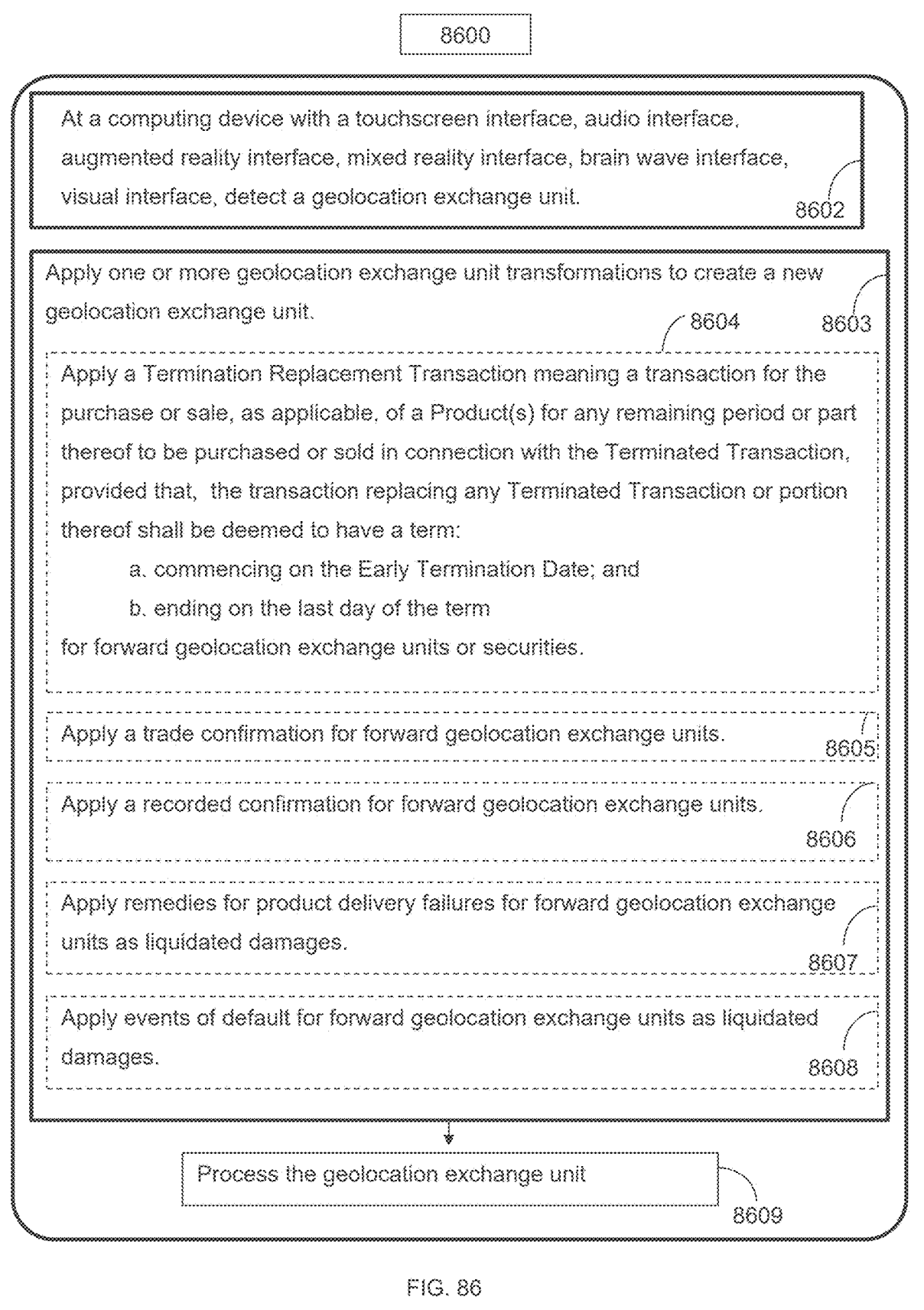

At a computing device with a touchscreen interface, audio interface, augmented reality interface, mixed reality interface, brain wave interface, visual interface, detect a geolocation exchange unit. 8602

Apply one or more geolocation exchange unit transformations to create a new geolocation exchange unit. 8604     8603

Apply a Termination Replacement Transaction meaning a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:

a. commencing on the Early Termination Date; and b. ending on the last day of the term for forward geolocation exchange units or securities.

Apply a trade confirmation for forward geolocation exchange units. 8605

Apply a recorded confirmation for forward geolocation exchange units. 8606

Apply remedies for product delivery failures for forward geolocation exchange units as liquidated damages. 8607

Apply events of default for forward geolocation exchange units as liquidated damages. 8608

Process the geolocation exchange unit 8609

Figure 87:
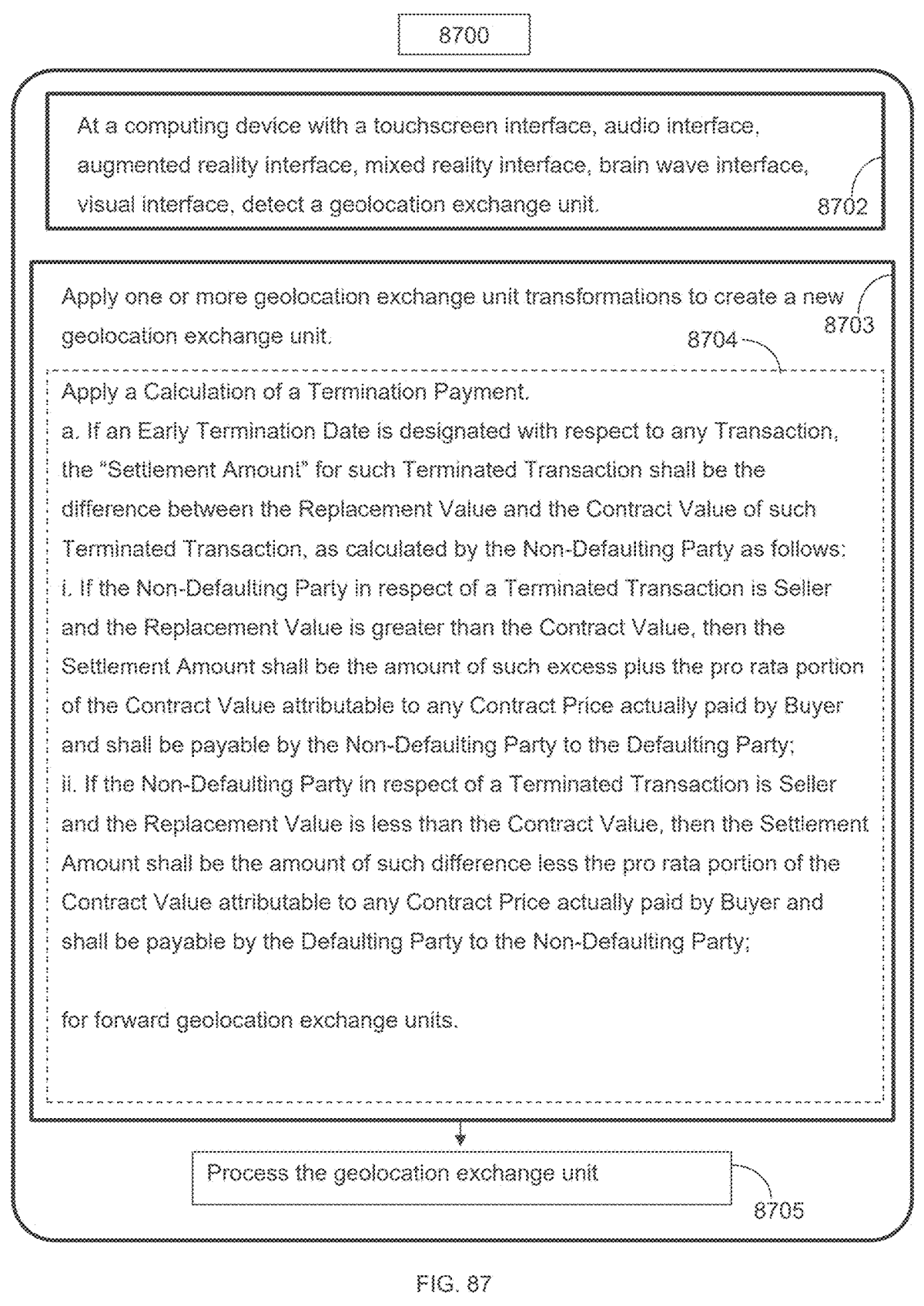

At a computing device with a touchscreen interface, audio interface, augmented reality interface, mixed reality interface, brain wave interface, visual interface, detect a geolocation exchange unit.    8702

Apply one or more geolocation exchange unit transformations to create a new geolocation exchange unit.    8704    8703

Apply a Calculation of a Termination Payment.

a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

for forward geolocation exchange units.

Process the geolocation exchange unit    8705

Figure 88:
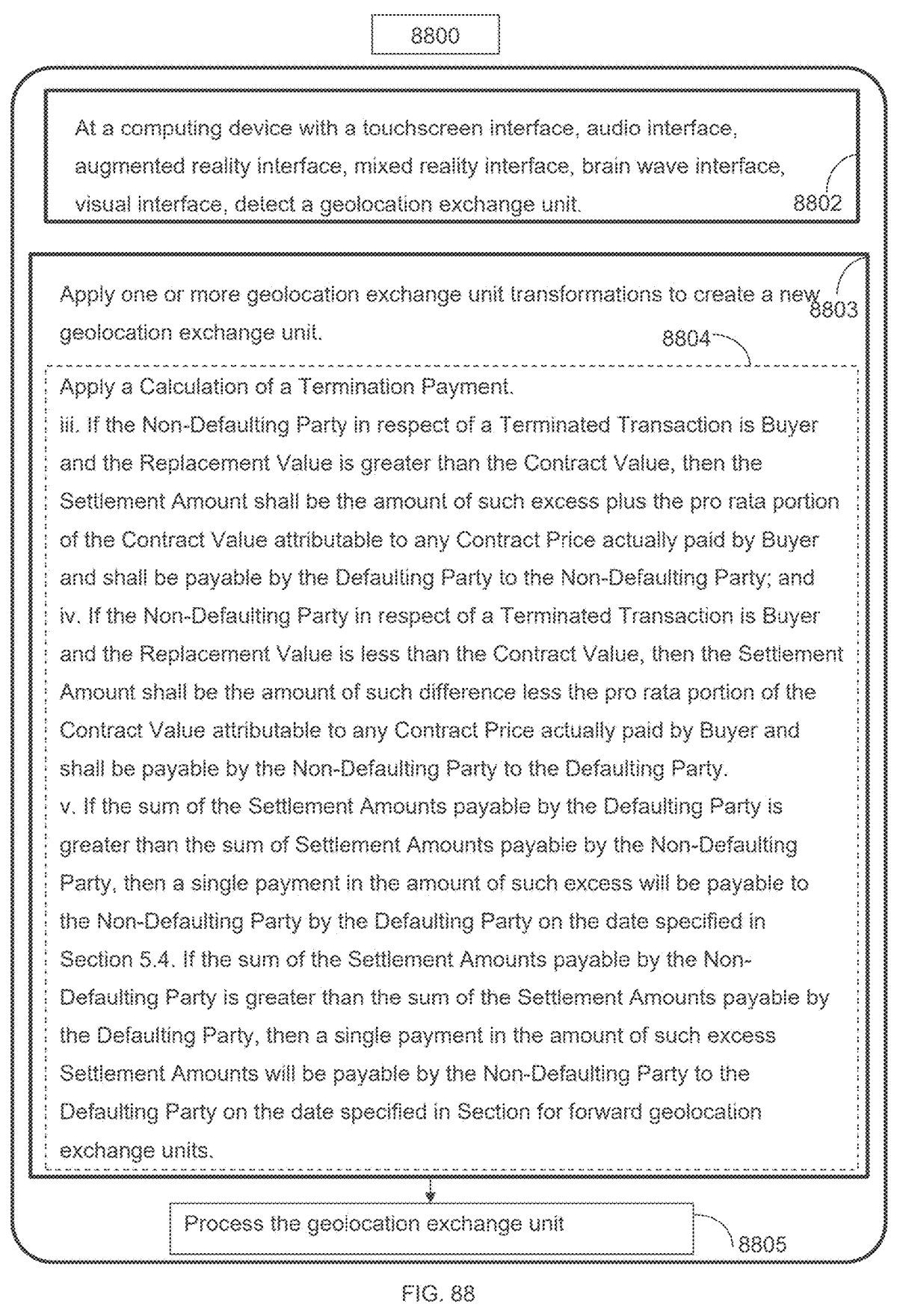

At a computing device with a touchscreen interface, audio interface, augmented reality interface, mixed reality interface, brain wave interface, visual interface, detect a geolocation exchange unit.    8802

Apply one or more geolocation exchange unit transformations to create a new geolocation exchange unit.    8803    8804

Apply a Calculation of a Termination Payment.

iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section for forward geolocation exchange units.

Process the geolocation exchange unit    8805

Geolocation Exchange Unit Portfolio sells Creation Basket to Authorized Participant — 9010

Authorized Participant sells Units in Secondary Market — 9020

Authorized Participant Purchases Units in Secondary Market — 9030

Authorized Participant redeems Geolocation Exchange Unit Portfolio — 9040

9200

10600

10700

10710

10720

Search    10730

Foodie Body Search    10740

Food Search Carbon Offset Engine 10750    10751    10752    10753

10760

Machine Learning Recursive Food and Beverage Optimization Engine

10770

10772    10773

10771    10774

10775

Figure 116:
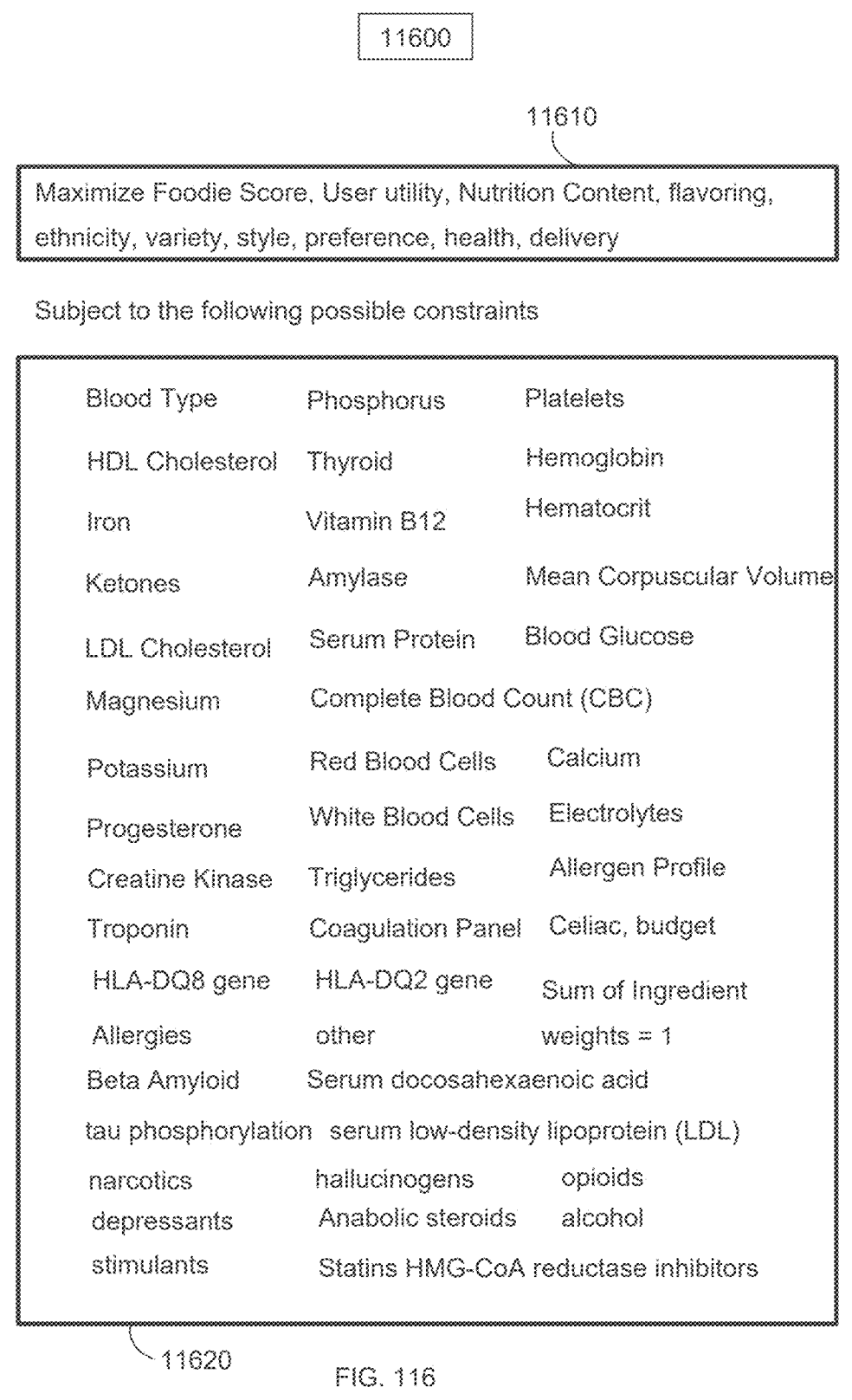

11600

11610

Maximize Foodie Score, User utility, Nutrition Content, flavoring, ethnicity, variety, style, preference, health, delivery Subject to the following possible constraints

| | | |
|---|---|---|
| Blood Type | Phosphorus | Platelets |
| HDL Cholesterol | Thyroid | Hemoglobin |
| Iron | Vitamin B12 | Hematocrit |
| Ketones | Amylase | Mean Corpuscular Volume |
| LDL Cholesterol | Serum Protein | Blood Glucose |
| Magnesium | Complete Blood Count (CBC) | |
| Potassium | Red Blood Cells | Calcium |
| Progesterone | White Blood Cells | Electrolytes |
| Creatine Kinase | Triglycerides | Allergen Profile |
| Troponin | Coagulation Panel | Celiac, budget |
| HLA-DQ8 gene | HLA-DQ2 gene | Sum of Ingredient |
| Allergies | other | weights = 1 |
| Beta Amyloid | Serum docosahexaenoic acid | |
| tau phosphorylation | serum low-density lipoprotein (LDL) | |
| narcotics | hallucinogens | opioids |
| depressants | Anabolic steroids | alcohol |
| stimulants | Statins HMG-CoA reductase inhibitors | |

Figures 120A, 120B:
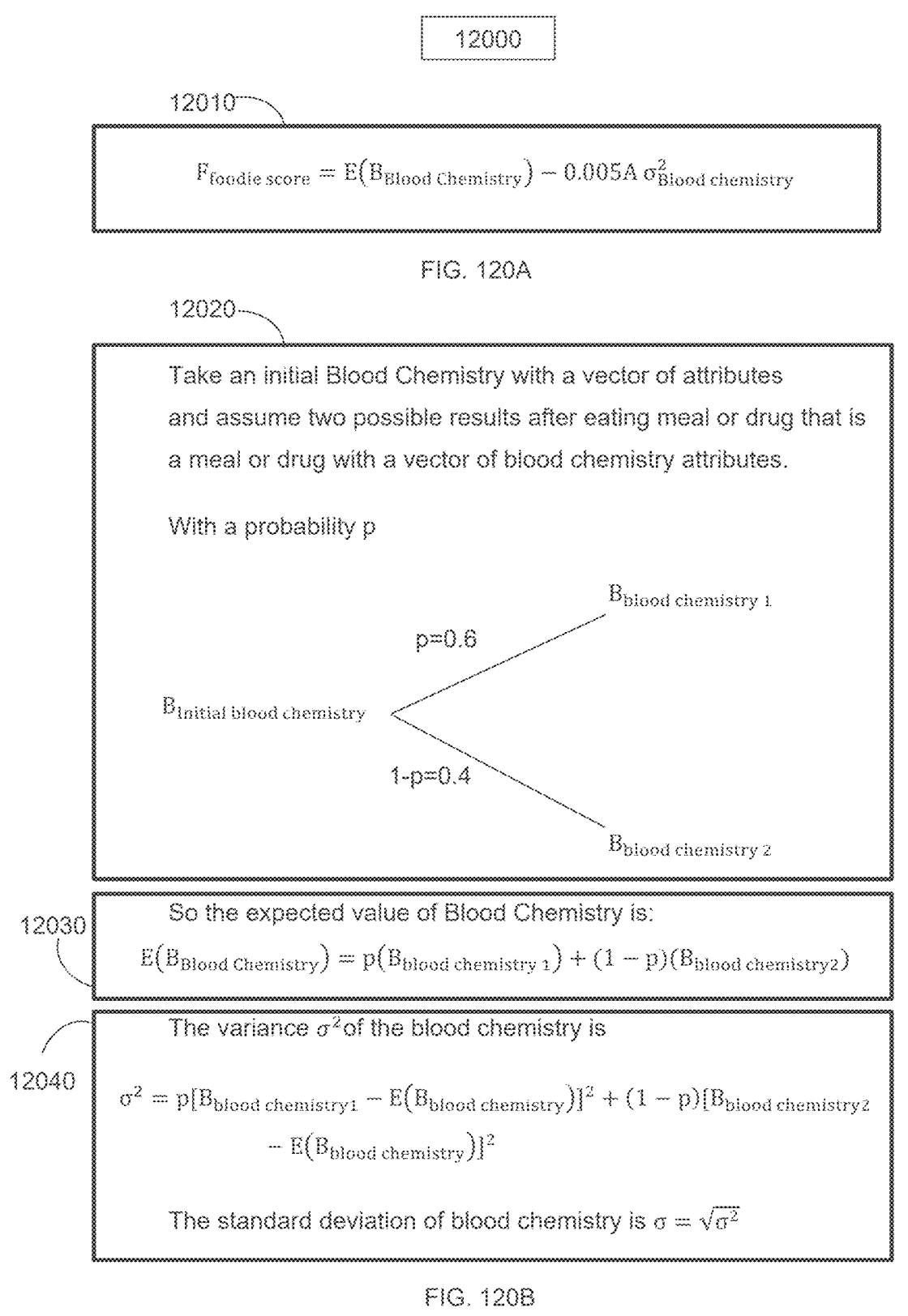

$$F_{\text{foodie score}} = E\left(B_{\text{Blood Chemistry}}\right) - 0.005A\,\sigma^2_{\text{Blood chemistry}}$$

Take an initial Blood Chemistry with a vector of attributes and assume two possible results after eating meal or drug that is a meal or drug with a vector of blood chemistry attributes.

With a probability p $B_{\text{Initial blood chemistry}}$ $p=0.6$     $B_{\text{blood chemistry 1}}$ $1-p=0.4$     $B_{\text{blood chemistry 2}}$

12030

So the expected value of Blood Chemistry is:

$$E\left(B_{\text{Blood Chemistry}}\right) = p\left(B_{\text{blood chemistry 1}}\right) + (1-p)\left(B_{\text{blood chemistry2}}\right)$$

12040

The variance $\sigma^2$ of the blood chemistry is $$\sigma^2 = p[B_{\text{blood chemistry1}} - E\left(B_{\text{blood chemistry}}\right)]^2 + (1-p)[B_{\text{blood chemistry2}} - E\left(B_{\text{blood chemistry}}\right)]^2$$

The standard deviation of blood chemistry is $\sigma = \sqrt{\sigma^2}$

| E blood chemistry meal | σ blood chemistry meal | $F_{foodie\ score} = E\left(B_{Blood\ Chemistry}\right) - 0.005A\ \sigma^2_{Blood\ chemistry}$ |
|---|---|---|
| 10 | 20.0% | $10 - 0.005 \times 4 \times 400 = 2$ |
| 15 | 25.5% | $15 - 0.005 \times 4 \times 650 = 2$ |
| 20 | 30.0% | $20 - 0.005 \times 4 \times 900 = 2$ |
| 25 | 33.9% | $25 - 0.005 \times 4 \times 1{,}150 = 2$ |

12310 —

12300

|  | State 1 | State 2 | State 3 |
|---|---|---|---|
| Opioid Probability | 0.5 | 0.3 | 0.2 |
| Opioid Blood Chemistry Toward target | 25% Increase to target | 10% Increase to target | -25% decrease to target |

The mean or expected return of an ingredient is a probability weighted return

In all scenarios:

$$E(r) = \sum_s \Pr(s)\, r(s)$$

Applying the aforementioned formula to 1710 above we have $$E(r_{ingredient}) = 0.5x25 + 0.3x10 + 0.2x(-25)$$

The variance of Opioid on blood chemistry is $$\sigma^2 = \sum_s \Pr(s)\, [r(s) - E(r)]^2$$

Applying the aforementioned formula to 1710 above we have $$\sigma^2_{opioid} = (0.5(25 - 10.5)^2 + 0.3(10 - 10.5)^2 + 0.2(-25 - 10.5)^2 = 357.25$$

$$\text{Or } \sigma_{opioid} = \sqrt{357.25} = 18.99\%$$

$$E(r_{meal}) = 0.5\big(E(r_{opioid})\big) + 0.5\big(E(r_{statin})\big)$$

$$= 0.5 \times 10.5 + 0.5 \times 5 = 7.75\%, \text{ when opioid is combined with statin}$$

$$\sigma_{Poodle} = 0.5\big(\sigma_{opioid}\big) + 0.5\big(\sigma_{statin}\big)$$

The standard deviation of the combination of ingredients

$$[r_{opioid} - E(r_{opioid})][r_{statin} - E(r_{statin})]$$

$$Cov\big(r_{opioid}, r_{statin}\big) = \sum_{s} \Pr(s)\,[r_{opioid}(S) - E(r_{opioid})][r_{statin}(s) - E(r_{statin})]$$

$$\rho(\text{opioid}, \text{statin}) = \frac{\text{Cov}[r_{\text{opioid}}, r_{\text{statin}}]}{\sigma_{\text{opioid}}\sigma_{\text{statin}}}$$

12510

FIG. 125A $$\sigma^2_{\text{blood chemistry}} = w_1^2\sigma^2 + w_2^2\sigma_2^2 + 2w_1w_2\text{Cov}(r_1r_2)$$

Where subscript 1 is opioid or another ingredient and

Subscript 2 is statin or another ingredient

12520

FIG. 125B $$\max_{\text{vector of ingredients}}[F_{\text{foodie Score}}] = E\left(r_{\substack{\text{Blood}\\\text{chem}\\\text{meal}}}\right) - 0.005A\sigma^2_{\substack{\text{blood}\\\text{chem}\\\text{meal}}}$$

Where term A is the Foodie's user preference index

| | meal$_1$ or ing$_1$ | meal$_2$ or ing$_2$ |
|---|---|---|
| Meal or ingredient weights | $w_{ing\ 1}$ | $w_{ing2}$ |
| $w_{ing\ 1}$ | $\sigma^2_{ing\ 1}$ | $Cov(r_{ing1}, r_{ing2})$ |
| $w_{ing\ 2}$ | $Cov(r_{ing\ 1}, r_{ing\ 2})$ | $\sigma^2_{ing\ 2}$ |

| | Ingredient 1 | Ingredient 2 |
|---|---|---|
| Expected blood chemistry; E(r) | 8% | 13% |
| Standard deviation ; $\sigma$ | 12% | 20% |
| Covariance; $Cov(r_{ing1}, r_{ing2})$ | 72 | |
| Correlation Coefficient : $\rho_{ing1,ing2}$ | 0.30 | |

| $w_{opioid}$ | $w_{statin}$ | $\rho = -1$ | $\rho = 0$ | $\rho = 0.3$ | $\rho = 1$ |
|---|---|---|---|---|---|
| 0.0 | 1.00 | 20.00% | 20.00% | 20.00% | 20.00% |
| 0.25 | 0.75 | 12.00 | 15.3 | 16.16 | 18.00 |
| 0.50 | 0.50 | 4 | 11.66 | 13.11 | 16.00 |
| 0.75 | 0.25 | 4.00 | 10.30 | 11.53 | 14.00 |
| 1.00 | 0.0 | 12.00 | 12.00 | 12.00 | 12.00 |
| Minimum $\sigma_m$ | | 0.00 | 10.29 | 11.45 | - |
| $w_{opioid}@min\sigma_m$ | | 0.63 | 0.74 | 0.82 | - |

12800

12810

12820

12900

12910

$$\text{Slope}_{\text{Foodie Allocation Line (A)}} = \frac{E(\text{blood chemistry})_{\text{opioid,statin}} - \text{Ingredient}_{\text{no }\sigma}}{\sigma_{\text{opioid,statin}}}$$

$$= \frac{8.9-5}{11.45} = 0.34$$

12920

13000

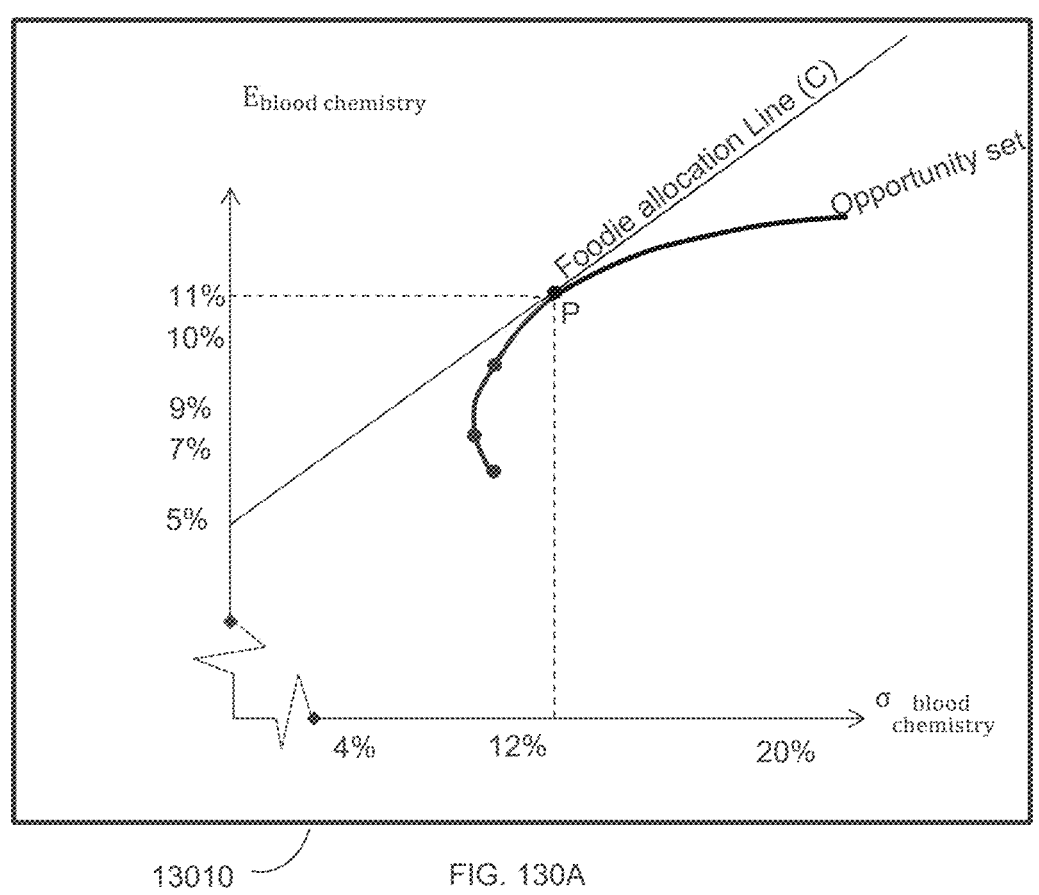

13010     FIG. 130A $$Slope_{Foodie\ allocation\ line} = \frac{E_{blood\ chemistry} - Water_{blood\ chemistry}}{\sigma_{blood\ chemistry}}$$

$$E_{blood\ chemistry(BC)}\ of\ combination = w_{opioid}E_{opioid(BC)} + w_{statin}E_{statin(BC)}$$

$$= 8w_{opioid} + 13w_{statin}$$

$$\sigma_{blood\ chemistry\ combination} = [w_{opi}^2\sigma_{opi}^2 + w_{stat}^2\sigma_{stat}^2 + 2w_{opi}w_{stat}Cov(r_{opi}r_{stat})]^{\frac{1}{2}}$$

$$= [144w_{opi}^2 + 400w_{stat}^2 + 2x72w_{opi}w_{stat}]^{\frac{1}{2}}$$

13020     FIG. 130B $$13100$$

$$\max_{w_i} \text{Slope}_{\text{Foodie allocation line}} = \frac{E_{\text{blood chemistry}} - \text{Water}_{\text{blood chemistry}}}{\sigma_{\text{blood chemistry}}}$$

Subject to $\sum w_i = 1$, which is the standard problem in calculus.

13110        FIG. 131A $$w_{\text{opioid}} = \frac{[E(r_{\text{opiBC}}) - \text{Water}_{\text{BC}}]\sigma^2_{\text{statBC}} - [E(r_{\text{statBC}}) - \text{Water}_{\text{BC}}]\text{Cov}(r_{\text{opiBC}}, r_{\text{statBC}})}{[E(r_{\text{opiBC}}) - \text{Water}_{\text{BC}}]\sigma^2_{\text{statBC}} + [E(r_{\text{statBC}}) - \text{Water}_{\text{BC}}]\sigma^2_{\text{opiBC}} - [E(r_{\text{opiBC}}) - \text{Water}_{\text{BC}} + E(r_{\text{statBC}}) - \text{Water}_{\text{BC}}]\text{Cov}(r_{\text{opiBC,statBC}}))}$$

$$w_{\text{statin}} = 1 - w_{\text{opioid}}$$

$$w_{\text{opioid}} = \frac{(8-5)400-(13-5)72}{(8-5)400+(13-5)144-(8-5+13-5)72}$$
$$= 0.40$$
$$w_{\text{statin}} = 1-0.40$$
$$= 0.6$$

13120

FIG. 131B $$y = \frac{E(r_{\text{combination meal}}) - \text{Water}_{\text{BC}}}{0.01 \times A\sigma^2_{\text{combination meal}}}$$

$$= \frac{11-5}{0.01 \times 4 \times 14.2^2} = 0.7439$$

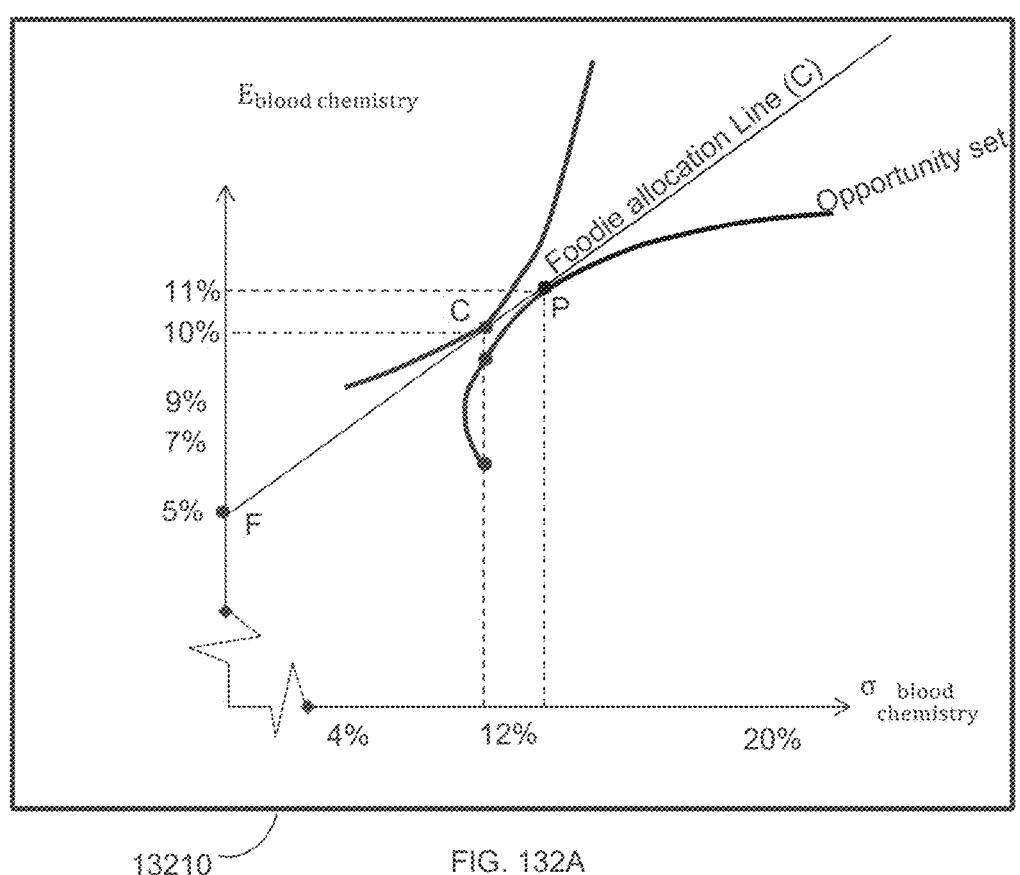

13210 ⌐          FIG. 132A

Specify the blood chemistry of all ingredients (expected blood chemistry, variances and covariances)

Establish the combination of ingredients

Calculate the optimal ingredient combination

Calculate the properties of the ingredient combination using weights determined by optimization.

Allocate calories and chemistry between ingredient combo and water.

Calculate the fraction of the complete meal towards the ingredients and water

Calculate the share of calories in each ingredient and water

$$E(r_p) = \sum_{i=1}^{n} w_i E(r_i)$$

$$\sigma_p^2 = \sum_{i=1}^{n} w_i^2 \sigma_i^2 + \sum_{\substack{i=1 \\ i \neq j}}^{n} \sum_{j=1}^{n} w_i w_j Cov(r_i r_j)$$

13410

13420

13500

$$w \in R^d$$

Vector w is a set of ingredient weights $w = \begin{bmatrix} w_1 \\ w_2 \\ \vdots \\ w_d \end{bmatrix}$ where $w_1 + w_2 + \cdots + w_d = 1$ Let the expected meal ingredient biomarker chemistry vector be $$r = \begin{bmatrix} r_1 \\ r_1 \\ \cdot \\ \cdot \\ r_d \end{bmatrix}, E(r) = \begin{bmatrix} E(r_1) \\ E(r_2) \\ \cdot \\ \cdot \\ E(r_d) \end{bmatrix}$$

Variance – covariance Matrix of ingredients in the meal / drug ingredient combination $$\sum = \begin{bmatrix} \sigma_1^2 & \cdots & \sigma_{1d} \\ \vdots & \ddots & \vdots \\ \sigma_{1d} & \cdots & \sigma_d^2 \end{bmatrix}$$

$$r_p = w'x\, r = [w_1 \quad \cdots \quad w_d] x \begin{bmatrix} r_1 \\ \vdots \\ r_d \end{bmatrix}$$

$$E(r_p) = w'x\, E(r)$$

$$\sigma_p^2 = w'x \sum x\, w = [w_1 \ldots w_d] \begin{bmatrix} \sigma_1^2 & \cdots & \sigma_{1d} \\ \vdots & \ddots & \vdots \\ \sigma_{1d} & \cdots & \sigma_d^2 \end{bmatrix} \begin{bmatrix} w_1 \\ \vdots \\ w_d \end{bmatrix}$$

Egg, yolk, raw, frozen, pasteurized

Refuse:%

| Nutrients and Units | | Amount in 100 grams of edible portion | | | | | | Amount in edible portion of common measure of food | | |
| --- | --- | --- | --- | --- | --- | --- | --- | --- | --- | --- |
| | | Mean | Std. Error | Number of Data Points | Deriv Code | Source Code | Confi- dence Code | Measure 1 | Measure 2 | Measure 3 |
| Proximate: | | | | | | | | | | |
| Water | g | 56.44 | 0.068 | 15 | A | 1 | | 16.00 | 128.12 | |
| Energy | kcal | 296.0 | | 0 | NC | 4 | | 84 | 671 | |
| Energy | kJ | 1238 | | 0 | NC | 4 | | 351 | 2810 | |
| Protein | g | 15.53 | 0.095 | 15 | A | 1 | | 4.40 | 35.26 | |
| Total lipid (fat) | g | 25.60 | 0.171 | 15 | DA | 1 | | 7.26 | 58.12 | |
| Ash | g | 1.62 | 0.057 | 15 | A | 1 | | 0.46 | 3.67 | |
| Carbohydrate, by difference | g | 0.81 | | 0 | NC | 4 | | 0.23 | 1.84 | |
| Fiber, total dietary | g | 0.0 | | 0 | Z | 7 | | 0.0 | 0.0 | |
| Sugars, total | g | 0.16 | 0.014 | 15 | A | 1 | | 0.05 | 0.37 | |
| Sucrose | g | 0.00 | 0.000 | 15 | A | 1 | | 0.00 | 0.00 | |
| Glucose (dextrose) | g | 0.16 | 0.014 | 15 | A | 1 | | 0.05 | 0.37 | |
| Fructose | g | 0.00 | 0.000 | 15 | A | 1 | | 0.00 | 0.00 | |
| Lactose | g | 0.00 | 0.000 | 15 | A | 1 | | 0.00 | 0.00 | |
| Maltose | g | 0.00 | 0.000 | 15 | A | 1 | | 0.00 | 0.00 | |
| Galactose | g | 0.00 | 0.000 | 15 | A | 1 | | 0.00 | 0.00 | |
| Starch | g | | | | | | | | | |
| Minerals: | | | | | | | | | | |
| Calcium, Ca | mg | 134 | 2.872 | 15 | A | 1 | | 38 | 304 | |
| Iron, Fe | mg | 4.55 | 0.066 | 15 | A | 1 | | 1.29 | 10.33 | |
| Magnesium, Mg | mg | 11 | | 3 | A | 1 | | 3 | 25 | |
| Phosphorus, P | mg | 420 | | 3 | A | 1 | | 119 | 953 | |
| Potassium, K | mg | 121 | | 3 | A | 1 | | 34 | 274 | |
| Sodium, Na | mg | 67 | 0.860 | 15 | A | 1 | | 19 | 151 | |
| Zinc, Zn | mg | 3.17 | | 3 | A | 1 | | 0.90 | 7.20 | |
| Copper, Cu | mg | 0.000 | | 3 | A | 1 | | 0.000 | 0.000 | |
| Manganese, Mn | mg | 0.078 | | 3 | A | 1 | | 0.022 | 0.177 | |
| Selenium, Se | µg | 56.4 | | 3 | A | 1 | | 16.0 | 128.1 | |

FIG. 136A

| Vitamins: | | | | | | | | |
|---|---|---|---|---|---|---|---|---|
| Vitamin C, total ascorbic acid | mg | 0.0 | 0.000 | 15 | A | 1 | 0.0 | 0.0 |
| Thiamin | mg | 0.223 | | 3 | A | 1 | 0.063 | 0.507 |
| Riboflavin | mg | 0.563 | | 3 | A | 1 | 0.160 | 1.279 |
| Niacin | mg | 0.031 | | 3 | A | 1 | 0.009 | 0.070 |
| Pantothenic acid | mg | 3.437 | | 3 | A | 1 | 0.974 | 7.801 |
| Vitamin B-6 | mg | 0.412 | 0.007 | 15 | A | 1 | 0.117 | 0.934 |
| Folate, total | µg | 151 | | 3 | A | 1 | 43 | 342 |
| Folic acid | µg | 0 | | 0 | Z | 7 | 0 | 0 |
| Folate, food | µg | 151 | | 3 | A | 1 | 43 | 342 |
| Folate, DFE | µg | 151 | | 0 | NC | 4 | 43 | 342 |
| Choline, total | mg | 6393 | | 3 | A | 1 | 181.3 | 1451.3 |
| Betaine | mg | | | | | | | |
| Vitamin B-12 | µg | 1.90 | 0.259 | 15 | A | 1 | 0.54 | 4.32 |
| Vitamin B-12, added | µg | 0.00 | | 0 | Z | 7 | 0.00 | 0.00 |
| Vitamin A, RAE | µg | 419 | | 0 | AS | 1 | 119 | 950 |
| Retinol | µg | 419 | 12.742 | 15 | A | 1 | 119 | 950 |
| Carotene, beta | µg | 10 | | 3 | A | 1 | 3 | 23 |
| Carotene, alpha | µg | 36 | | 0 | BFFR | 4 | 10 | 83 |
| Cryptoxanthin, beta | µg | 32 | | 0 | BFFR | 4 | 9 | 73 |
| Vitamin A, IU | IU | 1469 | | 0 | NC | 4 | 417 | 3335 |
| Lycopene | µg | 0 | | 0 | BFFR | 4 | 0 | 0 |
| Lutein + zeaxanthin | µg | 904 | | 3 | A | 1 | 256 | 2051 |
| Vitamin E (alpha-tocopherol) | mg | 2.24 | | 3 | A | 1 | 0.64 | 5.09 |
| Vitamin E, added | mg | 0.00 | | 0 | Z | 7 | 0.00 | 0.00 |
| Tocopherol, beta | mg | | | | | | | |
| Tocopherol, gamma | mg | | | | | | | |
| Tocopherol, delta | mg | | | | | | | |
| Tocotrienol, alpha | mg | | | | | | | |
| Tocotrienol, beta | mg | | | | | | | |
| Tocotrienol, gamma | mg | | | | | | | |

Egg, yolk, raw, frozen, pasteurized

| Nutrients and Units | Amount in 100 grams of edible portion | | | | | | Amount in edible portion of common measure of food | | |
|---|---|---|---|---|---|---|---|---|---|
| | Mean | Std. Error | Number of Data Points | Deriv Code | Source Code | Confi- dence Code | Measure 1 | Measure 2 | Measure 3 |
| Tocotrienol, delta _____ mg | | | | | | | | | |
| Vitamin D (D2 + D3) _____ µg | 6.0 | | 20 | AS | 1 | | 1.7 | 13.5 | |
| Vitamin D _____ IU | 238 | | 0 | NR | 4 | | 68 | 541 | |
| Vitamin K (phylloquinone) _____ µg | 0.7 | | 0 | BFFR | 4 | | 0.2 | 1.5 | |
| Dihydrophylloquinone _____ µg | | | | | | | | | |
| Menaquinone-4 _____ µg | | | | | | | | | |
| Lipids: | | | | | | | | | |
| Fatty acids, total saturated _____ g | 8.615 | | 0 | NC | 4 | | 2.442 | 19.556 | |
| 4:0 _____ g | 0.000 | 0.000 | 15 | A | 1 | | 0.000 | 0.000 | |
| 6:0 _____ g | 0.000 | 0.000 | 15 | A | 1 | | 0.000 | 0.000 | |
| 8:0 _____ g | 0.000 | 0.000 | 15 | A | 1 | | 0.000 | 0.000 | |
| 10:0 _____ g | 0.000 | 0.000 | 15 | A | 1 | | 0.000 | 0.000 | |
| 12:0 _____ g | 0.000 | 0.000 | 15 | A | 1 | | 0.000 | 0.000 | |
| 13:0 _____ g | | | | | | | | | |
| 14:0 _____ g | 0.083 | 0.001 | 15 | A | 1 | | 0.024 | 0.189 | |
| 15:0 _____ g | 0.022 | 0.000 | 15 | A | 1 | | 0.006 | 0.050 | |
| 16:0 _____ g | 6.211 | 0.038 | 15 | A | 1 | | 1.761 | 14.078 | |
| 17:0 _____ g | 0.051 | 0.001 | 15 | A | 1 | | 0.014 | 0.115 | |
| 18:0 _____ g | 2.249 | 0.031 | 15 | A | 1 | | 0.637 | 5.104 | |
| 20:0 _____ g | 0.000 | 0.000 | 15 | A | 1 | | 0.000 | 0.000 | |
| 22:0 _____ g | 0.000 | 0.000 | 15 | A | 1 | | 0.000 | 0.000 | |
| 24:0 _____ g | 0.000 | 0.000 | 15 | A | 1 | | 0.000 | 0.000 | |
| Fatty acids, total trans-monoenoic _____ g | 9.956 | | 0 | NC | 4 | | 2.823 | 22.600 | |
| 14:1 _____ g | 0.022 | 0.000 | 15 | A | 1 | | 0.006 | 0.050 | |
| 15:1 _____ g | 0.000 | 0.000 | 15 | A | 1 | | 0.000 | 0.000 | |
| 16:1 undifferentiated _____ g | 0.545 | 0.023 | 15 | A | 1 | | 0.155 | 1.238 | |
| 17:1 _____ g | 0.000 | 0.000 | 15 | A | 1 | | 0.000 | 0.000 | |
| 18:1 undifferentiated _____ g | 9.331 | 0.142 | 15 | AS | 1 | | 2.645 | 21.181 | |
| 18:1 c _____ g | 9.261 | 0.144 | 15 | A | 1 | | 2.626 | 21.023 | |
| 18:1 t _____ g | 0.069 | 0.005 | 15 | A | 1 | | 0.020 | 0.158 | |
| 18:1-11t (18:1g-7) _____ g | | | | | | | | | |
| 20:1 _____ g | 0.058 | 0.001 | 15 | A | 1 | | 0.016 | 0.131 | |
| 22:1 undifferentiated _____ g | 0.000 | 0.000 | 15 | A | 1 | | 0.000 | 0.000 | |
| 24:1 c _____ g | | | | | | | | | |

FIG. 137A

| | | | | | | | |
|---|---|---|---|---|---|---|---|
| Fatty acids, total polyunsaturated | g | 4.827 | | 0 | NC | 4 | 1.368 | 10.957 |
| 18:2 undifferentiated | g | 4.009 | 0.175 | 15 | AS | 1 | 1.137 | 9.100 |
| 18:2 n-6 c,c | g | 3.980 | 0.174 | 15 | A | 1 | 1.128 | 9.035 |
| 18:2 CLAs | g | | | | | | | |
| 18:2 t,t | g | 0.029 | 0.003 | 15 | A | 1 | 0.008 | 0.066 |
| 18:2 i | g | | | | | | | |
| 18:2 t not further defined | g | | | | | | | |
| 18:3 undifferentiated | g | 0.124 | 0.010 | 15 | AS | 1 | 0.035 | 0.281 |
| 18:3 n-3 c,c,c (ALA) | g | 0.093 | 0.011 | 15 | A | 1 | 0.026 | 0.210 |
| 18:3 n-6 c,c,c | g | 0.031 | 0.002 | 15 | A | 1 | 0.009 | 0.071 |
| 18:3i | g | 0.000 | 0.000 | 15 | A | 1 | 0.000 | 0.000 |
| 18:4 | g | 0.000 | 0.000 | 15 | A | 1 | 0.000 | 0.000 |
| 20:2 n-6 c,c | g | 0.047 | 0.002 | 15 | A | 1 | 0.013 | 0.107 |
| 20:3 undifferentiated | g | 0.000 | 0.000 | 15 | A | 1 | 0.000 | 0.000 |
| 20:3 n-3 | g | | | | | | | |
| 20:3 n-6 | g | | | | | | | |
| 20:4 undifferentiated | g | 0.490 | 0.011 | 15 | A | 1 | 0.139 | 1.112 |
| 20:4 n-6 | g | | | | | | | |
| 20:5 n-3 (EPA) | g | 0.000 | 0.000 | 15 | A | 1 | 0.000 | 0.000 |
| 21:5 | g | | | | | | | |
| 22:4 | g | | | | | | | |
| 22:5 n-3 (DPA) | g | 0.022 | 0.000 | 15 | A | 1 | 0.006 | 0.050 |
| 22:6 n-3 (DHA) | g | 0.135 | 0.005 | 15 | A | 1 | 0.038 | 0.307 |
| Fatty acids, total trans | g | 0.098 | | 0 | NC | 4 | 0.028 | 0.224 |
| Fatty acids, total trans-monoenoic | g | 0.069 | | 0 | NC | 4 | 0.020 | 0.158 |
| Fatty acids, total trans-polyenoic | g | 0.029 | | 0 | NC | 4 | 0.008 | 0.066 |
| Cholesterol | mg | 991 | | 3 | A | 1 | 281 | 2250 |
| Phytosterols | mg | | | | | | | |
| Amino Acids: | | | | | | | | |

Egg, yolk, raw, frozen, pasteurized

| Nutrients and Units | Amount in 100 grams of edible portion | | | | | | Amount in edible portion of common measure of food | | |
|---|---|---|---|---|---|---|---|---|---|
| | Mean | Std. Error | Number of Data Points | Deriv Code | Source Code | Confidence Code | Measure 1 | Measure 2 | Measure 3 |
| Tryptophan _____ g | 0.223 | | 0 | A | 1 | | 0.063 | 0.506 | |
| Threonine _____ g | 0.706 | | 0 | A | 1 | | 0.200 | 1.603 | |
| Isoleucine _____ g | 0.780 | | 0 | A | 1 | | 0.221 | 1.771 | |
| Leucine _____ g | 1.351 | | 0 | A | 1 | | 0.383 | 3.067 | |
| Lysin _____ g | 1.182 | | 0 | A | 1 | | 0.335 | 2.684 | |
| Methionine _____ g | 0.375 | | 0 | A | 1 | | 0.106 | 0.852 | |
| Crystine _____ g | 0.274 | | 0 | A | 1 | | 0.078 | 0.621 | |
| Phenylalnine _____ g | 0.689 | | 0 | A | 1 | | 0.195 | 1.564 | |
| Tyrosine _____ g | 0.682 | | 0 | A | 1 | | 0.193 | 1.549 | |
| Valine _____ g | 0.908 | | 0 | A | 1 | | 0.258 | 2.062 | |
| Arginine _____ g | 1.091 | | 0 | A | 1 | | 0.309 | 2.476 | |
| Histidine _____ g | 0.399 | | 0 | A | 1 | | 0.113 | 0.905 | |
| Alanine _____ g | 0.811 | | 0 | A | 1 | | 0.230 | 1.840 | |
| Aspartic acid _____ g | 1.503 | | 0 | A | 1 | | 0.426 | 3.413 | |
| Glutamic acid _____ g | 1.942 | | 0 | A | 1 | | 0.551 | 4.409 | |
| Glycine _____ g | 0.476 | | 0 | A | 1 | | 0.135 | 1.081 | |
| Proline _____ g | 0.615 | | 0 | A | 1 | | 0.174 | 1.395 | |
| Serine _____ g | 1.301 | | 0 | A | 1 | | 0.369 | 2.952 | |
| Hydroxyproline _____ g | | | | | | | | | |
| Others: | | | | | | | | | |
| Alcohol, ethyl _____ g | 0.0 | 0.000 | 0 | | 7 | | 0.0 | 0.0 | |
| Caffeine _____ mg | 0 | 0.000 | 0 | X | 7 | | 0 | 0 | |
| Theobromine _____ mg | 0 | 0.000 | 0 | X | 7 | | 0 | 0 | |

Blanks in the Mean column indicate lack of reliable data. The Number of Data Points column is the number of analyses upon which the mean is based. Number of Data Points of zero indicates the mean was either calculated (as for Energy) or estimated, usually from a recipe, another form of the same food, or similar food.

Common Measures:
Measure 1 = 28.35g; 1oz
Measure 2 = 227g; .5lb

Calories Factors: Protein             Fat             Carbohydrate

Food Group: 01 Dairy and Egg Products

Figure 142:
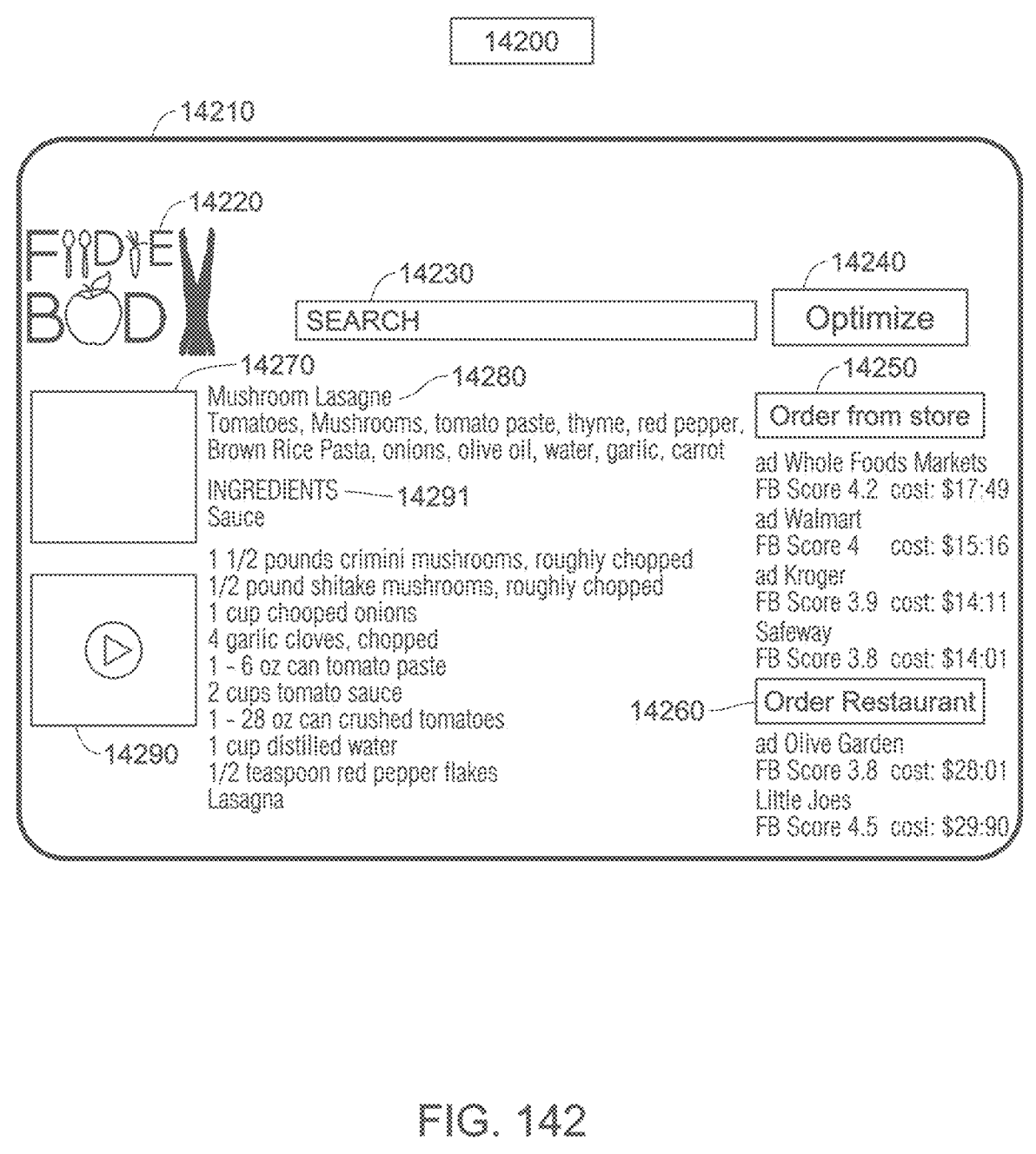

FOODIE BODY

14230
SEARCH

14240
Optimize

14270

14280
Mushroom Lasagne
Tomatoes, Mushrooms, tomato paste, thyme, red pepper,
Brown Rice Pasta, onions, olive oil, water, garlic, carrot 14250
Order from store ad Whole Foods Markets
FB Score 4.2  cost: $17.49
ad Walmart
FB Score 4    cost: $15.16
ad Kroger
FB Score 3.9  cost: $14.11
Safeway
FB Score 3.8  cost: $14.01

INGREDIENTS ——— 14291
Sauce 1 1/2 pounds crimini mushrooms, roughly chopped
1/2 pound shitake mushrooms, roughly chopped
1 cup chooped onions
4 garlic cloves, chopped
1 - 6 oz can tomato paste
2 cups tomato sauce
1 - 28 oz can crushed tomatoes
1 cup distilled water
1/2 teaspoon red pepper flakes
Lasagna

14260

14290

Order Restaurant ad Olive Garden
FB Score 3.8  cost: $28.01
Little Joes
FB Score 4.5  cost: $29.90

14910 — HEALTHY A-BETA

14920 — HEALTHY TAU

14930 — ALZHEIMER'S A-BETA

14940 — ALZHEIMER'S TAU

14950

$Biomarker = Beta\ Amyloid\ Plaques_i = 141.76 + 63.46X_i - 12.96X_i^2 + 0.93X_i^3$

14960

$Biomarker = hyperphosphoylated\ protein\ Tau_i = 11.76 + 66.6X_i - 1.21X_i^2 + 0.32X_i^3$

14970

$Biomarker = Neurofibrillary\ Tangles_i = 8.88 + 15.47X_i - 2.06X_i^2 + 0.10X_i^3$

14980

$Biomarker = ApoE3\ Beta\ Amyloid\ Plaques_i = 1.2 + \delta_0 + 63.46X_i - 12.96X_i^2 + 0.93X_i^3$ 15000
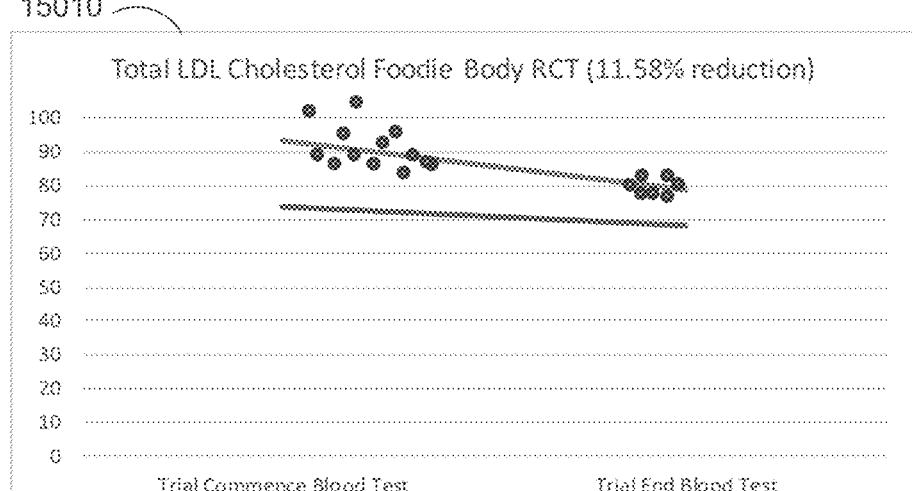
15010
15011
$$Biomarker = Low\ Density\ Lipoprotein\ (LDL)_i = -1.2 lnX_i + 140 + \delta_0$$
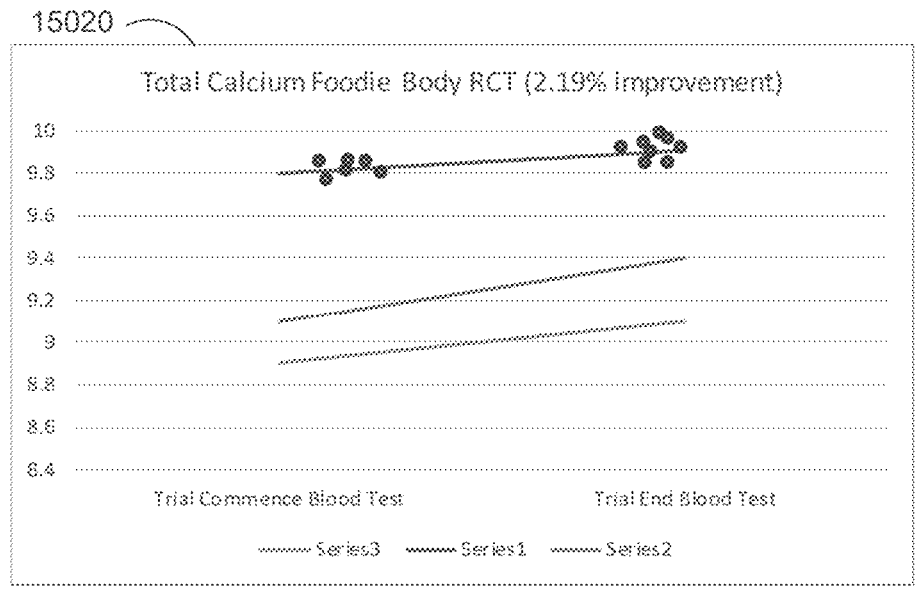
15020
15021
$$Biomarker = Calcium_i = 1.3 lnX_i + 8.8$$
FIG. 150

15100

15110

15120

Figure 157:
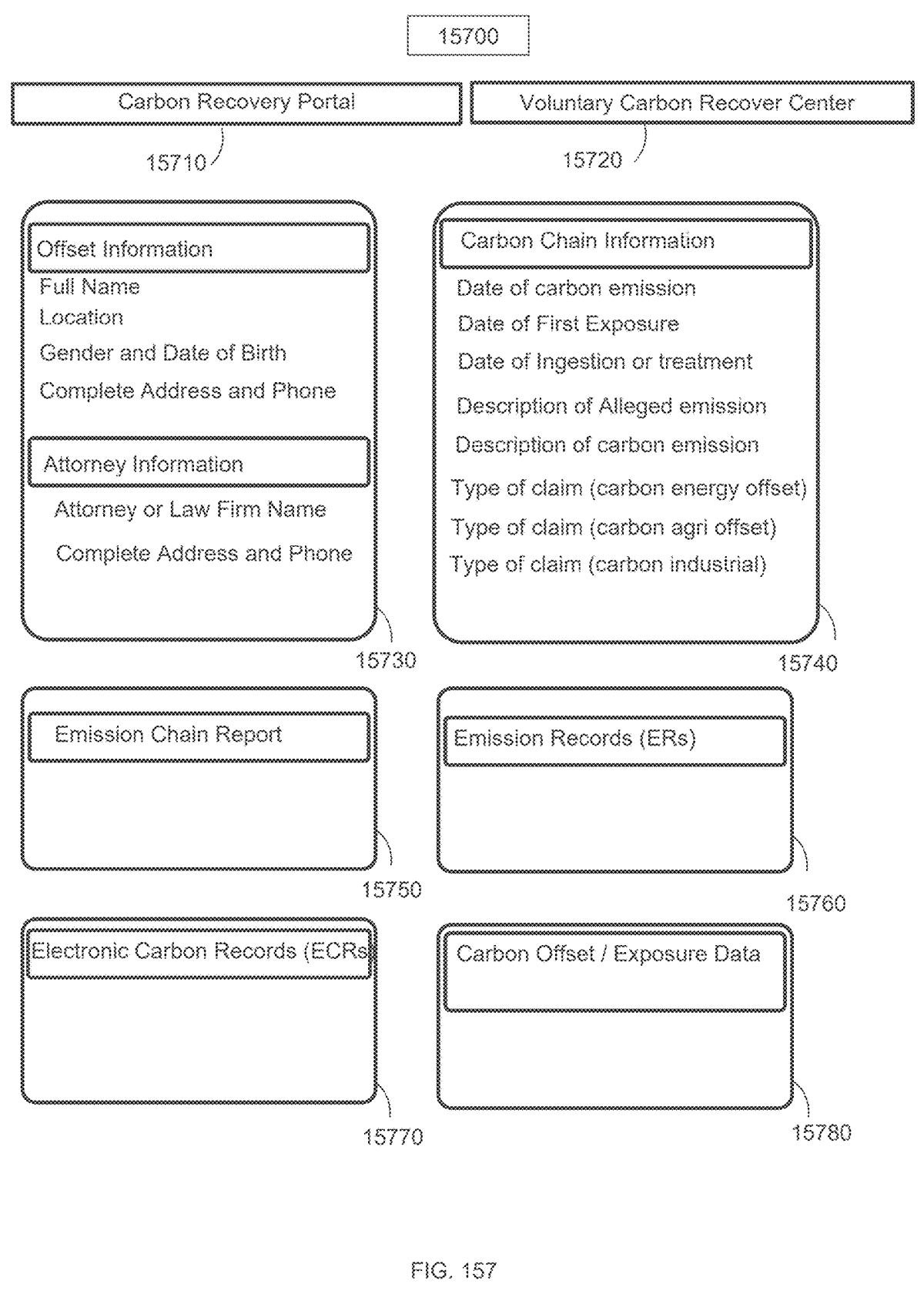

15700

Carbon Recovery Portal

15710

Voluntary Carbon Recover Center

15720

Offset Information

Full Name

Location

Gender and Date of Birth

Complete Address and Phone

Attorney Information

Attorney or Law Firm Name

Complete Address and Phone

15730

Carbon Chain Information

Date of carbon emission

Date of First Exposure

Date of Ingestion or treatment

Description of Alleged emission

Description of carbon emission

Type of claim (carbon energy offset)

Type of claim (carbon agri offset)

Type of claim (carbon industrial)

15740

Emission Chain Report

15750

Emission Records (ERs)

15760

Electronic Carbon Records (ECRs)

15770

Carbon Offset / Exposure Data

START

SELECT AN INITIAL N-DIMENSIONAL VECTOR $p_0$

COMPUTE AN APPROXIMATION $p_n$ TO A STEADY STATE PROBABILITY $P_\infty$ IN ACCORDANCE WITH THE EQUATION $p_n = A^n p_0$ DETERMINE A RANK $r[k]$ FOR NODE k from A $k^{th}$ COMPONENT OF $p_n$

END

Figure 160:
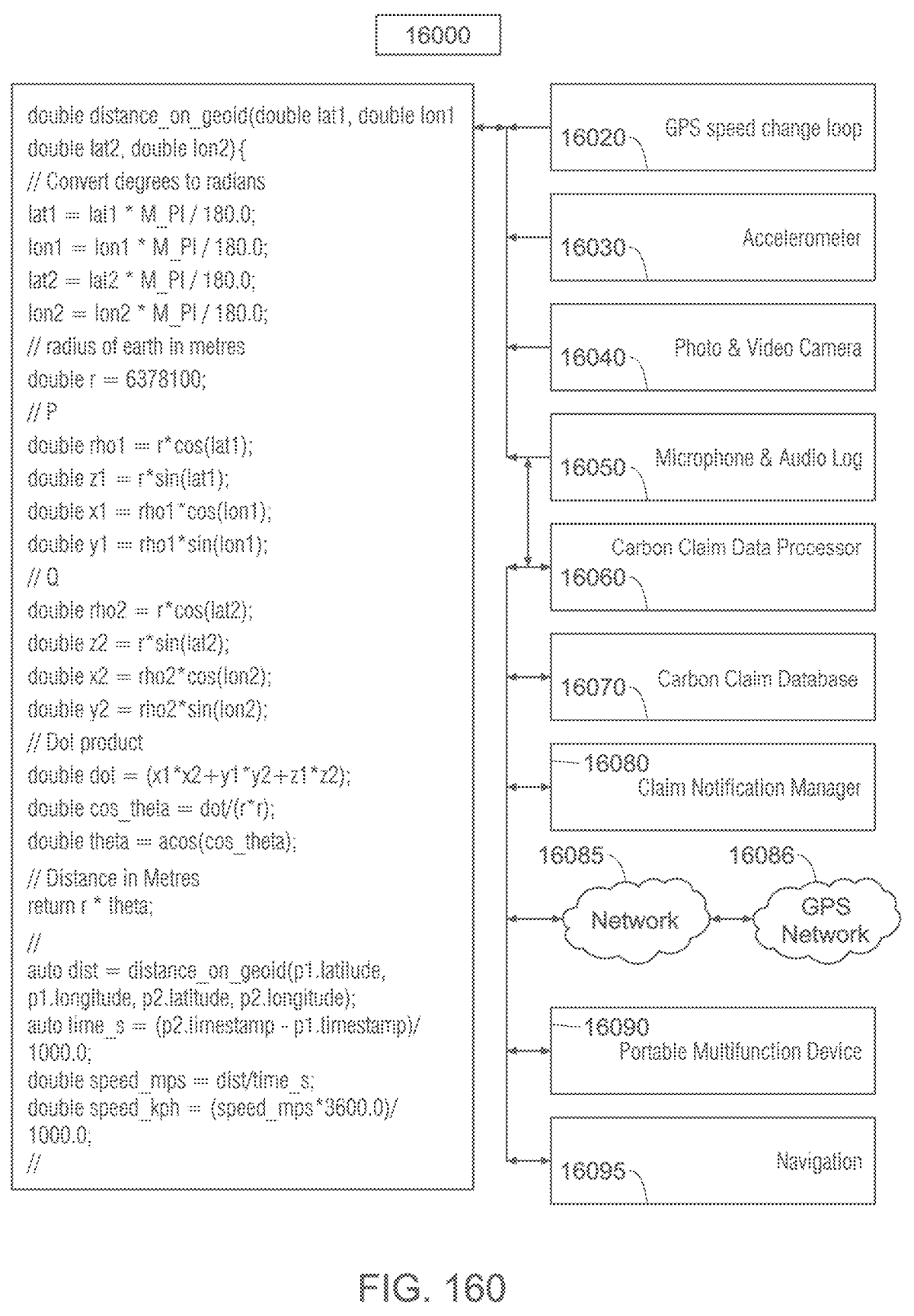

16000

```
double distance_on_geoid(double lat1, double lon1
double lat2, double lon2) {
// Convert degrees to radians
lat1 = lat1 * M_PI / 180.0;
lon1 = lon1 * M_PI / 180.0;
lat2 = lat2 * M_PI / 180.0;
lon2 = lon2 * M_PI / 180.0;
// radius of earth in metres
double r = 6378100;
// P
double rho1 = r*cos(lat1);
double z1 = r*sin(lat1);
double x1 = rho1*cos(lon1);
double y1 = rho1*sin(lon1);
// Q
double rho2 = r*cos(lat2);
double z2 = r*sin(lat2);
double x2 = rho2*cos(lon2);
double y2 = rho2*sin(lon2);
// Dot product
double dot = (x1*x2+y1*y2+z1*z2);
double cos_theta = dot/(r*r);
double theta = acos(cos_theta);
// Distance in Metres
return r * theta;
//
auto dist = distance_on_geoid(p1.latitude,
p1.longitude, p2.latitude, p2.longitude);
auto time_s = (p2.timestamp - p1.timestamp)/
1000.0;
double speed_mps = dist/time_s;
double speed_kph = (speed_mps*3600.0)/
1000.0;
//
```

16020 — GPS speed change loop

16030 — Accelerometer

16040 — Photo & Video Camera

16050 — Microphone & Audio Log

16060 — Carbon Claim Data Processor

16070 — Carbon Claim Database

16080 — Claim Notification Manager

16085 — Network

16086 — GPS Network

16090 — Portable Multifunction Device

16095 — Navigation

16110 — RECEIVE EMISSIONS ATTRIBUTE DATA

16120 — RECEIVE EVIDENCE DATA

16130 — DETERMINE EMISSIONS OUTPUT DATA

16140 — TRANSMIT EMISSIONS OUTPUT DATA TO ONE OR MORE DISTRIBUTED LEDGERS

16150 — GENERATE EMISSIONS UNITS

16160 — PROVIDE EMISSIONS MARKET PLATFORM

SYSTEM AND METHOD FOR TRADING EMISSIONS UNITS

CROSS-REFERENCE TO RELATED APPLICATIONS

This application claims the benefit of U.S. provisional patent application Ser. No. 63/290,153, filed Dec. 16, 2021 and titled CARBON BLOCKCHAIN CLAIM EXCHANGE DEVICE, the entire disclosure of which is herein incorporated by reference.

This application is a continuation-in-part of each of the following: U.S. patent application Ser. No. 18/075,351, filed 2022 Dec. 5, which claims the benefit of and priority to U.S. Patent Application No. 63/286,460, filed 2021 Dec. 6; U.S. patent application Ser. No. 17/732,487, filed 2022 Apr. 28, which claims the benefit of and priority to U.S. Patent Application No. 63/181,866, filed 2021 Apr. 29; Patent Application Number U.S. Ser. No. 17/576,861, filed 2022 Jan. 14, which claims the benefit of and priority to U.S. Patent Application No. 63/138,753, filed 2021 Jan. 18; U.S. patent application Ser. No. 17/566,876, filed 2021 Dec. 31, which claims the benefit of and priority to U.S. Patent Application No. 63/133,163, filed 2020 Dec. 31; U.S. patent application Ser. No. 17/375,914, filed 2021 Jul. 14, which claims the benefit of and priority to U.S. Patent Application No. 63/052,159, filed 2020 Jul. 15; Patent Application Number US 147/373679, filed 2021 Jul. 12, which claims the benefit of and priority to U.S. Patent Application No. 63/051,373, filed 2020 Jul. 13; U.S. patent application Ser. No. 17/358,429, filed 2021 Jun. 25, which claims the benefit of and priority to U.S. Patent Application No. 63/044,997, filed 2020 Jun. 26; U.S. patent application Ser. No. 17/349, 829, filed 2021 Jun. 16, which claims the benefit of and priority to U.S. Patent Application No. 63/039,918, filed 2020 Jun. 16; U.S. patent application Ser. No. 17/324,051, filed 2021 May 18, which claims the benefit of and priority to U.S. Patent Application No. 63/027,344, filed 2020 May 19; U.S. patent application Ser. No. 17/187,792, filed 2021 Feb. 27, which claims the benefit of and priority to U.S. Patent Application No. 62/983,458, filed 2020 Feb. 28; Patent Application Number U.S. Ser. No. 17/178,174, filed 2021 Feb. 17, which claims the benefit of and priority to U.S. Patent Application No. 62/977,559, filed 2020 Feb. 17; U.S. patent application Ser. No. 17/175,689, filed 2021 Feb. 14, which claims the benefit of and priority to U.S. Patent Application No. 62/977,225, filed 2020 Feb. 15; U.S. patent application Ser. No. 17/165,813, filed 2021 Feb. 2, which claims the benefit of and priority to U.S. Patent Application No. 62/969,301, filed 2020 Feb. 3; Patent Application Number U.S. Ser. No. 17/082,254, filed 2020 Oct. 28, which claims the benefit of and priority to U.S. Patent Application No. 62/927,081, filed 2019 Oct. 28; U.S. patent application Ser. No. 17/082,249, filed 2020 Oct. 28, which claims the benefit of and priority to U.S. Patent Application No. 62/927,025, filed 2019 Oct. 28; and U.S. patent application Ser. No. 17/069,597, filed 2020 Oct. 13, which claims the benefit of and priority to U.S. Patent Application No. 62/914,427 filed 2019 Oct. 12. Each of these applications is incorporated herein by reference in their entirety.

This application is also a continuation-in-part of each of the following: Patent Application Number U.S. Ser. No. 17/403,826, filed 2021 Aug. 16, which is a continuation of U.S. patent application Ser. No. 16/589,229, filed 2019 Oct. 1; U.S. patent application Ser. No. 17/976,738, filed 2022 Oct. 28, which is a continuation of U.S. patent application Ser. No. 16/556,838, filed 2019 Aug. 30; Patent Application Number U.S. Ser. No. 16/397,685, filed 2019 Apr. 29; U.S. patent application Ser. No. 16/380,771, filed 2019 Apr. 10; U.S. patent application Ser. No. 16/359,841, filed 2019 Mar. 20; U.S. patent application Ser. No. 16/357,241, filed 2019 Mar. 18; U.S. patent application Ser. No. 17/510,318, filed 2021 Oct. 25, which is a continuation of U.S. patent application Ser. No. 16/293,712, filed 2019 Mar. 6, now Patent Number U.S. Ser. No. 11/157,852; U.S. patent application Ser. No. 17/493,455, filed 2021 Oct. 4, which is a continuation of U.S. patent application Ser. No. 16/290,278, filed 2019 Mar. 1, now Patent Number U.S. Ser. No. 11/138,661; Patent Application Number U.S. Ser. No. 17/567,686, filed 2022 Jan. 3, which is a continuation of Patent Application Number U.S. Ser. No. 16/274,490, filed 2019 Feb. 13, now Patent Number U.S. Pat. No. 11,215,466, which is a continuation-in-part of U.S. patent application Ser. No. 16/258, 658, filed 2019 Jan. 27, now Patent Number U.S. Ser. No. 11/035,682; U.S. patent application Ser. No. 17/541,080, filed 2021 Dec. 2, which is a continuation of U.S. patent application Ser. No. 16/257,032, filed 2019 Jan. 24; Patent Application Number U.S. Ser. No. 17/555,050, filed 2021 Dec. 17, which is a continuation of U.S. patent application Ser. No. 16/242,981, filed 2019 Jan. 8; U.S. patent application Ser. No. 16/242,967, filed 2019 Jan. 8; Patent Application Number U.S. Ser. No. 16/239,485, filed 2019 Jan. 3; U.S. patent application Ser. No. 16/183,647, filed 2018 Nov. 7; U.S. patent application Ser. No. 16/167,525, filed 2018 Oct. 22; Patent Application Number U.S. Ser. No. 15/877, 393, filed 2018 Jan. 23; U.S. patent application Ser. No. 15/484,059, filed 2017 Apr. 10; and U.S. patent application Ser. No. 17/493,432, filed 2021 Oct. 4, which is a continuation of Patent Application Number U.S. Ser. No. 15/266, 326, filed 2016 Sep. 15, now Patent Number U.S. Ser. No. 11/138,827. Each of these applications is incorporated herein by reference in their entirety.

BACKGROUND OF THE INVENTION

The following descriptions and examples are not admitted as prior art by virtue of their inclusion within this section.

Various entities (e.g., individuals, corporations, and government agencies) have become increasingly concerned with the effects of pollution on the environment, such as the impact of emissions with respect to climate change. Emissions may refer to gases that are released into the atmosphere, including emissions that can be linked to human activity. Such emissions may include greenhouse gases (e.g., carbon dioxide, methane, nitrous oxide, hydrofluorocarbons, perfluorocarbons, sulfur hexafluoride, and/or ozone), sulfur dioxide, volatile organic compounds, and/or any other pollutant known in the art.

In response to the concerns over climate change, a number of market-based approaches have been developed in order to control pollution, such as by providing economic incentives for reducing the emissions of pollutants. As is known in the art, these market-based approaches may include emissions trading schemes, carbon pricing, carbon markets, cap and trade, carbon credit systems, and/or the like. Assuring compliance with a market-based scheme may require measuring emissions, reporting the measurements, verification of the measurements. However, some market-based schemes have been criticized for lacking transparency with respect to the measurement and report processes and lacking proper verification of the measurements, where such failures may lead to manipulation of such schemes and fraud.

SUMMARY

Described herein are implementations of various technologies relating to a system and method for trading emissions units. In one implementation, a method may include receiving emissions attribute data from a plurality of users for a plurality of emissions objects, where a respective emissions object is associated with a respective emissions output, where the respective emissions object is associated with a respective user, and where the emissions attribute data for the respective emissions object includes data corresponding to an object type for the respective emissions object. The method may also include receiving evidence data from the plurality of users for the plurality of emissions objects, where the evidence data from the respective user for the respective emissions object may include location data determined using a respective device of the respective user, where the location data is associated with the respective emissions object, and where the respective device is configured to transmit the evidence data to one or more distributed ledgers. The method may further include determining emissions output data for the plurality of emissions objects based on the emissions attribute data and the evidence data, where the emissions output data for the respective emissions object includes data corresponding to the respective emissions output. The method may additionally include transmitting the emissions output data to the one or more distributed ledgers. The method may also include generating a plurality of emissions units for the plurality of users based on the emissions output data, where a respective emissions unit for the respective user corresponds to the respective emissions output. The method may further include providing an emissions market platform to the plurality of users for trading the plurality of emissions units.

In another implementation, a computing system may include one or more processors and at least one memory. The at least one memory may include program instructions executable by the one or more processors to receive emissions attribute data from a plurality of users for a plurality of emissions objects, where a respective emissions object is associated with a respective emissions output, where the respective emissions object is associated with a respective user, and where the emissions attribute data for the respective emissions object comprises data corresponding to an object type for the respective emissions object. The at least one memory may also include program instructions executable by the one or more processors to receive evidence data from the plurality of users for the plurality of emissions objects, where the evidence data from the respective user for the respective emissions object includes location data determined using a respective device of the respective user, where the location data is associated with the respective emissions object, and where the respective device is configured to transmit the evidence data to one or more distributed ledgers. The at least one memory may further include program instructions executable by the one or more processors to determine emissions output data for the plurality of emissions objects based on the emissions attribute data and the evidence data, where the emissions output data for the respective emissions object includes data corresponding to the respective emissions output. The at least one memory may additionally include program instructions executable by the one or more processors to transmit the emissions output data to the one or more distributed ledgers. The at least one memory may also include program instructions executable by the one or more processors to generate a plurality of emissions units for the plurality of users based on the emissions output data, where a respective emissions unit for the respective user corresponds to the respective emissions output. The at least one memory may further include program instructions executable by the one or more processors to provide an emissions market platform to the plurality of users for trading the plurality of emissions units.

In yet another implementation, a non-transitory computer-readable medium having stored thereon a plurality of computer-executable instructions which, when executed by a computer, may cause the computer to receive emissions attribute data from a plurality of users for a plurality of emissions objects, where a respective emissions object is associated with a respective emissions output, where the respective emissions object is associated with a respective user, and where the emissions attribute data for the respective emissions object comprises data corresponding to an object type for the respective emissions object. The plurality of computer-executable instructions which, when executed by a computer, may also cause the computer to receive evidence data from the plurality of users for the plurality of emissions objects, where the evidence data from the respective user for the respective emissions object includes location data determined using a respective device of the respective user, where the location data is associated with the respective emissions object, and where the respective device is configured to transmit the evidence data to one or more distributed ledgers. The plurality of computer-executable instructions which, when executed by a computer, may further cause the computer to determine emissions output data for the plurality of emissions objects based on the emissions attribute data and the evidence data, where the emissions output data for the respective emissions object includes data corresponding to the respective emissions output. The plurality of computer-executable instructions which, when executed by a computer, may additionally cause the computer to transmit the emissions output data to the one or more distributed ledgers. The plurality of computer-executable instructions which, when executed by a computer, may also cause the computer to generate a plurality of emissions units for the plurality of users based on the emissions output data, where a respective emissions unit for the respective user corresponds to the respective emissions output. The plurality of computer-executable instructions which, when executed by a computer, may further cause the computer to provide an emissions market platform to the plurality of users for trading the plurality of emissions units.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3 illustrates a user price-time priority queue system in accordance with implementations of various techniques described herein.

FIG. 16 illustrates a flow diagram of a method in accordance with implementations of various techniques described herein.

FIGS. 19-27 illustrate the user interface of a computing device in accordance with implementations of various techniques described herein.

FIGS. 40 and 41 illustrate a configuration module in accordance with implementations of various techniques described herein.

FIGS. 52-84 illustrate a geolocation exchange unit legal transformation in accordance with implementations of various techniques described herein.

FIGS. 85-88 illustrate a flow diagram of legal transformation steps in accordance with implementations of various techniques described herein.

FIG. 116 illustrates a node ranked search engine configuration in accordance with implementations of various techniques described herein.

FIGS. 120A, 120B, 121A, 121B, 122A, 122B, 123A-123C, 124A-124D, 125A-125C, 126A, 126B, 127A, 127B, 128A, 128B, 129A, 129B, 130A, 130B, 131A-131C, 132A, 132B, 133A, 133B, 134A, 134B, and 135 illustrate a ranking formulation configuration in accordance with implementations of various techniques described herein.

FIGS. 136-138 illustrates implant, ingestion, chemical composition data in which the various technologies described herein may be incorporated and practiced.

FIGS. 141-148 illustrate a computing system user interface in which the various technologies described herein may be incorporated and practiced.

FIG. 150 illustrates a low density lipoprotein (LDL) cholesterol output in accordance with implementations of various techniques described herein.

FIG. 157 illustrates a plurality of data sources in which the various technologies described herein may be incorporated and practiced.

FIG. 160 illustrates automated claim generation algorithms and functions for the portable multifunction device in which the various technologies described herein may be incorporated and practiced.

DETAILED DESCRIPTION

Figure 1A:
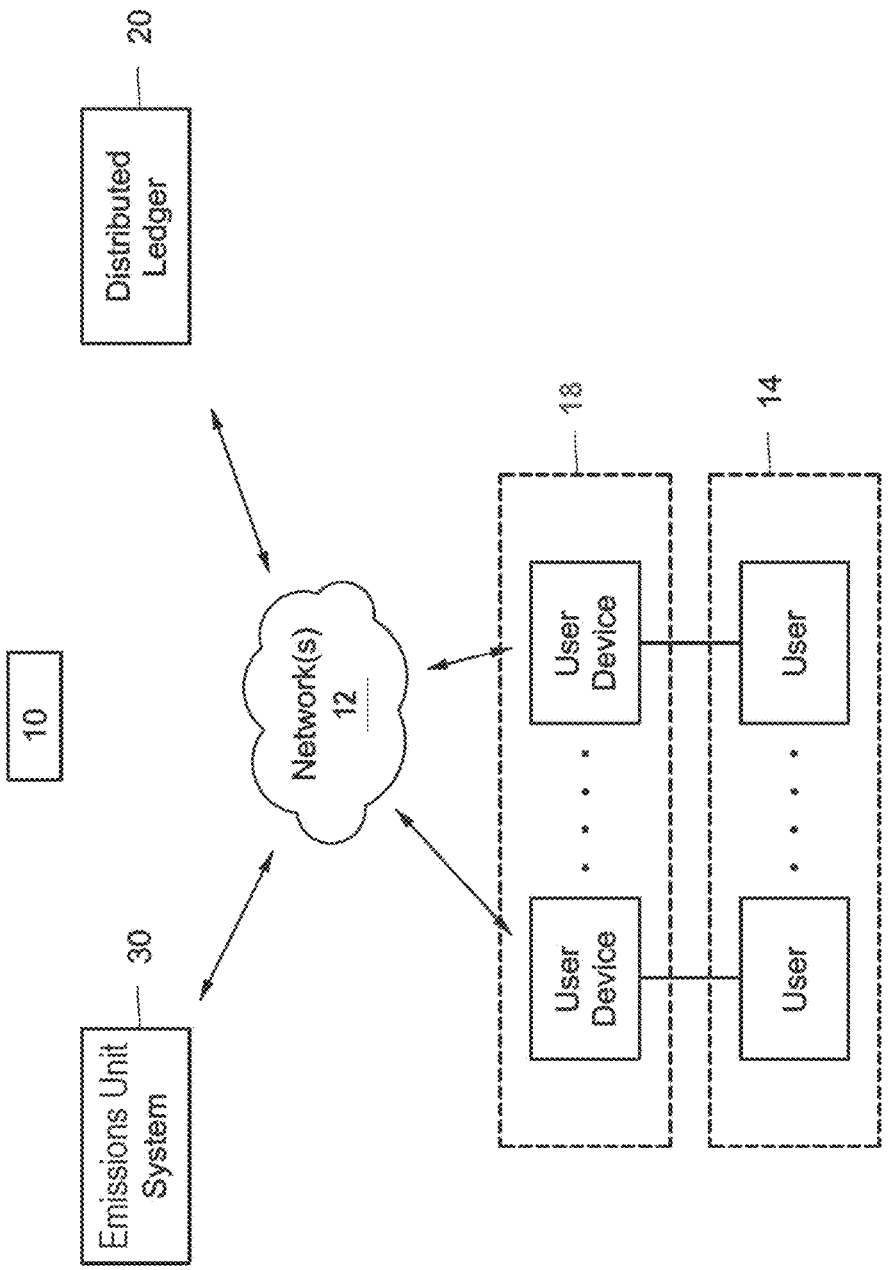
FIGS. 1A and 1B illustrate a schematic diagram of a system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits, and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade, and transact litigation or patent geolocation claim units as a physical or financial forward commodity, security, swap, option, future, or forward. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a," "an," and "the" are intended to also include the plural forms as well, unless the context clearly indicates otherwise. It will also be understood that the term "and/or"

as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A computing device, as described herein, may include any computing implementation known to those skilled in the art, including mobile computing devices. In some implementations, a fixed stationary computing device, a virtual reality headset, a mixed reality headset, an augmented reality headset, or an audio interfaced computer device may be used instead. In another implementation, the computing device may be used in conjunction with a projection computing device. The computing device may be used with or include any device which communicates and integrates the use of one or more of the following: a network; a community route processor; a my route processor; a sequence route processor; a global positioning system (GPS) network; biomarker node ranked instructions; multi-dimension map tile database; symbol map tile database; routing algorithms based on dynamic market inputs; one or more servers; a forward commodity forward market auction database; a security or derivative market auction database; grouping software instructions for hubs; securitization transformations and specifications; travel location servers; game servers; indexing algorithms for emission securities, emission offset securities, emission geolocation unit securities, and/or emission offset geolocation unit securities; forwards, futures, options, swaps, derivatives with various locations; navigation servers; routing sequence algorithms; virtual hub topology methods and systems; transparent open access user interface pricing systems with price time priority queues; blockchain data corresponding to geolocation data and/or Internet of Things (IoT) device data; data associated with a legal claim; facial recognition data; retina scan recognition data; fingerprint recognition or photo recognition data of users for security and identity checks; and/or data relating to algorithms for biomarkers, travel, or other claim blockchain node rankings and constraints. A computing device, as described herein, may utilize a user interface (e.g., a graphical user interface) formatted on mobile or stationary computing devices over various mediums. Such devices may be connected through a network for the purpose of grouping users into virtual hub sequences of community or social network claim objects as a gateway to participating, transacting, and/or trading emission or emission offset and emission or emission offset geolocation units between combinations of virtual hubs as a forward commodity, security, or derivative in an auction.

Various implementations directed to a system and method for trading emissions units will now be described in the following paragraphs with reference to FIGS. 1-162.

As noted above, various entities (e.g., individuals, corporations, and government agencies) have become increasingly concerned with the effects of pollution on the environment, including the effects that emissions may have with respect to climate change. Emissions may refer to gases that are released into the atmosphere, including emissions that can be linked to human activity. Such emissions may include greenhouse gases (e.g., carbon dioxide, methane, nitrous oxide, hydrofluorocarbons, perfluorocarbons, sulfur hexafluoride, and/or ozone), sulfur dioxide, volatile organic compounds, and/or any other pollutant known in the art.

In response to such concerns, a number of market-based approaches have been implemented in order to incentivize the reduction of emissions into the environment. As is known in the art, these market-based approaches may include emissions trading schemes, emissions pricing systems, emissions market systems, cap and trade systems, emissions credit systems, and/or the like. For example, in an emissions credit system, an emissions credit may represent a tradable certificate or permit that represents the right of the owner of the credit to emit a set amount of emissions. An emissions credit may include a carbon credit, a greenhouse gas credit, and/or any other type of credit known in the art. In some instances, a user of the emissions credit system may be able to earn an emissions credit by engaging in one or more activities that reduce an output of emissions and/or enhance the removal of emissions from the atmosphere. A user of the emissions credit system may be an individual, an entity, and/or any other type of user known to those skilled in the art. As is known in the art, an entity may represent a company, an organization, an association, a financial institution, a government agency, and/or the like. In some implementations, the user of the emissions credit system may be an individual associated with an entity, such as an employee of a company.

Activities that reduce an emissions output may include those related to renewable energy, methane abatement, energy efficiency, reforestation, and fuel switching to emissions-neutral fuels or emissions-negative fuels. After earning the emission credit, the user may then be able to utilize the emissions credit to offset direct and/or indirect emissions associated with the user or the user's operations. An emissions credit may be interchangeably referred to herein as an emissions offset, an emissions offset credit, an emissions claim, an emissions offset claim, and/or the like. In some scenarios, the user may choose to sell the emissions credit to a second user, such that the second user may utilize the credit to offset the direct and/or indirect emissions associated with the second user. In particular, users of the system may utilize a platform, an exchange, and/or the like to trade emissions credits. Users of the emissions credit system may choose to earn and/or purchase emissions credits for various reasons, including, but not limited to, the following: to mitigate harmful effects on the environment, to meet an established quota or regulatory limit for emissions, to hedge against future increases to the price of emissions credits, to sell the emissions credits in the future, and/or the like.

As is known in the art, in order to earn an emissions credit, the user's associated activity that reduces an emissions output may need to be verified. In particular, the occurrence of the activity may need to be validated, such as by a third party (e.g., an auditor). Further, the methodology and/or data used to determine the number of emissions credits to be awarded to a user may also need to be verified. However, some emissions credit systems may lack transparency with respect to the verification process, including the process and/or data used to determine the emissions credits. Such a lack of transparency may lead to manipulation of the emissions credits system and/or fraud.

Furthermore, as global warming and emission reduction have increased in importance in the eye of the public, nascent carbon markets have started to develop in ways similar to how oil and commodity markets started fifty or more years ago. In addition, technology and devices have changed significantly since when carbon markets were initially developed. Internet of Things (IoT) device capability may also drastically improve the ability for these beneficial carbon markets to form. However, the challenge of using devices to properly classify and audit carbon exposure is particularly significant, as current regulatory measurement and audit systems are not linked to markets and, therefore, suffer from lack of transparency and ability to measure outcomes. Many conventional carbon interface systems used by the regulatory state regimes rely upon decades-long contracts that may be vulnerable to reversibility, coarse regional measurements producing only approximate baselines, or may have relatively high regulatory expenses. In some scenarios, carbon markets may lack technology and devices to make significant emission reductions, which may expedite funding.

In addition, data may not be organized to associate biomarkers and structured factual data to structured emissions credits, which may then form a structured data blockchain around the emissions credit as an asset. The data blockchain may be further organized by satellite geolocation data and price-time priority queues to make the emissions claims or carbon credits exchange traded. Such queues may not be used, though, because emissions claims or carbon credit systems may typically be considered to be closed, non-transparent, non-substitutable, non-transferrable. Moreover, for such systems, no cost of cover calculations may exist, and the construct for dynamic matching based on emissions claims or carbon credit unit marketplaces may not be understood. Further, in such scenarios, emission or emission offset or physical transformations may not exist for emission claim or carbon credit units to trade as commodities or securities. The lack of transformations may prevent the formation of markets that are based upon market dynamic, transparent market price-based inputs in edge weights or edge values for the block chained emissions claims or carbon credits. In these scenarios, methods and systems may lack the emission or emission offset and physical calculation mechanics for emissions claims or carbon credit units, which may limit analysis and technology system usefulness.

Furthermore, deficiencies in market structure may not allow for the efficient transferability of an underlying emissions claims or carbon credit or required regulatory audit and measurement, which may inhibit flexibility to exchange such an asset and may lead to the development of monopolistic systems. Additionally, devices to record various measurements may be required to be paired and sequenced to make accurate blockchain audits. In one such scenario, the blockchain may be an epidemiological related blockchain (e.g., Epichain®) that may serve as an efficient mechanism for placing epidemiology studies into a blockchain. Further, in some scenarios, while emissions claims or carbon credits may allow for transferability or assignability, they may lack structures which account for force majeure contingencies, remedies for failures, events of default, calculation formulas for termination payments, or independent valuation transformations. In such scenarios, the ability to trade the value of emissions claims or carbon credits may be limited. Therefore, there may be a need to have a portable multifunction device (e.g., a mobile computing device) that may be paired with other devices to measure these activities.

In view of the above, various implementations for trading emissions units using a distributed ledger are disclosed herein. In one implementation, a system may receive emissions attribute data from a plurality of users for a plurality of emissions objects. In particular, a respective emissions object may be associated with a respective user, and the emissions attribute data for the respective emissions object may include data corresponding to an object type for the respective emissions object. In addition, the system may receive evidence data from the plurality of users for the plurality of emissions objects, where the evidence data from the respective user for the respective emissions object may include location data determined using a device of the respective user. Further, the device may be configured to transmit the evidence data to one or more distributed ledgers. The system may also be configured to determine emissions output data for the plurality of emissions objects based on the emissions attribute data and the evidence data. The emissions output data for the respective emissions object may include data corresponding to the respective emissions output. The system may then transmit the emissions output data to the one or more distributed ledgers. Further, the system may generate a plurality of emissions units for the plurality of users based on the emissions output data. The respective emissions unit for the respective user may correspond to the respective emissions output. In addition, the system may provide an emissions market platform to the plurality of users for trading the plurality of emissions units.

In some implementations, various technologies relating to a price time priority queue emissions claims or carbon credit units with associated blockchain data structures on a series of portable multi-function devices may be described herein. In one implementation, a method may include receiving origin location data and destination location data from a first user, where the origin location data corresponds to a geographic origin and the destination location data corresponds to a geographic destination. The method may also include organizing a blockchain of backlinked emission or emission offset events. The method may also include node ranked statistical relationships between emission or emission offset claims based on words, associations, categories, fields, subsets, and supersets. The method may also include organizing emission or emission offset claim data associations, which may include, but is not be limited to, geolocation data of vehicle travel data, non-vehicle travel data, energy transmission data, energy production or consumption data, agriculture data, biomarker data, transaction data, chemical drug data, food data, implant data or other sources of data which may associate with the emission or emission offset claim. The method may also include generating a plurality of routes based on the origin location data and the destination location data associated with the claims. The method may further include determining a plurality of virtual hubs along the plurality of claim or credit synthetic offset locations and/or routes, where the plurality of virtual hubs includes a first virtual hub based on the origin location data and a second virtual hub based on the destination location data. In addition, the method may include receiving market depth data for a geolocation exchange for the one or more geolocation exchange units based on the plurality of emissions claims or carbon credits in the form of forwards, futures, securities, swaps, or other derivatives, where the market depth data includes one or more bid prices and one or more offer prices for the one or more geolocation emission claims or carbon credit exchange units or geolocation exchange units. Geolocation emission claims, carbon credit exchange units, and geolocation exchange units may be used interchangeably herein. The method may also include selecting node ranked travel data, biomarker data, energy transmission data, energy production or consumption data, agriculture data, transaction data, chemical drug data, food data, scientific data or other sources of data, where the data may be associated with the emission or emission offset or emission or emission offset claim for the one or more geolocation exchange units based on an objective function. The objective function uses the associated data with the emission or emission offset or emission or emission offset claim in conjunction with an associated blockchain for the claim or credit asset, the market depth data, or combinations thereof.

In another implementation, a computing system may include one or more processors, and the computing system may also include at least one memory having program instructions executable by the one or more processors to receive origin location data and destination location data from a first user, where the origin location data corresponds to a geographic origin and the destination location data corresponds to a geographic destination. The at least one memory may also have program instructions executable by the one or more processors to generate a plurality of data associations based on the origin location data and the destination location data. The at least one memory may further have program instructions executable by the one or more processors to determine a plurality of virtual hubs along the plurality of routes or location history, where the plurality of virtual hubs includes a first virtual hub based on the origin location data and a second virtual hub based on the destination location data. The at least one memory may additionally have program instructions executable by the one or more processors to receive and determine a blockchain of backlinked emission or emission offset credits, claims, or citations. The at least one memory may additionally have program instructions executable by the one or more processors to receive and determine node ranked statistical relationships between emission or emission offset claims based on words, associations, categories, fields, subsets, and supersets. The at least one memory may additionally have program instructions executable by the one or more processors to receive and determine organizing emission or emission offset claim data associations, where the data associations may include, but are not limited to, the following: geolocation data of vehicle travel data, non-vehicle travel data, energy transmission data, energy production or consumption data, agriculture data, biomarker data, transaction data, chemical drug data, food data, implant data, international emission or emission offset class (section, class, subclass, group), or other sources of data. Such data may be associated with the emission or emission offset claim or credit. The at least one memory may additionally have program instructions executable by the one or more processors to receive emission or emission offset cost and payout data for the plurality of claims for one or more geolocation exchange units, where the one or more geolocation exchange units corresponds to a predetermined node ranked data blockchain with the emission claim or credit, and where the emission claim or carbon credit cost and payout data includes data relating to node ranked claim probabilities and associations, or combinations thereof. In addition, the at least one memory may have program instructions executable by the one or more processors to receive market depth data for a geolocation exchange for the one or more geolocation exchange units based on the plurality of claims, where the market depth data includes one or more bid prices and one or more offer prices for the one or more geolocation exchange units. The at least one memory may also have program instructions executable by the one or more processors to select a ranked claim, ranked pool of claims, or associated node ranked cash flows on the claims for the one or more geolocation exchange units based on an objective function, where the objective function uses the emission or emission offset cost data, the market depth data, and cash flow rating data, or combinations thereof. The at least one memory may also have program instructions executable by the one or more processors to select a ranked claim or ranked pool of claims or credits, where the node ranked cash flows on the claims for the one or more geolocation exchange units may have been rated by a debt, security, or derivative rating agency. Such an agency may include S&P, Fitch, Moody's, and/or other independent rating agencies.

In yet another implementation, a non-transitory computer-readable medium may have stored thereon a plurality of computer-executable instructions which, when executed by a computer, cause the computer to receive origin location data and destination location data from a first user, where the origin location data corresponds to a geographic origin and the destination location data corresponds to a geographic destination. The plurality of computer-executable instructions which, when executed by a computer, may also cause the computer to generate a plurality of emissions claims or carbon credits based on the origin location data and or the destination location data. The plurality of computer-executable instructions which, when executed by a computer, may further cause the computer to determine a plurality of virtual hubs for the plurality of claims, where the plurality of virtual hubs includes a first virtual hub based on the origin location data and a second virtual hub based on the destination location data. The plurality of computer-executable instructions which, when executed by a computer, may additionally cause the computer to receive emission claim or carbon credit cost data for the plurality of routes for one or more geolocation exchange units, where the one or more geolocation exchange units corresponds to a predetermined claim or set of claims from the first virtual hub to the second virtual hub, and where the emission claim or carbon credit cost data includes data relating to geolocation data of vehicle travel data, non-vehicle travel data, energy transmission data, energy production or consumption data, agriculture data, biomarker data, transaction data, chemical drug data, food data, implant data, international emission or emission offset class (section, class, subclass, group) or other sources of data which may associate with the emission or emission offset claim, or combinations thereof. In addition, the plurality of computer-executable instructions which, when executed by a computer, may cause the computer to receive market depth data for a geolocation exchange for the one or more geolocation exchange units based on the plurality of emissions claims or carbon credits, where the market depth data includes one or more bid prices and one or more offer prices for the one or more geolocation exchange units. The plurality of computer-executable instructions which, when executed by a computer, may also cause the computer to select an optimized payout of the plurality of claims for the one or more geolocation exchange units based on an objective function, wherein the objective function uses geolocation data of vehicle travel data, non-vehicle travel data, energy transmission data, energy production or consumption data, agriculture data, biomarker data, transaction data, chemical drug data, food data, implant data, international emission or emission offset class (section, class, subclass, group) or other sources of data which may associate with the emission or emission offset claim or credit, or combinations thereof.

For example, FIG. 1A illustrates a schematic diagram of a system 10 in accordance with implementations of various techniques described herein. The system 100 may include one or more networks 12, a plurality of users 14, a plurality of user devices 18, a distributed ledger 120, and an emissions unit system 30. The user devices 18, the distributed ledger 20, and the emissions unit system 30 may be in communication with one another through the one or more networks 12. The one or more networks 12 may include, but are not limited to, one or more of the following networks: a local area network (LAN), a wide area network (WAN) (e.g., the Internet), a cellular network, a mobile network, a virtual network, and/or any other public and/or private network known in the art capable of supporting communication among two or more of the elements of the system 10. In particular, the one or more networks 12 may be used to implement and/or facilitate any type of wired communication, wireless communication, or both that is known to those skilled in the art.

The users 14 may be similar to one or more of the users discussed above. In particular, the users 14 may include one or more individuals, one or more entities, and/or the like. For example, a user 14 may represent an individual associated with an entity, such as an employee of a company. As shown, each user 14 may own, operate, and/or be associated with one or more of the user devices 18. The user devices 18 may include any electronics device known to those skilled in the art, such as a computing device, a drone device, a reader device, and/or the like. A computing device may include a mobile device, a tablet device, a smartphone, a wearable device, a personal computer, a laptop, a personal digital assistant (PDA), a drone device, and/or any other computing device known to those skilled in the art. Various implementations of a computing device are discussed in further detail in another section.

In addition, a user device 18 may include a satellite navigation receiver (not shown) used to communicate with one or more positioning satellites to determine a location (e.g., longitude, latitude, and/or altitude) of the user device 18 and/or associated time information. The satellite navigation receive may be configured to communicate with any global navigation satellite system (GNSS), including the Global Positioning System (GPS). In another implementation, though not shown in FIG. 1A, a user device 18 may include one or more output devices used to output information to a user of the device 18. In one such implementation, the user device 118 may include one or more presentation units (e.g., a display screen) used to visually output information to a user of the device 18.

In some implementations, a user device 18 may include one or more input devices that are configured to acquire various types of data. In one such implementation, the one or more input devices may include a camera and/or scanner used to acquire image data, a microphone used to acquire audio data, one or more sensors to acquire various sensor data, and/or the like. For example, one or more input devices used to acquire one or more of the following types of data: location data, Internet of things (IoT) data, financial blockchain data, financial transaction data, accelerometer data, gyroscopic data, temperature data, ambient temperature data, magnetic field data, neural sensor data, proximity data, sound wave data, claim expected value data, relative humidity data, International Mobile Equipment Identity (IMEI) device data, ICCID device data, Wi-Wi address data, optical wave data, breathing pattern data, ultrasound data, audio data, video data, photo data, pressure sensor data, photo metadata, video metadata, internet protocol address data, data logs, weather data, traffic data, atmospheric data, advertising data, advertising metadata, supervisory control and data acquisition (SCADA) data, customer relationship management (CRM) data, enterprise resource planning (ERP) data, social network persona data, enterprise asset management (EAM) data, biometric data, pulse data, water meter data, eye movement data, non-vehicle accident data, biomarker data, transaction data, chemical drug data, food data, geographical information system (GIS) data, implant data, patent data, facial recognition data, retina scan recognition data, fingerprint recognition or photo recognition data of users for security and identity checks, and/or data relating to algorithms for biomarkers, travel, or other claim blockchain node rankings and constraints.

In one implementation, the users 14 may, via their respective user devices 16, communicate with the emissions unit system 30 in order to trade one or more emissions units. In one implementation, an emissions unit may correspond to an emissions credit associated with a particular emissions object, attribute data associated with the emissions object, evidence data corresponding to the emissions object, one or more specification transformations, or combinations thereof. Emissions units are further described below. An emissions unit may also hereinafter be referred to as an emissions credit unit, emissions claim unit, an emissions geolocation exchange unit, and/or the like. In some implementations, an emissions unit may correspond to a carbon credit associated with a particular emissions object. In such implementations, the emissions unit may also be referred to as a carbon unit, a carbon credit unit, a carbon claim unit, and/or the like.

As used herein, an emissions object may refer to any good or activity that produces and/or is associated with an emissions output. As is known in the art, a good may represent any tangible or intangible item that is of utility to a user 14, such as a product, a raw material, a resource, a commodity, an asset, a service, a security, a data record, an intermediate good, an output good, and/or the like. Thus, in some implementations, an emissions object may be a good such as an agricultural product, energy capacity, cargo, food, meals, and/or the like. In other implementations, an emissions object may be an activity such as traveling using a vehicle, conducting an online meeting, conducting a telehealth meeting, manufacturing, and/or the like.

As further described below, the emissions unit system 30 may be configured to determine an emissions output associated with an emissions object based on attribute data and/or evidence data associated with the emissions object. In one implementation, a user 14 may utilize a user device 16 to determine attribute data associated with the emissions object, where the attribute data may include data corresponding to an object type. An object type may refer to whether the emissions object corresponds to a particular good (e.g., an agricultural product, energy, cargo or freight, food, meals, and/or the like) or a particular activity (e.g., vehicle transportation, virtual meetings, telehealth, doctor's visits, manufacturing processes, and/or the like). In a further implementation, the attribute data may include data corresponding to an object quantity (e.g., the number of agricultural products), object identification (e.g., an object identifier), user identification (e.g., an identifier for a user associated with the emissions object), and/or the like.

In addition, a user 14 may utilize a user device 16 to determine evidence data associated with the emissions object, where the evidence data may include data used to verify the emissions output associated with the particular emissions object. In some implementations, the evidence data may include device data generated using the user device 16. Such device data may include location data, device identification data, sensor data, IoT data, timestamp data, tracking objects data, applications data associated with applications installed on the user device (e.g., calendar data, schedule data, etc.). In a further implementation, the evidence data may include biomarker data, public emissions data, and/or the like.

Further, the user device 16 may be configured to transmit the attribute data and/or evidence data to the distributed ledger 20, such as through the one or more networks 12. The emissions unit system 30 may then be able to evaluate the particular emissions object based on the determined emissions output, the attribute data, and/or the evidence data stored on the distributed ledger 20. Based on the evaluation of the associated data stored on the distributed ledger 20, the emissions unit system 30 may generate one or more emissions units corresponding to the emissions object. Upon generating the one or more emissions units, the system 30 may transmit data corresponding to the units to the distributed ledger 20, such that the data corresponding to the units may be associated with the determined emissions output, the attribute data, and/or the evidence data stored on the distributed ledger 20. In another implementation, and as further described below, the emission unit system 30 may also facilitate trading of the emissions units using the determined emissions output, the attribute data, and/or the evidence data stored on the distributed ledger 20.

As further explained below, the distributed ledger 20 may be used to store data received from the user devices 18. As is known in the art, the distributed ledger 20 may be a database that is spread across several devices on a peer-to-peer network, where each device may replicate and save an identical copy of the ledger and updates itself independently. In particular, the distributed ledger 20 may be any type of ledger, such as a blockchain. A blockchain may be a public ledger in the form of a distributed database that contains a plurality of data blocks, such that the blockchain maintains a continuously growing list of data records and is hardened against tampering and revision by cryptographic means. In particular, the blockchain may be a decentralized protocol for logging transactions between parties, which transparently captures and stores any modifications to its distributed database and saves them for as long as the blockchain exists. Storing information into a blockchain may involve digitally signing the information to be stored in a block of the blockchain. Furthermore, maintaining the blockchain may involve a process called blockchain mining, wherein one or more miners verify and seal each block, such that the information contained therein is saved and the block can no longer be modified, thereby providing immutable and sequenced blocks of the blockchain. Every transaction that is verified and added to the blockchain may receive transaction identification data that is unique to the transaction. In one implementation, the distributed ledger 20 may be implemented by a network of devices that is separate from the system 10. In another implementation, the distributed ledger 20 may be implemented by the emissions unit system 30.

In a further implementation, the system 10 may include one or more supplemental devices (not shown) that are configured to acquire one or more of the same types of data as the user devices 16. In such an implementation, these devices may also transmit the data to the distributed ledger 20, such that the data may be associated with a relevant emissions object.

In some implementations, one or more elements of the system 10 may be implemented using a cloud computing system, including the distributed ledger 20 and/or the system 30. The one or more computing devices mentioned above, such as the user devices 18, may be configured to perform one or more operations as described herein using one or more applications downloaded to, installed in, and/or active in these one or more computing devices. In addition, the one or more computing devices mentioned above may communicate with one another using any technique known to those skilled in the art. For example, though not shown in FIG. 1A, these one or more computing devices may communicate with one another using one or more application programming interfaces (APIs) associated with the one or more applications. In another example, the one or more applications used by at least some of the computing devices may include a web browser, such that the web browser may be used to communicate with other computing devices of the system 10 via the one or more networks 12. In some implementations, one or more entities associated with the system 10 may provide at least some of the one or more applications used by the one or more computing devices mentioned above, such as an entity associated with the tracking system 30. In other implementations, these one or more entities may provide one or more tools (e.g., software development kits) for use in developing, and/or adding functionalities to, at least some of the one or more applications used by the one or more computing devices mentioned above. In another implementation, at least some of the one or more applications used by the one or more computing devices mentioned above may be provided by an entity independent from and/or unrelated to these one or more entities.

Moreover, although the system 10 is presented in one arrangement, other implementations may include one or more elements of the system 10 in different arrangements and/or with additional elements. For example, though one distributed ledger 20 is shown in FIG. 1A, those skilled in the art will understand that the implementations described herein may be applied to a plurality of distributed ledgers 20.

Figure 1B:
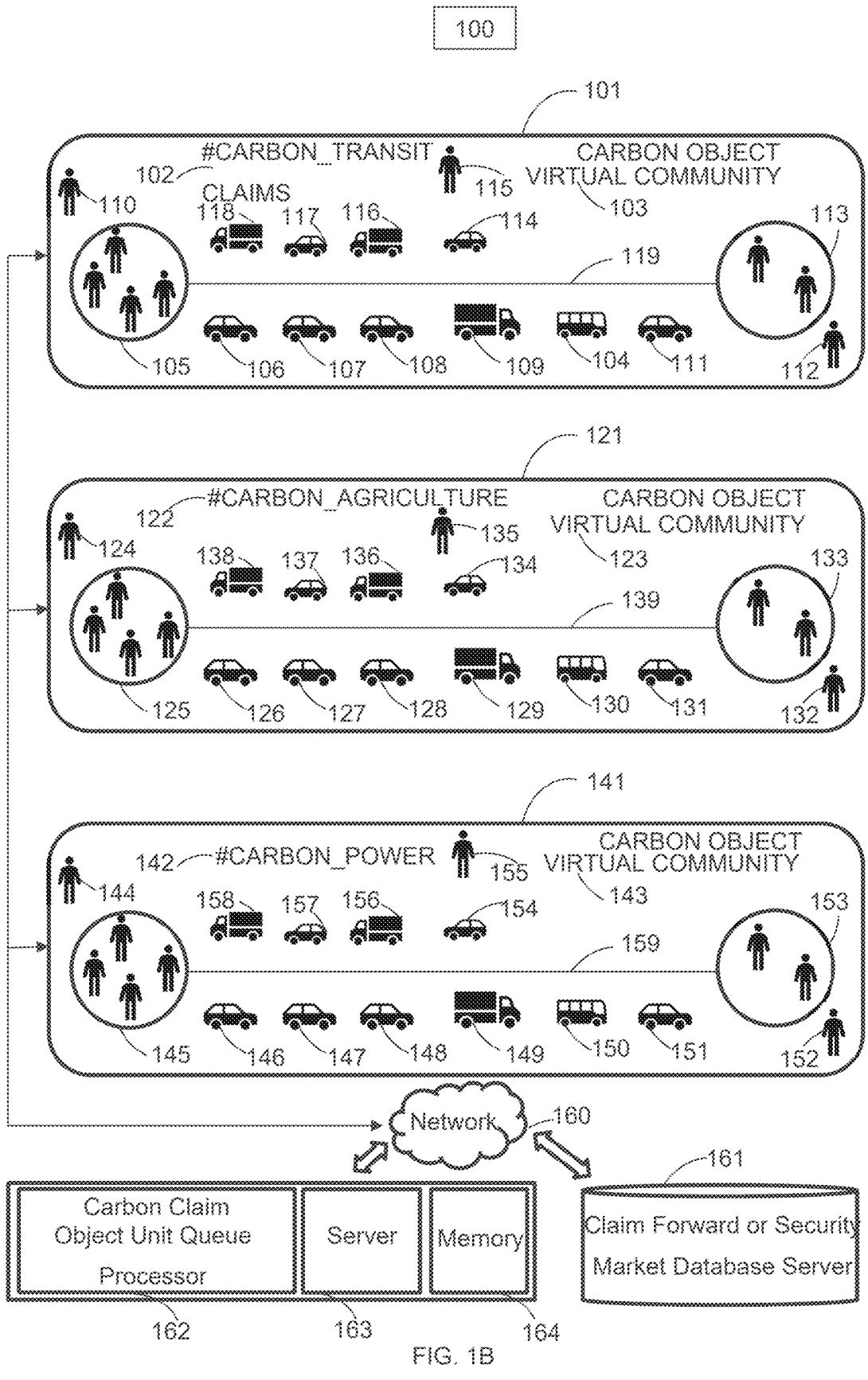

FIG. 1 B illustrates a system using virtual hubs in accordance with implementations of various techniques described herein. In one implementation as illustrated in FIG. 1 B, a user 110 may be assigned or may join a virtual emission or emission offset claim social network community 101, 103 103 of an emission or emission offset and emission or emission offset geolocation unit, where the claim community 101, 103 is a sequence of one or more virtual hubs or a legal claim of pool of claims. The virtual hub sequence may be assigned a metadata tag 102, such as #CARBON_TRANSIT, which may be a shortened name for a longer, full name sequence, such as carbon public or private transportation offset. The virtual route claim community 101, 103 may include an origin virtual hub 105, which may be a specific address and/or geolocation data. As shown in FIG. 1B, the origin virtual hub 105 may be in the city of Ithaca, NY. A geolocation exchange unit may encompass the emission or emission offset and emission or emission offset geolocation unit described herein, and those skilled in the art will understand that one or more of the implementations described herein may be applied to the geolocation exchange unit.

As shown in FIG. 1 B, a route 119 may be disposed between the Ithaca, NY virtual hub 105 and the New York City, NY virtual hub 113, where the route 119 may be a sequence of one or two or more virtual hubs in multi-mode dimension space. As also shown in FIG. 1 B, one or more trucks 118, cars 117, additional trucks 116, and/or additional cars 114 may be headed in a certain direction along the route 119. Additional vehicles 106, 107, 108, 109, 104, 111 may be headed in the other direction along the route 119 between the two virtual hub points 105, 113. One or more additional users 112 may also join the virtual hub route sequence community 103. In another implementation, the user 110 may be assigned or may join a virtual route community 121, 122, 123, where the virtual route community may be a sequence of one or more virtual hubs in multiple modes or dimensions.

In one implementation, emission or emission offset claims and/or emission or emission offset claim units 101 may be transformed towards forward, future, option, securities, international swap, and derivative agreement configurations using one or more formulas and emission or emission offset transformations. In some implementations, the formulas may be used to calculate replacement value contracts associated with the emissions claims or carbon credit geolocation units 101. In such implementations, the emission claim or carbon credit geolocation claim units 101 may be configured as firm or non-firm emission or emission offset contracts, where the contracts may be utilized with the one or more formulas. In particular, the one or more formulas may be used to determine liquidated damages, replacement contract values, termination replacement price, termination replacement transactions, termination payments, interest rates, interest discount rates, option premiums, force majeure, early termination dates, and/or default dates.

In a further implementation, a virtual hub sequence, such as route 119 between the Ithaca, NY virtual hub 105 and the New York City, NY virtual hub 113, may be transformed into one or more claim community objects, where the community objects may be assigned a plurality of attributes. The community objects having attributes may be similar to the use of class and class objects having methods in object-oriented programming (e.g., Java). Similar to the use of data transformations in computing languages, the data transformation of a virtual hub sequence into a community object may facilitate communication in an organized manner using modular logic. In some implementations, virtual hub sequences, such as route 119 between virtual hub 105 and virtual hub 113, may be combined with other virtual hub sequences to extend the series sequence.

The attributes of communities and associated emission or emission offset and calculation transformations may allow for superior communication, accountability and transactions to occur using a community emission claim or carbon credit geolocation claim unit object (i.e., unit 101). In some implementations, the data transformation of a virtual hub sequence community object may allow for a plurality of network members 110, 112 to be assigned to virtual route communities 103 based on a plurality of attributes, prior GPS location histories, claim attributes, insurance attributes, navigation search queries, and/or other attributes. Virtual hub sequences which have been transformed into community objects may provide greater communication and organizational ability for a market in order to transact emission or emission offset and emission or emission offset geolocation claim units and to provide a gateway for emission or emission offset and emission or emission offset geolocation claim unit transactions, as described in U.S. Pat. No. 11,138, 827, "Implementations of a Computerized Business Transaction Exchange for Various Users," filed Sep. 15, 2016 and U.S. Patent Application Publication, U.S. Ser. No. 15/877, 393, "Electronic Forward Market Exchange for Transportation Seats and Capacity in Transportation Spaces and Vehicles," filed Jan. 23, 2018, the entireties of which are incorporated by reference herein.

In one implementation, as described in U.S. patent application Ser. No. 17/069,597, "Price-Time Priority Queue Routing for Transportation Capacity Units," filed Oct. 12, 2019, the entireties of which are incorporated by reference herein, an emission or emission offset and emission or emission offset geolocation unit routing and procurement problem may be defined where a emission or emission offset site is considered to be a single node in a emission or emission offset and emission or emission offset geolocation unit topology 120, a set of K emission or emission offset and emission or emission offset geolocation claim units may be available to purchase, and a set M of geographically dispersed suppliers/markets 121, 122, 123 may be available from which to choose. A discrete demand $d_k$ may be specified for each $k \in K$, such that, in turn, transportation capacity units can be purchased from a subset $M_k \subseteq M$ of suppliers at a price $P_{ik} > 0$, $i \in M_k$. Moreover, a product availability $q_{ik} > 0$ may also be defined for each product $k \in K$ and each supplier $i \in M_k$. In some implementations, to guarantee the existence of a feasible purchasing plan with respect to the product demand, the condition $\Sigma_{i \in M_k} q_{ik} \leq d_k$, $\forall k \in K$ has to hold. In a further implementation, a route sequence may be defined on a complete directed graph $G=(V, A)$ where $V:=M \cup \{0\}$ is the node set and $A:=\{(i, j): i, j \in V, i \neq j\}$ is the arc edge set, where i and j may each refer a city or node. An emission or emission offset cost, emission or emission offset cost or traveling cost $c_{ij}$ may be associated with each arc (i, j) $\in A$. In some implementations, each arc may represent a route between two nodes or cities. An arc set may include a collection of arcs (i.e., routes between two nodes or cities). As such, an arc set may represent a multi-stop route.

The above equations may be used to determine a tour G starting and ending at the depot, visiting a subset of suppliers, and deciding how much to purchase for each product from each supplier in order to satisfy the demand at a minimum traveling and purchasing costs. A goal of the routing algorithm may be to satisfy product demands and node visits. In particular, the convenience to visit a supplier of emission or emission offset and emission or emission offset geolocation units may depend on the trade-off between the additional emission or emission offset costs, emission or emission offset costs, or traveling cost of visiting the node and the possible savings obtained in purchasing other emission claim or carbon credit geolocation claim units at lower prices. The emission claim or carbon credit geolocation claim unit algorithm may have a bi-objective nature, where the minimization of both traveling and purchasing costs may be linearly combined in a single objective function. The bi-objective function nature may make the problem of selecting the optimal suppliers of emission claim or carbon credit geolocation claim units more complex. In particular, the emission or emission offset cost, emission or emission offset cost, or traveling cost optimization pushes the purchaser to select only suppliers that are strictly necessary to satisfy product demand, whereas the purchasing cost minimization pushes to select a more convenient and potentially larger set of suppliers which could be by example but not limiting by example, lawyers, law firms, claim beneficiaries, emission or emission offset inventors, claim assignees or other types of claim suppliers.

In some implementations, a first classification may be derived using the routing nature on a directed graph, where the cost $c_{ij}$ may be potentially different from $c_{ji}$, thereby granting the potential for asymmetry, as opposed to the symmetric case where $c_{ij} = c_{ji}$. The asymmetric case may be referred to as a directed graph, whereas the symmetric case may be referred to as an undirected graph. Another classification may concern the availability of products at the suppliers. In particular, if the available quantity of a transportation capacity unit product $k \in K$ in a supplier $i \in M_k$ is defined as a finite value $q_{ik}$, which may potentially be smaller than product demand $d_k$, then the routing algorithm case may be restricted. In a further implementation, the unrestricted case may be where the supply of emission claim or carbon credit geolocation claim units is unlimited, such that $q_{ik}$; $d_k$, $k \in K$, $i \in M_k$. The unrestricted case may be a special case, as having an unlimited supply of emission claim or carbon credit geolocation units may be equivalent to considering $d_k=1$ and $q_{ik}=1$, $\forall k \in K$, $\forall i \in M^k$.

In another implementation, the emission claim or carbon credit geolocation claim unit routing problem may be considered to be NP-hard in the strong sense as a generalization of the uncapacitated facility location problem. In some implementations, the proof therein with the following reductions to the generalized case where each supplier offers a product that cannot be purchased elsewhere, wherein each transportation or capacity unit is distinct; and each node corresponds to a supplier and each customer to a emission or emission offset and emission or emission offset geolocation unit, $M_k=M$ for all $k \in K$, $P_{ik}$ is the cost of serving customer k from node i, and $c_{ij}:=b_i+b_j/2$, $\forall (i, j) \in A$ with $b_i$ the cost of opening node i. In particular, each destination node may be arrived at from only one origin node, such that the path must be unique. Subsequent paths to a new node must also adhere to this principle. Accordingly, the overall path sequence between all nodes must be exactly one route sequence. There may be only one line path connecting all the nodes, as opposed to multiple paths between the nodes. As such, the portfolio route distance and emission or emission offset, emission or emission offset or traveling cost of moving that claim object has been minimized, and the cost of movement of the emission claim or carbon credit geolocation exchange unit (as further explained below) has been minimized.

In some implementations, some special cases of the emission claim or carbon credit geolocation claim unit routing may be solved trivially. One such special case may be the trivial emission or emission offset, emission or emission offset, or traveling cost case. For the trivial traveling case, if traveling costs are null (or negligible such as in the virtual transportation or virtual video case), then an optimal unrestricted supply solution can be found by purchasing each product or emission or emission offset and emission or emission offset geolocation unit from the cheapest supplier, since any tour connecting these suppliers is optimal. In some implementations of the trivial traveling case, for the restricted case, the suppliers may be sorted in non-decreasing order or price for each product k. Then, the optimal solution may be found by purchasing for each k, from its cheapest suppliers, the minimum between the available quantity and the residual demand. Another special case may be the one supplier case. For the one supplier case, if a supplier sells all the products of emission or emission offset and emission or emission offset geolocation units at the lowest price, then only this supplier will be part of the optimal tour. In some implementations of the one supplier case, the restricted emission claim or carbon credit geolocation claim unit routing problem remains true if, for each product, the quantity available in that supplier is sufficient to satisfy demand. In particular, the supply must be at least equal to demand, or the path route may not otherwise exist.

In some implementations, the problem of feasibility may be checked polynomially just by inspecting of the input data. In particular, the problem may be checked using all of the variables. In a further implementation, if a product is not available at any supplier, then no solution may exist for the unrestricted emission or emission offset and emission or emission offset geolocation unit routing problem. Similarly, for the restricted emission or emission offset and emission or emission offset geolocation unit routing problem, the infeasibility may occur if there exists a product k such that $\Sigma_{i \in M_k} q_{ik} < d_k$. Emission or emission offset and emission or emission offset geolocation units may represent any claim where associated market emission claim or carbon credit geolocation claim unit market structure transformations have occurred. In particular, the market structure queues or price time priority queues for transformed emission claim or carbon credit geolocation claim units with special configurations mentioned above may be incorporated via industrial and generic communication networks. Such infrastructures may include one or more local area networks collecting traffic of user nodes at the switching centers and of a backbone network that routes high volume traffic among switching centers. Because of reliability and self-healing properties, an optimized network structure may use a ring architecture for the backbone and a star architecture for the local area networks. In some implementations, the emission or emission offset and emission or emission offset geolocation unit routing problem may be to determine a tour on the ring backbone on a subset of the network virtual nodes and connect the remaining nodes to the others in the tour, minimizing the overall connection cost or emission or emission offset cost. In such implementations, the problem may be referred to as the ring—star problem, where the graph nodes may correspond to both the suppliers and the set of emission or emission offset and emission or emission offset geolocation units.

In a further implementation, box 124 illustrates a Miller Tucker-Zemlin formulation, the node stops (i.e., virtual hubs) may be labeled with index values 1 through n (see box 125). As also shown in box 125, the path variable $x_{ij}$ may equal 1 as the path goes from node i to node j and may equal 0 otherwise. In some implementations, for i=1, . . . , n, $u_i$ may represent a dummy variable, and $c_{ij}$ may represent the distance between node i and node j. Further, with the aforementioned assumptions, the emission claim or carbon credit geolocation claim unit routing problem may be written as the combination of formulations disclosed in boxes 126, 127, 128, 129, 131, 130, and 132. In some embodiments, the first set of inequalities disclosed in boxes 126, 127, and 128 may require that each node has arrived at from exactly one other node, and the second set of inequalities disclosed in boxes 129, 131, 130, 132 may require that from each node there is a departure to exactly one other node. The Miller Tucker-Zemlin formulation shown in box 124 may represent a general case upon which more specific, modified cases over new dimensions may be built.

The constraints disclosed in boxes 130, 131 may enforce that there is only one single tour covering all nodes and not two or more disjointed tours that only collectively cover all nodes. To prove this, it may be shown that: (1) every feasible solution may contain only one closed sequence of nodes, and (2) that for every tour covering all nodes, that there may be values for the dummy variables $u_i$ that satisfy the constraints. To prove that every feasible solution may contain only one closed sequence of nodes, it may be demonstrated that every subtour in a feasible solution passes through node 1 (noting that the equalities may ensure there can only be one such tour). For if we sum all the inequalities corresponding to $x_{ij}=1$ for any subtour of k steps not passing through node 1, we may obtain: $nk \le (n-1) k$, which may represent a contradiction. Thus, for every single tour covering all nodes, there may be values for the dummy variables $u_i$ that satisfy the constraints. Without loss of generality, the tour may be defined as originating (and ending) at node 1. In some implementations, it may be determined that $u_i=t$ if node i is visited in step t (i, t=1, 2, . . . , n). Accordingly, it may be determined that $u_i-u_j \le n-1$, since $u_i$ can be no greater than n and $u_j$ can be no less than 1. Hence, the constraints may be satisfied whenever $x_{ij}=0$. In some implementations, for $x_{ij}=1$, we may derive the following: $u_i-u_j+nx_{ij}=(t)-(t+1)+n=n-1$, which may satisfy the constraint.

In an additional implementation, the #Carbon_Agriculture object credit or emission offset 122 may link an emission or emission offset claim for an agriculture claim as a social network object which may link the price time priority queues 162, 161 to trade the emissions claims or carbon credit geolocation units 101, 121, 141. The vehicle data 138, 137, 136, 134, 126, 127, 128, 129, 130, 131 may be used to ascertain the various positions, speeds or other relevant data of vehicles to form the basis of a crash or travel report linked to the claim object 121. In some embodiments, the agriculture product or farm or forest land or crop may produce the emission or carbon offset, or the offset may yield from an offset calculation in a person substituting animal based consumption with plant based consumption due to the reduction in methane across the agricultural production offset and the associated transportation with that agricultural emission offset credit or claim.

In an additional implementation, the #Carbon_Power 142 emission or emission offset claim object may also ascertain various position data and use data to verify infringement of certain devices for the respective emission credit or claim object 141 which may then form the basis of a blockchain of data associating to the claim to provide data which may influence the value of the claim on the price-time priority queue exchange and database server 161. The emission or emission offset and emission or emission offset claim objects 101, 121, 141 may have a plurality of basis claim or credit types such as but not limited to commercial, emission or emission offset claims, consumption offset credits or claims, mass tort claims, class action claims, tort claims, equitable claims, or other theory emission or emission offset claims 161 which may be stored on the server 163 then processed with instructions in memory 164 and sent over a network 160.

Figure 2:
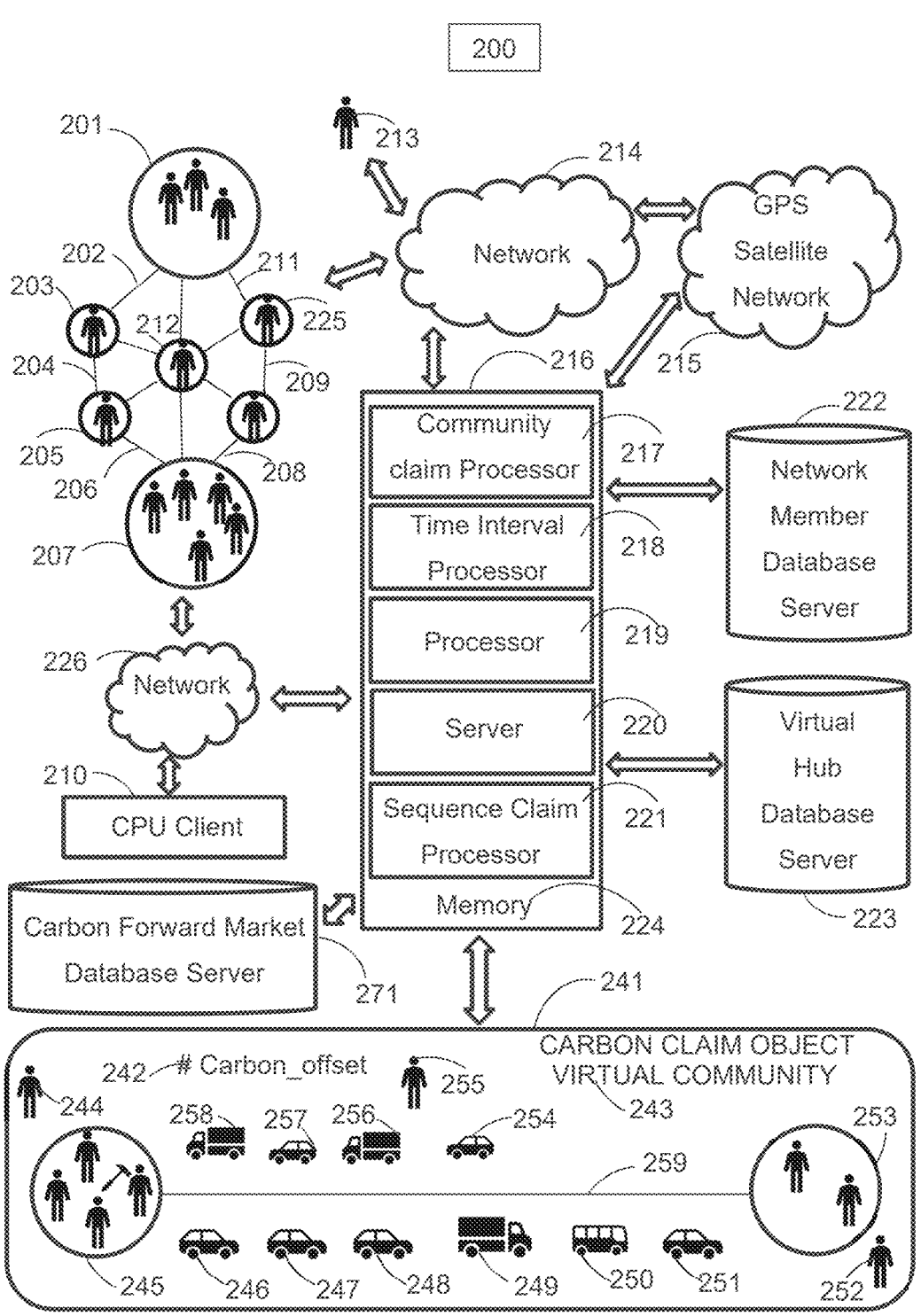
FIG. 2 illustrates a network configuration in accordance with implementations of various techniques described herein.

FIG. 2 illustrates a network configuration 200 in accordance with implementations of various techniques described herein. As shown, the configuration 200 may include a network of virtual location and emission credit or claim hubs 201, 203, 205, 207, 212, 225, where each network may represent a virtual emission credit or claim jurisdiction network of a neighborhood, village, city, county, state, country, continent, or inter-virtual hub networks across geographies. Methods and/or data transformations, as described herein, may be used to transform navigation claim routes 202, which are a virtual hub sequence, between a series of virtual claim hubs 201 and 203, 203 and 212, or multi-leg or multi-modal combinations such as 201 to 203 and 203 to 212. The network configuration 200 may be implemented using one or more computing systems composed of one or more computing devices.

In some implementations, one or more users 213 of the network 214 may input hundreds, thousands, or millions or more of virtual hubs, thereby forming a network topology for emissions claims or carbon credit geolocation unit virtual hub sequences 241. The emissions claims or carbon credit geolocation unit data transformation to a series of virtual emissions claims or carbon credit geolocation unit hubs 245, 253 may allow for network structures 201, 203, 212, 205, 207, 225, 212 to be developed. Further, the structures may be organized in a hub and spoke model or ring and star model, where these models are known to those skilled in the art. Further, using virtual emissions claims or carbon credit geolocation unit hub topologies 241 over road structures 259 may allow for the benefits of data which speeds the process of claims and the basis for claim formation.

In some implementations, once the virtual emissions claims or carbon credit geolocation unit hub networks 201, 203, 212, 205, 207, 225, 212 have been input into the network 214, the community route processor 217 may transform subsections of the topology of the emissions claims or carbon credit geolocation unit networks 201, 203, 212, 205, 207, 225, 212 into a virtual hub sequence 241. The virtual hub sequence 241 may represent two addresses 245, 253 route 259 such as Palo Alto, California 245 to San Francisco, California 253. In particular, each virtual hub address 245, 252 may correspond with a physical address. Virtual emissions claims or carbon credit geolocation unit communities 243 may be one to one, one to two, one to many, and/or any superset or subset combination thereof.

The My Emission or Credit Claim Processor 217 may further process virtual hub combination and virtual emissions claims or carbon credit geolocation unit hub sequences into a specific network member's account on the network member database server 222. The sequence route processor 221 may be used to connect a plurality of virtual hub sequences 201, 203 205, 207 in a logical order to complete a path combination 201 to 207 for navigation or community object construction. In some implementations, emissions claims or carbon credit geolocation unit community objects may be derived from simple direct path routes 202 between two virtual hubs 201 and 203, may be derived from multi-virtual hub constructions between two virtual hub sequences 201 to 207 by waypoints of 201 to 203 to 212 to 207, or any combination or superset or subset thereof.

In a further implementation, the virtual route community 243 may allow attributes to be assigned to the community objects. In particular, users may be assigned to a plurality or emissions claims or carbon credit geolocation unit community virtual hub sequence objects 241. In some implementations, a network member 213 may be assigned to a virtual route community 241 because the user's route history on the GPS satellite network 215 suggests the route has overlap with virtual hub route sequences that the user has used or queried on various search methods on the system. In another implementation, the user 213 may use a CPU client 210 with the network 226 of navigation route communities 243, where the CPU client 210 may include a visual interface, an audio interface, and/or any other type of computing interface known to those skilled in the art. In some embodiments virtual route communities 241 may be transformed data structures that form objects to which community users 213 may subscribe, friend, join, or follow to receive information regarding emissions claims or carbon credit geolocation unit transactions, as described in U.S. Patent Application Publication, U.S. Ser. No. 15/877,393, "Electronic Forward Market Exchange for Transportation Seats and Capacity in Transportation Spaces and Vehicles," filed Jan. 23, 2018, the entirety of which is incorporated by reference herein.

FIG. 3 illustrates a user price-time priority queue system 300 in accordance with implementations of various techniques described herein. In particular, the user price-time priority queue system 300 may be used for transacting or matching transformed emission claim or carbon credit geolocation claim unit data, participating, transacting and/or trading emission claim or carbon credit geolocation claim units, representing the transformed emissions claims or carbon credit geolocation unit value as a homogeneous asset specification, or representing emissions claims or carbon credit geolocation units as a physical forward commodity or security, swap, option, forward, and/or future between combinations of virtual hubs over various emissions claims or carbon credit geolocation unit modes. In some implementations, one or more user transformed emissions claims or carbon credit geolocation units and/or one or more transformed emissions claims or carbon credit geolocation unit units may be associated with emissions claims or carbon credit geolocation unit community objects and routing sequences in the system 300.

The system 300 may include one or more of the following instructions, transformations, and/or elements, as shown in FIG. 3. As is known to those skilled in the art, different values than those shown in FIG. 3 may be used. In particular, the system 300 may include: transformed emissions claims or carbon credit geolocation unit price-time priority sell queue 320; transformed emissions claims or carbon credit geolocation unit price-time priority buy queue 321; transformed emissions claims or carbon credit geolocation unit price priority bucket 305 in the emissions claims or carbon credit geolocation unit buy queue of $5.10; transformed emissions claims or carbon credit geolocation unit price priority bucket 306 in the emissions claims or carbon credit geolocation unit buy queue of $5.30; transformed emissions claims or carbon credit geolocation unit price priority bucket 310 in the emissions claims or carbon credit geolocation unit buy queue of $5.60; transformed emissions claims or carbon credit geolocation unit price priority bucket 314 in the emissions claims or carbon credit geolocation unit sell queue of $5.70; and transformed emissions claims or carbon credit geolocation unit price priority bucket 315 in the emissions claims or carbon credit geolocation unit sell queue of $5.80; and transformed emissions claims or carbon credit geolocation unit price priority bucket 316 in the emissions claims or carbon credit geolocation unit sell queue of $6.60.

The system 300 may also include one or more of the following: transformed emissions claims or carbon credit geolocation unit price-time priority buy price 304 in the first time position of the price priority bucket 305 of $5.10; transformed emissions claims or carbon credit geolocation unit price-time priority buy price 303 in the second time position of the price priority bucket 305 of $5.10; transformed emissions claims or carbon credit geolocation unit price-time priority buy price 302 in the third time position of the price priority bucket 305 of $5.10; transformed emissions claims or carbon credit geolocation unit price-time priority buy price 307 in the first time position of the price priority bucket 306 of $5.30; transformed emissions claims or carbon credit geolocation unit price-time priority buy price 309 in the first time position of the price priority bucket 310 of $5.60; transformed emissions claims or carbon credit geolocation unit price-time priority buy price 308 in the second time position of the price priority bucket 310 of $5.60; transformed emissions claims or carbon credit geolocation unit price-time priority sell price 311 in the first time position of the price priority bucket 314 of $5.70; transformed emissions claims or carbon credit geolocation unit price-time priority sell price 312 in the second time position of the price priority bucket 314 of $5.70; transformed emissions claims or carbon credit geolocation unit price-time priority sell price 313 in the third time position of the price priority bucket 314 of $5.70; transformed emissions claims or carbon credit geolocation unit price-time priority sell price 318 in the first time position of the price priority bucket 315 of $5.80; transformed emissions claims or carbon credit geolocation unit price-time priority sell price 319 in the second time position of the price priority bucket 315 of $5.80; and transformed emissions claims or carbon credit geolocation unit price-time priority sell price 317 in the first time position of the price priority bucket 316 of $6.60.

The system 300 may also include a transformed emissions claims or carbon credit geolocation unit price time priority limit order book ("LOB") 325, which may be represented by the vector q(t) 301. In particular, the i-th coordinate for i>0, $q_i(t)$, may represent the number of sell limit orders of transformed emissions claims or carbon credit geolocation units that are waiting in the LOB at time t a price i□ (where □ may represent the price unit tick size of the transformed emissions claims or carbon credit geolocation unit). In addition, the number of buy limit orders for transformed emissions claims or carbon credit geolocation units at i□ may be represented with a negative sign $q_i$ (t).

Further, the system 300 may also include: a benchmark price 326 of all sell limit orders at time t, which may be computed as s(t)=s(q(t))=min (min {0<i□: $q_i$ (t)>0}) if $q_i$ (t) is less than or equal to 0 for all i>0, then s (q (t))=infinity; benchmark price 327 of all buy limit orders at time t, which may be computed as b(t)=b (q (t))=max (max {i□>0: $q_i$ (t)<0}), if $q_i$ (t) is greater than or equal to 0 for all i>0, then b(q (t))=negative infinity; order match 328 in the transformed emissions claims or carbon credit geolocation unit limit order book where s(t)=b(t), which may move the method and system to the matched transformed emissions claims or carbon credit geolocation unit limit order confirmation and delivery process; a limit order book status of no order match 329, where s (t)>b (t); if limit order book i-th $q_i$ (t) element 330 of LOB is cancelled, remove from queue; and if i-th $q_i$ (t) element is a new transformed emissions claims or carbon credit geolocation unit order 331 in LOB, then insert into respective limit order buy queue 321 or limit order sell queue 320 with priority of price, and then time into the price time priority queues.

In some implementations, the price—time priority queue for transformed emissions claims or carbon credit geolocation units may be assigned to a claim community object 241, where the object 241 may be a waypoint sequence of transformed emissions claims or carbon credit geolocation units. In a further implementation, the price—time priority queue may be assigned to two waypoints as a claim community object 241, or the price—time prior queue may be assigned to a claim community waypoint object sequence of many waypoints 203 to 205 to 207 to 212. The waypoints may have been added together to form one continuous claim community object 241 and respective price—time priority queue for transformed emissions claims or carbon credit geolocation units through processing instructions from the Emission Community Route Processor 217 and Emission Sequence Route Processor 221, where the processors may be configured to communicate via the networks 226, 214, and 215. In another implementation, the limit order book 301 vector may be assigned to a specific date and time for the claim community waypoint object which is a forward market price for transformed emissions claims or carbon credit geolocation unit(s) 271 and claim community waypoint object(s) 241. In particular, the value of a route or the value of the path may be assigned between two nodes using the organizing method of the price time priority queue. The benefit of this method is the assignment of a market mechanism to efficiently allocate and organize buyers and seller across the optimization sequence of both a single claim route between two nodes and also the portfolio path of an entire arc set. The objects may also have emission or emission offset transformations to securitize or unitize the object, such that it may be traded on exchange with cost of cover, replacement value, liquidated damages, and default remedy calculations which are required to securitize an object.

In a further implementation, a specific transformed emissions claims or carbon credit geolocation unit price—time priority queue limit buy order 304, with a specific price stamp bucket 305 of $5.10, may be cancelled. If the order 304 is cancelled, then the price—time priority limit order book buy queue price at position 303 moves to the higher price—time priority queue position of 304, and price—time priority price of position 302 moves to position 303. Similarly, in a further implementation, the price—time priority limit order sell price 319 of price—time priority bucket price 315 of $5.80 may be cancelled. If price—time priority of the transformed emissions claims or carbon credit geolocation unit is cancelled, then order 317 moves to a higher position in the overall transformed transportation queue 320, even though the limit order book price 317 may remain in the price bucket of position 316 at $6.60.

In another implementation, price—time priority insertion may occur where a new order may be inserted into either the transformed emissions claims or carbon credit geolocation unit buy queue 320 or transformed emissions claims or carbon credit geolocation unit sell queue 321. For example, a new price—time limit order for a transformed emissions claims or carbon credit geolocation unit may be inserted as a sell order at a price of $5.70 at position 313, which would then assume order 312 was also at a price of $5.70 and that order 312 was placed with a time that was before order 313 was placed. In the aforementioned example of the price—time order insertion of 313, price—time orders of 319, 318 and 317 may have moved lower in their relative position, even though they remain in distinctly different price buckets of 315 and 316, respectively. With regard to the price—time priority queue for transformed emissions claims or carbon credit geolocation units, price is first priority, followed by time stamp.

In some implementations, the lowest selling price s(t) 326 may equal the highest buying price b(t) 327. In such an implementation, the highest transformed emissions claims or carbon credit geolocation unit buy queue price bucket 310 may be equal to the lowest transformed emissions claims or carbon credit geolocation unit sell queue 320 selling bucket price 314. In the example of the limit order book 301, the highest transformed unit buy price 310 of $5.60 may be lower than the lowest emissions claims or carbon credit geolocation unit sell queue 320 lowest selling bucket 314 of $3.70. As such, no match may occur because s (t)>b (t) (see box 329). In some implementations, one or more order insertions 331 or order cancellations 330 may occur for transformed emissions claims or carbon credit geolocation units from the transportation forward market database server 271 associated with community objects, where the objects may be a series of waypoints 241.

In another implementation, the LOB 325 for transformed emissions claims or carbon credit geolocation units may contain many different types of instruction structures and specifications, such as limit orders, market orders, market if touched orders, snap market orders, snap mid orders, snap to primary orders, peg to benchmark orders, or adaptive custom orders. Adaptive custom orders may be custom, customer-designed instructions, as known to those skilled in the art. In some implementations, the LOB 325 for transformed emissions claims or carbon credit geolocation units may also contain instructions for order times, such as good for the day, good till cancelled, immediate or cancel, good till date, day till cancelled, or a plurality of additional custom instructions for the timing of the order of the transformed emissions claims or carbon credit geolocation unit in the LOB 325. In a further implementation, a plurality of additional instructions and specifications may also be unique to each transformed emissions claims or carbon credit geolocation unit in the LOB 325, such as automobile mode, air mode, autonomous vehicle mode, bike mode, boat mode, bus mode, drone mode, limo mode, motorcycle mode, moped mode, shuttle mode, spaceship mode, subway mode, taxi mode, train mode, and fastest optimized mode. Fastest optimized mode may combine many modes or a single mode for a waypoint claim community object 241 or waypoint claim community sequence (e.g., 201 to 203 to 205 to 212 to 207) of many claim communities 241.

In another implementation, the LOB 325 may be assigned to transformed emissions claims or carbon credit geolocation unit packages, renewable energy, agriculture or food or other emission unit products that have associated claim community objects 241. In such an implementation, the LOB 325 for transformed emissions claims or carbon credit geolocation units may be assigned to cargo, such as a trailer of a rig, a container of a boat, a container on a truck, or any type of product or activity that produces transformed emissions claims or carbon credit geolocation unit. In a further implementation, the LOB 325 may be assigned to a virtual transformed emissions claims or carbon credit geolocation unit, which may represent emission credit or claims along a packet moving medium, such as a telecommunications pipeline, satellite telecommunications, and/or wireless telecommunications that move packets of data, where the packets correspond to transformed emissions claims or carbon credit geolocation units. In a further implementation carbon offset credits may be formed from virtual transportation such as tele-commuting or using video or augmented or virtual reality work or meetings or activities.

In another implementation, the LOB 325 may have other configurations and ordering algorithms in the open architecture emission auction method and system as unitized and as described in U.S. Pat. No. 11,138,827, "Implementations of a Computerized Business Transaction Exchange for Various Users," filed Sep. 15, 2016, the entirety of which is incorporated by reference herein.

Figure 4:
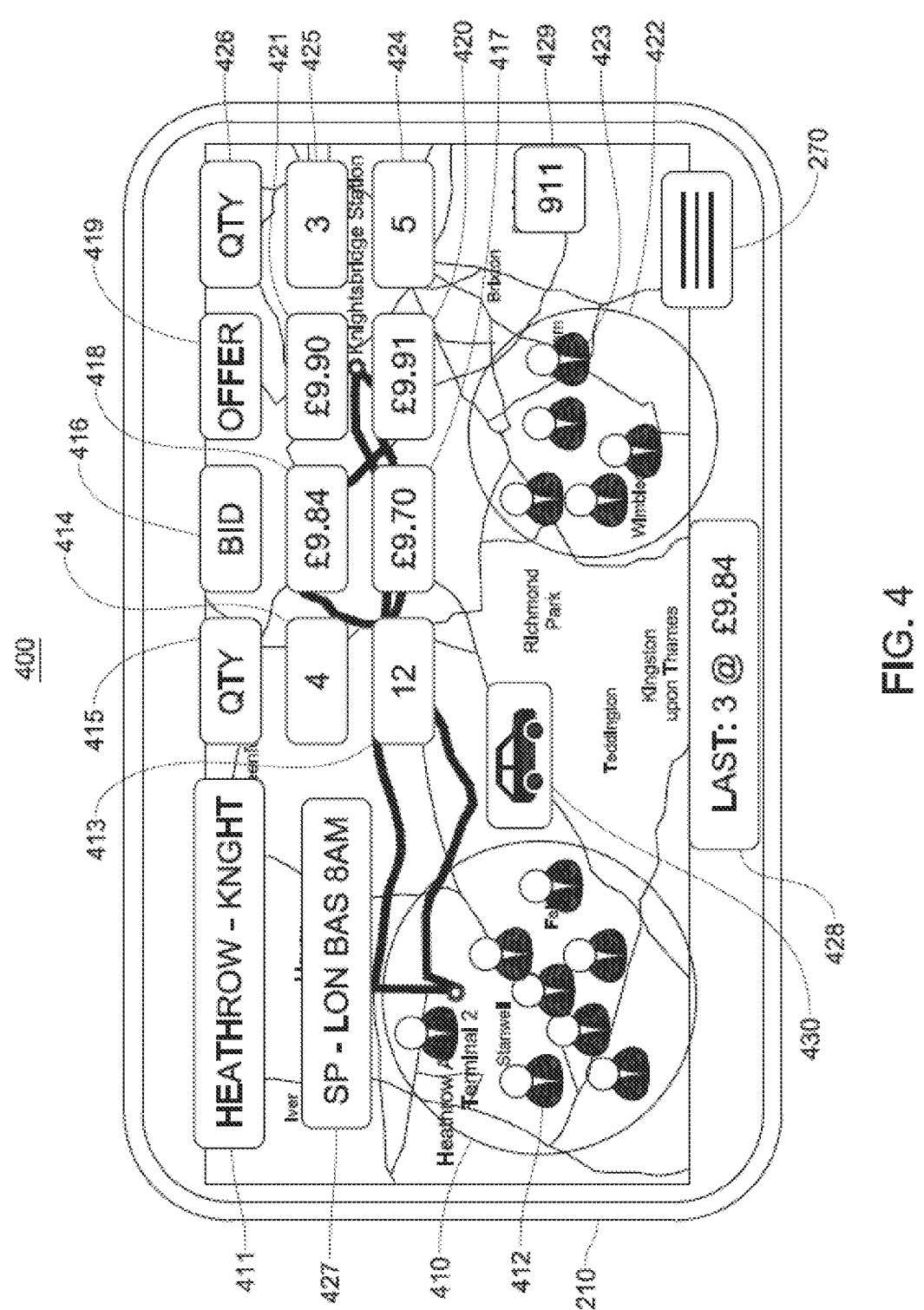
FIGS. 4-14 illustrate a user interface of a computing device in accordance with implementations of various techniques described herein.

FIG. 4 illustrates a user interface 210 of a computing device in accordance with implementations of various techniques described herein. In particular, the user interface 210 may be used for participating, transacting, and/or trading transformed emissions claims or carbon credit geolocation unit commodity or security between combinations of virtual hubs over various transportation modes. While the implementations disclosed herein may be discussed using a mobile computing device, any other form of computing device known to those skilled in the art may be used, as well. Further, the user interface 210 may also hereinafter be referred to as a graphical user interface (GUI) 210. In addition, the term button as used herein may refer to either physical or displayed virtual buttons on the mobile computing device. Further, while the implementations disclosed herein may be discussed in terms of the user 110, the implementations may be used by other types of users, as well.

The user interface 210 may display and/or include one or more of the following elements: a virtual hub combination 411; a virtual hub origin/from location 410 with users 412 within the virtual hub location 410; and a claim specification summary of the market, level of service, credit or claim data blockchain of claim associations and credit proceedings and time of delivery commencement 427. For example, as shown in FIG. 4, the user interface 210 may display an international virtual market hub combination market, such as within London as a credit or claim against National Health Service as the health provider. In some embodiments, a worker with National Health may work remotely, thereby bypassing their physical commute and thereby receiving or earning an emission or carbon credit blockchain for their respective forgone physical commute with a lesser carbon or emission impact virtual commute.

The user interface may also display and/or include one or more of the following elements: a mode of claim type 430; a transaction summary of the last trade auction quantity and price 428 in the local currency or another currency set by the user 110; a virtual hub destination/to location 422 and user who is being delivered on the emission or emission offset and emission or emission offset geolocation unit 423; a bid/buy quantity title header 415 for an exemplary virtual emission claim or carbon credit geolocation claim unit hub market; a bid/buy price title header 416 for an exemplary virtual emission claim or carbon credit geolocation unit hub market; an offer/sell price title header 419 for an exemplary virtual emission claim or carbon credit geolocation unit hub market; and an offer/sell quantity title header 426 for an exemplary virtual emission claim or carbon credit geolocation unit hub market.

The user interface may also display and/or include one or more of the following elements: a bid/buy quantity 414 for the best bid quantity from a plurality of users 110 for a emission claim or carbon credit geolocation unit virtual hub combination that has undergone a plurality of data transformations according to one or more implementations described herein; a bid/buy quantity 413 for the second-best bid quantity from the plurality of users 110 for a emission or emission offset and emission or emission offset geolocation virtual hub combination that has undergone a plurality of data transformations according to one or more implementations described herein; a bid/buy price 418 for the best bid price from the plurality of users 110 for a emission claim or carbon credit geolocation unit virtual hub combination that has undergone a plurality of data transformations according to one or more implementations described herein; and a bid/buy price 417 for the second-best bid price from the plurality of users 110 for a emission or emission offset and emission or emission offset geolocation virtual hub combination that has undergone a plurality of data transformations according to one or more implementations described herein.

In addition, the user interface may display and/or include one or more of the following elements: an offer/sell price 421 for the best offer price from the plurality of users 110 for a emission or emission offset and emission or emission offset geolocation virtual hub combination that has undergone a plurality of data transformations according to one or more implementations described herein; an offer/sell price 420 for the second-best offer price from the plurality of users 110 for a emission or emission offset and emission or emission offset geolocation virtual hub combination that has undergone a plurality of data transformations according to one or more implementations described herein; an offer/sell quantity 425 for the best offer quantity from the plurality of users 110 for a emission or emission offset and emission or emission offset geolocation virtual hub combination that has undergone a plurality of data transformations according to one or more implementations described herein; an offer/sell quantity 424 for the second-best offer quantity from the plurality of users 110 for a emission or emission offset and emission or emission offset geolocation virtual hub combination that has undergone a plurality of data transformations according to one or more implementations described herein; a safety dispatch "911" button 429 to enact video and audio recording of the user's 110 environment and dispatch of that information to authorities; and a hamburger menu button 270 to move back to menu options and settings away from the participation, transaction, trading displayed in the user interface 210.

In some implementations, a user 110 may enter a transaction quantity and price for a transformed emission or emission offset and emission or emission offset geolocation unit securities in order to participate, transact and/or trade via the GUI 210, where the GUI 210 may detect the user's 110 contact with a displayed bid/buy price 418 or offer/sell price 421. The GUI 210 may detect the user's 110 contact with any of the GUI 210 buttons mentioned above. The GUI 210 may also detect user contact with any of the GUI's 210 display and/or buttons 418, 417, 420, 421 or may communicate with the user 110 via a voice interface.

Upon user contact with the display and/or buttons on the GUI 210, instructions may be instantiated which allow the user 110 to change the specifications of the virtual emission claim or carbon credit geolocation unit hub combination 411. A plurality of prices and markets may be presented based on a plurality of emission claim or carbon credit geolocation unit contract specifications. In some implementations, the best bid/buy price 418 may be moving up in price or down in price depending on the market conditions at any given time. The last auction trade or last transacted price for a given specification may be listed to inform the user 110 as to how the market is moving, which may allow the user 110 to submit a competitive offer/selling price 421 or bid/buying price 414. In some implementations, users 110 may adjust settings of the GUI 210 to show more bid/buying prices 417 or more offer/selling prices 420. The matrix of market quantities and prices 413, 414, 415, 416, 417, 418, 419, 420, 421, 424, 425, 426 displayed in the GUI 210 may be referred to as market depth. In a further implementation, the number of users 110 may be displayed as user icons 412 or 423 for the people logged who desire to transact, trade or participate in a given virtual hub 410 to virtual hub 422 combination auction. Users 110 may select the emission claim or carbon credit geolocation unit mode 430, such that the GUI 210 displays a market for one form of transformed emission claim or carbon credit geolocation unit as a commodity or security. In a further implementation, the GUI 210 may show multiple forms of transformed emission claim or carbon credit geolocation unit between two virtual transportation capacity hubs 410, 411, 422.

In some implementations, the user 110 may select the 911 display and/or button 429, which may activate voice and video recording functions on the mobile computing device and transmit the data with a confirmation from the user 110 to the authorities to provide enhanced security while participating, transacting or trading forward transformed emission claim or carbon credit geolocation units as a commodity or security. The user may toggle between the GUI 210 market view screen in FIG. 4 and other menu 270 options and settings by the user 110 selecting the hamburger button 270, with the mobile computing device detecting the user 110 input or contact on the GUI 210. In some implementations, the mobile computing device may instantiate instructions in its memory, and the device may transmit emission or emission offset and emission or emission offset geolocation data through the network 214 or wireless GPS network 215 to call upon instruction routines and instruction subroutines on the emission claim or carbon credit geolocation unit forward market or security market database server 271, virtual hub database server 223, network member database server 222, no arbitrage condition database server and/or instructions in the memory of the cloud and local CPUs 290. These elements may interface together to make a system configured to deliver emission or emission offset and emission or emission offset geolocation units to users 110 from and to a plurality of virtual hubs 410, 422 with a plurality of emission claim or carbon credit geolocation unit specifications 427 at specific market prices.

Figure 5:
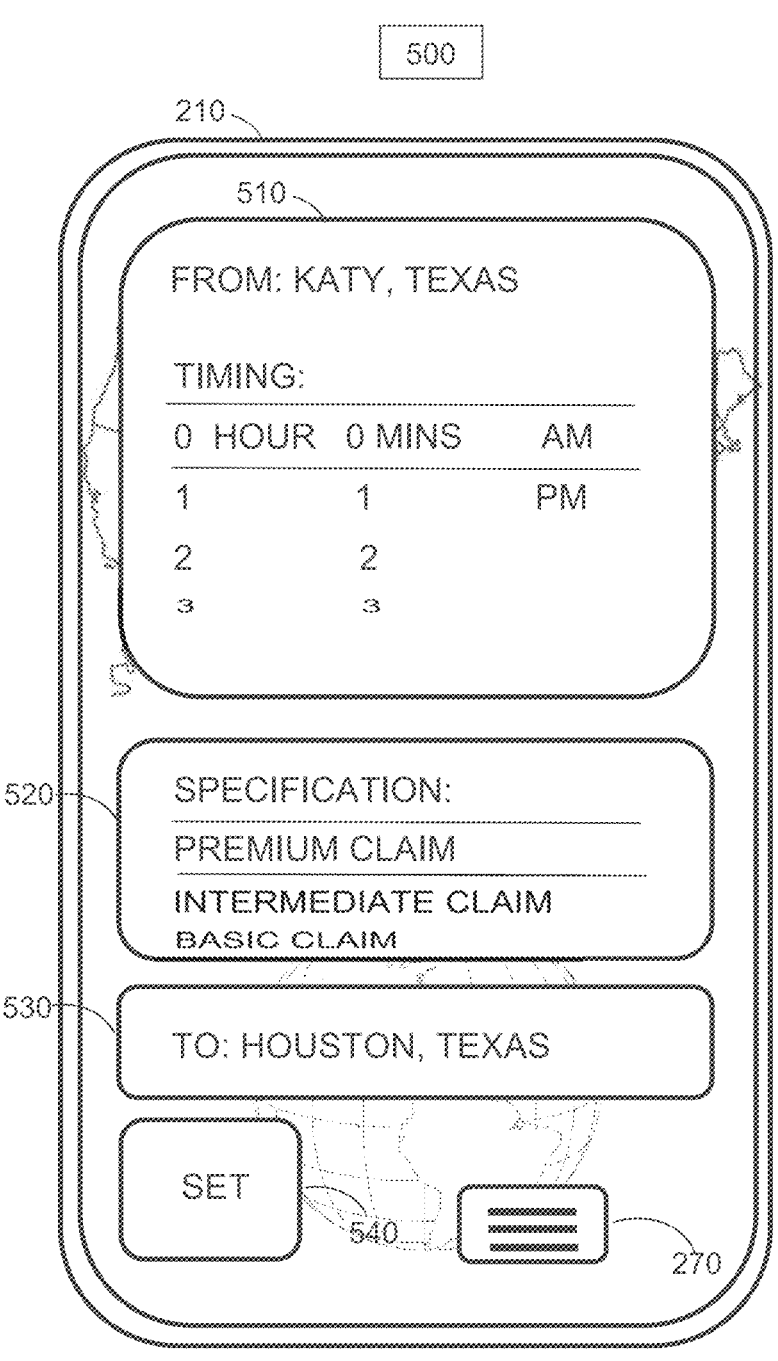

FIG. 5 illustrates the user interface 210 of a computing device in accordance with implementations of various techniques described herein. In particular, the user interface 210 may be used for listing timing emission claim or carbon credit geolocation unit specifications 510 on a portable multifunction device (e.g., a mobile computing device). Further, while the implementations disclosed herein may be discussed in terms of the user 110, the implementations may be used by other types of users, as well.

The user interface 210 may display and/or include one or more of the following elements: origin/from virtual hub timing or securitization timing of cash flows on the claim (a data transformation) 510; specification of quality of emission claim or carbon credit geolocation unit capacity and associated claim or credit data blockchain (a data transformation) or type such as physical or financial 520; destination/To virtual hub (a data transformation) 530; setting button 540 to transmit the timings 510 and quality and type specification grade 520 (a data transformation); and hamburger button 270 to instruct the GUI 210 to take the user 110 to the menu screen.

In some implementations, the user 110 may select a plurality of timing options in the timing selection emission claim or carbon credit geolocation unit specification 510. The timing specification constraint may be the time at which the transformed emission or emission offset and emission or emission offset geolocation unit security cash flows start from the origin/from emission claim or carbon credit geolocation unit virtual hub 410. As in any commodity or security market, if a user 110 is late or defaults on the obligation and they have purchased the emission claim or carbon credit geolocation unit, the user must still pay for the emission or emission offset and emission or emission offset geolocation unit, regardless of whether the user 110 is present at the time of departure. The user sell back the emission claim or carbon credit geolocation unit, if they know they will be late, to sell back the emission or emission offset and emission or emission offset geolocation unit to the market at the then current price to reverse their obligation. Accordingly, for the purpose of example, but not limiting by example, if a user 110 bought a transformed emission claim or carbon credit geolocation unit security for £9.90 421 and the user 110 realizes they need to adjust their obligation for the 8 AM cash flow or other claim specification 427, then the user 110 may either pay for the emissions claims or carbon credit geolocation unit, even though the user 110 was present and did not take delivery of the emissions claims or carbon credit geolocation unit security, or the user 110 may preemptively sell back the emission claim or carbon credit geolocation unit security for forward to the market at the then current bid price 418. The user 110 would then have offset their obligation in a timely manner and another user 110 on the network 214, 226 may then purchase the available emission or emission offset and emission or emission offset geolocation unit security. By eliminating the initial obligation and by creating an offset obligation, additional data transformation concepts such as cost of cover, liquidated damages or force majeure may be avoided. In some implementations, virtual emission claim or carbon credit geolocation unit hub combination units may or may not have the available liquidity if the user 110 were to wait too long before delivery of the transportation capacity unit to make an adjustment. Therefore, the user 110 may need to take delivery even if they are not present.

In some implementations, the user 110 may select an emission claim or carbon credit geolocation unit which is in various stages of processing the specification 520, a specification for financial swaps and options, or a specification for physical swaps and options of emission claim or carbon credit geolocation claim units. For example, a plurality of specification grades may exist, such as "premium," which may be defined by certain classes of emission claim or carbon credit geolocation unit which may have already had various regulatory, trial, appellate, state supreme, circuit digital epichain and supreme digital epichain verdicts or and/or certain quality levels. Similarly, for example, a plurality of specification grades may exist such as "intermediate" or "basic," which may be defined by certain classes of emission or emission offset and emission or emission offset geolocation unit securities and/or certain quality levels or lesser digital epichain precedent. Specification claim levels may also be associated with rating levels such as bonds which correspond to various interest rates for risk versus return considerations for the investors such as AAA, AA, A, BBB, BB, B and pluralities of high yield ratings.

In some implementations, the user 110 may select the destination/to virtual hub 530 to change the virtual hub combination. In another implementation, the user 110 may contact the "set" button 540 to transmit the transformed emission claim or carbon credit geolocation unit security specification data by using the GUI 210. In such an implementation, the mobile computing device may instantiate instructions in its memory, and the mobile computing device may then transmit transportation capacity data through the network 214 or wireless GPS network 215 to call upon instruction routines and instruction sub-routines on emission claim or carbon credit geolocation unit market database server for forwards, futures, bonds, asset backed securities, index securities, securities, swaps or other derivatives 271, virtual hub database server 223, network member database server 222, map routing servers, no arbitrage condition database server and/or instructions in the memory of the cloud and local CPUs 290. The elements may interface together to make a system configured to deliver transformed emission claim or carbon credit geolocation unit securities to users 110 from and to a plurality of virtual hubs 410, 422 with a plurality of specifications at specific market prices.

Figure 6:
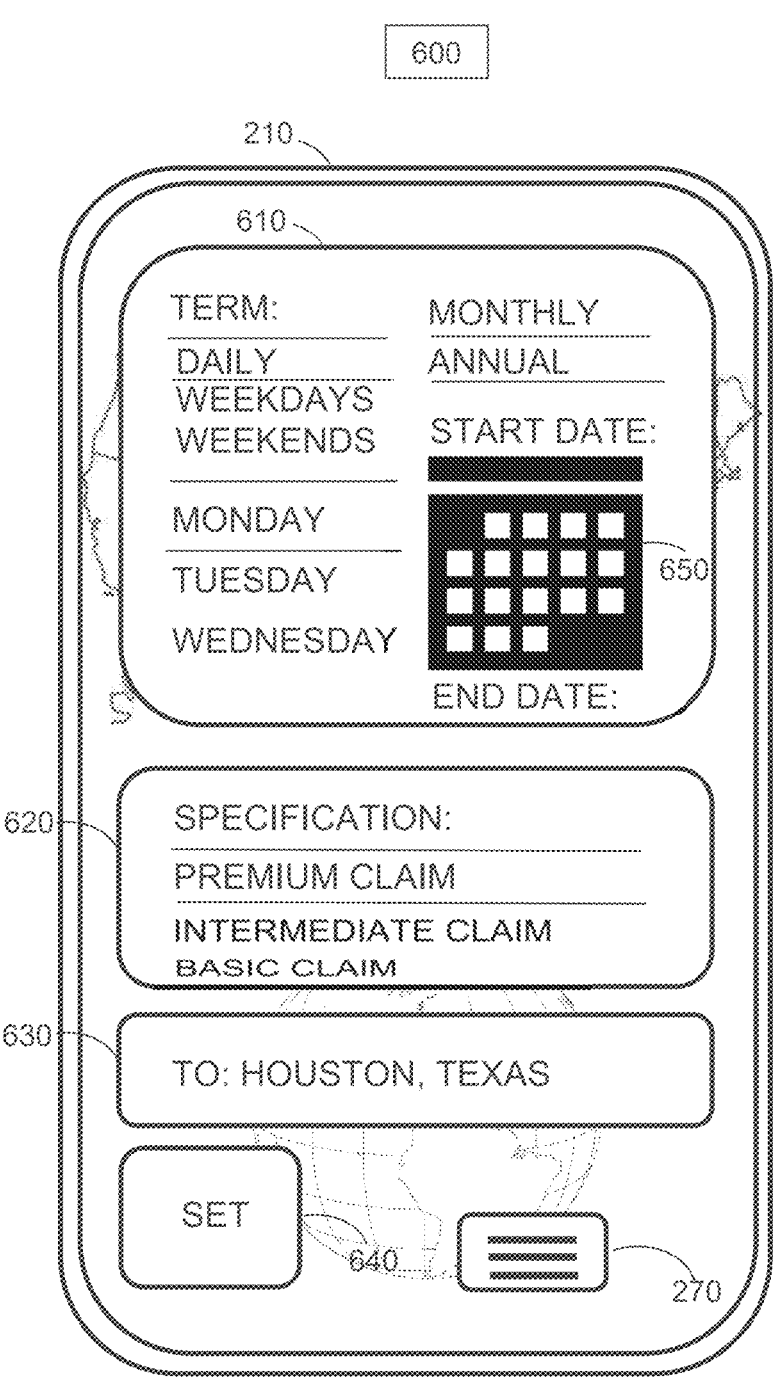

FIG. 6 illustrates the user interface 210 of a computing device in accordance with implementations of various techniques described herein. In particular, the user interface 210 may be used for selecting the term transformation specification 610 on a portable multifunction device (e.g., a mobile computing device). Further, while the implementations disclosed herein may be discussed in terms of the user 110, the implementations may be used by other types of users, as well.

In some embodiments, the user 110 may select a certain meeting time and date 650 with a plurality of other users for a virtual mode meeting 811 which may have the form factor of a video meeting conducted through virtual meeting software or hardware or a combination thereof. In some embodiments, the user 110 may select the time and date 650 and the feature may link with traditional calendar software such as Microsoft's Outlook or Teams or Google Calendar or WebEx or Zoom or Ring Central or many other calendar and meeting corroboration tools such that the carbon or emission offset credit may be an option to switch a meeting from physical to virtual in order to earn the carbon or emission offset credit. In some embodiments, the buy or sell and value of the virtual carbon or emission blockchain credit may be established on a per mile or per kilometer basis as calculated by the opportunity cost of the travel in physical miles verified on the virtual carbon or emission blockchain with the GPS coordinates and location of the user on the video call. In some embodiments, a GPS text or email verification may be sent to verify the location of a certain user to prevent false locations in the verification blockchain due to VPN or Virtual Private Network configurations in a private or corporate network environment. In some embodiments, the method and system may calculate the virtual mileage saved by conducting a virtual meeting in lieu of a physical meeting which then would prompt the software in a calendar meeting software integration to determine the device locations of the meeting participants and calculate the value of the carbon emission saved and thereby give the users 110 the ability to change their meeting status to virtual 811 or physical modes including but not limited to vehicular, boat, air, motorcycle, train, taxi, augmented reality, virtual reality, mixed reality, audio reality, neural interface reality or many other form factors for meetings. In some embodiments, a GPS longitude, latitude and altitude formulation may include calculating distance in the form but not limited to the form of the great circle distance or the orthodromic distance is the shortest distance between two points on a sphere (or the surface of Earth). In some embodiments, in order to use this method, we need to have the co-ordinates of virtual hub point A 245 and virtual hub point B 253. The great circle method may be chosen over other methods; first, convert the latitude and longitude values from decimal degrees to radians. For this divide the values of longitude and latitude of both the points by 180/pi. The value of pi is 22/7. The value of 180/pi is approximately 57.29577951. If we want to calculate the distance between two places in miles, use the value 3, 963, which is the radius of Earth. If we want to calculate the distance between two places in kilometers, use the value 6, 378.8, which is the radius of Earth. In some embodiments, an exemplary step may be to Find the value of the latitude in radians:

Value of Latitude in Radians,lat=Latitude/(180/pi)OR

Value of Latitude in Radians,lat=Latitude/ 57.29577951

Find the value of longitude in radians:

Value of Longitude in Radians,long=Longitude/(180/ pi)OR

Value of Longitude in Radians,long=Longitude/ 57.29577951

In some embodiments, additional steps may include but not be limited to obtaining the co-ordinates of point A 245 in terms of latitude and longitude. Use the above conversion method to convert the values of latitude and longitude in radians. For example, but not limited by example, we will call it as lat1 and long1. In some embodiments, as an additional step, incrementally complete the same for the co-ordinates of Point B 253 and get lat2 and long2. In some embodiments, incrementally, to get the distance between point A 245 and point B 253 one may use the following formula: Distance, d=3963.0*arccos[(sin(lat1)* sin(lat2))*cos(lat1)*cos(lat2)*cos(long2−long1)]. In some embodiments, the arccos may be representative of the arc-cosine defined as the inverse cosine function when x is between negative one and positive one. In some embodiments, the exemplary obtained distance, d, is in miles. In some embodiments, if one wanted the value to be in units of kilometers, multiple d by 1.609344.

$$d \text{ in kilometers} = 1.609344 * d \text{ in miles}$$

Thus, one may have the shortest distance between two places on Earth using the great circle distance approach. In some embodiments, such an exemplary approach to calculating virtual distance saved as an emission or carbon credit over a plurality of virtual hub topologies from various virtual network meeting topologies may be used in corroboration with devices such as Internet of Things devices which have the ability to determine GPS location through satellite or other near band or broadband methods. In some embodiments, the transformed carbon or emission credit from virtual transportation or virtual meetings may be multiplied by an emission or carbon credit or claim value to determine the overall value of the contribution of an individual meeting or collectively determined by a larger network group, topology or corporation of virtual network meeting nodes. In some embodiments, such interface and device calculations may be presented in calendar software, meeting software, carbon or emission credit software, virtual reality software, mixed reality software, audio reality software, augmented reality software, neural interface software or through portable multifunction devices. In some embodiments, carbon offset credits or claims may be calculated in the context of U.S. Pat. No. 11,138,827, "Implementations of a computerized business transaction exchange for various users", filed Sep. 15, 2016 or U.S. patent application Ser. No. 17,324,051 "Time Interval Geolocation Community Objects with Price Time Priority Queues for Transformed Time Interval Geolocation Units", filed May 18, 2021 with the entire provisional application filed May 17, 2020, the contents included in their entirety herein.

In some embodiments, the user interface 210 may display and/or include one or more of the following elements: term claim specification options 610 (a data transformation); specification 620 of quality or type such as financial or physical of emission or emission offset and emission or emission offset geolocation(a data transformation); jurisdiction virtual hub 630 (a data transformation); setting button 640 to transmit the term 610 and quality specification grade 620 (a data transformation); calendar button 650 to select specification start dates and end dates for a plurality of virtual emission claim or carbon credit geolocation unit hub combinations (a data transformation); and hamburger button 270 to instruct the GUI 210 to take the user 110 to the menu screen.

The term specification options 610 may be used to participate, transact and/or trade in a specific emission claim or carbon credit geolocation unit virtual hub combination for a specific time period specification. In some implementations, the term 610 may refer the term structure of the securitized cash flows or simply payment terms in other use cases. Users 110 may set the term to daily, weekly, monthly, annual, weekdays, weekends, specific days, or any combination of term selections. For example, the user 110 may select "weekdays" from among the term specification options 610 during a specific calendar time period of a given year, which may be selected using the calendar button 650. In particular, specific time start dates and end dates may be set by the user with the calendar button 650. For example, a user 110 may select "Mondays" within a specification date window (a data transformation). In another example, the user 110 may select "weekends" during a specification calendar window of dates (a data transformation).

The user 110 may contact the "set" button 640 to transmit the transformed emission or emission offset and emission or emission offset geolocation unit specification data by using the GUI 210. The mobile computing device may instantiate instructions in its memory, and the device may then transmit emission claim or carbon credit geolocation unit data through the network 214 or wireless GPS network 215 to call upon instruction routines and instruction sub-routines on the emission claim or carbon credit geolocation unit forward market or security market database server 271, virtual hub database server 223, network member database server 222, map routing servers, no arbitrage condition database server and/or instructions in the memory of the cloud and local CPUs 290. These elements may interface together to make a system configured to deliver emission claim or carbon credit geolocation units to users 110 with reference to a plurality of virtual hubs 410, 422 with a plurality of specifications at specific market prices.

Figure 7:
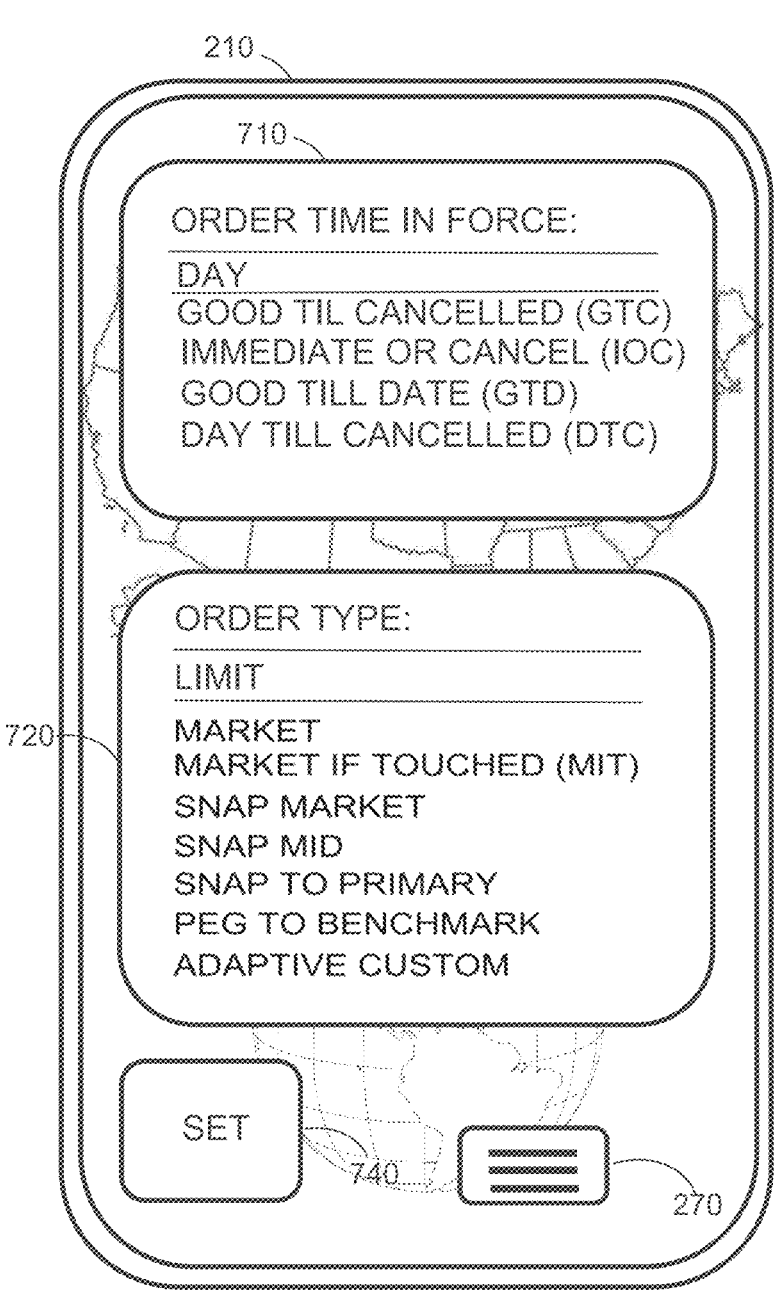

FIG. 7 illustrates the user interface 210 of a computing device in accordance with implementations of various techniques described herein. In particular, the user interface 210 may be used for selecting order time in force order types 710 (a data transformation) and order types 720 (a data transformation) on a portable multifunction device (e.g., a mobile computing device). Further, while the implementations disclosed herein may be discussed in terms of the user 110, the implementations may be used by other types of users, as well.

The user interface 210 may display and/or include one or more of the following elements: order time in force specification options 710 (a data transformation); order type specification options 720 (a data transformation); setting button 740 to transmit the order time in force specification 710 and Order type specification option 720 (a data transformation); and/or hamburger button 270 to instruct the GUI 210 to take the user 110 to the menu screen.

In some implementations, the user interface 210 may be used by the user 110 to select a plurality of order time in force emission claim or carbon credit geolocation unit specifications 710. The order time in force selections 710 may include one or more of the following: day (DAY) order; good till cancelled order (GTC); immediate or cancel order (IOC); good till date order (GTD); and/or day till cancelled order (DTC). Order time in force specifications 710 may be used to designate how long a user 110 order may be valid. In a further implementation, the GUI 210 may display the definitions of a plurality of order time in force specification 710 characteristics so that the user 110 may select the appropriate order time in force specification for an emission or emission offset and emission or emission offset geolocation unit.

In some implementations, the user interface 210 may be used to select the order type specifications 720. The order type selections 720 may include one or more of the following: Limit, Market, Market if Touched (MIT); Snap to Market; Snap to Mid; Snap to Primary; Peg to Benchmark; and/or Adaptive Custom. In a further implementation, the GUI 210 may display the definitions of a plurality of order type specification 720 characteristics so that the user 110 may select the appropriate order type specification 720 for an emission or emission offset and emission or emission offset geolocation unit.

In some implementations, the user 110 may contact the "set" button 740 to transmit the emission or emission offset and emission or emission offset geolocation unit specification data by using the GUI 210. In such an implementation, the mobile computing device may instantiate instructions in its memory, and the mobile computing device 111 may then transmit emission or emission offset and emission or emission offset geolocation data through the network 214 or wireless GPS network 215 to call upon instruction routines and instruction sub-routines on the emission claim or carbon credit geolocation unit forward market and securities market database server 271, virtual hub database server 223, network member database server 222, map routing server, no arbitrage condition database server and/or instructions in the memory of the cloud and local CPUs 290. These elements may interface together to make a system configured to deliver transformed emission claim or carbon credit geolocation unit securities or forwards or derivatives to user(s) 110 from and to a plurality of virtual hubs 410, 422 with a plurality of specifications at specific market prices.

Figure 8:
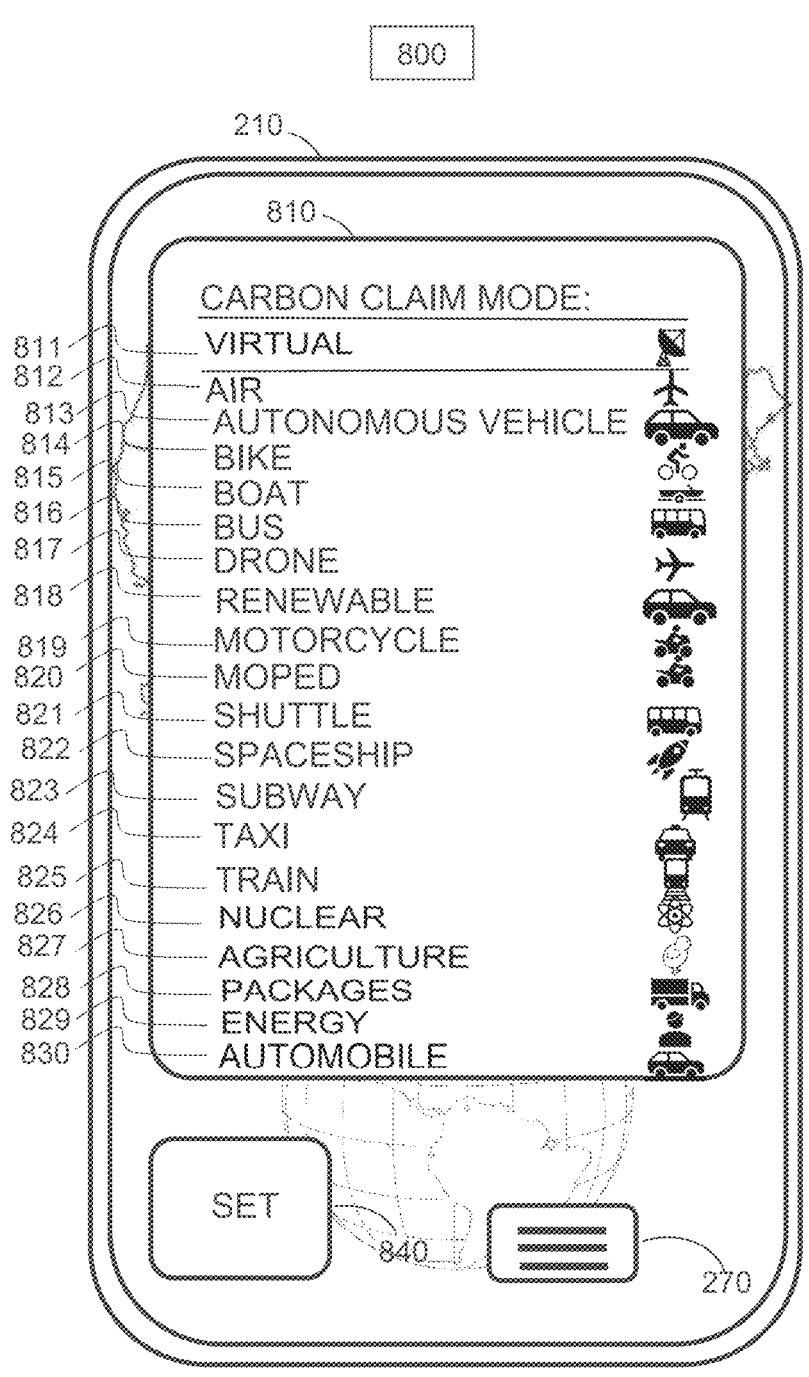

FIG. 8 illustrates the user interface 210 of a computing device in accordance with implementations of various techniques described herein. In particular, the user interface 210 may be used for selecting virtual hub emission claim or carbon credit geolocation unit modes 810 (a data transformation) on a portable multifunction device (e.g., a mobile computing device). Further, while the implementations disclosed herein may be discussed in terms of the user 110, the implementations may be used by other types of users, as well.

The user interface 210 may display and/or include one or more of the following elements: virtual hub emission claim or carbon credit geolocation unit modes 810 (a data transformation); setting button 840 to transmit the virtual hub emission claim or carbon credit geolocation unit modes 810; and/or the hamburger button 270 to instruct the GUI 210 to take the user 110 to the menu screen.

In some implementations, the user interface 210 may be used by the user 110 to select a plurality of virtual hub transformed emission claim or carbon credit geolocation unit modes 810. The virtual hub emission claim or carbon credit geolocation unit mode selections 810 may include one or more of the following: virtual meetings between two or more locations bridged over a network 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; and/or automobile 830. In one such implementation, a selection of a particular virtual hub emission claim or carbon credit geolocation unit mode may correspond to a selection by a user 110 for a virtual emission or emission offset and emission or emission offset geolocation unit relating to a mode or location of a claim incident. In another such implementation, the user 110 of a particular virtual hub emission claim or carbon credit geolocation unit mode may correspond to a bid on cargo 829 or package capacity 828 in any mode or multi-modal of transformed emission or emission offset and emission or emission offset geolocation between a combination of virtual emission claim or carbon credit geolocation claim unit hub locations. In some embodiments, the plurality of virtual hubs may be one hub or many hubs as relating to geolocation data for the claim data block chain. The user 110 may use one or more modes of transportation between a combination of virtual emission claim or carbon credit geolocation unit points. In some embodiments, the user 110 may select a virtual meetings between two or more locations bridged over a network 811 to earn carbon or emission credits and sell them to his employer so that the employer and employee can reduce their emissions footprint. In yet another embodiment, a user 100 may select a virtual meetings between two or more locations bridged over a network 811 to offset a business trip with a client and the client or the employer may offer to buy the credit to reduce the physical trip expense in addition to earning the carbon or emission offset credit.

In some implementations, the user 110 may contact the "set" button 840 to transmit the transformed emission or emission offset and emission or emission offset geolocation unit specification mode data by using the GUI 210. In such implementations, the mobile computing device may instantiate instructions in its memory, and the mobile computing device 210 may then transmit emission claim or carbon credit geolocation unit data through the network 214 or wireless GPS network 215 to call upon instruction routines and instruction sub-routines on the transportation forward market database server 271, virtual hub database server 223, network member database server 222, no arbitrage condition database server and/or instructions in the memory of the cloud and local CPUs 290. The elements may interface together to make a system configured to deliver transformed emission or emission offset and emission or emission offset geolocation unit securities, forwards, futures, swaps, options or other derivatives to users 110 from and to a plurality of virtual hubs 410, 422 with a plurality of specifications at specific market prices.

Figure 9:
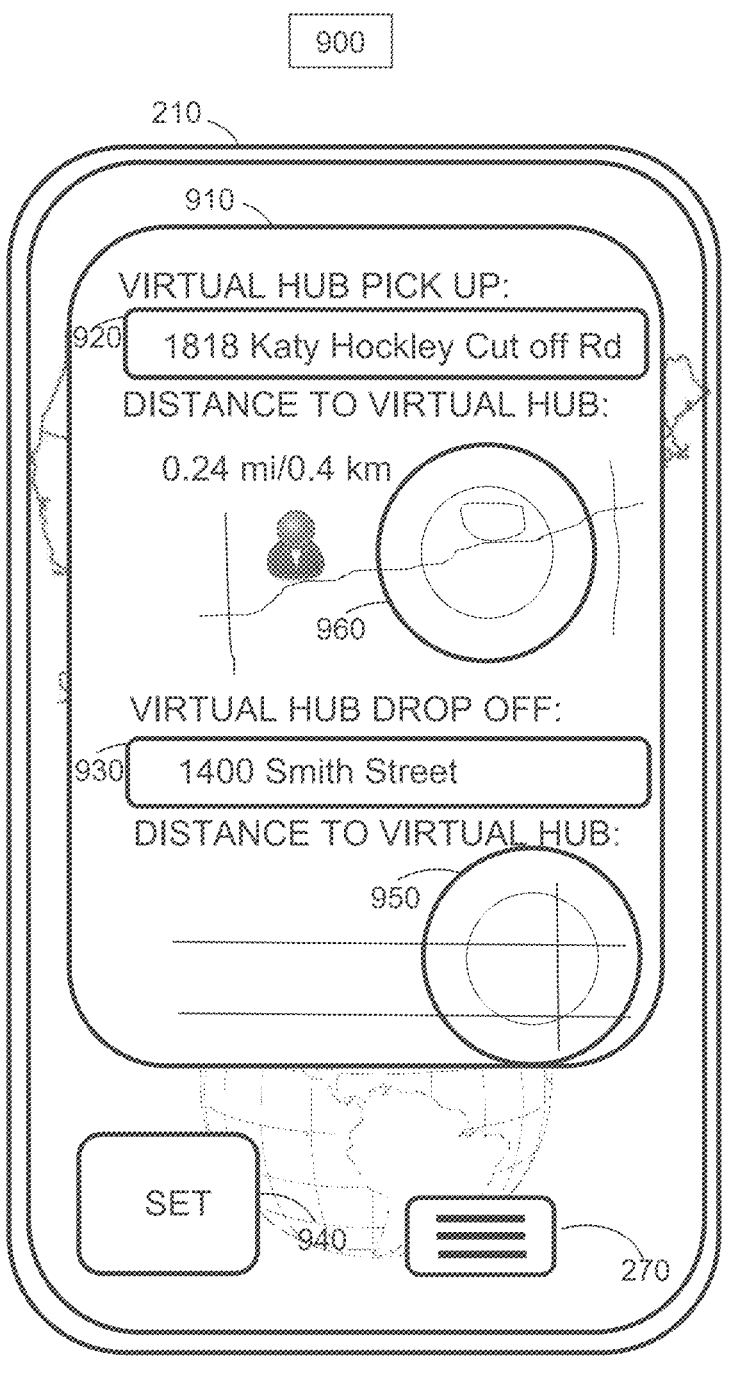

FIG. 9 illustrates the user interface 210 of a computing device in accordance with implementations of various techniques described herein. In particular, the user interface 210 may be used for identifying the distance the user 110 is from the virtual hub emission claim or carbon credit geolocation claim unit from a map and distance perspective on a portable multifunction device (e.g., a mobile computing device). Further, while the implementations disclosed herein may be discussed in terms of the user 110, the implementations may be used by other types of users, as well.

The user interface 210 may display and/or include one or more of the following: virtual hub emission claim or carbon credit geolocation unit pick up or origin display 910; virtual hub emission claim or carbon credit geolocation unit pick up or origin address 920; virtual hub emission claim or carbon credit geolocation unit drop off or digital epichain address 930; virtual hub emission claim or carbon credit geolocation unit pick-up or origin target zone 960; virtual hub transportation capacity drop-off or digital epichain target zone 950; setting button 940 to transmit the virtual hub emission claim or carbon credit geolocation unit addresses 920, 930; and/or hamburger button 270 to instruct the GUI 210 to take the user 110 to the menu screen.

In some implementations, the user interface 210 may be used by the user 110 to select a plurality of virtual hub emission claim or carbon credit geolocation unit address specifications 910. The virtual hub emission or emission offset and emission or emission offset geolocation unit address selections 910 may include one or more of the following: virtual hub pick up address 920; and/or virtual hub drop off address 930. The virtual hub emission claim or carbon credit geolocation unit addresses 920 and 930 may be changed before delivery of a virtual emission claim or carbon credit geolocation unit. The user interface map and address tool 910 may display the user's 110 distance from the address of the virtual emission claim or carbon credit geolocation unit hub, and the display may be used as a map to assist the user 110 in finding the location of the virtual emission claim or carbon credit geolocation unit hub for emissions claims or carbon credit data due diligence or data gathering. The user interface 210 may also display the virtual hub pick up zone 960 on a map in context to the user's 110 location. In addition, the user interface 210 displays the virtual hub drop off zone 950 on a map in context to the user's 110 location. In yet other embodiments, the virtual pick up hub 920 may be a home or business producing renewable energy as described in U.S. Patent Application Ser. No. 17,373,679, "Virtual Power Plant Optimization Method and System", filed Jul. 12, 2021 with the provisional filing its entirety filed Jul. 13, 2020 the contents of which are hereby incorporated by reference in their entirety and the power and carbon or emission offset unit may be synthetically created from a series of homes patched together on the grid to form with the geolocation properties and virtual power plant unit. In some implementations the virtual hub pick up may create a blockchain location event of a meal being consumed which the user 110 selects a plant based meal instead of a meat based meal thereby earning a carbon or emission offset credit or claim. In some embodiments, the meal and ingredients may be stored in a multi-dimension scan object linked device as described in U.S. Patent Application No. 63,181,866, "Multi-Function Device Legal Product Claim Blockchain", filed Apr. 29, 2021 the contents of which are hereby incorporated by reference in their entirety. In yet other embodiments, the food to blood or biomarker relationship may be measured, audited and placed in a blockchain with a plurality of biomarker devices as described in U.S. Patent Application No. 16,380,771, "Online Food and Beverage Search Method Based on Food to Biomarker Optimization Algorithms In A Node Ranked Database", filed Apr. 10, 2019 the contents of which are hereby incorporated by reference in their entirety. In yet other embodiments, the carbon or emission offset credit or claim may be verified by the relative improvement or worsening of the biomarker to serve as regulatory proof and the credit may be purchased or given as a tax credit or other means of currency and may be funded by Medicare, CMS, a government, a business, individual or insurance company who may purchase the carbon offset credit for compliance to become net-zero as well as creating an economic incentive to lower health insurance cost as the individual is improving in health from higher percentages of plant based consumption.

In some implementations, the user 110 may contact the "set" button 940 to transmit the emission claim or carbon credit geolocation unit specification address data by using the GUI (graphic user interface) 210. In such an implementation, the mobile computing device may instantiate instructions in its memory, and the mobile computing device 210 may then transmit emission or emission offset and emission or emission offset geolocation data through the network 214 or wireless GPS network 215 to call upon instruction routines and instruction sub-routines on the emission claim or carbon credit geolocation unit forward market or securities market database server 271, virtual hub database server 223, network member database server 222, map routing server, no arbitrage condition database server and/or instructions in the memory of the cloud and local CPUs 290. These elements may interface together to make a system configured to deliver emission or emission offset and emission or emission offset geolocation units to users 110 from and to a plurality of virtual hubs 410, 422 with a plurality of specifications at specific market prices.

Figure 10:
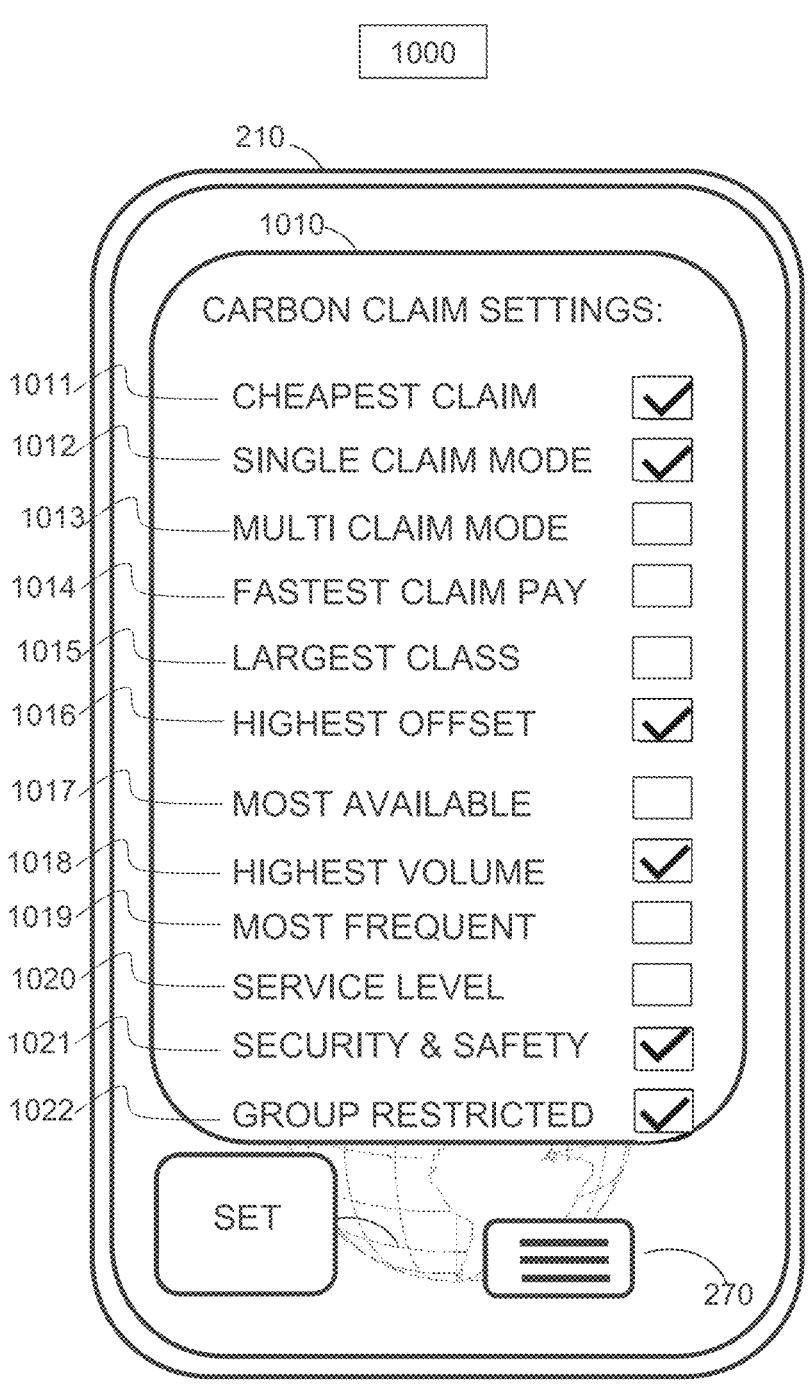

FIG. 10 illustrates the user interface 210 of a computing device in accordance with implementations of various techniques described herein. In particular, the user interface 210 may be used for identifying the constraints and no arbitrage settings 1010 that the user 110 selects on a portable multi-function device (e.g., a mobile computing device) (multiple data transformations). Further, while the implementations disclosed herein may be discussed in terms of the user 110, the implementations may be used by other types of users, as well.

The user interface 210 may display and/or include one or more of the following elements: constraint and no arbitrage settings 1010 (a data transformation); setting button 1040 to transmit the virtual hub emission claim or carbon credit geolocation unit constraints and no arbitrage settings 1010; and/or hamburger button 270 to instruct the GUI 210 to take the user 110 to the menu screen.

In some implementations, the user interface 210 may be used by the user 110 to select a plurality of virtual hub emission claim or carbon credit geolocation unit constraint and no arbitrage settings 1010. The virtual hub emission claim or carbon credit geolocation unit constraint and no arbitrage selections 1010 may include one or more of the following: cheapest claim by payout node ranking and default risk ranking 1011 (a data transformation); single claim mode by payout node ranking and default risk ranking 1012 (a data transformation); multi-claim mode by payout node ranking and default risk ranking 1013 (a data transformation); fastest claim pay by payout node ranking and default risk ranking 1014 (a data transformation); largest class or mass tort by payout node ranking and default risk ranking 1015 (a data transformation); highest rating by payout node ranking and default risk ranking 1016 (a data transformation); most available by payout node ranking and default risk ranking 1017 (a data transformation); highest volume by payout node ranking and default risk ranking 1018 (a data transformation); most frequent by payout node ranking and default risk ranking 1019 (a data transformation); service level by emission or emission offset work proceeding progress by payout node ranking and default risk ranking 1020 (a data transformation); and/or security and safety by payout node ranking and default risk ranking 1021 (a data transformation). In some implementations the claims may also be privately marketing to comply with securities laws with group restrictions 1022.

Selecting the lowest claim payout setting 1011 may initiate a standard cost minimization linear program (such as in the cloud and/or local CPUs 290), where the program may be used to assist the user 110 in completing the by payout node ranking and default risk ranking between two virtual hubs with the lowest claim payout which have been probability ranked in the database by low risk and low reward claim payout. Selecting the single mode setting 1012 may set a constraint that the user 110 wishes to complete the emission claim or carbon credit geolocation unit claim between two virtual hubs with only one mode of claim. Selecting the multi-claim mode setting 1013 may set a constraint that the user 110 wishes to complete the emission claim or carbon credit geolocation unit claim between two virtual hubs with more than one mode of claim type such as vehicle type or truck or boat or aircraft or other location such as home or work in a workmans' comp claim. Selecting the fastest claim pay setting 1014 may initiate the use of a standard linear programming equation (such as by the cloud and/or local CPUs 290), where the equation may be used to minimize time for the user 110 to receive claim payout as ranked by the multi-factor node database for claim correlation and payout probability rating in completing the emission claim or carbon credit geolocation unit claim between two virtual hubs with the shortest time or with the least amount of carbon or other types of emissions. In addition, the settings 1010 may set instructions for the price-based emission claim or carbon credit geolocation unit claim index and GUI presentation on the interface 210.

Selecting the largest class or mass tort setting 1015 may initiate the use of an algorithm (such as by the cloud and/or local CPUs 290) to determine the highest ratings for a emission claim or carbon credit geolocation unit claim payout or lowest risk of default in a node ranked ordered list, where the algorithm may be used to assist the user 110 in completing the transformed emission claim or carbon credit geolocation unit claim between two virtual hubs with the highest risk or lowest risk rating depending on the users 110 selection. Selecting the highest rating setting 1016 may initiate the use of a rating algorithm (such as by the cloud and/or local CPUs 290), where the algorithm may be used to assist the user 110 in completing the emission claim or carbon credit geolocation unit claim between two virtual hubs with the highest risk or lowest risk rating. Selecting the most available setting 1017 may initiate the use of an algorithm (such as by the cloud and/or local CPUs 290) to search for the emission claim or carbon credit geolocation unit claim with the most emission claim or carbon credit geolocation unit claims, where the algorithm may be used to assist the user 110 in completing the emission claim or carbon credit geolocation unit claim between two virtual hubs with the most available emission claim or carbon credit geolocation claim units. Selecting the highest volume setting 1018 may initiate the use of an algorithm (such as by the cloud and/or local CPUs 290), where the algorithm may be used to select the emission claim or carbon credit geolocation unit claim with the highest volume of participants to assist the user 110 in completing the transformed emission claim or carbon credit geolocation unit claim between two virtual hubs with the largest number of users 110. Selecting the most frequent setting 1019 may initiate the use of a most frequent route analysis (such as by the cloud and/or local CPUs 290) from a timing constraint perspective, where the analysis may be used to assist the user 110 in completing the emission claim or carbon credit geolocation unit claim between two virtual hubs with the most frequent number of claims.

Selecting the service level setting 1020 may be used (such as by the cloud and/or local CPUs 290) to align the constraint and to select the service level in order to assist the user 110 in completing the emission claim or carbon credit geolocation unit claim between two virtual hubs with the correct level of service. Selecting the security and safety setting 1021 may initiate safety and security algorithms (such as by the cloud and/or local CPUs 290) on the user 110 based on block chain performance of plaintiffs and defendants, where the algorithms may be used to assist the user 110 in completing the emission claim or carbon credit geolocation unit claim between two virtual hubs with the highest level of safety and security. Selecting the group restricted setting 1022 may initiate grouping limitation algorithms (such as by the cloud and/or local CPUs 290) on the user's 110 market auction based on limiting the pool of plaintiffs and defendants, where the algorithms may be used to assist the user 110 in completing the emission or emission offset and emission or emission offset geolocation unit between two virtual hubs with a limit on the pool of available users. In some implementations, a plurality of settings 1010 which transform the data may be sequenced for presenting as a transformed market or as a transformed market as a layer on a navigation system with indexed claims based on price. A user's 110 pool for group restricted settings 1022 (a data transformation) may limit the user pool displayed by email, security, sex, rating, or a plurality of other restrictions.

The user 110 may contact the "set" button 1040 to transmit the emission or emission offset and emission or emission offset geolocation unit security specification constraint and arbitrage data by using the GUI 210. The mobile computing device may instantiate instructions in its memory, and the mobile computing device may then transmit emission claim or carbon credit geolocation unit claim security or forward and safety data through the network 214 or wireless GPS network 215 to call upon instruction routines and instruction sub-routines on the emission claim or carbon credit geolocation unit claim forward market or security market database server 271, virtual hub database server 223, network member database server 222, map routing server, no arbitrage condition database server and/or instructions in the memory of the cloud and local CPUs 290. These elements may interface together to make a system configured to deliver emission or emission offset and emission or emission offset geolocation units to users 110 from and to a plurality of virtual hubs 410, 422 with a plurality of specifications at specific market prices in an auction format.

Figure 11:
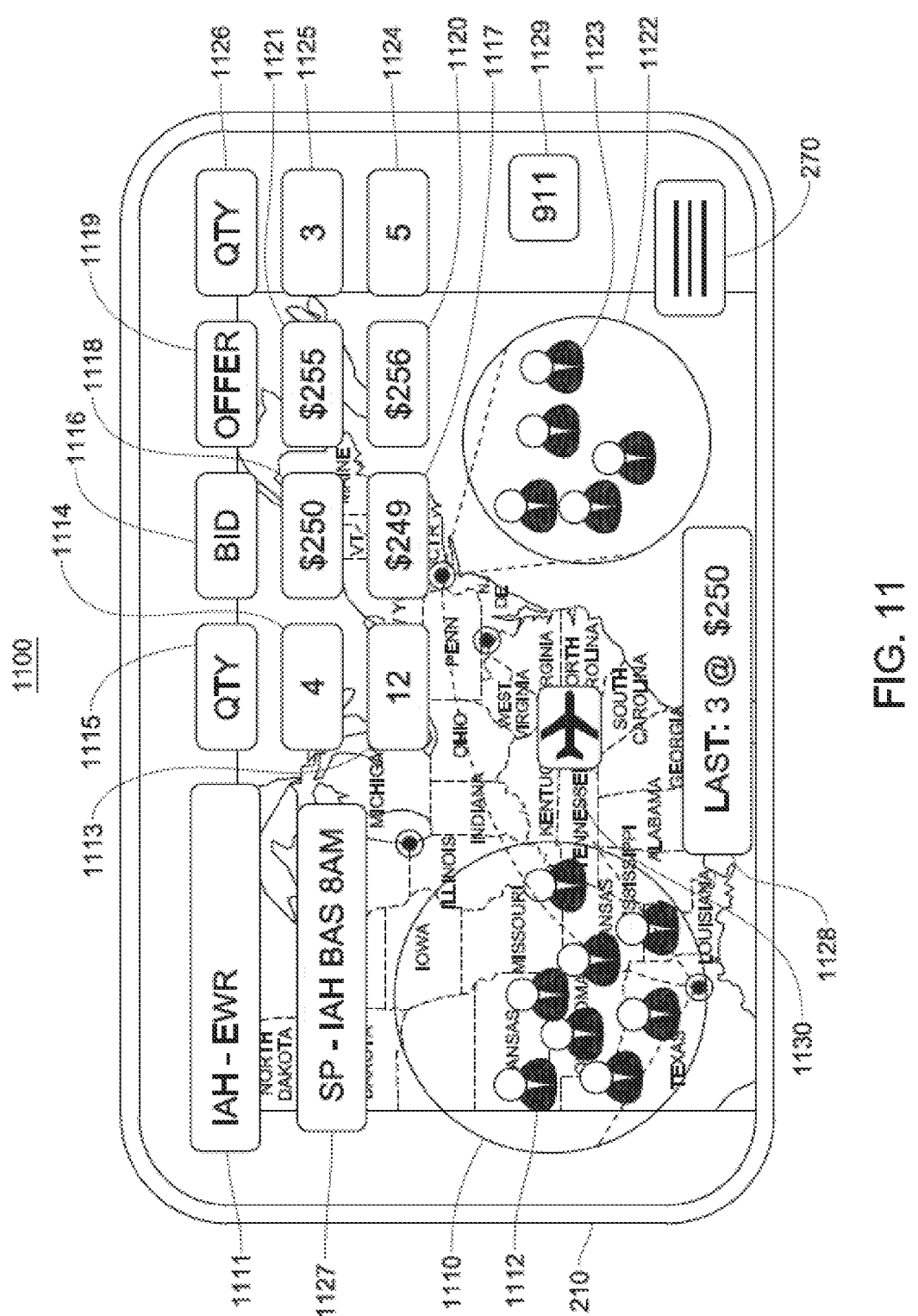

FIG. 11 illustrates the user interface 210 of a computing device in accordance with implementations of various techniques described herein. In particular, the user interface 210 may be used for participating, transacting and/or trading transformed emission or emission offset and emission or emission offset geolocation unit as a physical forward commodity or security between combinations of virtual hubs over various emission or emission offset and emission or emission offset geolocation unit modes. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub combination 1111; a virtual hub origin/from location 1110 with users 1112 within the virtual hub location 1110; a specification summary of the market, claim type such as Houston to New York virtual transportation offset credit claim 1127; a mode of virtual meetings comparative to airline emission or emission offset and emission or emission offset geolocation type 1130; a transaction summary of the last trades quantity and price 1128; a virtual hub claim origin and digital epichain location 1122 and user who is party to the claim on the emission or emission offset and emission or emission offset geolocation unit 1123; a bid/buy quantity title header 1115 for a virtual emission or emission offset and emission or emission offset geolocation unit hub market; a bid/buy price title header 1116 for a virtual emission or emission offset and emission or emission offset geolocation unit hub market; an offer/sell price title header 1119 for a virtual emission or emission offset and emission or emission offset geolocation unit hub market; and/or an offer/sell quantity title header 1126 for a virtual emission or emission offset and emission or emission offset geolocation unit hub market.

The user interface may also display and/or include one or more of the following elements: a bid/buy quantity 1114 for the best bid quantity from a plurality of users 110 for a emission or emission offset and emission or emission offset geolocation virtual hub combination that has undergone a plurality of data transformations using implementations described herein; a bid/buy quantity 1113 for the second-best bid quantity from a plurality of users 110 for a emission or emission offset and emission or emission offset geolocation claim unit virtual hub combination that has undergone a plurality of data transformations using implementations described herein; a bid/buy price 1118 for the best bid price from a plurality of users 110 for a emission or emission offset and emission or emission offset geolocation claim unit virtual hub combination that has undergone a plurality of data transformations using implementations described herein; and/or a bid/buy price 1117 for the second-best bid price from a plurality of users 110 for a emission or emission offset and emission or emission offset geolocation virtual hub combination that has undergone a plurality of data transformations using implementations described herein.

In addition, the user interface may display and/or include one or more of the following elements: an offer/sell price 1121 for the best offer price from a plurality of users 110 for a emission or emission offset and emission or emission offset geolocation virtual hub combination that has undergone a plurality of data transformations using implementations described herein; an offer/sell price 1120 for the second-best offer price from a plurality of users 110 for a emission or emission offset and emission or emission offset geolocation virtual hub combination that has undergone a plurality of data transformations using implementations described herein; an offer/sell quantity 1125 for the best offer quantity from a plurality of users 110 for a emission or emission offset and emission or emission offset geolocation virtual hub combination that has undergone a plurality of data transformations using implementations described herein; an offer/sell quantity 1124 for the second-best offer quantity from a plurality of users 110 for a emission or emission offset and emission or emission offset geolocation virtual hub combination that has undergone a plurality of data transformations using implementations described herein; a safety dispatch "911" button 1129 to enact video and audio recording of the user 110 environment and dispatch of that information to authorities; and/or a hamburger menu button 270 to move back to menu options and settings away from the participation, transaction, trading auction GUI 210.

In some implementations, the user 110 may enter a transaction quantity and price for a transformed emission or emission offset and emission or emission offset geolocation unit securities in order to participate, transact and/or trade via the GUI 210, where the GUI 210 may detect the user's 110 contact or audio interface with the bid/buy price 1118 or the offer/sell price 1121. The GUI 210 may detect the user's 110 contact with any of the buttons of the GUI 210 mentioned above. Upon user contact or audio interface with the buttons on the GUI 210, instructions may be instantiated in the memory of the device, which may allow the user 110 to change the specifications of the respective virtual hub combination 1111.

A plurality of prices and markets may be presented based on a plurality of emission or emission offset and emission or emission offset geolocation claim unit contract specifications. In some implementations, the best bid/buy price 1118 may be moving up in price or down in price depending on the market conditions at any given time. The last trade or last transacted price for a given specification may be listed to inform the user 110 as to how the market is moving, which may allow the user 110 to submit a competitive offer/selling price 1121 or bid/buying price 1118. In some implementations, the user 110 may adjust settings of the GUI 210 to show more bid/buying prices 1117 or more offer/selling prices 1120. The matrix of market quantities and prices 1113, 1114, 1115, 1116, 1117, 1118, 1119, 1120, 1121, 1124, 1125, 1126 displayed in the GUI 210 may be referred to as market depth. In a further implementation, the number of users 110 may be displayed as user icons 1112 or 1123 for the people logged in who desire to transact, trade or participate in a given virtual hub emission or emission offset geolocation claim unit 1110 to virtual hub 1122 combination.

Users 110 may select the emission or emission offset geolocation claim unit mode 1130, such that GUI 210 displays a market for one form of emission or emission offset geolocation claim units as a commodity or security. In a further implementation, the GUI 210 may show multiple forms of emission or emission offset geolocation claim units between two virtual emission or emission offset geolocation claim unit hubs 1110, 1111, 1122.

In some implementations, the user 110 may select the 911 button 1129, which may activate voice and video recording functions on the mobile computing device and transmit the data with a confirmation from the user 110 to the authorities to provide enhanced security while participating, transacting or trading transformed forward emission or emission offset geolocation claim units as a commodity or security. The user may toggle between the GUI 210 market view screen in FIG. 11 and other menu 270 options and settings by the user 110 selecting the hamburger button 270, with the mobile computing device detecting the user 110 input/contact or audio instruction. In some implementations, the mobile computing device may instantiate instructions in its memory, and the device may then transmit the emission or emission offset and emission or emission offset geolocation data through the network 214 such as through the device accelerometer 11721 or GPS position coordinates from the GPS receiver 11720 or camera 11712 or microphone 11709 and coordinate speed changes that corroborate with the accelerometer 11721 or GPS receiver 11720 or camera 11712 or microphone 11709 to notify the user of a potential claim from the travel triangulation data or wireless GPS network 215 to call upon instruction routines and instruction sub-routines on the emission or emission offset geolocation claim unit forward market or securities market database server 271, virtual hub database server 223, network member database server 222, map routing server, no arbitrage condition database server and/or instructions in the memory of the cloud and local CPUs 290. In some embodiments the device accelerometer 11721 or GPS position coordinates from the GPS receiver 11720 or camera 11712 or microphone 11709 and coordinate speed changes that corroborate with the device accelerometer 11721 or GPS receiver 11720 or camera 11712 or microphone 11709 to node rank the claim incident by quality of data underlying the claim which then may associate with a quality ranking or security interest for the claim. In some embodiments, algorithms will coordinate the instructions to formulate the claim from the device accelerometer 11721 or GPS position coordinates from the GPS receiver 11720 or camera 11712 or microphone 11709 and coordinate speed changes that corroborate with the device accelerometer 11721 or GPS receiver 11720 or camera 11712 or microphone 11709 to node rank the claim incident by quality of data and instruction signals such as is covered in FIG. 160 which is discussed in detail later in the specification. In yet other embodiments, data may be ascertained in the carbon or emission claim block chain rankings such as personal health records or carbon purchase or sale records 15760, motor vehicle crash reports 15750, electronic health records 15770 and dietary and medication ingestion data 15780 or other claim data in the blockchain. In some embodiments, these elements may interface together to make a system configured to deliver emission or emission offset geolocation claim units to users 110 from and to a plurality of virtual hubs 1110, 1122 with a plurality of specifications at specific market prices.

Figure 12:
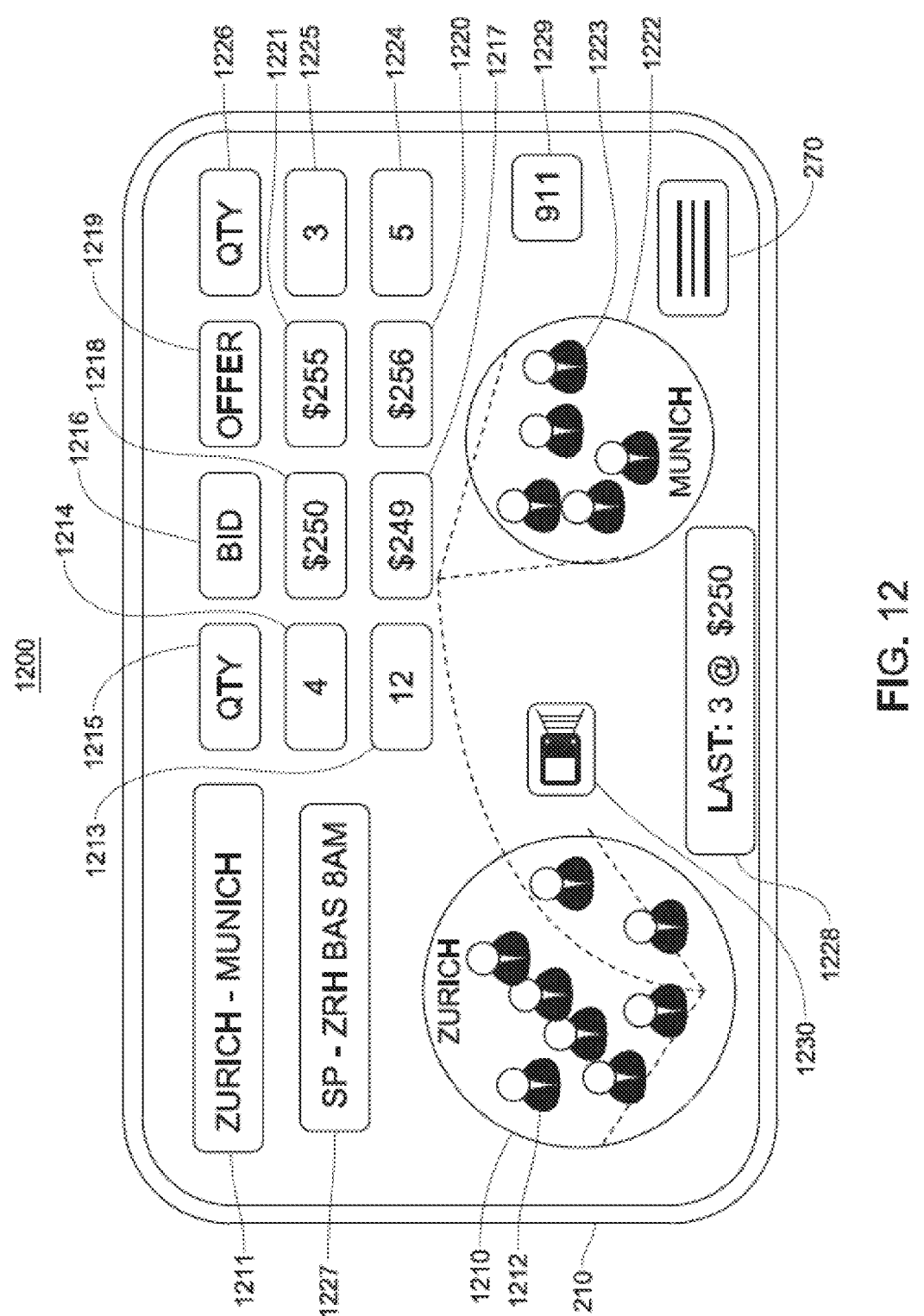

FIG. 12 illustrates a user interface 210 of a computing device in accordance with implementations of various techniques described herein. In particular, the user interface 210 may be used for participating, transacting, and/or trading transformed emission or emission offset and emission or emission offset geolocation exchange units as a physical forward commodity or security between combinations of virtual hubs over various emission or emission offset and emission or emission offset geolocation exchange unit modes. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub claim combination 1211; a virtual hub claim origin/from location 1210 with users 1212 within the virtual hub location 1210; a specification summary of the emission or emission offset claim market, level of service and claim time of commencement for a wireless emission or emission offset claim specification 1227; a mode of emission or emission offset claim type 1230; a transaction summary of the last trades quantity and price 1228; a virtual hub destination/to location 1222 and user who is being delivered on the emission or emission offset and emission or emission offset geolocation unit 1223; a bid/buy quantity title header 1215 for a virtual emission or emission offset and emission or emission offset geolocation exchange unit hub market; a bid/buy price title header 1216 for a virtual emission or emission offset and emission or emission offset geolocation exchange unit hub market; an offer/sell price title header 1219 for a virtual emission or emission offset and emission or emission offset geolocation exchange unit hub market; and/or an offer/sell quantity title header 1226 for an exemplary virtual emission or emission offset and emission or emission offset geolocation exchange unit hub market.

The user interface may also display and/or include one or more of the following elements: a bid/buy quantity 1214 for the best bid quantity from a plurality of users 110 for a emission or emission offset and emission or emission offset geolocation virtual hub combination that has undergone a plurality of data transformations using implementations described herein; a bid/buy quantity 1213 for the second-best bid quantity from a plurality of users 110 for a emission or emission offset and emission or emission offset geolocation virtual hub combination that has undergone a plurality of data transformations using implementations described herein; a bid/buy price 1218 for the best bid price from a plurality of users 110 for a emission or emission offset and emission or emission offset geolocation virtual hub combination that has undergone a plurality of data transformations using implementations described herein; and/or an bid/buy price 1217 for the second-best bid price from a plurality of users 110 for a emission or emission offset and emission or emission offset geolocation virtual hub combination that has undergone a plurality of data transformations using implementations described herein.

In addition, the user interface may display and/or include one or more of the following elements: an offer/sell price 1221 for the best offer price from a plurality of users 110 for a emission or emission offset and emission or emission offset geolocation virtual hub combination that has undergone a plurality of data transformations using implementations described herein; an offer/sell price 1220 for the second-best offer price from a plurality of users 110 for a emission or emission offset and emission or emission offset geolocation virtual hub combination that has undergone a plurality of data transformations using implementations described herein; an offer/sell quantity 1225 for the best offer quantity from a plurality of users 110 for a emission or emission offset and emission or emission offset geolocation virtual hub combination that has undergone a plurality of data transformations using implementations described herein; an offer/sell quantity 1224 for the second-best offer quantity from a plurality of users 110 for a emission or emission offset and emission or emission offset geolocation virtual hub claim combination that has undergone a plurality of data transformations using implementations described herein; a safety dispatch "911" button 1229 to enact video and audio recording of the user 110 environment and dispatch of that information to authorities; and/or a hamburger menu button 270 to move back to menu options and settings away from the participation, transaction, trading GUI 210.

In some implementations, the user 110 may enter a transaction quantity and price for an emission or emission offset and emission or emission offset geolocation claim units in order to participate, transact and/or trade via the GUI 210, where the GUI 210 may detect the user's 110 contact with a bid/buy price 1218 or offer/sell price 1221. The GUI 210 may detect the user's 110 contact with any of the GUI 210 buttons mentioned above. Upon user contact with the buttons or audio interface on the GUI 210, instructions are instantiated in the memory of the device which allow the user 110 to change the specifications of the respective virtual hub emission or emission offset and emission or emission offset geolocation claim unit combination 1211.

A plurality of transformed prices and transformed markets may be presented based on a plurality of transformed contract emission or emission offset and emission or emission offset geolocation claim unit specifications. In some implementations, the best bid/buy price 1118 may be moving up in price or down in price depending on the market conditions at any given time. The last trade or last transacted price for a given specification may be listed to inform the user 110 as to how the market is moving, which may allow the user 110 to submit a competitive offer/selling price 1221 or bid/buying price 1214. In some implementations, the user 110 may adjust settings of the GUI 210 to show more bid/buying prices 1217 or more offer/selling prices 1120. The matrix of market quantities and prices 1213, 1214, 1215, 1216, 1217, 1218, 1219, 1220, 1221, 1224, 1225, 1226 displayed in the GUI 210 may be referred to as market depth.

In a further implementation, the number of users 110 may be displayed as user icons 1212 or 1223 for the people logged in who desire to transact, trade or participate in a given virtual hub 1210 to virtual hub emission or emission offset and emission or emission offset geolocation claim unit 1222 combination. Users 110 may select the transportation mode 1230, such that the GUI 210 displays a market for one form or mode of emission or emission offset and emission or emission offset geolocation claim unit as a commodity or security. In a further implementation, the GUI 210 may show multiple forms (multi-modal) of emission or emission offset and emission or emission offset geolocation claim units between virtual emission or emission offset and emission or emission offset geolocation claim unit hubs 1210, 1211, 1222.

In some implementations, the user 110 may select the 911 button 1229, which may activate voice and video recording functions on the mobile computing device and transmit the data with a confirmation from the user 110 to the authorities to provide enhanced security while participating, transacting or trading transformed forward emission or emission offset and emission or emission offset geolocation claim units as a commodity or security. The user may toggle between the GUI 210 market view screen in FIG. 12 and other menu 270 options and settings by the user 110 selecting the hamburger button 270, with the mobile computing device detecting the user 110 input/contact or audio instructions. In some implementations, the mobile computing device may instantiate instructions in its memory, and the device may then transmit emission or emission offset and emission or emission offset geolocation data through the network 214 or wireless GPS network 215 to call upon instruction routines and instruction sub-routines on the emission or emission offset and emission or emission offset geolocation claim unit forward market or securities market database server 271, virtual hub database server 223, network member database server 222, map routing servers, no arbitrage condition database server and/or instructions in the memory of the cloud and local CPUs 290. These elements may interface together to make a system configured to deliver emission or emission offset and emission or emission offset geolocation units to users 110 from and to a plurality of virtual hubs 1210, 1222 with a plurality of specifications at specific market prices.

Figure 13:
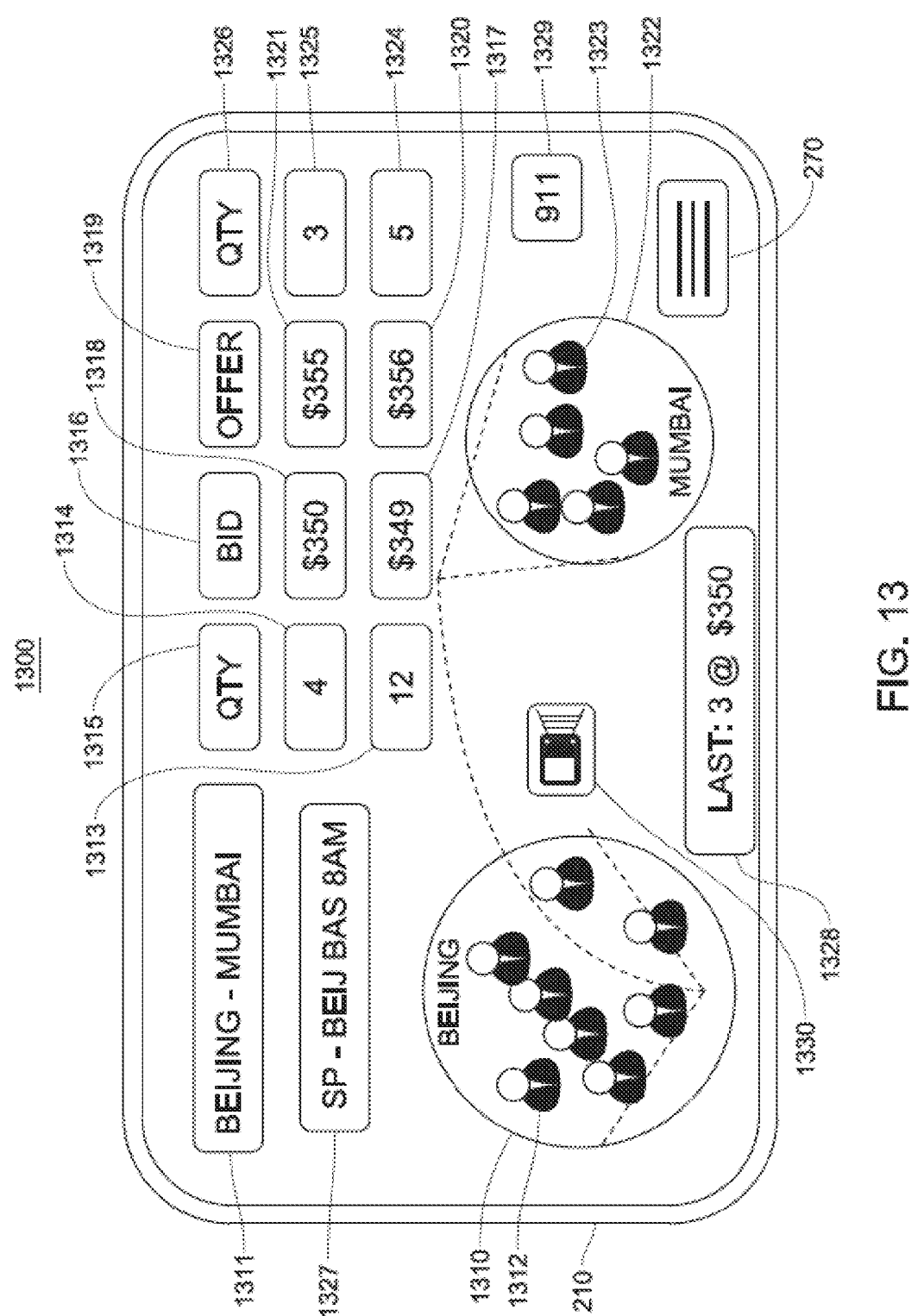

FIG. 13 illustrates the user interface 210 of a computing device in accordance with implementations of various techniques described herein. In particular, the user interface 210 may be used for participating, transacting, and/or trading transformed emission or emission offset and emission or emission offset geolocation claim units as a physical forward commodities or securities between combinations of virtual hubs over various emission or emission offset and emission or emission offset geolocation claim unit modes. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a emission or emission offset and emission or emission offset geolocation claim unit virtual hub combination 1311; a virtual hub origin/from location 1310 with users 1312 within the virtual hub location 1310; a specification summary 1327 of the market, level of service and time of delivery commencement; a mode of Medicare secondary payer claim type 1330; a transaction summary 1328 of the last trades quantity and price; a virtual hub destination/to location 1322 and user who is being delivered on the emission or emission offset and emission or emission offset geolocation claim unit 1323; a bid/buy quantity title header 1315 for a virtual emission or emission offset and emission or emission offset geolocation claim unit hub market; a bid/buy price title header 1316 for a virtual emission or emission offset and emission or emission offset geolocation claim unit hub market; an offer/sell price title header 1319 for a virtual emission or emission offset and emission or emission offset geolocation claim unit hub market; and/or an offer/sell quantity title header 1326 for a virtual emission or emission offset and emission or emission offset geolocation claim unit hub market.

The user interface 210 may also display and/or include one or more of the following elements: a bid/buy quantity 1314 for the best bid quantity from a plurality of users 110 for a emission or emission offset and emission or emission offset geolocation claim unit virtual hub combination that has undergone a plurality of data transformations using implementations described herein; a bid/buy quantity 1313 for the second-best bid quantity from a plurality of users 110 for a emission or emission offset and emission or emission offset geolocation claim unit virtual hub combination that has undergone a plurality of data transformations using implementations described herein; a bid/buy price 1318 for the best bid price from a plurality of users 110 for a emission or emission offset and emission or emission offset geolocation claim unit virtual hub combination that has undergone a plurality of data transformations using implementations described herein; and/or a bid/buy price 1317 for the second-best bid price from a plurality of users 110 for a emission or emission offset and emission or emission offset geolocation claim unit virtual hub combination that has undergone a plurality of data transformations using implementations described herein.

In addition, the user interface may display and/or include one or more of the following elements: an offer/sell price 1321 for the best offer price from a plurality of users 110 for a emission or emission offset and emission or emission offset geolocation claim unit virtual hub combination that has undergone a plurality of data transformations using implementations described herein; an offer/sell price 1320 for the second-best offer price from a plurality of users 110 for a emission or emission offset and emission or emission offset geolocation claim unit virtual hub combination that has undergone a plurality of data transformations using implementations described herein; an offer/sell quantity 1325 for the best offer quantity from a plurality of users 110 for a emission or emission offset and emission or emission offset geolocation claim unit virtual hub combination that has undergone a plurality of data transformations using implementations described herein; an offer/sell quantity 1324 for the second-best offer quantity from a plurality of users 110 for a emission or emission offset and emission or emission offset geolocation claim unit virtual hub combination that has undergone a plurality of data transformations using implementations described herein; a safety dispatch "911" button 1329 to enact video and audio recording of the user's 110 environment and dispatch of that information to authorities; and/or a hamburger menu button 270 to move back to menu options and settings away from the participation, transaction, trading GUI 210.

In some implementations, the user 110 may enter a transaction quantity and price for an emission or emission offset and emission or emission offset geolocation claim unit in order to participate, transact and/or trade via the GUI 210, where the mobile computing device (e.g., via the GUI 210) may detect the user's 110 contact or audio instructions with the bid/buy price 1318 or the offer/sell price 1321. The mobile computing device may detect the user's 110 contact with any of the GUI 210 buttons mentioned above. Upon user contact or audio interface with the buttons or audio instructions on the GUI 210, instructions may be instantiated in the memory of the device, which may allow the user 110 to change the specifications of the respective emission or emission offset and emission or emission offset geolocation claim unit virtual hub combination 1311.

A plurality of prices and markets may be presented based on a plurality of transformed contract emission or emission offset and emission or emission offset geolocation claim unit specifications. In some implementations, the best bid/buy price 1318 may be moving up in price or down in price depending on the market conditions at any given time. The last trade or last transacted price for a given transformed specification may be listed to inform the user 110 as to how the market is moving, which may allow the user 110 to submit a competitive offer/selling price 1321 or bid/buying price 1318. In some implementations, the user 110 may adjust settings of the GUI 210 to show more bid/buying prices 1317 or more offer/selling prices 1320. The matrix of market quantities and prices 1313, 1314, 1315, 1316, 1317, 1318, 1319, 1320, 1321, 1324, 1325, 1326 displayed in the GUI 210 may be referred to as market depth.

In a further implementation, the number of users 110 may be displayed as user icons 1312 or 1323 for the people logged in who desire to transact, trade or participate in a given emission or emission offset and emission or emission offset geolocation claim unit virtual hub 1310 to emission or emission offset and emission or emission offset geolocation claim unit virtual hub 1322 transformed combination. Users 110 may select the transportation mode 1330, such that the GUI 210 displays a market for one form of emission or emission offset and emission or emission offset geolocation claim unit as a commodity or security. In a further implementation, to the GUI 210 may show multiple forms of transformed emission or emission offset and emission or emission offset geolocation claim unit or securities between one or more virtual emission or emission offset and emission or emission offset geolocation claim unit capacity hubs 1310, 1311, 1322.

In another implementation, transformed emissions claims or carbon credit geolocation units or transformed emissions claims or carbon credit geolocation unit securities may be substitutable between modes if specifications or security cash flows meet the grade category of the transformed emissions claims or carbon credit geolocation unit specification or transformed emissions claims or carbon credit geolocation unit security. For example, a user 110 may have bought a transformed emissions claims or carbon credit geolocation unit with a specification and the delivery mechanism was a physical location digital epichain summons or claim credit record. However, the physical location digital epichain summons record user 110 may buy back their transformed emissions claims or carbon credit geolocation unit or transformed emissions claims or carbon credit geolocation unit security, allowing the original purchaser to be matched with a physical digital epichain location summons of another user 110 who will deliver the transformed emissions claims or carbon credit geolocation unit or transformed emissions claims or carbon credit geolocation unit security. The modes of transportation discussed above, including a bus, train, airplane, car, and/or a plurality of other modes, may be substitutable if the transformed emissions claims or carbon credit geolocation unit or transformed emissions claims or carbon credit geolocation unit security meets the delivery transformed specification grade.

In some implementations, the user 110 may select the 911 button 1329, which may activate voice interface and video recording functions on the mobile computing device and transmit the data with a confirmation from the user 110 to the authorities to provide enhanced security while participating, transacting or trading forward emissions claims or carbon credit geolocation units as a commodity or security. The user may toggle between the GUI 210 market view screen in FIG. 13 and other menu 270 options and settings by the user 110 selecting the hamburger button 270, with the mobile computing device detecting the user 110 input or contact. In some implementations, the mobile computing device may instantiate instructions in its memory, and the device may then transmit the emission or emission offset and emission or emission offset geolocation data through the network 214 or wireless GPS network 215 to call upon instruction routines and instruction sub-routines on the emissions claims or carbon credit geolocation unit forward market or securities market database server 271, virtual hub database server 223, network member database server 222, map routing servers, no arbitrage condition database server and/or instructions in the memory of the cloud and local CPUs 290. The elements may interface together to make a system configured to deliver emission or emission offset and emission or emission offset geolocation units to users 110 from and to a plurality of virtual hubs 1310, 1322 with a plurality of specifications at specific market prices.

Figure 14:
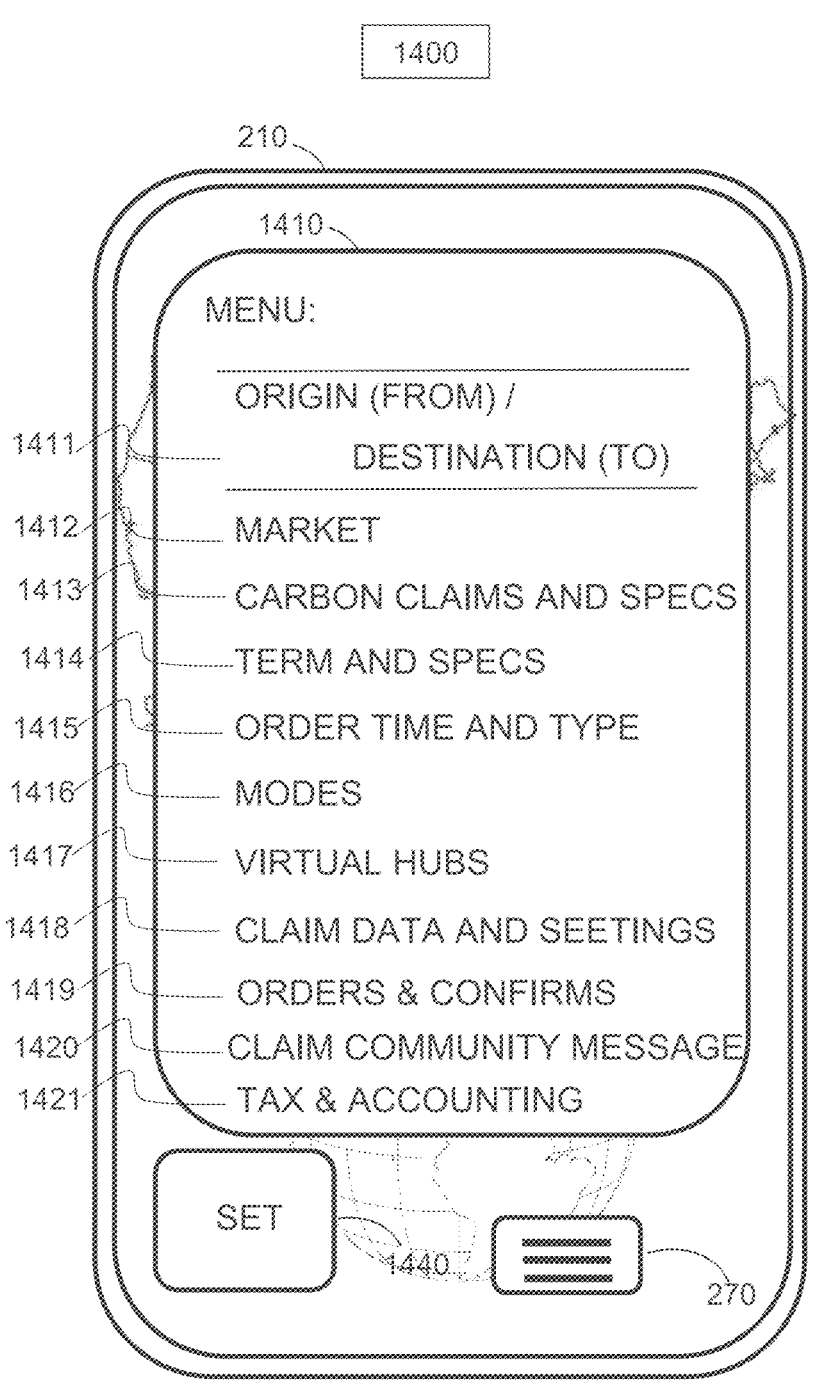

FIG. 14 illustrates a user interface 210 of a computing device in accordance with implementations of various techniques described herein. In particular, the user interface 210 may be used for selecting market menu options 1410 on a portable multifunction device (e.g., a mobile computing device). Further, while the implementations disclosed herein may be discussed in terms of the user 110, the implementations may be used by other types of users, as well.

The user interface 210 may display and/or include one or more of the following elements: menu options 1410; origin (from)/destination (to) menu option 1411; market menu option 1412; carbon claim specs menu option 1413; term and specs menu option 1414; order time and type menu option 1415; modes menu option 1416; virtual hubs menu option 1417; no arb settings menu option 1418; orders and confirms menu option 1419; pool message menu option 1420; tax and accounting menu option 1421; setting button 1440 to transmit the menu option; and/or hamburger button 270 to instruct the GUI 210 to take the user 110 to the menu screen.

In some implementations, the user interface 210 may be used by the user 110 to select a plurality of menu options 1410. The user 110 may select the claim origin (from)/digital epichain destination (to) menu option 1411, which may lead to the GUI 210 displaying an address input rendering (e.g., address input rendering 910 and/or FIG. 2). The user 110 may select the "market" menu option 1412, which may lead to the GUI 210 displaying a market participation, transaction and/or trading rendering (e.g., as shown in FIG. 4, 11, 12, or 13). The user may toggle between the GUI 210 market view screen in FIG. 14 and other menu options and settings by the user 110 selecting the hamburger button 270, where the mobile computing device may detect the user's 110 input or contact with the GUI 210. The user 110 may select the claims and spec menu option 1413, which may lead to the GUI 210 displaying a claims and specs rendering (e.g., as shown in FIG. 5). The user 110 may select the term and specs menu option 1414, which may lead to the GUI 210 displaying a term and specs rendering (e.g., as shown in FIG. 6). The user 110 may select the order time and type menu option 1415, which may lead to the GUI 210 displaying an order time and type rendering (e.g., as shown in FIG. 7).

The user 110 may select the modes menu option 1416, which may lead to the GUI 210 displaying a mode rendering (e.g., as shown in FIG. 13). The user 110 may select the virtual hubs menu option 1417, which may lead to the GUI 210 displaying a virtual hubs rendering (e.g., as shown in FIG. 9). The user 110 may select the claim data and settings menu option 1418, which may lead to the GUI 210 displaying a no arbitrage constraint rendering (e.g., as shown in FIG. 10). The user 110 may select the orders and confirms menu option 1419, which may lead to the GUI 210 displaying the market orders and transaction confirmations for the user 110. The user 110 may select the claim pool community object message menu option 1420, which may lead to the GUI 210 displaying a message to either the actual emissions claims or carbon credit geolocation unit, the opposite seller user, or buyer user, depending on if the user 110 was an opposite buyer or seller of the emissions claims or carbon credit geolocation unit. The user 110 may select the tax and accounting menu option 1421, which may lead to the GUI 210 displaying tax and accounting information for the user 110.

Selecting a particular menu option 1410 may lead to the mobile computing device instantiating instructions in its memory, and the mobile computing device may then transmit emissions claims or carbon credit geolocation unit data through the network 214 or wireless GPS network 215 to call upon instruction routines and instruction sub-routines on the emissions claims or carbon credit geolocation unit forward market database or securities market server 271, virtual hub database server 223, network member database server 222, map routing server, no arbitrage condition database server and/or instructions in the memory of the cloud and local CPUs 290. The elements may interface together to make a system configured to deliver emission or emission offset and emission or emission offset geolocation units or securities to users 110 from and to a plurality of virtual hubs 410, 422 with a plurality of specifications at specific market prices.

Figure 15:
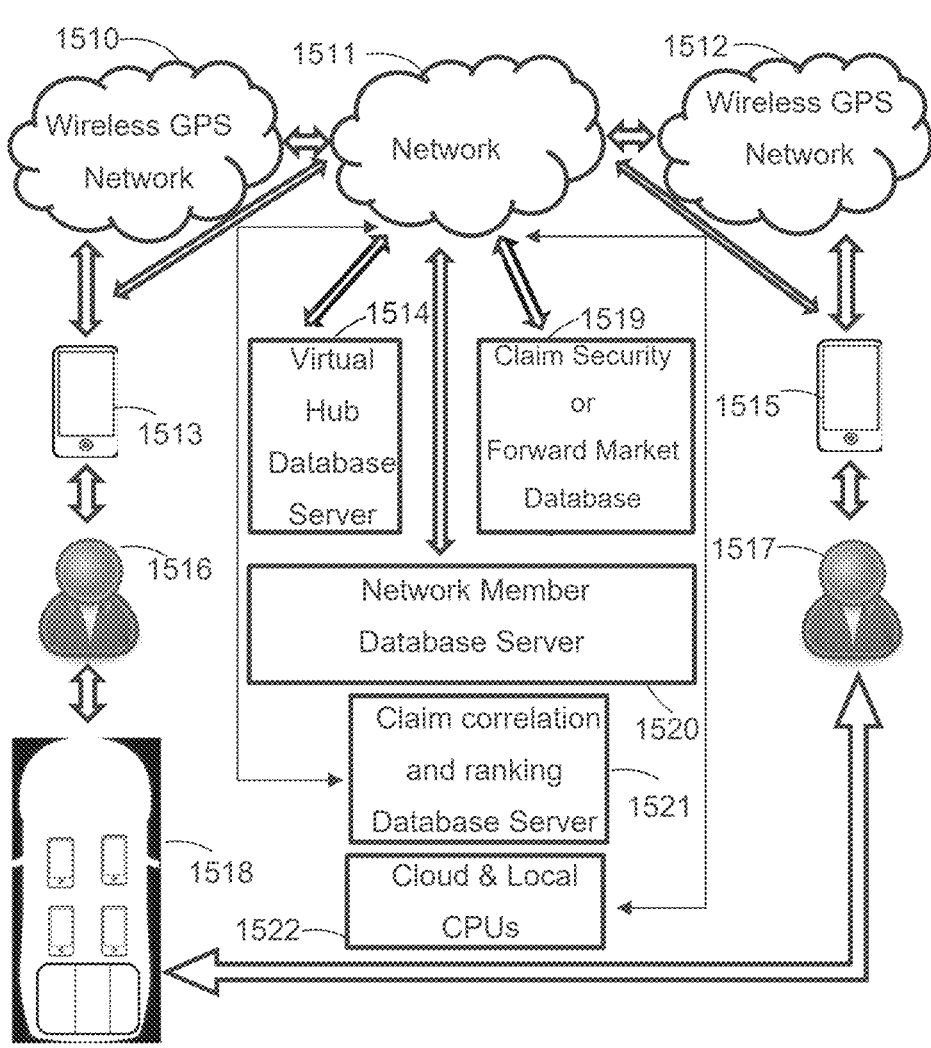
FIG. 15 illustrates a network configuration in accordance with implementations of various techniques described herein.

FIG. 15 illustrates a network configuration 1500 in accordance with implementations of various techniques described herein. In one implementation, the network configuration 1500 may be used for participating, transacting and/or trading transformed emission or emission offset and emission or emission offset geolocation units or securities. Further, while the implementations disclosed herein may be discussed in terms of the user 110, the implementations may be used by other types of users, as well.

In some implementations, the network configuration 1500 may include one or more of the following elements: wireless global positioning system (GPS) network 1510; networks 1511; additional GPS network 1512; user member portable multifunction device 1513; virtual hub database server 1514; emissions claims or carbon credit geolocation unit forward market or securities market database server 1519; additional user member portable multifunction device 1515; network member database server 1520; network member user 1516; additional network member user 1517; no arbitrage constraint database server 1521; cloud and local CPUs 1522; and/or emission or emission offset and emission or emission offset geolocation unit mode 1518.

In some implementations, the software and/or instructions stored in memory of the cloud & local CPUs 1522 and portable multifunction devices 1513, 1515 (e.g., mobile computing devices) may include additional instructions to instantiate specification requirements, participation, transactions, and/or trading on the emission or emission offset and emission or emission offset geolocation claim unit network 1511. The instructions may include standard database web services with the database as service provider (i.e., calling from the outside in), which may allow the client GUI 210 or 1513 to call the virtual hub database server 1514, the emissions claims or carbon credit geolocation unit forward market or securities market database server 1519, the network member database server 1520, the no arbitrage constraint database server 1521, and/or the cloud & local CPUs 1522 via the wireless GPS network 1510 or network 1511. In some implementations, the virtual hub database server 1514, the emissions claims or carbon credit geolocation unit forward market or securities database server 1519, the network member database server 1520, the no arbitrage constraint database server 1521, and/or the cloud & local CPUs 1522 may each instruct the network 1511 to instantiate the database servers 1514, 1519, 1520, 1521, 1522 as service consumers (i.e., calling from the inside out), which may allow a SQL query or application module in the database session to consume an external web service. In some implementations, users 1516 and/or 1517 may use portable multifunction devices 1513 and/or 1515 to access the emission or emission offset and emission or emission offset geolocation claim unit market GUI 210, thereby allowing the users 1516 and/or 1517 to participate, transact and/or trade emission or emission offset and emission or emission offset geolocation claim units.

In some implementations, the virtual hub emissions claims or carbon credit geolocation unit database server 1514 may store map tile data in addition to user location data or travel or incident data as will later be described from device algorithms in FIG. 160, where such data may be used to display or render, via the GUI 210, locations of claim virtual hubs and user 1516 proximity to those virtual hubs. In some implementations, the emissions claims or carbon credit geolocation unit forward market database server 1519 may store bid and offer data for respective quantities of users, as well as transaction data and a plurality of market data for each virtual hub combination. In some implementations, the network member database server 1520 may store user profile, user claim transaction, user claim trade, user claim settings, user claim specifications, user claim rating, user claim criminal history, background claim check data, facial recognition data, fingerprint recognition data, photo scan recognition data, claim history data, user track record, user bank data, user credit card data, user history data, user tax data, and/or a plurality of other data. In some implementations, the no arbitrage constraint database server 1521 may store data and algorithms to identify user 110 constraints and may run algorithm calculations for users 110 on specific constraints to check for compliance with the constraints and integrity of the carbon or emission blockchain specification. In some implementations, network servers and CPUs 1514, 1519, 1520, 1521, 1522, 1513, 1515 may interface through the network 1511 and/or wireless GPS networks 1510, 1512, such that emission or emission offset and emission or emission offset geolocation claim units may be participated in, transacted and/or traded efficiently in the context of a market for emissions claims or carbon credit geolocation units or securities. Included aforementioned data elements may be a subset or superset of data used for any specific calculation or transformation to participate, transact, or trade emission or emission offset and emission or emission offset geolocation claim units or securities.

FIG. 16 illustrates a flow diagram of a method 1600 in accordance with implementations of various techniques described herein, where the method 1600 may be used for participating in, transacting, and/or trading transformed emissions claims or carbon credit geolocation units or securities between emissions claims or carbon credit geolocation unit virtual hub combinations. In one implementation, method 1600 may be at least partially performed by a computing system, such as the computing system implementations discussed herein. In particular, the computing system may include one or more of the following: a computing device, a mobile or portable multifunction device, a fixed computing device, a computing device with a touchscreen, a computing device without a touchscreen, an augmented, audio interface computing device, a computing device with a mixed reality non-screen display, and/or any other computing system or device known to those skilled in the art. It should be understood that while method 1600 indicates a particular order of execution of operations, in some implementations, certain portions of the operations might be executed in a different order. Further, in some implementations, additional operations or steps may be added to the method 1600. Likewise, some operations or steps may be omitted.

At block 1610, the computing system may receive and/or detect a user login. In one implementation, the user login may be communicated to an emissions claims or carbon credit geolocation unit network (as described above) for detection and/or any other determination. At block 1620, the computing system may determine a claim origin location based on user input or current GPS coordinate information and may determine a destination address based on user input. In one implementation, data relating to the claim origin location and/or the claim or digital epichain destination address may be transmitted using the emissions claims or carbon credit geolocation unit network.

At block 1630, the computing system may, in conjunction with CPUs and/or databases of the network, generate and apply one or more optimization techniques to form a virtual hub with other users that have similar emissions claims or carbon credit geolocation unit requests within a geographic boundary. At block 1640, the computing system may, in conjunction with CPUs and or databases of the network, generate instructions for a plurality of computing devices, network, virtual hub database server, network member database server and emissions claims or carbon credit geolocation unit forward market or securities database server 271. These instructions may be used form a combination of virtual hubs and transformed contract specifications for delivery of emissions claims or carbon credit geolocation units between the virtual hubs. This combination may be presented via a graphical user interface to allow users to enter forward physical prices to sell (offer) or bid (buy) emissions claims or carbon credit geolocation unit or securities between virtual hub combinations in an open market auction format.

At block 1650, the computing system may, in conjunction with CPUs and or databases of the network, generate instructions to interface a plurality of networks, global positioning systems networks, servers, forward commodity market or security market auctions, map routing servers, grouping instruction software for virtual hubs, navigation servers, transparent open access pricing systems, game servers, blockchain claim history, safety systems, virtual hub servers and systems, no arbitrage constraint condition systems. These elements may form a system configured to implement a forward commodity or security emission or emission offset and emission or emission offset geolocation unit forward market or securities market system.

Figure 17:
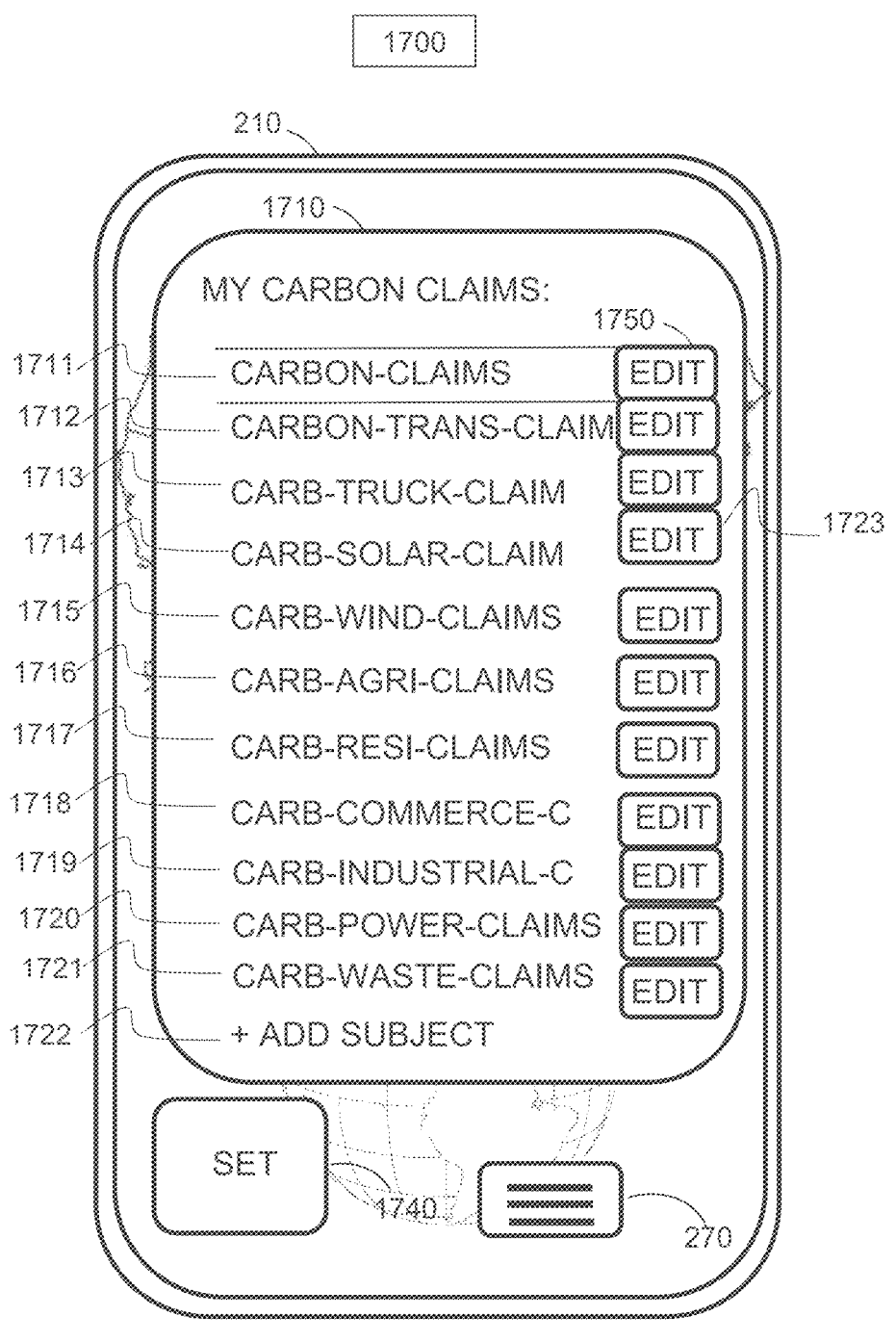
FIG. 17 illustrates a user interface of a computing device in accordance with implementations of various techniques described herein.

FIG. 17 illustrates a user interface 210 of a computing device in accordance with implementations of various techniques described herein. In particular, the of the user interface 210 may display one or more options relating to a user's most frequent emissions claims or carbon credit geolocation unit claims 1710, which may be used for participating, transacting and/or trading emission or emission offset and emission or emission offset geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements relating to the most frequent my claims: General Carbon Claims or Credits 1711 (may have subsets of transformed data); Carbon or Emission Transportation Claims or Credits 1712 (may have subsets of transformed data); Carbon or Emission Truck or Freight Claims or Credits 1713 (may have subsets of transformed data); Carbon or Emission Solar Claims or Credits 1714 (may have subsets of transformed data); Carbon or Emission Wind Claims or Credits 1715 (may have subsets of transformed data); Carbon or Emission Agriculture Claims or Credits 1716 (may have subsets of transformed data); Carbon or Emission Residential Claims or Credits 1717 (may have subsets of transformed data); Carbon or Emission Commercial Claims or Credits 1718 (may have subsets of transformed data); Carbon or emission industrial claim or credit offset 1719 (may have subsets of transformed data); carbon energy or power credit emission or emission offset 1720 (may have subsets of transformed data); Carbon or emission waste claim or credits 1721 (may have subsets of transformed data), ; +Add Subject or Claim 1722 (may have subsets of transformed data); Edit 1723 or 1750 (may have subsets of transformed data); set button 1740 to transmit the My Claims data; and/or hamburger button 270 to instruct the GUI 210 to take the user 110 to the menu screen.

In some implementations, the GUI 210 may be used to select, store and/or edit a user's 110 frequent or preferred claims ("MY CLAIMS") 1710 for more efficient access to emissions claims or carbon credit geolocation unit markets over various modes and specifications of emissions claims or carbon credit geolocation units. In such implementations, the user 110 may select, store and/or edit address and specification data for General Carbon Claims or Credits 1711 (may have subsets of transformed data); Carbon or Emission Transportation Claims or Credits 1712 (may have subsets of transformed data); Carbon or Emission Truck or Freight Claims or Credits 1713 (may have subsets of transformed data); Carbon or Emission Solar Claims or Credits 1714 (may have subsets of transformed data); Carbon or Emission Wind Claims or Credits 1715 (may have subsets of transformed data); Carbon or Emission Agriculture Claims or Credits 1716 (may have subsets of transformed data); Carbon or Emission Residential Claims or Credits 1717 (may have subsets of transformed data); Carbon or Emission Commercial Claims or Credits 1718 (may have subsets of transformed data); Carbon or emission industrial claim or credit offset 1719 (may have subsets of transformed data); carbon energy or power credit emission or emission offset 1720 (may have subsets of transformed data); Carbon or emission waste claim or credits 1721 (may have subsets of transformed data), ; +Add Subject or Claim 1722 (may have subsets of transformed data); Edit 1723 or 1750 (may have subsets of transformed data); In some embodiments, the My Claims module 1710 may include any claim a user 110 may request on any emissions claims or carbon credit geolocation unit mode and/or specification.

In some embodiments the user may toggle between the market view screen (e.g., as shown in FIG. 4) and other menu options and settings (e.g., options 1410 of FIG. 14) by the user 110 selecting the hamburger button 270, with the mobile computing device detecting the user 110 input or contact. In some implementations, the user 110 may be notified via SMS text, in application, email, and/or a plurality of other known communication methods as to when market activity occurs on a given claim object or emissions claims or carbon credit geolocation unit virtual hub combination. In other words, the "My Claims" 1710 feature may not only allow for one touch access to a saved route but may also perform notification features between users. Lastly, in some implementations, the Edit button 1723, 1750 may allow a user 110 to modify a plurality of notification settings, such as email, SMS text, in application, voice, messaging, and/or other notification methods.

Figure 18:
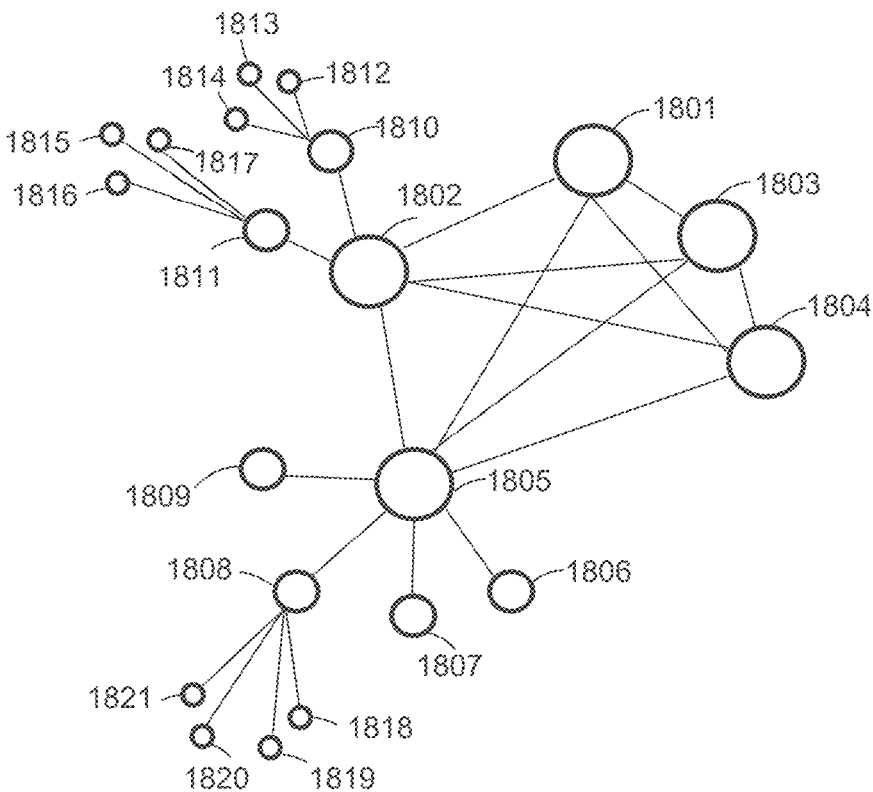
FIG. 18 illustrates a network topology configuration in accordance with implementations of various techniques described herein.

FIG. 18 illustrates a network topology configuration 1800 in accordance with implementations of various techniques described herein. In one implementation, the network configuration 1800 may be used for participating, transacting and/or trading transformed emission or emission offset and emission or emission offset geolocation units or securities. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the network configuration 1800 may include one or more of the following elements: large emissions claims or carbon credit geolocation unit virtual hub nodes 1801, 1802, 1803, 1804, 1805; medium emissions claims or carbon credit geolocation unit virtual hub nodes 1810, 1811, 1809, 1808, 1807, 1806; and/or small emissions claims or carbon credit geolocation unit virtual hub nodes 1812, 1813, 1814, 1815, 1816, 1817, 1818, 1819, 1820, 1821. In particular, the overall network node topology configuration 1800 may include large virtual hub nodes 1801, 1802, 1803, 1804, 1805, medium virtual hub nodes 1810, 1811, 1809, 1808, 1807, 1806, small virtual hub nodes 1812, 1813, 1814, 1815, 1816, 1817, 1818, 1819, 1820, 1821, or a subset or superset thereof. In some embodiments, a corporate virtual meeting may occur with nodes from all over the world may occur and the carbon or emission offset credits may form a blockchain across all the network to render as an aggregated carbon or emission claim.

In some implementations, a user may input a claim starting point of 1815 and a claim ending point of 1818, which may represent specific geographic emissions claims or carbon credit geolocation unit virtual hub locations in a city, multiple cities, a country, or multiple countries. Forward transportation market auctions may occur directly between two exemplary points, such as 1815 and 1818, or the method and system may combine a series of smaller auctions to create a larger auction between two endpoints on the system. In one implementation, a series of smaller auctions may be combined between 1815 and 1811, 1811 and 1802, 1802 and 1805, 1805 and 1808, and 1808 and 1818, which would be added together to make a combined emissions claims or carbon credit geolocation unit virtual hub auction. A combined series of smaller auctions may be constrained by instructions used to form auctions, where such instructions may be based on lowest value emissions claims or carbon credit geolocation unit, single mode or type emissions claims or carbon credit geolocation unit auctions, multi-mode or type emissions claims or carbon credit geolocation unit, fastest emissions claims or carbon credit geolocation unit constraints, most used emissions claims or carbon credit geolocation unit auctions, highest rated emissions claims or carbon credit geolocation unit auctions, most available or liquid emissions claims or carbon credit geolocation unit auctions, highest volume emissions claims or carbon credit geolocation unit auctions, most frequent emissions claims or carbon credit geolocation unit auctions, service level emissions claims or carbon credit geolocation unit auctions, security and safety level auctions, and/or group restricted auctions by sex, email, organization, gender, or other considerations.

In some implementations, the constraints may allow for many types of auctions for transformed emission claim or carbon credit geolocation claim units or securities in a forward emission claim or carbon credit geolocation claim market. In such implementations, the user 110 may specify instructions that set forward market auction constraints based on one or a plurality of constraints. The constrained auctions may have fungible units which allow many participants to transact in the auctions. The forward market of emissions claims or carbon credit geolocation units between virtual hubs 1801 and 1804, or other combinations along map routes, may include the attributes of a fungible forward contract or security. Such a contract may allow for one emissions claims or carbon credit geolocation unit to be substitutable for another emissions claims or carbon credit geolocation unit, because the unit may have been transformed and defined as a commodity contract or security. For example, assume user A bought a emissions claims or carbon credit geolocation unit from user B between virtual hub 1801 and virtual hub 1804, but then user A was not able to perform the obligation to purchase the emissions claims or carbon credit geolocation unit between virtual hub 1801 and virtual hub 1804 from user B. User A could then resell the emissions claims or carbon credit geolocation unit contract between virtual hub 1801 and virtual hub 1804 to a third party user C on the forward emissions claims or carbon credit geolocation unit auction market between virtual hub 1804 and virtual hub 1801 to retrieve the financial payment made for their original purchase from user B. User C would then replace user A and be matched with user B for the emissions claims or carbon credit geolocation unit transformation between virtual hub 1804 and virtual hub 1801. In some implementations, constrained optimization may be used to form one auction between two points or a series of multiple auctions that form one larger auction.

In some implementations, the forward emission claim or carbon credit geolocation claim unit auctions subject to various constraints may be presented as a linear programming cost minimization problem for cases where the user 110 selects the cheapest claim 1011 constraint. For example, the series of auctions that utilize the lowest cost emission claim or carbon credit between the claim start point 1815 and the claim ending point 1818 may be combined. Further, in such an example, the linear programming cost minimization function may select the path of 1815 to 1811 to 1802 to 1804 to 1805 to 1808 to 1818 if that combination is the lowest cost auction path.

In another implementation, the user 110 may select instructions for the auction to minimize both cost and shortest route. In such an implementation, the linear programming function may minimize the cost, subject to the constraint that time is shortest along the path. The resulting auction may combine a different and unique series of auctions between the starting point of 1815 and ending point 1818. Accordingly, the path may be optimized to minimize cost subject to the shortest path, which may yield a path of 1815 to 1811 to 1802 to 1805 to 1808 to 1818. The plurality of combinations and permutations of linear programming sequences of auctions for emissions claims or carbon credit geolocation unit units between two points may be infinite.

In some implementations, the forward transformed emission claim or carbon credit geolocation claim unit or transformed t emissions claims or carbon credit geolocation unit security auctions may be held side by side between two competing claims. For example, a user may input instructions for the method and system to route between virtual hub 1801 and virtual hub 1805. One route may be directly between virtual hub 1801 and virtual hub 1805. Another route may be between virtual hub 1801 and virtual hub 1805 by way of virtual hub 1802. The time between the routes may vary due to travel status, traffic, construction, road conditions, travels, or a plurality of other exogenous factors. However, the data transformation of the implementations disclosed herein may allow for two auctions to form side by side. Side by side auctions may be displayed on a market based user interface (e.g., as shown in FIG. 13) or as a software layer of instructions over a navigation system. The first emissions claims or carbon credit geolocation unit auction may be directly between virtual hub 1805 and virtual hub 1801 as one auction. A second auction may be formed by combining two smaller auctions between virtual hub 1805 and virtual hub 1802 with the auction between virtual hub 1802 and virtual hub 1801, which could be expressed independently or as a combined auction. The plurality of route auctions for the emissions claims or carbon credit geolocation unit (e.g., the first auction directly between 1801 virtual hub and 1805 virtual hub and the second auction between 1801 virtual hub and 1805 virtual hub by way of 1802 virtual hub) may provide transparent price auction information to the user regarding the value of various proposed claims, which may have different price values.

Figure 19:
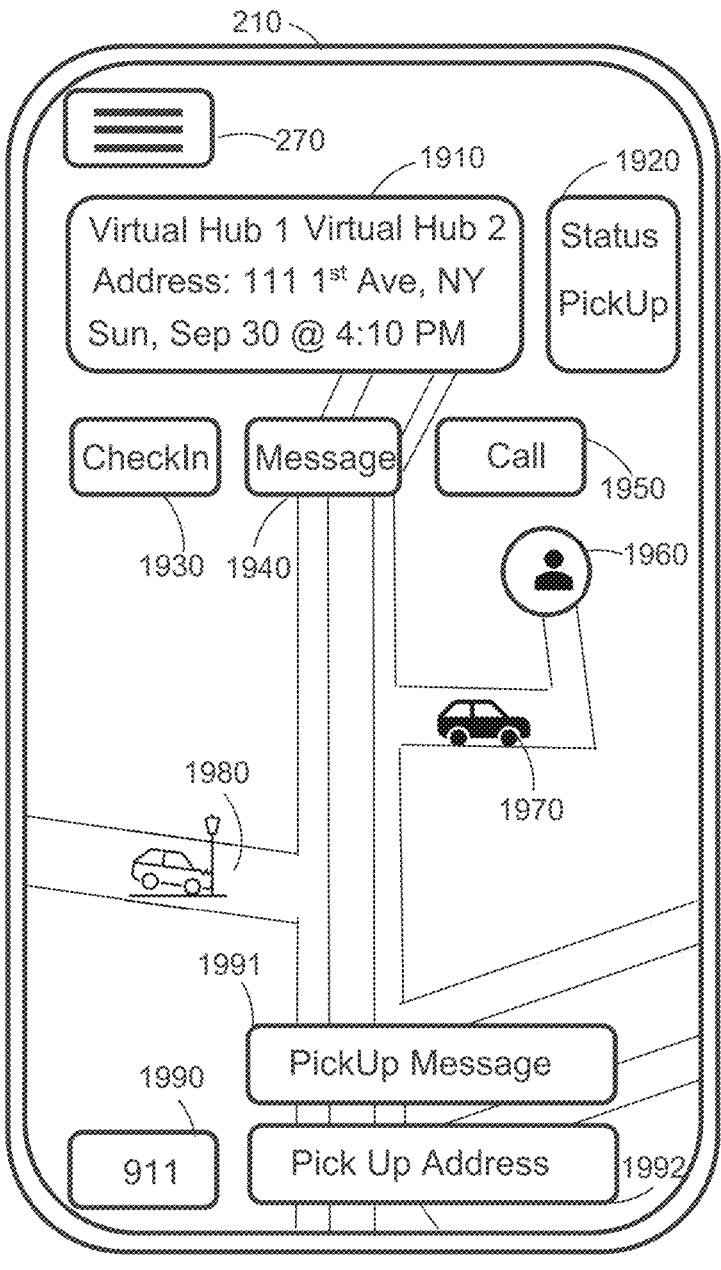

FIG. 19 illustrates the user interface 210 of a computing device in accordance with implementations of various techniques described herein. In particular, the user interface 210 may be used to display a delivery and pick up status configuration 1900 for participating, transacting and/or trading transformed emission or emission offset and emission or emission offset geolocation units or securities. In particular, the GUI 210 may be used to display implementations which utilize a multi-layered network node topology for forward market of emission claim or carbon credit geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the delivery and pick up claim status configuration 1900 may include one or more of the following elements: hamburger menu button 270 to move between different application configurations; information 1910 relating to a claim virtual hub 1 pickup address and claim virtual hub 2 destination address having a contract specification with regards to quality, day, date, and time; claim status 1920 indicating the status of "PickUp" for the emissions claims or carbon credit geolocation unit; check-in emissions claims or carbon credit geolocation unit button

1930 for the emissions claims or carbon credit geolocation unit; message button 1940 for messaging texts and instructions between users to facilitate pick up and delivery of emission or emission offset and emission or emission offset geolocation claim units; call button 1950 for placing a call between users, where number masking may be used for privacy and security; GPS map location indicator 1960 of a rider or of a cargo location; GPS map location indicator 1970 of a driver or of a cargo carrier; GPS map 1980 corresponding to the delivery and pick up of the emissions claims or carbon credit geolocation unit; texting message window 1991 used for communication between users; pick up address data window 1992 during the ongoing pick up process; and/or security button 1990 used to report security issues to 911 and system database.

In some implementations, the GUI 210 may transmit claim delivery instructions to the users 110 (e.g., the rider and driver), where the instructions may include a rendering or map of their respective GPS locations, which may be shown via indicators 1960 and 1970. The GUI 210 may display the trip status 1920, where the trip status may include pick up, start, leaving, on-going, in-progress, arriving, arrived, or a plurality of other claim status conditions. Further, the GUI 210 may include check-in emissions claims or carbon credit geolocation unit button 1930, which may be used to confirm whether an emissions claim, or carbon credit geolocation unit transformed emissions claim, or carbon credit geolocation unit has been moved into the transformed emissions claims or carbon credit geolocation unit object. The transformed emissions claims or carbon credit geolocation unit object may be a person, home, business, car, airplane, autonomous vehicle, bike, boat, ship, bus, drone, limo, motorcycle, moped, shuttle, spaceship, subway, taxi, train, cargo, emission or emission offset entity or a combination of transformed modes, and/or other modes of emissions claims or carbon credit geolocation units.

In addition, the users 110 may transmit a message using the message button 1940, which may be used to transmit audio, visual or text messages between users 110. The users 110 may also call each other using the call button 1950, which may be used to communicate claim pick up or delivery instructions. Additionally, a user may message another user using the texting message window 1991, which may be used to facilitate visual, audio or text communication between users and while logging a claim message history.

In some implementations, the users 110 may toggle to other modes of the application using the menu hamburger button 270. The relative positions of an emissions claims or carbon credit geolocation unit seller (i.e., indicator 1970) and an emissions claims or carbon credit geolocation unit buyer (i.e., indicator 1960) may be displayed on the GPS map 1980 to help users 110 understand each other's claim relative position and location on the map 1980. In some implementations, the GPS location of the emission claim or carbon credit geolocation claim unit seller (i.e., indicator 1970) and emissions claims or carbon credit geolocation unit buyer (i.e., indicator 1960) may be tracked in real time with location updates on the map 1980.

Figure 20:
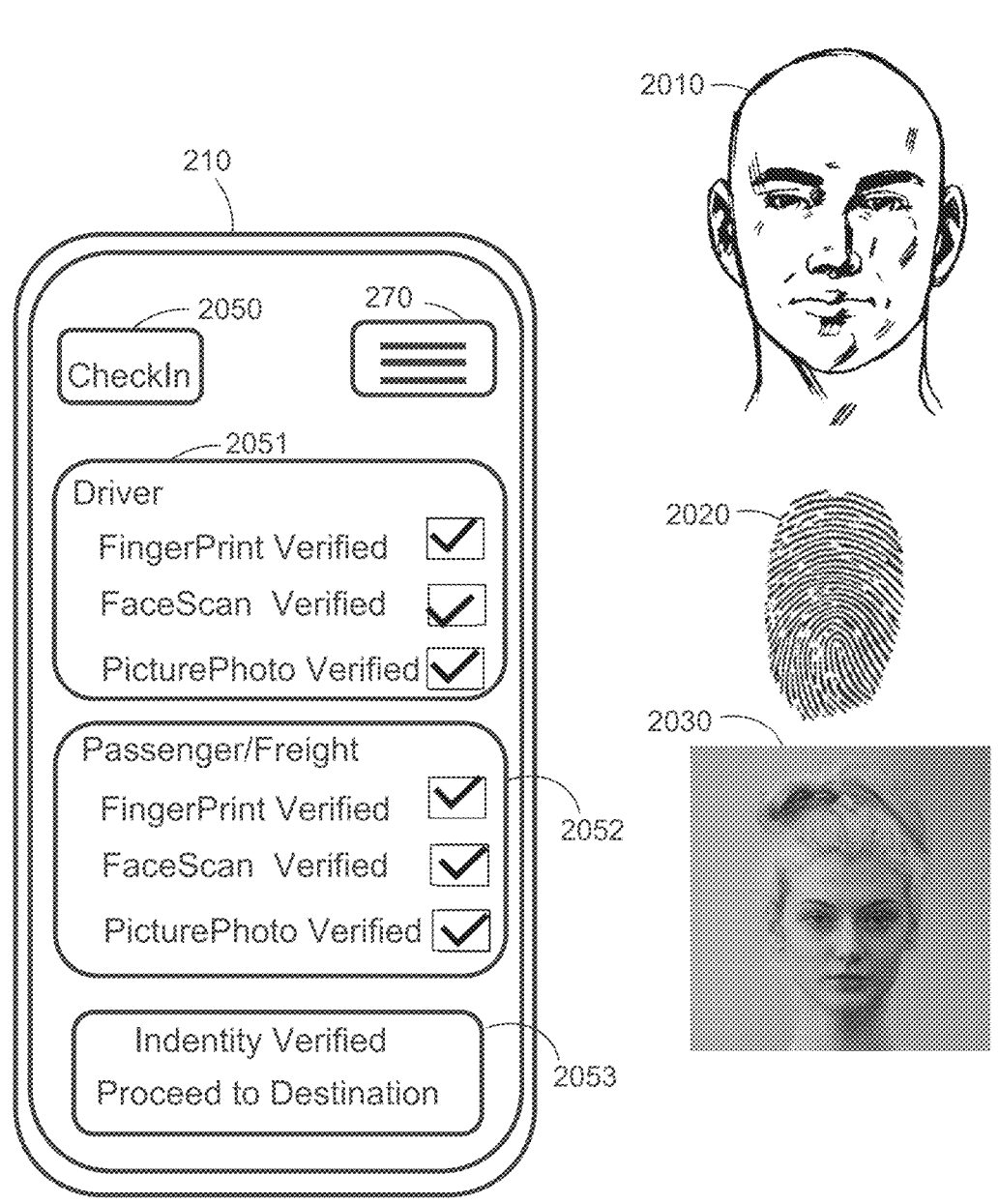

FIG. 20 illustrates the user interface 210 of a computing device in accordance with implementations of various techniques described herein. In particular, the of the user interface 210 may display a claim Checkin configuration 2000, which may be used for participating, transacting and/or trading emission or emission offset and emission or emission offset geolocation claim units. In particular, the GUI 210 may be used to display a multi-layered network node topology for forward market or securities market of emission claim or carbon credit geolocation claim units with security CheckIn features to verify identities involved with the claim. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the user interface 210 may display and/or include one or more of the following elements: a CheckIn button 2050 for a buyer or seller of a emissions claims or carbon credit geolocation unit; a hamburger menu button 270 to move between different application configurations; a buyer or seller of emissions claims or carbon credit geolocation unit scan check window 2051, which may indicate the use of a fingerprint, face scan, and/or picture photo scan to verify the identity of a user; a passenger or freight and emissions claims or carbon credit geolocation unit buyer unit scan check window 2052, which may indicate the use of a fingerprint, face scan, and/or picture photo scan to verify the identity of a claim user as defendant, plaintiff, lawyers or other parties affiliated with the claim; a emissions claims or carbon credit geolocation unit verification confirmation window 2053 to confirm identities of users in the system at the application system level; facial data 2010 for a buyer and/or seller of emissions claims or carbon credit geolocation unit for whom facial recognition confirmation is used; fingerprint data 2020 for a buyer and/or seller of a emissions claims or carbon credit geolocation unit for whom fingerprint recognition confirmation is used; photo data 2030 for a buyer and/or seller of a emissions claims or carbon credit geolocation unit for whom photo recognition confirmation is used;

In some implementations, the computing device may be used to transmit data and confirm the identity of users against identity records in the network member database server 222. The computing device may also be used to confirm security checks for criminal records or other activity that would suspend a user from the platform environment. In a further implementation, the driver verification window 2051 may indicate a failure regarding an identity verification due to a user not being the registered user on the network member database server 222. In other implementations, the passenger or driver or freight verification window 2052 may indicate a failure regarding an identity verification due to a user not being the registered user on the network member database server 222. In another implementation, the emissions claims or carbon credit geolocation unit verification window 2053 may instruct the user to proceed to a destination if the one or more verifications are successful which may then form a link to the carbon or emission epichain or blockchain. The emissions claims or carbon credit geolocation unit verification window 2053 may also instruct the user not to proceed to the destination if the one or more verification are not successful for the multi-factor authentication.

Figure 21:
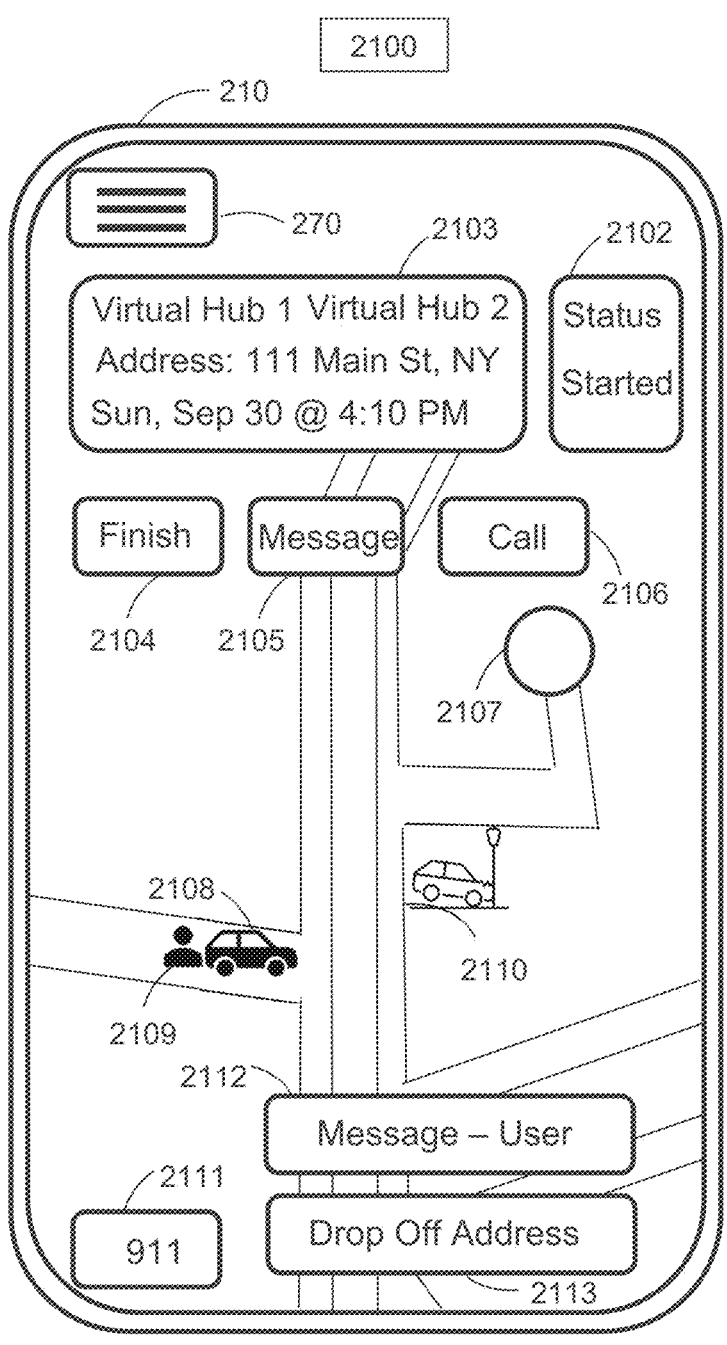

FIG. 21 illustrates the user interface 210 of a computing device in accordance with implementations of various techniques described herein. In particular, the user interface 210 may be used to display a delivery and pick up status configuration 2100 once an emissions claims or carbon credit geolocation unit delivery has started when participating, transacting and/or trading emission or emission offset and emission or emission offset geolocation claim units, as described above. In particular, the GUI 210 may be used to display implementations which utilize a multi-layered network node topology for forward market of emission claim or carbon credit geolocation claim units. Further, while the implementations disclosed herein may be discussed in terms of the user 110, the implementations may be used by other types of users, as well.

In some implementations, the delivery and pick up status configuration 2100 may include one or more of the following elements, or a subset or superset thereof:

a hamburger menu button 270 to move between different application configurations; information 2103 relating to a virtual hub 1 emissions claims or carbon credit geolocation unit pickup address and virtual hub 2 emissions claims or carbon credit geolocation unit destination address having a transformed contract specification with regards to quality, day, date, and time of delivery of a emissions claims or carbon credit geolocation unit; claim status 2102 indicating the status of "Started" for the emissions claims or carbon credit geolocation unit or security; a finish trip passenger or freight button 2104 for the emissions claims or carbon credit geolocation unit for use once a emissions claims or carbon credit geolocation unit has been delivered; message button 2105 for messaging texts and instructions between users to facilitate the pick up and delivery of emission or emission offset and emission or emission offset geolocation claim units; call button 2106 for placing a call between system users, where number masking may be used for privacy and security; GPS map location indicator 2109 of a claim party, defendant, plaintiff, rider, driver, pedestrian, business, home, or a cargo location; GPS map location indicator 2108 of a driver or a cargo carrier location; GPS map 2110 corresponding to the delivery and pick up of the emissions claims or carbon credit geolocation unit; texting message window 2112 for communication between users; starting point 2107 of a virtual hub for forward emissions claims or carbon credit geolocation units; security button 2111 to report security issues to 911 and/or a system database; and/or drop off address window 2113 for the delivery of passenger or emissions claims or carbon credit geolocation unit.

In some implementations, the GUI 210 may transmit delivery instructions to the users 110 (e.g., the rider and driver), where the instructions may include a rendering or map of their respective GPS locations, which may be shown via indicators 1960 and 1970. The GUI 210 may display the claim status 2102, where the claim status may include pick up, started, leaving, on-going, in-progress, arriving, arrived, or a plurality of other claim status conditions.

Further, the GUI 210 may include a finish trip passenger or freight button 2104, which may be used to confirm an emissions claim or a carbon credit geolocation unit has been delivered or completed by the emissions claims or carbon credit geolocation unit object. The emissions claims or carbon credit geolocation unit object may be a person, object, business, home, property, emission or emission offset entity, car, airplane, autonomous vehicle, bike, boat, ship, bus, drone, limo, motorcycle, moped, shuttle, spaceship, subway, taxi, train, cargo, and/or other modes of transportation.

In addition, the users 110 may transmit a message using the message button 2105, which may be used to transmit audio, visual or text messages between users 110. The users 110 may also call each other using the call button 2106, which may be used to communicate claim pick up or delivery instructions or other communications. Additionally, a user may message another user using the texting message window 2112, which may be used to facilitate visual, audio or text communication between users while logging a block-chain claim message history.

In some implementations, the users 110 may toggle to other modes of the application using the menu hamburger button 270. The relative positions of a transformed emissions claims or carbon credit geolocation unit or security seller (i.e., indicator 2108) and a transformed emissions claims or carbon credit geolocation unit or security buyer (i.e., indicator 2109) may be displayed on the GPS map 2110 to help users 110 understand each other's relative position and location on the map 2110. In some implementations, the GPS location of the emission claim or carbon credit geolocation claim unit seller (i.e., indicator 2108) and emissions claims or carbon credit geolocation unit buyer (i.e., indicator 2109) may be tracked in real time with location updates on the map 2110. In some embodiments, these virtual hubs may represent bandwidth between two or more locations which form a virtual transportation link which may replace a physical transportation link which then has an earned carbon or emission credit offset.

Figure 22:
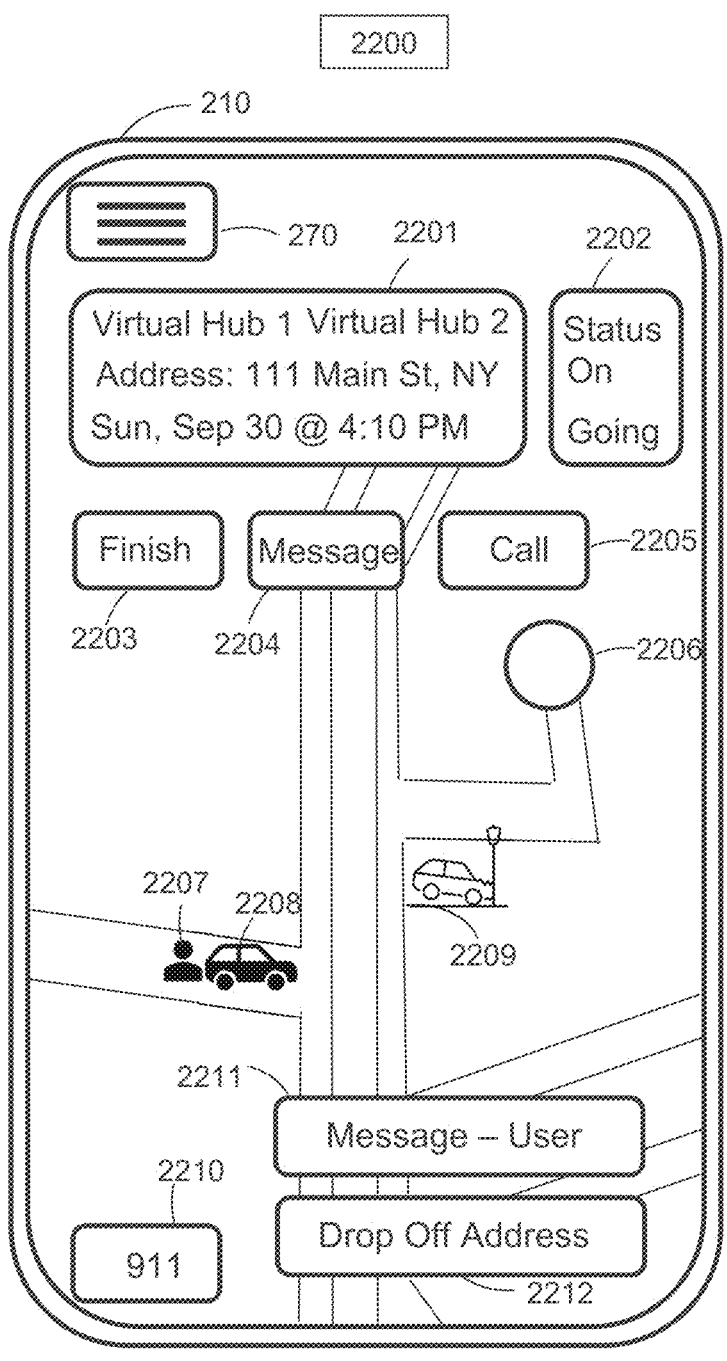

FIG. 22 illustrates the user interface 210 of a computing device in accordance with implementations of various techniques described herein. In particular, the user interface 210 may be used to display a claim delivery and pick up status configuration 2200 for an emissions claims or carbon credit geolocation unit delivery that is ongoing when participating, transacting and/or trading transformed emission or emission offset and emission or emission offset geolocation claim units or securities. In particular, the GUI 210 may be used to display implementations which utilize a multi-layered network node topology for forward market of emission claim or carbon credit geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the claim delivery and pick up status configuration 2200 may include one or more of the following elements: hamburger menu button 270 to move between different application configurations; information 2201 relating to virtual hub 1 emissions claims or carbon credit geolocation unit pickup address and virtual hub 2 emissions claims or carbon credit geolocation unit destination address having a contract specification with regards to quality, day, date, and time of delivery of a emissions claims or carbon credit geolocation unit; trip status 2202 indicating that the status of "Ongoing" for the emissions claims or carbon credit geolocation unit; finish emissions claims or carbon credit geolocation unit button 2203 for the emissions claims or carbon credit geolocation unit for use once a emissions claims or carbon credit geolocation unit has been delivered; message button 2204 for messaging texts and instructions between users to facilitate the pick-up and delivery of emission or emission offset and emission or emission offset geolocation claim units; call button 2205 for placing a call between system users, number masking may be used for privacy and security; GPS map location indicator 2207 of a rider or cargo or person or emission or emission offset entity object location; GPS map location indicator 2208 of a driver or cargo carrier or person or emission or emission offset entity object location; GPS map 2209 corresponding to the delivery and pick up of the of emissions claims or carbon credit geolocation unit; texting message window 2211 for communication between users; claim starting point 2206 of a virtual hub for forward emissions claims or carbon credit geolocation units; security button 2210 to report and record security issues to 911 and/or a system database; and/or drop off address window 2212 for the delivery of passenger or emissions claims or carbon credit geolocation unit.

In some implementations, the GUI 210 may transmit delivery instructions to the users 110 (e.g., the rider and driver or claim defendants, claim plaintiffs, or other claim affiliates), where the instructions may include a rendering or map of their respective GPS locations, which may be shown via indicators 2207 and 2208. The GUI 210 may display the claim status 2202, where the claim status 2202 may include pick up, started, leaving, on-going, in-progress, arriving, arrived, or a plurality of other claim status conditions.

Further, the GUI 210 may include a finish emissions claims or carbon credit geolocation unit button 2203, which may be used to confirm an emissions claim or carbon credit geolocation unit or security has been delivered or completed by the emissions claims or carbon credit geolocation unit. The emissions claims or carbon credit geolocation unit object may be a person, emission or emission offset entity, home, business, group, object, car, airplane, autonomous vehicle, bike, boat, ship, bus, drone, limo, motorcycle, moped, shuttle, spaceship, subway, taxi, train, cargo, and/or other types of transportation modes.

In addition, the users 110 may transmit a message using the message button 2204, which may be used to transmit audio, visual or text messages between users 110. The users 110 may also call each other using the call button 2205, which may be used to communicate claim pick up or delivery instructions or other necessary communication. Additionally, a user may message another user to facilitate visual, audio or text communication between users while logging a message history.

In some implementations, the users 110 may toggle to other modes of the application using the menu hamburger button 270. The relative positions of an emissions claims or carbon credit geolocation unit seller (i.e., indicator 2208) and emissions claims or carbon credit geolocation unit buyer (i.e., indicator 2207) may be displayed on the GPS map 2209 to help users 110 understand each other's relative position and location on the map 2209. In some implementations, the GPS location of the emission claim or carbon credit geolocation claim unit seller (i.e., indicator 2208) and emissions claims or carbon credit geolocation unit buyer (i.e., indicator 2207) may be tracked in real time with location updates on the map 2209. The GUI 210 may also display the drop off address 2212 of the emissions claims or carbon credit geolocation unit. In some implementations, a user 110 may use a security button 2210 to submit a recording to the system servers and to authorities who are connected to the system if anything has occurred that may compromise the security of any user or emissions claims or carbon credit geolocation unit.

Figure 23:
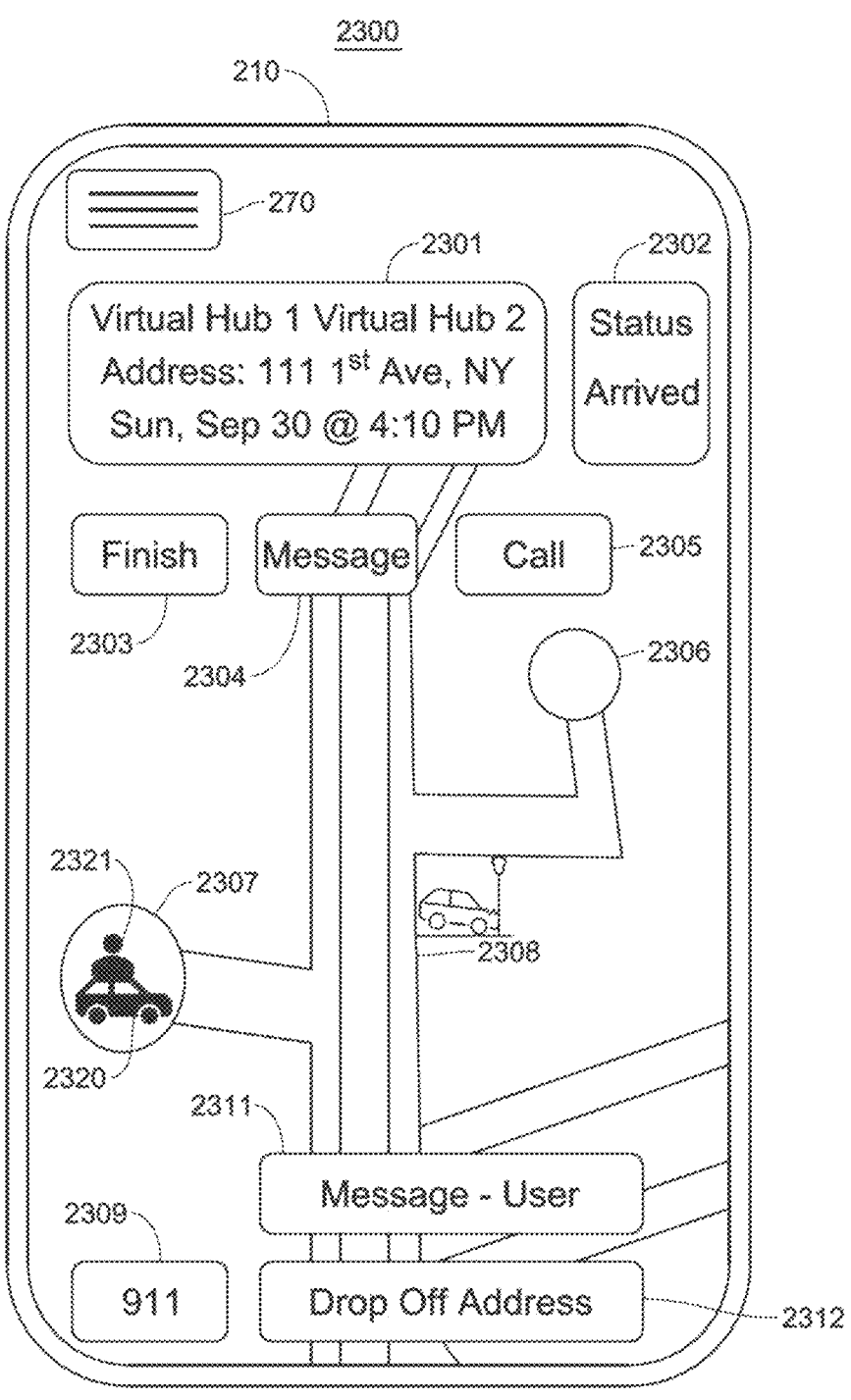

FIG. 23 illustrates the user interface 210 of a computing device in accordance with implementations of various techniques described herein. In particular, the user interface 210 may be used to display an emissions claims or carbon credit geolocation unit delivery and pick up status configuration 2300 once an emissions claims or carbon credit geolocation unit delivery has arrived when participating, transacting and/or trading emission or emission offset and emission or emission offset geolocation claim units. In particular, the GUI 210 may be used to display implementations which utilize a multi-layered network node topology for forward market or securities market of emission claim or carbon credit geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the emissions claims or carbon credit geolocation unit delivery and pick up status configuration 2300 may include one or more of the following elements: hamburger menu button 270 to move between different application configurations; information 2301 relating to a virtual hub 1 emissions claims or carbon credit geolocation unit pickup address and virtual hub 2 emissions claims or carbon credit geolocation unit destination address having a contract specification with regards to quality, day, date, and time of delivery of a emissions claims or carbon credit geolocation unit; claim status 2302 indicating the status of "Arrived" for the emissions claims or carbon credit geolocation unit; finish emissions claims or carbon credit geolocation unit button 2303 for the emissions claims or carbon credit geolocation unit for use once a emissions claims or carbon credit geolocation unit has been delivered or an incremental status update has been achieved; message button 2304 for messaging texts and instructions between users to facilitate the emissions claims or carbon credit geolocation unit pick up and delivery of emission or emission offset and emission or emission offset geolocation claim units; call button 2305 for placing a call between system users, where number masking may be used for privacy and security; GPS map location indicator 2321 of a rider or cargo or person or claim affiliate location; GPS map location indicator 2320 of a driver or cargo carrier location; GPS map 2308 corresponding to the delivery and pick up of the emissions claims or carbon credit geolocation unit; texting message window 2311 for communication between users; starting point 2306 of a virtual hub for forward transformed emissions claims or carbon credit geolocation units or securities; ending point 2307 of a virtual hub for forward transformed emissions claims or carbon credit geolocation units or securities; security button 2309 to report and record security issues to 911 and/or a system database; and/or drop off address window 2312 for the delivery of emissions claims or carbon credit geolocation units.

In some implementations, the GUI 210 may transmit delivery instructions to the users 110 (e.g., the rider and driver), where the instructions may include a rendering or map of their respective GPS locations, which may be shown via indicators 2320 and 2321. The GUI 210 may display the trip status 2302, where the claim status may include pick up, started, leaving, on-going, in-progress, arriving, arrived, location or a plurality of other claim status conditions.

Further, the GUI 210 may include a finish emissions claims or carbon credit geolocation unit button 2303, which may be used to confirm an emissions claim or carbon credit geolocation unit has been delivered or completed by the emissions claims or carbon credit geolocation unit object. The emissions claims or carbon credit geolocation unit object may be a person, object, business, emission or emission offset entity, car, airplane, autonomous vehicle, bike, boat, ship, bus, drone, limo, motorcycle, moped, shuttle, spaceship, subway, taxi, train, cargo, virtual bandwidth meeting and/or other types of transportation modes.

In addition, the users 110 may transmit a message using the message button 2304, which may be used to transmit audio, visual or text messages between users 110. The users 110 may also call each other using the call button 2305, which may be used to communicate emissions claims or carbon credit geolocation unit pickup or delivery instructions or other communications. Additionally, a user may message another user using the texting message window 2112, which may be used to facilitate visual, audio or text communication between users while logging a message history.

In some implementations, the users 110 may toggle to other modes of the application using the menu hamburger button 270. The relative positions of an emissions claim or carbon credit geolocation unit seller (i.e., indicator 2320) and an emission claims or carbon credit geolocation unit buyer (i.e., indicator 2321) may be displayed on the GPS map 2110 2308 to help users 110 understand each other's relative position and location on the map 2308. In some implementations, the GPS location of the emission claim or carbon credit geolocation claim unit seller (i.e., indicator 2320) and transformed emissions claims or carbon credit geolocation unit or security buyer (i.e., indicator 2321) may be tracked in real time with location updates on the map 2308. The GUI 210 may also display the drop off address 2312 of the transformed emissions claims or carbon credit geolocation unit or security. In some implementations, a user 110 may use a security button 2309 to submit a recording to the system servers and to authorities who are connected to the system if anything has occurred that may compromise the security of any user or emissions claims or carbon credit geolocation unit.

Figure 24:
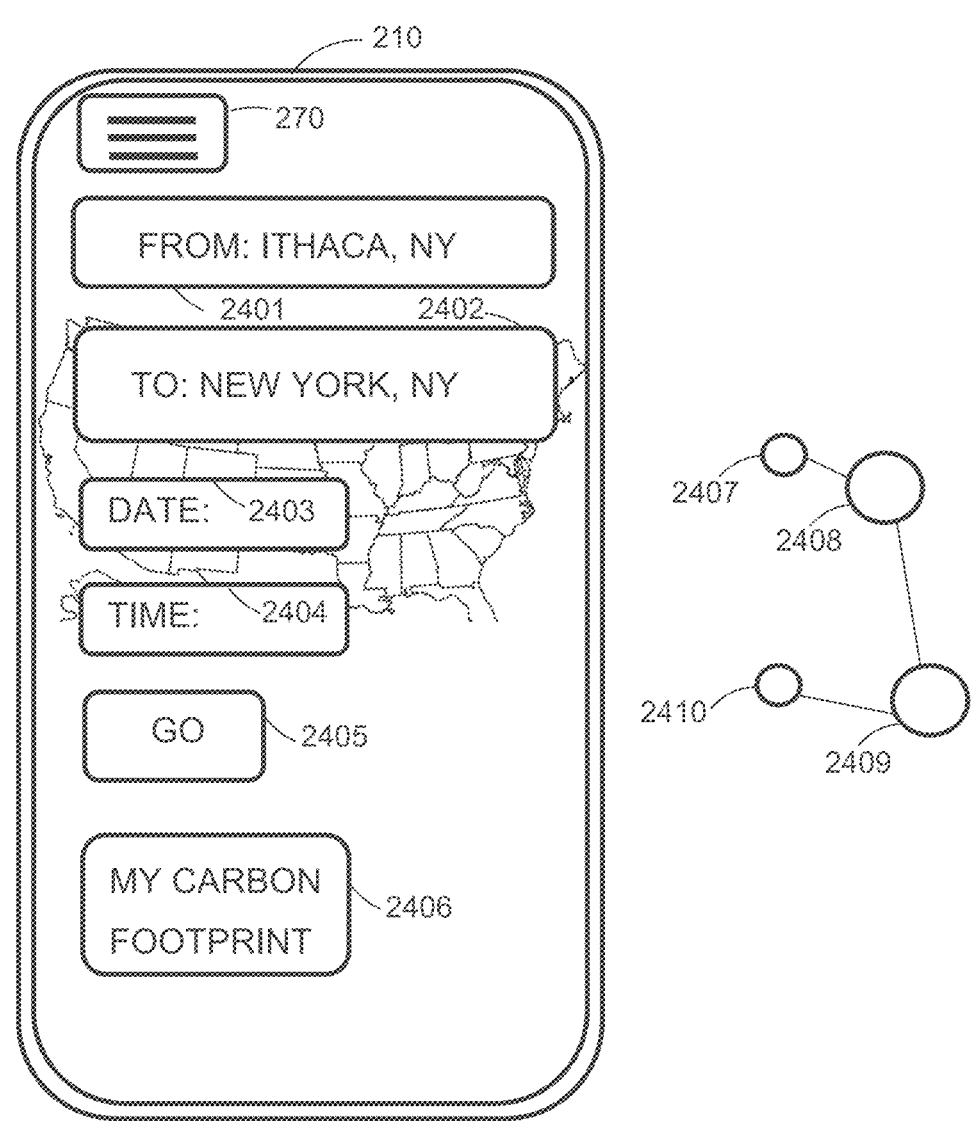

FIG. 24 illustrates the user interface 210 of a computing device in accordance with implementations of various techniques described herein. In particular, the user interface 210 may be used to display an emissions claim or carbon credit geolocation unit delivery and pick up configuration 2400 for an emissions claims or carbon credit geolocation unit multi-layered network node topology for use with participating, transacting and/or trading emission or emission offset and emission or emission offset geolocation claim units. In particular, the GUI 210 may be used to display implementations which utilize a multi-layered network node topology for forward market of emission claim or carbon credit geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the delivery and pick up configuration 2400 may include one or more of the following elements: hamburger menu button 270 to move between different application configurations; emissions claims or carbon credit geolocation unit "From" node starting point 2401 of a multi-layered network node topology for forward market of emission claim or carbon credit geolocation claim units; emissions claims or carbon credit geolocation unit "To" or destination node ending point 2402 of a multi-layered network node topology for forward market of emission claim or carbon credit geolocation claim units; emissions claims or carbon credit geolocation unit Date module 2403 of an auction corresponding to a multi-layered network node topology for forward market of transformed emission claim or carbon credit geolocation claim units or securities; emissions claims or carbon credit geolocation unit Time module 2404 for pickup and delivery of an auction corresponding to a multi-layered network node topology for forward market of emission claim or carbon credit geolocation claim units; Go button 2405, which may be used to form an auction corresponding to a multi-layered network node topology for forward market of transformed emission claim or carbon credit geolocation claim units or securities; My Claims button 2406, which may be used to obtain common emissions claims or carbon credit geolocation unit "From" node 2401 or "To" node 2402 points in an auction corresponding to a multi-layered network node topology for forward market of transformed emission claim or carbon credit geolocation claim units for a user on the system; and/or multi-hub networks (i.e., node points) 2407, 2408, 2409, 2410, which may form a single node auction, a dual node auction, and/or any possible node combination or a multi-node auction series corresponding to a multi-layered network node topology for forward market of emission claim or carbon credit geolocation claim units for a user on the system.

In some implementations, the GUI 210 may transmit an emissions claims or carbon credit geolocation unit "From" node 2401 and "To" node 2402 with instructions to the users 110 with a specific date 2403 and time 2404 corresponding to a multi-layered network node topology for forward market of transformed emission claim or carbon credit geolocation claim units. The instructions may include for a user on the system to perform an emissions claims or carbon credit geolocation unit auction by pressing the Go button 2405. The system may use a plurality of constraints, such as, but not limited to, cheapest claim, single claim mode, multi-claim method mode, fastest claim payout, most used claim type, highest rated claim, most available claim type, highest volume claim, most frequent claim, service level claim, security and safety of claim, group restricted email, and/or group criteria. The system may also use any two or more of the node points 2407, 2408, 2409, 2410, including any combination of the points 2407, 2408, 2409, 2410. In some implementations, the system may use no constraints, one constraint, or a plurality of constraints to allow the user 110 to participate, transact, or trade in a multi-layered network node topology for forward market of emission claim or carbon credit geolocation claim units in an auction.

In some implementations, the auction for forward market emissions claims or carbon credit geolocation units or securities may be comprised of an auction at one hub location or between only two points or between a plurality of points subject to a plurality of constraints. For example, the from point, starting point, or starting virtual hub may be the node point 2407. However, the system may select an auction between node points 2408 and 2409, rather than starting at point 2407, because one or more constraints were selected to frame the auction for forward market emissions claims or carbon credit geolocation units. In some implementations, an auction may be comprised of multiple modes of emissions claims or carbon credit geolocation units, such as a Medicare Secondary Payer Claim auction between points 2407 and 2408, followed by an airplane emissions claims or carbon credit geolocation unit auction between points 2408 and 2409, which may be followed by a truck emissions claims or carbon credit geolocation unit auction between points 2410 and 2409 for emissions claims or carbon credit geolocation units. The various plurality of auctions may be displayed as one auction or a series of auctions. The auctions for a multi-layered network node topology for a forward market of emission claim or carbon credit geolocation claim units may consist of any subset or superset of the aforementioned possibilities, including any constraints discussed with respect to FIG. 10 or any plurality of modes discussed with respect to FIG. 8.

FIG. 25 illustrates the user interface 210 of a computing device in accordance with implementations of various techniques described herein. In particular, the user interface 210 may be used to display a setting configuration 2500 for an emission claim or carbon credit geolocation claim unit multi-layered network node topology, which may be used for participating, transacting and/or trading emission or emission offset and emission or emission offset geolocation claim units. In particular, the GUI 210 may be used to display a multi layered network node topology for forward market of emission claim or carbon credit geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the setting configuration 2500 may include one or more of the following setting elements: hamburger menu button 270 to move between different application configurations; open markets setting toggle 2510, which may allow a user to see all market participants of a given auction of transformed emission claim or carbon credit geolocation claim units or securities; restricted markets setting, which may be restricted by organization 2520, by sex 2530, by rating 2540, by security 2550, or by any other restriction the user 110 defines and where the restriction may limit the auction participants for the user; and/or privacy settings, which may include push notification restrictions 2560, location information restrictions 2570, sync with contacts restrictions 2580, and/or other privacy settings.

In some implementations, a user 110 may select the open markets toggle 2510, which may be used to show every participant in a given auction for a multi-layered network node topology for a forward market of emission claim or carbon credit geolocation claim units. The users 110 may also select to restrict the market view of the GUI 210, such as by organization 2520 (may be based on email), by sex 2530, by rating 2540 of driver or user, by security 2550, and/or by any other restriction. Users 110 may also change privacy settings, which may change push notification restrictions 2560, location settings restrictions 2570, sync with contacts settings restrictions 2580, and/or any other settings. The toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market auction for a multi-layered network node topology for a forward market of emission claim or carbon credit geolocation claim units. In particular, the overall input sets may be restricted by sex, organization, rating, security, privacy, location, and/or other attributes. As such, optimizations may occur over limited subsets for the emission claim or carbon credit geolocation claim units.

Figure 26:
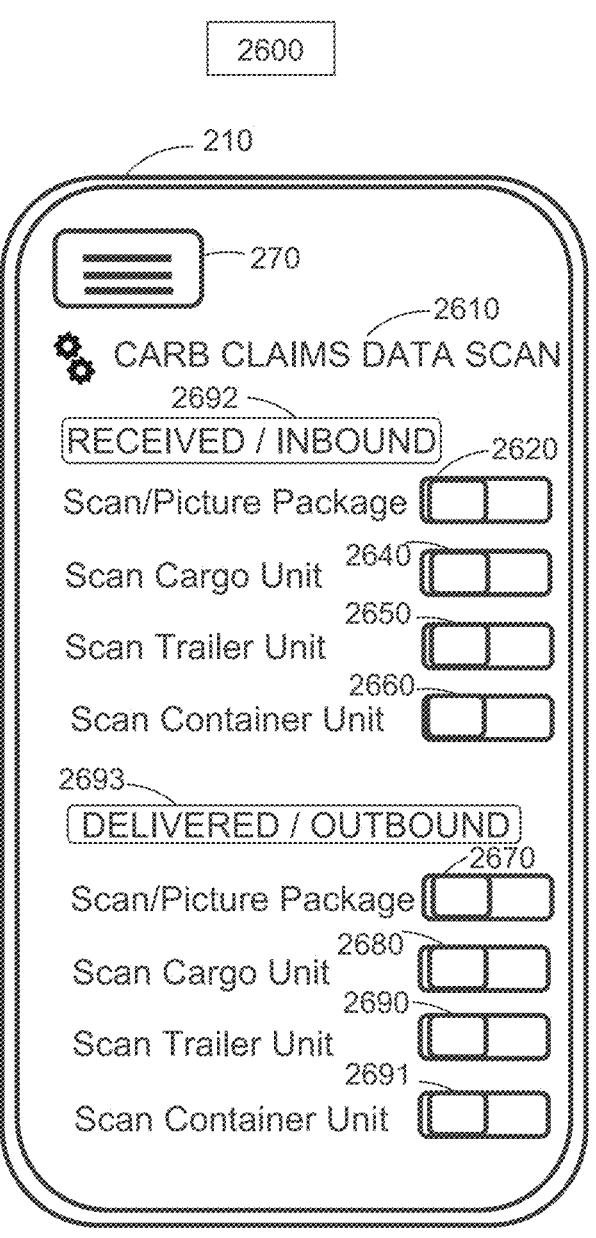

FIG. 26 illustrates the user interface 210 of a computing device in accordance with implementations of various techniques described herein. In particular, the user interface 210 may be used to display a claim data scan configuration 2600 for a transformed emission claim or carbon credit geolocation claim unit multi-layered network node topology for use with participating, transacting and/or trading emission or emission offset and emission or emission offset geolocation claim units. In particular, the GUI 210 may be used to display implementations which utilize a multi-layered network node topology for forward market of emission claim or carbon credit geolocation claim units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the claim data configuration 2600 may include one or more of the following elements: hamburger menu button 270 to move between different application configurations; package/cargo scan module 2610, which may be used to document the status and position of transformed forward market emissions claims or carbon credit geolocation units or security; package/cargo inbound or received module 2692, which may be used to scan a picture, universal product code barcode, QR code, or other transformed emission claim or carbon credit geolocation claim unit identifier or security; package/cargo inbound scan toggle switch 2620, which may be used to scan a picture, universal product code barcode, QR code, or other transformed emission claim or carbon credit geolocation claim unit identifier or security; cargo unit inbound scan toggle switch 2640, which may be used to scan a picture, universal product code barcode, QR code, or other transformed emission claim or carbon credit geolocation claim unit identifier or security; trailer unit inbound scan toggle switch 2650, which may be used to scan a picture, universal product code barcode, QR code, or other transformed emission claim or carbon credit geolocation claim unit identifier or security; and/or container unit inbound scan toggle switch 2660, which may be used to scan a picture, universal product code barcode, QR code, or other transformed emission claim or carbon credit geolocation claim unit identifier or security The claim data scan configuration 2600 may also include one or more of the following elements: package/cargo outbound or delivered module 2693, which may be used to scan a picture, universal product code barcode, QR code, or other transformed emission claim or carbon credit geolocation claim unit or security identifier or security; package/cargo outbound or delivered scan toggle 2670, which may be used to scan a picture, universal product code barcode, QR code, or other transformed emission claim or carbon credit geolocation claim unit identifier or security; cargo outbound or delivered scan toggle 2680, which may be used to scan a picture, universal product code barcode, QR code, or other transformed emission claim or carbon credit geolocation claim unit identifier; trailer outbound or delivered scan toggle 2690, which may be used to scan a picture, universal product code barcode, QR code, or other transformed emission claim or carbon credit geolocation claim unit identifier; and/or container unit outbound or delivered scan toggle 2691, which may be used to scan a picture, universal product code barcode, QR code, or other transformed emission claim or carbon credit geolocation claim unit identifier.

In some implementations, a user 110 may select the package/cargo scan module 2610 to scan or take a picture of a package or cargo identification code, such as a QR code, Uniform Product code, and/or other identifying package or cargo characteristic. The user 110 may select the package/cargo inbound scan toggle switch 2620, which may capture the identification characteristic, such as QR Codes, Uniform Product Codes, Serial Numbers, and/or other cargo identification characteristics of a package/cargo emission claim or carbon credit geolocation claim unit. Cargo claims may be a larger unit or structure than a package, where the cargo may be, for example, a crate or large movable unit with the identification characteristics mentioned above. For such larger units, the user 110 may use the cargo claim unit inbound scan toggle switch 2640 to capture the cargo identification characteristic for inbound receipt of the emission claim or carbon credit geolocation claim unit. The trailer unit inbound scan toggle switch 2650 option may be used by the user 110 to instruct the system configuration that a large trailer unit, such as an eighteen wheel trailer unit or smaller trailer, may be scanned to identify the emission claim or carbon credit geolocation claim unit in order to confirm receipt. The container unit inbound scan toggle switch 2660 may be utilized to track the receipt or location of a shipping container.

In some implementations, the user 110 may select the package/cargo outbound or delivered module 2693 to scan or take a picture of a package or cargo identification code, such as a QR code, Uniform Product code, and/or other identifying package or cargo characteristics to confirm delivery to a delivery address of the emission claim or carbon credit geolocation claim unit. The user 110 may select the package/cargo outbound or delivered scan toggle 2670, which may be used to capture the identification characteristic of a package or cargo emission claim or carbon credit geolocation claim unit once the unit is delivered to the delivery address. For such larger units, such as cargo, the user 110 may use the cargo outbound or delivered scan toggle 2680 to capture the cargo identification characteristic for outbound receipt of the transformed emission claim or carbon credit geolocation claim unit or security. The trailer outbound or delivered scan toggle 2690 may be used by the user 110 to instruct the system that a large trailer unit, such as an eighteen wheel trailer unit or smaller trailer, may be scanned to identify the emission claim or carbon credit geolocation claim unit and confirm claim delivery. The container unit outbound or delivered scan toggle 2691 may be utilized to track the delivery or location of a shipping container which has been delivered. Transformed emission claim or carbon credit geolocation claim units or securities may be a subset or superset of the aforementioned in the formation of an open forward market auction for a multi layered network node topology for a forward market of transformed emission claim or carbon credit geolocation claim units or securities. In particular, the overall input sets may be restricted by claim cargo type, claim package type, claim data type, virtual type, and/or other attributes. As such, optimizations may occur over limited subsets for the emission claim or carbon credit geolocation claim units.

Figure 27:
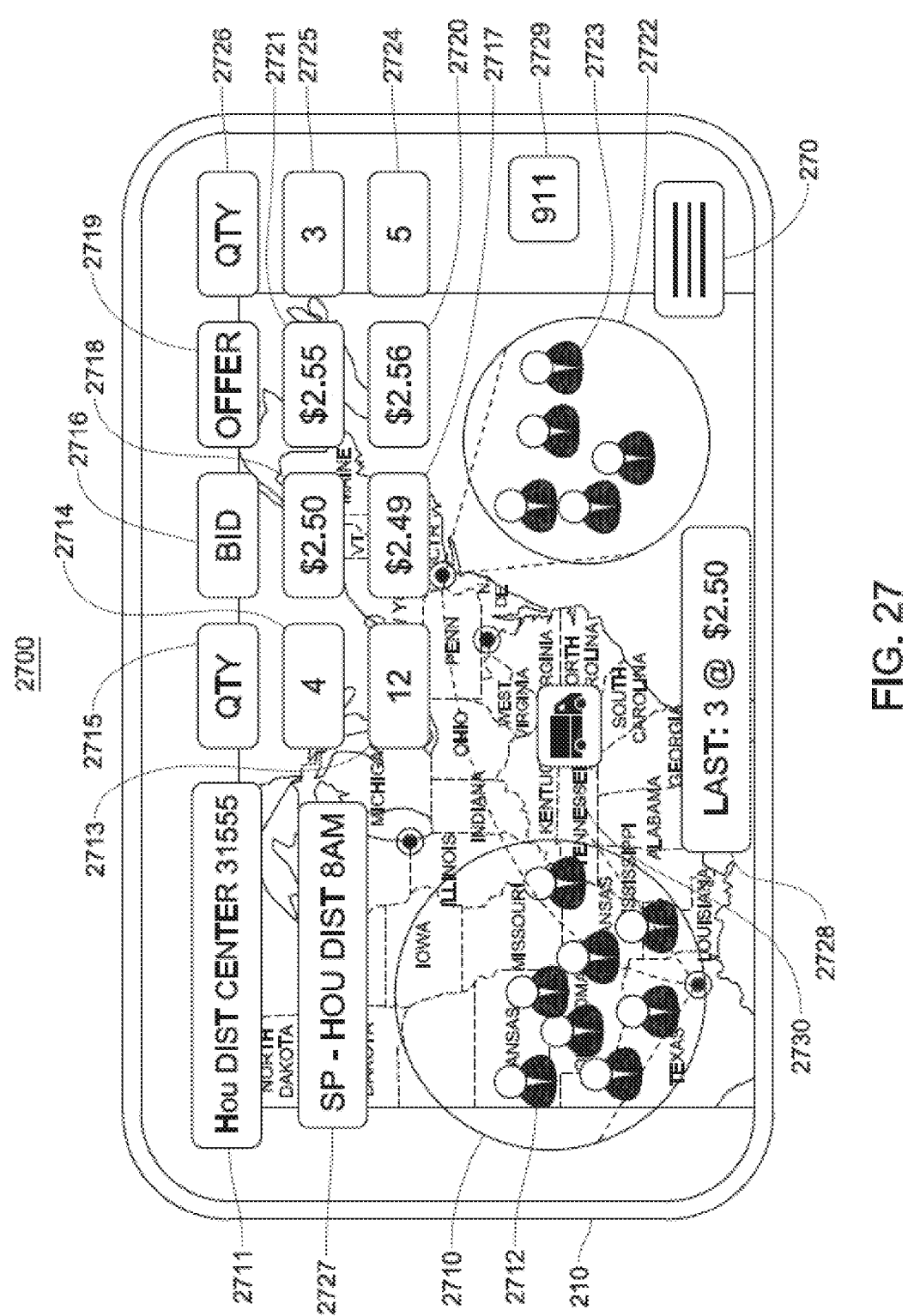

FIG. 27 illustrates the user interface 210 of a computing device in accordance with implementations of various techniques described herein. In particular, the user interface 210 may be used to display an MSP Auto Claim (Medicare Secondary Payer Auto Claim) configuration 2700 for a transformed emission claim or carbon credit geolocation claim unit or security multi layered network node topology, which may be used for participating, transacting and/or trading transformed emission or emission offset and emission or emission offset geolocation claim units or securities. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub combination 2711 from a shipping center location (a data transformation);

a virtual hub origin/from location 2710 with users or claim freight originators 2712 within the virtual hub location 2710 (a data transformation); a specification summary 2727 of the market, level of service and time of delivery commencement (a data transformation); a mode of ground emission or emission offset and emission or emission offset geolocation type 2730 (a data transformation); a transaction summary 2728 of the last trades quantity and price; a virtual hub destination/to location 2722 and user who is being delivered on the emission or emission offset and emission or emission offset geolocation unit 2723 (a data transformation); a bid/buy quantity title header 2715 for a virtual emission claim or carbon credit geolocation claim unit hub market (a data transformation); a bid/buy price title header 2716 for a virtual transportation or freight hub market (a data transformation); an offer/sell price title header 2719 for a virtual transportation or freight hub market (a data transformation); and/or an offer/sell quantity title header 2726 for a virtual transportation or freight hub market (a data transformation).

The user interface 210 may also display and/or include one or more of the following elements: a bid/buy quantity 2714 for the best bid quantity from a plurality of users 110 for a emission or emission offset and emission or emission offset geolocation virtual hub combination 2711 (a data transformation); a bid/buy quantity 2713 for the second-best bid quantity from a plurality of users 110 for a emission or emission offset and emission or emission offset geolocation virtual hub combination 2711 (a data transformation); a bid/buy price 2718 for the best bid price from a plurality of users 110 for a emission or emission offset and emission or emission offset geolocation claim unit virtual hub combination 2711 (a data transformation); a bid/buy price 2717 for the second-best bid price from a plurality of users 110 for a emission or emission offset and emission or emission offset geolocation virtual hub combination 2711 (a data transformation); In addition, the user interface 210 may display and/or include one or more of the following elements: an offer/sell price 2721 for the best offer price from a plurality of users 110 for a emission or emission offset and emission or emission offset geolocation claim unit virtual hub combination 2711 (a data transformation); an offer/sell price 2720 for the second-best offer price from a plurality of users 110 for a emission or emission offset and emission or emission offset geolocation virtual hub combination 2711 (a data transformation); an offer/sell quantity 2725 for the best offer quantity from a plurality of users 110 for a emission or emission offset and emission or emission offset geolocation virtual hub combination 2711 (a data transformation); an offer/sell quantity 2724 for the second-best offer quantity from a plurality of users 110 for a emission or emission offset and emission or emission offset geolocation virtual hub combination 2711 (a data transformation); a safety dispatch "911" button 2729 to enact video and audio recording of the user's 110 environment and dispatch of that information to authorities and system servers; and/or a hamburger menu button 270 to move back to menu options and settings away from the participation, transaction, trading auction GUI 210.

In some implementations, the user 110 may enter a transaction quantity and price for an emission or emission offset and emission or emission offset geolocation units in order to participate, transact and/or trade via the GUI 210, where the mobile computing device (e.g., via the GUI 210) may detect the user's 110 contact or audio interface with the bid/buy price 2718 or offer/sell price 2721. The mobile computing device may detect user's 110 contact with any of the GUI 210 buttons mentioned above. Upon user contact or audio interface with buttons on the GUI 210, instructions may be instantiated in the memory of the device, which may allow the user 110 to change the specifications of the respective virtual hub combination 2711.

A plurality of prices and markets may be presented based on a plurality of transformed contract specifications. In some implementations, the best bid/buy price 2718 may be moving up in price or down in price depending on the market conditions at any given time. The last trade or last transacted price for a given specification may be listed to inform the user 110 as to how the market is moving, which may allow the user 110 to submit a competitive offer/selling price 2721 or bid/buying price 2718. In some implementations, the user 110 may adjust settings of the GUI 210 to show more bid/buying prices 2717 or more offer/selling prices 2720. The matrix of market quantities and prices 2713, 2714, 2715, 2716, 2717, 2718, 2719, 2720, 2721, 2724, 2725, 2726 displayed in the GUI 210 may be referred to as market depth.

In a further implementation, the number of users 110 may be displayed as user icons 2712 or 2723 for the people logged in who desire to transact, trade or participate in a given virtual hub 2710 to virtual hub 2722 combination for emission claim or carbon credit geolocation claim units. Users 110 may select the transportation mode 2730, such that the GUI 210 displays a market for one form of transformed emission or emission offset and emission or emission offset geolocation claim unit as a commodity or security. In a further implementation, the GUI 210 may show multiple forms of emission or emission offset and emission or emission offset geolocation claim unit between virtual emission claim or carbon credit geolocation claim unit hubs 2710, 2711, 2722.

In some implementations, a user 110 may select the 911 button 2729, which may activate voice interface and video recording functions on the mobile computing device and transmit the data with a confirmation from the user 110 to the authorities and system servers to provide enhanced security while participating, transacting or trading forward transformed transportation or freight as a commodity or security. The user may toggle between the GUI 210 market view screen in FIG. 27 and other menu 270 options and settings by the user 110 selecting the hamburger button 270, with the mobile computing device detecting the user 110 input/contact or audio instruction. In some implementations, the mobile computing device may instantiate instructions in its memory, and the device may then transmit transformed emission or emission offset and emission or emission offset geolocation claim unit data through the network 214 or wireless GPS network 215 to call upon instruction routines and instruction sub-routines on the emission claim or carbon credit geolocation claim unit forward market or securities market database server 271, virtual hub database server 223, network member database server 222, map routing servers, no arbitrage condition database server and/or instructions in the memory of the cloud and local CPUs 290. These elements may interface together to make a system configured to deliver emission claim or carbon credit geolocation claim units to users 110 from and to a plurality of virtual hubs 2710, 2722 with a plurality of specifications at specific market prices.

Figure 28:
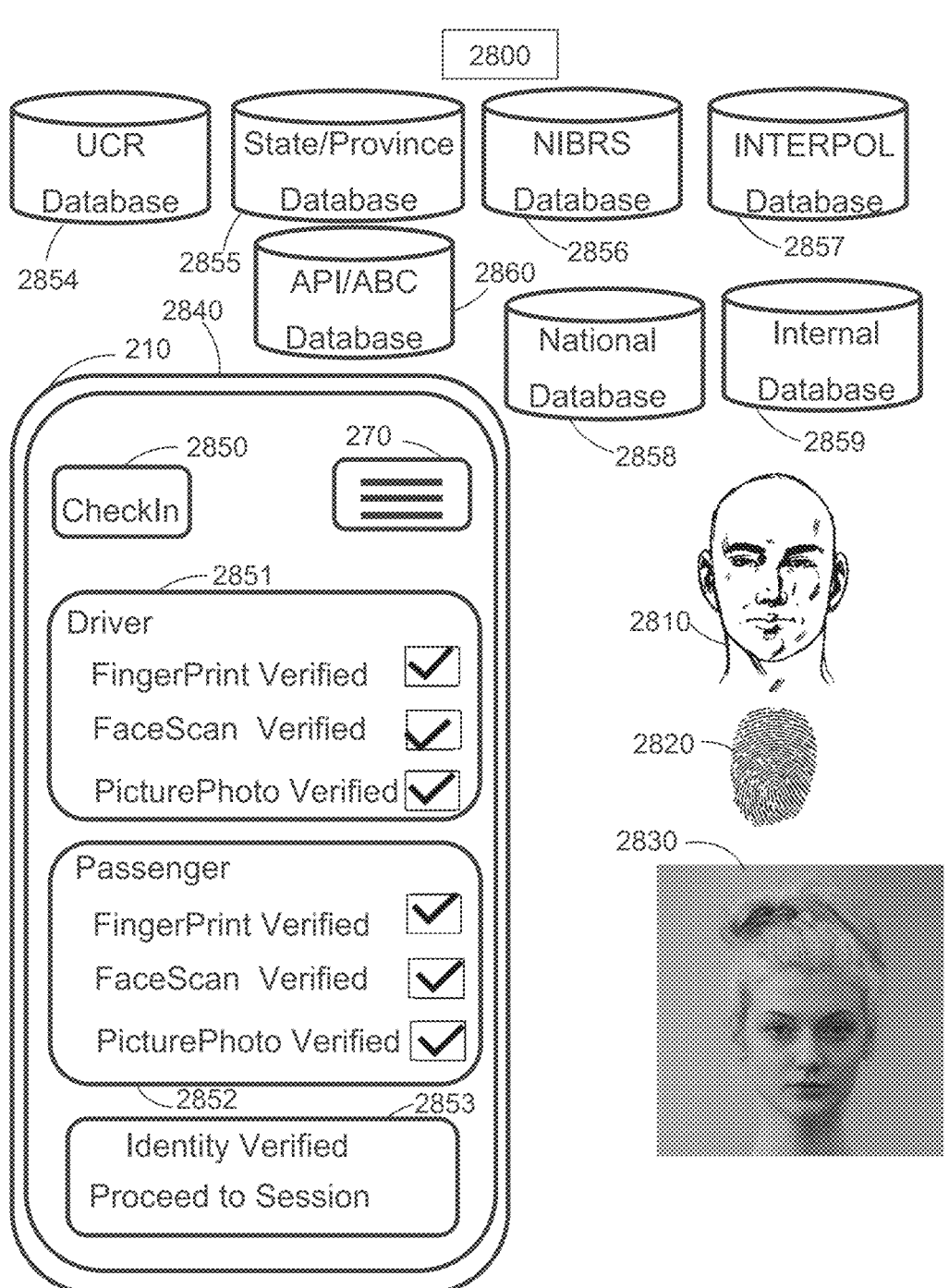
FIG. 28 illustrates a check in and security database configuration for a litigation or patent geolocation claim unit multi-layered network node topology for use with participating, transacting and/or trading transformed litigation and patent geolocation units or securities in accordance with implementations of various techniques described herein.

FIG. 28 illustrates a check in and security database configuration 2800 for an emission claim or carbon credit geolocation claim unit multi-layered network node topology for use with participating, transacting and/or trading transformed emission or emission offset and emission or emission offset geolocation claim units or securities in accordance with implementations of various techniques described herein. The configuration 2800 may be implemented using the mobile computing device mentioned above, where the device may include the GUI 210. In particular, the GUI 210 may be used to display implementations which utilize a multi-layered network node topology for forward market of emission claim or carbon credit geolocation claim units. The emission claim or carbon credit geolocation claim unit security may be the same as those discussed above. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In particular, the check in and security database configuration 2800 may include one or more of the following elements: a uniform crime reporting ("UCR") database 2854 from international agencies who report crime; an international, state, and/or provincial crime reporting database 2855 from international governments who report crime; an international National Incident-Based Reporting System ("NIBRS") crime reporting database 2856 from international governments who report crime; an International Criminal Police Organization (INTERPOL) crime reporting database 2857 from international governments who report crime which connects National Central Bureaus ("NCBs"); an international application program interface and ABC ("API/ABC") crime reporting database 2860 from international governments who report crime; a national crime reporting database 2858 from international governments who report crime; and/or an internal system crime reporting database 2859 from crimes which occurred on system.

The check in and security database configuration 2800 may also include one or more of the following elements: a facial scan to identify a user against a plurality of crime databases based on a facial image 2810; a fingerprint scan to identify a user against a plurality of crime databases based on a fingerprint image 2820; a photo scan to identify a user against a plurality of crime databases based on a photo image 2830; a voice scan to identify a user against a plurality of crime databases based on vocal data; hamburger menu button 270 to move between different application configurations displayed by the GUI 210; a claim driver, claim buyer, or claim seller interface 2851 to confirm an identity against a plurality of crime databases using one or more verification methods; a participant user interface 2852 to confirm an identity against a plurality of crime databases using one or more verification methods; and/or a handshake verification user interface 2853 to confirm both buyer and seller of emission claim or carbon credit geolocation claim units were correctly verified against crime databases which may reduce criminal activity or money laundering issues which could arise.

In some implementations, one or more crime databases may be used to confirm whether a user 110 has a criminal history. Such crime databases may include the UCR Database 2854, the international, state, and/or provincial crime reporting database 2855, the international NIBRS database 2856, the INTERPOL database 2857, the API/ABC database 2860, the national crime reporting database 2858, the internal system crime reporting database 2859, and/or any other crime database known to those skilled in the art. Such security checks may be automated and may be utilized for various modes of transportation, such as those discussed above, which may improve the overall safety of these transportation modes.

In some implementations, a user may be rejected from using a verified transport if the user fails a safety check based on one or more of the crime databases. In contrast, a user that has been confirmed has having no crime history or money laundering red flag issues or users that do not have activity reported in the crime databases mentioned above may be provided a claim verified status 2853 in the system.

Figure 29:
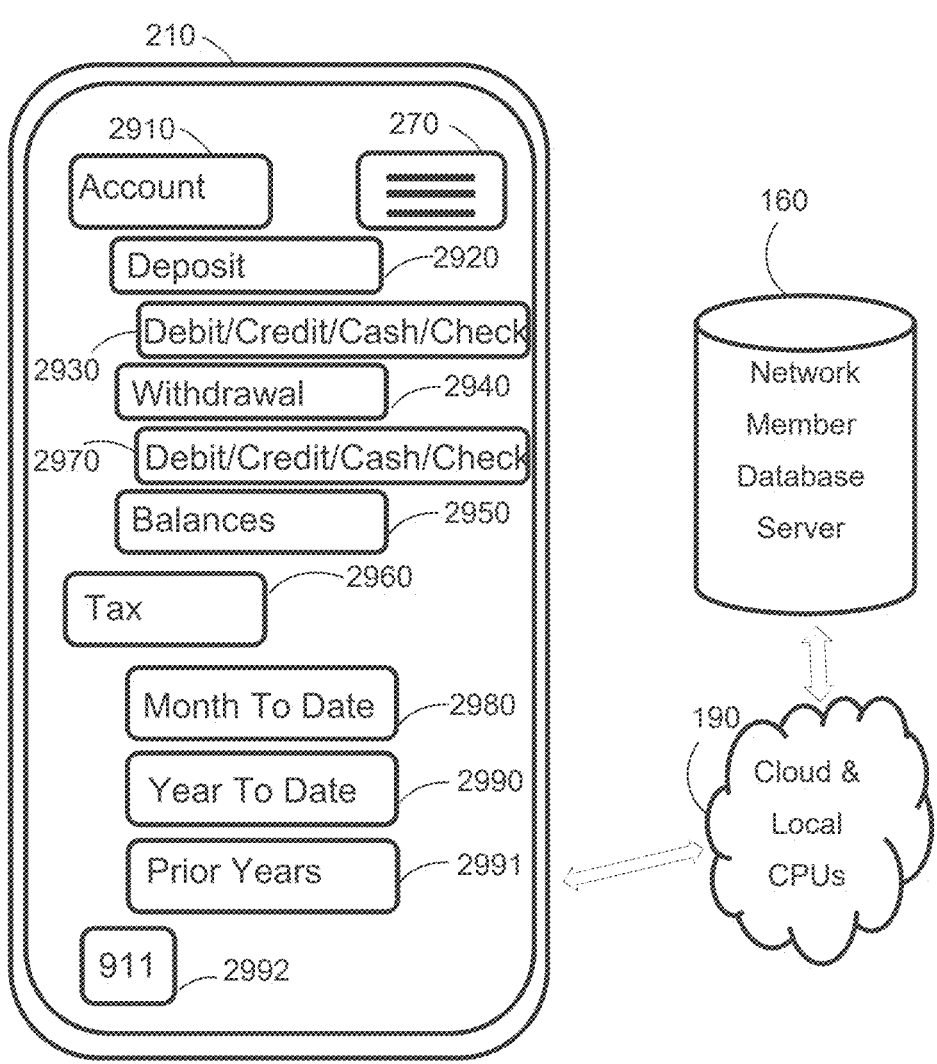
FIG. 29 illustrates a user accounting configuration for a transformed litigation or patent geolocation claim unit or security multi-layered network node topology for use with participating, transacting and/or trading transformed litigation and patent geolocation unit auctions in accordance with implementations of various techniques described herein.

FIG. 29 illustrates a user accounting configuration 2900 for a transformed emission claim or carbon credit geolocation claim unit or security multi-layered network node topology for use with participating, transacting and/or trading transformed emission or emission offset and emission or emission offset geolocation claim unit auctions in accordance with implementations of various techniques described herein. The configuration 2900 may be implemented using the computing device (e.g., mobile computing device) mentioned above, where the device may include the GUI 210. In particular, the GUI 210 may be used to display implementations which utilize a multi-layered network node topology for forward market of emission claim or carbon credit geolocation claim units. The emission claim or carbon credit geolocation claim unit security may be the same as those discussed above. Further, the computing device may be voice-enabled device, a screen-enabled device, a non-screen enabled device, or any computing device known to those skilled in the art. Further, while the implementations disclosed herein may be discussed in terms of the user 110, the implementations may be used by other types of users, as well.

In particular, the user accounting configuration 2900 may include one or more of the following elements, at least some of which may be implemented using the GUI 210: a hamburger menu button 270 to move between different application configurations of the mobile computing device; an account button 2910 to edit or confirm user account data; a deposit button 2920 to add transaction funds, transaction currency, or transaction balances to the user account; a deposit method button 2930 to add transaction funds, transaction currency, or transaction balances to the user account through debit, credit, cash, check, virtual currency, digital currency, or any other payment method known to those skilled in the art; a withdrawal button 2940 to send transaction funds, transaction currency, or transaction balances to the user account in a different institution; a withdrawal method button 2970 to send transaction funds, transaction currency, or transaction balances to the user account at a different institution through debit, credit, cash, check, virtual currency, digital currency, or any other payment method known to those skilled in the art; a balances button 2950 to confirm user account balances; a tax button 2960 to track user account activity for taxation reporting; a month to date tax reporting button 2980; a year to date tax reporting button 2990; a prior year tax reporting button 2991; a 911 security button 2992; a network member database server 222; and/or a cloud and local CPU network configuration 290 to send and receive network member account data.

The account button 2910 may be used to edit or confirm the user account data, such that, in response to the user operating (e.g., contacting) the account button 2910, the mobile computing device may provide the user account data to the user via display or vocal output. As noted above, the deposit button 2920 may be used to add transaction funds, transaction currency, or transaction balances to the user account, such that, in response to the user operating (e.g., contacting) the deposit button 2920, the mobile computing device may provide user deposit data to the user via display or vocal output. Further, as noted above, the deposit method button 2930 may be used to add transaction funds, transaction currency, or transaction balances to the user account through debit, credit, cash, check, virtual currency, digital currency, or any other payment method known to those skilled in the art. In particular, the deposit method button 2930 may be used to select the method by which the user adds transaction funds, transaction currency, or transaction balances to the user account. In response to the user operating (e.g., contacting) the deposit method button 2930, the mobile computing device may provide user deposit method data to the user via display or vocal output.

As noted above, the withdrawal button 2940 may be used to send transaction funds, transaction currency, or transaction balances to the user account in a different institution, such that, in response to the user operating (e.g., contacting) the withdrawal button 2940, the mobile computing device may provide user withdrawal data to the user via display or vocal output. Further, as noted above, the withdrawal method button 2970 may be used to send transaction funds, transaction currency, or transaction balances to the user account at a different institution through debit, credit, cash, check, virtual currency, digital currency, or any other payment method known to those skilled in the art. In particular, the withdrawal method button 2970 may be used to select the method by which the user sends transaction funds, transaction currency, or transaction balances to the user account. In response to the user operating (e.g., contacting) the withdrawal method button 2970, the mobile computing device may provide user withdrawal method data to the user via display or vocal output.

As noted above, the balances button 2950 may be used to confirm user account balances, such that, in response to the user operating (e.g., contacting) the balances button 2950, the mobile computing device may provide user balances data to the user via display or vocal output. The tax button 2960 may be used to track user account activity for taxation reporting, such that, in response to the user operating (e.g., contacting) the tax button 2960, the mobile computing device may provide user tax data to the user via display or vocal output. Operating (e.g., contacting) the month to date tax reporting button 2980, the year to date tax reporting button 2990, and the prior year tax reporting button 2991 may lead to the mobile computing device providing related data to the user via display or vocal output. In some implementations, accounting and tax information may be stored in the network member database server 222 and transmitted via the cloud and local CPUs 290 to the mobile computing device.

Figure 30:
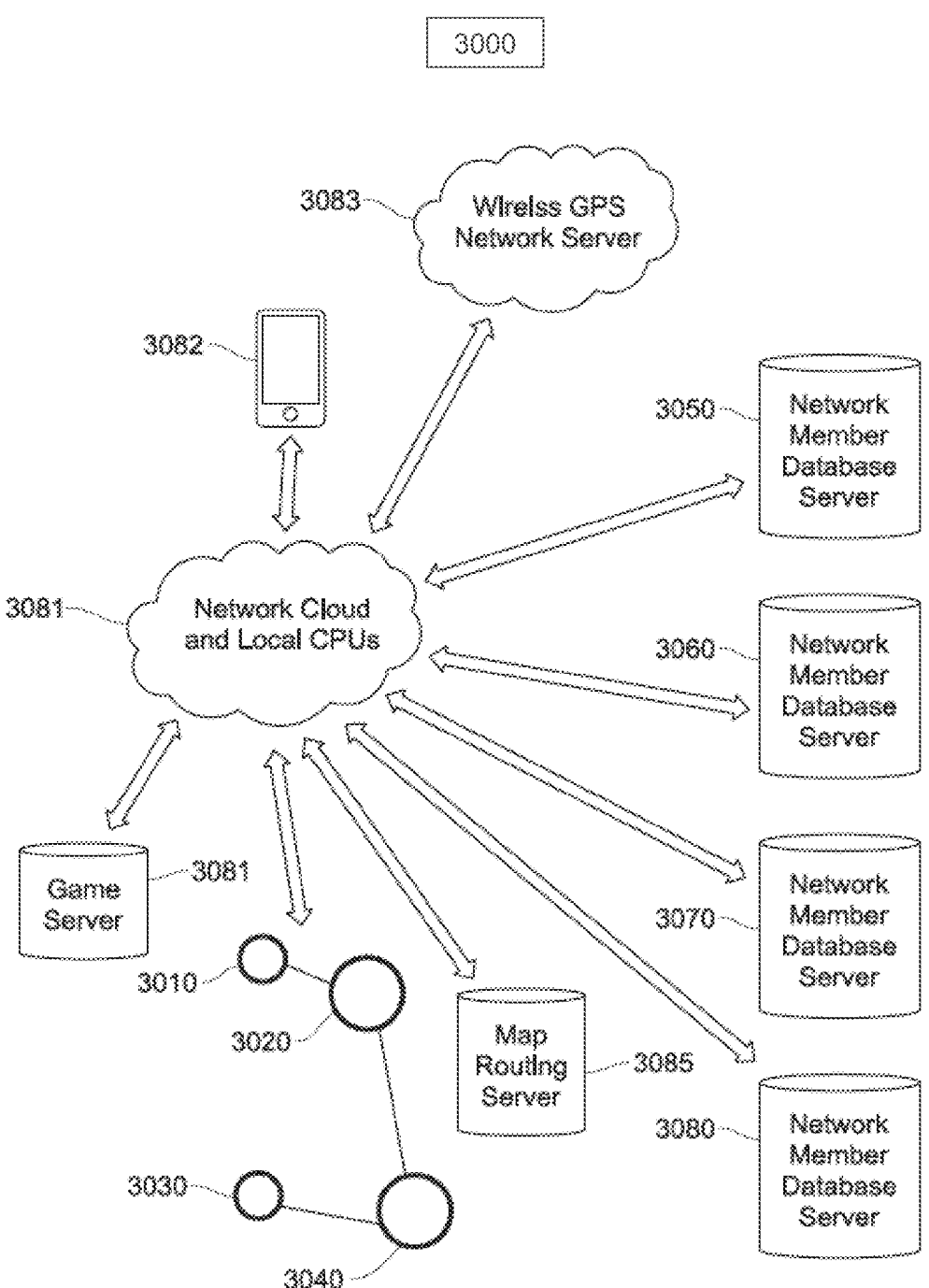
FIG. 30 illustrates a network configuration for a litigation or patent geolocation claim unit multi-layered network node topology.

FIG. 30 illustrates a network configuration 3000 for an emission claim or carbon credit geolocation claim unit multi-layered network node topology. In particular, the network configuration 3000 may be used for participating, transacting and/or trading emission or emission offset and emission or emission offset geolocation claim unit auctions.

In some implementations, the network configuration 3000 may include one or more of the following elements: a wireless GPS network and server 3083; a wireless (e.g., mobile) computing device 3082 that may provide an audio, video, screen, and/or non-screen interface; a network member database server 3050; a transportation forward market database server 3060; a no arbitrage condition database server 3070; a virtual hub database server 3080; a network, network cloud, and local CPUs 3081; and/or a network multi-layered network virtual hub node topology (e.g., virtual hub nodes) 3010, 3020, 3030, 3040 for forward market transportation of freight unit auctions.

In some implementations, the network topology 3010 may utilize the computing device 3082 to interface with system and method instructions over the network, network cloud, and local CPUs 3081. The instructions may be used on CPUs to order a constrained or unconstrained virtual hub network topology auction over two or more virtual hub nodes 3010, 3020, 3030, 3040, where the auction may apply to one or more modes of transportation or freight. Further, the instructions and data may be derived using the virtual hub database server 3080, the no arbitrage condition database server 3070, the emission claim or carbon credit geolocation claim unit forward market or securities market database server 3060, the network member database server 3050, and/or the wireless GPS network and server 3083. Network data may be provided via the wireless computing device, where the device may be voice-enabled device, a screen-enabled device, a non-screen enabled device, or any computing device known to those skilled in the art.

Figure 31:
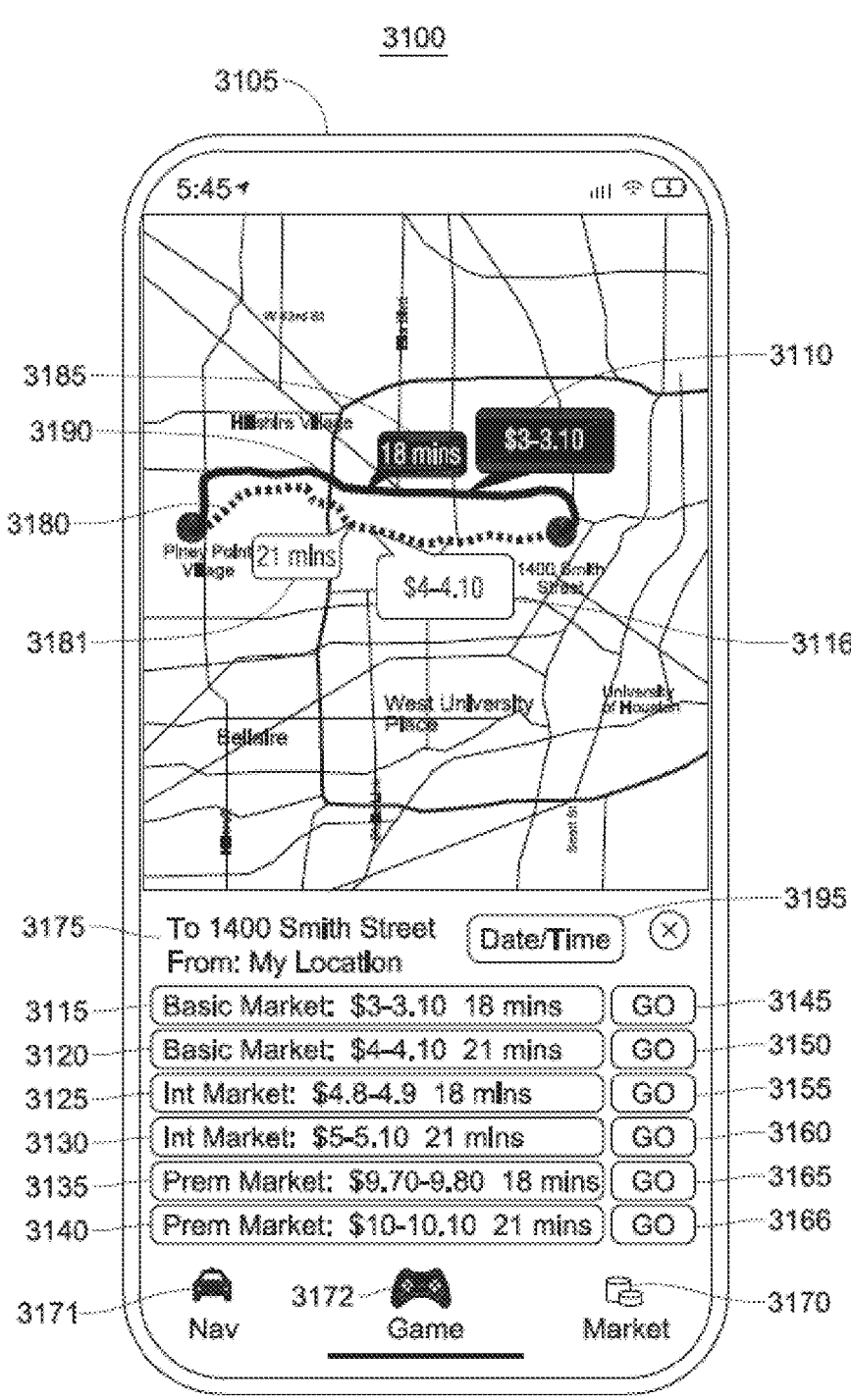
FIGS. 31-35 illustrate a market configuration in accordance with implementations of various techniques described herein.

FIG. 31 illustrates a market configuration 3100 in accordance with implementations of various techniques described herein, where the market configuration 3100 may integrate the implementations disclosed herein as a layer on a map software platform. The map software platform may include third-party map software platforms or any other map software platforms known to those skilled in the art. Further, the configuration 3100 may be used for participating, transacting, and/or trading in transformed emission or emission offset and emission or emission offset geolocation unit auctions. The emission claim or carbon credit geolocation claim unit security may be the same as those discussed above.

The configuration 3100 may be implemented using the computing device (e.g., mobile computing device) mentioned above, where the device may include a user interface 3105. The user interface 3105 may be a GUI or any other user interface known to those skilled in the art. Further, the computing device may be voice-enabled device, a screen-enabled device, a non-screen enabled device, or any computing device known to those skilled in the art. In particular, the interface 3105 may be used to display implementations which utilize a multi-layered network node topology for forward market of emission claim or carbon credit geolocation claim units. Further, the transformed transportation capacity unit market auction, as described in implementations disclosed herein, may be fully functional as a layer in map routing software or as a stand-alone application.

The market configuration 3100 may display and/or include one or more of the following elements, at least some of which may be implemented via the interface 3105:

A claim route request 3175, where the request 3175 is input by a user; a claim route node structure 3190 that satisfies the user claim route request 3175, where the claim route node structure may also be referred to as a route; an alternative claim route node structure 3180 that satisfies the user route request 3175, along with an associated time 3181, and where the route node structure may be referred to as a claim route; a time estimate 3185 for the claim route 3190; a live emission claim or carbon credit geolocation claim unit auction price value 3110 for the claim route 3190; an alternative live auction price value 3116 for the route 3180; a navigation mode button 3171; a game mode button 3172; a date and time modification button 3195 for the route request 3175; a transformed forward emissions claims or carbon credit geolocation unit auction value and modification feed 3115 and selection GO button 3145 to transact for a basic emissions claims or carbon credit geolocation unit or security feature and characteristic for the route 3190; and/or an alternative transformed forward emissions claims or carbon credit geolocation unit auction value and modification feed 3120 and selection GO button 3150 to transact for a basic emissions claims or carbon credit geolocation unit or security feature and characteristic for the alternative route 3180.

The market configuration 3100 may also display and/or include one or more of the following elements, some of which may be implemented via the interface 3105: a transformed forward emissions claims or carbon credit geolocation unit auction value and modification feed 3125 and selection GO button 3155 to transact for an intermediate emissions claims or carbon credit geolocation unit or security feature and characteristic for the claim route 3190; an alternative transformed forward emissions claims or carbon credit geolocation unit auction value and modification feed 3130 and selection GO button 3160 to transact for an intermediate emissions claims or carbon credit geolocation unit or security feature and characteristic for the alternative claim route 3180; a transformed forward emissions claims or carbon credit geolocation unit auction value and modification feed 3135 and selection GO button 3165 to transact for a premium emissions claims or carbon credit geolocation unit or security feature and characteristic for the claim route 3190; an alternative transformed forward emissions claims or carbon credit geolocation unit auction value and modification feed 3140 and selection GO button 3166 to transact for a premium emissions claims or carbon credit geolocation unit or security feature and characteristic for the alternative claim route 3180; and/or a market display button 3170, which may be configured to display the forward transformed emissions claims or carbon credit geolocation unit market auction as an overlay onto a map claim routing platform for the user request 3175.

In some implementations, the interface 3105 may display one or more map routing interfaces or layers on interfaces, such as those provided via third-party map software platforms. In particular, the interface 3105 may integrate the implementations disclosed herein and display the transformed forward emissions claims or carbon credit geolocation unit or security market auction. The interface 3105 may display the auction price along one or more routes based on one or more virtual hub topologies over a user-defined route request 3175. In a further implementation, the mobile computing device may present the forward transformed emissions claims or carbon credit geolocation unit auction price 3110 for the route 3190 via the interface 3105 or any visual, audio, other communication method known to those skilled in the art.

In another implementation, the mobile computing device may communicate (e.g., via the interface 3105) to a user the forward transformed emissions claims or carbon credit geolocation unit or security auction price 3116 of the alternative claim route 3180. The user may view the prices 3116 and 3110 and then select either route 3190 or 3180. The prices 3110 and 3116 may be generated from a plurality of users between two virtual hubs corresponding to the user-defined claim route request 3175. The forward market emissions claims or carbon credit geolocation unit auction may be provided (e.g., via the interface 3105) on an on-demand basis, representing the current time and day. In another implementation, the forward market emissions claims or carbon credit geolocation unit auction may be provided on a forward basis, such as by using the date and time modification button 3195 to display the market pricing for future time intervals for the routes 3190 and 3180 corresponding to the user-defined route request 3175. The user-defined route request 3175 may also be referred to as a user-requested virtual hub combination.

In one implementation, virtual hubs may represent the end points corresponding to the route request 3175. In another implementation, virtual hubs may represent points along a route corresponding to the route request 3175, but not including the endpoints. In yet another implementation, virtual hubs may represent points at locations that are not along the route corresponding to the user-defined route request 3175. Virtual hub combinations may transform emission claim or carbon credit geolocation claim units into a forward market or security market, which may allow users to transact in the physical market by either: a) delivering transformed emissions claims or carbon credit geolocation units as a driver of a vehicle or capacity holder, or b) by receiving the units as a passenger or receiving a package (i.e., if the unit is a package rather than a person). In particular, an emissions claim, or carbon credit geolocation unit or security may represent space which may be filled by a person or a package. Further, the market display button 3170 may overlay the forward transformed emissions claims or carbon credit geolocation unit market or securities auction as a layer on a GPS map routing software platform/display. In one such implementation, the overlay of the market auction may be displayed as an alternative to time based routing or mileage based routing.

The forward emissions claims or carbon credit geolocation unit market may include specifications, such as basic (as shown in feeds 3115 and 3120), intermediate (as shown in feeds 3125 and 3130), and premium (as shown in feeds 3135 and 3140). These specifications may also have one or more other characteristics or levels that form the basis of a fungible transformed contract or substitutable contract between users. The contract may be exchangeable with the same terms and conditions if one user is unable to fulfill his or her contract obligations for the transformed emissions claims or carbon credit geolocation unit. The navigation mode button 3171 may be used to display turn-by-turn directions along the price-based claim navigation route 3190. The game mode button 3172 may be used to display a game-based overlay on the price-based claim navigation route 3190. The market display button 3170 may be used to display a market-based overlay on the priced-based claim navigation route 3190.

As noted above, the configuration 3100 may display one or more prices for routes corresponding to the route request 3175. For example, interface 3105 may display the emissions claims or carbon credit geolocation unit auction prices 3110 and 3116. As shown in FIG. 31, two route prices (e.g., $3 and $3.10) are shown for the live auction price value 3110. The live auction price value 3110 may represent one or more price queues, such as those discussed in implementations described herein. The first price of $3 may represent the price at which a user is willing to buy or pay for an emissions claim or carbon credit geolocation unit along the claim route 3190. The second price of $3.10 may represent the price at which a user is willing to sell an emissions claim or carbon credit geolocation unit along the claim route 3190. The auction may be configured to match, such as through software instructions, the highest bidding price of $3 with the lowest selling price in the price queue when the prices match. For example, if a user wanted to sell an emissions claim or carbon credit geolocation unit at the current forward market auction queue 3110 for route 3190, the user would enter a price of $3, which is the current highest bidding price in the queue 3110. In another example, another user may desire to buy an emissions claim or carbon credit geolocation unit for the forward transformed emissions claims or carbon credit geolocation unit auction route 3190. To match, the user would enter a price of $3.10, which is the lowest selling price of a seller on the forward market emissions claims or carbon credit geolocation unit auction queue 3110.

Figure 32:
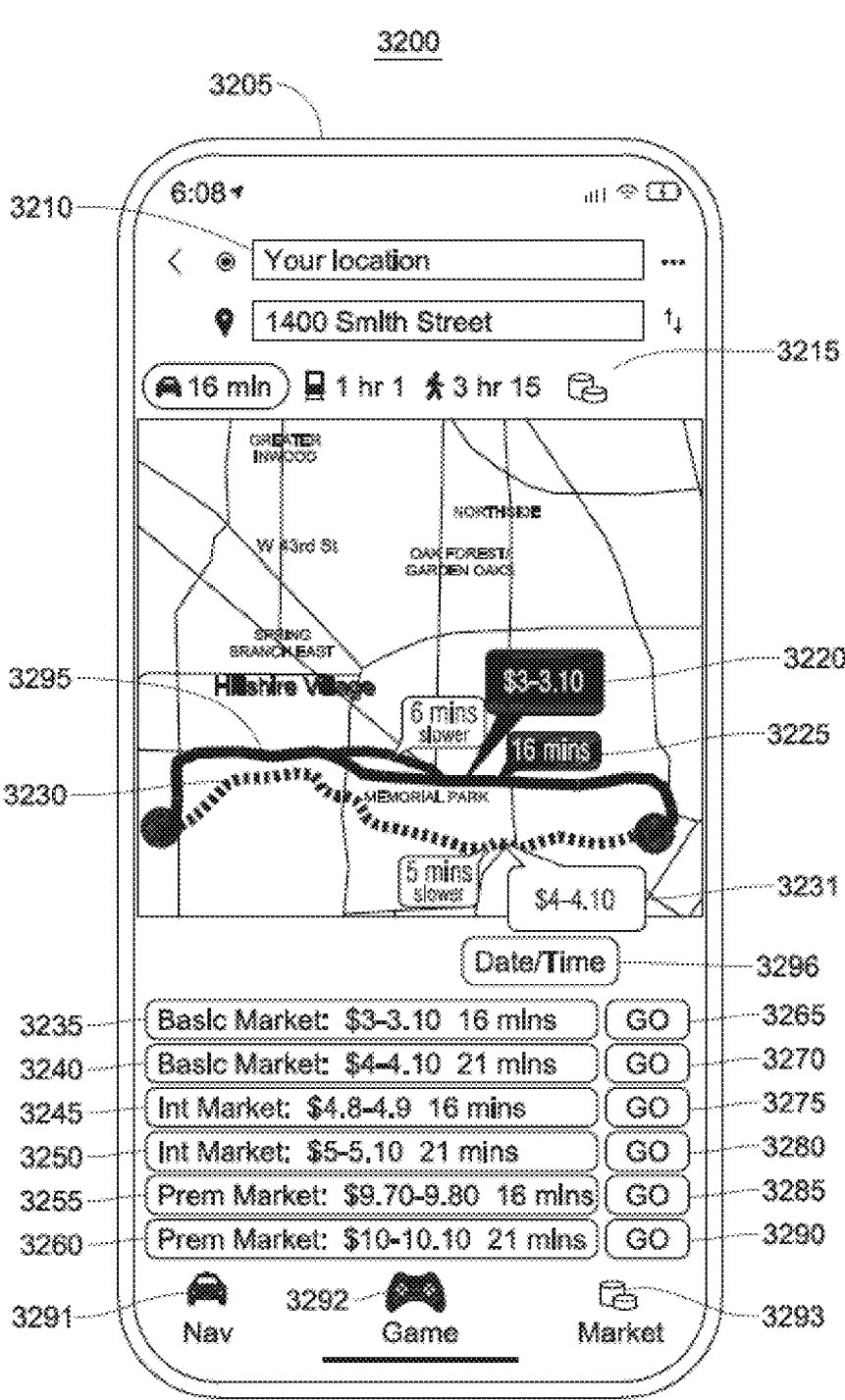

FIG. 32 illustrates a market configuration 3200 in accordance with implementations of various techniques described herein, where the market configuration 3200 may integrate the implementations herein as a layer on another map software platform. The map software platform may include third-party map software platforms or any other map software platforms known to those skilled in the art. Further, the configuration 3200 may be use for participating, transacting, and/or trading in transformed emission or emission offset and emission or emission offset geolocation unit auctions. The emission claim or carbon credit geolocation claim unit security may be the same as those discussed above.

The configuration 3200 may be implemented using the computing device (e.g., mobile computing device) mentioned above, where the device may include a user interface 3205. The user interface 3205 may be a GUI or any other user interface known to those skilled in the art. Further, the computing device may be voice-enabled device, a screen-enabled device, a non-screen enabled device, or any computing device known to those skilled in the art. In particular, the interface 3205 may be used to display implementations which utilize a multi-layered network node topology for forward market or securities market of emission claim or carbon credit geolocation claim units. Further, the transformed transportation capacity unit market auction, as described in implementations disclosed herein, may be fully functional as a layer in map routing software or as a standalone application.

The market configuration 3200 may display and/or include one or more of the following elements, at least some of which may be implemented via the interface 3205:

In some embodiments, a carbon or emission claim route request 3210, where the request 3210 is input by user; a claim route node structure that satisfies the user route request 3210, where the claim route node structure may also be referred to as a claim route; an alternative claim route node structure 3230 that satisfies the user route request 3210 with an associated time, where the claim route node structure may be referred to as a claim route; a time estimate 3225 for the route 3295; a navigation mode button 3291; a game mode button 3292; a market mode button 3293; a live auction price value 3220 for the claim route 3295; an alternative live auction price value 3231 for the route 3230; a date and time modification button 3296 for the claim route request 3210; a transformed forward emissions claims or carbon credit geolocation unit or security auction value and modification feed 3235 and selection GO button 3265 to transact for a basic emissions claims or carbon credit geolocation unit feature and characteristic for the route 3295; and/or an alternative transformed forward emissions claims or carbon credit geolocation unit or security auction value and modification feed 3240 and selection GO button 3270 to transact for a basic emissions claims or carbon credit geolocation unit feature and characteristic for the alternative claim route 3230.

The market configuration 3200 may also display and/or include one or more of the following elements, some of which may be implemented via the interface 3105: a transformed forward emissions claims or carbon credit geolocation unit or security auction value and modification feed

3245 and selection GO button 3275 to transact for an intermediate emissions claims or carbon credit geolocation unit feature and characteristic for the claim route 3295; an alternative transformed forward emissions claims or carbon credit geolocation unit or security auction value and modification feed 3250 and selection GO button 3280 to transact for an intermediate emissions claims or carbon credit geolocation unit feature and characteristic for the alternative route 3230; a transformed forward emissions claims or carbon credit geolocation unit or security auction value and modification feed 3255 and selection GO button 3285 to transact for a premium emissions claims or carbon credit geolocation unit feature and characteristic for the route 3295; an alternative transformed forward emissions claims or carbon credit geolocation unit or security auction value and modification feed 3260 and selection GO button 3290 to transact for a premium transformed emissions claims or carbon credit geolocation unit feature and characteristic for the alternative claim route 3230; and/or a market display feature 3215, which may be configured to display the forward transformed emissions claims or carbon credit geolocation unit market auction as an overlay onto a map routing platform for the user request 3210.

In some implementations, the interface 3205 may display one or more map routing interfaces, such as those provided via third-party map software platforms. In particular, the interface 3205 may integrate the implementations disclosed herein and display the transformed forward emissions claims or carbon credit geolocation unit or security market auction price. The interface 3205 may display the auction along one or more routes based on one or more virtual hub topologies over a user-defined route request 3210. In a further implementation, the mobile computing device may present the forward transformed emissions claims or carbon credit geolocation unit or security auction price 3220 for the route 3295 via the interface 3205 or any visual, audio, other communication method known to those skilled in the art.

In another implementation, the mobile computing device may communicate (e.g., via the interface 3205) to a user the forward transformed emissions claims or carbon credit geolocation unit auction price 3231 of the alternative route 3230. The user may view the prices 3231 and 3220 and then select either route 3295 or 3230. The prices 3231 and 3220 may be generated from a plurality of users between two virtual hubs corresponding to the user-defined route request 3210 and instructions to generate a price queue for buyers and sellers of emissions claims or carbon credit geolocation units long given routes. In some implementations, the user may alter the date using the date and time modification button 3296, such that the transformed emissions claims or carbon credit geolocation unit or security may be updated with user-submitted prices for forward looking time periods. The forward market transformed emissions claims or carbon credit geolocation unit or security auction may be provided (e.g., via the interface 3205) on an on-demand basis, representing the current time and day. In another implementation, the forward market emissions claims or carbon credit geolocation unit auction may be provided on a forward basis, such as by using the date and time modification button 3296 to display the market pricing for future time intervals for the routes 3295 and 3230 corresponding to the user-defined route request 3210. The user-defined route request 3210 may also be referred to as a user-requested virtual hub combination In one implementation, virtual hubs may represent the end points corresponding to the route request 3210. In another implementation, virtual hubs may represent points along a route corresponding to the route request 3210, but not including the endpoints. In yet another implementation, virtual hubs may represent points at locations that are not along the route corresponding to the user-defined route request 3210. Virtual hub combinations may transform transportation capacity units or securities into a forward market, which may allow users to transact in the physical market by either: a) delivering transformed emissions claims or carbon credit geolocation units as a driver of a vehicle or capacity holder, or b) by receiving the units as a passenger or receiving a package (i.e., if the unit is a package rather than a person). In particular, a transformed emissions claims or carbon credit geolocation unit may represent space which may be filled by a person or a package. Further, the market display feature 3215 may overlay the forward transformed emissions claims or carbon credit geolocation unit market auction as a layer on a GPS map routing software platform/display. In one such implementation, the overlay of the market auction may be displayed as an alternative to time based routing.

The forward emissions claims or carbon credit geolocation unit market or securities market may include specifications, such as basic (as shown in feeds 3235 and 3240), intermediate (as shown in feeds 3245 and 3250), and premium (as shown in feeds 3255 and 3260) which may or may not have associated credit and default risk ratings. These specifications may also have one or more other characteristics or levels that form the basis of a fungible contract or substitutable contract between users. The contract may be exchangeable with the same terms and conditions if one user is unable to fulfill his or her contract obligations for the transformed emissions claims or carbon credit geolocation unit. The navigation mode button 3291 may be used to display turn-by-turn directions along the price-based navigation route 3295. The game mode button 3292 may be used to display a game-based overlay on the price-based navigation route 3295. The market mode button 3293 may be used to display a market-based overlay on the priced-based navigation route 3295.

As noted above, the configuration 3200 may display one or more prices for routes corresponding to the route request 3210. For example, interface 3205 may display the transformed emissions claims or carbon credit geolocation unit or security auction prices 3220 and 3231. As shown in FIG. 32, two route prices (e.g., $3 and $3.10) are shown for the live auction price value 3110. The live auction price value 3110 may represent one or more price queues, such as those discussed in implementations described herein. The first price of $3 may represent the price at which a user is willing to buy or pay for an emissions claim or carbon credit geolocation unit along the claim route 3295. The second price of $3.10 may represent the price at which a user is willing to sell an emissions claim or carbon credit geolocation unit along the route 3295. The auction may be configured to match, such as through software instructions, the highest bidding price of $3 with the lowest selling price in the price queue when the prices match. For example, if a user wanted to sell an emission claims or carbon credit geolocation unit at the current forward market auction queue 3220 for route 3295, the user would enter a price of $3, which is the current highest bidding price in the queue 3220. In another example, another user may desire to buy a transformed emissions claims or carbon credit geolocation unit for the forward transformed emissions claims or carbon credit geolocation unit or security auction route 3295. To match, the user would enter a price of $3.10, which is the lowest selling price of a seller on the forward market transformed emissions claims or carbon credit geolocation unit auction queue 3220.

Figure 33:
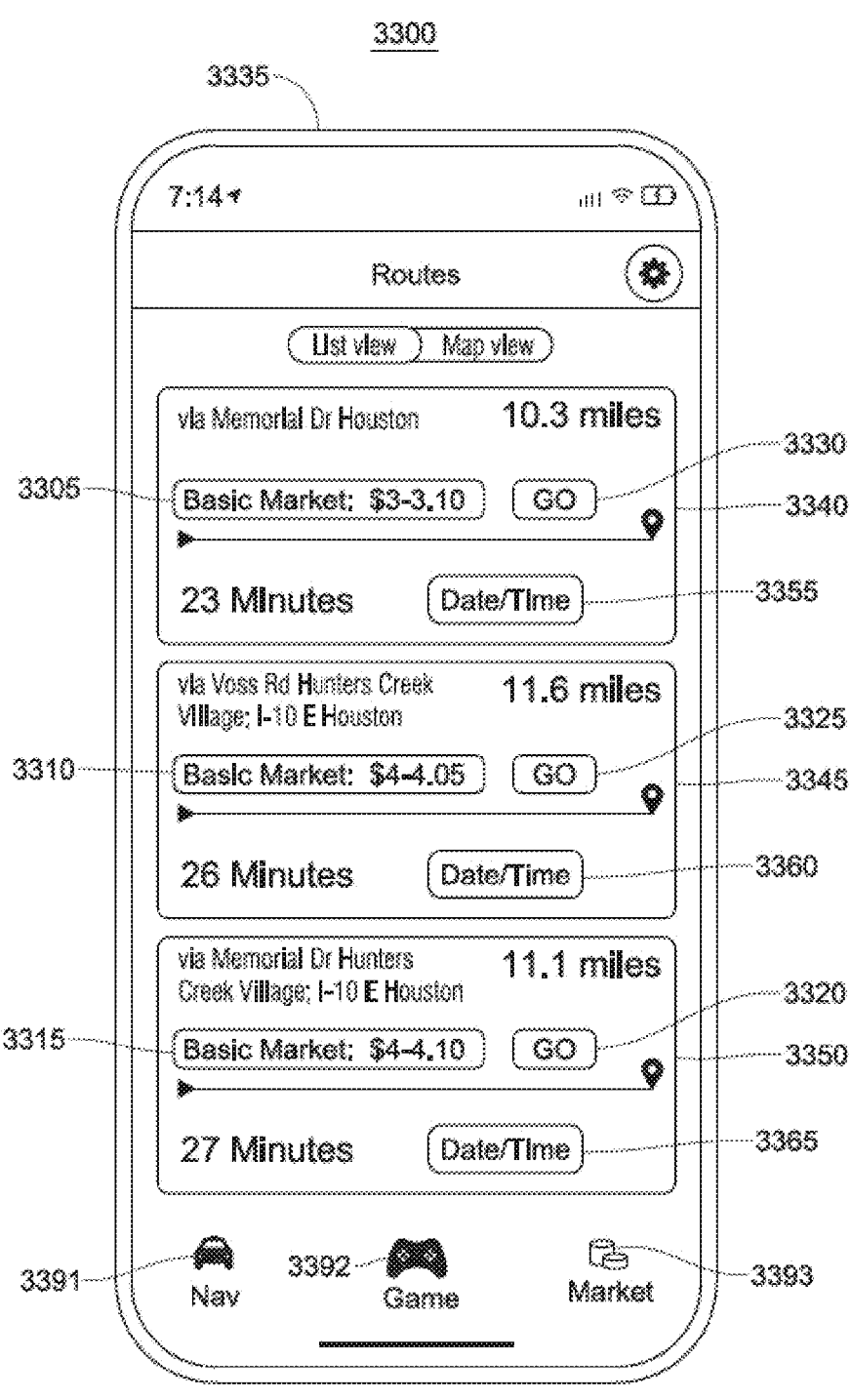

FIG. 33 illustrates a market configuration 3300 in accordance with implementations of various techniques described herein, where the market configuration 3300 may integrate the implementations disclosed herein as a layer on a map software platform. The map software platform may include third-party map software platforms or any other map software platforms known to those skilled in the art. Further, the configuration 3300 may be used for participating, transacting, and/or trading in transformed emission or emission offset and emission or emission offset geolocation unit auctions. The emission claim or carbon credit geolocation claim unit security may be the same as those discussed above.

The configuration 3300 may be implemented using the computing device (e.g., mobile computing device) mentioned above, where the device may include a user interface 3335. The user interface 3335 may be a GUI or any other user interface known to those skilled in the art. Further, the computing device may be voice-enabled device, a screen-enabled device, a non-screen enabled device, or any computing device known to those skilled in the art. In particular, the interface 3335 may be used to display implementations which utilize a multi-layered network node topology for forward market or securities market of emission claim or carbon credit geolocation claim units. Further, the transformed transportation capacity unit market auction, as described in implementations disclosed herein, may be fully functional as a layer in map routing software or as a stand-alone application.

The market configuration 3300 may display and/or include one or more of the following elements, at least some of which may be implemented via the interface 3335; a route node structure 3340 that satisfies user route request with an associated time and price, where the route node structure may also be referred to as a route; an alternative route node structure 3345 that satisfies the user route request with an associated time and price, where the route node structure may also be referred to as a route; another alternative route node structure 3350 that satisfies the user route request with an associated time and price, where the route node structure may also be referred to as a route; a live auction price value 3305 for the price-based route 3340; a navigation mode button 3391; a game mode button 3392; a market mode button 3393; a go 3330 button to transact or modify the price based routing; a go 3325 button to transact or modify the price based routing; a go 3320 button to transact or modify the price based routing; an alternative live auction price value 3310 for the route 3345; an alternative live auction price value 3315 for the route 3350; a date and time modification button 3355 for the route 3340; a date and time modification button 3360 for the route 3345; and/or a date and time modification button 3365 for the route 3350.

In some implementations, the interface 3335 may display one or more map routing interfaces, such as those provided via third-party map software platforms. In particular, the interface 3335 may integrate the implementations disclosed herein and display the transformed forward emissions claims or carbon credit geolocation unit market auction. The interface 3335 may display the auction price along one or more routes based on one or more virtual hub topologies over a user-defined route request. In a further implementation, the mobile computing device may present the forward transformed emissions claims or carbon credit geolocation unit or security auction price 3305 on for the route 3340 via the interface 3335 or any visual, audio, other communication method known to those skilled in the art.

In another implementation, the mobile computing device may communicate (e.g., via the interface 3335) to a user the forward transformed emissions claims or carbon credit geolocation unit auction price 3310 of the alternative route 3345. The user may view the prices 3305, 3310, and 3315 and then select one of route 3340, 3345, or 3350. The prices 3305, 3310, and 3315 may be generated from a plurality of users between two virtual hubs corresponding to the user-defined route request and generated using a price queue for buyers and sellers of emissions claims or carbon credit geolocation units along the routes 3340, 3345, or 3350. The forward market transformed emissions claims or carbon credit geolocation unit or security auction may be provided (e.g., via the interface 3335) on an on-demand basis, representing the current time and day. provided (e.g., via the interface 3335) on an on-demand basis, representing the current time and day. In another implementation, the forward market emissions claims or carbon credit geolocation unit auction may be provided on a forward basis or with various cash flow durations to match obligations of a plurality of fixed income portfolios or pension funds or retirement funds or endowments, such as by using the date and time modification buttons 3355, 3360, 3365 to display the market pricing for future time intervals for the routes 3340, 3345, and 3350 corresponding to the user-defined claim route request. The user-defined route request may also be referred to as a user-requested virtual hub combination. In a further implementation, the user may utilize the date and time modification buttons 3355 to alter the date, such that the transformed emissions claims or carbon credit geolocation unit or security may be updated with user-submitted prices 3305 for forward looking time periods.

In one implementation, virtual hubs may represent the end points corresponding to the route defined by the user. In another implementation, virtual hubs may represent points along a route corresponding to the user-defined route request, but not including the endpoints. In yet another implementation, virtual hubs may represent points at locations that are not along the route corresponding to the user-defined route request. Virtual hub combinations may transform emission claim or carbon credit geolocation claim units into a forward market, which may allow users to transact in the physical market by either: a) delivering emissions claims or carbon credit geolocation units as a driver of a claim vehicle or claim capacity holder, or b) by receiving the units as a passenger or receiving a claim package (i.e., if the unit is a claim or package rather than a person). In particular, an emissions claim or carbon credit geolocation unit may represent space which may be filled by an emission claim or carbon credit geolocation claim unit of any type. Further, the forward emissions claims or carbon credit geolocation unit market auction overlay may be a layer on a GPS map routing software platform/display. In one such implementation, the overlay of the market auction may be displayed as an alternative to time based routing.

The forward emissions claims or carbon credit geolocation unit market may include specifications, such as basic (as shown with respect to values 3305, 3310, and 3315). These specifications may also have one or more other transformed characteristics or levels that form the basis of a fungible contract or substitutable contract specifications between users. The contract may be exchangeable with the same terms and conditions if one user is unable to fulfill his or her contract obligations for the transformed emissions claims or carbon credit geolocation unit or security. The navigation mode button 3391 may be used to display turn-by-turn directions along a price-based navigation route. The game mode button 3392 may be used to display a game-based overlay on a price-based navigation route. The market mode button 3393 may be used to display a market-based overlay on a priced based navigation route.

As noted above, the configuration 3300 may display one or more prices for routes corresponding to the route request. For example, interface 3335 may display the emissions claims or carbon credit geolocation unit auction prices 3305, 3310, and 3315. As shown in FIG. 33, two or more prices may correspond to each route. For example, two route prices (e.g., $3 and $3.10) are shown for the live auction price value 3305. The live auction price value 3305 may represent one or more price queues, such as those discussed in implementations described herein. The first price of $3 may represent the price at which a user is willing to buy or pay for an emissions claims or carbon credit geolocation unit along the route 3340. The second price of $3.10 may represent the price at which a user is willing to sell an emissions claim or carbon credit geolocation unit along the route 3340. The auction may be configured to match, such as through software instructions, the highest bidding price of $3 with the lowest selling price in the price queue when the prices match. For example, if a user wanted to sell an emissions claims or carbon credit geolocation unit at the current forward market auction queue 3305 for the route 3340, then the user would enter a price of $3, which is the current highest bidding price in the queue 3305. In another example, another user may desire to buy an emissions claim or carbon credit geolocation unit for the forward emissions claims or carbon credit geolocation unit auction for the route 3340. To match, the user would enter a price of $3.10, which is the lowest selling price of a seller on the forward market emissions claims or carbon credit geolocation unit auction queue 3305.

Figure 34:
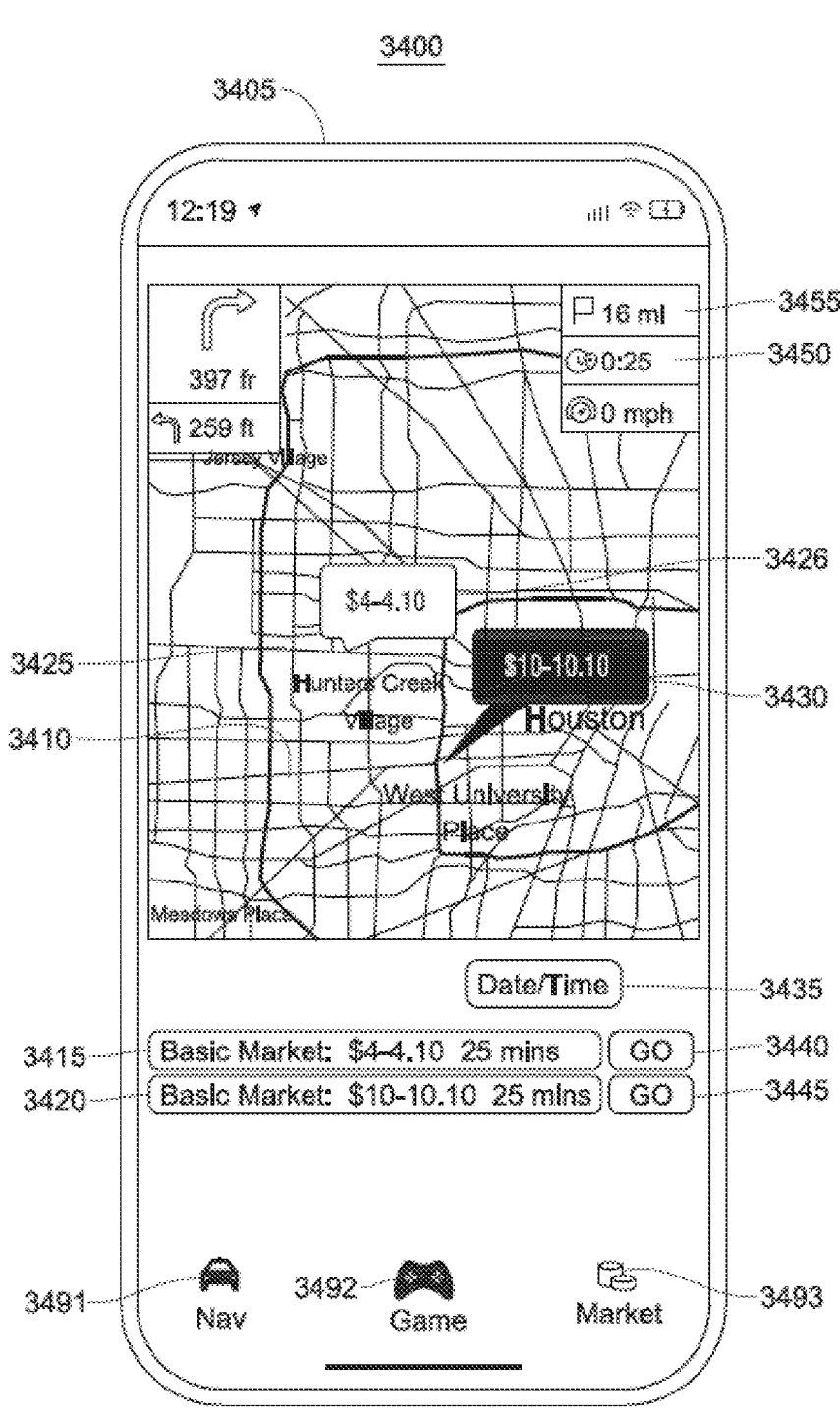

FIG. 34 illustrates a market configuration 3400 in accordance with implementations of various techniques described herein, where the market configuration 3400 may integrate the implementations disclosed herein as a layer on a map software platform. The map software platform may include third-party map software platforms or any other map software platforms known to those skilled in the art. Further, the configuration 3400 may be used for participating, transacting, and/or trading in transformed emission or emission offset and emission or emission offset geolocation unit auctions. The emission claim or carbon credit geolocation claim unit security may be the same as those discussed above.

The configuration 3400 may be implemented using the computing device (e.g., mobile computing device) mentioned above, where the device may include a user interface 3405. The user interface 3405 may be a GUI or any other user interface known to those skilled in the art. Further, the computing device may be voice-enabled device, a screen-enabled device, a non-screen enabled device, or any computing device known to those skilled in the art. In particular, the interface 3405 may be used to display implementations which utilize a multi-layered network node topology for forward market of emission claim or carbon credit geolocation claim units. Further, the transformed transportation capacity unit market auction, as described in implementations disclosed herein, may be fully functional as a layer in map routing software or as a stand-alone application.

The market configuration 3400 may display and/or include one or more of the following elements, at least some of which may be implemented via the interface 3405: a route

3410; a live auction price value 3430 for the route 3410; an alternative live auction claim price value 3426 for a claim route 3425; a navigation claim mode button 3491; a game mode button 3492; a market mode button 3493; a date and time modification button 3435 for the route 3410; a mileage estimate 3455 for the claim route 3410; a claim route estimate 3450 for the route 3410; a transformed forward emissions claims or carbon credit geolocation unit auction value and modification feed 3415 and selection GO button 3440 to transact for a basic emissions claims or carbon credit geolocation unit or security feature and characteristic for the route 3425; and/or a transformed forward emissions claims or carbon credit geolocation unit or security auction value and modification feed 3420 and selection GO button 3445 to transact for a premium emissions claims or carbon credit geolocation unit feature and characteristic for the route 3410.

In some implementations, the navigation mode button 3491 may be used to display turn-by-turn directions along the price-based navigation route 3410. The game mode button 3492 may be used to display a game-based overlay on the price-based navigation route 3410. The market mode button 3493 may be used to display a market-based overlay on the priced-based navigation route 3410.

Figure 35:
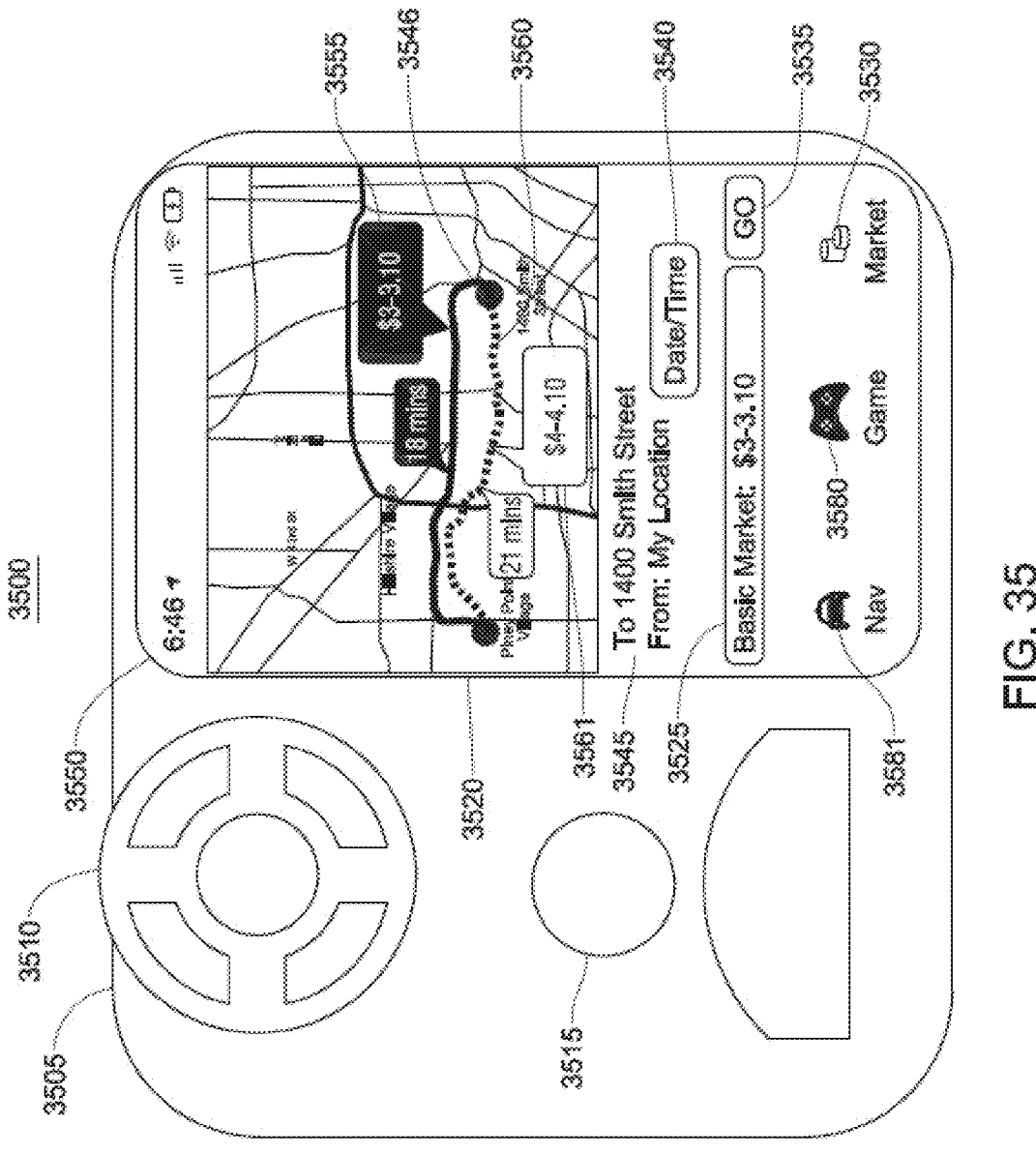

FIG. 35 illustrates a market configuration 3500 in accordance with implementations of various techniques described herein, where the market configuration 3500 may integrate the implementations disclosed herein as a layer on a map software platform in the setting of a vehicle GPS navigation system. The map software platform may include third-party map software platforms or any other map software platforms known to those skilled in the art. Further, the configuration 3500 may be used for participating, transacting, and/or trading in transformed emission or emission offset and emission or emission offset geolocation unit auctions. The emission claim or carbon credit geolocation claim unit security may be the same as those discussed above.

The configuration 3500 may be implemented using a computing device (e.g., mobile computing device) mentioned above, where the device may include a user interface 3550. The user interface 3550 may be a GUI or any other user interface known to those skilled in the art. Further, the computing device may be voice-enabled device, a screen-enabled device, a non-screen enabled device, or any computing device known to those skilled in the art. In particular, the interface 3550 may be used to display implementations which utilize a multi-layered network node topology for forward market of emission claim or carbon credit geolocation claim units. Further, the transformed transportation capacity unit market auction, as described in implementations disclosed herein, may be fully functional as a layer in map routing software or as a stand-alone application.

The market configuration 3500 may display and/or include one or more of the following elements, at least some of which may be implemented via the interface 3550: a vehicle emissions claims or carbon credit geolocation unit carrier unit 3505; a vehicle emissions claims or carbon credit geolocation unit steering wheel 3510; a claim navigation mode button 3581; a game mode button 3580; a market mode button 3530; a user 3515 of emissions claims or carbon credit geolocation unit, such as a seller or a driver; address information 3545 for a claim route 3546, where the claim route 3546 satisfies a user request; a date and time modification button 3540 for the claim route 3546; a transformed forward emissions claims or carbon credit geolocation unit auction value and modification feed 3525 and selection GO button 3535 to transact for a basic emissions claims or carbon credit geolocation unit feature and characteristic for the route 3546 that satisfies the user calm route request; a live auction price value 3555 for the route 3546; a live auction price value 3561 for an alternative route 3560 satisfying the user request; and/or a market layer routing overlay 3530.

In some implementations, the configuration 3500 may be implemented using a vehicle unit GPS navigation system. In particular, the interface 3550 may be used to display and/or may be integrated with the vehicle unit GPS navigation system. The user 3515 may input driving address information 3545 having an origin location and a destination location. In some implementations, the crash incident GPS algorithms and system 16000 may link to the vehicle to automatically produce the claim upon detection. In additional implementations, the vehicle cameras, microphones and accelerometer may be linked to the multifunction device to automate the claim origination process. In some implementations, the user 3515 may communicate with the interface 3550 through a touchscreen 3520, an audio interface, or another interface. The user 3515 may use the date and time modification button 3540 to change the displayed pricing for the route 3546 from an on-demand (i.e., current time) to a forward time or date (i.e., future time). The market auction based pricing for the route 3546 may vary by date and time due to a plurality of market factors. The user 3515 may edit the displayed market-based auction price for the emissions claims or carbon credit geolocation units by modifying the transformed forward emissions claims or carbon credit geolocation unit auction value and modification feed 3525. Further, the user 3515 may transact for the emissions claims or carbon credit geolocation unit at a particular auction price by selecting the GO button 3535. The navigation mode button 3581 may be used to display turn-by-turn directions along the price-based navigation route 3546. The game mode button 3580 may be used to display a game-based overlay on the price based navigation route 3546. The market mode button 3530 may be used to display a market-based overlay on the priced-based navigation route 3546.

The configuration 3500 may display one or more prices for routes corresponding to a user route request. For example, interface 3550 may display the emissions claims or carbon credit geolocation unit auction prices 3555 and 3561. As shown in FIG. 35, two route prices (e.g., $3 and $3.10) are shown for the live auction price value 3555. The live auction price value 3555 may represent one or more price queues, such as those discussed in implementations described herein. The first price of $3 may represent the price at which a user is willing to buy or pay for an emissions claims or carbon credit geolocation unit along the route 3546. The second price of $3.10 may represent the price at which a user is willing to sell an emissions claim or carbon credit geolocation unit along the claim route 3546. The auction may be configured to match, such as through software instructions, the highest bidding price of $3 with the lowest selling price in the price queue when the prices match. For example, if a user 3515 wanted to sell an emissions claims or carbon credit geolocation unit at the current forward market auction queue 3555 for claim route 3546, then the user 3515 would enter a price of $3, which is the current highest bidding price in the queue 3555. In another example, another user may desire to buy an emissions claims or carbon credit geolocation unit for the forward transformed emissions claims or carbon credit geolocation unit or security auction route 3546. To match, the user would enter a price of $3.10, which is the lowest selling price of a seller on the forward market transformed emis-
sions claims or carbon credit geolocation unit or security
auction queue 3555.

In some implementations, alternative routes, such as
claim route 3560, having prices in alternative emissions
claims or carbon credit geolocation unit auctions may have
different prices based on supply and demand conditions. In
some embodiments the market layer routing overlay button
3530 may be used to provide an alternative to time-based
routing or mileage-based routing which are fundamentally
different premises. In a further implementation, the overall
software system and associated instructions may ask the user
3515, such as through the interface 3550 or any other
interface (e.g., audio), if he or she would like to monetize
their claims upon starting any navigation sequence for
transformed emissions claims or carbon credit geolocation
units or securities.

Figure 36:
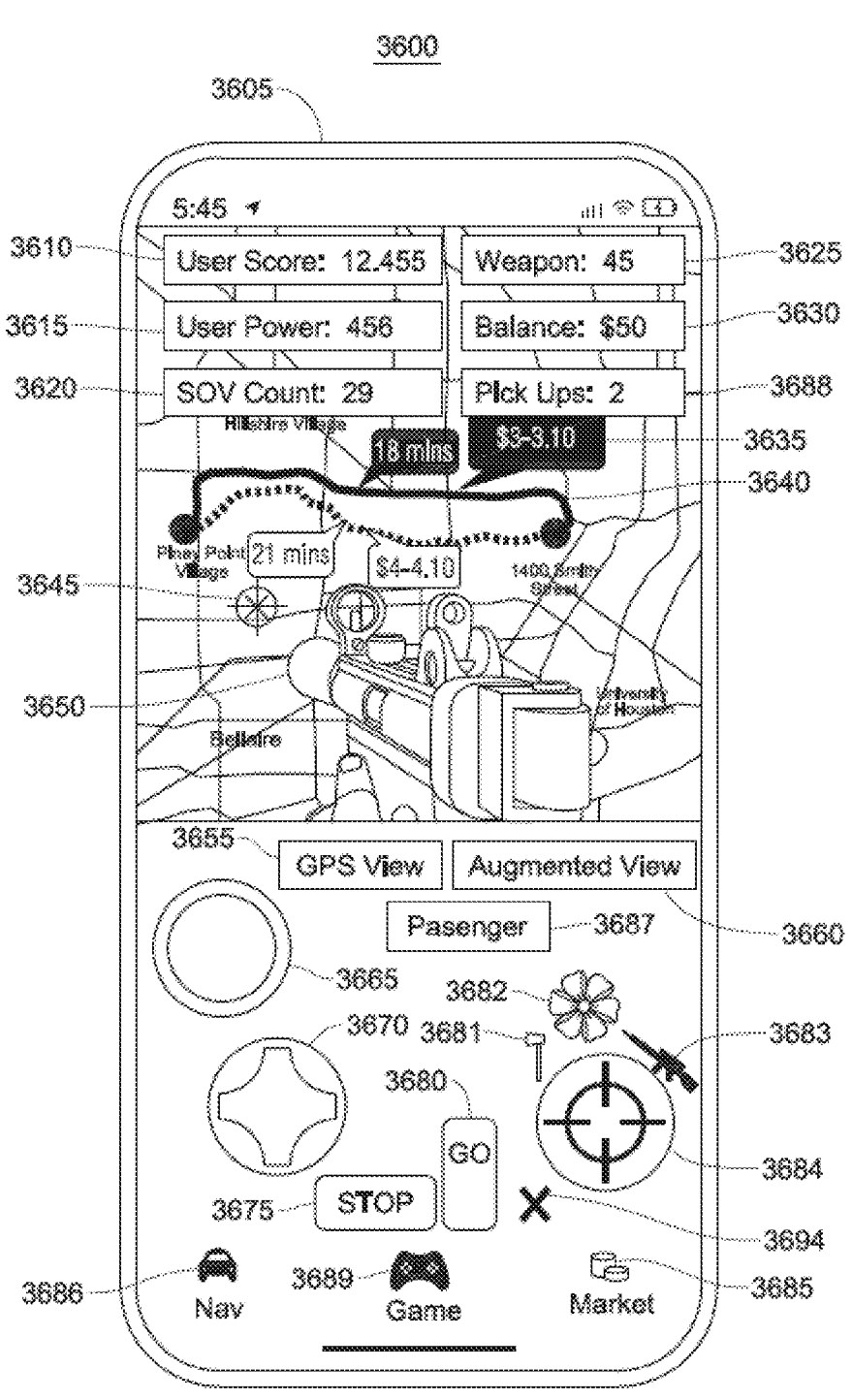
FIGS. 36-39 illustrate an accident logging and gaming configuration in accordance with implementations of various techniques described herein.

FIG. 36 illustrates a gaming configuration 3600 in accor-
dance with implementations of various techniques described
herein, where the gaming configuration 3600 may integrate
the implementations disclosed herein as a game layer on a
map software platform or general platform to help assist
with data collection and claim processing. The map software
platform may include an internal map software platform, a
third-party map software platform, or any other map soft-
ware platforms known to those skilled in the art. Further, the
configuration 3600 may be used for participating, transact-
ing, and/or trading in transformed emission or emission
offset and emission or emission offset geolocation unit
auctions. The emission claim or carbon credit geolocation
claim unit security may be the same as those discussed
above.

The configuration 3600 may be implemented using the
computing device (e.g., mobile computing device) men-
tioned above, where the device may include a user interface
3605. The user interface 3605 may be a GUI or any other
user interface known to those skilled in the art. Further, the
computing device may be voice-enabled device, a screen-
enabled device, a non-screen enabled device, or any com-
puting device known to those skilled in the art. In particular,
the interface 3605 may be used to display implementations
which utilize a multi-layered network node topology for
forward market of emission claim or carbon credit geolo-
cation claim units. Further, the transformed emission claim
or carbon credit geolocation claim unit market auction, as
described in implementations disclosed herein, may be fully
functional as a layer in map routing software or as a
stand-alone application.

The gaming configuration 3600 may display and/or
include one or more of the following elements, at least some
of which may be implemented via the interface 3605:

a game overlay user score indicator 3610; a game overlay
user power indicator 3615; a game overlay single
occupancy vehicle (SOV) claim count indicator 3620;
a game overlay weapon strength indicator 3625; a
claim game overlay account balance indicator 3630; a
claim game overlay passenger pick-ups indicator 3688;
a claim game overlay SOV target 3645; a claim game
overlay SOV weapon 3650; a claim game overlay GPS
standard map view button 3655; a game overlay aug-
mented or mixed reality view button 3660; a game
overlay passenger mode button 3687; a game overlay
fire button 3665; a game overlay multi-purpose direc-
tion button 3670; a game overlay go button 3680; a
game overlay stop button 3675; a navigation overlay
button 3686; a game overlay button 3689; a market
overlay button 3685; market overlay weapon selection buttons 3683, 3682, 3681, 3694; and/or a market over-
lay aim finder toggle 3684.

In some implementations, a user may use the claim game
overlay button 3689 to generate a game layer over the
displayed mapping, where the claim game layer may also be
displayed using the interface 3605. The user may use the
game layer to engage with a gaming environment that
interacts with the transformed emission or emission offset
and emission or emission offset geolocation unit auction
described above. The claim gaming environment and game
layer be implemented using instructions and a computing
system, as known to those skilled in the art. In one imple-
mentation, the gaming environment may be used to award
scores and/or points for reporting travel or incident data
targeted using the SOV count indicator 3620, to compute
and distribute positive or negative emissions claims or
carbon credit geolocation unit game auction strategy points
(e.g., the points displayed using the score indicator 3610, the
power indicator 3615, and/or the account balance indicator
3630) based on one or more of the following: price 3635,
route mileage, number of claims processed, number of
claims (as shown in claim pick-ups indicator 3688), claim
time estimates, emissions claims or carbon credit geoloca-
tion unit claim route 3640, emissions claims or carbon credit
geolocation unit specifications, emissions claims or carbon
credit geolocation unit model type, emissions claims or
carbon credit geolocation unit make type, emissions claims
or carbon credit geolocation unit age, matched emissions
claims or carbon credit geolocation unit specification,
matched emissions claims or carbon credit geolocation unit
fuel type, matched emissions claims or carbon credit geo-
location unit emission specification, cumulative user emis-
sions claims or carbon credit geolocation unit specifications,
emissions claims or carbon credit geolocation unit rating,
emissions claims or carbon credit geolocation unit safety,
emissions claims or carbon credit geolocation unit time,
emissions claims or carbon credit geolocation unit delay,
emissions claims or carbon credit geolocation unit driver
rating, emissions claims or carbon credit geolocation unit
participant rating, emissions claims or carbon credit geolo-
cation unit timeliness relative to contract specification, and/
or other specifications.

In some implementations, the game overlay button 3689
may be used to generate the game layer via the interface
3605. The game layer may display a plurality of weapon or
scoring configurations, such as a rifle 3683, an axe 3681, a
flower gift 3682, and a X logo 3694. The weapon or scoring
configurations may be used to take away points or gain
points from other users on the system. In a further imple-
mentation, the scoring may be independent of other players
on the system but dependent on the user's actions in the
game overlay. In particular, a selected weapon (e.g., the
SOV weapon 3650) may be used to log travel vehicles
within the gaming environment. The user may use the go
button 3680 to accelerate and avoid an attack or fire or
incident report. In addition, the user may use the stop button
3675 to slow down or stop in order to avoid enemy fire or
attack. In some implementations, the stop button 3675 may
interface with an autonomous driving system of a vehicle to
pick up claims along a price-based navigation route to
increase the score of the player (as shown in score indicator
3610) and increase the balances awarded to the player (as
shown in balance indicator 3630) by earning money on the
system. A user may be identified by the X logo or by a
person logo, where the user may be a bidder on the price-
based navigation claim route 3640 who can increase scores
and balances. In some implementations, a user may scan navigation view (such as through the button 3655) or augmented reality view (such as through the button 3660) to look for SOV targets 3645 or X logos for users who are bidding on the price-based navigation route 3640.

In some implementations, the strategy of the price-based navigation gaming environment is to pick up as many passengers or bidders as possible along the price-based navigation route 3640, destroy as many single occupancy vehicles along the price-based navigation route 3640, and to give flowers 3682 and rewards to emissions claims or carbon credit geolocation unit providers who have more than one person in the vehicle along the price-based claim navigation route 3640. Users may work independently or collectively in tribes to maximize user score in strategy.

Figure 37:
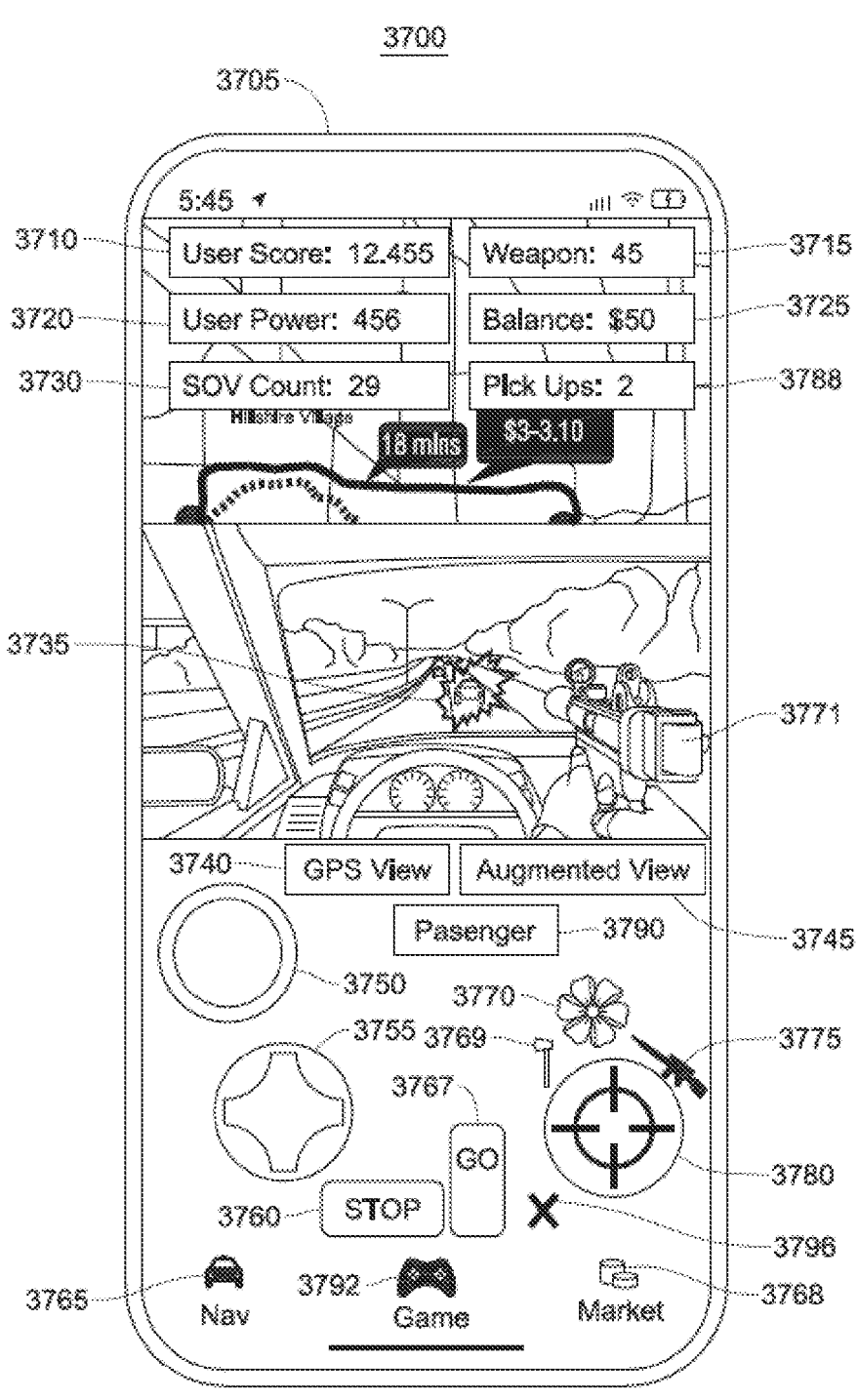

FIG. 37 illustrates a gaming configuration 3700 in accordance with implementations of various techniques described herein, where the gaming configuration 3700 may integrate the implementations disclosed herein on a map software platform. The map software platform may include an internal map software platform, a third-party map software platform, a navigation software platform, and/or any other map software platforms known to those skilled in the art. Further, the configuration 3700 may be used for participating, transacting, and/or trading in transformed emission or emission offset and emission or emission offset geolocation unit auctions. The emission claim or carbon credit geolocation claim unit security may be the same as those discussed above.

The configuration 3700 may be implemented using the computing device (e.g., mobile computing device) mentioned above, where the device may include a user interface 3705. The user interface 3705 may be a GUI or any other user interface known to those skilled in the art. Further, the computing device may be voice-enabled device, a screen-enabled device, a non-screen enabled device, or any computing device known to those skilled in the art. In particular, the interface 3705 may be used to display implementations which utilize a multi-layered network node topology for forward market of emission claim or carbon credit geolocation claim units. Further, the transformed emission claim or carbon credit geolocation claim unit market auction, as described in implementations disclosed herein, may be fully functional as a layer in map routing software or as a stand-alone application.

In gaming configuration 3700 may display and/or include one or more of the following elements, at least some of which may be implemented via the interface 3705: a game overlay user score indicator 3710; a game overlay user power indicator 3720; a game overlay SOV count indicator 3730; a game overlay weapon strength indicator 3715; a game overlay account balance indicator 3725; a game overlay claim pick ups indicator 3788; a claim game overlay SOV target 3735; a claim game overlay SOV weapon 3771; a game overlay GPS standard map view button 3740; a game overlay augmented or mixed reality view button 3745; a game overlay passenger mode button 3790; a game overlay fire button 3750; a game overlay multi-purpose direction button 3755; a game overlay go button 3767; a game overlay stop button 3760; a navigation overlay button 3765; a game overlay button 3792; a market overlay button 3768; market overlay weapon selection buttons 3775, 3770, 3769, 3796; and/or a market overlay aim finder toggle 3780.

In some implementations, a user may use the game overlay button 3792 to generate a game layer over the displayed mapping, where the game layer may also be displayed using the interface 3705. The user may use the game layer to engage with a gaming environment that interacts with the transformed emission or emission offset and emission or emission offset geolocation unit auction described above. The gaming environment and game layer be implemented using instructions and a computing system, as known to those skilled in the art. In one implementation, when interacting with the gaming environment and game layer, the interface 3705 may alert the user to a SOV target 3735. The user may interact with the gaming environment to use weapons 3775 or 3769 to destroy the SOV target 3735, which may increase user score displayed in the user score indicator 3710.

In another implementation, the user may identify a vehicle as having more than one claim and may then choose to reward or gift flowers (e.g., via the button 3770) to the vehicle or the system user of the vehicle in the gaming environment. The user may also choose to use a weapon (e.g., via the button 3775 or 3769) against a SOV target 3735 within the gaming environment, at which point the vehicle may explode in the gaming environment and the passenger would be left without a vehicle. In a further implementation, the results of the gift or weapon usage may be viewed in an augmented reality view (e.g., via button 3745) or a GPS view (e.g., via button 3740). The user may also choose, within the gaming environment, to award flowers (e.g., via button 3770) to a vehicle with more than one passenger, which may increase the user's score (displayed in the user score indicator 3710) and the add to score of the user that has more than one passenger in their vehicle.

Figure 38:
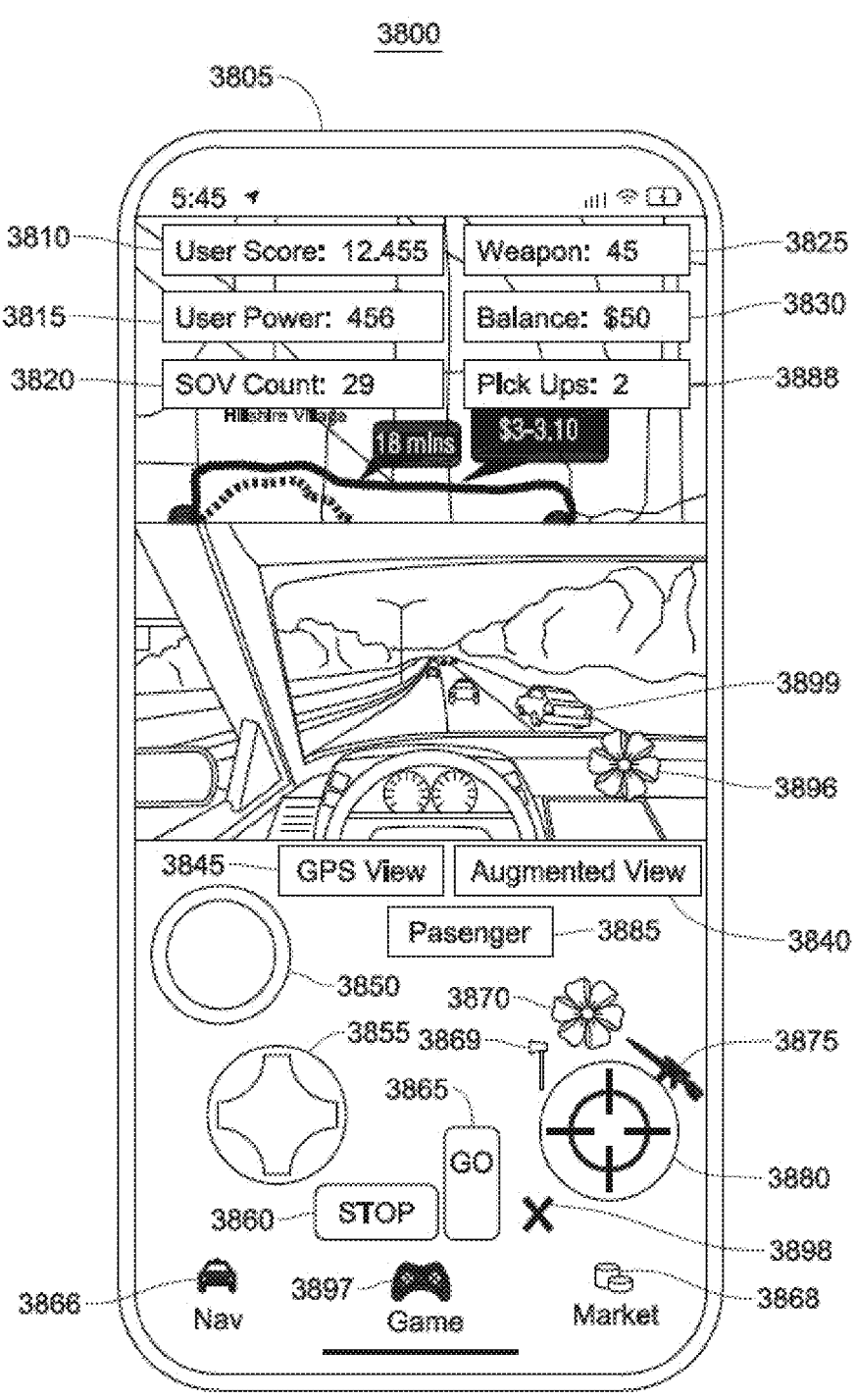

FIG. 38 illustrates a gaming configuration 3800 in accordance with implementations of various techniques described herein, where the gaming configuration 3800 may integrate the implementations disclosed herein on a map software platform. The map software platform may include an internal map software platform, a third-party map software platform, a navigation software platform, and/or any other map software platforms known to those skilled in the art. Further, the configuration 3800 may be used for participating, transacting, and/or trading in transformed emission or emission offset and emission or emission offset geolocation unit auctions. The emission claim or carbon credit geolocation claim unit security may be the same as those discussed above.

The configuration 3800 may be implemented using the computing device (e.g., mobile computing device) mentioned above, where the device may include a user interface 3805. The user interface 3805 may be a GUI or any other user interface known to those skilled in the art. Further, the computing device may be voice-enabled device, a screen-enabled device, a non-screen enabled device, or any computing device known to those skilled in the art. In particular, the interface 3805 may be used to display implementations which utilize a multi-layered network node topology for forward market or securities market of emission claim or carbon credit geolocation claim units. Further, the transformed emission claim or carbon credit geolocation claim unit market auction, as described in implementations disclosed herein, may be fully functional as a layer in map routing software or as a stand-alone application.

The gaming configuration 3800 may display and/or include one or more of the following elements, at least some of which may be implemented via the interface 3805: a game overlay user score indicator 3810; a game overlay user power indicator 3815; a game overlay SOV count indicator 3820; a game overlay weapon strength indicator 3825; a game overlay account claim balance indicator 3830; a game overlay claim pick ups indicator 3888; a game overlay flower gift 3896; a game overlay GPS standard map view button 3845; a game overlay augmented or mixed reality view button 3840; a game overlay claim mode button 3885; a game overlay fire button 3850; a game overlay multi-purpose direction button 3855; a game overlay go button 3865; a game overlay stop button 3860; a navigation overlay button 3866; a game overlay button 3897; a market overlay button 3868; market overlay weapon selection buttons 3869, 3870, 3875, 3898; and/or a market overlay aim finder toggle 3880.

In some implementations, a user may use the game overlay button 3897 to generate a game layer over the displayed mapping, where the game layer may also be displayed using the interface 3805. The user may use the game layer to engage with a gaming environment that interacts with the transformed emission or emission offset and emission or emission offset geolocation unit auction described above. The gaming environment and game layer be implemented using instructions and a computing system, as known to those skilled in the art. In one implementation, when interacting with the gaming environment and game layer, the interface 3805 may alert the user to a vehicle 3899 with more than one passenger, which may prompt the user to gift a flower to the other user within the gaming environment. In some implementations, the game interrace 3800 user 110 may log travel or incident data to score reward points. In some implementations, the game interface may log photo, video, voice, sound data to record car crashes, pedestrian injuries, vehicle injuries, truck injuries and travels, road hazards, air hazards, claim case data and facts, ambulance locations and photos and video, police locations, police photos and videos, and other claim evidence or data within the claim data block chain.

Figure 39:
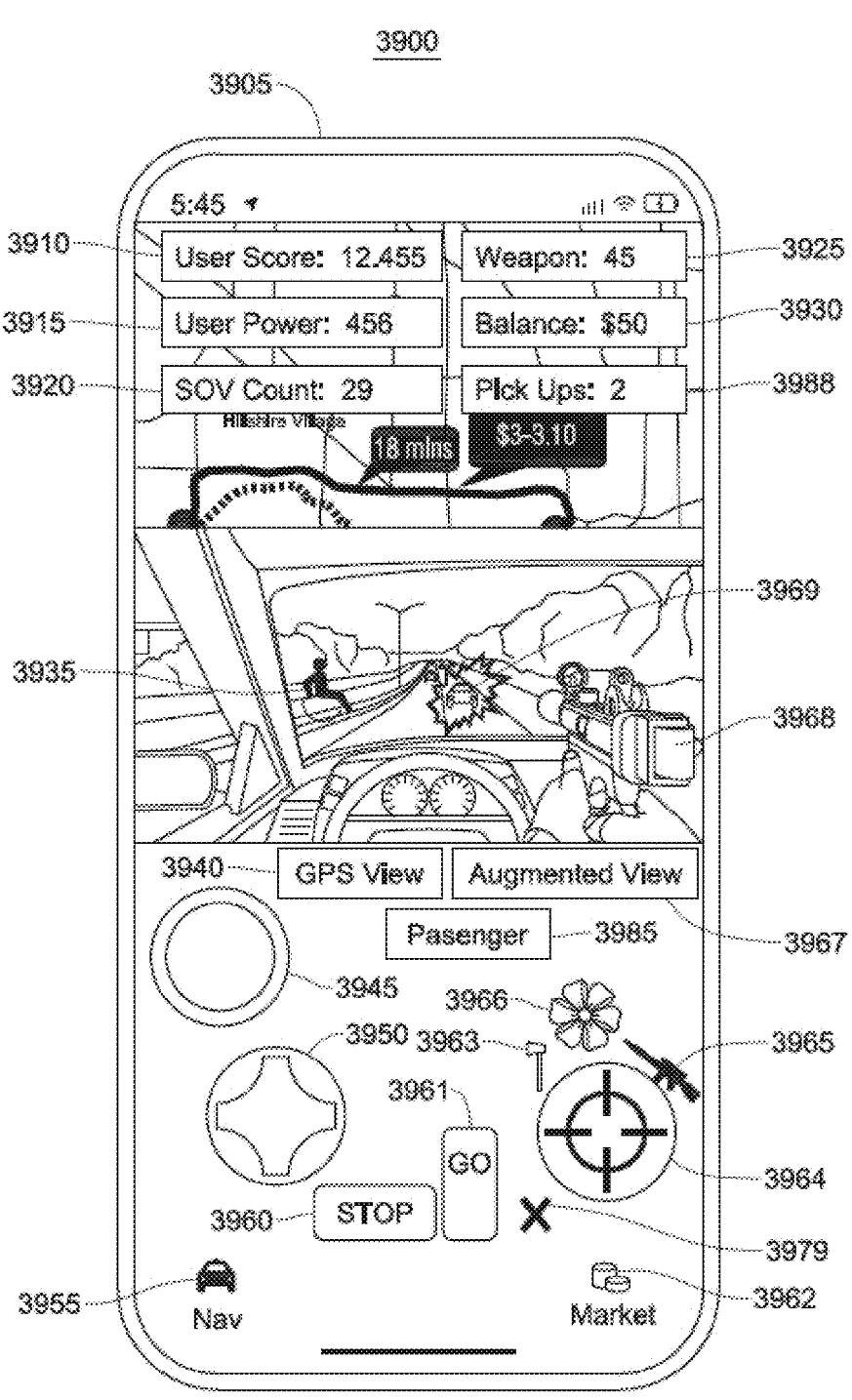

FIG. 39 illustrates a gaming configuration 3900 in accordance with implementations of various techniques described herein, where the gaming configuration 3900 may integrate the implementations disclosed herein on a map software platform. The map software platform may include an internal map software platform, a third-party map software platform, a navigation software platform, and/or any other map software platforms known to those skilled in the art. Further, the configuration 3900 may be used for participating, transacting, and/or trading in transformed emission or emission offset and emission or emission offset geolocation unit auctions. The emission claim or carbon credit geolocation claim unit security may be the same as those discussed above.

The configuration 3900 may be implemented using the computing device (e.g., mobile computing device) mentioned above, where the device may include a user interface 3905. The user interface 3905 may be a GUI or any other user interface known to those skilled in the art. Further, the computing device may be voice-enabled device, a screen-enabled device, a non-screen enabled device, or any computing device known to those skilled in the art. In particular, the interface 3905 may be used to display implementations which utilize a multi-layered network node topology for forward market of emission claim or carbon credit geolocation claim units. Further, the transformed emission claim or carbon credit geolocation claim unit market auction, as described in implementations disclosed herein, may be fully functional as a layer in map routing software or as a stand-alone application.

In gaming configuration 3900 may display and/or include one or more of the following elements, at least some of which may be implemented via the interface 3905: a claim game overlay user score indicator 3910; a claim game overlay user power indicator 3915; a claim game overlay SOV count indicator 3920; a claim game overlay weapon strength indicator 3925; a claim game overlay account balance indicator 3930; a claim game overlay claim pick ups indicator 3988; a game overlay weapon 3968; a game overlay GPS standard map view button 3940; a game overlay augmented or mixed reality view button 3967; a game overlay claim mode button 3985; a game overlay fire button 3945; a game overlay multi-purpose direction button 3950; a game overlay go button 3961; a game overlay stop button 3960; a navigation overlay button 3955; a market overlay button 3962; market overlay weapon selection buttons 3963, 3966, 3965, 3979; a market overlay aim finder toggle 3964; [00338] and/or a user 3935 in an augmented reality view who has had his or her SOV destroyed or claim processed.

In some implementations, a user may use the game overlay go button 3961 to generate a game layer over the displayed mapping, where the game layer may also be displayed using the interface 3905. The user may use the game layer to engage with a gaming environment that interacts with the transformed emission or emission offset and emission or emission offset geolocation claim unit auction described above. The gaming environment and game layer be implemented using instructions and a computing system, as known to those skilled in the art. In one implementation, when interacting with the gaming environment and game layer, the interface 3905 may show the user 3935 who has had his or her SOV destroyed within the gaming environment or a claim has been processed, which may increase the score of the current user (i.e., the score shown in user score indicator 3910). In addition, the user may target and destroy additional SOVs along the price-based navigation route with the gaming environment.

FIG. 40 illustrates a configuration module 4000 in accordance with implementations of various techniques described herein, where the configuration module 4000 may be used to record one or more vehicle specifications for a user participating, transacting and/or trading in transformed emission or emission offset and emission or emission offset geolocation unit auctions. The emission claim or carbon credit geolocation claim unit security may be the same as those discussed above.

The configuration module 4000 may be implemented using the computing device (e.g., mobile computing device) mentioned above, where the device may include a user interface 4010. The user interface 4010 may be a GUI or any other user interface known to those skilled in the art. Further, the computing device may be voice-enabled device, a screen-enabled device, a non-screen enabled device, or any computing device known to those skilled in the art. In particular, the interface 4010 may be used to display implementations which utilize a multi-layered network node topology for forward market of emission claim or carbon credit geolocation claim units for claim price-based navigation.

The configuration module 4000 may display and/or include one or more of the following elements, at least some of which may be implemented via the interface 4010: a emissions claims or carbon credit geolocation unit model make heading 4015; a emissions claims or carbon credit geolocation unit model type heading 4025; a emissions claims or carbon credit geolocation unit model year heading 4035; a system menu toggle button 4051; a emissions claims or carbon credit geolocation unit model fuel type heading 4045; a emissions claims or carbon credit geolocation unit model make selection box 4020; a emissions claims or carbon credit geolocation unit model type selection box 4030; a emissions claims or carbon credit geolocation unit model year selection box 4040; and/or a emissions claims or carbon credit geolocation unit model fuel type selection box 4050.

In some embodiments, the configuration module 4000 may allow the user to record vehicle specifications for the user's vehicle, which may allow the user to participate, transact and/or trade in transformed emission or emission offset and emission or emission offset geolocation unit auctions, as described above. The vehicle specifications may include model make, model type, model year, model fuel type, and/or any other specification known to those skilled in the art. Further, those skilled in the art will understand that the vehicle specifications are not limited to those shown in FIG. 40.

In one implementation, the user may select a model make for the vehicle under the model make heading 4015, such as, for example, by selecting the model make selection box 4020 to indicate that the vehicle is an Acura. Similarly, the user may select a model type for the vehicle under the model type heading 4025 by selecting the model type selection box 4030, may select a model year for the vehicle under the model year heading 4035 by selecting the model year selection box 4040, and may select a model fuel type for the vehicle under the model fuel type heading 4045 by selecting the model fuel type selection box 4050.

In addition, the implementations described herein may be used to perform a data transformation with respect to an emissions claims or carbon credit geolocation unit or security, such that one or more of the selected vehicle specifications (e.g., model make, model type, model year, model fuel type, and/or the like) may be linked to create specification pools. With respect to the transformed emission or emission offset and emission or emission offset geolocation unit auctions described herein, the combinations of similar selected vehicle specifications may be fungible or substitutable when participating, transacting and/or trading in transformed emission or emission offset and emission or emission offset geolocation unit auctions. In other implementations, specifications relating to transformed emissions claims or carbon credit geolocation units or securities for travel by bus, subway, train, air, private automobile, and/or other transportation modes may similarly be substitutable. In particular, broad specifications of the transformed transportation or security pool may be substitutable, provided that the broad transformed specifications are met for delivery within the transformed emissions claims or carbon credit geolocation unit or security pool.

Figure 41:
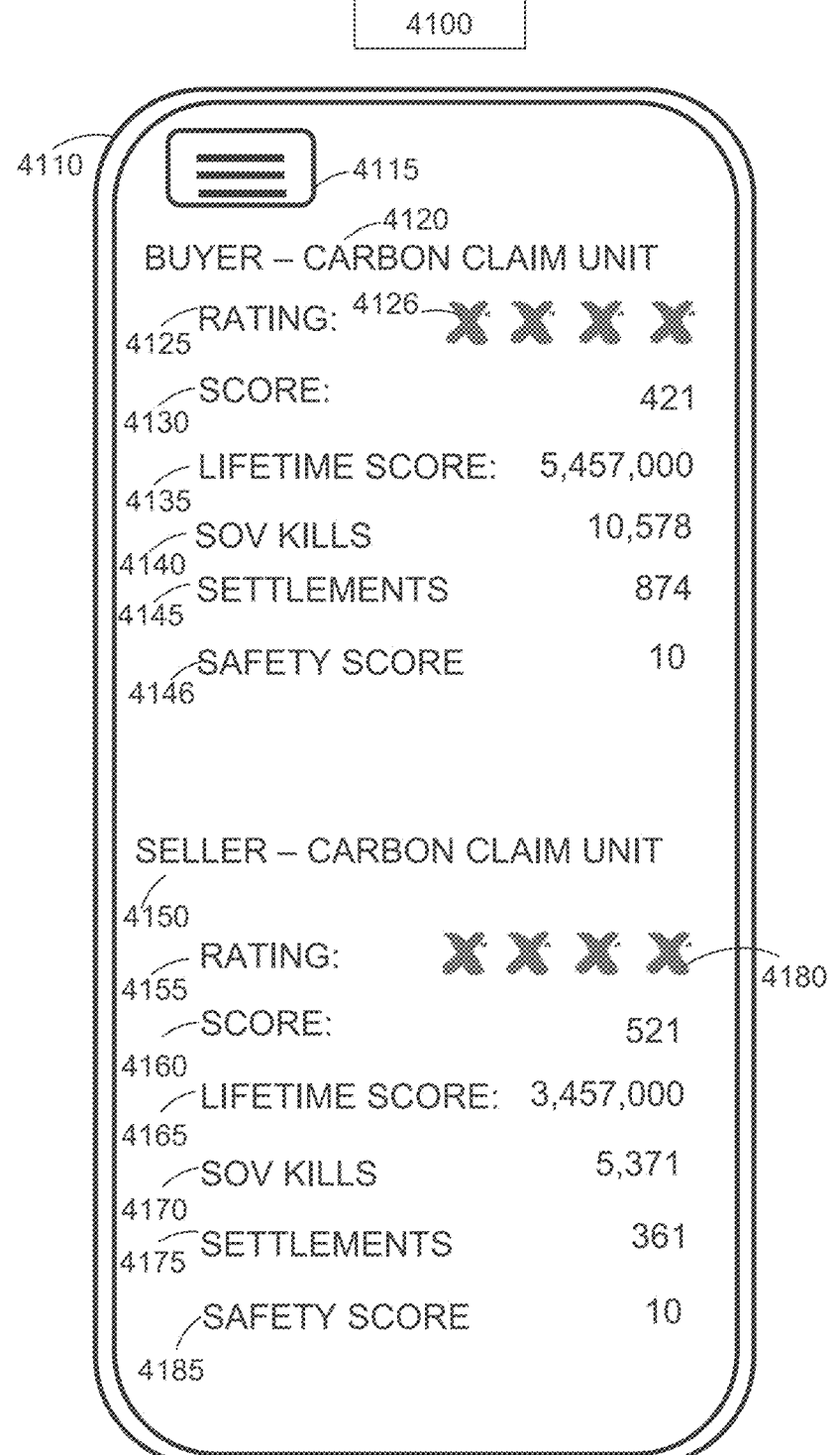

FIG. 41 illustrates a configuration module 4100 in accordance with implementations of various techniques described herein, where the configuration module 4100 may be used to record rider or driver emissions claims or carbon credit geolocation unit specification ratings for a user participating, transacting and/or trading in transformed emission or emission offset and emission or emission offset geolocation unit auctions. The emission claim or carbon credit geolocation claim unit security may be the same as those discussed above.

The configuration module 4100 may be implemented using the computing device (e.g., mobile computing device) mentioned above, where the device may include a user interface 4110. The user interface 4110 may be a GUI or any other user interface known to those skilled in the art. Further, the computing device may be voice-enabled device, a screen-enabled device, a non-screen enabled device, or any computing device known to those skilled in the art. In particular, the interface 4110 may be used to display implementations which utilize a multi-layered network node topology for forward market of emission claim or carbon credit geolocation claim units for claim price-based navigation.

The configuration module 4100 may display and/or include one or more of the following elements, at least some of which may be implemented via the interface 4110: a menu toggle button 4115; a rider emissions claims or carbon credit geolocation unit rating category heading 4120; a rider emissions claims or carbon credit geolocation unit rating label 4125; a rider emissions claims or carbon credit geolocation unit rating X logo amount 4126; a rider emissions claims or carbon credit geolocation unit rating score 4130 for a navigation route; a rider emissions claims or carbon credit geolocation unit rating lifetime score 4135; a rider emissions claims or carbon credit geolocation unit SOV kills count 4140; a rider emissions claims or carbon credit geolocation unit ride count 4145; a rider emissions claims or carbon credit geolocation unit ride safety score 4146; a driver emissions claims or carbon credit geolocation unit rating category heading 4150; a driver emissions claims or carbon credit geolocation unit rating label 4155; a driver emissions claims or carbon credit geolocation unit rating X logo amount 4180; a driver emissions claims or carbon credit geolocation unit rating score 4160 for a navigation route; a driver emissions claims or carbon credit geolocation unit rating lifetime score 4165; a driver emissions claims or carbon credit geolocation unit SOV kills 4170; a driver emissions claims or carbon credit geolocation unit rides count 4175; and/or a driver emissions claims or carbon credit geolocation unit ride safety score 4185.

In some implementations one or more elements of the configuration module 4100 may be used to account for user actions in the gaming configurations and market configurations mentioned above for use in participating, transacting and/or trading in transformed emission or emission offset and emission or emission offset geolocation unit auctions.

Figure 42:
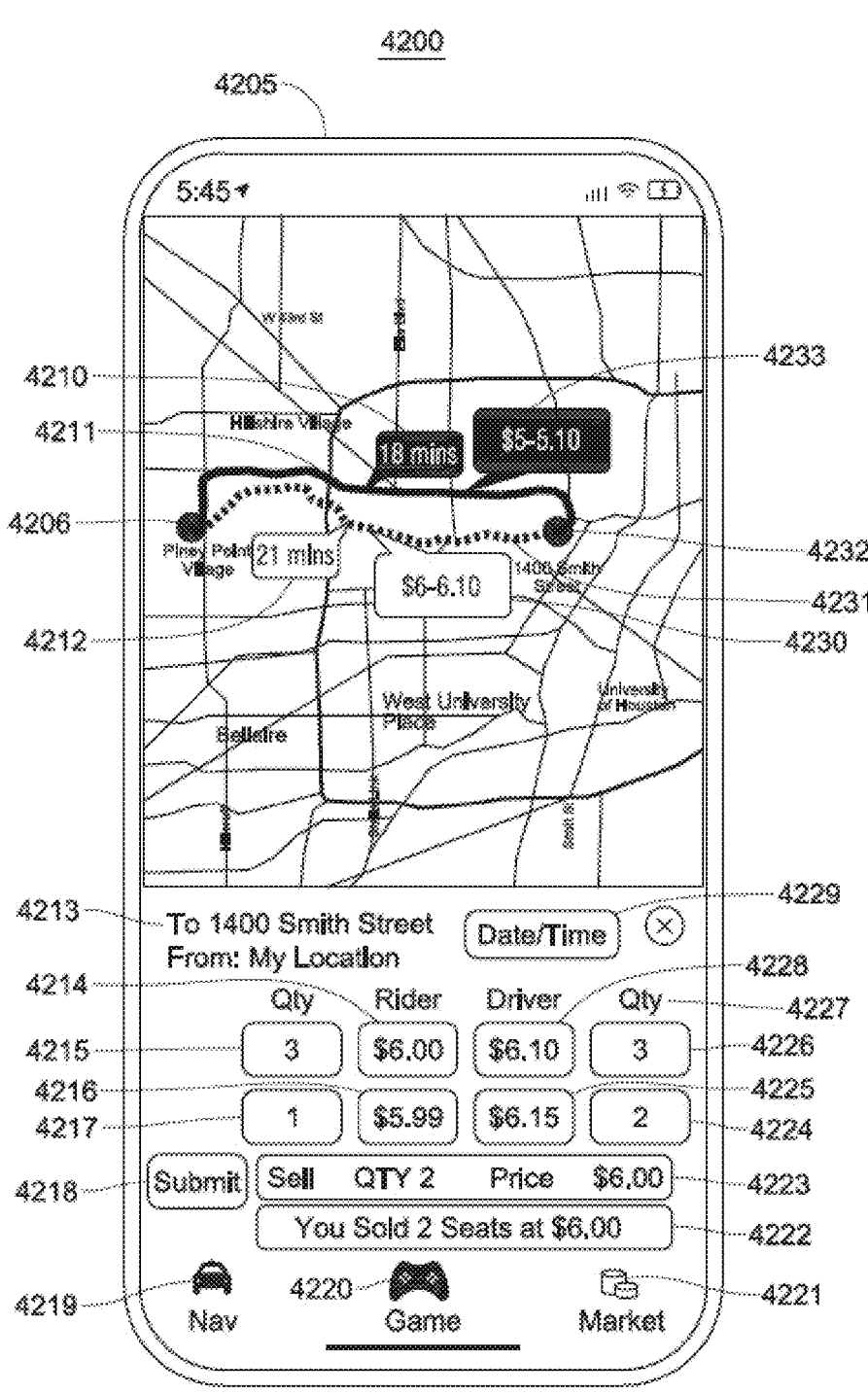
FIG. 42 illustrates a market configuration module in accordance with implementations of various techniques described herein.

FIG. 42 illustrates a market configuration module 4200 in accordance with implementations of various techniques described herein, where the configuration module 4200 may be used to display and/or implement the rider or driver transformed emissions claims or carbon credit geolocation unit or security specifications and the market framework for the transformation for a specified plurality of routes. Further, the configuration module 4200 may be used for participating, transacting, and/or trading in transformed emission or emission offset and emission or emission offset geolocation unit auctions. The emission claim or carbon credit geolocation claim unit security may be the same as those discussed above.

The configuration module 4200 may be implemented using the computing device (e.g., mobile computing device) mentioned above, where the device may include a user interface 4205. The user interface 4205 may be a GUI or any other user interface known to those skilled in the art. Further, the computing device may be voice-enabled device, a screen-enabled device, a non-screen enabled device, or any computing device known to those skilled in the art. In particular, the interface 4205 may be used to display implementations which utilize a multi-layered network node topology for forward market of emission claim or carbon credit geolocation claim units. Further, the transformed emission claim or carbon credit geolocation claim unit market auction, as described in implementations disclosed herein, may be fully functional as a layer in map routing software or as a stand-alone application.

The market configuration module 4200 may display and/ or include one or more of the following elements, at least some of which may be implemented via the interface 4205: a primary price-based navigation route 4211 of a transformed emissions claims or carbon credit geolocation unit or security; a secondary price-based navigation route 4231 of a transformed emissions claims or carbon credit geolocation unit or security; an estimated time 4210 of the primary route 4211; one or more market prices 4233 of a buyer and seller of the primary route 4211; an estimated time 4212 of the secondary routes 4231; one or more market prices 4230 of a claim buyer and seller of the secondary route 4231; a claim starting point virtual hub 4206 of the routes 4211, 4231; an ending point virtual hub 4232 of the routes 4211, 4231; location information 4213 for a claim ending point and a starting point address of the virtual hubs for the claim routes 4211, 4231; and/or a date and time specification button 4229 for the routes 4211, 4231.

The market configuration module 4200 may also display and/or include one or more of the following elements, at least some of which may be implemented via the interface 4205: a number or quantity 4215 of offers to buy/bids by riders for transformed emissions claims or carbon credit geolocation units or securities corresponding to the secondary route 4231, where the offers to buy/bids are displayed first in a rider queue that is indexed by highest price; a price 4214 for offers to buy/bids by riders for transformed emissions claims or carbon credit geolocation units or securities corresponding to the secondary claim route 4231, where the offers to buy/bids are displayed first in the rider queue that is indexed by highest price; a price 4216 for offers to buy/bids by riders for transformed emissions claims or carbon credit geolocation units or securities corresponding to the secondary route 4231, where the offers to buy/bids are displayed second in the rider queue that is indexed by highest price; and/or a number or quantity 4217 of offers to buy/bids by riders for transformed emissions claims or carbon credit geolocation units or securities corresponding to the secondary route 4231, where the offers to buy/bids are displayed second in a rider queue that is indexed by highest price.

The market configuration module 4200 may further display and/or include one or more of the following elements, at least some of which may be implemented via the interface 4205: a number or quantity 4226 of offers to sell by drivers for transformed emissions claims or carbon credit geolocation units or securities corresponding to the secondary route 4231, where the offers to sell are displayed first in a driver queue that is indexed by lowest price; a price 4228 for offers to sell by drivers for transformed emissions claims or carbon credit geolocation units or securities corresponding to the secondary claim route 4231, where the offers to sell are displayed first in the driver queue that is indexed by lowest price; a number or quantity 4224 of offers to sell by drivers for transformed emissions claims or carbon credit geolocation units or securities corresponding to the secondary claim route 4231, where the offers to sell are displayed second in the driver queue that is indexed by lowest price; and/or a price 4225 for offers to sell by drivers for transformed emissions claims or carbon credit geolocation units or securities corresponding to the secondary claim route 4231, where the offers to sell are displayed second in the driver queue that is indexed by lowest price.

The market configuration module 4200 may additionally display and/or include one or more of the following elements, at least some of which may be implemented via the interface 4205: an order entry submit button 4218 configured to submit a user order; information 4223 for an order by a driver to sell a specified quantity of transformed emissions claims or carbon credit geolocation units or securities; an order confirmation 4222 for an order by the driver, where the confirmation indicates the driver sold two units of transformed emissions claims or carbon credit geolocation units or securities; a market view button 4222, where the market view button 4222 may be used to display a claim price-based navigation layer with indexed prices for one or more routes between two virtual hubs; a game view layer button 4220 for the transformed emissions claims or carbon credit geolocation units or securities; and/or a navigation view layer button 4219 for the transformed emissions claims or carbon credit geolocation units or securities.

As noted above with respect to FIG. 40, a user of one or more configurations (e.g., configuration module 4000) described herein may be used to record vehicle specifications for the user's vehicle. For example, as described above with respect to FIG. 40, the user may select a model make for the vehicle under the model make heading 4015, such as, for example, by selecting the model make selection box 4020 to indicate that the vehicle is an Acura. Returning to FIG. 42, in some implementations, the user's vehicle may be assigned to one or more specification pools, where each specification pool may represent an aggregate of participants or units with a similar selected vehicle specification. In other implementations, the user may be assigned to one or more specification pools, where each specification pool may represent an aggregate of participants with a similar selected specification.

The market configuration module 4200 may then be used to display one or more user-selected navigation routes (e.g., routes 4211, 4231) between the claim starting point virtual hub 4206 and the ending point virtual hub 4232. The market configuration module 4200 may also display one or more prices associated with the one or more user-selected claim navigation routes. For example, the market configuration module 4200 may display the one or more market prices 4230 for the claim secondary route 4231, where the one or more market prices 4230 may correspond to a buy price from the highest bidder or rider for the claim route 4231.

Further details pertaining to the one or more market prices 4230 may be displayed in the market configuration module 4200, such as in a rider queue display in the module 4200. In particular, as shown in FIG. 42, the price 4214 may correspond to the highest bid price by a rider for the route 4231, where the price 4214 may have an associated quantity 4215 of transformed emissions claims or carbon credit geolocation units or securities. Similarly, as shown in FIG. 42, the price 4228 may correspond to the lowest offer or sale price by a driver for the route 4231, where the price 4228 may have an associated quantity 4226 of transformed emissions claims or carbon credit geolocation units or securities. In some implementations, the quantity 4215 of offers to buy/bids by riders for transformed emissions claims or carbon credit geolocation units or securities corresponding to the secondary route 4231 may represent one or more units. As shown in FIG. 42, the quantity 4215 may include three units, which may represent 1-3 claim investors who desire to purchase the transformed emissions claims or carbon credit geolocation units or securities for the route 4231. As also shown in FIG. 42, the indexed price 4214 may be queued to the top based on a highest price index and time stamp for a given specification of a transformed emissions claims or carbon credit geolocation unit or security.

In some implementations, the offers to buy/bids by buyers and offers to sell by sellers may be for transformed emissions claims or carbon credit geolocation units or securities having one or more specific specification, attributes, and/or the like. In such implementations, these transformed emissions claims or carbon credit geolocation units or securities may represent a pool of transformed emissions claims or carbon credit geolocation units or securities for a user-selected route having one or more similar specifications, attributes, and/or the like. These one or more specifications, attributes, and/or the like may include one or more of the following: vehicle mode make, vehicle mode model type, vehicle model year, cheapest claim, single claim mode, multi claim modal, fastest claim pay, most probable claim pay, highest claim rating, most available claim, highest volume claim, most frequent, service level, security and safety, group restricted, modes, automobile, air, autonomous vehicle, bike, boat, bus, drone, limo, home, business, emission or emission offset entity, motorcycle, moped, shuttle, spaceship, subway, taxi, train, fastest optimized, cheapest route, packages, cargo, virtual, order types, term specification, timing specification, virtual hub end point and start point, and/or a plurality of other specifications, attributes, and/or the like.

In some implementations, the market configuration module 4200 may be used to match a buyer with a seller for a transformed emissions claims or carbon credit geolocation unit or security in instances where the rider's offer is the highest price 4214 in the buyer queue, the sellers' offer is the lowest price 4228 in the driver queue, and the price 4214 is equal to the price 4228. In a further implementation, if no such match of prices occur between the driver and rider queues for a given specification of a transformed emissions claims or carbon credit geolocation unit or security, then the prices/offers may remain in the queues until a match or a new order entry re-indexes the order of all the deals. For example, the rider queue may be re-indexed if a newly offered price is higher than the current highest bid price 4214. In another example, the buyer queue may be re-indexed after an order has been placed, with the rider queue being indexed and ranked such that a highest rider price is placed at the top of the queue and the remaining rider prices are displayed in descending order based on price and then based on time of order entry with all other things being equal. The seller price queue may be similarly indexed and ranked such that a lowest driver offer/price 4228 is placed at the top of the queue and the remaining driver prices are displayed in ascending order based on price and then based on time of order entry with all other things being equal (e.g., for a given pool specification of transformed emissions claims or carbon credit geolocation units or securities).

In some implementations, the plurality of claim routes (e.g., 4231 and 4211) may be displayed as price-based navigation options that are indexed by market pricing. The user may select one or more routes (e.g., one, two, three, etc.) to be displayed as options between their virtual hubs in order to perform calculations that may maximize the number of emissions claims or carbon credit geolocation units or securities they sell for a given claim route specification data block chain, the prices they may obtain, and/or any combination of other specifications or objectives.

Figure 43:
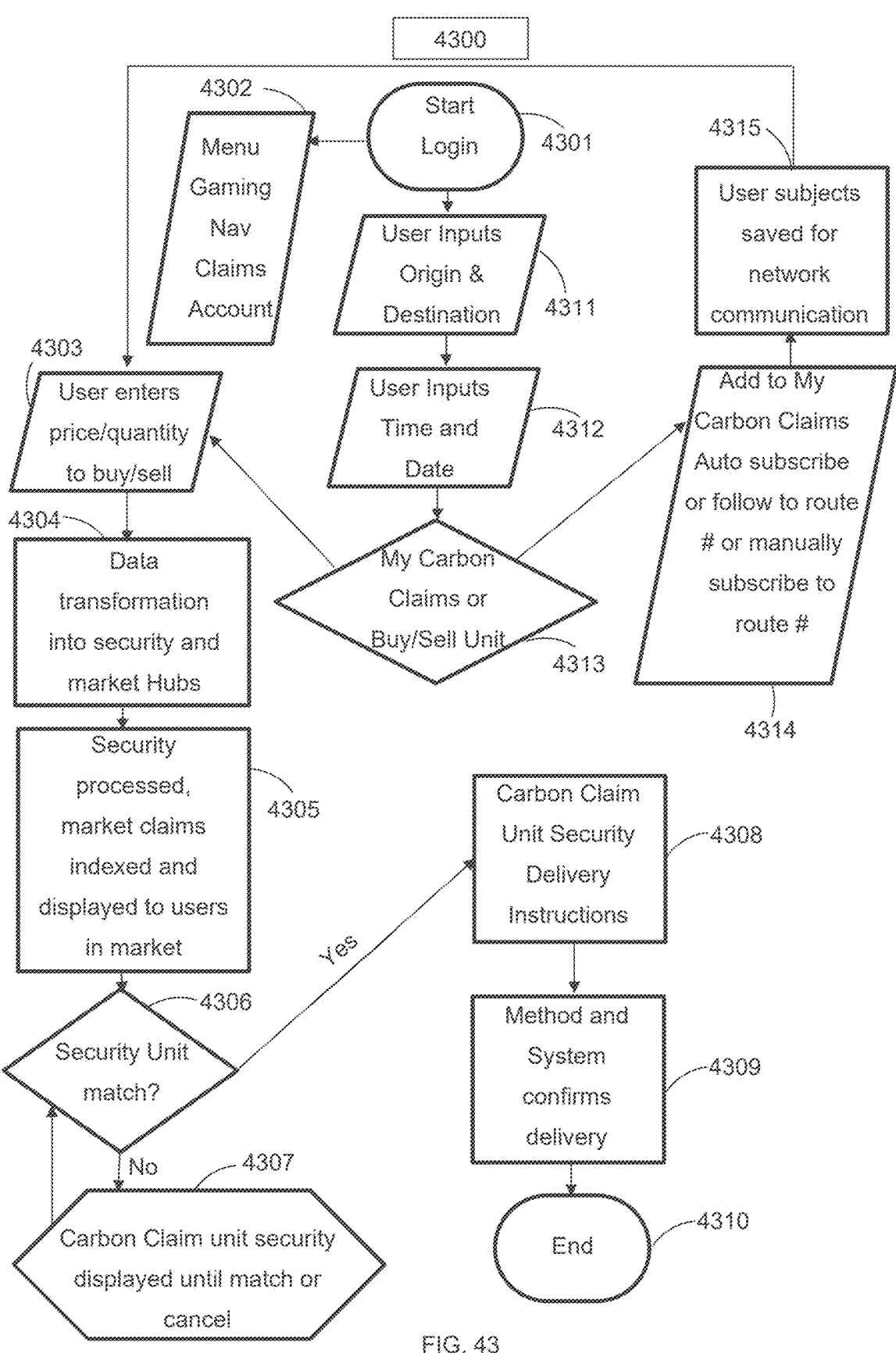
FIG. 43 illustrates a flow diagram of a method in accordance with implementations of various techniques described herein.

FIG. 43 illustrates a flow diagram of a method 4300 in accordance with implementations of various techniques described herein, where the method 4300 may be used for participating in, transacting, and/or trading transformed emission claim or carbon credit geolocation claim unit or securities between virtual hub combinations. In one implementation, method 4300 may be at least partially performed by a computing system, such as the computing system implementations discussed herein. In particular, the computing system may include one or more of the following: a computing device, a mobile or portable multifunction device, a fixed computing device, a computing device with a touchscreen, a computing device without a touchscreen, an augmented, audio interface computing device, a computing device with a mixed reality non-screen display, and/or any other computing system or device known to those skilled in the art. It should be understood that while method 4300 indicates a particular order of execution of operations, in some implementations, certain portions of the operations might be executed in a different order. Further, in some implementations, additional operations or steps may be added to the method 4300. Likewise, some operations or steps may be omitted.

In one implementation, the method 4300 may correspond to a user experience during a transformed emissions claims or carbon credit geolocation unit or security life cycle. At 4301, the user may login to the computing system, where the user may be similar to the user 110 described above. At 4302, the user may be required to go to a plurality of menu options. At 4311, the user may provide inputs relating to an origin and destination of virtual hubs, and, at 4312, the user may provide inputs relating to time and date for a given specification for the transformed emissions claims or carbon credit geolocation unit or security.

In a further implementation, the specification for the transformed emissions claims or carbon credit geolocation unit or security for a particular route may include one or more of the following specifications, attributes, and/or the like, as specified by the user: vehicle mode make, vehicle mode model type, vehicle model year, cheapest claim, single claim mode, multi claim modal, fastest route, most scenic, highest rating, most available, highest volume, most frequent, service level, security and safety, group restricted, modes, automobile, air, autonomous vehicle, bike, boat, bus, drone, limo, motorcycle, moped, shuttle, spaceship, subway, taxi, train, fastest optimized, cheapest claim, packages, cargo, virtual, order types, term specification, timing specification, virtual hub end point and start point, and/or a plurality of other specifications, attributes, and/or the like. At 4313, the user may save a route to the "My Claims" section of the computing system. At 4314, the user may save a route to the "Add My Claims" section of the computing system. In some implementations, the user's route may be saved at 4313 and/or 4314 in the computing system for one touch retrieval in the future.

At 4303, the user may enter a price or quantity to buy or sell the transformed emissions claims or carbon credit geolocation unit or security for a given specification or specification combination. At 4304, one or more steps may be used for the transformation of the emissions claims or carbon credit geolocation unit or security. At 4305, the computing system may perform one or more additional data transformations to process the emissions claims or carbon credit geolocation unit or security, may determine one or more market navigation route options and indexing, may determine one or more virtual hub or virtual hub combination data transformations, may determine one or more emissions claims or carbon credit geolocation unit transformations, and may determine one or more transformed emissions claims or carbon credit geolocation unit combinations and combination specifications.

At 4306, the computing system may determine if a transformed emissions claims or carbon credit geolocation unit or security matches in price and specification (e.g., offers to buy and sell are equally priced). At 4308, if there is a match, then the computing system may begin the delivery process for the transformed emissions claims or carbon credit geolocation unit or security. At 4309, the computing system may continue the delivery process, which may include steps such as electric signal handoff, security checks, 911 system checks, GPS server and user position checks, money laundering checks, emissions claims or carbon credit geolocation unit rating checks, and/or other possible checks for the data elements of the transformed emissions claims or carbon credit geolocation unit or security. The check mentioned herein may be used for verification of delivery of the unit or security. At 4307, if the prices of the buyer and seller queue do not match, then the steps described with respect to 4304, 4305, and 4306 may repeat until a match is made or an order is cancelled before it expires for the transformed emissions claims or carbon credit geolocation unit or security.

Figure 44:
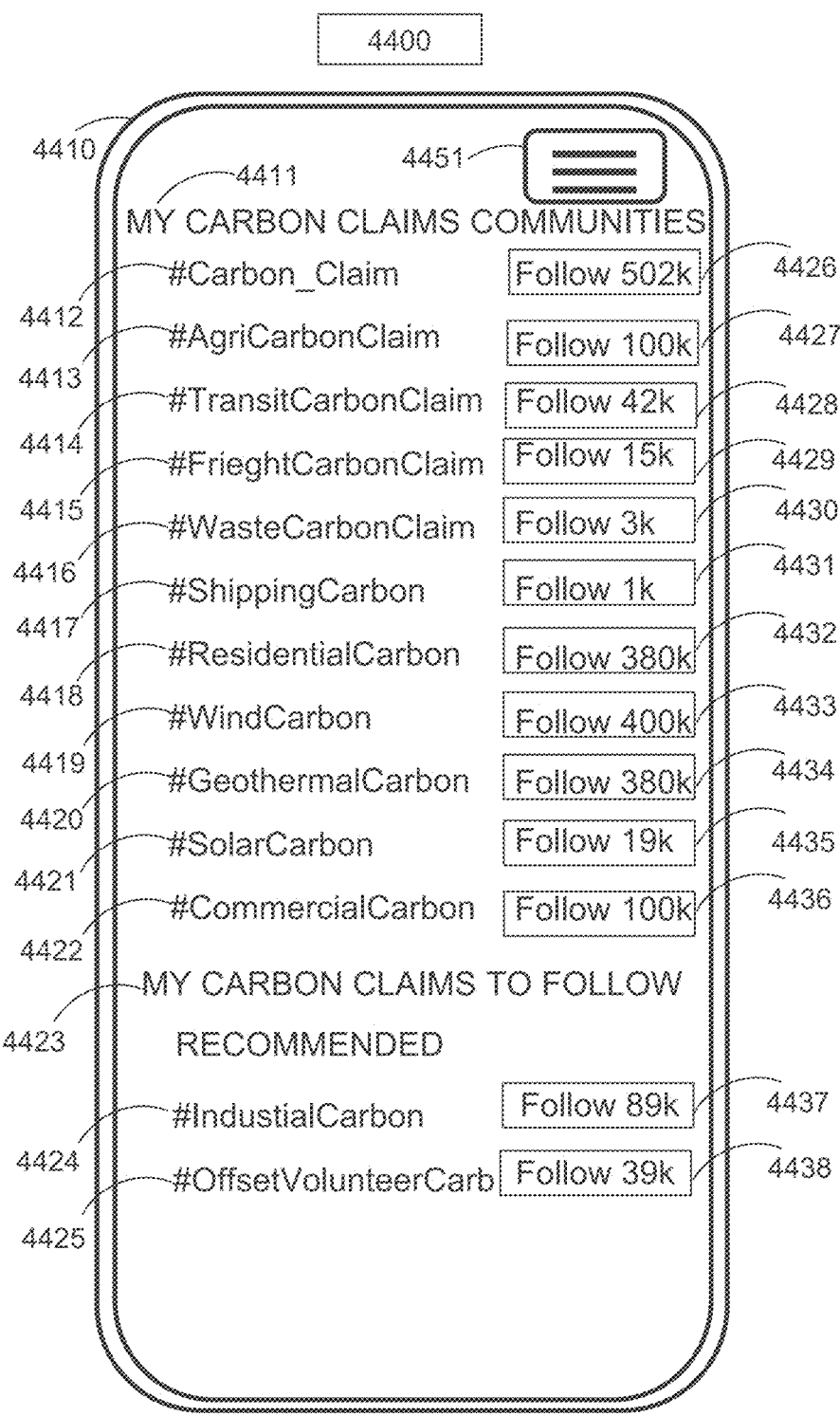
FIGS. 44-46 illustrate a configuration module in accordance with implementations of various techniques described herein.

FIG. 44 illustrates a configuration module 4400 in accordance with implementations of various techniques described herein, where the configuration module 4400 may be used to for accessing one or more functions associated with the My Claims implementations mentioned above. In particular, as mentioned above, a computing system may be used to select, store and/or edit a user's preferred claims, which may be referred to as My Claims, for more efficient access to emission claim or carbon credit geolocation claim unit markets over various modes and specifications of transportation capacity.

The configuration module 4400 may be implemented using a computing device (e.g., the mobile computing device mentioned above), where the device may include a user interface 4410. The user interface 4410 may be a GUI or any other user interface known to those skilled in the art. Further, the computing device may be voice-enabled device, a screen-enabled device, a non-screen enabled device, or any computing device known to those skilled in the art. In particular, the interface 4410 may be used to display implementations which utilize a multi-layered network node topology for forward market of emission claim or carbon credit geolocation claim units for claim price-based navigation.

As shown in FIG. 44, the user interface 4410 may display a My Claims Community heading 4411. The user interface 4410 may also display a menu option button 4451 configured to allow the user to access other areas of the method and system implemented on the computing device. In one implementation, a virtual emission claim or carbon credit geolocation claim unit hub sequence representing one or more claims from Palo Alto, California to San Francisco, California may be represented as an object via the interface 4410 with a metadata tag #PaIoSF 4412. In a further implementation, the virtual emission claim or carbon credit geolocation claim unit hub sequence having the #PaIoSF 4412 tag may have an associated option button 4426 configured to allow the user to follow, join, subscribe to, or add an online community (which may be represented by a community object transformed data structure within the computing system) associated with the virtual emission claim or carbon credit geolocation claim unit hub sequence having the #PaIoSF 4412 tag. In some implementations, the associated option button 4426 may indicate a number of followers or network members who have joined the associated community, which is shown to be 502,000 in FIG. 44.

In another implementation, a virtual emission claim or carbon credit geolocation claim unit hub sequence representing one or more routes from Menlo Park, California to San Francisco, California may be represented as an object via the interface 4410 with a metadata tag #MenloSF 4413. In a further implementation, the virtual emission claim or carbon credit geolocation claim unit hub sequence having the #MenloSF 4413 tag may have an associated option button 4427 configured to allow the user to follow, join, subscribe to, or add an online community (which may be represented by a community object transformed data structure within the computing system) associated with the virtual emission claim or carbon credit geolocation claim unit hub sequence having the #MenloSF 4413 tag. In some implementations, the associated option button 4427 may indicate a number of followers or network members who have joined the associated community, which is shown to be 100,000 in FIG. 44

In another implementation, a virtual emission claim or carbon credit geolocation claim unit hub sequence representing one or more routes from San Francisco, California to Santa Cruz, California may be represented as an object via the interface 4410 with a metadata tag #SFSantaCruz 4414. In a further implementation, the virtual emission claim or carbon credit geolocation claim unit hub sequence having the #SFSantaCruz 4414 tag may have an associated option button 4428 configured to allow the user to follow, join, subscribe to, or add an online community (which may be represented by a community object transformed data structure within the computing system) associated with the virtual emission claim or carbon credit geolocation claim unit hub sequence having the #SFSantaCruz 4414 tag. In some implementations, the associated option button 4428 may indicate a number of followers or network members who have joined the associated community, which is shown to be 42,000 in FIG. 44

In another implementation, a virtual emission claim or carbon credit geolocation claim unit hub sequence representing one or more routes from Nob Hill in San Francisco, California to Fisherman's Wharf in San Francisco, California may be represented as an object via the interface 4410 with a metadata tag #NobHillWharf 4415. In a further implementation, the virtual emission claim or carbon credit geolocation claim unit hub sequence having the #NobHillWharf 4415 tag may have an associated option button 4429 configured to allow the user to follow, join, subscribe to, or add an online community (which may be represented by a community object transformed data structure within the computing system) associated with the virtual emission claim or carbon credit geolocation claim unit hub sequence having the #NobHillWharf 4415 tag. In some implementations, the associated option button 4429 may indicate a number of followers or network members who have joined the associated community, which is shown to be 15,000 in FIG. 44.

In yet another implementation, a virtual emission claim or carbon credit geolocation claim unit hub sequence representing one or more routes from Cornell University in Ithaca, NY to Wegmans in Ithaca, NY may be represented as an object via the interface 4410 with a metadata tag #CornellWegmans 4416. In a further implementation, the virtual emission claim or carbon credit geolocation claim unit hub sequence having the #CornellWegmans 4416 tag may have an associated option button 4430 configured to allow the user to follow, join, subscribe to, or add an online community (which may be represented by a community object transformed data structure within the computing system) associated with the virtual emission claim or carbon credit geolocation claim unit hub sequence having the #CornellWegmans 4416 tag. In some implementations, the associated option button 4430 may indicate a number of followers or network members who have joined the associated community, which is shown to be 3,000 in FIG. 44.

In yet another implementation, a virtual emission claim or carbon credit geolocation claim unit hub sequence representing one or more routes from Ithaca College in Ithaca, NY to Wegmans in Ithaca, NY may be represented as an object via the interface 4410 with a metadata tag #ICWegmans 4417. In a further implementation, the virtual emission claim or carbon credit geolocation claim unit hub sequence having the #ICWegmans 4417 tag may have an associated option button 4431 configured to allow the user to follow, join, subscribe to, or add an online community (which may be represented by a community object transformed data structure within the computing system) associated with the virtual emission claim or carbon credit geolocation claim unit hub sequence having the #ICWegmans 4417 tag. In some implementations, the associated option button 4431 may indicate a number of followers or network members who have joined the associated community, which is shown to be 1,000 in FIG. 44.

In another implementation, a virtual emission claim or carbon credit geolocation claim unit hub sequence representing one or more routes from Katy, Texas to Houston, Texas may be represented as an object via the interface 4410 with a metadata tag #KatyDtownHouston 4418. In a further implementation, the virtual emission claim or carbon credit geolocation claim unit hub sequence having the #KatyDtownHouston 4418 tag may have an associated option button 4432 configured to allow the user to follow, join, subscribe to, or add an online community (which may be represented by a community object transformed data structure within the computing system) associated with the virtual emission claim or carbon credit geolocation claim unit hub sequence having the #KatyDtownHouston 4418 tag. In some implementations, the associated option button 4432 may indicate a number of followers or network members who have joined the associated community, which is shown to be 380,000 in FIG. 44.

In yet another implementation, a virtual emission claim or carbon credit geolocation claim unit hub sequence representing one or more routes from Upper East Side in NYC to Grand Central Station in NYC may be represented as an object via the interface 4410 with a metadata tag #UEastGrandCent 4419. In a further implementation, the virtual emission claim or carbon credit geolocation claim unit hub sequence having the #UEastGrandCent 4419 tag may have an associated option button 4433 configured to allow the user to follow, join, subscribe to, or add an online community (which may be represented by a community object transformed data structure within the computing system) associated with the virtual emission claim or carbon credit geolocation claim unit hub sequence having the #UEastGrandCent 4419 tag. In some implementations, the associated option button 4433 may indicate a number of followers or network members who have joined the associated community, which is shown to be 400,000 in FIG. 44.

In another implementation, a virtual emission claim or carbon credit geolocation claim unit hub sequence representing one or more routes from Penn Station in NYC to Grand Central Station in NYC may be represented as an object via the interface 4410 with a metadata tag #PennStatGrandCent 4420. In a further implementation, the virtual emission claim or carbon credit geolocation claim unit hub sequence having the #PennStatGrandCent 4420 tag may have an associated option button 4434 configured to allow the user to follow, join, subscribe to, or add an online community (which may be represented by a community object transformed data structure within the computing system) associated with the virtual emission claim or carbon credit geolocation claim unit hub sequence having the #PennStatGrandCent 4420 tag. In some implementations, the associated option button 4434 may indicate a number of followers or network members who have joined the associated community, which is shown to be 380,000 in FIG. 44.

In yet another implementation, a virtual emission claim or carbon credit geolocation claim unit hub sequence representing one or more routes from Ithaca, NY to Grand Central Station in NYC may be represented as an object via the interface 4410 with a metadata tag #IthacaNYC 4421. In a further implementation, the virtual emission claim or carbon credit geolocation claim unit hub sequence having the #IthacaNYC 4421 tag may have an associated option button 4435 configured to allow the user to follow, join, subscribe to, or add an online community (which may be represented by a community object transformed data structure within the computing system) associated with the virtual emission claim or carbon credit geolocation claim unit hub sequence having the #IthacaNYC 4421 tag. In some implementations, the associated option button 4435 may indicate a number of followers or network members who have joined the associated community, which is shown to be 19,000 in FIG. 44.

In another implementation, a virtual emission claim or carbon credit geolocation claim unit hub sequence representing one or more routes from Austin, TX to Houston, TX may be represented as an object via the interface 4410 with a metadata tag #AustinHou 4422. In a further implementation, the virtual emission claim or carbon credit geolocation claim unit hub sequence having the #AustinHou 4422 tag may have an associated option button 4436 configured to allow the user to follow, join, subscribe to, or add an online community (which may be represented by a community object transformed data structure within the computing system) associated with the virtual emission claim or carbon credit geolocation claim unit hub sequence having the ##AustinHou 4422 tag. In some implementations, the associated option button 4436 may indicate a number of followers or network members who have joined the associated community, which is shown to be 100,000 in FIG. 44.

In some implementations, the computing system may recommend one or more virtual emission claim or carbon credit geolocation claim unit hub sequences to the user, which may be displayed via the interface 4410 under a My Claims To Follow Recommended heading 4423. In one such implementation, a virtual emission claim or carbon credit geolocation claim unit hub sequence representing one or more routes from Harvard University in Cambridge, MA to Boston Commons in Boston, MA may be represented as an object via the interface 4410 with a metadata tag #HarvardBCommons 4424. In a further implementation, the virtual emission claim or carbon credit geolocation claim unit hub sequence having the #HarvardBCommons 4424 tag may have an associated option button 4437 configured to allow the user to follow, join, subscribe to, or add an online community (which may be represented by a community object transformed data structure within the computing system) associated with the virtual emission claim or carbon credit geolocation claim unit hub sequence having the #HarvardBCommons 4424 tag. In some implementations, the associated option button 4437 may indicate a number of followers or network members who have joined the associated community, which is shown to be 89,000 in FIG. 44.

In another such implementation, a virtual emission claim or carbon credit geolocation claim unit hub sequence representing one or more routes from Naperville in Chicago, IL to Marketplace in Chicago, IL may be represented as an object via the interface 4410 with a metadata tag #NapervilleChiMkt 4425. In a further implementation, the virtual emission claim or carbon credit geolocation claim unit hub sequence having the #NapervilleChiMkt 4425 tag may have an associated option button 4438 configured to allow the user to follow, join, subscribe to, or add an online community (which may be represented by a community object transformed data structure within the computing system) associated with the virtual emission claim or carbon credit geolocation claim unit hub sequence having the #NapervilleChiMkt 4425 tag. In some implementations, the associated option button 4438 may indicate a number of followers or network members who have joined the associated community, which is shown to be 39,000 in FIG. 44.

Figure 45:
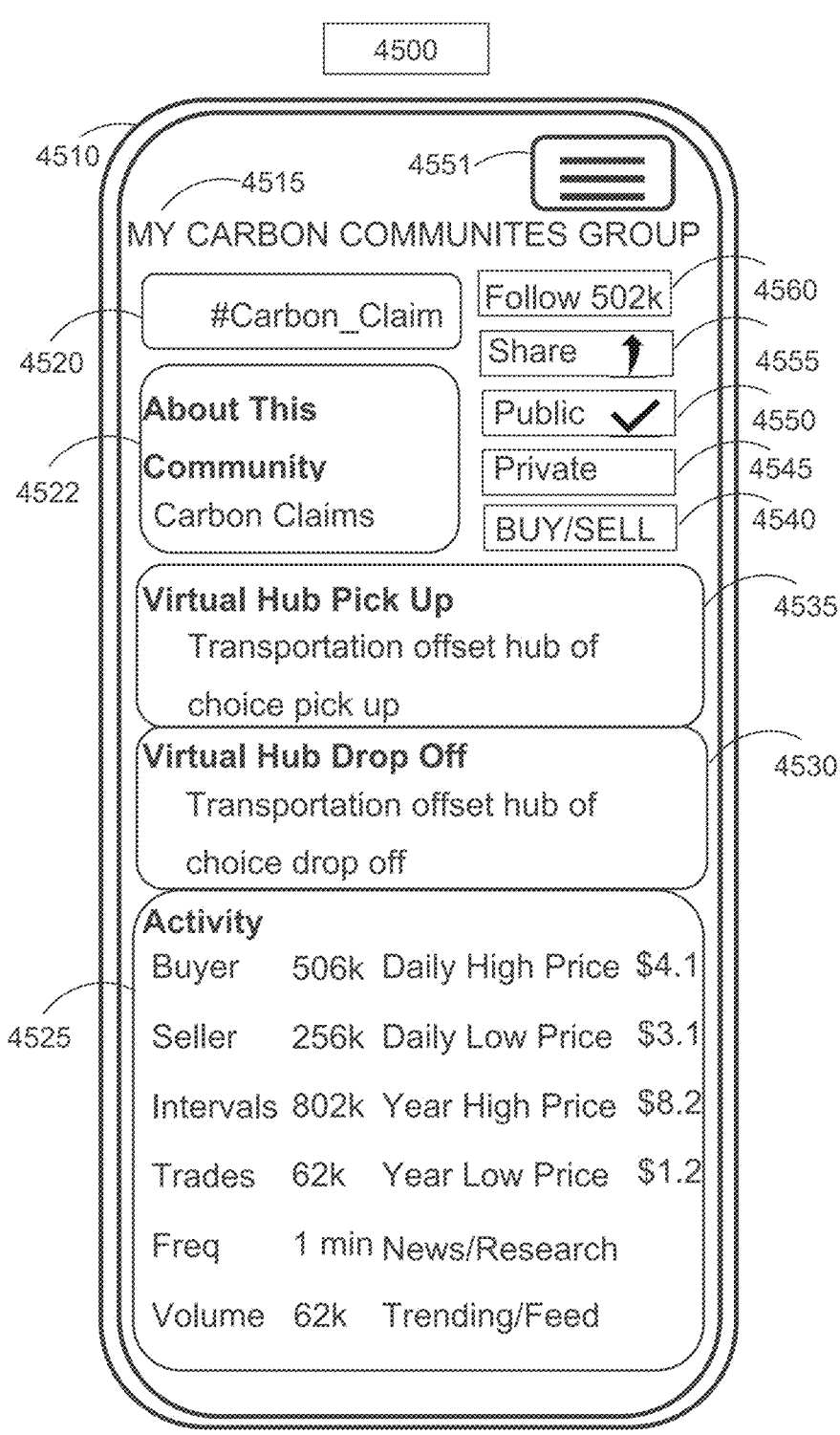

FIG. 45 illustrates a configuration module 4500 in accordance with implementations of various techniques described herein, where the configuration module 4500 may be used to display and/or choose options for a virtual emission claim or carbon credit geolocation claim unit hub sequence with an associated online community (which may be represented by a community object transformed data structure within the computing system).

The configuration module 4500 may be implemented using a computing device (e.g., the mobile computing device mentioned above), where the device may include a user interface 4510. The user interface 4510 may be a GUI or any other user interface known to those skilled in the art. Further, the computing device may be voice-enabled device, a screen-enabled device, a non-screen enabled device, or any computing device known to those skilled in the art. In particular, the interface 4510 may be used to display implementations which utilize a multi-layered network node topology for forward market or securities market of emission claim or carbon credit geolocation claim units for price-based navigation.

As shown in FIG. 45, the user interface 4510 may display a My Claim Communities heading 4515. The user interface 4510 may display one or more options for a particular virtual hub sequence, such as the transformed data structure of a transformed community virtual emission claim or carbon credit geolocation claim unit hub sequence representing one or more routes from Palo Alto, California to San Francisco, California with a metadata tag #PaIoSF 4520.

As shown, the interface 4510 may display long form claim details relating to the particular virtual hub sequence (e.g., the virtual emission claim or carbon credit geolocation claim unit hub sequence having the #PaIoSF tag) in the About This Claim section 4522. Further, the interface 4510 may display an option to follow button 4560 the online community associated with the virtual emission claim or carbon credit geolocation claim unit hub sequence, where the button 4560 may also indicate a number of followers or network members who have joined the associated community. In addition, the interface 4510 may display a share button 4555, where the button 4555 may allow the user to share the associated community group to others via another social network, text, email, and/or other network protocol. The interface 4510 may also display a public button 4550 and a private button 4545, which may be used to change the privacy settings for the associated online community. Additionally, the interface 4510 may display a buy/sell button 4540, which may be used to provide a gateway to buy or sell emissions claims or carbon credit geolocation units corresponding to the virtual emission claim or carbon credit geolocation claim unit hub sequence.

The interface 4510 may also display address information 45435 relating to a virtual hub emission claim or carbon credit geolocation claim unit pick up location and address information 4530 relating to a virtual hub drop off emission claim or carbon credit geolocation claim unit location for the virtual emission claim or carbon credit geolocation claim unit hub sequence. The interface 4510 may further display activity information 4525 relating to statistics and data for the virtual emission claim or carbon credit geolocation claim unit hub sequence and/or its associated online community, such as statistics and data relating to the number of riders, number of claims, number of defendants, number of plaintiffs, number of drivers, number of seats, number of trades, frequency of emissions claims or carbon credit geolocation units, volume of emissions claims or carbon credit geolocation units, daily high price for emissions claims or carbon credit geolocation units, daily low price for emissions claims or carbon credit geolocation units for the virtual emission claim or carbon credit geolocation claim unit hub sequence community object, yearly high price, yearly low price, news, research, trending, feeds for the virtual hub sequence, and/or the like.

Figure 46:
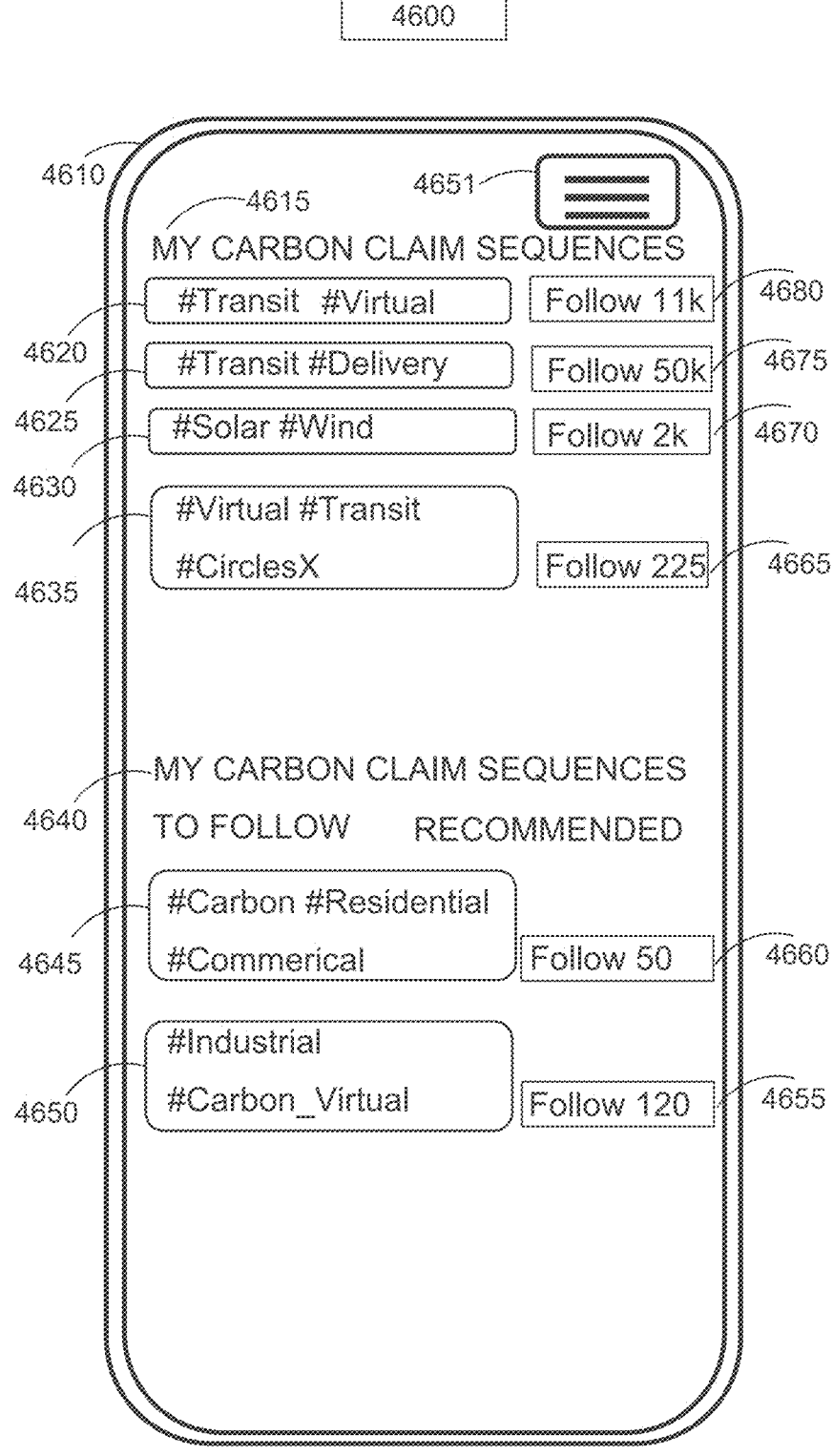

FIG. 46 a configuration module 4600 in accordance with implementations of various techniques described herein, where the configuration module 4600 may be used to transform virtual emission claim or carbon credit geolocation claim unit hub sequences with two virtual hubs into virtual emission claim or carbon credit geolocation claim unit hub sequences with more than two virtual hubs. In particular, the virtual emission claim or carbon credit geolocation claim unit hub sequences with more than two virtual hubs may be composed of two or more series of virtual emission claim or carbon credit geolocation claim unit hub sequences.

The configuration module 4600 may be implemented using a computing device (e.g., the mobile computing device mentioned above), where the device may include a user interface 4610. The user interface 4610 may be a GUI or any other user interface known to those skilled in the art. Further, the computing device may be voice-enabled device, a screen-enabled device, a non-screen enabled device, or any computing device known to those skilled in the art. In particular, the interface 4610 may be used to display implementations which utilize a multi-layered network node topology for forward market of emission claim or carbon credit geolocation claim units for claim price-based navigation.

As shown in FIG. 46, the user interface 4610 may display a My Claim Sequences heading 4615. In one implementation, the interface 4610 may display a multi-leg virtual emission claim or carbon credit geolocation claim unit hub sequence 4620 representing an origin virtual hub sequence of Palo Alto, CA to San Francisco, CA (with a metadata tag #PaloSF) followed by a secondary sequence of San Francisco, CA to Sausalito, California CA (with a metadata tag #SFSaus). Multi-leg virtual hub sequences may allow for the linking of villages, cities or states using a network emission claim or carbon credit geolocation claim unit topology structure for multiple providers of emissions claims or carbon credit geolocation units, which may provide higher levels of frequency and market opportunity to link public and private systems. In a further implementation, the multi-leg virtual emission claim or carbon credit geolocation claim unit hub sequence 4620 having the #PaloSF #SFSaus tags may have an associated option button 4680 configured to allow users to join, follow, subscribe to, or become a member of an online community (which may be represented by a community object transformed data structure within the computing system) associated with the multi-leg virtual emission claim or carbon credit geolocation claim unit hub sequence 4620, which may help to alleviate potential data collection issues within claim processing systems.

In another implementation, the interface 4610 may display a multi-leg virtual emission claim or carbon credit geolocation claim unit hub sequence 4625 representing an origin virtual hub sequence of Ithaca, NY to New York City, NY (with a metadata tag #IthacaNY) followed by a secondary sequence of New York City, NY to Midtown in New York City, NY (with a metadata tag #NYCMid). In such an implementation, the multi-leg virtual emission claim or carbon credit geolocation claim unit hub sequence 4625 may allow for a emissions claims or carbon credit geolocation unit seller or buyer to connect two disparate insurance or data or emission claim or carbon credit geolocation claim unit networks to provide data gap detail at the lowest market cost, because each leg or series of virtual emission claim or carbon credit geolocation claim unit hub sequences may have an independent market associated with the leg or virtual hub sequence. In a further implementation, the multi-leg virtual emission claim or carbon credit geolocation claim unit hub sequence 4625 having the #IthacaNY #NYCMid tags may have an associated option button 4675 configured to allow users to join, follow, subscribe to, or become a member of an online community (which may be represented by a community object transformed data structure within the computing system) associated with the multi-leg virtual emission claim or carbon credit geolocation claim unit hub sequence 4625, which may help to alleviate potential data gap issues within claim processing and digital epichain systems.

In a further implementation, the configuration module 4600 may be used to transform virtual emission claim or carbon credit geolocation claim unit hub sequences composed of three or more series of virtual emission claim or carbon credit geolocation claim unit hub sequences. In one such implementation, the interface 4610 may display a multi-leg virtual emission claim or carbon credit geolocation claim unit hub sequence 4635 representing an origin virtual hub sequence of Austin, TX to Houston, TX (with a metadata tag #AustinHou), followed by a sequence of Houston, TX to Memorial in Houston, TX (with a metadata tag #HouMem), and followed by a sequence of Memorial in Houston, TX to Voss in Houston, TX (with a metadata tag #MemVoss). In particular, a user may use an emissions claims or carbon credit geolocation unit for the initial sequence with tag #AustinHou, uses another emissions claims or carbon credit geolocation unit for the sequence with tag #HouMem, and then uses yet another emissions claims or carbon credit geolocation unit for the sequence with tag #MemVoss. The multi-leg virtual emission claim or carbon credit geolocation claim unit hub sequence 4635 may help to alleviate data gap issues. In particular, multi-leg virtual emission claim or carbon credit geolocation claim unit hub sequence 4635 and the associated sequence community object transformation may help users understand options and piece multiple claim systems onto a single community based object to aggregate communication and transaction benefits of the system.

In some implementations, computing system may use prior history navigation searches and locations to build recommended additional multi-leg virtual emission claim or carbon credit geolocation claim unit hub sequences to the user, which may be displayed via the interface 4610 under a My Claims Sequences To Follow Recommended heading

4640. In one such implementation, the computing system may recommend a multi-leg virtual hub route sequence composed of four or more virtual hub sequences, combinations of already linked virtual hub sequences, and/or the like. For example, as shown in FIG. 46, the interface 4610 may display a multi-leg virtual emission claim or carbon credit geolocation claim unit hub sequence 4645, which may be similar to the sequence 4635 with the additional sequence of CVS in Houston, TX to an opioid claim in Houston, TX (with a metadata tag #CVSOpioidHouston). The multi-leg virtual emission claim or carbon credit geolocation claim unit hub sequence 4645 may help to provide a data gap sequence to a user on the system. In a further implementation, the multi-leg virtual emission claim or carbon credit geolocation claim unit hub sequence 4645 may have an associated option button 4660 configured to allow users to join, follow, subscribe to, or become a member of an online community (which may be represented by a community object transformed data structure within the computing system) associated with the multi-leg virtual emission claim or carbon credit geolocation claim unit hub sequence 4645.

In another example, as shown in FIG. 46, the interface 4610 may display a multi-leg virtual emission claim or carbon credit geolocation claim unit hub sequence 4650, which may be similar to the sequence 4620 with the additional sequence of Sausalito, CA to a specific address in Marin Terminal in Sausalito, CA (with a metadata tag #SausMarinTerm). The multi-leg virtual emission claim or carbon credit geolocation claim unit hub sequence 4650 may help to provide a data gap sequence to a system user or insurance company, attorney, beneficiary or other general use case. In a further implementation, the multi-leg virtual emission claim or carbon credit geolocation claim unit hub sequence 4650 may have an associated option button 4655 configured to allow users to join, follow, subscribe to, or become a member of an online community (which may be represented by a community object transformed data structure within the computing system) associated with the multi-leg virtual emission claim or carbon credit geolocation claim unit hub sequence 4650.

Traversing a series of linked claims via a multi-leg virtual emission claim or carbon credit geolocation claim unit hub sequence may allow for the cost of non-linked claims to be dramatically lower due to using a series of connected local systems, as the private systems may be more expensive and potentially do not communicate or share data. The transformed virtual hub sequence methodology may allow for claims systems to be integrated in ways that were not formerly possible because the systems were disparate or simply did not allow for linked claims or linked community objects that could optimize topological network structures over existing inefficient structures.

Figure 47:
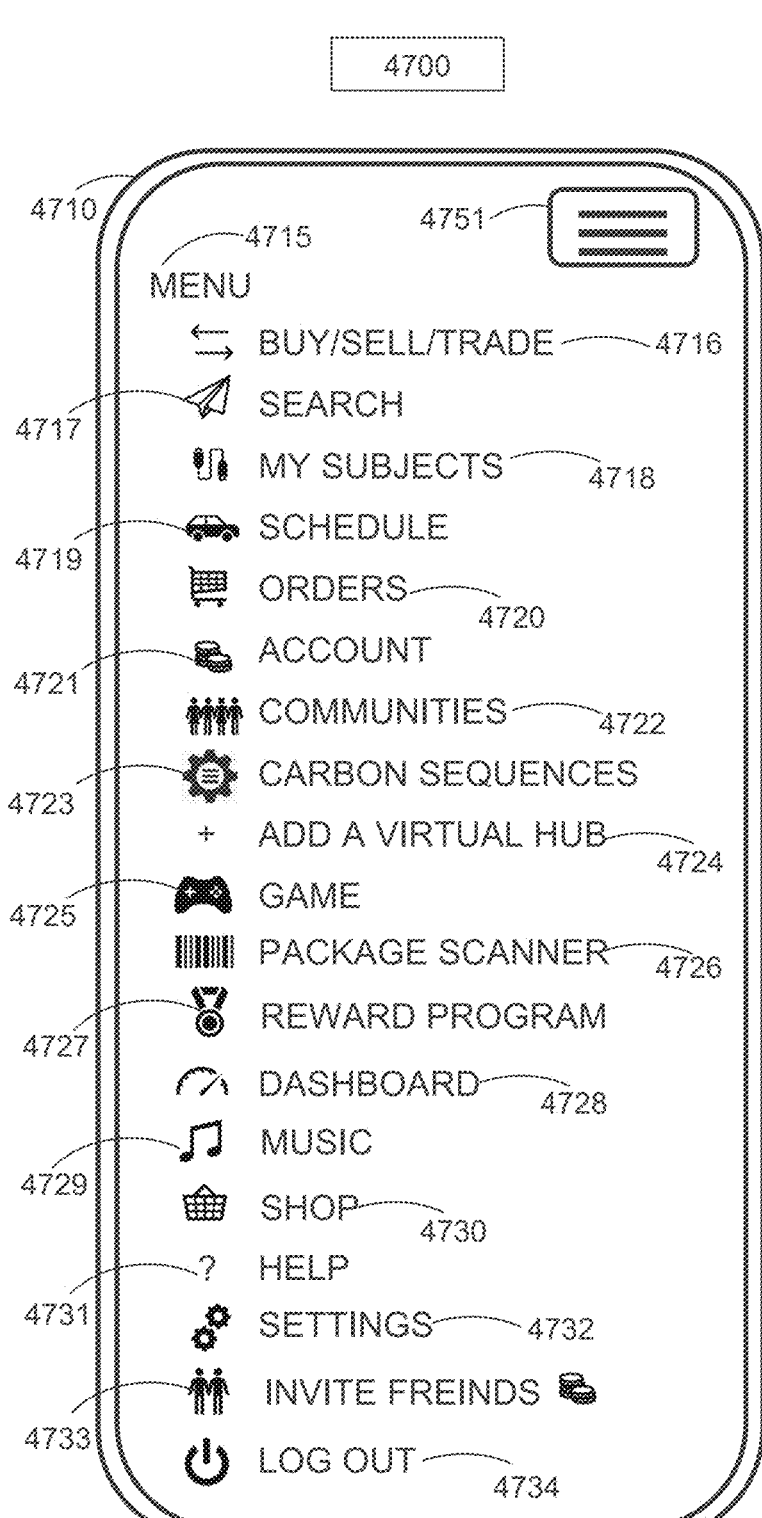
FIG. 47 illustrates a menu options configuration in accordance with implementations of various techniques described herein.

FIG. 47 illustrates a menu options configuration 4700 in accordance with implementations of various techniques described herein, where the menu options configuration 4700 may be used to display one or more menu options for use with the implementations and configurations described herein.

The menu options configuration 4700 may be implemented using a computing device (e.g., the mobile computing device mentioned above), where the device may include a user interface 4710. The user interface 4710 may be a GUI or any other user interface known to those skilled in the art. Further, the computing device may be voice-enabled device, a screen-enabled device, a non-screen enabled device, or any computing device known to those skilled in the art. In particular, the interface 4710 may be used to display implementations which utilize a multi-layered network node topology for forward market of emission claim or carbon credit geolocation claim units for price-based navigation.

The menu options configuration 4700 may include a buy/sell/trade option 4716, which may be configured to allow the user to access the emissions claims or carbon credit geolocation unit gateway trading platform for virtual hub emission claim or carbon credit geolocation claim unit combinations and virtual hub sequences. The menu options configuration 4700 may include a navigation option 4717, which may be configured to allow the user to access a navigation module for claim price based navigation or claim selection based on cost or earnings from a claim, as described in: a) U.S. Emission or emission offset Application Ser. No 16/242,967, "Price Based Navigation," filed Jan. 8, 2019, the entirety of which is incorporated by reference herein; and, b) U.S. Emission or emission offset Application Publication, U.S. Ser. No. 15/877,393, "Electronic Forward Market Exchange for Transportation Seats and Capacity in Transportation Spaces and Vehicles," filed Jan. 23, 2018, the entirety of which is incorporated by reference herein.

The menu options configuration 4700 may also include a "my claims" or "my subjects" option 4718, which may be configured to allow the user to access claims that are associated to their user profile or behavior and may be stored in the network member database. The menu options configuration 4700 may also include a claims option 4719, which may be configured to allow the user to access a claim status or delivery view. The menu options configuration 4700 may also include an orders option 4720, which may be configured to allow the user to cancel or adjust orders in the system that are unfilled. The menu options configuration 4700 may also include an accounts option 4721 to allow the user to toggle to an account page, a communities option 4722 to allow the user to toggle to a communities object page, or a claim sequences option 4723 to allow the user to toggle to a claim sequences page.

Further, the menu options configuration 4700 may include an additional hubs option 4724 to allow the user to add additional hubs 4724 or include a gaming option 4725 to allow the user to an emission claim or carbon credit geolocation claim unit gaming interface. In addition, the menu options configuration 4700 may also include a package scanner option 4726 to allow the user to scan freight emissions claims or carbon credit geolocation units. Additionally, the menu options configuration 4700 may also include a reward program option 4727 to allow users to access a reward, and the configuration 4700 may include a dashboard option 4728 to allow users to access a dashboard module. The menu options configuration 4700 may also include a music option 4729 and a shop option 4730. Further, the menu options configuration 4700 may include a help option 4731 and/or a settings option 4732 to allow the user to update account information or privacy settings. In addition, the menu options configuration 4700 may include an invite friends option 4733 to allow the user to earn rewards, bonuses, cash, or credits. The menu options configuration 4700 may also include a logout option 4734 to allow the user to log out of the system.

Figure 48:
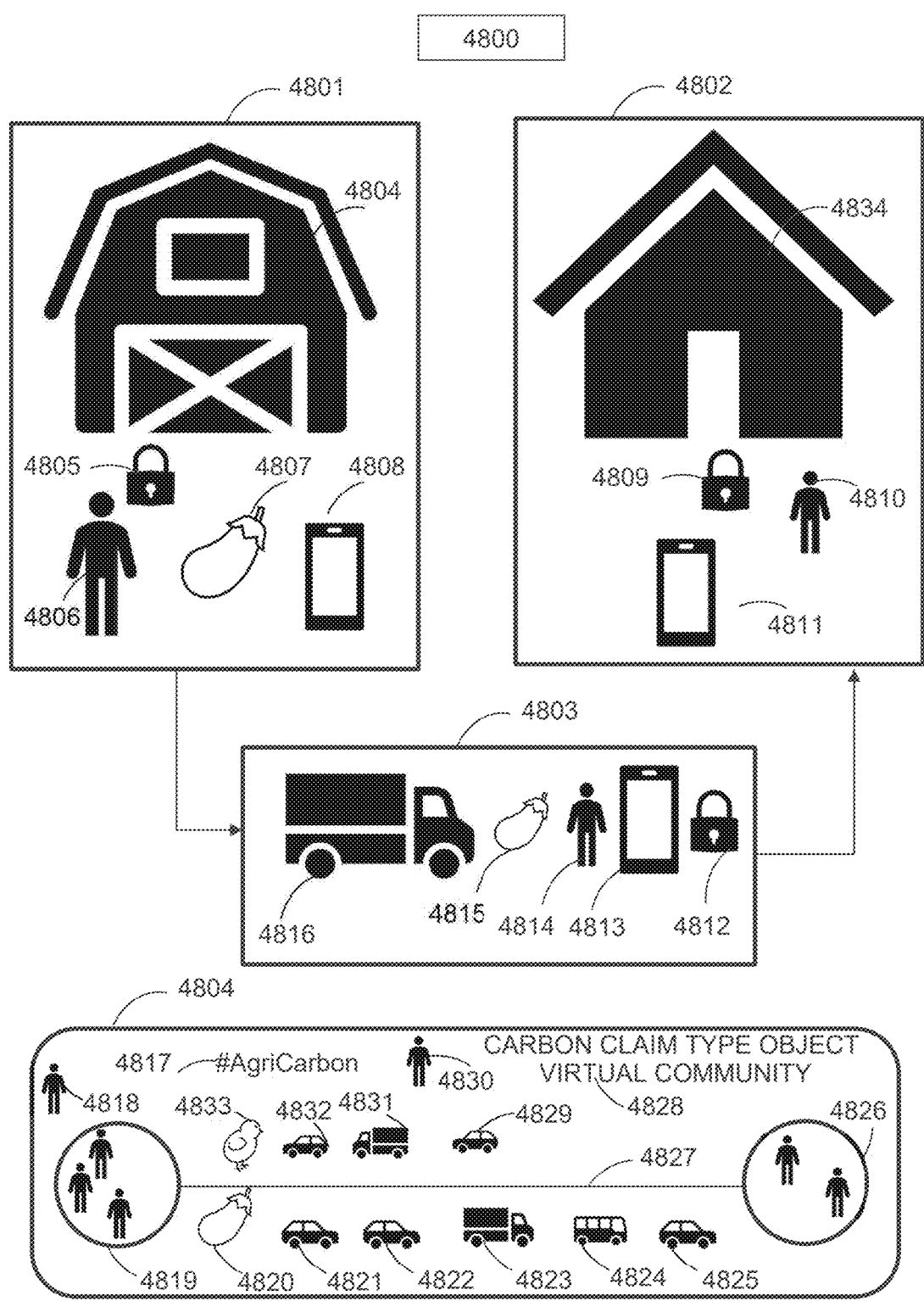
FIGS. 48-50 illustrate a system in accordance with implementations of various techniques described herein.

FIG. 48 illustrates another exemplary network configuration 4800 module of the disclosed method and system which records the network architecture of a typical emissions claims or carbon credit geolocation unit object with a price-time priority queue and resulting delivery sequence and integration with the emissions claims or carbon credit geolocation unit linked virtual community object. In some embodiments, the multi layered network node topology of participating, transacting and/or trading transformed emissions claims or carbon credit geolocation unit linked emission claim or carbon credit geolocation claim unit attribute specification or emissions claims or carbon credit geolocation units or securities for emissions claims or carbon credit geolocation unit community linked objects 4800 includes the following elements, or a subset or superset thereof:

exemplary emissions claims or carbon credit geolocation unit community object waypoint origin 4801;

exemplary emissions claims or carbon credit geolocation unit community object waypoint destination 4802;

exemplary emissions claims or carbon credit geolocation unit community object during transit 4803;

exemplary emissions claims or carbon credit geolocation unit community object 4804 to which a user may subscribe, join, friend, follow, etc.;

exemplary emissions claims or carbon credit geolocation unit storage unit at an emissions claims or carbon credit geolocation unit community waypoint origin 4804;

exemplary technology storage security device which electronically locks or unlocks the emissions claims or carbon credit geolocation unit community object for claims 4805 at waypoint origin;

exemplary emissions claims or carbon credit geolocation unit community object user at waypoint origin 4806;

exemplary emissions claims or carbon credit geolocation unit community object unit in the form of an exemplary vehicle at the emissions claims or carbon credit geolocation unit community waypoint origin 4807;

exemplary emissions claims or carbon credit geolocation unit community object unit in the form of an exemplary truck at the emissions claims or carbon credit geolocation unit community waypoint origin 4808;

exemplary storage security device which electronically locks or unlocks the emissions claims or carbon credit geolocation unit community object for transport 4809 at destination emissions claims or carbon credit geolocation unit waypoint;

exemplary emissions claims or carbon credit geolocation unit community object user at waypoint destination 4810;

exemplary emissions claims or carbon credit geolocation unit community delivery lock box or electronic confirmation of arrival at waypoint destination 4811 for emissions claims or carbon credit geolocation unit community unit;

exemplary emissions claims or carbon credit geolocation unit community unit transport vehicle in transit between origin and destination waypoint 4816;

exemplary emissions claims or carbon credit geolocation unit community unit in transit between origin and destination waypoint 4815;

exemplary emissions claims or carbon credit geolocation unit community unit transport driver in transit between origin and destination waypoint 4814;

exemplary emissions claims or carbon credit geolocation unit community unit transport mobile computer device method and system interface in transit between origin and destination waypoint 4813;

exemplary emissions claims or carbon credit geolocation unit community unit transport mobile computer device method and system security interface in transit between origin and destination waypoint 4812;

exemplary emissions claims or carbon credit geolocation unit community object tag between origin and destination waypoint(s) for a specified emission claim or carbon credit geolocation claim unit community object such as a hammer 4817;

exemplary emissions claims or carbon credit geolocation unit community linked transport unit user at origin waypoint 4818;

exemplary emissions claims or carbon credit geolocation unit community linked virtual claim object 4828;

exemplary emissions claims or carbon credit geolocation unit community linked claim user 4830;

exemplary emissions claims or carbon credit geolocation unit community linked object origin waypoint 4819 with users and emission claim or carbon credit geolocation claim unit units;

exemplary emissions claims or carbon credit geolocation unit community linked object destination waypoint 4826 with users and emissions claims or carbon credit geolocation units;

exemplary emissions claims or carbon credit geolocation unit community virtual route user 4830;

exemplary emissions claims or carbon credit geolocation unit community linked object unit claim vehicles on an exemplary waypoint combination 4833, 4832, 4831, 4829, 4820, 4821, 4822, 4823, 4824, 4825.

In some embodiments, users 4806, 4810, 4814, 4818, 4830, 4819, 4826 may follow or subscribe or friend an emissions claims or carbon credit geolocation unit community linked virtual route or claim route 4828 for a particular emissions claims or carbon credit geolocation unit 4817 such as an agriculture carbon or emission claim or credit, for example, though not limited to the example. In some embodiments, the emissions claims or carbon credit geolocation unit community linked emissions claims or carbon credit geolocation unit attribute specification unit 4817 may be comprised of such as drug claims, personal injury claims, business claims, open air lot claims, covered lot claims, assigned spot claims, street claims, handicapped claims, work claims, school claims, private home claims, private garage claims, claims with an electric charge, large vehicle or a plurality of other claim types. In some embodiments, the emissions claims or carbon credit geolocation unit community linked unit 4817 may be comprised of trucks 4808, cars 4807 or other vehicle types or emissions claims or carbon credit geolocation unit types. In some embodiments, the emissions claims or carbon credit geolocation unit community linked claim unit user may be a community member 4806 who owns emissions claims or carbon credit geolocation unit inventory 4807 at a waypoint origin 4819 and desires to participate or transact in the price-time priority queue 300 for a certain emissions claims or carbon credit geolocation unit 4807 on a waypoint sequence 4819, 4826 or 4801, 4802. In some embodiments, the emissions claims or carbon credit geolocation unit community linked transport unit user may be an end consumer, restaurant, hotel, carpenter or other end user 4810 who desires to participate in the price-time priority queue 300 for certain emissions claims or carbon credit geolocation units 4807, 4808. In some embodiments, the end user 4810 or origin owner 4806 of the emissions claims or carbon credit geolocation unit community linked object with waypoints 4804 may use a mobile or fixed or visual or audio interface computer unit 4813 to enter price-time priority queue 300 based transactions for emissions claims or carbon credit geolocation units 4807, 4808, 4819, 4826, 4815 along an emissions claims or carbon credit geolocation unit community linked waypoint combination path 4827. In some embodiments, emissions claims or carbon credit geolocation unit communities may serve as virtual claim markets 4804 with associated price time priority queues 300 and GPS tracking of the emissions claims or carbon credit geolocation unit units 4807, 4808, 4819, 4826, 4815 through the scanning of emissions claims or carbon credit geolocation units 2600 at emissions claims or carbon credit geolocation unit waypoint origin 4801, waypoint destination 4802, or along the waypoint sequence path 4803. In some embodiments, the user 4806 may transfer emissions claims or carbon credit geolocation units 4807, 4808 by using the scan feature 2600 of the mobile or fixed or visual or audio interface computer unit 4813 to a emissions claims or carbon credit geolocation unit community linked claim user 4814 in the emissions claims or carbon credit geolocation unit community linked vehicle 4816 as a security authorized transaction participant 4812 of the price-time priority queue 300 of the emissions claims or carbon credit geolocation unit community linked claim unit 4815. In some embodiments, the emissions claims or carbon credit geolocation unit community linked claim unit 4815 may be delivered to an end user 4810 at an end user destination waypoint 4834 by using the mobile or fixed or visual or audio interface computer unit 4813 unlock sequence 4809 interface to deliver the emissions claims or carbon credit geolocation unit community linked transport unit 4815 to a secure 4809 delivery claim unit 4811. In some embodiments, scanning procedures 2600 of the mobile or fixed or visual or audio interface computer unit 4813 may comprise secure transfer and records or the emissions claims or carbon credit geolocation unit community linked claim unit 4815 for both pickup transfer at the emissions claims or carbon credit geolocation unit community unit object origin 4801, waypoint combination transfer claim 4803 and waypoint destination delivery 4802.

FIG. 48 may be incrementally defined as shown in boxes 4801 and 4802 with reference to U.S. Emission or emission offset Application U.S. Ser. No. 17/069,597, "Price-Time Priority Queue Routing for Transportation Capacity Units," filed Oct. 12, 2019, the entireties of which are incorporated by reference herein with supplemental reference to diagrams from the aforementioned application. In particular, as shown in box 4802, $y_i$, $i \in M$ may be a binary variable with a value of 1 if supplier i is selected. The binary variable may have a value of 0 otherwise. Further, $x_{ij}, (i,j) \in A$ may be a binary variable with a value of 1 if arc(i, j) is traversed. The binary variable may have a value of 0 otherwise. In addition, $Z_{ik}$, k $\in$ K, i $\in$ $M_k$ may be a variable representing the number of units of product k purchased by supplier i. Moreover, for any subset V' of nodes, the following equations may be defined:

$$\delta + (V') := \{(i,j) \in A : i \in V', j \in V'\} \tag{1}$$

$$\delta - (V') = \{(i,j) \in A : i \in V', j \in V'\} \tag{2}.$$

Further, as shown in box 4803, for the price-time priority queue routing:

$$\min \sum_{(i,j) \in A}^{n} c_{ij} x_{ij} \sum_{k \in K} \sum_{i \in M_k} P_{ik} Z_{ik} : \tag{3}.$$

which may be subject to the following equations, as shown in boxes 4803-4810:

$$\sum_{i \in M_k} Z_{ik} = d_k, k \in K \tag{4}$$

$$Z_{ik} \le q_{ik} y_i, k \in K, i \in M_k \tag{5}$$

$$\sum_{(i,j) \in \delta + (\{h\})} X_{ij} = \sum_{(i,j) \in \delta - (\{h\})} X_{ij} = y_h, h \in M \tag{6}$$

$$\Sigma_{(i,j)\in\delta^-(M')}x_{ij}\leq y_h=M'c\ M,h\in M' \tag{7}$$

$$x_{ij}\in\{0,1\},(i,j)\in A \tag{8}$$

$$y_i\in\{0,1\},i\in M \tag{9}$$

$$Z_{iik}\leq 0,k\in K,i\in M_k \tag{10}$$

In some implementations, the objective function of Equation 3 and shown in box 4803 may be used for the joint minimization of the traveling and purchasing costs. Further, Equation 4 (shown in box 4804) may ensure that each product demand is satisfied. The constraint equations in Equation 5 (shown in box 4805) may impose that each supplier has to visit to purchase an emission claim or carbon credit geolocation claim unit product from it and the purchased quantity should not exceed the corresponding availability. The constraints in Equations 6 and 7 (shown in boxes 4806 and 4807) may be used to decide the visiting tour feasibility. In particular, Equation 6 may impose that, for each visited supplier, exactly one arc is to enter and leave the relative node. In particular, the price-time priority queue may be used to provide value for each path of an individual node pair. As such, an overall route sequence for an emission claim or carbon credit geolocation claim unit, where the sequence may include a transit of people, packages, data, electricity, space and time, virtual transit, and/or the like. The sequence may also be organized by price-time priority queue for value and then aggregated into a complete arc set.

Further, the inequalities of Equation 7 may be connectively constraints that prevent the creation of sub-tours, not including the depot, by imposing that at least one arc must enter each subset M' of suppliers in which at least one supplier h has visited. In addition, the constraints of Equations 8, 9, and 10 (shown in boxes 4808, 4809, and 4810) may impose binary and non-negative conditions on variables. In some implementations, no integrality conditions may be required for z variables, even if they actually represent the number of emission claim or carbon credit geolocation claim units purchased for each product in each supplier. In some implementations, if all input data are integers, then an optimal solution where all z-variables have integer values may exist.

Figure 49:
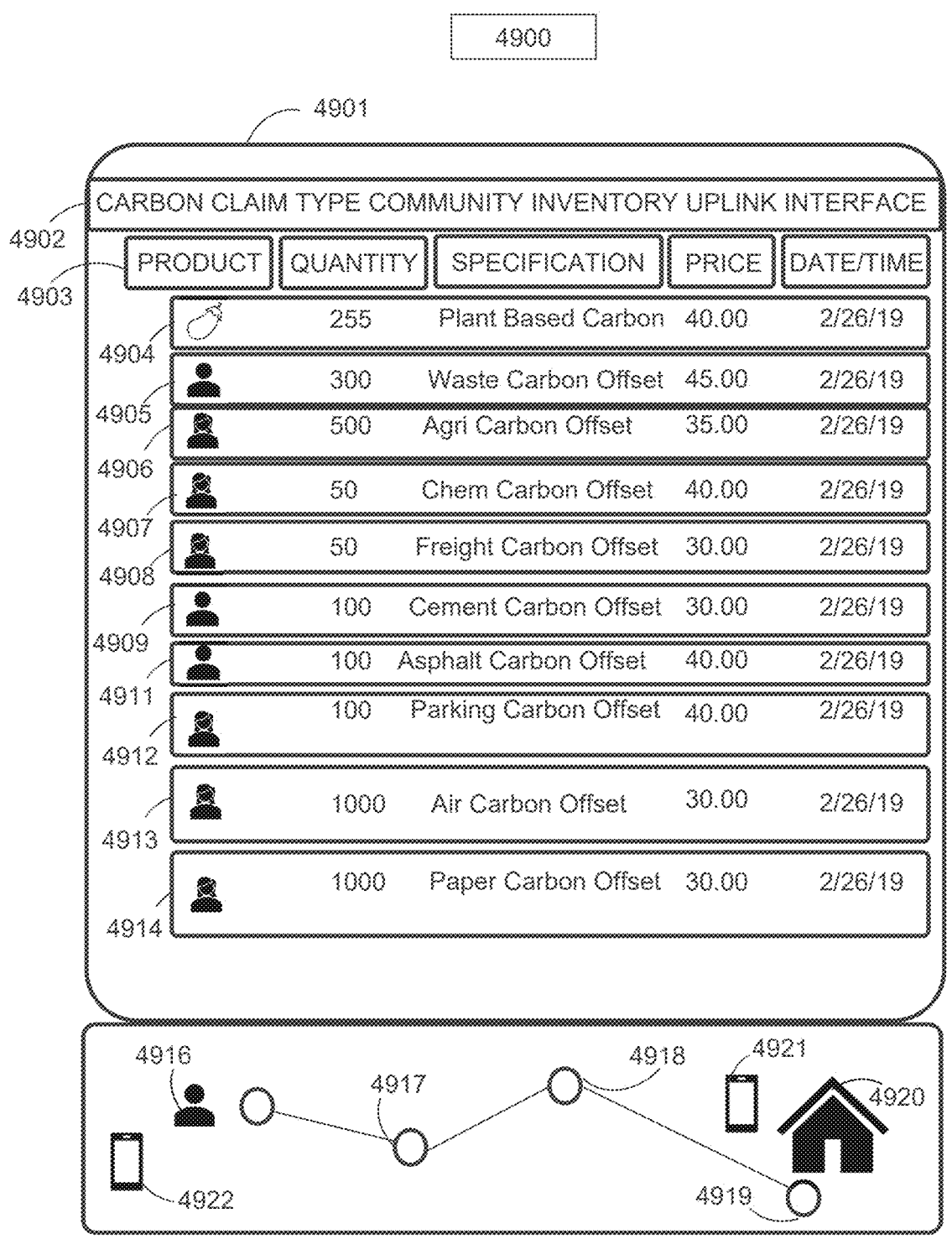

FIG. 49 illustrates an exemplary emission claim or carbon credit geolocation claim unit community inventory uplink interface 4900 of the disclosed method and system which may be user to upload emission claim or carbon credit geolocation claim unit community linked transport unit inventory to the emission claim or carbon credit geolocation claim unit linked virtual community object. In some embodiments, the uplink element of the multi layered network node topology of participating, transacting and/or trading transformed emission claim or carbon credit geolocation claim unit community linked emission claim or carbon credit geolocation claim unit attribute specification or emission claim or carbon credit geolocation claim unit or securities for emission claim or carbon credit geolocation claim unit community linked objects 4900 includes the following elements, or a subset or superset thereof:

exemplary emission claim or carbon credit geolocation claim unit community object unit uplink interface 4901 for emission claim or carbon credit geolocation claim unit inventory automation;

exemplary emission claim or carbon credit geolocation claim unit community object unit header interface 4902;

exemplary emission claim or carbon credit geolocation claim unit community object unit product type, quantity, specification, price, date and time 4903;

exemplary emission claim or carbon credit geolocation claim unit community unit object of specification plant based consumption or plant or forrest emission or emission offset claim 4904 with a plurality of additional specifications;

exemplary emission claim or carbon credit geolocation claim unit community unit object of specification carbon or emission waste claim 4905 with a plurality of additional specifications;

exemplary emission claim or carbon credit geolocation claim unit community unit object of specification agricultural claim 4906 with a plurality of additional specifications;

exemplary emission claim or carbon credit geolocation claim unit community unit object of a chemical or chemistry carbon or emission offset credit or claim 4907 with a plurality of additional specifications;

exemplary emission claim or carbon credit geolocation claim unit community unit object of freight or shipping carbon offset or claim 4908 with a plurality of additional specifications;

exemplary emission claim or carbon credit geolocation claim unit community unit object of a cement carbon offset or emission claim 4909 with a plurality of additional specifications;

exemplary emission claim or carbon credit geolocation claim unit community unit object of asphalt carbon offset claim 4911 with a plurality of additional specifications;

exemplary emission claim or carbon credit geolocation claim unit community unit object of parking carbon or emission offset claim 4912 with a plurality of additional specifications;

exemplary emission claim or carbon credit geolocation claim unit community unit object of an air carbon or emission or emission offset claim 4913 with a plurality of additional specifications;

exemplary emission claim or carbon credit geolocation claim unit community unit object at origin waypoint 4916;

exemplary emission claim or carbon credit geolocation claim unit community linked emission claim or carbon credit geolocation claim unit attribute specification unit object transfer or bypass waypoint 4917;

exemplary emission claim or carbon credit geolocation claim unit community linked emission claim or carbon credit geolocation claim unit attribute specification unit object transfer or bypass waypoint 4918;

exemplary emission claim or carbon credit geolocation claim unit community linked emission claim or carbon credit geolocation claim unit attribute specification unit object destination waypoint 4919 and fixed area delivery emission claim or carbon credit geolocation claim unit 4920;

In some embodiments, the method and system of emission claim or carbon credit geolocation claim unit community linked emission claim or carbon credit geolocation claim unit attribute specification units 4916 with emission claim or carbon credit geolocation claim unit community linked emission claim or carbon credit geolocation claim unit attribute specification price-time priority queues 300 may utilize an uplink module interface 4901 to upload emission claim or carbon credit geolocation claim unit inventory 4901 to the emission claim or carbon credit geolocation claim unit community linked emission claim or carbon credit geolocation claim unit attribute specification unit object which may also be a form of a virtual emission claim or carbon credit geolocation claim unit market interface to users of the method and system. In some embodiments, the emission claim or carbon credit geolocation claim unit may include a subset or superset of the following emission claim or carbon credit geolocation claim unit examples but not limiting by example: plant based emission or emission offset claim 4904, carbon waste credit or claim 4905, carbon agriculture credit or claim 4906, carbon chemical or chemistry credit or claim 4907, carbon freight or shipping credit or claim 4908, carbon cement credit or claim 4909, carbon asphalt credit or claim 4911, carbon parking credit or claim 4912, carbon air emission credit or emission or emission offset claim 4913 or a plurality of other commercial units common to the emission or emission offset market. In some embodiments, the emission claim or carbon credit geolocation claim units may include specifications and specification profiles in the specifications to standardize the units in the data transformations of the emission claim or carbon credit geolocation claim units 4916. FIG. 49 further may illustrate a system 4900 in accordance with implementations of various techniques described herein and with reference to U.S. patent application Ser. No. 17/069,597, "Price-Time Priority Queue Routing for Transportation Capacity Units," filed Oct. 12, 2019, the entireties of which are incorporated by reference herein may also incrementally be described with reference to the aforementioned application diagram figure. In one implementation, an asymmetric emission claim or carbon credit geolocation claim unit routing problem with trivial preprocessing may be defined as shown in box 4901. In particular, as shown in box 4902, a first trivial preprocessing can be applied to the system 4800:

$$\overset{\text{def}}{=} M^* := \{0\} \cup \{i \in M : \exists k \in K \text{ such that} \Sigma_{j \in M_k / \{i\}} q_{ik} \tag{11}$$

In particular, the node set shown in Equation 11 and box 4902 may be part of any feasible solution.

As shown in box 4903:

$$K^* := \{k \in K : \Sigma_{i \in M_k} q_{ik} = d_k\} \tag{12}$$

as the product set for which suppliers' selection and purchasing plan decisions may be predetermined. Thus, the constraints of Equation 9 (shown in box 4809) may be replaced by $$y_i = 1 \text{ when } i \in M^* \tag{13}$$

and the constraints of Equation 4 (shown in box 4804) may be replaced by $$Z_{ik} = q_{ik} \text{ when } k \in K^*, i \in M \tag{14}$$

In some implementations, the formulations of system 4800 may not be implemented through a commercial solver (e.g., solvers available in commercial spreadsheet programs) even for small size instances, since the number of constraints (e.g., Equation 7) may be exponentially larger than the size of M. In particular, the commercial solver may be limited due to one or more of the following reasons: a lack of price-time priority queue input ingest to organize inputs; failure to limit or organize the solution to minimize distance and maximize profit; failure to transform the underlying emission claim or carbon credit geolocation claim unit into a form that would work emission or emission offset or technically with such a queue, in that it has not be unitized or securitized as a homogenous unit; and/or the like. However, there may exist other subtour elimination constraints that yield, expanding the variables subspace, emission claim or carbon credit geolocation claim unit route sequence formulations with one or more polynomial constraints cardinality for compact formulations.

Figure 50:
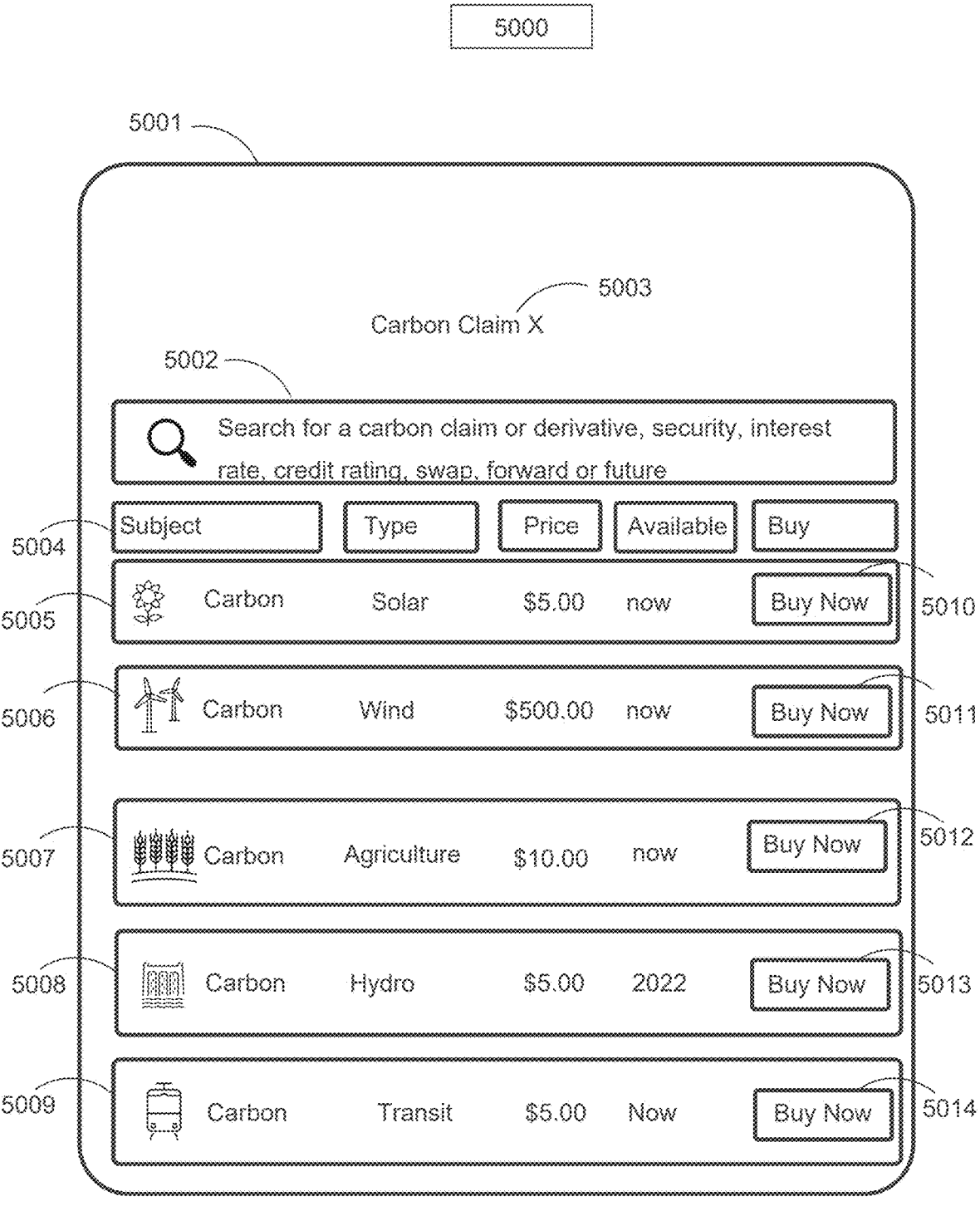

FIG. 50 illustrates an exemplary emission claim or carbon credit geolocation claim unit community search interface 5000 of the disclosed method and system which may be user to search for an emission claim or carbon credit geolocation claim unit community linked emission claim or carbon credit geolocation claim unit attribute specification unit inventory to the emission claim or carbon credit geolocation claim unit linked virtual community object. In some embodiments, the search element of the multi layered network node topology of participating, transacting and/or trading transformed emission claim or carbon credit geolocation claim unit community linked emission claim or carbon credit geolocation claim unit attribute specification or emission claim or carbon credit geolocation claim unit capacity units or securities for emission claim or carbon credit geolocation claim unit community linked objects 5000 includes the following elements, or a subset or superset thereof:

exemplary emission claim or carbon credit geolocation claim unit community unit object search interface mobile or fixed or audio computer unit 5001;

exemplary emission claim or carbon credit geolocation claim unit community unit object search interface title 5003;

exemplary emission claim or carbon credit geolocation claim unit community unit object search interface for user emission claim or carbon credit geolocation claim unit search input 5002;

exemplary emission claim or carbon credit geolocation claim unit community unit object category title header such as emission claim or carbon credit geolocation claim unit product, distance to emission claim or carbon credit geolocation claim unit, price of transformed emission claim or carbon credit geolocation claim unit, availability of transformed emission claim or carbon credit geolocation claim unit, buy option for associated price-time priority queue of transformed emission claim or carbon credit geolocation claim unit 5004;

exemplary emission claim or carbon credit geolocation claim unit community unit object of a commuter emission claim or carbon credit geolocation claim unit specification 5005 carbon or emission solar and a type of solar claim from the user at a price of $5.00 in the price-time priority queue with an immediate availability and an associated buy now option button 5010;

exemplary emission claim or carbon credit geolocation claim unit community unit object of an emission claim or carbon credit geolocation claim unit specification 5006 with counterparty of carbon and a type of wind claim for a user at a price of $5.00 in the price-time priority queue with an immediate availability and an associated buy now option button 5011;

exemplary emission claim or carbon credit geolocation claim unit community unit object of a general liability emission claim or carbon credit geolocation claim unit specification 5007 with a counterparty of carbon for a user at a price of $10.00 in the price-time priority queue with an immediate availability and an associated buy now option button 5012;

exemplary emission claim or carbon credit geolocation claim unit community unit object of a carbon emission claim or carbon credit geolocation claim unit 5008 with a counterparty of hydro user at a price of $5.00 in the price-time priority queue with an immediate availability and an associated buy now option button 5013;

exemplary emission claim or carbon credit geolocation claim unit community unit object of a transit emission claim or carbon credit geolocation claim unit 5009 with a type of emission or emission offset claim for the user at a price of $5.00 in the price-time priority queue with an immediate availability and an associated buy now option button 5014.

In some embodiments, the search function 5002 for the emission claim or carbon credit geolocation claim unit community object 4804 with a price-time priority queue auction indexes the search result with the following prioritization of first the emission claim or carbon credit geolocation claim unit, then second the distance of the emission claim or carbon credit geolocation claim unit from the user in the community object sequence, then by price-time priority. In some embodiments, the search function may prioritize as a second priority price-time prioritization followed by distance as a third index ranking. In some embodiments, the search function 5002 may provide instructions for the graphical user interface 5001 to state if availability of the transformed emission claim or carbon credit geolocation claim unit is immediately available, available the next day or available a plurality of other time and date designations for a plurality of duration exposures. In some embodiments, the emission claim or carbon credit geolocation claim unit community object 5005 may state only the lowest price $5.00 of the then current price-time priority queue 300 for the specific object requested in the search function 5002. In some embodiments, the transformed emission claim or carbon credit geolocation claim unit may be a commuter auto liability emission claim or carbon credit geolocation claim unit 5005, a workmans compensation emission claim or carbon credit geolocation claim unit 5006, a general liability emission claim or carbon credit geolocation claim unit 5007, a general commercial liability emission claim or carbon credit geolocation claim unit 5008, a general technology emission or emission offset claim 5009 or a plurality of other alternative transformed emission claim or carbon credit geolocation claim units. In some embodiments, the specific transformed emission claim or carbon credit geolocation claim unit may have a buy now 5010 button. In some embodiments, the buy now button 5010 instantiates the instructions for allow the application to consummate a transaction with geolocation and step by step delivery or emission or emission offset or digital epichain instructions 900, 2100, 2200, 2300 with the user interface as shown from the match of the user who owns the transformed emission claim or carbon credit geolocation claim unit the user who seeks to buy the transformed emission claim or carbon credit geolocation claim unit. FIG. 50 further may illustrate a system 5000 in accordance with implementations of various techniques described herein and with reference to U.S. Emission or emission offset Application U.S. Ser. No. 17/069,597, "Price-Time Priority Queue Routing for Transportation Capacity Units," filed Oct. 12, 2019, the entireties of which are incorporated by reference herein and reference to the aforementioned application diagram figures. In one implementation, an asymmetric emission claim or carbon credit geolocation claim unit routing problem with introductions of a non-negative variable may be defined as shown in box 5001. In particular, as shown in box 5002, a non-negative variable ut, may be introduced for each supplier i ∈ M representing the total number of suppliers already visited when leaving supplier i. Further, as explained in boxes 5002-5004, the inequality of Equation 7 (and shown in box 4807) may be substituted with:

$$u_i - u_j + |M|x_{ij} \le |M| - 1 i, j \in M, i \ne j \tag{15}$$

Using Equation 15 may prevent the creation of subtours by controlling the order of visit of the suppliers.

In another implementation, as shown in box 5005, a non-negative flow variable fj may be defined for each arc (i,j) E A representing the quantity of a commodity on the vehicle when it leaves supplier i and arrives in j. The single commodity flow formulation may be obtained by substituting the inequalities of Equations 6 and 7 (shown in boxes 4806 and 4807) with the following, which are also shown in boxes 5006-5008:

$$\Sigma_{j \in M} f_{0j} = \Sigma_{k \in K} d_k \tag{16}$$

$$\Sigma_{(i,j) \in \delta+(\{h\})} f_{ij} - \Sigma_{(i,j) \Sigma \delta-(\{h\})} f_{ij} = -\Sigma_{k \in K} z_{hk} h \in M \tag{17}$$

$$f_{ij} \le x_{ij} \Sigma_{k \in K} d_k (i,j) \in A \tag{18}.$$

Figure 51:
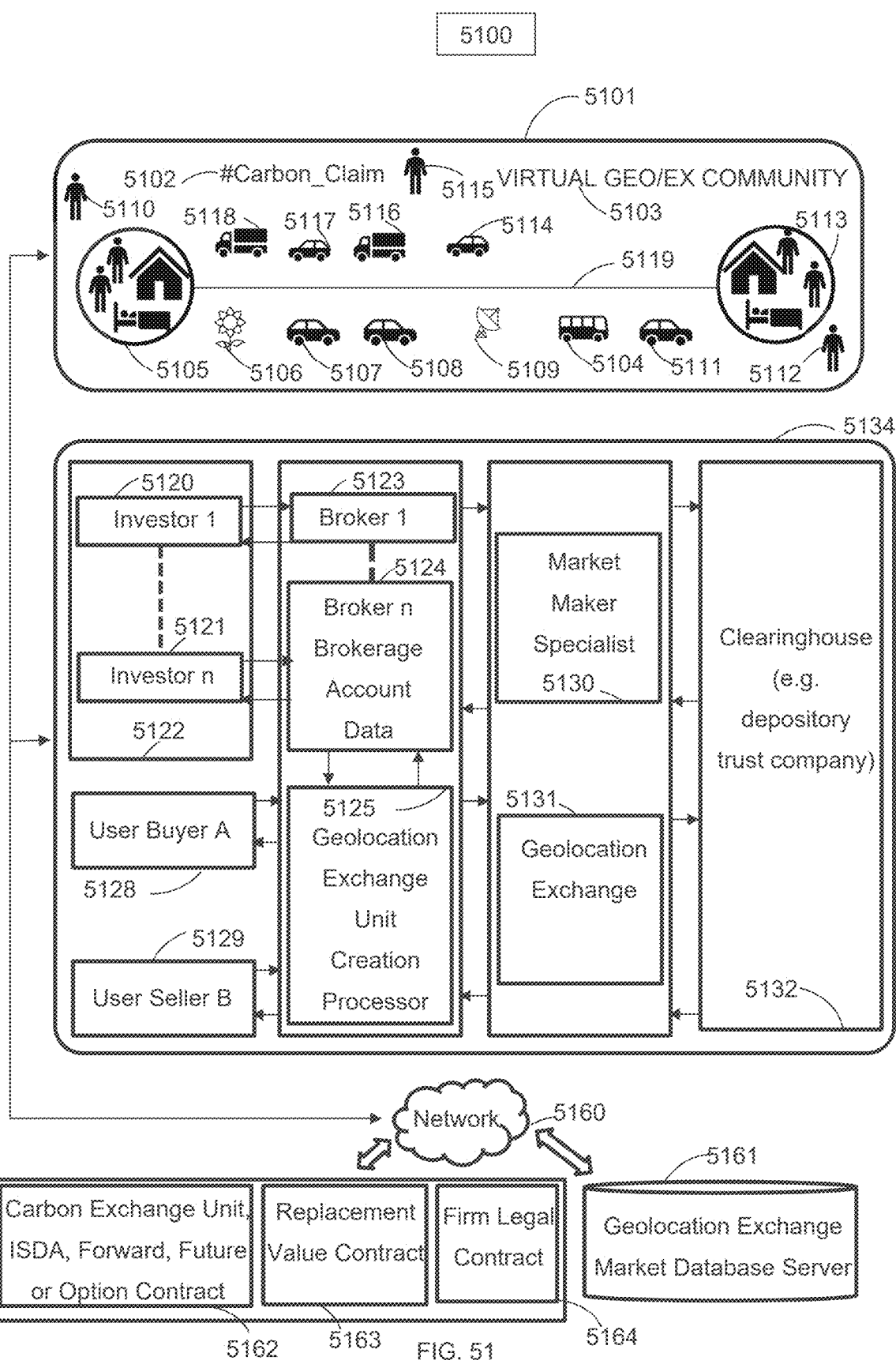
FIG. 51 illustrates a schematic diagram of a computing system in which the various technologies described herein may be incorporated and practiced.

FIG. 51 illustrates an exemplary emission claim or carbon credit geolocation claim unit object community and associated emission claim or carbon credit geolocation claim unit creation method structure. In some embodiments, an emission claim or carbon credit geolocation claim unit such as #Carbon_Claim (California Air Resources Claim) 5102 is constructed as an emission claim or carbon credit geolocation claim unit community to which people or users may subscribe or follow with an associated price time and priority queue for the relevant carbon or emission claim or carbon credit geolocation claim unit community object 5101. A user 5110 may subscribe the to the carbon claim object community 5102. In some embodiments, there may be a plurality of delivery methods for the virtual geolocation exchange unit or emission claim or carbon credit geolocation claim unit 5103 community of virtual transportation or virtual bandwidth meeting carbon or emission offset Claim object 5102. In some embodiments, the delivery methods may be physical such as a truck 5118, car 5117, truck 5116, small car 5114, virtual 5119 and satellite bandwidth or land line bandwidth 5109, multi-vehicle 5111, plant 5106, 5107, 5108 or bus 5104 for the plurality of users 5110 and 5112 between two physical or virtual locations 5105, 5113. In some embodiments, the creation method process 5134 of an emission claim or carbon credit geolocation claim unit may have a plurality of investors 5120, 5121 who invest in a broker account 5123 or 5124 to then alert the emission claim or carbon credit geolocation claim unit creation processor 5125 the collateral has been posted. In some embodiments, a plurality of buyers 5128, 5129 may directly purchase the emission claim or carbon credit geolocation claim units. In some embodiments, the market maker or specialist 5130 may help to facilitate transactions for the emission claim or carbon credit geolocation claim unit exchange 5131 and clearinghouse 5132. In some embodiments, the creation process for a emission claim or carbon credit geolocation claim unit may interact with the system network 5160 to form a emission or emission offset transformation for the emission claim or carbon credit geolocation claim unit exchange unit ISDA, Forward, Future, Swap, Security, Derivative or Option contract 5162 and replacement value contract 5163 and firm emission or emission offset contract 5164 which may be the basis for the transactions on the emission claim or carbon credit geolocation claim unit exchange market or securities market database server 5161. FIG. 51 further may illustrate a system 5000 in accordance with implementations of various techniques described herein and with reference to U.S. patent application Ser. No. 17/069,597, "Price-Time Priority Queue Routing for Transportation Capacity Units," filed Oct. 12, 2019, the entireties of which are incorporated by reference herein and reference to the aforementioned application diagram figures, in accordance with implementations of various techniques described herein. In one implementation, a Euler diagram of an emission claim or carbon credit geolocation claim unit routing problem with introduction solution sets and subsets may be defined as shown in box 5101. In one implementation, and as explained in box 5102, a Euler diagram for P, NP, NP-complete, and NP-hard set of problems is shown in box 5101. The left side may be valid under the assumption that P #NP, while the right side may be valid under the assumption that P=NP (except that the empty language and its complement are never NP-complete, and in general, not every problem in P or NP is NP-complete).

FIG. 52 illustrates an exemplary preamble formula structure 5200 for an emission claim or carbon credit geolocation claim unit which may represent an emission claim or carbon credit geolocation claim unit securities, forwards, swaps, options, futures, exchange traded funds (ETFs), or derivative unit securities or unitization structures or any exchange traded asset or derivative thereof. In some embodiments, to avoid doubt in the emission or emission offset transformations a "Geolocation Exchange Unit" is synonymous with a "Emission claim or carbon credit Geolocation Claim Unit" a "Transportation Capacity Unit" or "Freight Capacity Unit", or in other words, the Geolocation Exchange Unit refers more broadly to an exchange traded structure or instrument that may be in the form of stock, fixed income, debt, foreign exchange, futures, forwards, swaps, options, derivatives, exchange traded fund, block chain traded asset, private placement structure or public market structure. In some embodiments, the disclosed method and system relates to the sale and purchase or resale or repurchase or transfer and assignment of those certain geolocation exchange units or emission claim or carbon credit geolocation claim units. In some embodiments, CirclesX or Emission or emission offsetsX may relate to the purchase or sale or repurchase and resale of geolocation exchange units or emission claim or carbon credit geolocation claim units. In some embodiments CirclesX may relate to the purchase or sale or repurchase and resale of emission claim or carbon credit geolocation claim units. In some embodiments, a SimpsX Trade Hub is synonymous with a Virtual Hub. In yet other embodiments, a CirclesX, HoursX, PortalsX or WondersX or FarmsX or RoutesX or SidesX or CurbsX or TollsX Trade Hub is synonymous with a Virtual Hub. In some embodiments, PortalsX Geolocation Exchange Units may be capacity of advertising impressions though a plurality of operating system applications and web browsers associated with a data vault of a user 110 specification of geolocation attributes and geolocation exchange unit attributes. U.S. Provisional Emission or emission offset Application 62,969,301, "Web browser and operating system portal and search portal with price time priority queues", filed Feb. 3, 2020, the contents which are hereby incorporated by reference in their entirety. In some embodiments, FarmsX Geolocation Exchange Units may be capacity of agricultural units with a plurality of agriculture exchange units as a specification of geolocation attributes and geolocation exchange unit attributes. U.S. Emission or emission offset application Ser. No. 16,290,278, "Agriculture community objects with price-time priority queues for transformed agricultural units", filed Mar. 1, 2019, the contents which are hereby incorporated by reference in their entirety. In some embodiments, Rent It X Geolocation Exchange Units may be capacity of rental tool or farm equipment or heavy machinery or general appliance units with a plurality of rental exchange units as a specification of geolocation attributes and geolocation exchange unit attributes. U.S. Emission or emission offset application Ser. No. 16,293,712, "Tool appliance community objects with price-time priority queues for transformed tool units", filed Mar. 6, 2019, the contents which are hereby incorporated by reference in their entirety. In some embodiments, Renewable Energy X Geolocation Exchange Units may be capacity of renewable energy units with a plurality of energy exchange units as a specification of geolocation attributes and geolocation exchange unit attributes. U.S. Emission or emission offset application Ser. No. 16,357,241, "Social community objects with price time priority queues for transformed renewable energy units", filed Mar. 18, 2019, the contents which are hereby incorporated by reference in their entirety. In some embodiments, Tutors X Geolocation Exchange Units may be capacity of educational or tutoring units with a plurality of educational exchange units as a specification of geolocation attributes and geolocation exchange unit attributes. U.S. Emission or emission offset application Ser. No. 16,397,685, "Social community objects with price-time priority queues for transformed educational units", filed Apr. 29, 2019, the contents which are hereby incorporated by reference in their entirety. In some embodiments, Parked X Geolocation Exchange Units may be capacity of parking units with a plurality of parking exchange units as a specification of geolocation attributes and geolocation exchange unit attributes. U.S. Emission or emission offset application Ser. No. 16,359,841, "Social community objects with price-time priority queues for transformed parking units", filed Mar. 20, 2019, the contents which are hereby incorporated by reference in their entirety. In some embodiments, CurbsX Geolocation Exchange Units may be capacity of curb space for parking or storage though a plurality of parking spots or curb storage specifications of geolocation attributes and geolocation exchange unit attributes. U.S. Provisional Emission or emission offset Application 62,927,025, "Social community objects with price-time priority queues for transformed curb capacity units", filed Oct. 28, 2019, the contents which are hereby incorporated by reference in their entirety. In some embodiments, TollsX Geolocation Exchange Units may be capacity of tolling space or congestion management space for road or city congestion though a plurality of tolling or congestion management specifications of geolocation attributes and geolocation exchange unit attributes. U.S. Provisional Emission or emission offset Application 62,927,081, "Social community objects with price-time priority queues for transformed congestion capacity units", filed Oct. 28, 2019, the contents which are hereby incorporated by reference in their entirety. In some embodiments, the Geolocation Exchange Unit is used interchangeably with any trading unit utilizing geolocation attributes in geolocation exchanged based methods.

FIG. 53 illustrates an exemplary preamble formula extension structure 5300 for a transformed Geolocation Exchange Unit which may represent an emission claim or carbon credit geolocation claim unit securities or derivative unit securities or unitization structure. In some embodiments, the disclosed method and system relates to the sale and purchase or resale or repurchase or transfer and assignment of those certain emission claim or carbon credit geolocation claim units. In some embodiments, CirclesX or SimpsX may relate to the purchase, sale, repurchase, or resale of emission claim or carbon credit geolocation claim units.

FIG. 54 illustrates an exemplary definition formula structure 5400 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions may be set from a superset or subset or combination of the following structure to include Affiliate, Agreement, Applicable Interest Rate, Assigning Party, Bankrupt entity and other terms in accordance with some embodiments. In some embodiments, the formula for the transformed transportation or freight capacity unit may be present within the definitions stated in FIG. 54.

FIG. 55 illustrates an exemplary definition formula structure 5500 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Business Day, Buyer, Claiming Party, Claims, Confirmation, Contract Price, Contract Value, Contractual Currency and other terms in accordance with some embodiments. In some embodiments, the formula for the transformed emission claim or carbon credit geolocation claim unit may be present within the definitions stated in FIG. 55.

FIG. 56 illustrates an exemplary definition formula structure 5600 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Cost, Defaulting Party, Default Rate, Delivery, Early Termination Date, Effective Date, Event of Default, Force Majeure and other terms in accordance with some embodiments. In some embodiments, the formula for the transformed emission claim or carbon credit geolocation claim unit may be present within the definitions stated in FIG. 56.

FIG. 57 illustrates an exemplary definition formula structure 5700 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions may be set from a superset or subset or combination of the following structure to include GTCs, Independent Amount, Letters of Credit, Margin Party, Non-Defaulting Party, Option, Option Buyer, Option Seller, Party or Parties, Party B, Payment Date, Performance Assurance and other terms in accordance with some embodiments. In some embodiments, the formula for the transformed emission claim or carbon credit geolocation claim unit may be present within the definitions stated in FIG. 57.

FIG. 58 illustrates an exemplary definition formula structure 5800 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions may be set from a superset or subset or combination of the following structure to include Person, Premium, Present Value Discount Rate, Ask Yield, Product, Recording, Replacement Value, Seller, Settlement Amount, and other terms in accordance with some embodiments. In some embodiments, the formula for the transformed emission claim or carbon credit geolocation claim unit may be present within the definitions stated in FIG. 58.

FIG. 59 illustrates an exemplary definition formula structure 5900 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions may be set from a superset or subset or combination of the following structure to include Taxes, Term, Terminated Transaction, Termination Payment, Termination Replacement Price, Termination Replacement Transaction and other terms in accordance with some embodiments. In some embodiments, the formula for the transformed transportation or freight capacity unit may be present within the definitions stated in FIG. 59.

FIG. 60 illustrates an exemplary definition formula structure 6000 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions may be set from a superset or subset or combination of the following structure to include Trade Date, Transaction, Geolocation Exchange Unit may be used interchangeably and other terms in accordance with some embodiments. In some embodiments, the formula for the transformed emission claim or carbon credit geolocation claim unit may be present within the definitions stated in FIG. 60.

FIG. 61 illustrates an exemplary definition formula structure 6100 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions may be set from a superset or subset or combination of the following structure to include Confirmation and other terms in accordance with some embodiments. In some embodiments, a plurality of definitions may be set from a superset or subset or combination of the following structure to include Recording of Transactions and other terms in accordance with some embodiments. In some embodiments, the formula for the transformed emission claim or carbon credit geolocation claim unit may be present within the definitions stated in FIG. 61.

FIG. 62 illustrates an exemplary definition formula structure 6200 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Inconsistency with these established formulas for a plurality of transformed transportation unit formulas. In some embodiments, the formula for the transformed emission claim or carbon credit geolocation claim unit may be present within the definitions stated in FIG. 62.

FIG. 63 illustrates an exemplary definition formula structure 6300 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Force Majeure with these established formulas for a plurality of transformed transportation unit formulas. In some embodiments, Force Majeure may occur and be written in one or more business days from the Force Majeure event. In some embodiments, Remedies for Product Delivery Failures may be caused a failure of the Buyer or Seller to deliver the Geolocation Exchange Unit emission claim or carbon credit geolocation claim unit or GXU and the non-failing party shall be entitled to the formula of the then current price of such GXU as liquidated damages. In some embodiments, the formula for the transformed emission claim or carbon credit geolocation claim unit may be present within the definitions stated in FIG. 63.

FIG. 64 illustrates an exemplary definition formula structure 6400 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include events of default and remedies with these established formulas for a plurality of transformed emission claim or carbon credit geolocation claim unit formulas. In some embodiments, the formula for the transformed emission claim or carbon credit geolocation claim unit may be present within the definitions stated in FIG. 60. In some embodiments, events of default may include failure to make payment when required, making false representations, failure to perform to deliver the GXU, post-merger or reorganization failing to support the obligations of GXU or GXU or emission claim or carbon credit geolocation claim unit transactions. In some embodiments, events of default may include credit default or failure to delivery performance assurance or margin.

FIG. 65 illustrates an exemplary definition formula structure 6500 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include effect of default for a plurality of transformed emission claim or carbon credit geolocation claim unit formulas. In some embodiments, effect of default may occur and be written in one or more business days from the Effect of an event of Default. In some embodiments, the calculation of a termination payment may be "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party. In some embodiments, the formula for the transformed emission claim or carbon credit geolocation claim unit may be present within the definitions stated in FIG. 65.

FIG. 66 illustrates an exemplary definition formula structure 6600 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include effect of default for a plurality of transformed transportation unit formulas. In some embodiments, effect of default may occur and be written in one or more business days from the Effect of an event of Default. In some embodiments, the calculation of a termination payment may be "Settlement Amount" for such Terminated Transaction shall be the difference between the Replacement Value and the Contract Value of such Terminated Transaction, as calculated by the Non-Defaulting Party as follows:

iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section 5.4. In some embodiments, the formula for the transformed emission claim or carbon credit geolocation claim unit may be present within the definitions stated in FIG. 66.

Figure 67:
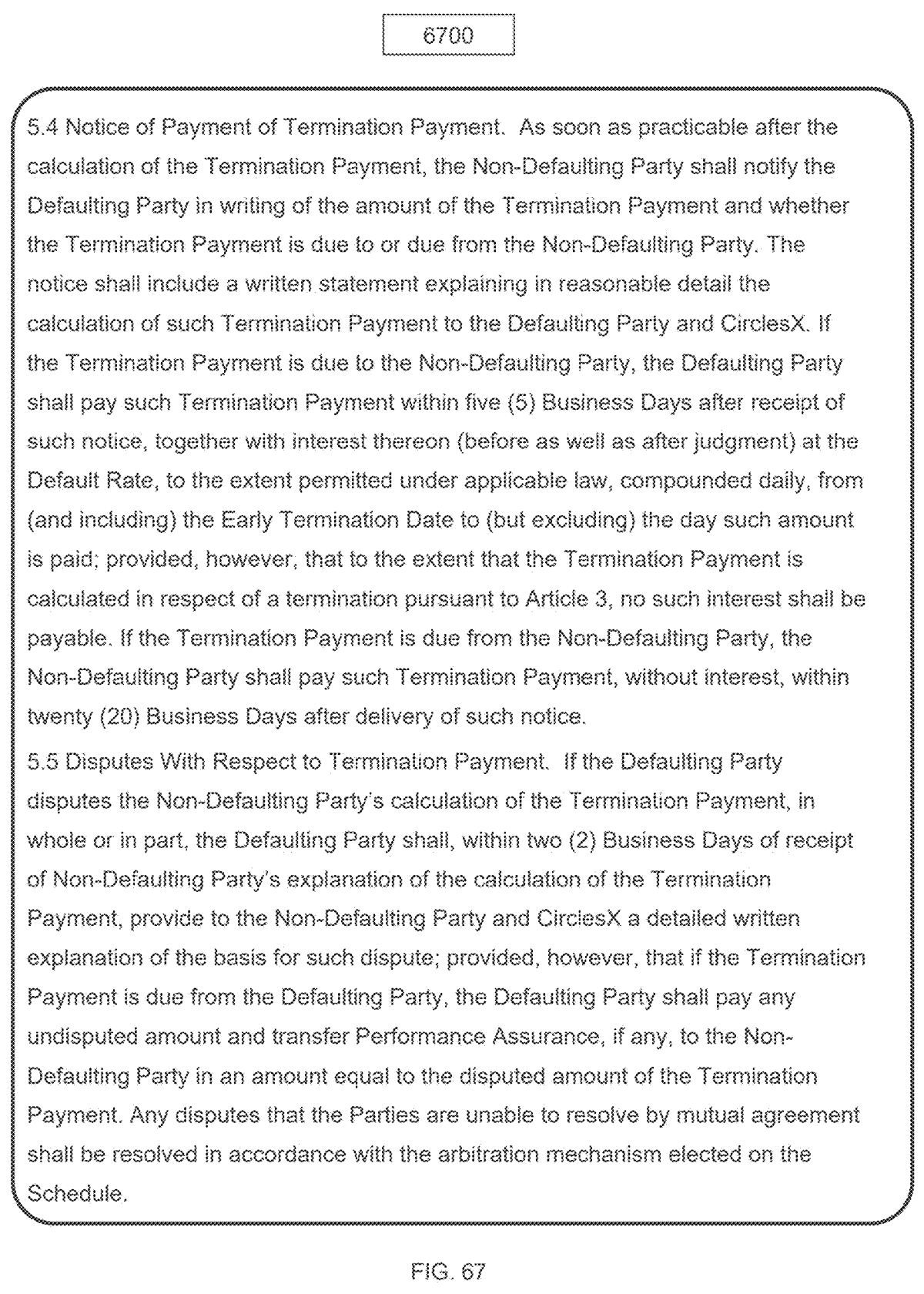

FIG. 67 illustrates an exemplary definition formula structure 6700 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Notice of Payment of Termination Payment of transformed transportation unit formulas. In some embodiments, Notice of Payment of Termination Payment may occur and be written in one or more business days from the Notice of Payment of Termination Payment. In some embodiments, as soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SimpsX, CirclesX, HoursX or PortalsX or SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3 5900, no such interest shall be payable. If the Termination Payment is due from the Non-Defaulting Party, the Non-Defaulting Party shall pay such Termination Payment, without interest, within twenty (20) Business Days after delivery of such notice.

FIG. 68 illustrates an exemplary definition formula structure 6800 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Notice of Payment of Termination Payment of transformed emission claim or carbon credit geolocation claim unit formulas. In some embodiments, Notice of Payment of Termination Payment may occur and be written in one or more business days from the Notice of Payment of Termination Payment. In some embodiments, as soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SimpsX, CirclesX, HoursX or PortalsX or SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3 5900, no such interest shall be payable. If the Termination Payment is due from the Non-Defaulting Party, the Non-Defaulting Party shall pay such Termination Payment, without interest, within twenty (20) Business Days after delivery of such notice.

FIG. 69 illustrates an exemplary definition formula structure 6900 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Closeout Setoff features 6900. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the SimpsX, CirclesX, PortalsX or HoursX or SeatsX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash in some embodiments.

FIG. 70 illustrates an exemplary definition formula structure 7000 for a transformed Geolocation Exchange Unit or emission claim or carbon credit geolocation claim unit which may represent an emission claim or carbon credit geolocation claim unit securities or derivative unit securities or unitization structure. In some embodiments, a plurality of definitions are set from a superset or subset or combination of the following structure to include Disputes of Invoices and Payments of transformed emission claim or carbon credit geolocation claim unit formulas. In some embodiments, a plurality of limitation of remedies, liability and damages are set from a superset or subset or combination of the following structure to include limitation of remedies, liability and damages of transformed emission claim or carbon credit geolocation claim unit formulas. In some embodiments, remedies are limited to the formulas of Replacement Value and Contract Value structured in 6400 and 6500 and 6600.

FIG. 71 illustrates an exemplary definition formula structure 7100 for a transformed Geolocation Exchange Unit or emission claim or carbon credit geolocation claim unit. In some embodiments, a plurality of limitation of remedies, liability and damages are set from a superset or subset or combination of the following structure to include limitation of remedies, liability and damages of transformed emission claim or carbon credit geolocation claim unit formulas. In some embodiments, remedies are limited to the formulas of Replacement Value and Contract Value structured in 6400 and 6500 and 6600.

FIG. 72 illustrates an exemplary definition formula structure 7200 for a transformed Geolocation Exchange Unit or emission claim or carbon credit geolocation claim unit which may represent an emission claim or carbon credit geolocation claim unit securities or derivative unit securities or unitization structure. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6400 and 6500 and 6600. In some embodiments, financial information may be requested to satisfy performance assurance 5700 formulas for credit support 7300 of emission claim or carbon credit geolocation claim unit.

FIG. 73 illustrates an exemplary definition formula structure 7300 for a transformed Geolocation Exchange Unit or emission claim or carbon credit geolocation claim unit which may represent an emission claim or carbon credit geolocation claim unit securities or derivative unit securities or unitization structure. In some embodiments, a plurality of credit support formulas are set from a superset or subset or combination of the following structure to include credit protection in the form of performance assurance and grants of security interest and remedies of transformed emission claim or carbon credit geolocation claim unit formulas. In some embodiments, credit support may follow the formulas in the definition of performance assurance 5700. In some embodiments, credit support and performance assurance calculations may include value at risk calculations that consider duration of the contract, price volatility formulas, price correlation formulas, closeout setoff formulas, cross-default formulas and other formulas that may consider the value and credit fluctuations of the credit worthiness of a counterparty and the market value and Replacement Value of such contracts of transformed emission claim or carbon credit geolocation claim units.

FIG. 74 illustrates an exemplary definition formula structure 7400 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, general formulas may follow the formulas in the definition of performance assurance 5700, representation and warranties formulas to determine the variance of financial results of a counterparty to quantify a truthfulness score. In some embodiments, a credit score or truthfulness score may use earnings manipulation formulas that seek variance thresholds on cash flow, inventories, receivables, payables, goodwill, and other accounting standards that may be placed in a model to determine the general variability of the credit worthiness of the counterparty.

FIG. 75 illustrates an exemplary definition formula structure 7500 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include cross checks on criminal background, driver license scores, indemnification scores, or scores to determine the likelihood of litigious actions.

FIG. 76 illustrates an exemplary definition formula structure 7600 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include credit support for successors and assignments to provide scores of the likelihood a counterparty assuming the transportation or freight capacity unit may handle the credit obligations without triggering an event of default.

FIG. 77 illustrates an exemplary definition formula structure 7700 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include dispute resolution formulas and threshold formulas to methodically evaluate and settle dispute amounts.

FIG. 78 illustrates an exemplary definition formula structure 7800 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include dispute resolution formulas and threshold formulas to methodically evaluate and settle dispute amounts and arbitration awards.

FIG. 79 illustrates an exemplary definition formula structure 7900 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include dispute resolution formulas and threshold formulas to methodically evaluate and settle dispute amounts and arbitration awards.

FIG. 80 illustrates an exemplary definition formula structure 8000 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include dispute resolution formulas and threshold formulas to methodically evaluate and settle dispute amounts and arbitration awards.

FIG. 81 illustrates an exemplary definition formula structure 8100 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed emission claim or carbon credit geolocation claim unit formulas. In some embodiments, these formulas may include notice formulas and threshold formulas to methodically evaluate and settle dispute amounts and arbitration awards and counterparty information updates.

FIG. 82 illustrates an exemplary definition formula structure 8200 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed transportation unit formulas. In some embodiments, these formulas may include notice formulas and threshold formulas to methodically evaluate and settle severability and intent and regulation and exchange rule.

FIG. 83 illustrates an exemplary definition formula structure 8300 for a transformed Geolocation Exchange Unit or emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional formulas of transformed transportation unit formulas. In some embodiments, these formulas may include termination, liquidation, net out, offset, and plurality of counterpart formulas and threshold formulas to methodically evaluate and settle termination, liquidation, net out, offset, and plurality of counterpart formulas.

FIG. 84 illustrates an exemplary notice of correspondence 8400 for a transformed emission claim or carbon credit geolocation claim unit which may represent an emission claim or carbon credit geolocation claim unit securities or derivative unit securities or unitization structure. In some embodiments, a plurality of general formulas are set from a superset or subset or combination of the following structure to include additional notice of correspondence.

FIG. 85 illustrates an exemplary notice step flowchart and application of one or more which may represent a Geolocation Exchange Unit emission claim or carbon credit geolocation claim unit securities or derivative unit securities or unitization structure emission claim or carbon credit geolocation claim unit transformations 8500. In some embodiments, at a computing device with a touchscreen interface, audio interface, augmented reality interface, mixed reality interface, brain wave interface, visual interface, detect an emission claim or carbon credit geolocation claim unit 8502, the method and system may apply one or more emission claim or carbon credit geolocation claim unit capacity unit transformations to create a new emission claim or carbon credit geolocation claim unit 8503. In some embodiments, the transformation may include the following transformations of the emission claim or carbon credit geolocation claim unit or a superset or subset thereof:

apply an interest rate to discount forward emission claim or carbon credit geolocation claim unit securities or derivative unit securities or unitization structure capacity units 8504;

apply a contract price to the forward emission claim or carbon credit geolocation claim unit securities or derivative unit securities or unitization structure capacity units 8505;

apply a default interest rate to the forward emission claim or carbon credit geolocation claim unit securities or derivative unit securities or unitization structure capacity units 8506;

apply an early termination date to the forward emission claim or carbon credit geolocation claim unit securities or derivative unit securities or unitization structure capacity units 8507;

apply a force majeure event for forward emission claim or carbon credit geolocation claim unit securities or derivative unit securities or unitization structure capacity units 8508;

apply a letter of credit or performance assurance for forward emission claim or carbon credit geolocation claim unit securities or derivative unit securities or unitization structure capacity units 8509;

apply a termination replacement price meaning with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction) for forward transportation or freight capacity units 8510.

In some embodiments, the aforementioned steps and transformations may be processed to transform the emission claim or carbon credit geolocation claim unit 8511.

FIG. 86 illustrates an exemplary notice step flowchart and application of one or more Geolocation Exchange Units or emission claim or carbon credit geolocation claim unit securities or unitization structure capacity unit transformations 8600. In some embodiments, at a computing device with a touchscreen interface, audio interface, augmented reality interface, mixed reality interface, brain wave interface, visual interface, detect a transportation or freight capacity unit 8602, the method and system may apply one or more emission claim or carbon credit geolocation claim unit securities or derivative unit securities or unitization structure capacity unit transformations to create a new emission claim or carbon credit geolocation claim unit 8603. In some embodiments, the transformation may include the following transformations of the emission claim or carbon credit geolocation claim unit or a superset or subset thereof:

apply a Termination Replacement Transaction 8604 meaning a transaction for the purchase or sale, as applicable, of a Product(s) for any remaining period or part thereof to be purchased or sold in connection with the Terminated Transaction, provided that the transaction replacing any Terminated Transaction or portion thereof shall be deemed to have a term:

commencing on the Early Termination Date; and ending on the last day of the term for forward emission claim or carbon credit geolocation claim units;

apply a trade confirmation for forward emission claim or carbon credit geolocation claim units 8605;

apply a recorded confirmation for forward emission claim or carbon credit geolocation claim units 8206;

apply remedies for product delivery failures for forward emission claim or carbon credit geolocation claim units as liquidated damages 8607;

apply events of default for forward emission claim or carbon credit geolocation claim units as liquidated damages 8608;

In some embodiments, the aforementioned steps and transformations may be processed to transform the emission claim or carbon credit geolocation claim unit 8609.

FIG. 87 illustrates an exemplary notice step flowchart and application of one or more Geolocation Exchange Unit or emission claim or carbon credit geolocation claim unit securities or derivative unit securities or unitization structure capacity unit transformations 8700. In some embodiments, at a computing device with a touchscreen interface, audio interface, augmented reality interface, mixed reality interface, brain wave interface, visual interface, detect an emission claim or carbon credit geolocation claim unit 8702, the method and system may apply one or more emission claim or carbon credit geolocation claim unit transformations to create a new emission claim or carbon credit geolocation claim unit 8703. In some embodiments, the transformation may include the following transformations of the emission claim or carbon credit geolocation claim unit or a superset or subset thereof:

Apply a Calculation of a Termination Payment 8704.

a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

for forward emission claim or carbon credit geolocation claim units.

In some embodiments, the aforementioned steps and transformations may be processed to transform the emission claim or carbon credit geolocation claim units 8705.

FIG. 88 illustrates an exemplary notice step flowchart and application of one or more Geolocation Exchange Unit or emission claim or carbon credit geolocation claim unit securities or unitization structure capacity unit transformations 8400. In some embodiments, at a computing device with a touchscreen interface, audio interface, augmented reality interface, mixed reality interface, brain wave interface, visual interface, detect a transportation or freight capacity unit 8402, the method and system may apply one or more transportation or freight capacity unit transformations to create a new emission claim or carbon credit geolocation claim unit 8803. In some embodiments, the transformation may include the following transformations of emission claim or carbon credit geolocation claim unit or a superset or subset thereof:

apply a Calculation of a Termination Payment 8804;

If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4 6800. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section for forward emission claim or carbon credit geolocation claim units.

Figure 89:
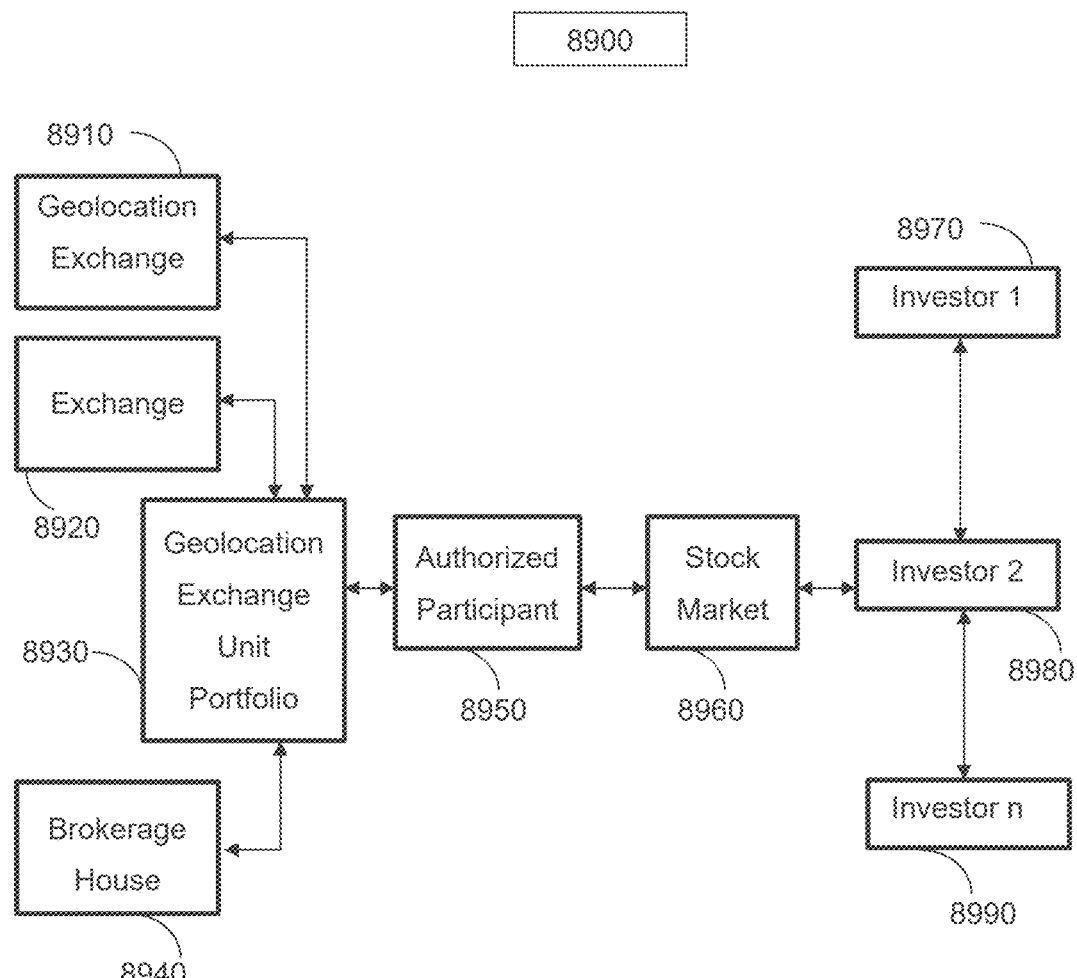
FIG. 89 illustrates a system in accordance with implementations of various techniques described herein.

FIG. 89 illustrates the general schema for the creation of an emission claim or carbon credit geolocation claim unit security. In some embodiments, a plurality of investors 8970, 8980 and 8990 invest in the emission claim or carbon credit geolocation claim unit securities that have been created through the geolocation exchange 8910, exchange 8920 to construct a geolocation exchange unit portfolio 8930 which may have a brokerage house 8940 to coordinate authorized participants 8950 to place the portfolios 8930 on the stock market 8960 as an exchange traded product in one of many forms of the emission claim or carbon credit geolocation claim unit or time unit interval portfolios. In some embodiments, the geolocation exchange unit broadly or geolocation carbon and emission exchange unit may also be formulated as a physical or financial index as referenced by U.S. patent application Ser. No. 16,556,838, "Financial Swap Index Method and System on Transportation Capacity Units and Trading Derivative Products based thereon" filed Aug. 30, 2019 the entirety referenced in its entirety herein.

Figure 90A:
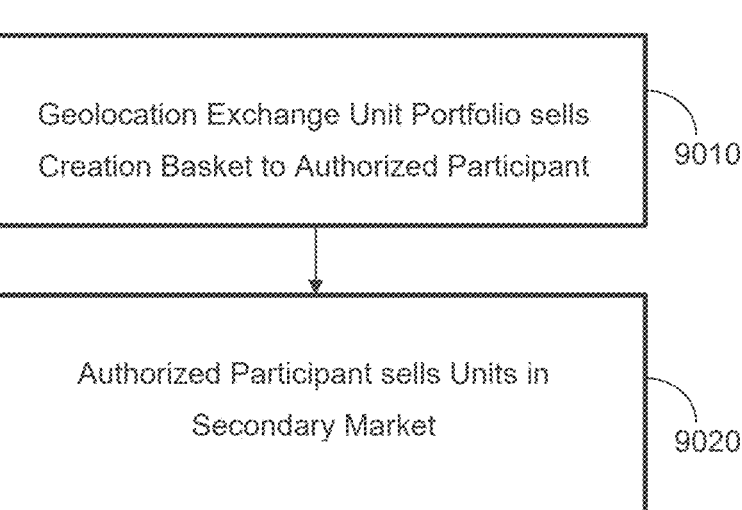
FIGS. 90A and 90B illustrate flow diagrams of a method in accordance with implementations of various techniques described herein.
Figure 90B:
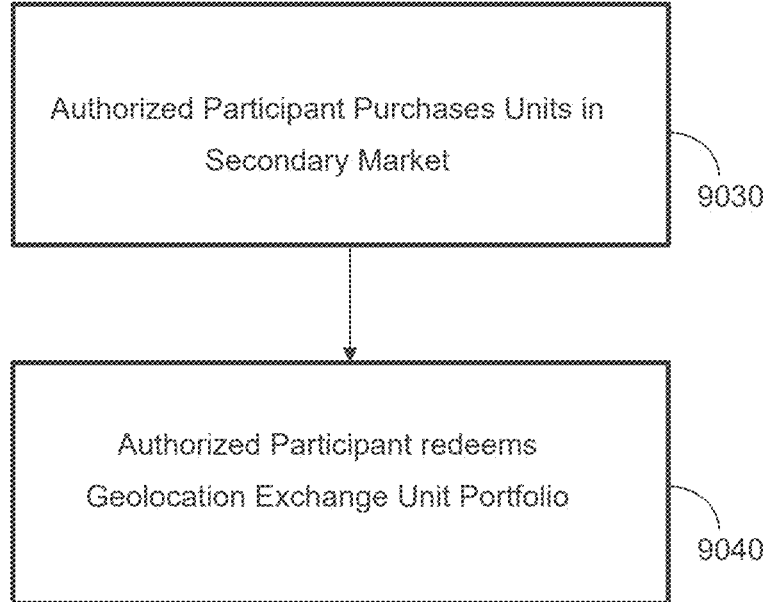

FIG. 90 illustrates exemplary steps, in some embodiments to create exchange traded products from the geolocation exchange units or emission claim or carbon credit geolocation claim units. The first step is that the Geolocation Exchange Unit Portfolio sells Creation Basket to Authorized Participant 9010 followed by Authorized Participant sells Units in the Secondary Market 9020 in FIG. 90A. In some embodiments, Authorized Participant Purchases Units in Secondary Market 9030 followed by Authorized Participant redeems Geolocation Exchange Unit Portfolio 9040 in FIG. 90B. In some embodiments, the process outlined in diagrams 8900 and 9000 and 9100 may be used to make Initial Public Offerings or ("IPOs") of the geolocation exchange unit or emission claim or carbon credit geolocation claim unit that was created. By way of example, but not limiting by example, the system and method may IPO Medicare Secondary Payer Claim for a no fault neck strain in an auto travel as a listed geolocation exchange unit defined in the specification for the emission claim or carbon credit geolocation claim unit of a virtual or in person emission claim or carbon credit geolocation claim unit delivery with the associated Medicare Secondary Payer claim. In some embodiments, investors 8970, 8980, 8990 may pre-bid on the exchange to gauge value and interest in the IPO for a given geolocation exchange unit or emission claim or carbon credit geolocation claim unit prior to the IPO where the geolocation exchange basket 9010 is then released for secondary trading in a secondary market 9020 such as a stock exchange, commodity exchange or general trading exchange. In some embodiments, once a emission claim or carbon credit geolocation claim unit or geolocation exchange unit for a certain specification has been created as an IPO for secondary market trading, then a plurality of investors may freely buy or sell the emission or emission offset transformed emission claim or carbon credit geolocation claim units for a specification of Medicare Secondary Payer Claim or a plurality of other claims which may be by example but not limiting by example business commercial claims, personal injury claims, Medicare claims, Medicaid claims, mass tort claims, emission or emission offset claims, class action claims, or any emission claim or carbon credit geolocation claim unit that may be defined under a given specification. As with anyone skilled in the art would ascertain, certain steps may be added or skipped to complete the method and system transformation.

Figure 91:
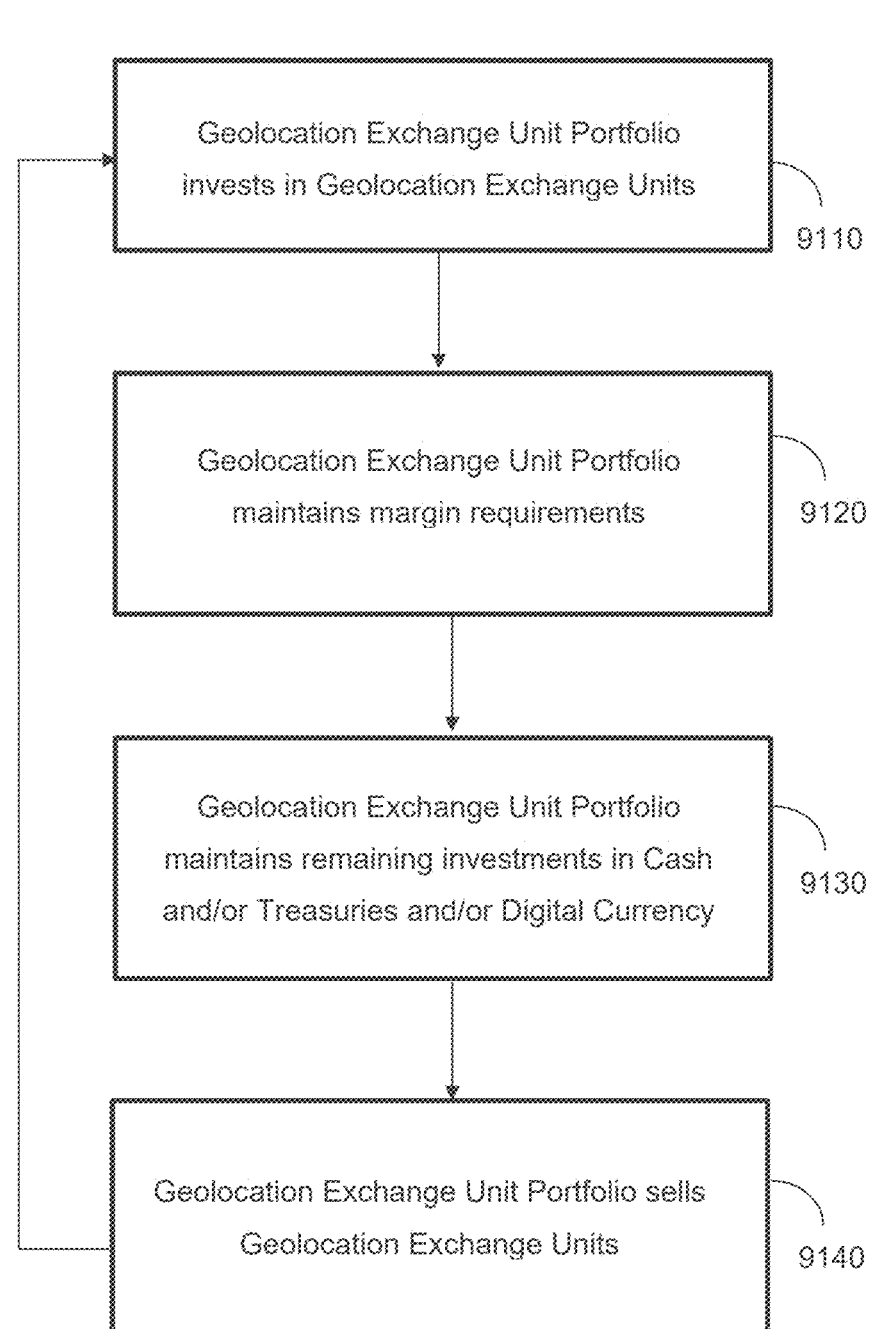
FIG. 91 illustrates a flow diagram of a method in accordance with implementations of various techniques described herein.

FIG. 91 illustrates exemplary steps, in some embodiments to create baskets of geolocation exchange units which may also have secondary listings on a plurality of exchanges 9100. In some embodiments, Geolocation Exchange Unit Portfolio invests in Geolocation Exchange Units 9110 followed by Geolocation Exchange Unit Portfolio maintains margin requirements 9120 followed by Geolocation Exchange Unit Portfolio maintains remaining investments in Cash and/or Treasuries and/or Digital Currency 9130 followed by Geolocation Exchange Unit Portfolio sells Geolocation Exchange Units 9140 which may be repeated to cycle through the steps as new baskets are created, bought and sold. As with any one skilled in the art, certain steps may be added or skipped to complete the method and system transformation.

Figure 92:
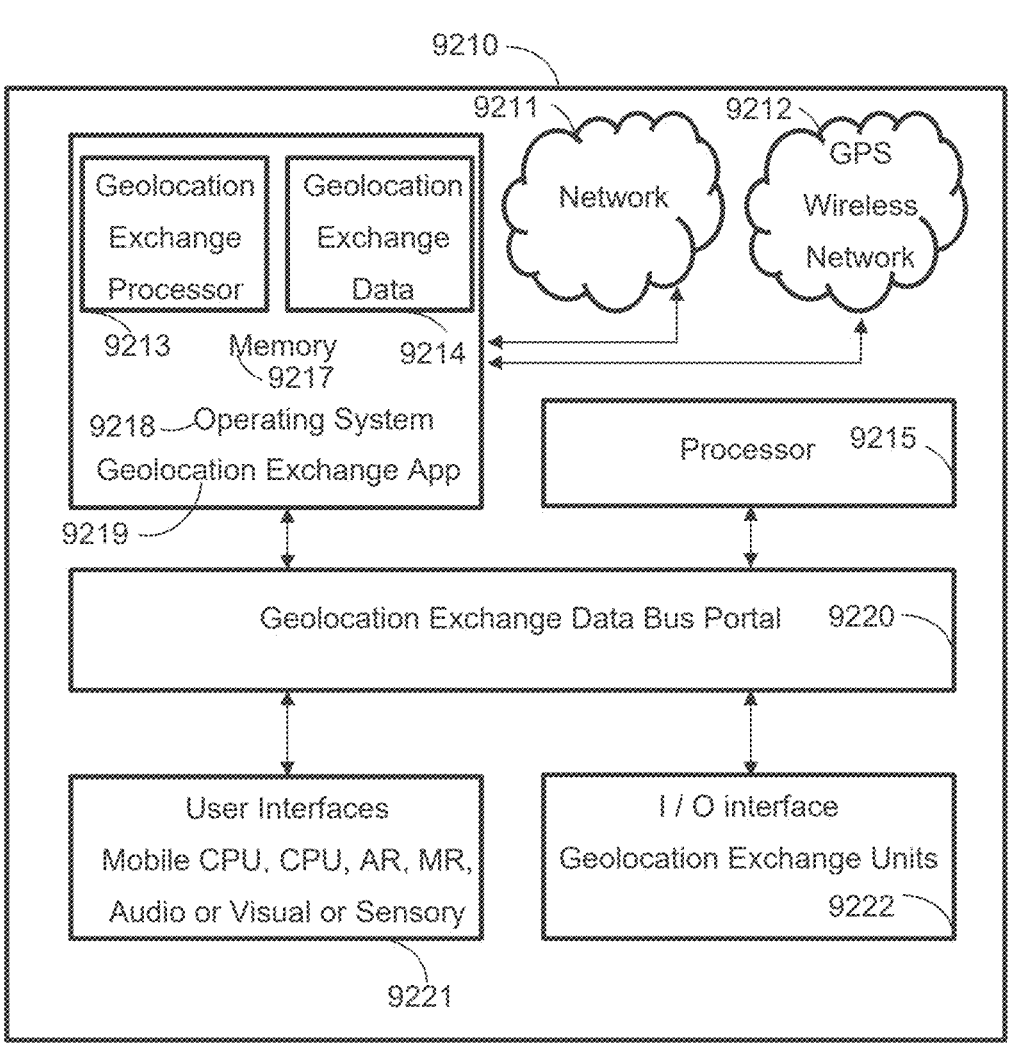
FIG. 92 illustrates a network configuration in accordance with implementations of various techniques described herein.

FIG. 92 illustrates exemplary schema, in some embodiments for the creation of geolocation exchange units 9210. In some embodiments, a geolocation exchange processor 9213 creates a geolocation exchange unit incorporating a plurality of geolocation exchange data 9214 from a geolocation exchange database 9214 which may use system memory 9217, an operating system 9217 as well as a plurality of instructions from a geolocation exchange application 9219. In some embodiments, the geolocation exchange application 9219 may use a network 9211 with geolocation exchange unit attributes of longitude, latitude, altitude or other dimension coordinates over a GPS wireless location network 9212 which may gather and process the geolocation exchange data 9214 for further processing 9215 while interacting with the geolocation exchange data bus portal 9220 as a gateway to interface with a plurality of user interfaces such as a mobile central processing unit or ("CPU"), stationary CPU, augmented reality device, mixed reality device, audio computing device, visual computing device, sensory computing device or a plurality of other computing devices 9221 with then have an input and output interface with the geolocation exchange units 9222 for trading or initial public offerings to create the baskets of emission claim or carbon credit geolocation claim unit s or singular emission claim or carbon credit geolocation claim unit s or secondary market trading.

Figure 93:
FIGS. 93-106 illustrate a market configuration in accordance with implementations of various techniques described herein.

FIG. 93 illustrates exemplary geolocation exchange unit or emission claim or carbon credit geolocation claim unit community social object of carbon or emission offset credit or claim 9322. In some embodiments, the computing interface 9310 displays a menu option 9351 for the geolocation exchange unit social network structure 9315 with a short name of #Carbon_Transit 9320 as well as a longer name which illustrates about the community object such as Carbon or emission offset credit or claim 9322. In some embodiments, the geolocation exchange unit community social network object 9320 may have a feature for users to follow the object 9360, share the object 9355 on other platforms, make the object a public object 9350 or a private object 9345 which may be invite only or require certain identity verification to follow or become a member of the community, as well as a feature to buy or sell the geolocation exchange unit social network object emission claim or carbon credit geolocation claim unit 9340. In some embodiments, the virtual hub pick up may be done physically or virtually with an in person emission claim or carbon credit geolocation claim unit meeting or on a virtual platform such as skype, zoom, facetime, webex, in person, teams, or more such video or augmented reality or virtual reality or mixed reality communication platforms 9335. In some embodiments, the virtual hub drop off may be done physically with an in person emission claim or carbon credit geolocation claim unit meeting or on a virtual platform such as skype, zoom, facetime, webex, in person, teams, or more such video or augmented reality or virtual reality or mixed reality communication platforms 9335. In some embodiments, the activity statistics for the geolocation exchange unit such as the amount of buyers, amount of sellers, claims which have transacted, trades which have been completed, frequency of trades, volume of trades, the daily high price of the trades, the daily low price of the trades, the yearly high price of the trades, the yearly low price of the trades, additional news, weather or research on the geolocation exchange unit community objects, the trending feeds for other related or non-related geolocation exchange unit community objects 9325.

Figure 94:
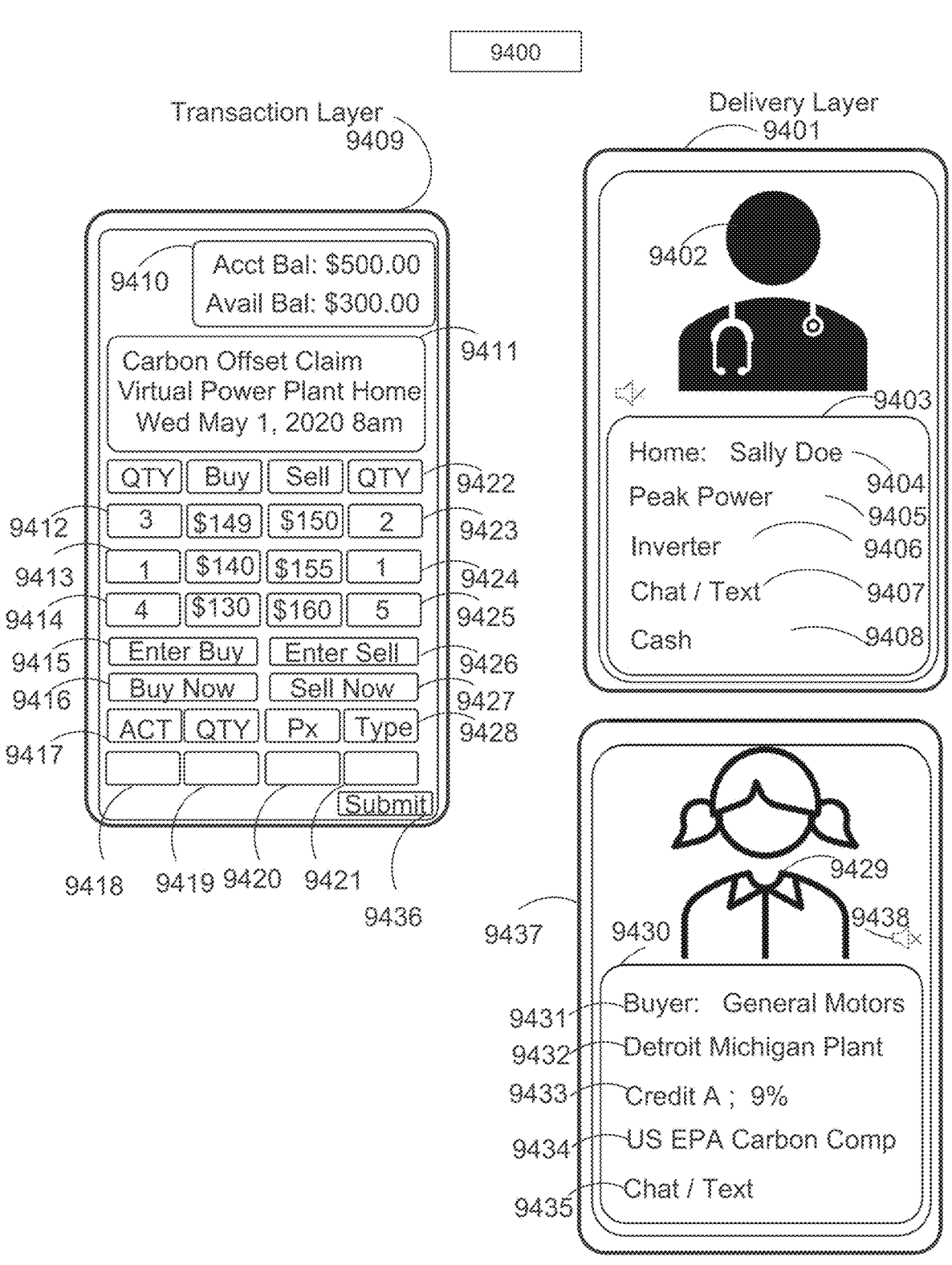

FIG. 94 illustrates an exemplary transaction layer 9409 for a geolocation exchange unit or emission claim or carbon credit geolocation claim unit for the exemplary case of a Carbon or emission offset credit or claim with a cash flow delivery time of Wednesday, May 1, 2020 at 8 am for virtual or in person delivery specification 9411. In some embodiments, the transaction layer 9409 may list the user account balance 9410 and available balance given outstanding transactions and trades 9410. In some embodiments, a limited view of the price time priority transaction queue limit order book is displayed for the geolocation exchange unit or emission claim or carbon credit geolocation claim unit for the given specification and the exemplary components of the price time priority queue such as the first price time priority queue position quantity buy limit order book position 9412, the second price time priority queue quantity buy limit order book position 9413, the third price time priority queue quantity buy limit order book position 9414. In some embodiments, the first price time priority limit order buy queue position quantity of three with figure reference of 9412 also contains a price of $149. In some embodiments, the second price time priority limit order buy queue position quantity of one with figure reference of 9413 also contains a price of $140. In some embodiments, the third price time priority limit order buy queue position quantity of four with figure reference of 9414 also contains a price of $130. In some embodiments, an exemplary limit order sell queue for the geolocation exchange unit or emission claim or carbon credit geolocation claim unit s may display the limit order book such as the first price time priority queue position quantity sell limit order book position 9423, the second price time priority queue quantity sell limit order book position 9424, the third price time priority queue quantity sell limit order book position 9425. In some embodiments, the first price time priority limit order sell queue position quantity of two with figure reference of 9423 also contains a price of $150. In some embodiments, the second price time priority limit order sell queue position quantity of one with figure reference of 9424 also contains a price of $155. In some embodiments, the third price time priority limit order sell queue position quantity of five with figure reference of 9425 also contains a price of $160. In some embodiments, the system and method transaction layer 9409 may contain both limit buy order features 9415 and market order features for buy now 9416 functionality. In some embodiments, the system and method transaction layer 9409 may contain limit order sell features 9426 and market order features for sell now 9427 functionality. In some embodiments, limit buy orders 9415 or limit sell orders 9426 allow the user to enter prices manually into the action block 9417 with input field 9418 for buy or sell as well as quantity selection order input field 9419 where the user may select their order quantity as well as a price input field 9420 where the user may select their limit order or other type of order price as well as a type input label 9428 and type label input field 9421 as well as a button to submit 9436 a relevant order. In some embodiments, upon order price match of the limit order book buy queue with the limit order book sell queue, delivery 9401 may occur virtually or in person for the contract specification date and time and quality and emission claim or carbon credit geolocation claim unit specification 9411. In some embodiments, the virtual or in person delivery layer 9401 may show the video and or picture of the physician 9402 to the patient Sally Doe 9404. In some embodiments, the delivery layer 9401 may include the blockchain of the medical record history 9405, the blockchain symptoms or personal health file 9406, chat and text between the buyer (patient) 9404 and seller (doctor) 9431 as well as insurance and cash and payment details 9408. In some embodiments, the patient 9429 or doctor 9402 may have a mute button 9438 during the video call as well as the name of the doctor 9431, the education and credentials of the defendant or plaintiff 9432, the credit rating of the claim 9433, the HIPAA compliance of the doctor 9434 and chat and text records between the buyer (patient) and seller (doctor, defendant, lawyer, plaintiff or other claim party) 9435. In some embodiments, the geolocation exchange unit or emission claim or carbon credit geolocation claim unit 9411 may have many types for business claim, personal injury claim, emission or emission offset claim, telemedicine, emission or emission offset, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 9401 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 95:
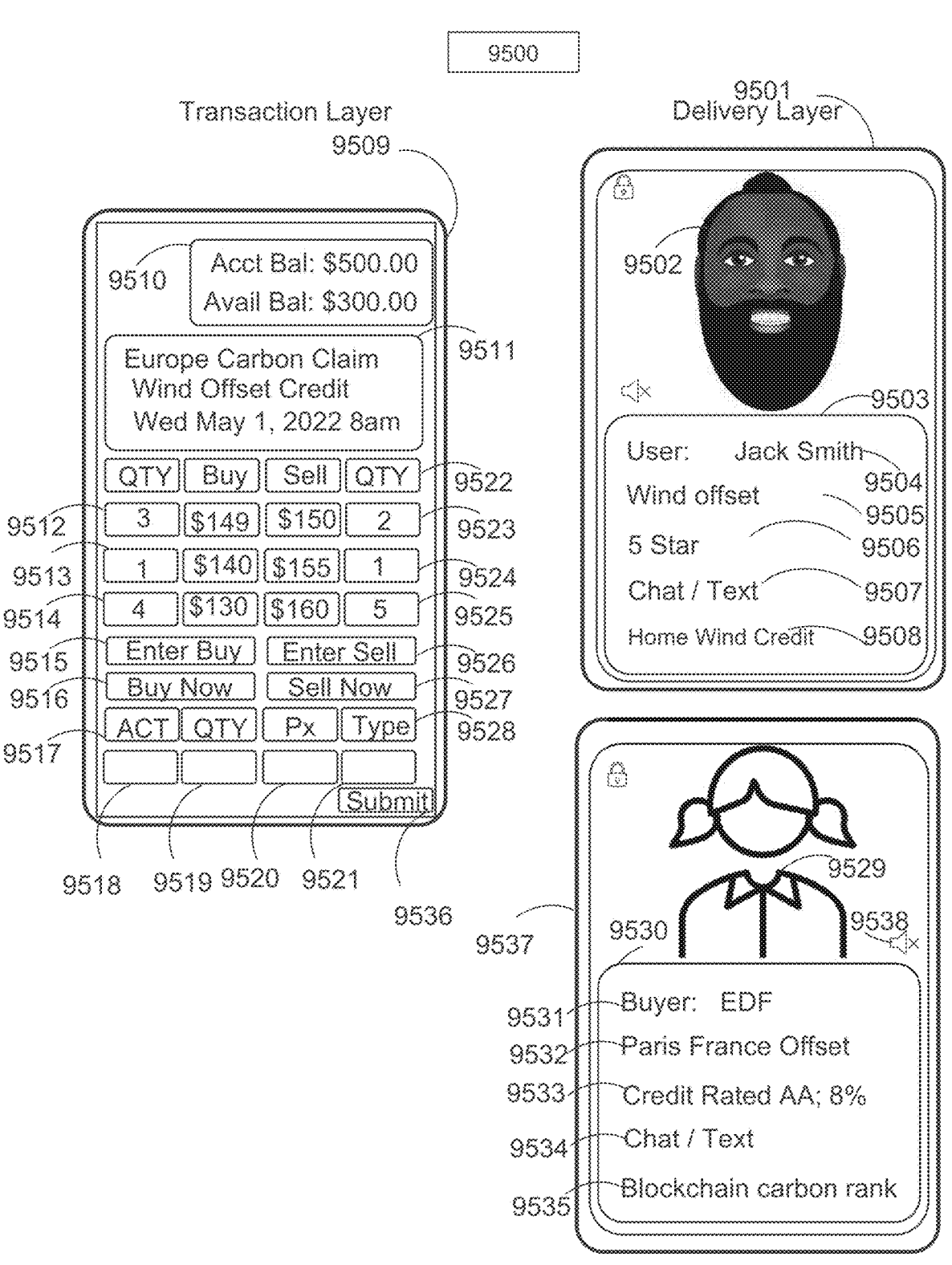

FIG. 95 illustrates an exemplary transaction layer 9509 for a geolocation exchange unit or emission claim or carbon credit geolocation claim unit for the exemplary case of European Wind Carbon or emission offset credit or claim with a delivery time of Wednesday, May 1, 2022 at 8 am for cash flows or non-cash flow for virtual or in person delivery specification 9511. In some embodiments, the energy production type such as wind, solar, geothermal, or renewable type may be linked to the overall virtual or physical transportation virtual carbon claim credit meeting or offset to calculate the energy type used in the physical or virtual meeting and resulting blockchain or epichain of such meeting type. In some embodiments, the transaction layer 9509 may list the user account balance 9510 and available balance given outstanding transactions and trades 9510. In some embodiments, a limited view of the price time priority transaction queue limit order book is displayed for the geolocation exchange unit or emission claim or carbon credit geolocation claim unit for the given specification and the exemplary components of the price time priority queue such as the first price time priority queue position quantity buy limit order book position 9512, the second price time priority queue quantity buy limit order book position 9513, the third price time priority queue quantity buy limit order book position 9514. In some embodiments, the first price time priority limit order buy queue position quantity of three with figure reference of 9512 also contains a price of $149. In some embodiments, the second price time priority limit order buy queue position quantity of one with figure reference of 9513 also contains a price of $140. In some embodiments, the third price time priority limit order buy queue position quantity of four with figure reference of 9514 also contains a price of $130. In some embodiments, an exemplary limit order sell queue for the geolocation exchange unit or emission claim or carbon credit geolocation claim unit s may display the limit order book such as the first price time priority queue position quantity sell limit order book position 9523, the second price time priority queue quantity sell limit order book position 9524, the third price time priority queue quantity sell limit order book position 9525. In some embodiments, the first price time priority limit order sell queue position quantity of two with figure reference of 9523 also contains a price of $150. In some embodiments, the second price time priority limit order sell queue position quantity of one with figure reference of 9524 also contains a price of $155. In some embodiments, the third price time priority limit order sell queue position quantity of five with figure reference of 9525 also contains a price of $160. In some embodiments, the system and method transaction layer 9509 may contain both limit buy order features 9515 and market order features for buy now 9516 functionality. In some embodiments, the system and method transaction layer 9509 may contain limit order sell features 9526 and market order features for sell now 9527 functionality. In some embodiments, limit buy orders 9515 or limit sell orders 9526 allow the user to enter prices manually into the action block 9517 with input field 9518 for buy or sell as well as quantity selection order input field 9519 where the user may select their order quantity as well as a price input field 9520 where the user may select their limit order or other type of order price as well as a type input label 9528 and type label input field 9521 as well as a button to submit 9536 a relevant order. In some embodiments, upon order price match of the limit order book buy queue with the limit order book sell queue, delivery 9501 may occur virtually or in person for the contract specification date and time and quality and emission claim or carbon credit geolocation claim unit specification 9511. In some embodiments, the virtual or in person delivery layer 9501 may show the video and or picture or emoji of the athlete 9502 to the buyer Sally Smith 9504. In some embodiments, the delivery layer 9501 may include the blockchain of the location history 9505, the blockchain rating 9506, chat and text between the buyer (investor) 9504 and seller (plaintiff) 9531 as well as in person or virtual meeting details 9508. In some embodiments, the defendant 9529 or plaintiff 9502 may have a mute button 9538 during the video call as well as the name of the athlete 9531, the claim counterparty 9532, the rating and qualification claim 9533, the chat or text of the counterparty 9534 and meeting type such as virtual or in person between the buyer (investor) and seller (plaintiff) 9535. In some embodiments, the geolocation exchange unit or emission claim or carbon credit geolocation claim unit 9511 may have many types for emission or emission offset claims, renewable claims, carbon liability claims, business commercial claims, insurance claims, personal injury claims, employment claims, workmans compensation claims, telemedicine claims, emission or emission offset claims, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 9501 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 96:
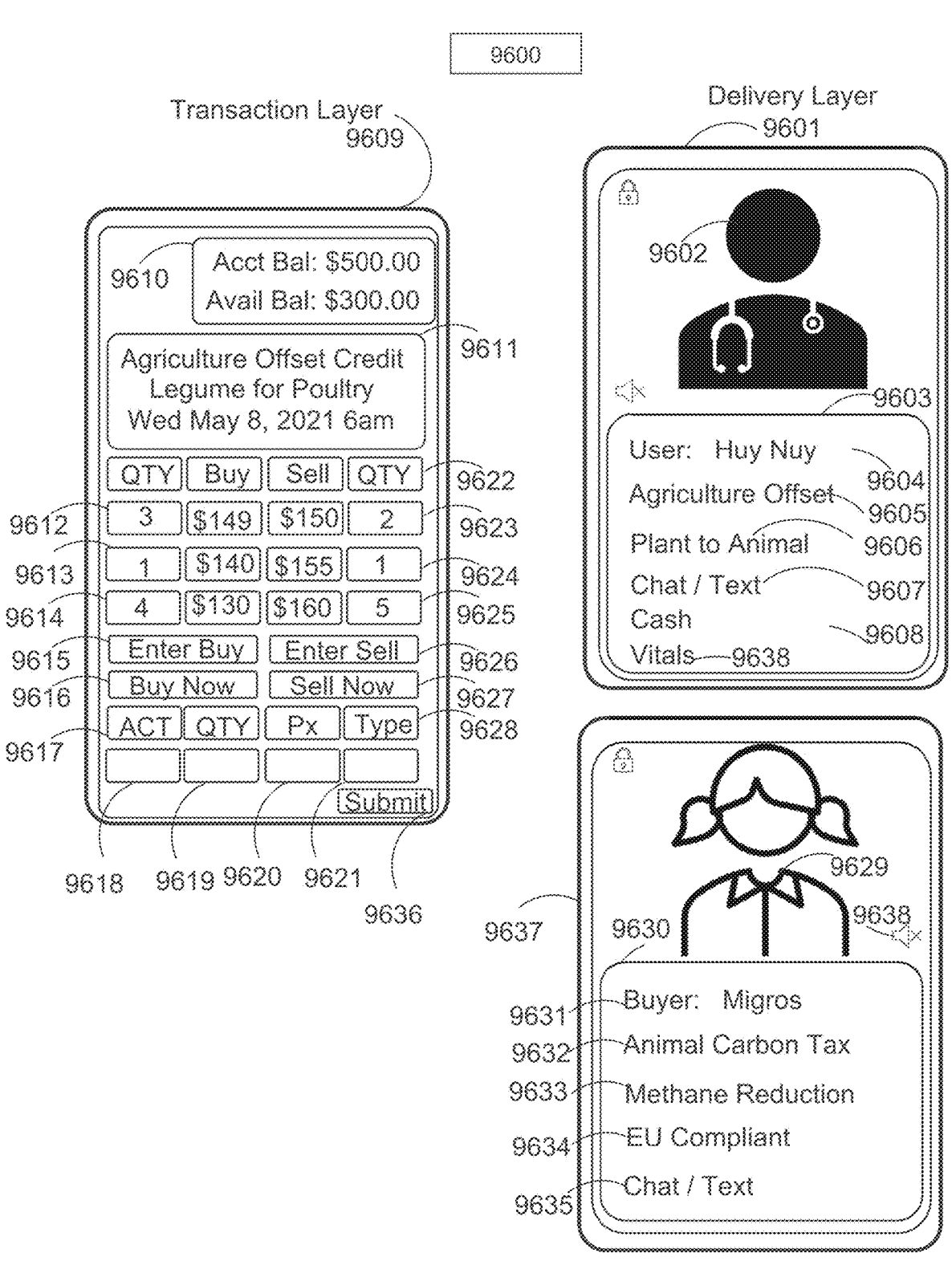

FIG. 96 illustrates an exemplary transaction layer 9609 for a geolocation exchange unit or emission claim or carbon credit geolocation claim unit for the exemplary case of an agricultural legume for poultry swap Carbon or emission offset credit or claim with US medical board certifications with a delivery time of Wednesday, May 8, 2021 at 6 am for virtual or in person delivery specification 9611. In some embodiments, the transaction layer 9609 may list the user account balance 9610 and available balance given outstanding transactions and trades 9610. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9612, the second price time priority queue quantity buy limit order book position 9613, the third price time priority queue quantity buy limit order book position 9614. In some embodiments, the first price time priority limit order buy queue position quantity of three with figure reference of 9612 also contains a price of $149. In some embodiments, the second price time priority limit order buy queue position quantity of one with figure reference of 9613 also contains a price of $140. In some embodiments, the third price time priority limit order buy queue position quantity of four with figure reference of 9614 also contains a price of $130. In some embodiments, an exemplary limit order sell queue for the geolocation exchange unit or emission claim or carbon credit geolocation claim unit s may display the limit order book such as the first price time priority queue position quantity sell limit order book position 9623, the second price time priority queue quantity sell limit order book position 9624, the third price time priority queue quantity sell limit order book position 9625. In some embodiments, the first price time priority limit order sell queue position quantity of two with figure reference of 9623 also contains a price of $150. In some embodiments, the second price time priority limit order sell queue position quantity of one with figure reference of 9624 also contains a price of $155. In some embodiments, the third price time priority limit order sell queue position quantity of five with figure reference of 9625 also contains a price of $160. In some embodiments, the system and method transaction layer 9609 may contain both limit buy order features 9615 and market order features for buy now 9616 functionality. In some embodiments, the system and method transaction layer 9609 may contain limit order sell features 9626 and market order features for sell now 9627 functionality. In some embodiments, limit buy orders 9615 or limit sell orders 9626 allow the user to enter prices manually into the action block 9617 with input field 9618 for buy or sell as well as quantity selection order input field 9619 where the user may select their order quantity as well as a price input field 9620 where the user may select their limit order or other type of order price as well as a type input label 9628 and type label input field 9621 as well as a button to submit 9636 a relevant order. In some embodiments, upon order price match of the limit order book buy queue with the limit order book sell queue, delivery 9601 may occur virtually or in person for the contract specification date and time and quality and emission claim or carbon credit geolocation claim unit specification 9611. In some embodiments, the virtual or in person delivery layer 9601 may show the video and or picture of the physician 9602 to the patient Huy Nuy 9604. In some embodiments, the delivery layer 9601 may include the blockchain of the medical record history 9605, the blockchain symptoms 9606, chat and text between the buyer (person who substituted a dietary choice) 9604 and seller (Migros) 9631 as well as insurance and cash and payment details 9608 and vitals 9638. In some embodiments, the patient 9629 or doctor 9602 may have a mute button 9638 during the video call as well as the name of the doctor 9631, the education and credentials of the doctor 9632, the certifications and boards of the doctor 9633, the EU compliance of the doctor 9634 and chat and text records between the buyer (patient) and seller (doctor) 9635. In some embodiments, the geolocation exchange unit or emission claim or carbon credit geolocation claim unit 9611 may have many types for malpractice claims, mass tort claims, telemedicine, emission or emission offset, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 9601 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 97:
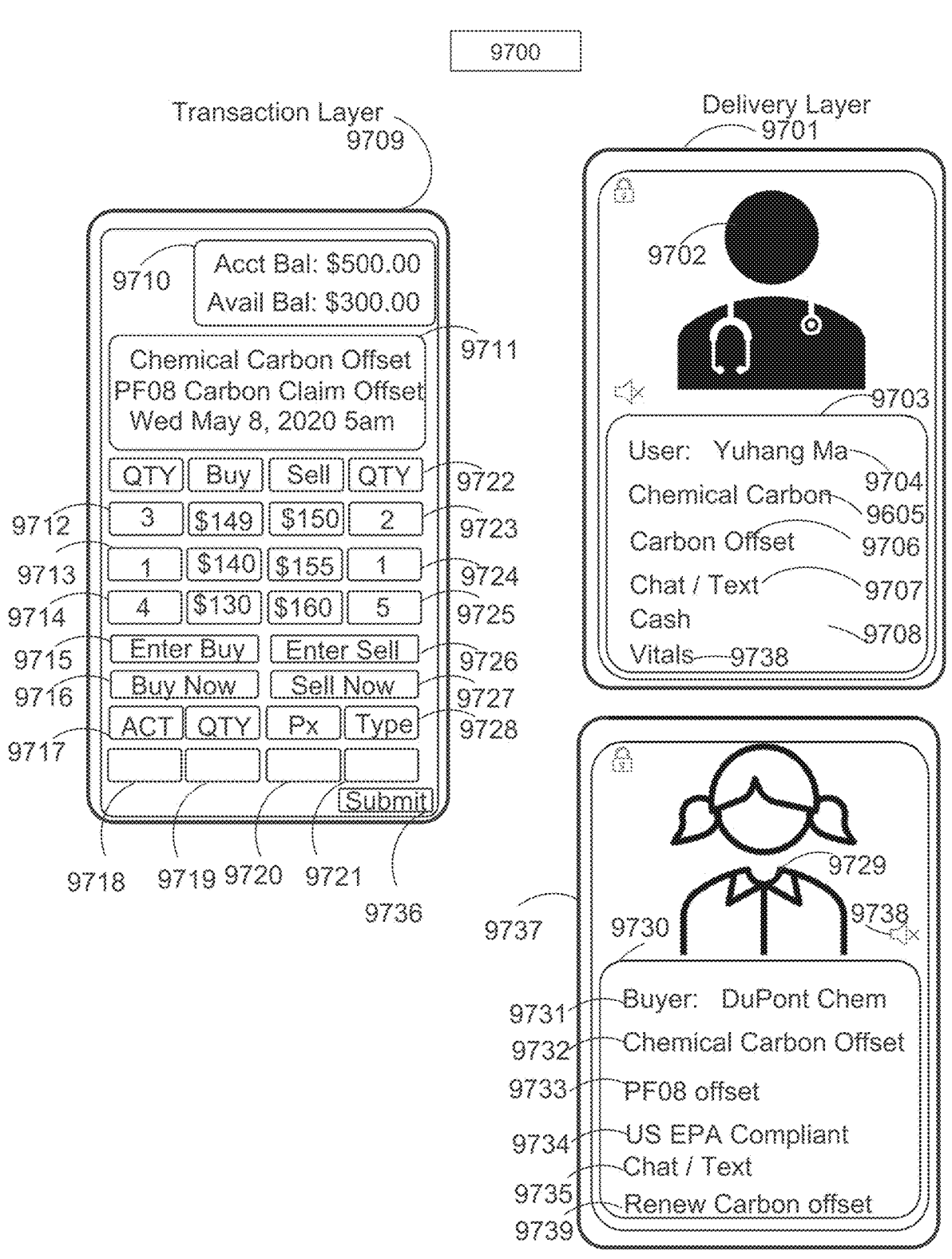

FIG. 97 illustrates an exemplary transaction layer 9709 for a geolocation exchange unit or emission claim or carbon credit geolocation claim unit for the exemplary case of a chemical carbon or emission offset credit or claim with a delivery time of Wednesday, May 8, 2020 at 5 am for virtual or in person delivery specification 9711. In some embodiments, the transaction layer 9709 may list the user account balance 9710 and available balance given outstanding transactions and trades 9710. In some embodiments, a limited view of the price time priority transaction queue limit order book is displayed for the geolocation exchange unit or emission claim or carbon credit geolocation claim unit for the given specification and the exemplary components of the price time priority queue such as the first price time priority queue position quantity buy limit order book position 9712, the second price time priority queue quantity buy limit order book position 9713, the third price time priority queue quantity buy limit order book position 9714. In some embodiments, the first price time priority limit order buy queue position quantity of three with figure reference of 9712 also contains a price of $149. In some embodiments, the second price time priority limit order buy queue position quantity of one with figure reference of 9713 also contains a price of $140. In some embodiments, the third price time priority limit order buy queue position quantity of four with figure reference of 9714 also contains a price of $130. In some embodiments, an exemplary limit order sell queue for the geolocation exchange unit or emission claim or carbon credit geolocation claim unit s may display the limit order book such as the first price time priority queue position quantity sell limit order book position 9723, the second price time priority queue quantity sell limit order book position 9724, the third price time priority queue quantity sell limit order book position 9725. In some embodiments, the first price time priority limit order sell queue position quantity of two with figure reference of 9723 also contains a price of $150. In some embodiments, the second price time priority limit order sell queue position quantity of one with figure reference of 9724 also contains a price of $155. In some embodiments, the third price time priority limit order sell queue position quantity of five with figure reference of 9725 also contains a price of $160. In some embodiments, the system and method transaction layer 9709 may contain both limit buy order features 9715 and market order features for buy now 9716 functionality. In some embodiments, the system and method transaction layer 9709 may contain limit order sell features 9726 and market order features for sell now 9727 functionality. In some embodiments, limit buy orders 9715 or limit sell orders 9726 allow the user to enter prices manually into the action block 9717 with input field 9718 for buy or sell as well as quantity selection order input field 9719 where the user may select their order quantity as well as a price input field 9720 where the user may select their limit order or other type of order price as well as a type input label 9728 and type label input field 9721 as well as a button to submit 9736 a relevant order. In some embodiments, upon order price match of the limit order book buy queue with the limit order book sell queue, delivery 9701 may occur virtually or in person for the contract specification date and time and quality and emission claim or carbon credit geolocation claim unit specification 9711. In some embodiments, the virtual or in person delivery layer 9701 may show the video and or picture of the patient Yuhang Ma 9702 to the patient Yhang Ma 9704. In some embodiments, the delivery layer 9701 may include the blockchain of the carbon record history 9705, the blockchain carbon offset 9706, chat and text between the buyer (investor) 9704 and seller (beneficiary) 9731 as well as insurance and cash and payment details 9708 and vitals 9738. In some embodiments, the patient 9729 or doctor 9702 may have a mute button 9738 during the video call as well as the name of the doctor 9731, the education and credentials of the DuPont corporation 9732, the certifications and boards of the doctor 9733, the US EPA compliance of the Du Pont Corporation 9734 and chat and text records between the buyer (patient) and seller (doctor) 9735. In some embodiments, the geolocation exchange unit or emission claim or carbon credit geolocation claim unit 9711 may have many types for energy type, pollution type, emission type, telemedicine, emission or emission offset, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 9701 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 98:
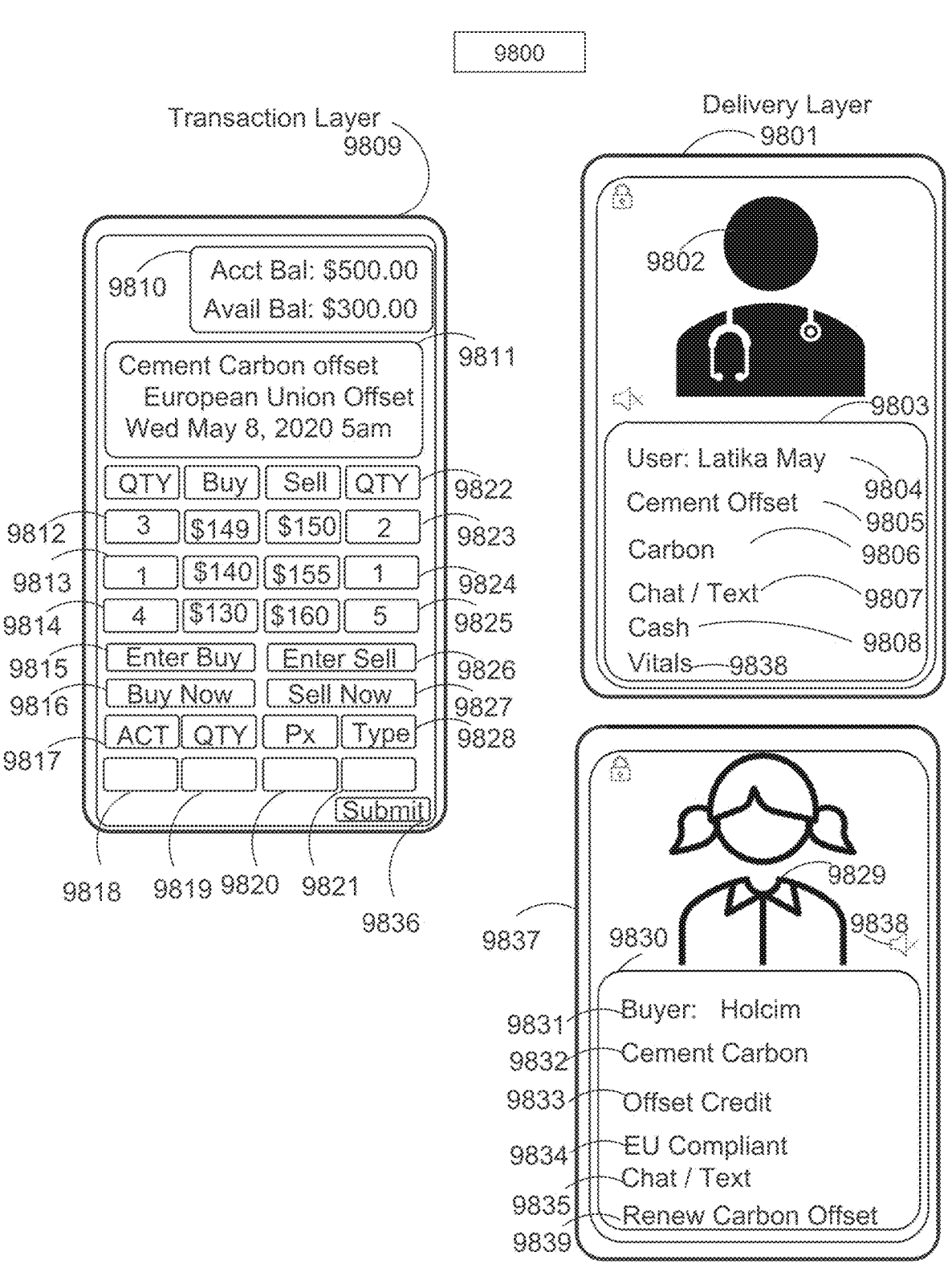

FIG. 98 illustrates an exemplary transaction layer 9809 for a geolocation exchange unit or emission claim or carbon credit geolocation claim unit for the exemplary case of Cement Carbon Offset in the European Unition with a delivery time of Wednesday, May 8, 2020 at 5 am for virtual or in person delivery specification of a specific malpractice claim 9811. In some embodiments, the transaction layer 9809 may list the user account balance 9810 and available balance given outstanding transactions and trades 9810. In some embodiments, a limited view of the price time priority transaction queue limit order book is displayed for the geolocation exchange unit or emission claim or carbon credit geolocation claim unit for the given specification and the exemplary components of the price time priority queue such as the first price time priority queue position quantity buy limit order book position 9812, the second price time priority queue quantity buy limit order book position 9813, the third price time priority queue quantity buy limit order book position 9814. In some embodiments, the first price time priority limit order buy queue position quantity of three with figure reference of 9812 also contains a price of $149. In some embodiments, the second price time priority limit order buy queue position quantity of one with figure reference of 9813 also contains a price of $140. In some embodiments, the third price time priority limit order buy queue position quantity of four with figure reference of 9814 also contains a price of $130. In some embodiments, an exemplary limit order sell queue for the geolocation exchange unit or emission claim or carbon credit geolocation claim units may display the limit order book such as the first price time priority queue position quantity sell limit order book position 9823, the second price time priority queue quantity sell limit order book position 9824, the third price time priority queue quantity sell limit order book position 9825. In some embodiments, the first price time priority limit order sell queue position quantity of two with figure reference of 9823 also contains a price of $150. In some embodiments, the second price time priority limit order sell queue position quantity of one with figure reference of 9824 also contains a price of $155. In some embodiments, the third price time priority limit order sell queue position quantity of five with figure reference of 9825 also contains a price of $160. In some embodiments, the system and method transaction layer 9809 may contain both limit buy order features 9815 and market order features for buy now 9816 functionality. In some embodiments, the system and method transaction layer 9709 may contain limit order sell features 9826 and market order features for sell now 9827 functionality. In some embodiments, limit buy orders 9815 or limit sell orders 9826 allow the user to enter prices manually into the action block 9817 with input field 9818 for buy or sell as well as quantity selection order input field 9819 where the user may select their order quantity as well as a price input field 9820 where the user may select their limit order or other type of order price as well as a type input label 9828 and type label input field 9821 as well as a button to submit 9836 a relevant order. In some embodiments, upon order price match of the limit order book buy queue with the limit order book sell queue, delivery 9801 may occur virtually or in person for the contract specification date and time and quality and emission claim or carbon credit geolocation claim unit specification 9811. In some embodiments, the virtual or in person delivery layer 9801 may show the video and or picture of the physician 9802 to the patient Latika May 9804. In some embodiments, the delivery layer 9801 may include the blockchain of the medical record history 9805, the blockchain symptoms 9806, chat and text between the seller (Telemedicine Doctor) 9804 and Buyer (Holcim) 9831 as well as insurance and cash and payment details 9808 and vitals 9838. In some embodiments, the patient 9829 or doctor 9802 may have a mute button 9838 during the video call as well as the name of the doctor 9831, the education and credentials of the doctor 9832, the certifications and boards of the doctor 9833, the EU compliance of the doctor and cement carbon offset 9834 and chat and text records between the buyer (patient) and seller (doctor) 9835. In some embodiments, the geolocation exchange unit or emission claim or carbon credit geolocation claim unit 9811 may have many types for carbon claim, malpractice claim, medicare claims, telemedicine claims, emission or emission offset claims, musicians, emission or emission offset claims, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 9801 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces. In some embodiments, raw claims which have not been processed may be matched with a processor and emission or emission offset representative before the security or cash flow creation module places in the claim on the exchange.

Figure 99:
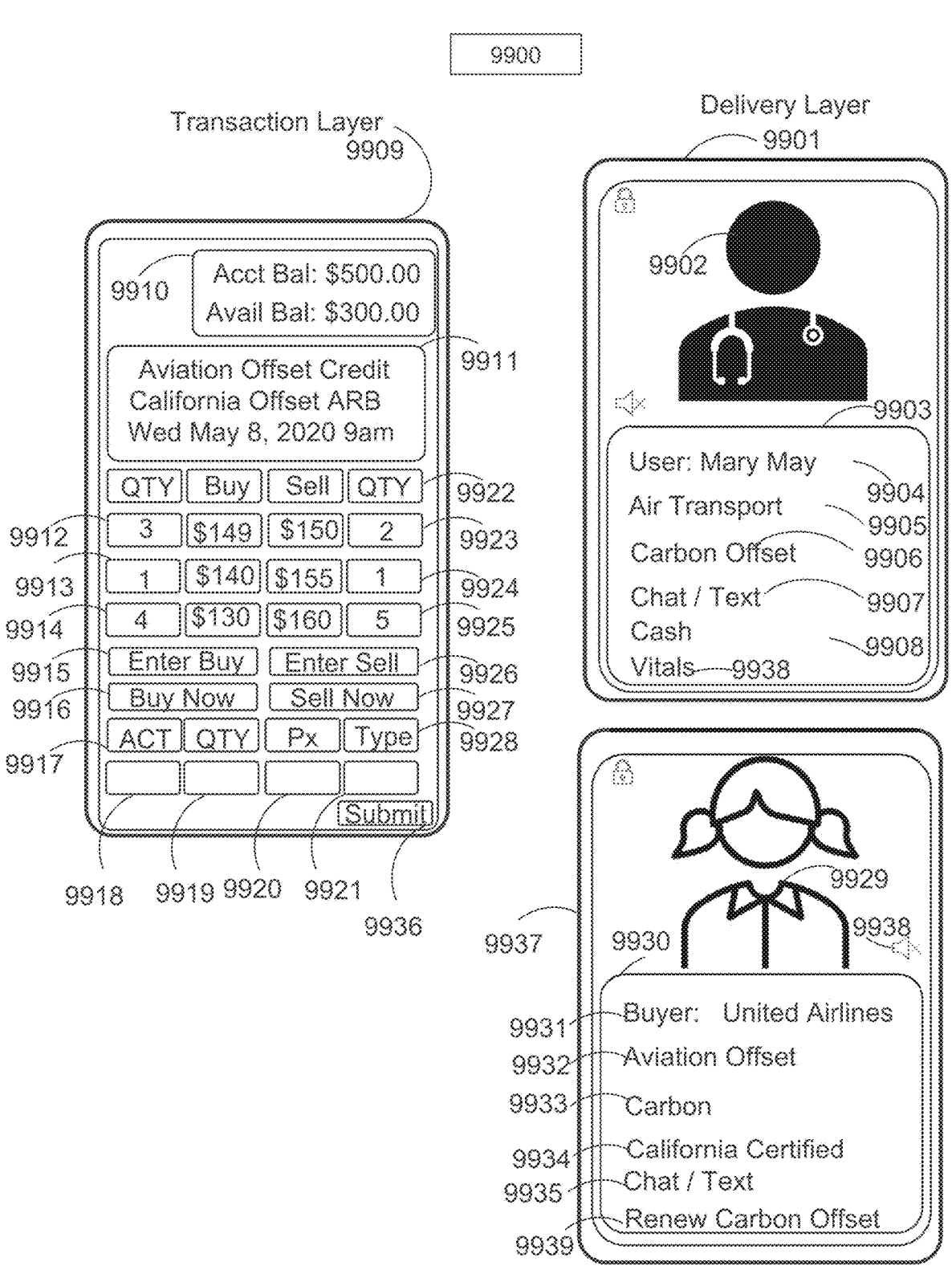

FIG. 99 illustrates an exemplary transaction layer 9909 for a geolocation exchange unit or emission claim or carbon credit geolocation claim unit for the exemplary case of an aviation offset California offset ARB carbon or emission claim with a delivery time of Wednesday, May 8, 2020 at 9 am for virtual or in person delivery specification 9911. In some embodiments, the transaction layer 9909 may list the user account balance 9910 and available balance given outstanding transactions and trades 9910. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9912, the second price time priority queue quantity buy limit order book position 9913, the third price time priority queue quantity buy limit order book position 9914. In some embodiments, the first price time priority limit order buy queue position quantity of three with figure reference of 9912 also contains a price of $149. In some embodiments, the second price time priority limit order buy queue position quantity of one with figure reference of 9913 also contains a price of $140. In some embodiments, the third price time priority limit order buy queue position quantity of four with figure reference of 9914 also contains a price of $130. In some embodiments, an exemplary limit order sell queue for the geolocation exchange unit or emission claim or carbon credit geolocation claim unit s may display the limit order book such as the first price time priority queue position quantity sell limit order book position 9923, the second price time priority queue quantity sell limit order book position 9924, the third price time priority queue quantity sell limit order book position 9925. In some embodiments, the first price time priority limit order sell queue position quantity of two with figure reference of 9923 also contains a price of $150. In some embodiments, the second price time priority limit order sell queue position quantity of one with figure reference of 9924 also contains a price of $155. In some embodiments, the third price time priority limit order sell queue position quantity of five with figure reference of 9925 also contains a price of $160. In some embodiments, the system and method transaction layer 9909 may contain both limit buy order features 9915 and market order features for buy now 9916 functionality. In some embodiments, the system and method transaction layer 9909 may contain limit order sell features 9926 and market order features for sell now 9927 functionality. In some embodiments, limit buy orders 9915 or limit sell orders 9926 allow the user to enter prices manually into the action block 9917 with input field 9918 for buy or sell as well as quantity selection order input field 9919 where the user may select their order quantity as well as a price input field 9920 where the user may select their limit order or other type of order price as well as a type input label 9928 and type label input field 9921 as well as a button to submit 9936 a relevant order. In some embodiments, upon order price match of the limit order book buy queue with the limit order book sell queue, delivery 9901 may occur virtually or in person for the contract specification date and time and quality and emission claim or carbon credit geolocation claim unit specification 9911. In some embodiments, the virtual or in person delivery layer 9901 may show the video and or picture of the physician 9902 to the patient Mary May 9904. In some embodiments, the delivery layer 9901 may include the blockchain of the carbon record history 9905, the blockchain symptoms 9906, chat and text between the seller (telemedicine doctor who did not physically travel for the procedure or appointment) 9904 and buyer (united airlines) 9931 as well as insurance and cash and payment details 9908 and vitals 9938. In some embodiments, the buyer 9929 or seller 9902 may have a mute button 9938 during the video call or carbon transaction as well as the name of the buyer 9931, the type of offset 9932, the type of geolocation product such as carbon 9933, the California ARB compliance of the buyer 9934 and chat and text records between the buyer (united) 9937 and seller (doctor) 9903. In some embodiments, the geolocation exchange unit or emission claim or carbon credit geolocation claim unit 9911 may have many types for carbon claims, general claims, emission or emission offset claims, telemedicine claims, emission or emission offset claims, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 9901 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 100:
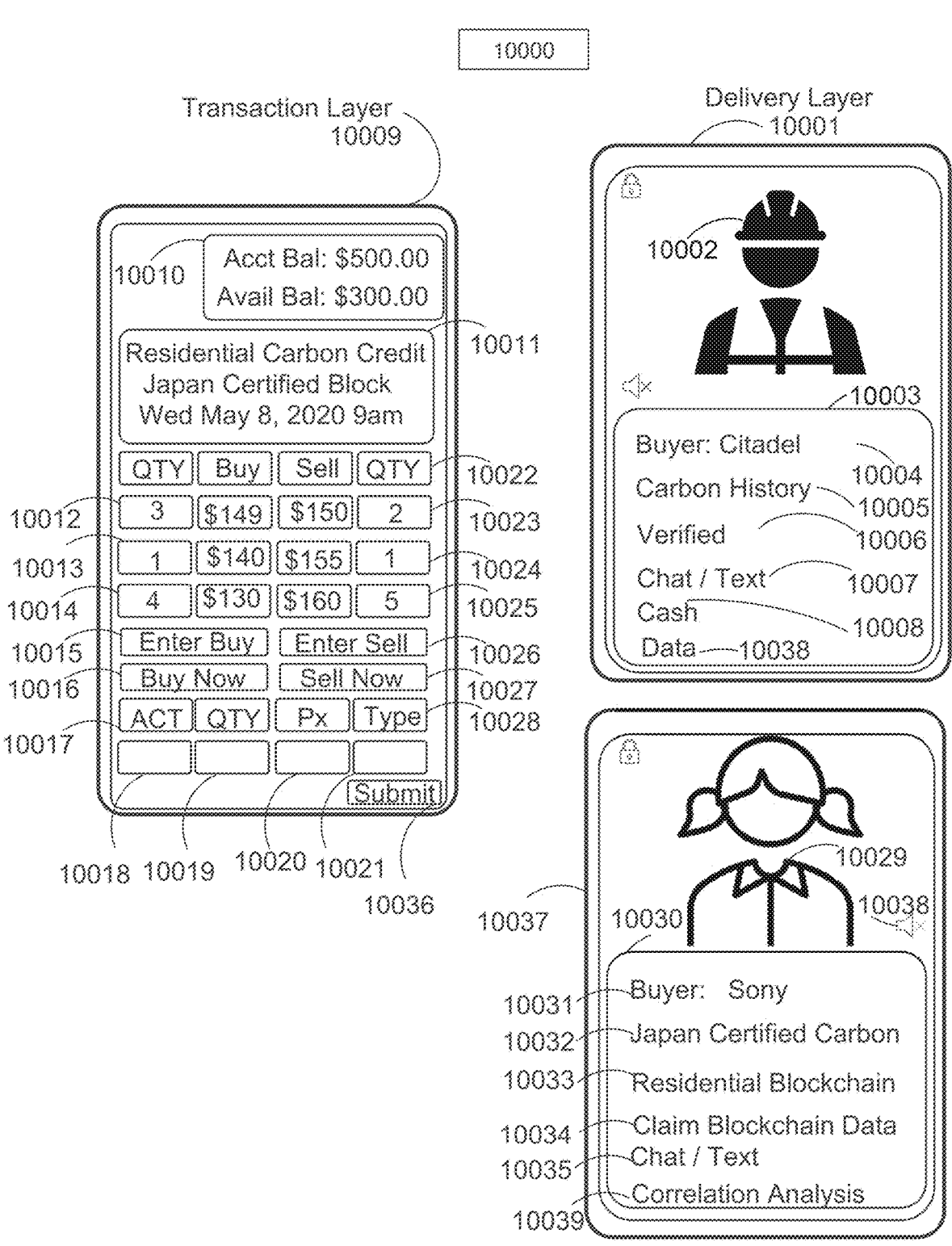

FIG. 100 illustrates an exemplary transaction layer 10009 for a geolocation exchange unit or emission claim or carbon credit geolocation claim unit for the exemplary case of a Residential carbon credit as a Japanese certified block with a delivery time of Wednesday, May 8, 2020 at 9 am for virtual or in person delivery specification 10011. In some embodiments, the transaction layer 10009 may list the user account balance 10010 and available balance given outstanding transactions and trades 10010. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10012, the second price time priority queue quantity buy limit order book position 10013, the third price time priority queue quantity buy limit order book position 10014. In some embodiments, the first price time priority limit order buy queue position quantity of three with figure reference of 10012 also contains a price of $149. In some embodiments, the second price time priority limit order buy queue position quantity of one with figure reference of 10013 also contains a price of $140. In some embodiments, the third price time priority limit order buy queue position quantity of four with figure reference of 10014 also contains a price of $130. In some embodiments, an exemplary limit order sell queue for the geolocation exchange unit or emission claim or carbon credit geolocation claim unit s may display the limit order book such as the first price time priority queue position quantity sell limit order book position 10023, the second price time priority queue quantity sell limit order book position 10024, the third price time priority queue quantity sell limit order book position 10025. In some embodiments, the first price time priority limit order sell queue position quantity of two with figure reference of 10023 also contains a price of $150. In some embodiments, the second price time priority limit order sell queue position quantity of one with figure reference of 10024 also contains a price of $155. In some embodiments, the third price time priority limit order sell queue position quantity of five with figure reference of 10025 also contains a price of $160. In some embodiments, the system and method transaction layer 10009 may contain both limit buy order features 10015 and market order features for buy now 10016 functionality. In some embodiments, the system and method transaction layer 10009 may contain limit order sell features 10026 and market order features for sell now 10027 functionality. In some embodiments, limit buy orders 10015 or limit sell orders 10026 allow the user to enter prices manually into the action block 10017 with input field 10018 for buy or sell as well as quantity selection order input field 10019 where the user may select their order quantity as well as a price input field 10020 where the user may select their limit order or other type of order price as well as a type input label 10028 and type label input field 10021 as well as a button to submit 10036 a relevant order. In some embodiments, upon order price match of the limit order book buy queue with the limit order book sell queue, delivery 10001 may occur virtually or in person for the contract specification date and time and quality and emission claim or carbon credit geolocation claim unit specification 10011. In some embodiments, the virtual or in person delivery layer 10001 may show the video and or picture of the worker 10002 to the customer address or geolocation attributes 10004. In some embodiments, the delivery layer 10001 may include the blockchain of the emission claim record history 10005, the blockchain problem 10006, chat and text between the buyer (customer) 10004 and seller (plumber) 10031 as well as insurance and cash and payment details 10008 and data 10038. In some embodiments, the customer 10029 or worker 10002 may have a mute button 10038 during the video call as well as the name of the Sony Corporation as buyer 10031, the education and credentials of the buyer 10032, the certifications of the buyer 10033, the state registration 10034 and chat and text records between the buyer (customer) and seller 10035. In some embodiments, the geolocation exchange unit or emission claim or carbon credit geolocation claim unit 10011 may have many types for Carbon Claims, telemedicine claims, emission or emission offset claim, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 10001 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 101:
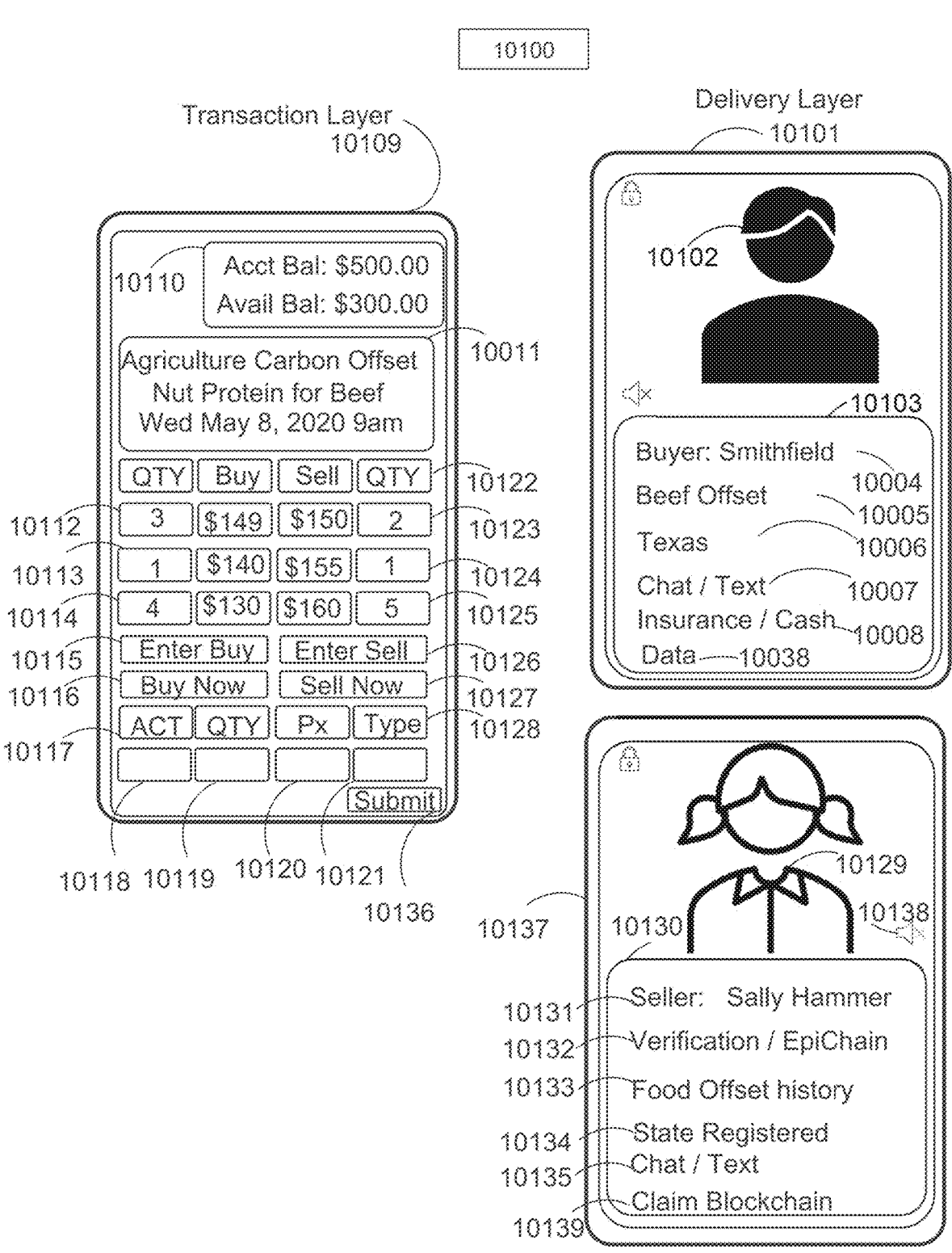

FIG. 101 illustrates an exemplary transaction layer 10109 for a geolocation exchange unit or emission claim or carbon credit geolocation claim unit for the exemplary case of an agriculture carbon offset claim or credit with a delivery time of Wednesday, May 8, 2020 at 9 am for cash flows or non-cash flows for virtual or in person delivery claim specification 10111. In some embodiments, the transaction layer 10109 may list the user account balance 10110 and available balance given outstanding transactions and trades 10110. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10112, the second price time priority queue quantity buy limit order book position 10113, the third price time priority queue quantity buy limit order book position 10114. In some embodiments, the first price time priority limit order buy queue position quantity of three with figure reference of 10112 also contains a price of $149. In some embodiments, the second price time priority limit order buy queue position quantity of one with figure reference of 10113 also contains a price of $140. In some embodiments, the third price time priority limit order buy queue position quantity of four with figure reference of 10114 also contains a price of $130. In some embodiments, an exemplary limit order sell queue for the geolocation exchange unit or emission claim or carbon credit geolocation claim unit s may display the limit order book such as the first price time priority queue position quantity sell limit order book position 10123, the second price time priority queue quantity sell limit order book position 10124, the third price time priority queue quantity sell limit order book position 10125. In some embodiments, the first price time priority limit order sell queue position quantity of two with figure reference of 10123 also contains a price of $150. In some embodiments, the second price time priority limit order sell queue position quantity of one with figure reference of 10124 also contains a price of $155. In some embodiments, the third price time priority limit order sell queue position quantity of five with figure reference of 10125 also contains a price of $160. In some embodiments, the system and method transaction layer 10109 may contain both limit buy order features 10115 and market order features for buy now 10116 functionality. In some embodiments, the system and method transaction layer 10109 may contain limit order sell features 10126 and market order features for sell now 10127 functionality. In some embodiments, limit buy orders 10115 or limit sell orders 10126 allow the user to enter prices manually into the action block 10017 with input field 10118 for buy or sell as well as quantity selection order input field 10119 where the user may select their order quantity as well as a price input field 10120 where the user may select their limit order or other type of order price as well as a type input label 10128 and type label input field 10121 as well as a button to submit 10136 a relevant order. In some embodiments, upon order price match of the limit order book buy queue with the limit order book sell queue, delivery 10101 may occur virtually or in person for the contract specification date and time and quality and emission claim or carbon credit geolocation claim unit specification 10111. In some embodiments, the virtual or in person delivery layer 10101 may show the video and or picture of the lawyer 10102 to the customer address 10104. In some embodiments, the delivery layer 10101 may include the blockchain of the home record history 10105, the blockchain problem 10106, chat and text between the buyer (insurance company) 10104 and seller (lawyer) 10131 as well as insurance and cash and payment details 10108 and data 10138. In some embodiments, the customer 10129 or lawyer 10102 may have a mute button 10138 during the video call as well as the name of the lawyer 10131, the education and credentials of the lawyer 10132, the certifications and boards of the lawyer 10133, the state registration 10134 and chat and text records between the buyer (customer) and seller (lawyer) 10135. In some embodiments, the geolocation exchange unit or emission claim or carbon credit geolocation claim unit 10111 may have many types for telemedicine, emission or emission offset, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 10101 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces. In some embodiments, insurance company payers of claim liability may buy the claim to settle the claim online rather than waiting for a judgement which could change the value of the claim.

Figure 102:
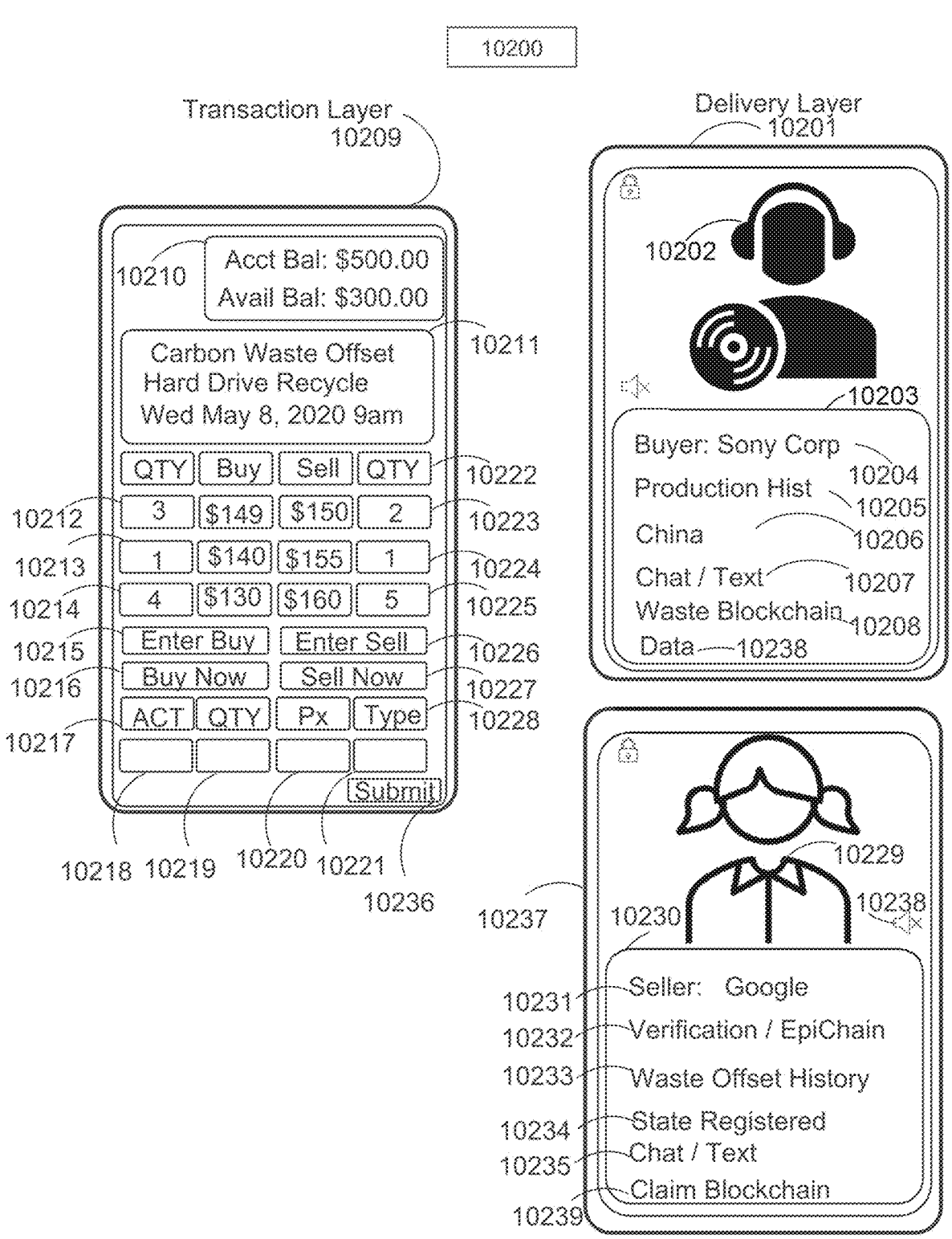

FIG. 102 illustrates an exemplary transaction layer 10209 for a geolocation exchange unit or emission claim or carbon credit geolocation claim unit for the exemplary case of carbon or emission offset claim or credit on hard drive recycling with state certifications with a delivery time of Wednesday, May 8, 2020 at 9 am for virtual or in person delivery specification 10211. In some embodiments, the transaction layer 10209 may list the user account balance 10210 and available balance given outstanding transactions and trades 10210. In some embodiments, a limited view of the price time priority transaction queue limit order book is displayed for the carbon geolocation exchange unit or time unit interval for the given specification and the exemplary components of the price time priority queue such as the first price time priority queue position quantity buy limit order book position 10212, the second price time priority queue quantity buy limit order book position 10213, the third price time priority queue quantity buy limit order book position 10214. In some embodiments, the first price time priority limit order buy queue position quantity of three with figure reference of 10212 also contains a price of $149. In some embodiments, the second price time priority limit order buy queue position quantity of one with figure reference of 10213 also contains a price of $140. In some embodiments, the third price time priority limit order buy queue position quantity of four with figure reference of 10214 also contains a price of $130. In some embodiments, an exemplary limit order sell queue for the geolocation exchange unit or emission claim or carbon credit geolocation claim unit s may display the limit order book such as the first price time priority queue position quantity sell limit order book position 10223, the second price time priority queue quantity sell limit order book position 10224, the third price time priority queue quantity sell limit order book position 10225. In some embodiments, the first price time priority limit order sell queue position quantity of two with figure reference of 10223 also contains a price of $150. In some embodiments, the second price time priority limit order sell queue position quantity of one with figure reference of 10224 also contains a price of $155. In some embodiments, the third price time priority limit order sell queue position quantity of five with figure reference of 10225 also contains a price of $160. In some embodiments, the system and method transaction layer 10209 may contain both limit buy order features 10215 and market order features for buy now 10216 functionality. In some embodiments, the system and method transaction layer 10209 may contain limit order sell features 10226 and market order features for sell now 10227 functionality. In some embodiments, limit buy orders 10215 or limit sell orders 10226 allow the user to enter prices manually into the action block 10217 with input field 10218 for buy or sell as well as quantity selection order input field 10219 where the user may select their order quantity as well as a price input field 10220 where the user may select their limit order or other type of order price as well as a type input label 10228 and type label input field 10221 as well as a button to submit 10236 a relevant order. In some embodiments, upon order price match of the limit order book buy queue with the limit order book sell queue, delivery 10201 may occur virtually or in person for the contract specification date and time and quality and emission claim or carbon credit geolocation claim unit specification 10211. In some embodiments, the virtual or in person delivery layer 10201 may show the video and or picture of the musician Jimmy Page 10202 to the customer address 10204. In some embodiments, the delivery layer 10201 may include the blockchain of the carbon record history 10205, the blockchain problem 10206, chat and text between the buyer (Sony Corp) 10204 and seller (Google) 10231 as well as insurance and cash and payment details 10208 and data 10238. In some embodiments, the customer 10229 or musician Sony Corp 10202 may have a mute button 10238 during the video call as well as the name of the musician Google 10231, the education and credentials of the carbon credit seller epichain 10232, the certifications and boards of the musician Jimmy Page 10233, the state registration 10234 and chat and text records between the buyer (Sony Corp) and seller (Google) 10235 and carbon credit or claim blockchain or epichain 10239. In some embodiments, the geolocation exchange unit or emission claim or carbon credit geolocation claim unit 10211 may have many types for carbon claims or credits, infringement claims, telemedicine, emission or emission offset claims, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 10201 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 103:
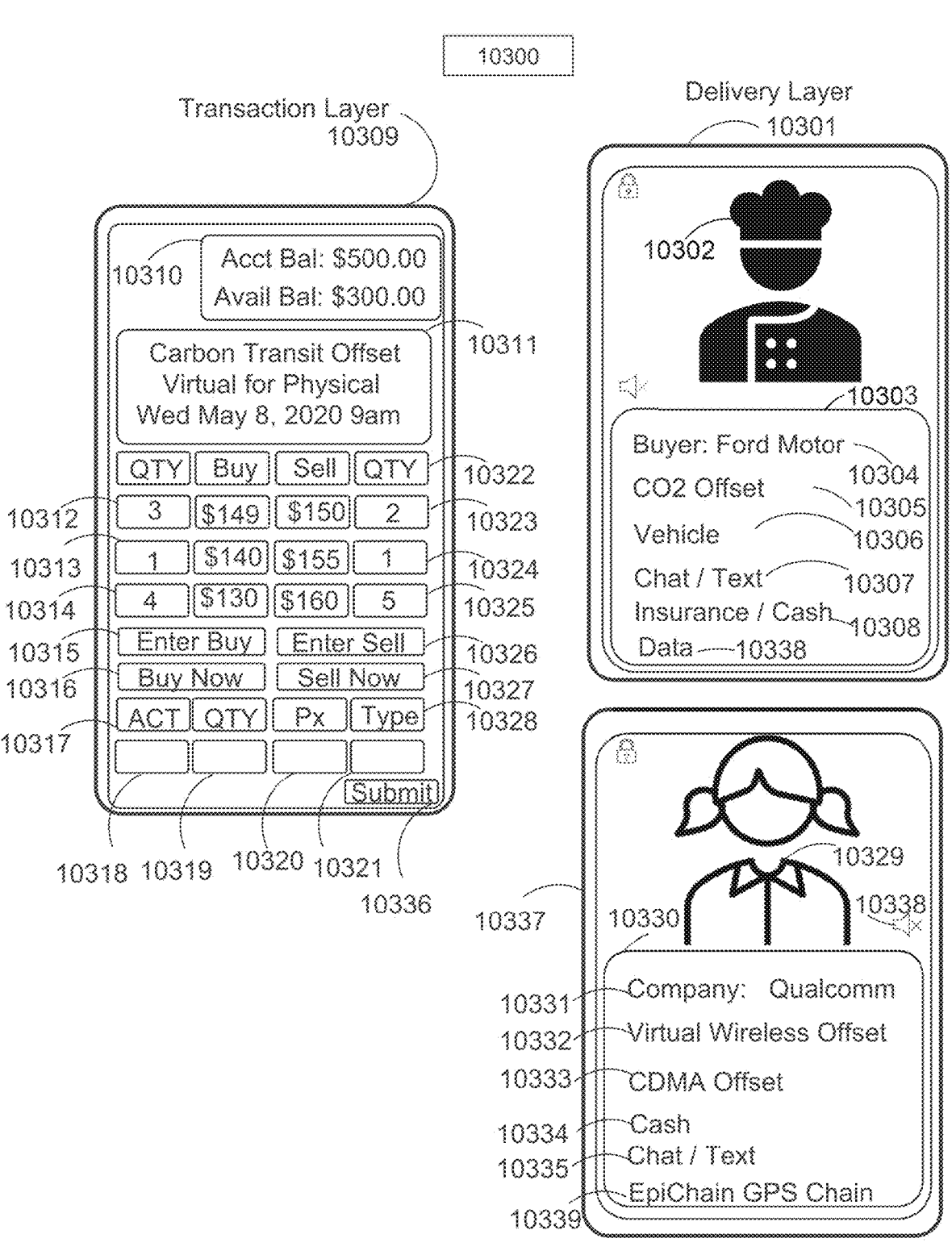

FIG. 103 illustrates an exemplary transaction layer 10309 for a geolocation exchange unit or emission claim or carbon credit geolocation claim unit for the exemplary case of the carbon or emission or emission offset transit claim or credit with state certifications with a delivery time of Wednesday, May 8, 2020 at 9 am for virtual or in person cash flow or non-cash flow delivery specification 10311. In some embodiments, the transaction layer 10309 may list the user account balance 10310 and available balance given outstanding transactions and trades 10310. In some embodiments, a limited view of the price time priority transaction queue limit order book is displayed for the geolocation exchange unit or emission claim or carbon credit geolocation claim unit for the given specification and the exemplary components of the price time priority queue such as the first price time priority queue position quantity buy limit order book position 10312, the second price time priority queue quantity buy limit order book position 10313, the third price time priority queue quantity buy limit order book position 10314. In some embodiments, the first price time priority limit order buy queue position quantity of three with figure reference of 10312 also contains a price of $149. In some embodiments, the second price time priority limit order buy queue position quantity of one with figure reference of 10313 also contains a price of $140. In some embodiments, the third price time priority limit order buy queue position quantity of four with figure reference of 10314 also contains a price of $130. In some embodiments, an exemplary limit order sell queue for the geolocation exchange unit or emission claim or carbon credit geolocation claim unit s may display the limit order book such as the first price time priority queue position quantity sell limit order book position 10323, the second price time priority queue quantity sell limit order book position 10324, the third price time priority queue quantity sell limit order book position 10325. In some embodiments, the first price time priority limit order sell queue position quantity of two with figure reference of 10323 also contains a price of $150. In some embodiments, the second price time priority limit order sell queue position quantity of one with figure reference of 10324 also contains a price of $155. In some embodiments, the third price time priority limit order sell queue position quantity of five with figure reference of 10325 also contains a price of $160. In some embodiments, the system and method transaction layer 10309 may contain both limit buy order features 10315 and market order features for buy now 10216 functionality. In some embodiments, the system and method transaction layer 10309 may contain limit order sell features 10326 and market order features for sell now 10327 functionality. In some embodiments, limit buy orders 10315 or limit sell orders 10326 allow the user to enter prices manually into the action block 10317 with input field 10318 for buy or sell as well as quantity selection order input field 10319 where the user may select their order quantity as well as a price input field 10320 where the user may select their limit order or other type of order price as well as a type input label 10328 and type label input field 10321 as well as a button to submit 10236 a relevant order. In some embodiments, upon order price match of the limit order book buy queue with the limit order book sell queue, delivery 10301 may occur virtually or in person for the contract specification date and time and quality and emission claim or carbon credit geolocation claim unit specification 10311. In some embodiments, the virtual or in person delivery layer 10301 may show the video and or picture of the chef Gordon Ramsey 10302 who may be doing a virtual cooking class to earn a virtual transit carbon credit or even a food based carbon credit with a switch to a plant based meal rather than an animal based meal which may have offset carbon blockchain or epichains associated with the choice change to a consumer or company who is reducing carbon or emissions to the customer address 10304. In some embodiments, the delivery layer 10301 may include the blockchain of the home record history 10305, the blockchain problem 10306, chat and text between the buyer (Ford) 10304 and seller (Qualcomm as licensor) 10331 as well as insurance and cash and payment details 10208 and data 10338. In some embodiments, the customer 10329 or chef Gordon Ramsey 10302 may have a mute button 10338 during the video call as well as the name of the Qualcomm 10331, the education and credentials of the chef Gordon Ramsey 10332, the certifications and boards of the digital epichain filing blockchain 10333, the case status 10334 and chat and text records between the buyer (investor) and seller (Qualcomm) 10335 and practice or maintenance plan 10339. In some embodiments, the geolocation exchange unit or emission claim or carbon credit geolocation claim unit 10311 may have many types for emission or emission offset claims, telemedicine, emission or emission offset claims, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the delivery layer 10301 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 104:
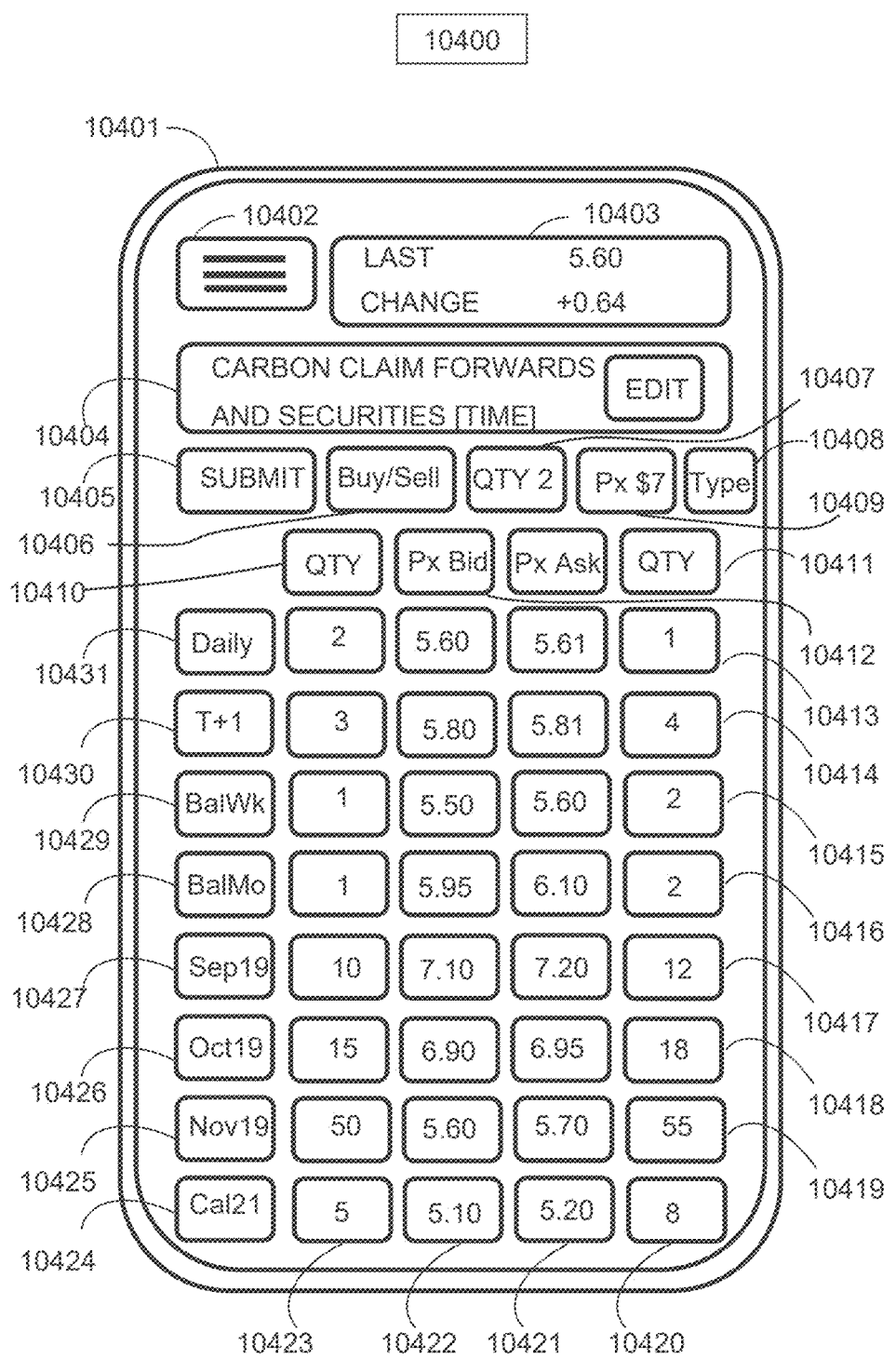

FIG. 104 illustrates an exemplary transaction layer and computing interface 10401 for a geolocation exchange unit or emission claim or carbon credit geolocation claim unit for the exemplary case of a specification emission or emission offset claim with forwards, securities, futures, financial swaps and financial indexes around the physical underlying value of the emission claim or carbon credit geolocation claim unit or geolocation unit for a certain specification. In some embodiments, the computing interface 10401 with a menu 10402, and an index monitor to measure the current index value and delta change for the index over a given time increment 10404 of the emission claim or carbon credit geolocation claim unit or geolocation exchange unit for the security interest in the claim or general interest or assignment in the claim 10404. In some embodiments, the order entry system may include a submit button for orders 10405, a buy or sell action button toggle 10406 a quantity input field 10407 a price entry field 10409 and a type field 10408. In some embodiments, the system and interface may include a quantity buy label for the price time priority queue for a given selection of forwards, securities, futures, options, swaps, derivatives, financial indexes or other trading instruments both physical and financial and derivative values 10410. In some embodiments, the system and interface may include a price buy label for the price time priority queue for a given selection of forwards, futures, options, swaps, derivatives, financial indexes or other trading instruments both physical and financial and derivative values 10412. In some embodiments, the system and interface may include a quantity sell and quantity price label for the price time priority queue for a given selection of forwards, securities, futures, options, swaps, derivatives, financial indexes or other trading instruments both physical and financial and derivative values 10411. In some embodiments, the system and interface may include a given tenure of instrument for the trading instrument such as daily for same day delivery 10431 or next day delivery 10430 or balance of the week 10429 or balance of the month 10428, or next month such as September 2019 10426 or two months forward such as October 2019 10426 or three months forward such as November 2019 10425 or the following year or two years forward for date calendar or a security with a certain interest rate duration or equity or general interest in the claim asset 2021 with reference of 10424 for the price time priority queue for a given selection of forwards, securities, futures, options, swaps, derivatives, financial indexes or other trading instruments both physical and financial and derivative values 10411. In some embodiments, the quantity buy in the price time priority queue is quantity of five for that column 10423 or the price buy in the price time priority queue is price of $5.10 10422 and price sell of $5.20 in the price time priority sell queue 10421 and quantity sell of eight in the price time priority sell queue 10420. In some embodiments, each tenor may have an associated sell quantity for a given tenure such as quantity of one for the daily tenure 10413, quantity of 4 for the next day sell queue tenure 10414, quantity of 2 for the balance of week tenure sell queue 10415, quantity of 2 for the balance of month sell queue tenure 10416, quantity of 12 for the September 19 month sell queue tenure 10417, quantity of 18 for the October 19 month sell queue tenure 10418, quantity of 55 for the November 19 month sell queue tenure 10419.

Figure 105:
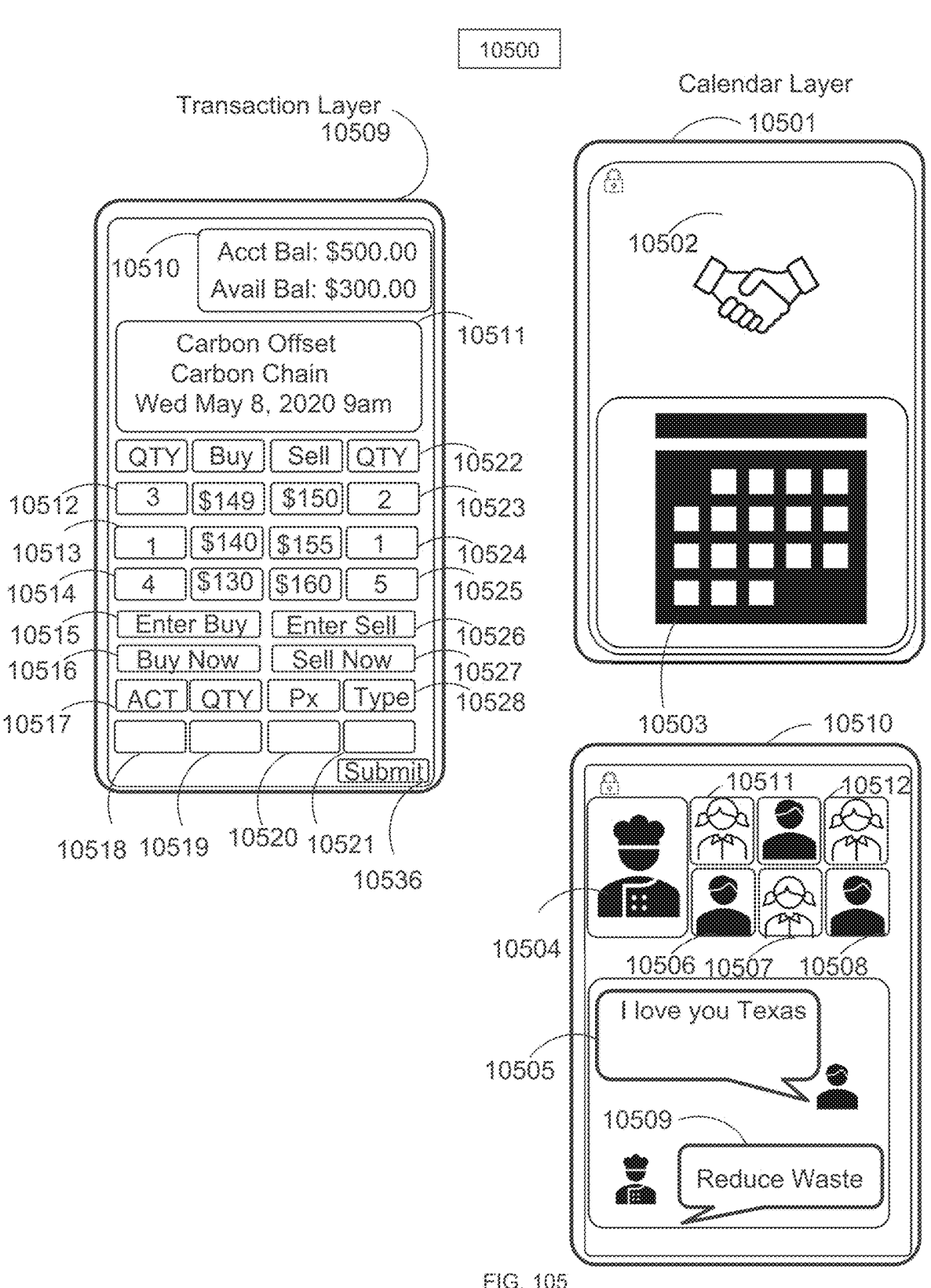

FIG. 105 illustrates an exemplary transaction layer 10509 for a geolocation exchange unit or emission claim or carbon credit geolocation claim unit for the exemplary case of carbon offset in the context of a virtual meeting with multi-nodal meeting construction of virtual carbon credits or claims creating carbon or emission offsets with a relation to the calendar meeting 10503 scheduling software 10502 with a delivery time of Wednesday, May 8, 2020 at 9 am for virtual or in person delivery specification 10511. In some embodiments, the transaction layer 10509 may list the user account balance 10510 and available balance given outstanding transactions and trades 10510. In some embodiments, a limited view of the price time priority transaction queue limit order book is displayed for the geolocation exchange unit or emission claim or carbon credit geolocation claim unit for the given specification and the exemplary components of the price time priority queue such as the first price time priority queue position quantity buy limit order book position 10512, the second price time priority queue quantity buy limit order book position 10513, the third price time priority queue quantity buy limit order book position 10514. In some embodiments, the first price time priority limit order buy queue position quantity of three with figure reference of 10512 also contains a price of $149. In some embodiments, the second price time priority limit order buy queue position quantity of one with figure reference of 10513 also contains a price of $140. In some embodiments, the third price time priority limit order buy queue position quantity of four with figure reference of 10514 also contains a price of $130. In some embodiments, an exemplary limit order sell queue for the geolocation exchange unit or emission claim or carbon credit geolocation claim unit s may display the limit order book such as the first price time priority queue position quantity sell limit order book position 10523, the second price time priority queue quantity sell limit order book position 10524, the third price time priority queue quantity sell limit order book position 10525. In some embodiments, the first price time priority limit order sell queue position quantity of two with figure reference of 10523 also contains a price of $150. In some embodiments, the second price time priority limit order sell queue position quantity of one with figure reference of 10524 also contains a price of $155. In some embodiments, the third price time priority limit order sell queue position quantity of five with figure reference of 10525 also contains a price of $160. In some embodiments, the system and method transaction layer 10509 may contain both limit buy order features 10515 and market order features for buy now 10516 functionality. In some embodiments, the system and method transaction layer 10509 may contain limit order sell features 10526 and market order features for sell now 10527 functionality. In some embodiments, limit buy orders 10515 or limit sell orders 10526 allow the user to enter prices manually into the action block 10517 with input field 10518 for buy or sell as well as quantity selection order input field 10519 where the user may select their order quantity as well as a price input field 10520 where the user may select their limit order or other type of order price as well as a type input label 10528 and type label input field 10521 as well as a button to submit 10536 a relevant order. In some embodiments, upon order price match of the limit order book buy queue with the limit order book sell queue, calendar layer 10301 may occur virtually or in person for the contract specification date and time and quality and emission claim or carbon credit geolocation claim unit specification 10511 with integration into the user calendar once a trade is matched and complete to help the user keep track of the emission claim or carbon credit geolocation claim unit obligations. In some embodiments, the virtual or in person delivery layer 10501 may show the video and or picture of the buyer and seller 10502 to the calendar 10503. In some embodiments, the calendar layer 10501 may include the integration features with outlook calendar, google calendar, or a plurality of other calendar programs. In some embodiments, all parties or some of the parties to the claim may video call 10510, 10511, 10512, 10504, 10507, 10508, 10509. In some embodiments each party in the call 10506, 10504, 10507, 10508, 10511, 10512 may be awarded or receive a carbon or emission credit by making a choice to do a virtual meeting rather than a physical meeting with calculations verified by a blockchain or epichain with verification features that prevent false VPN (Virtual Private Network) Internet Protocol addresses or resulting latitude or longitude or altitude geolocation specification attributes. In some embodiments, the epichain or blockchain for the carbon claim may use a plurality of device features such as GPS verification, MAC device ID verification, wifi WAN address verification, wifi LAN address verification, SMS or messaging to device verification, time to geolocation verification from a plurality of spot historical locations associated with the user 110 and device, user ID verification and other types of verification to validate the validity of the carbon or emission credit or claim offset activity. In some embodiments, the geolocation exchange unit or emission claim or carbon credit geolocation claim unit 10511 may have many types for business meetings, telemedicine, emission or emission offset claims, musicians, chefs, cooks, business persons, tutors, athletes, celebrities, professionals, teachers, engineers or more generally anyone or any topic selling or buying their emission claim or carbon credit geolocation claim unit for a given specification. In some embodiments, the geolocation exchange unit or emission claim or carbon credit geolocation claim unit may IPO or initial public offering once they commence selling to create the geolocation exchange unit specification which then may trade many times in the secondary market under the price time priority queue transformation structure and associated emission or emission offset transformations to the emission claim or carbon credit geolocation claim unit or geolocation exchange unit. In some embodiments, the calendar layer 10501 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces. In some embodiments, the virtual delivery layer 10510 may be one on one or one to many with video virtual delivery of the time unit interval unit. In some embodiments, the seller 10504 may present to many users 10511, 10512, 10506, 10507, 10508 with video communications or text or voice communications 10505, 10509.

Figure 106:
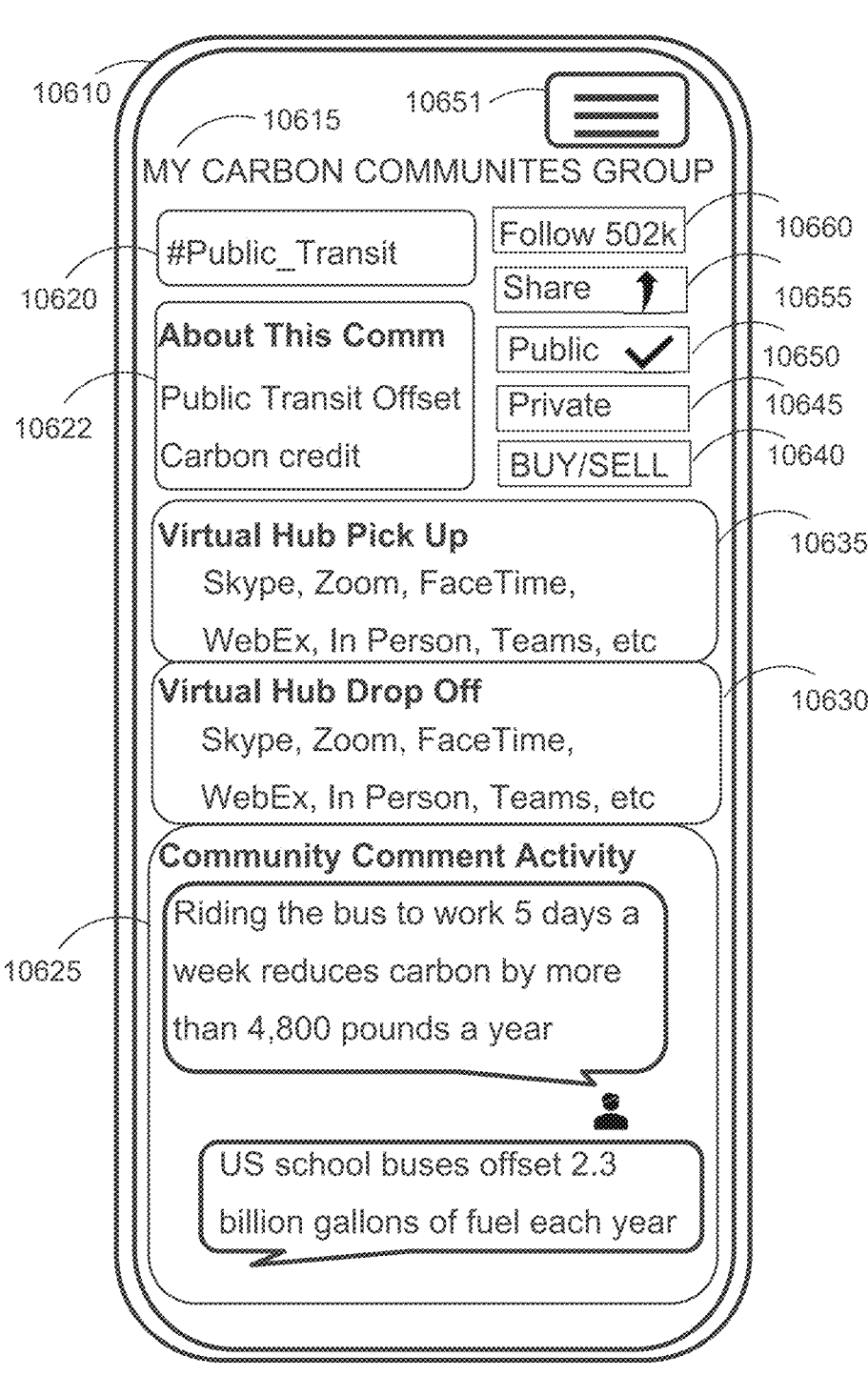

FIG. 106 illustrates exemplary geolocation exchange unit object 10620 for the Dermatologist 5 star malpractice claim with the geolocation exchange unit of a public transportation credit 10622 over a plurality of delivery methods that may be in person physically or virtually through augmented reality, mobile video computing, stationary video computing, mixed reality, virtual reality, audio computing devices, sensory computing devices or other computing devices with the ability to text 10625 in the community social network object which has been transformed into a security or tradable asset or commodity. In some embodiments, the community social network object transformation for the time unit interval or geolocation exchange unit may allow users to follow 10660, share 10655, keep private 10645, allow public access 10650 or move to a buy and sell price time priority queue 10640 for the given specification 10622. In some embodiments, the epichain or blockchain for the carbon claim may use a plurality of device features such as GPS verification, MAC device ID verification, wifi WAN address verification, wifi LAN address verification, SMS or messaging to device verification, time to geolocation verification from a plurality of spot historical locations associated with the user 110 and device, user ID verification and other types of verification to validate the validity of the carbon or emission credit or claim offset activity.

Figure 107:
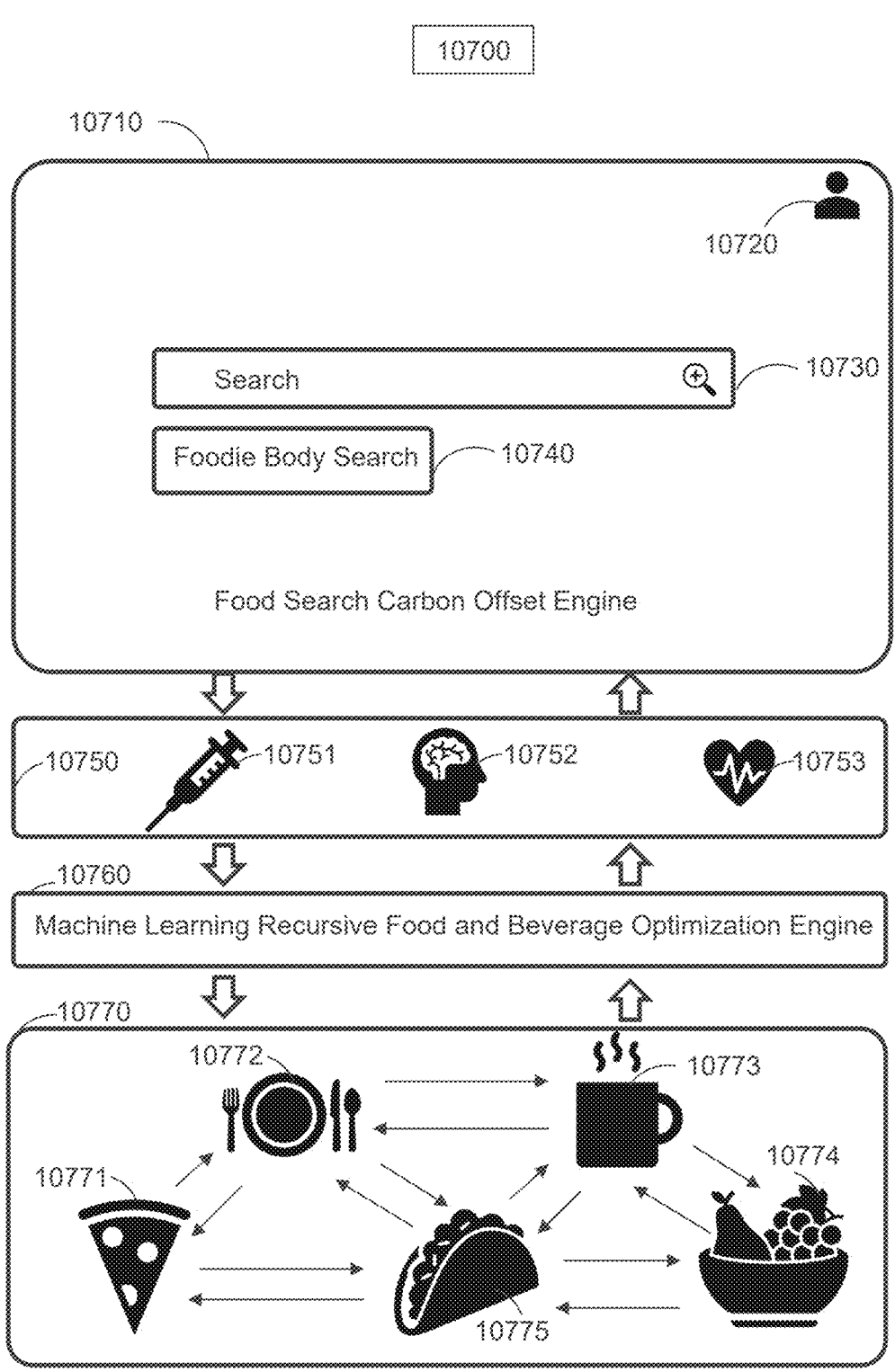
FIG. 107 illustrate a node ranked search engine in accordance with implementations of various techniques described herein.

FIG. 107 illustrates an exemplary search interface for mapping biomarkers to medical records for carbon or emission claim formation, securitization or derivative transformation to the geolocation exchange unit object for trading on the geolocation exchange. For the purpose of efficiency in this document we will interchangeably use the term "User" and "plaintiff" or "defendant" or "claim party." Also for the purpose of efficiency, "blood chemistry" or "biomarker chemistry" or "bioinformatic chemistry" may be used as short form or interchangeably with any superset or subset of blood, saliva, hair, urine, stool, fingernail, height, laser proxy scans, photo image scans, weight and skin sampling analysis or other biomarkers such by example but not limiting by example echocardiogram, nuclear perfusion studies, magnetic resonance imaging, positron emission tomography with biomarker chemistry data. In one exemplary implementation as illustrated in FIG. 107, a searchable food and beverage ranked node database interface 10710 may display a plurality of food and beverage selections 10770 to a user 10720 which may link to claim formation and securitization or transformation into a geolocation exchange unit. In one embodiment, a user 10720 may provide a blood, saliva, hair, urine, stool, fingernail, height, weight and skin sampling analysis 10750 to a certified biomarker laboratory 151 through a plurality of options. In one embodiment a user 10720 may provide a positron emission tomography scan 10752 to the database to allow the machine learning recursive food and beverage optimization and search engine 10760 to display a plurality of ranked foods and beverages 10770. In one embodiment a user 10720 may provide an electrocardiogram, nuclear stress test, angiogram, computed tomography or magnetic resonance imaging data 10753 to the database to allow the machine learning recursive food and beverage optimization and search engine 10760 to display a plurality of ranked foods and beverages 10770. In another embodiment a user 10720 may provide a plurality of biometric samples 10750 to the database to allow the machine learning recursive food and beverage optimization and search engine 160 to display a plurality of ranked drugs, implants, foods and beverages 10770. In some embodiments, the machine learning recursive food and beverage optimization engine node ranks a database 10770 based on machine learning models 160 that estimate dependent claim variables on independent drugs, implants, foods, biomarker and beverages inputs 10770 based on predictive and historical samples of drugs, implants, foods, biomarker and beverages compared to a plurality of biomarker test results from labs including but not limited to blood, saliva, hair, urine, stool, fingernail, height, weight and skin sampling analysis 10750. In some embodiments, the carbon or emission credit may be created by the use of choice of a plant based meal or a meat based meal or a combination thereof considering the carbon footprint of the meal and the associated weighting of ingredients of the meal. In some embodiments, machine learning classification methods may be utilized to identify meal ingredients and composition from the multi-dimension map tile database as described in U.S. patent application Ser. No. 17,358,429, "Multi-Dimension Classification Object Matrices to Estimate Multi-Dimensional Representations with Multi Function Device", filed Jun. 25, 2021 with a full provisional application filing date of Jun. 26, 2020, and additional ingredient composition and weightings from U.S. Patent Application 63,181,866, "Multi-Function Device Legal Product Claim Blockchain", filed Apr. 29, 2021, the entirety of referenced matter included herein.

Figure 108:
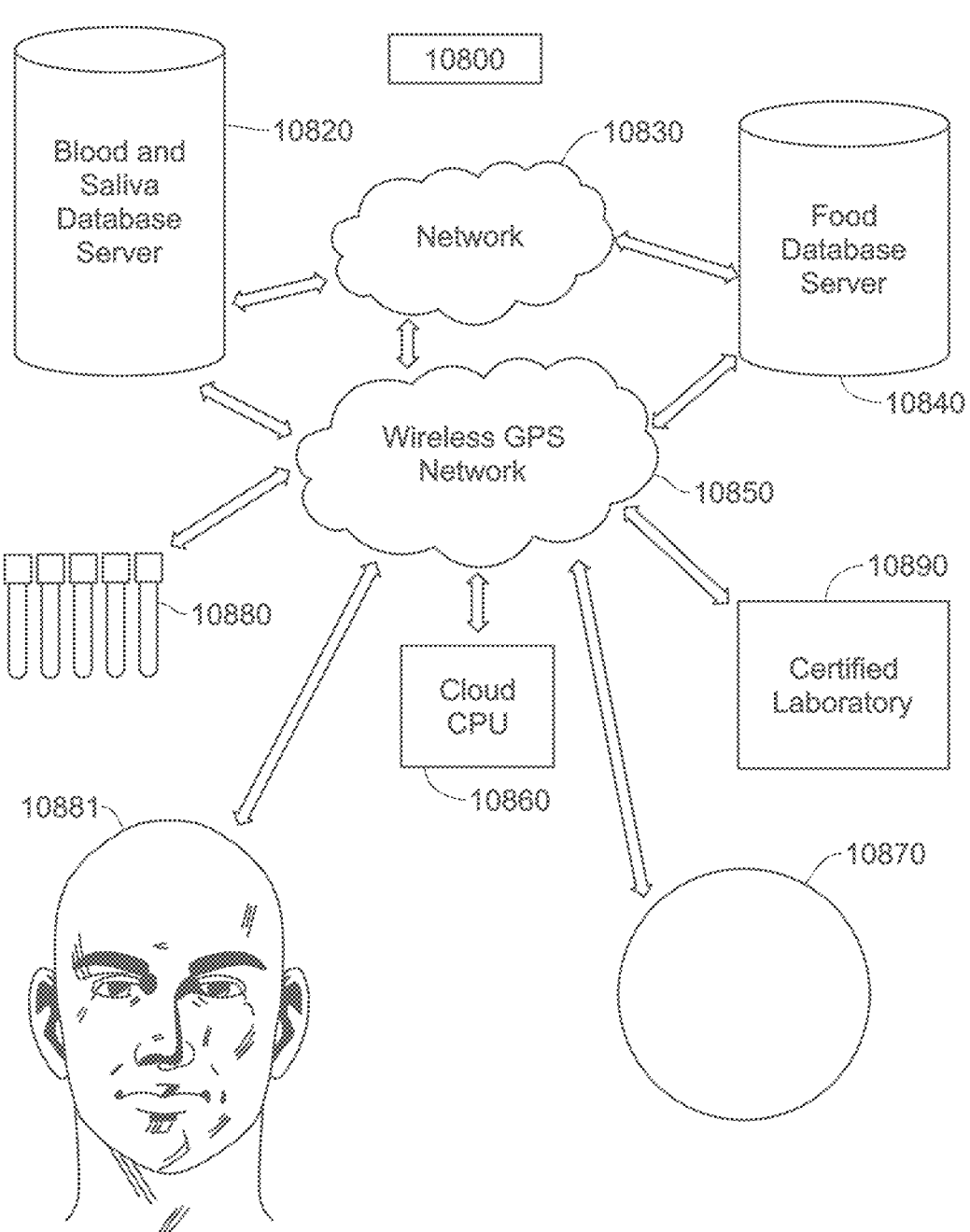
FIG. 108 illustrates a schematic diagram of a method and computing system in which the various technologies described herein may be incorporated and practiced.

The embodiment illustrated in FIG. 108, illustrates the certified laboratory 10890 may then transmit the biometric test results from the blood, saliva, hair, urine, stool, fingernail, height, weight and skin sampling analysis 10880 to a claim network 10830 which then archives the data in a biomarker blood, saliva, hair, urine, stool, fingernail, height, weight and skin sampling analysis claim database server 10820. The network 10830 also interacts with the user 10881 and a food and drug and implant database server 10840 which has compiled a plurality of nutrition information on food and drug and chemical ingredients from a plurality of global resources. Food providers of raw food ingredients or prepared dishes use the graphical user interface 10870 of a CPU 10870 to upload ingredient information 10840 to the claim network 10830 which then stores the chemical and nutrition information in the claim food and drug and chemical database server 10840. The user 10881 interacts with the network 10830 through the graphical user interface 10870 by selecting a plurality of options regarding claims, medical conditions, chemicals, nutrition, health, variety, flavoring, style, ethnicity and delivery of prepared and raw ingredients. The cloud based CPU 10860 contains algorithms and machine learning sequences of linear and non-linear equations which use a plurality of vectors to determine the optimal nutrition ingredients or prepared dishes which optimize blood, saliva, hair, urine, stool, fingernail, height, weight and skin sampling analysis of the user 10881 by interaction with the network 10830 and pulling data recursively from the blood, saliva, hair, urine, stool, fingernail, height, weight and skin sampling analysis database server 10820 and food database server 10840. In some embodiments, the node ranked implant, drug, food, chemistry objects are also ranked by negative influence to the objective function optimization equation algorithm. In some embodiments, the drug, food and beverage results may be node ranked in relation to moving the user 10810 towards a biomarker target with the highest efficiency and lowest variance or lowest efficiency and greatest amount of utility. In some embodiments, these weightings also may contain the carbon or emission contribution or reduction by ingredient weight or overall meal composition. In some embodiments, the user 10881 may submit blood, saliva, hair, urine, stool, fingernail, height, weight and skin sampling analysis 10880 to the certified laboratory 10870 through a plurality of methods to update the network 10830 and blood, saliva, hair, urine, stool, fingernail, height, weight and skin sampling analysis database server 10820 in a plurality of frequencies to improve the ability of the algorithms in the cloud CPU 10860 to optimize ingredients and rank food and beverage selections from the drug, chemical, implant, food database server 10840 to verify ingestion behavior and the benefit on the blockchain or epichain for verification purposes. In some embodiments, the food database server 10840 contains a schema for individual ingredients as well as combinations of ingredients from recipes which have been uploaded by a plurality of users 10881 through the graphical user interface 10870. The graphical user interface 10870 may be obtained on a stationary CPU, mobile device, augmented reality device, mixed reality device, audio interface or any device capable of presenting a graphical user interface 10870 or audio interface 10870 to a user 10881. The form of the graphical user interface may be a globe with flags of countries, a map with geographic location of countries, country listing, voice listing of countries or other representations of geographic and cultural areas 10870 or a plurality of food and beverage selections from the food database server 10840 over the network 10830 and wireless GPS network 10850. The user 10810 and network 10830 and graphical user interface 10870 may interact with the wireless GPS location network 10850 to obtain position of the user 10881 relative to the user 10881 to consider delivery mechanisms of the formed claim to the user and to constrain the optimization equations for claim recovery. The embodiment illustrated in FIG. 108. Illustrates further a user 10881 interacting with a wireless network 10850 and a network 10830 that connects a blood, saliva, hair, urine, stool, fingernail, height, weight and skin sampling 10880 analysis database server 10820 based on blood, saliva, hair, urine, stool, fingernail, height, weight and skin sampling analysis and test results from a user 10881 with a drug, chemical, implant, food database server 10840 which contains nutrition data on raw ingredients and combinations of raw ingredients in the form of recipes and prepared food and drugs in combinations of nutrition, side effects, health, variety, flavoring, style, ethnicity and delivery. The user 10881 may access the wireless network 10850, claim network 10830, blood, saliva, hair, urine, stool, fingernail, height, weight and skin sampling analysis database server 10820, drug and implant and incident and food database server 10840, cloud CPU 10860 or other CPUs accessible through the claim network 10830 through the graphical user interface 10870. The user 10881 continuously updates the blood, saliva, hair, urine, stool, fingernail, height, weight and skin sampling 10880 analysis database server 10820 by having a certified laboratory or certified home collection kit collect blood, saliva, hair, urine, stool, fingernail, height, weight and skin sampling analysis samples 10880 on a plurality of intervals to optimize claim selection from the food and drug and chemical and implant database server 10840.

Figure 109A:
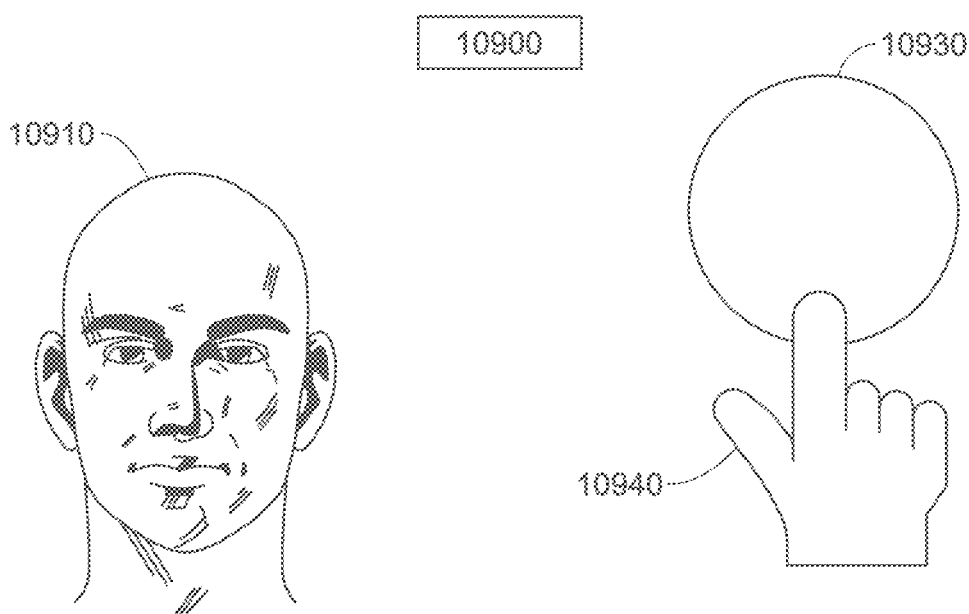
FIGS. 109A, 109B, 110A, 110B, 111, 112A, 112B, 113A, 113B, 114, and 115 illustrate a system in accordance with implementations of various techniques described herein.
Figure 109B:
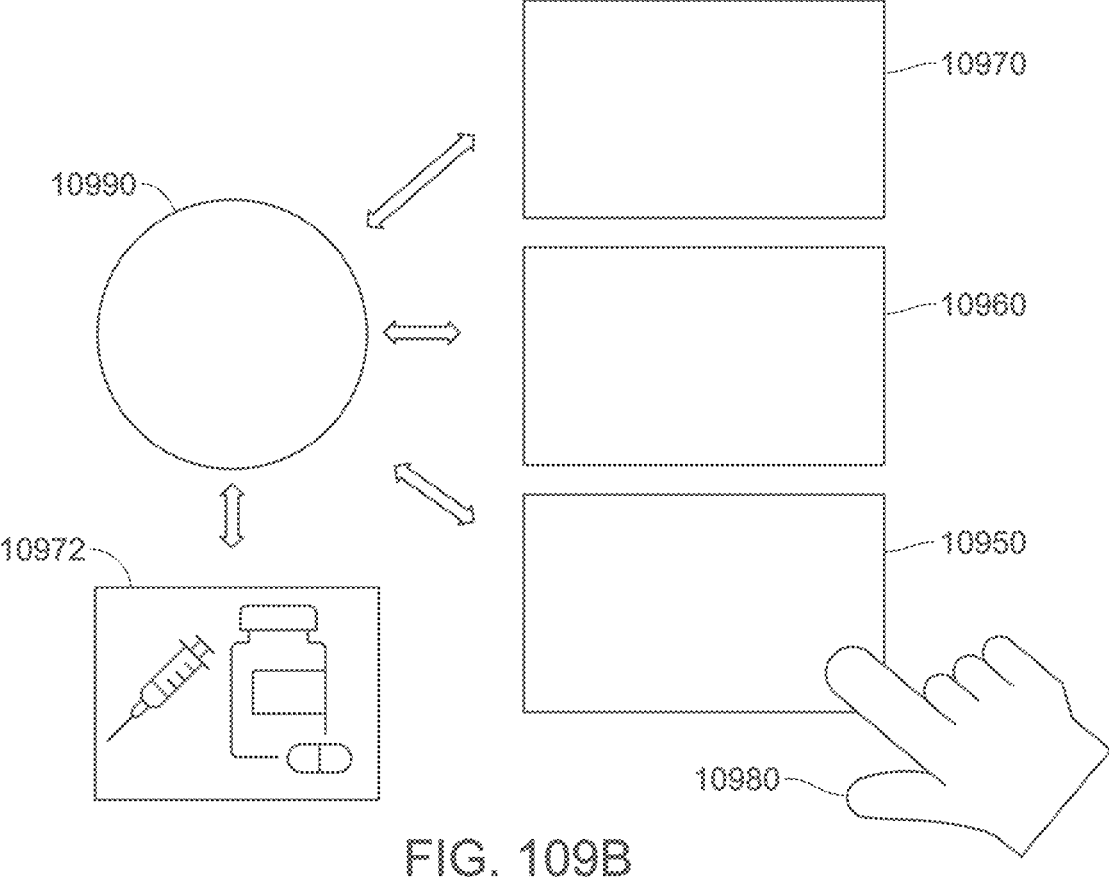

The embodiment illustrated in FIG. 109A, illustrates further a user 10910 selecting a country of origin for food flavor, variety, carbon or emission contribution or reduction, style, ethnicity preference from the graphical user interface 10930. The user 10910 may select the claim, side effects, flavor, variety, style, ethnicity preference 10940 which then initiates a method of setting up a recursive process of performing optimization equations on linear and nonlinear algebra vectors of various food combinations that optimize the side effects, claim issue, chemistry of blood, saliva, hair, urine, stool, fingernail, height, weight and skin sampling analysis. The embodiment illustrated in FIG. 109B, illustrates further a user 10910 directs a tool 10980 from the graphical user interface to select a plurality of prepared or raw food options such as a combination of meat, potatoes and other vegetables 10970, rice, Indian sauces, and breads 10960, seafood pasta 10950. In some embodiments, the user may also select implants, chemicals, drugs 10972 or other contact sources with the body to run the optimization equations over biomarkers. The user 10910 may scroll the suggested options 10970, 10960, 10950 by sliding, rolling, swiping or other intuitive movements to the graphical user interface 10990 usercontrolled pointer 10980. In some embodiments, the configuration of the device and user 10910 data then allows for claim formation of the geolocation exchange unit of emission or emission offset and emission or emission offset geolocation claim units.

Figure 110A:
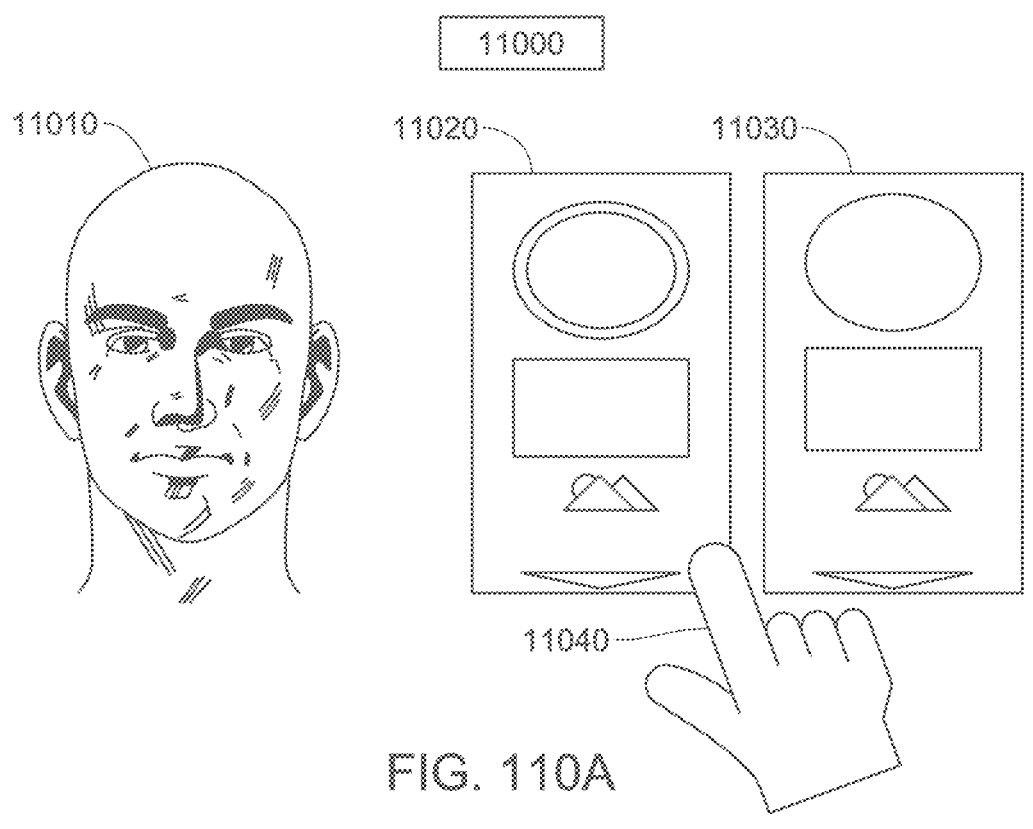
Figure 110B:
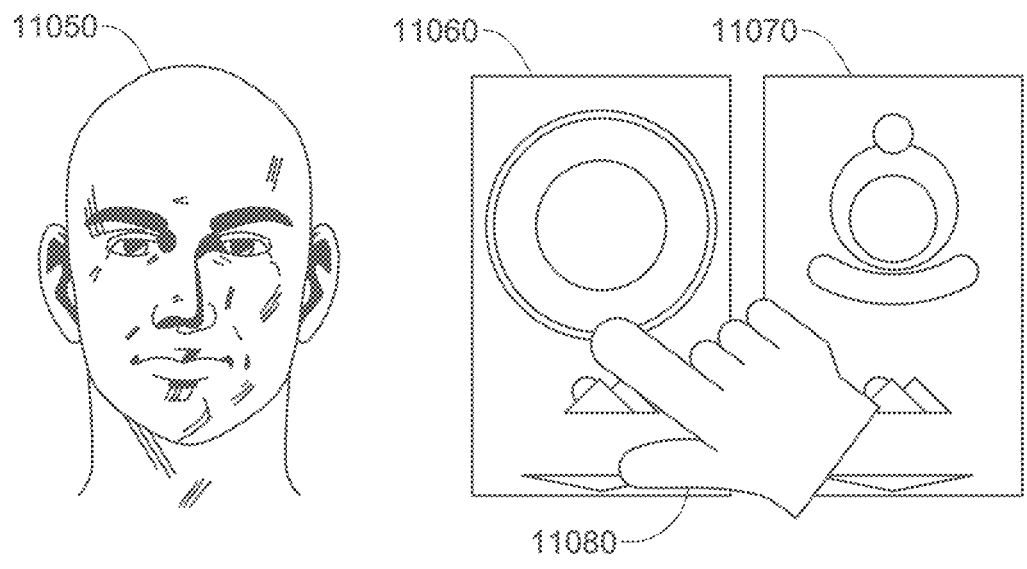

The embodiment illustrated in FIG. 110A, illustrates further a user 11010 selecting with the graphical user interface pointer 11040 a store or brand of food 11020 which carries carbon footprint analysis, raw drugs, implants, food or prepared foods that have been uploaded by the vendor 11020 so that the blood, saliva, hair, urine, stool, fingernail, height, weight and skin sampling analysis optimization equations may select raw ingredients, combinations of raw ingredients and prepared foods which optimize the users 11010 blood, saliva, hair, urine, stool, fingernail, height, weight and skin sampling analysis chemistry. The user 11010 may also select restaurants or pharmacies 11030 that have uploaded drug and food menus or input choices that have been optimized for the users 11010 blood, side effects, carbon contribution or reduction, claim effects, saliva, hair, urine, stool, fingernail, height, weight and skin sampling analysis chemistry. The embodiment illustrated in FIG. 110B. illustrates further a user 11050 directing a graphical user interface pointer 11080 in one configuration amongst many configurations where the user 11050 may select a drink such as coffee, hot statin ingredient chemical structure, tea, wine, milk, water, carbonated drink, juice, beer, cider, or spirit from a vendor 11060, 11070 who participates in the system. In some embodiments, vendors 11060, 11070 may provide food, drugs, pharmaceuticals, implants or other contact with the body. In some embodiments, the configuration of the device data then allows for claim formation of the geolocation exchange unit of emission or emission offset and emission or emission offset geolocation claim units.

Figure 111:
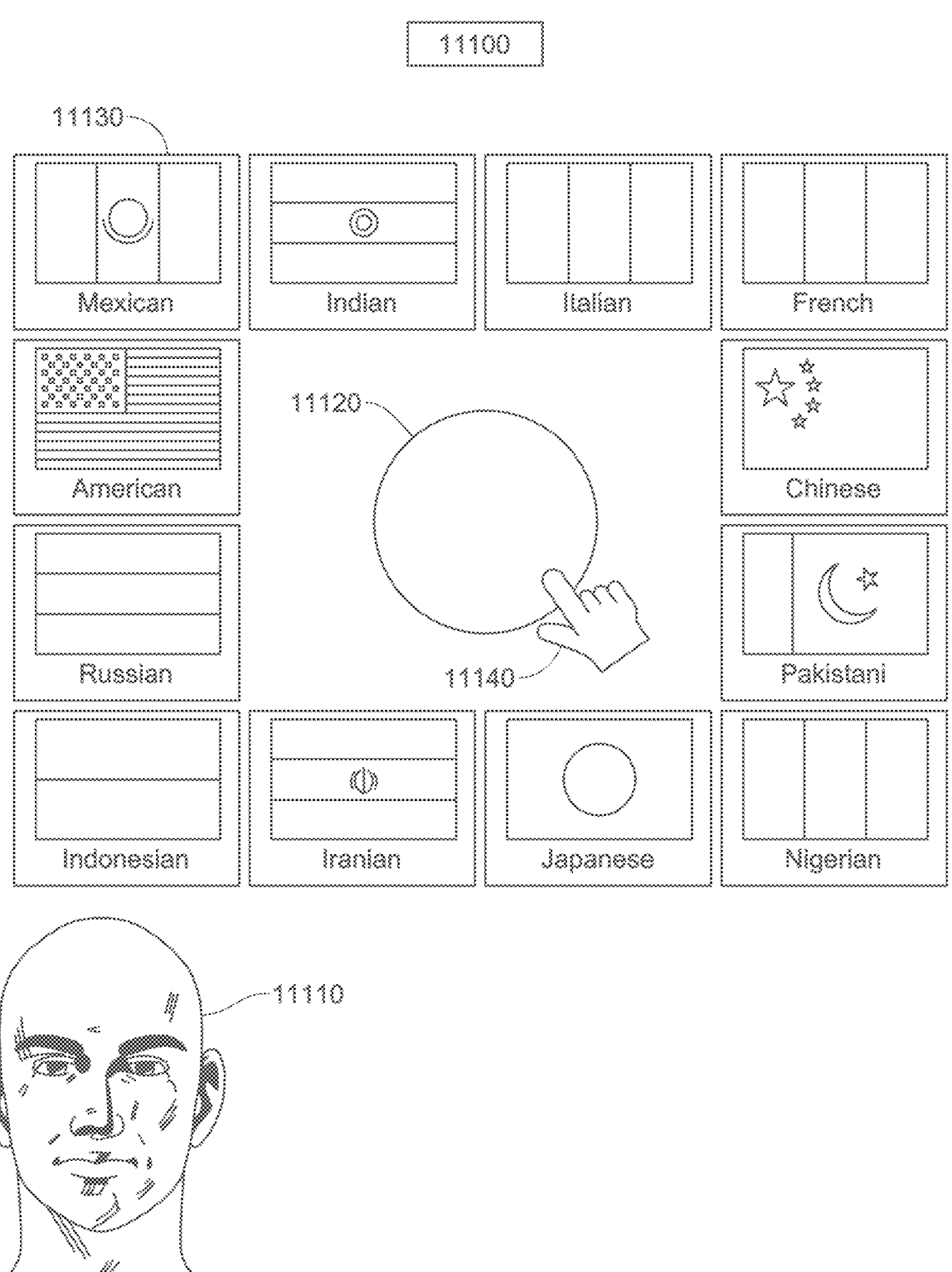

The embodiment illustrated in FIG. 111, illustrates further a user 11110 selecting with the graphical user interface pointer 11140 a style or country or flavor or ethnicity of food 11130 as an input to the vector based system of linear and non-linear equations to optimize blood, saliva, hair, urine, stool, fingernail, height, weight and skin sampling analysis of a user 11110 taking into account the style or country or flavor or ethnicity that the user 11110 desires. In some embodiments, the configuration of the device data then allows for claim formation of the geolocation exchange unit of emission or emission offset and emission or emission offset geolocation claim units.

Figure 112A:
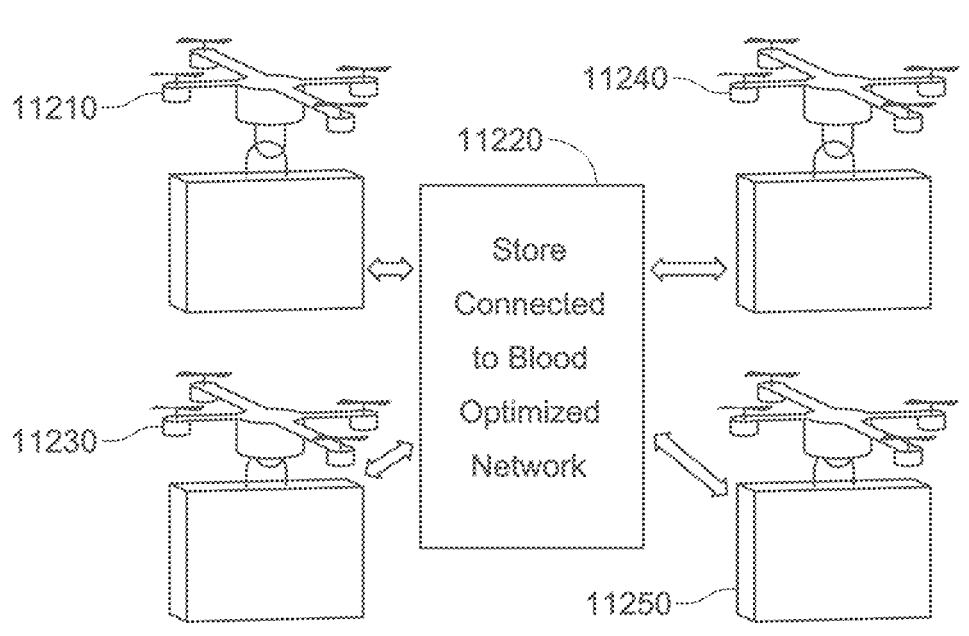
Figure 112B:
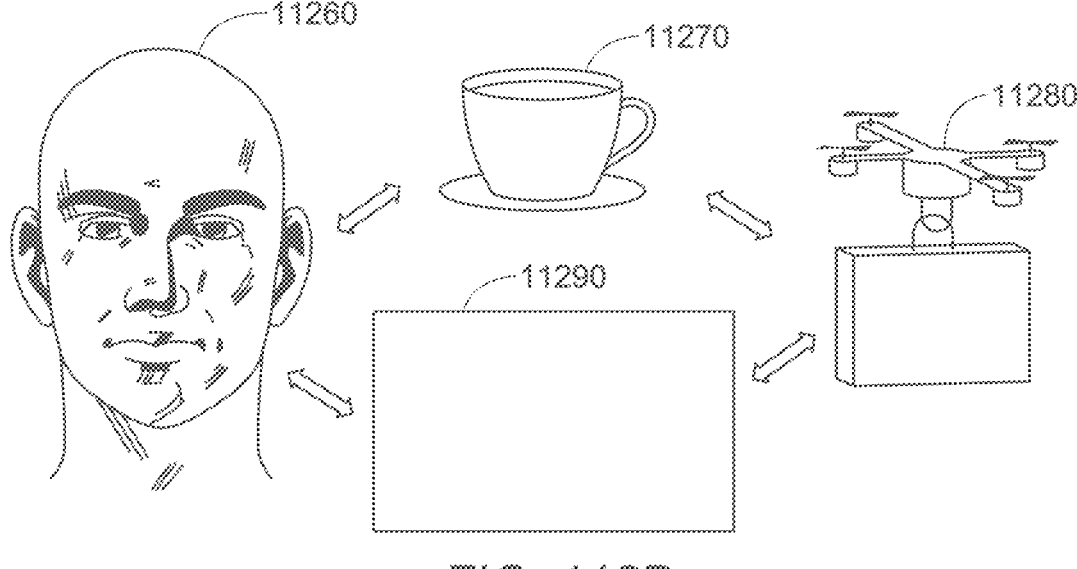

In some embodiments, the embodiment illustrated in FIG. 112B. illustrates further a user 11260 selecting with the graphical user interface a drink 11270 and combination of ingredients in the form of a recipe which includes raw ingredients or prepared food 11290 which can then be picked up at a specified location or delivered to the user 11260 via a drone 11280 or a plurality of other delivery methods with associated carbon or emission contribution or reduction credit or claim unit. The embodiment illustrated in FIG. 112A. illustrates further a user 11260 that may be connected to the claim network of stores that use the blood, saliva, hair, urine, stool, fingernail, height, weight and skin sampling analysis optimized database structure and schema 11220 to optimize side effect data, claim data, blood, saliva, hair, urine, stool, fingernail, height, weight and skin sampling analysis chemistry considering food consumption. A plurality of pick up or delivery methods which may be more or less carbon or emission intensive may be utilized that include but are not limited to programmed drones 11210, 11230, 11240, 11250. The drones 11280 may be operated by humans or may be autonomous. In some embodiments, the configuration of the device data then allows for claim formation of the geolocation exchange unit of emission or emission offset and emission or emission offset geolocation claim units.

Figure 113A:
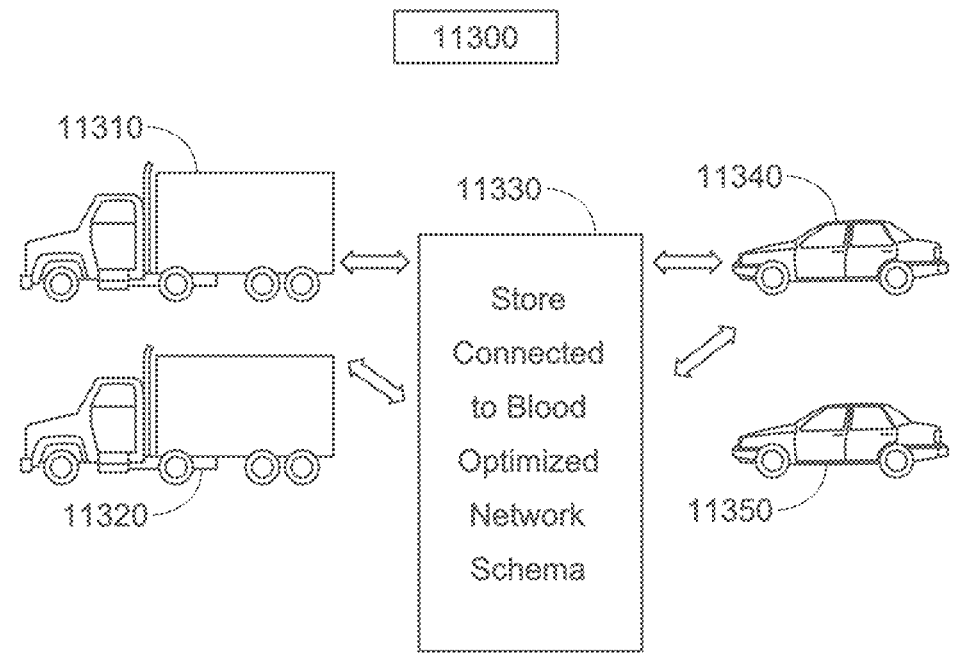
Figure 113B:
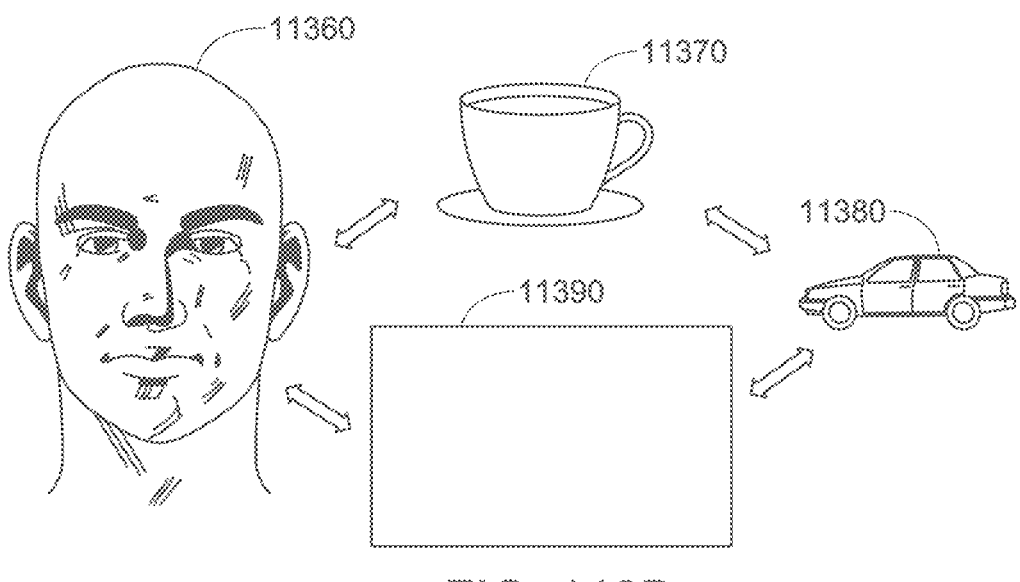

In some embodiments, the embodiment illustrated in FIG. 113B, illustrates further a user 11360 selecting with the graphical user interface a drink 11370 and combination of ingredients in the form of a recipe or prescription which includes raw ingredients or drugs or implants or prepared food 11390 which can then be picked up at a specified location or delivered to the user 11360 via a vehicle 11380 or a plurality of other delivery methods. In similar embodiments, claim data may also be delivered with the delivery network. The embodiment illustrated in FIG. 113A, illustrates further a user 11360 that may be connected to the claim network of stores that use the blood, saliva, hair, urine, stool, fingernail, height, weight and skin sampling analysis optimized database structure and schema 11330 to optimize claim outcomes, side effects, blood, saliva, hair, urine, stool, fingernail, height, weight and skin sampling analysis chemistry considering food consumption. A plurality of pick up or delivery methods may be utilized that include but are not limited to programmed vehicles 11310, 11320, 11340, 11350. The vehicles 11380 may be operated by humans or may be autonomous. In some embodiments, the configuration of the device data then allows for claim formation of the geolocation exchange unit of emission or emission offset and emission or emission offset geolocation claim units.

Figure 114:
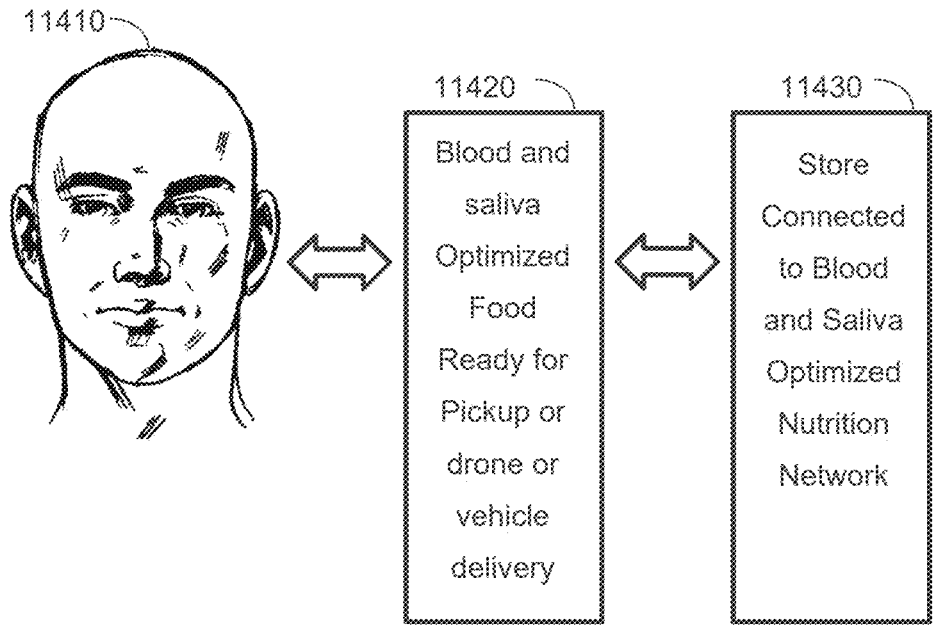

In some embodiments, the embodiment illustrated in FIG. 114. Illustrates further a user 11410 may select with the graphical user interface blood, saliva, hair, urine, stool, fingernail, height, weight and skin sampling analysis optimized food or drugs which are ready for pickup 11420 from a store or restaurant or cooking node or claim formation node which is connected to the blood, saliva, hair, urine, stool, fingernail, carbon, emission, height, weight and skin sampling analysis optimized claim network 11430. Grocery stores, food warehouses, co-ops, food distribution centers, restaurants, pharmacies, labs, hospitals, certified kitchens, or a plurality of other nodes capable of providing raw or prepared food, drugs or implants may be connected to the blood, saliva, hair, urine, stool, fingernail, height, weight and skin sampling analysis optimized nutrition claim network 830. In some embodiments, grocery stores, food warehouses, co-ops, food distribution centers, restaurants, drug stores, certified kitchens, or a plurality of other nodes capable of providing raw or prepared food may prepare the food for pickup 11420 or distribute the claim data or drugs or food via drone or delivery vehicle based on carbon reduction or contribution or a plurality of other methods. In some embodiments, the configuration of the device data then allows for claim formation of the geolocation exchange unit of emission or emission offset and emission or emission offset geolocation claim units. In some embodiments, the carbon or emission credits may be bought or sold by the items transacted in a store on the bioinformatic network or by choices the user 110 makes on selections which have a negative or positive carbon or emission contribution.

Figure 115:
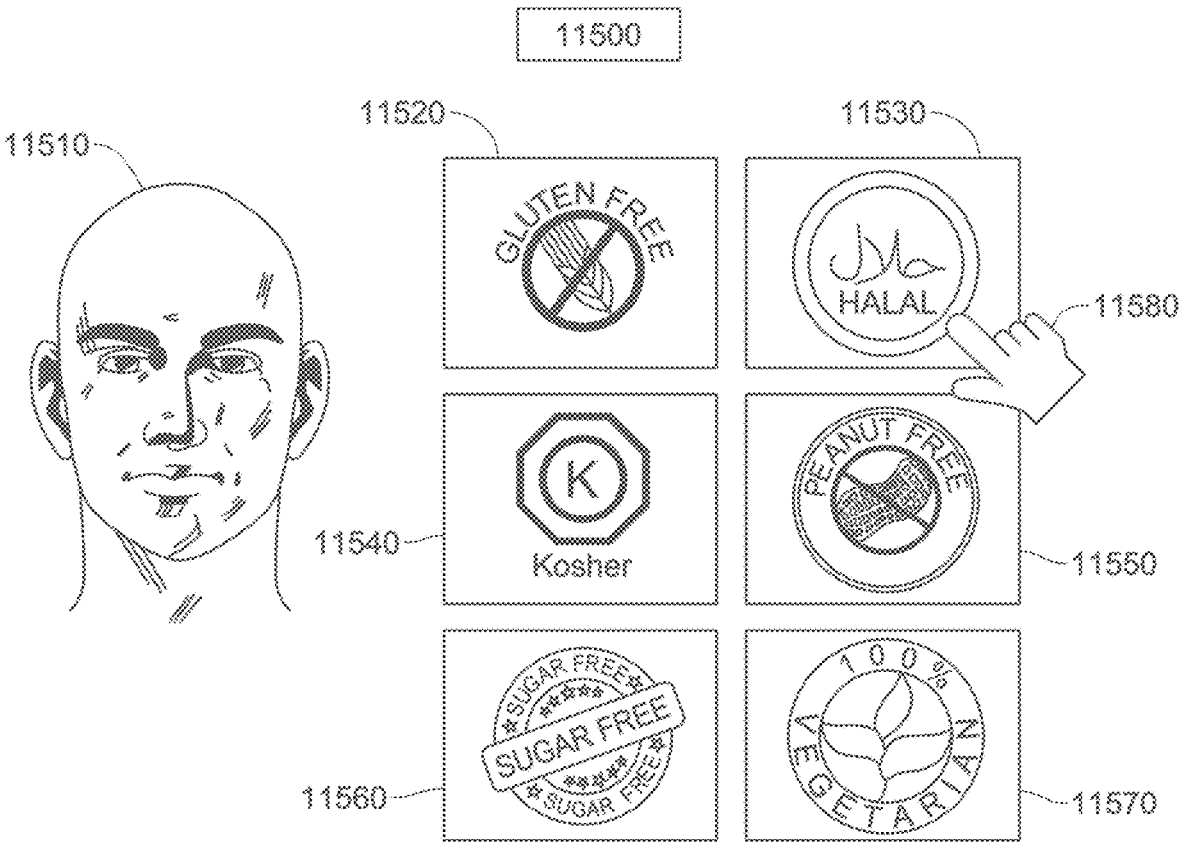

The embodiment illustrated in FIG. 115. Illustrates further a user 11510 may select with the graphical user interface pointer 11580 blood and saliva optimized food which may have a certain type of food designation such as gluten free 11520, halal 11530, kosher 11540, peanut free 11550, sugar free 11560, vegetarian 11570, or drug allergies, or drugs or a plurality of other designations that would be in the preference portfolio vector of the user 11510. In some embodiments, the relative carbon footprints of the food type designation categories may then have positive or negative effects on the value of the associated carbon or emission credits associated with transactions in the categories. In some embodiments, the configuration of the device data then allows for claim formation of the geolocation exchange unit of emission or emission offset and emission or emission offset geolocation claim units.

In one implementation as illustrated in FIG. 116, they method and system may maximize 11610 Foodie and Emission score, user utility (which may include carbon or emission contribution or reduction), nutrient content, flavoring, ethnicity, variety, style, preference, health, delivery subject to a plurality of contribution, constraint and variance data comprised from blood, saliva, hair, urine, stool, fingernail, height, weight and skin sampling analysis samples 10880 to a certified laboratory 10890 through a plurality of options. In some embodiments the biomarker settings may consider blood type, phosphorus levels, platelets, HDL Cholesterol, Thyroid, Hemoglobin, Iron, Vitamin B12, Hematocrit, Ketones, Amylase, Mean Corpuscular Volume, LDL cholesterol, serum protein, blood glucose, magnesium, complete blood count, potassium, red blood cells, calcium, progesterone, white blood cells, electrolytes, creatine kinase, triglycerides, allergen profile, troponin, coagulation panel, celiac, budget, HLA-DQ8 Gene, HLA-DQ2 gene, sums of ingredients, allergies, weight constraints, beta amyloid, serum docosahexaenoic acid, tau phosphorylation, serum low density lipoprotein (LDL), narcotics, hallucinogens, opioids, depressants, anabolic steroids, alcohol, stimulants, statins, human growth hormone, HMG-CoA reductase inhibitors and other measurable biomarkers 11620. In some embodiments, the configuration of the device data and analysis of the data then allows for claim formation of the geolocation exchange unit of emission or emission offset and emission or emission offset geolocation claim units.

Figure 117:
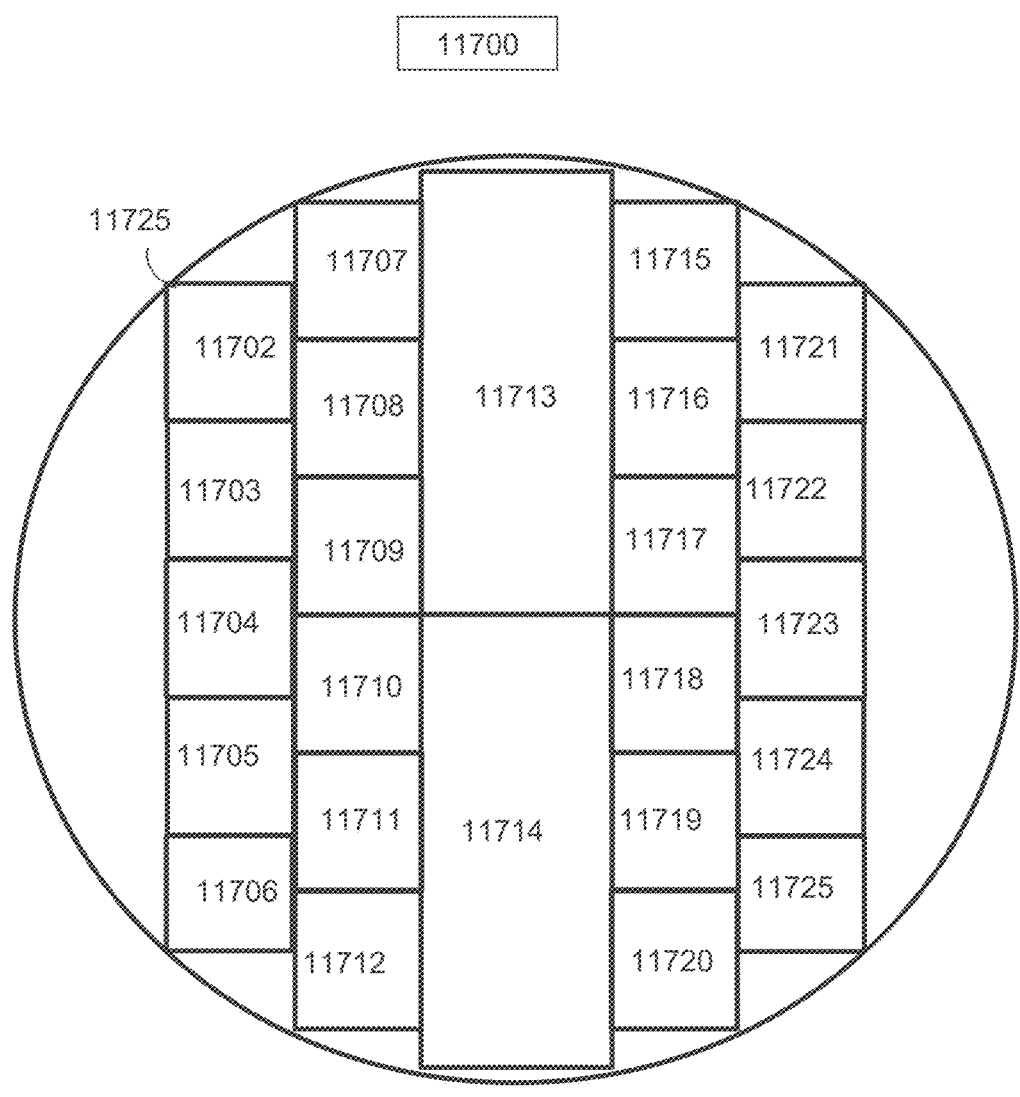
FIG. 117 illustrates computer system hardware in accordance with implementations of various techniques described herein.

The embodiment illustrated in FIG. 117, illustrates the mobile network based ball CPU projection device 11725. In some embodiments, the biomarker optimized food methods and system may be used on any CPU device which is stationary or mobile with access to a network. In one implementation, one configuration of a CPU device which can process the biomarker optimized food methods and system may be the device 11725 which may include a memory 11702, a memory controller 11703, one or more processing units (CPUs) 11704, a peripherals interface 11705, RF circuitry 11706, audio circuitry 11708, one or more speakers 11707 and 11715, a microphone 11709, an input/output (I/O) subsystem 11710, input control devices 11711, an external port 11712, optical sensors 11716, camera 11713, one or more laser projection systems 11714, power supply 11717, battery 11718, wifi module 11719, GPS receiver 11720, accelerometer 11721, Ambient light sensor 11722, location sensor 11723, barometer 11724, USB port 11725. In some embodiments, an analyte sensor may augment the biometric data between biometric panel readings to determine relative glucose changes from a report panel baseline using the blood panel matrices 13500. In some embodiments, analyte sensors may be configured to approximate carbon and emission dietary changes along the carbon and emission blockchain through the weighting matrices 13500 which incorporates dietary choices as well as verifications through analyte sensors and bioinformatic panel readings through the biometric samples 10880. The device 11725 may include more or fewer components or may have a different configuration or arrangement of components. The CPUs 11704 run or execute various instructions compiled by software and applications which are stored in the memory 11702 that perform various functions on the device 11725 such as the biomarker optimized food methods and system. The RF circuitry 11706 receives and sends RF signals. The RF circuitry 11706 converts electrical signals to/from electromagnetic signals and communicates with communications claim networks 10830 and 10850 and other communication devices via the electromagnetic signals. The instructions to perform the mathematic algorithm optimization may be on a local CPU such as 1125 or a cloud based CPU 190. The RF circuitry may be comprised of but not limited to an antenna system, a tuner, a digital signal processor, an analogue signal processor, various CODECs, a SIM card, memory, amplifiers, an oscillator and a transceiver. The wireless communication components may use a plurality of standard industry protocols such as Global System for Mobile Communication ("GSM"), Voice over internet protocol ("VOIP"), long-term evolution ("LTE"), code division multiple access ("CDMA"), Wireless Fidelity ("WiFi"), Bluetooth, Post office Protocol ("POP"), instant messaging, Enhanced Data GSM Environment ("EDGE"), short message service ("SMS"), or other communication protocol invented or not yet invented as of the filing or publish date of this document. The input/output subsystem 11710 couples with input/output peripherals 11705 and other control devices 11711 and other laser projection systems 11714 to control the device 11725. The laser projection system 11714 and camera 11713 take infrared tracking information feedback from the user 10881 into the peripheral interface 11725 and CPU 11704 to combine the data with instructions in the CPU 11704 and memory 11702 that provide an iterative instruction for the graphical user interface which is displayed in the waveguide lens or screen after comparison with information in the memory from the database server 10840. The input control devices 11711 may be controlled by user 10881 movements that are recorded by the laser projection system 11714 and camera 11713. The audio circuitry 11708, one or more speakers 11707 and 11715 and the microphone 11719 provide an audio interface between the user and the device 11725. The audio circuitry 11708 receives audio data from the peripherals interface 11705, converting the data to an electrical signal, and transmits the electrical signal to the speakers 11707 and 11715. The speakers 11707 and 11715 convert the electrical signals to human audible sound waves which are mechano-transducted into electrical impulses along auditory nerve fibers and further processed into the brain as neural signals. The audio circuitry 11708 also receives electrical signals converted by the microphone 11709 from sound waves. The audio circuitry 11708 converts the electrical signal to audio data and transmits the audio data to the peripherals interface 11705 for processing. Audio data may be retrieved and/or transmitted to memory 11702 and/or the RF circuitry 11706 by the peripherals interface 11705. In some embodiments the RF circuitry may produce ultra-high frequency waves that transmit to wireless headphones which then convert the electrical signals to human audible sound waves which are mechanotransducted into electrical impulses along auditory nerve fibers and further processed into the brain as neural signals. The device 11725 also includes a power supply 11717 and battery 11718 for powering the various components. The USB port 11725 may be used for providing power to the battery 11718 for storage of power. The location sensor 11723 couples with the peripherals interface 11705 or input/output subsystem 11710 to disable the device if the device 11725 is placed in a pocket, purse or other dark area to prevent unnecessary power loss when the device 11725 is not being used. The software instructions stored in the memory 11702 may include an operating system (LINUX, OS X, WINDOWS, UNIX, or a proprietary operating system) of instructions of various graphical user interfaces 1200. In some embodiments, the configuration of the device data and device and analysis of the data then allows for claim formation of the geolocation exchange unit of emission or emission offset and emission or emission offset geolocation claim units.

Figure 118:
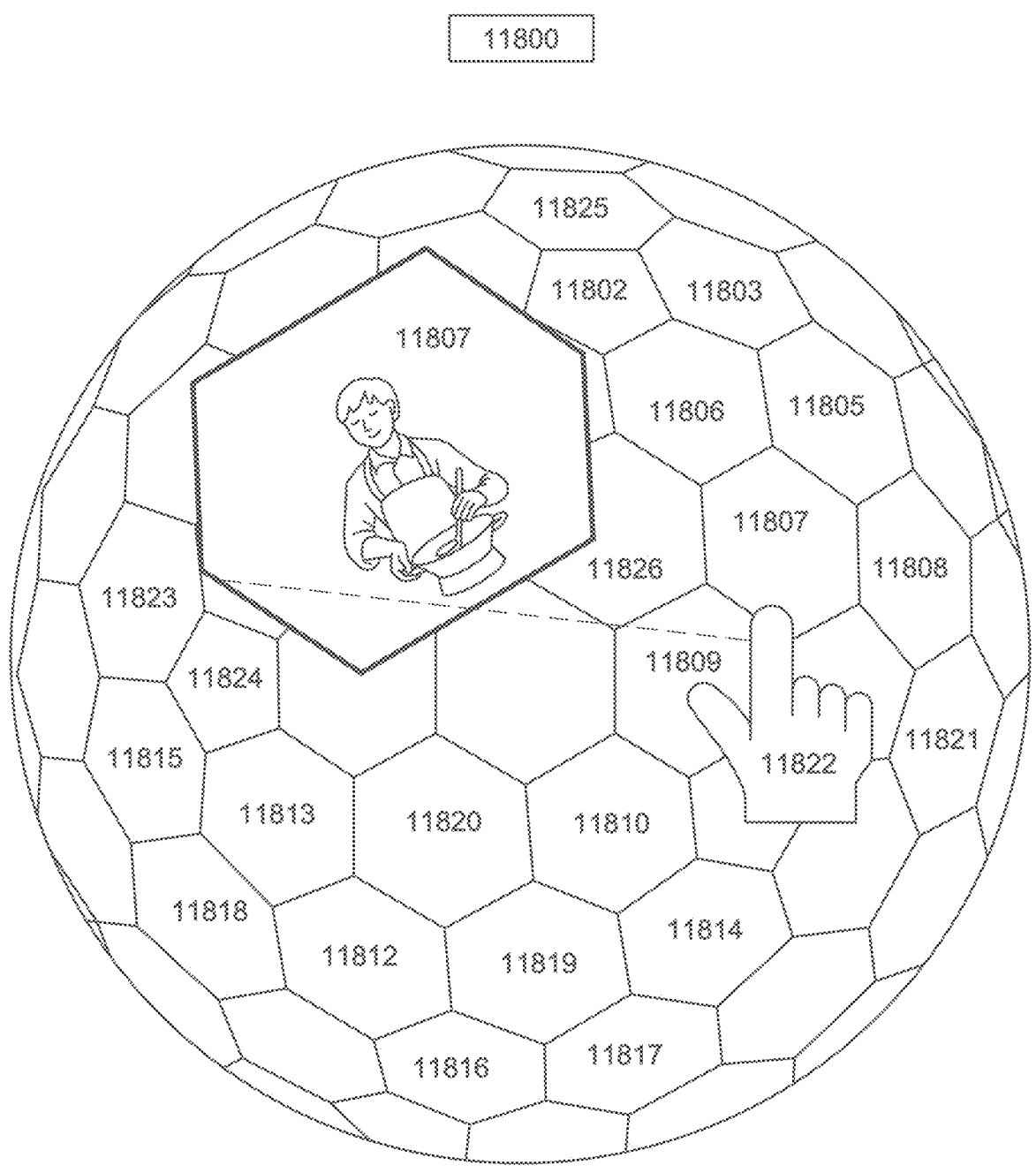
FIG. 118 illustrates a computing system user interface in which the various technologies described herein may be incorporated and practiced.

In some embodiments, the embodiment illustrated in FIG. 118, illustrates the graphical user interface of the system which may include a network based ball CPU form factor projection device 11725 or other form factors for a portable multi-function device. In some embodiments, system may include instructions for object hologram embodiments of a calendar 11801, photos 11812, camera 11812, videos 11809, maps 11811, weather 11802, credit cards 11815, banking 11815, crypto currency 11815, notes, clocks 11813, music 11806, application hosting servers 11820, settings 11820, physical fitness 11803, news 11816, video conferencing 11809, home security 11808, home lighting 11808, home watering systems 11808, home energy 11808 or temperature settings 11808, home cooking 11807, phone 11814, texting services, mail 11818, internet 11817, social networking 11819, blogs 11819, investments 11810, books, television 11809, movies 11809, device location, flashlights, music tuners 11806, airlines 11805, transportation 11805, identification 11819, translation, gaming 11821, real estate 11808, shopping, food 11807, commodities 11815, technology 11817, memberships, applications 11820, web applications 11817, audio media 11806, visual media 11809, mapping or GPS 11811, touch media 11817, drugs and implants and analyte sensors 11826, general communication 11814, internet 11817, mail 11818, contacts 11819, cloud services 11820, games 11821, translation services 11823, virtual drive through with geofence location services for nearby restaurants to allow advance ordering of food and payment 11824 such as the claim biomarker based algorithm to optimize claim formation, side effect data, claim payout, claim damage measurement, personal nutrition, virtual shopping with custom measurements through infrared scans 11825, etc . . . and facilitates communication between various hardware and software components. The biomarker optimized drug and food algorithm application may appear as represented in object 11807 or 11824. The application 11807 or 11824 may scan pictures of drugs or food which has been set for consumption by the user which has not been ordered through the system so that the ingredients or chemicals or implants may be identified and the data included in the blood, analyte and saliva based optimization models of biomarker chemistry. In some embodiments, the configuration of the device data and device and analysis of the data then allows for claim formation of the geolocation exchange unit of emission or emission offset and emission or emission offset geolocation claim units.

Figure 119:
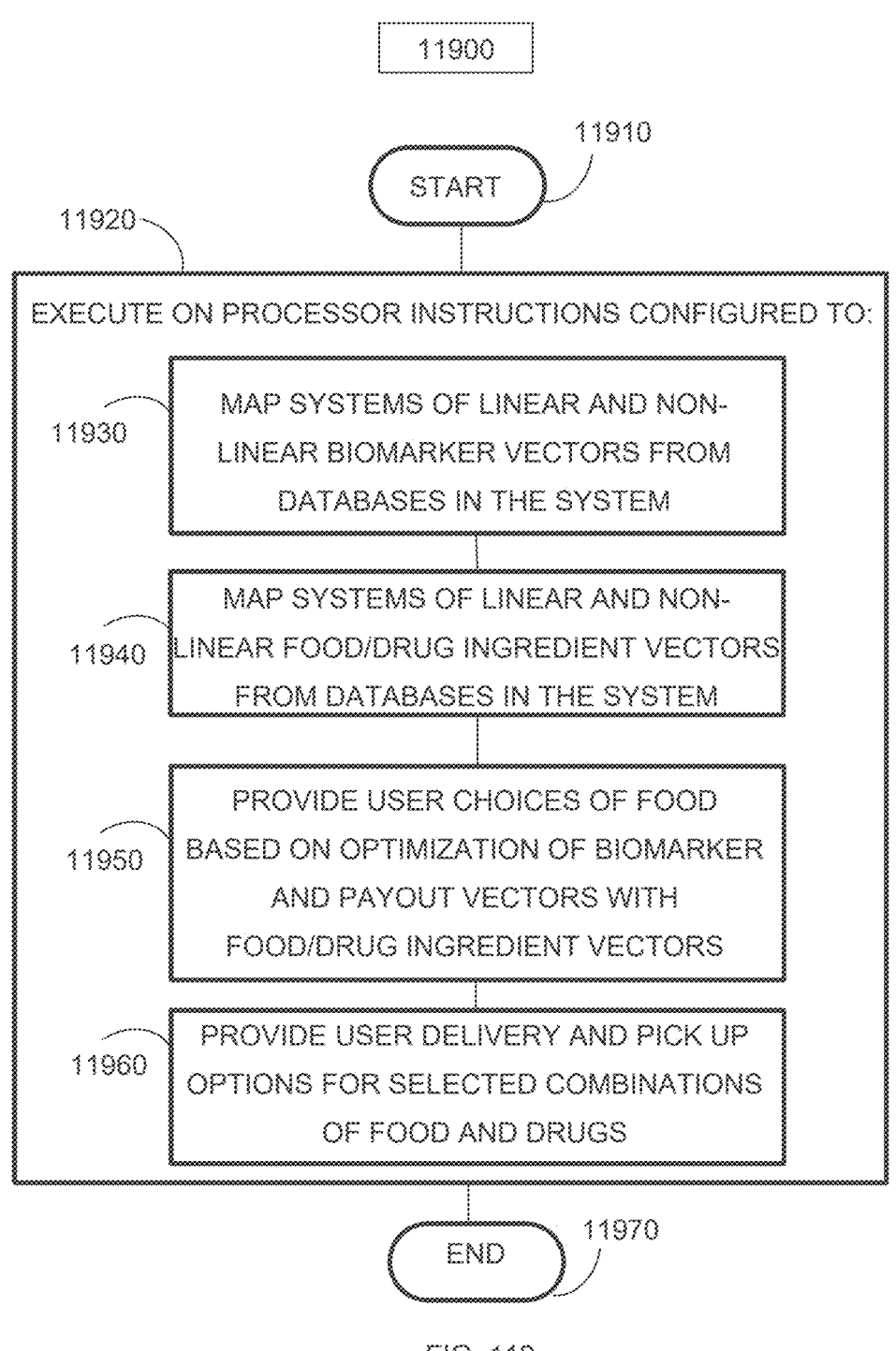
FIG. 119 illustrates a flow chart for node ranking in accordance with implementations of various techniques described herein.

In some embodiments, the process flow diagram in FIG. 119, illustrates implementations of methods and the system where a user 10881 uses the system and methods. In some embodiments, a user 10881 starts 11910 the implementation of the methods and systems by selecting a plurality of options regarding drugs, side effects claims, nutrition, health, variety, flavoring, style, ethnicity and delivery. In some embodiments, the system takes the inputs to execute on a processor instructions configured to 11920 complete the following instructions. In one implementation of the methods, the system maps systems of linear and non-linear blood, saliva, hair, urine, stool, analyte, fingernail, carbon and emission contribution or reduction, height, weight, biomarker, and skin sampling analysis vectors from databases in the system 11930. The map of the system of linear and non-linear blood, carbon and emission contribution or reduction, saliva, hair, urine, stool, fingernail, height, biomarker, weight and skin sampling analysis vectors forms a matrix which will then form the basis of part of the system of optimization equations used to select food options for the user. The system and methods further map systems of linear and non-linear food and drug and implant ingredient vectors from databases in the system 11940 which form a matrix of drug and implant and food nutrition content. The matrices are then multiplied to optimize the weights of ingredients to ensure optimal side effects, carbon or emission credits or claims, claim damage, claim recovery, blood, saliva, hair, urine, stool, carbon and emission contribution or reduction, fingernail, height, weight and skin sampling analysis chemistry for the user's body. The variance-covariance matrix is square and symmetric. In some embodiments, the optimization equation weights have also considered groups of drug and food ingredients that form the basis of prepared meals or prescriptions and recipes which are combinations of ingredients. In some embodiments, the system then provides the user claim formation data, delivery and pick-up options for selected combinations of foods or drugs 11960. The implementation of methods is recursive, and the optimal weights are being adjusted after each human body contact considering the historical ingredients consumed and bio-markers, claim data, side effects, carbon and emission con-tribution or reduction, blood, saliva, hair, urine, stool, fin-gernail, height, weight and skin sampling analysis data that is submitted into the database of the system for node rankings. The techniques and methods discussed herein may be devised with variations in many respects, and some variations may present additional advantages and/or reduce disadvantages with respect to other variations of these and other techniques and methods. Moreover, some variations may be implemented in combination, and some combina-tions may feature additional advantages and/or reduced disadvantages through synergistic cooperation and reweighting of the models through recursive optimization. The variations may be incorporated in various embodiments to confer individual and/or synergistic advantages upon such embodiments. In some embodiments, the configuration of the device data and device and analysis of the data then allows for method and system claim formation of the geolocation exchange unit of emission or emission offset and emission or emission offset geolocation claim units.

In some embodiments, the embodiment of the method and system illustrated in FIGS. 120A and 120B and 120C and 120D illustrates a representative food or drug market with heterogeneous expectations. Traditionally the buyer and seller have very different information (e.g., doctor and patient). In an exemplary scenario, the seller, manufacturer, physician, or cook knows the ingredient attributes whereas the buyer may make a purchase without knowing the ingre-dient attributes or their chemistry effect on the blood, body, carbon or emissions or other biomarkers. Surely the buyer can do research on all the ingredients, but generally the buyer does not have the same resources as the producer of the food who has food scientists and research staff to understand the effects of the ingredient attributes on bio-markers or other aspects of human health. Similarly, a mother or father may make a batch of cookies for their child thinking that the act of making cookies is showing love to their child if consumed in reasonable quantities. However, if the father or mother did not know their child was gluten intolerant or had celiac disease, then they were unknowingly inflicting pain on their child through the dietary choice. The implementation of the method and system also considers the asymmetric information between pharmaceutical companies (great amounts of scientists, chemists, PhDs, etc.) and those who are prescribed the drugs and products (consumers with considerably less resources). The implementation of the method considers that it is very costly for buyers and sellers of food or drugs to have homogeneous information or even to reduce heterogeneous information so that people make less sub-optimal drug or food choices as consumers or that stores offer the wrong types of food to their primary demo-graphics and customers. The implementation of the method has provided a solution for these problems and has greatly reduced or nearly eliminated the problem of heterogeneous information on food ingredients relative to personal bio-markers, blood, saliva, hair, urine, stool, fingernail, height, weight and skin sampling analysis chemistry. The imple-mentation of the method allows both the pharmaceutical company, hospital, physician, restaurant and the customer or patient to speak the same language of food and drug chem-istry for the respective biomarker chemistry while consid-ering side effects, claim data, flavor, ethnicity, or style preferences. The implementation of the method allows both the family meal cook and the family member or friend to speak the same language of food chemistry for the respec-tive blood, saliva, hair, urine, stool, fingernail, carbon and emission contribution or reduction, height, weight and skin sampling analysis chemistry while considering flavor, eth-nicity, or style preferences. The implementation of the method allows both host of a party and all the guests to speak the same language of food chemistry for the respective blood, saliva, hair, urine, stool, fingernail, height, carbon and emission contribution or reduction, weight and skin sam-pling analysis chemistry of guests while considering flavor, ethnicity, or style preferences. Blood tests and saliva samples and biomarker samples historically have been costly which add to the problem of heterogeneous informa-tion between food, drug, implant provider and consumer. The implementation of the method and system may cover the cost of the biomarker, blood, saliva, hair, carbon and emission contribution or reduction, urine, stool, fingernail, height, weight and skin sampling analysis test which can be self-administered with system equipment or administered by a lab in the system and method network. The method and system may reduce the overall food consumption of the user by providing mathematically rigorous drug side effect analy-sis, food nutritional for the consumer's biomarkers, blood, saliva, carbon and emission contribution or reduction, hair, urine, stool, fingernail, height, weight and skin sampling analysis which reduces food waste, medical malpractice, predatory pharmaceutical practices and wasted calorie con-sumption. The biomarker blood, saliva, hair, urine, carbon and emission contribution or reduction, stool, fingernail, height, weight and skin sampling analysis test may be self-administered through method and system equipment that is sent to the user or administered by a lab in the system or locally processed through a plurality of analyte sensors. To quantify embodiments of the method and system 12000, FIG. 120A illustrates a general claim utility function. The system and method assigns a utility function or "Foodie and Emission Score" or "Claim utility" or "side effect utility" or "carbon intensity" 12010 to their medical or incident claim issue or diet preferences which ranks through a series of neural network feedback on drug chemistry, body biomarker feedback, claim recovery, food styles, ethnicity, variety, flavoring. The equation 12010 has the following variables, F(Foodie and Emission score) or F(biomarker score) which is the utility function, E(Bblood chemistry) which is the current biomarkers, blood, saliva, hair, urine, stool, finger-nail, height, weight and skin sampling analysis chemistry of a portfolio of ingredients minus 0.005 which is a scaling convention that allows the system and method to express the current biomarkers, blood, saliva, hair, urine, carbon and emission contribution or reduction, stool, fingernail, height, weight and skin sampling analysis chemistry of a portfolio of ingredients and the standard deviation of those ingredi-ents to be a percentage rather than a decimal. The term A in 12010, is an index of the user's preference, which is derived from using neural networks that have been trained on the users preferences. In some embodiments, the term A in 12010 is continually updated in a recursive fashion to reflect the user's preferences in style, ethnicity, flavoring or other characteristics. In some embodiments, the sigma term squared in 12010 is the variance is of the blood chemistry of a portfolio of ingredients. In some embodiments, the bio-marker utility function or Foodie and Emission score 12010 represents the notion that the biomarker utility is enhanced or goes up when the biomarker, blood, saliva, hair, urine, carbon and emission contribution or reduction, stool, fin-gernail, height, weight and skin sampling analysis chemistry is within target and diminished or reduced by high variance blood chemistry or blood chemistry which brings the user out of target ranges. In some embodiments, the utility function may be inverted to solve for claim damages or high side effect levels from certain implants or drugs in chemistry testing. In some embodiments, the extent by which the plaintiff, Foodie and Emission or user is negatively affected by blood chemistry variance biomarker variance or biomarker, blood, saliva, hair, carbon and emission contribution or reduction, urine, stool, fingernail, height, weight and skin sampling analysis chemistry variance outside of target ranges depends on the term A in 12010 which is the user's preference index. More dietary sensitive Foodie and Emissions or user's may have a higher term A index value as their blood, saliva, hair, urine, stool, fingernail, height, weight and skin sampling analysis chemistry is disadvantaged more by biomarker, blood, carbon and emission contribution or reduction, saliva, hair, urine, stool, fingernail, height, weight and skin sampling analysis chemistry variance and out of range blood, saliva, hair, urine, stool, fingernail, height, weight and skin sampling analysis chemistry. Claim Plaintiff's or Foodie and Emission's or user's may pick meals or portfolios of ingredients based on the highest F(biomarker score) or F(Foodie and Emission score) in the equation 12010 which also may be inverted to measure maximum negative utility as well as positive utility. In some embodiments, search recipe for drug or implant or food and beverage combinations may be node ranked based on claim recovery ranking, claim credit, or on the distance of the drug or food combination portfolio value and the Foodie and Emission utility function 12010 or a plurality of other factors. If a drug or implant or food ingredient or portfolio of ingredients has no variance to blood chemistry of the user, then a selection will have a utility or biomarker score or Foodie and Emission Score of the expected biomarker chemistry without variance as the sigma term in equation 12010 is equal to zero. Equation 12010 provides a benchmark for the system and method to evaluate drug or implant ingestion or meals effect on biomarker chemistry. In some embodiments, in the implementation of the method according to equation 12010, the term A determines preferences of the user which then may cause as certain drugs or implants or meals to be accepted or rejected based upon the effect to blood, saliva, hair, carbon and emission contribution or reduction, urine, stool, fingernail, height, weight and skin sampling analysis chemistry.

In some embodiments, the implementation of the system and method is further represented in equations 12020 to take a simple two state case of biomarker chemistry for an exemplary user. In some embodiments, if a user has an initial biomarker blood, saliva, hair, urine, stool, fingernail, carbon and emission contribution or reduction, height, weight and skin sampling analysis chemistry (each biomarker may be represented as short form "blood chemistry") represented as a vector of attributes and assume two possible results after eating an ingredient or a portfolio of ingredients as a meal with a vector of blood, saliva, hair, urine, stool, fingernail, height, weight and skin sampling analysis chemistry attributes. The probability of state one is p for state of Blood Chemistry 1 and a probability of (1-p) for the state two of blood chemistry 2. In some embodiments, accordingly, the expected value of blood chemistry as illustrated in the set of equations 1430 is E(Blood chemistry) equals probability p multiplied by blood, saliva, hair, urine, stool, fingernail, height, weight and skin sampling analysis chemistry state 1 plus probability (1-p) multiplied by blood, saliva, hair, carbon and emission contribution or reduction, urine, stool, fingernail, height, weight and skin sampling analysis chemistry state 2. The variance or sigma squared of the blood, saliva, hair, urine, stool, fingernail, height, weight and skin sampling analysis chemistry is represented in 12040. In some embodiments, the configuration of the device data and device and analysis of the data then allows for method and system claim formation of the geolocation exchange unit of emission or emission offset and emission or emission offset geolocation claim units.

Figure 121A:
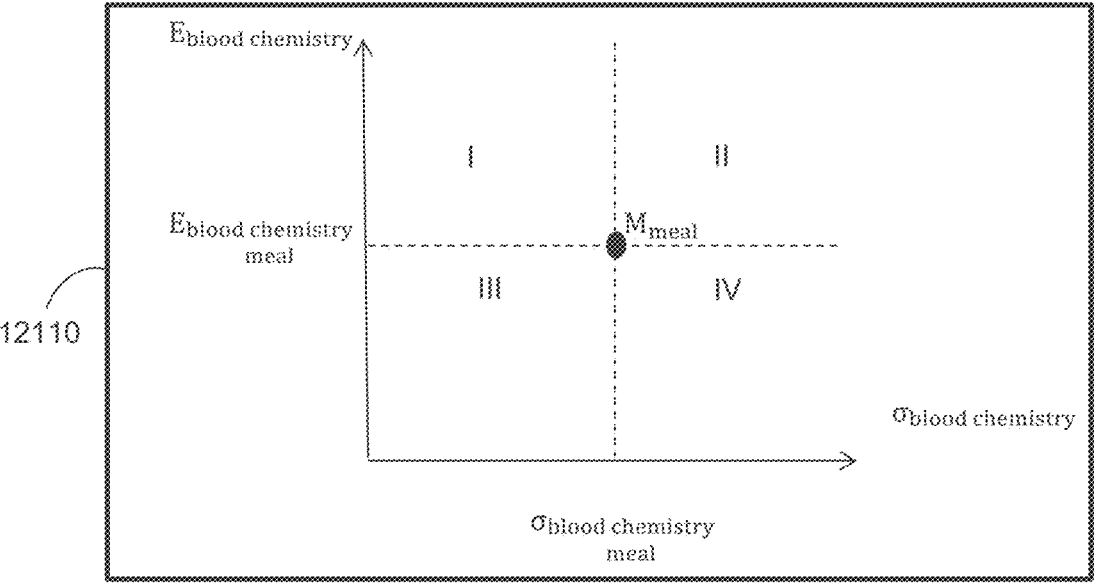
Figure 121B:
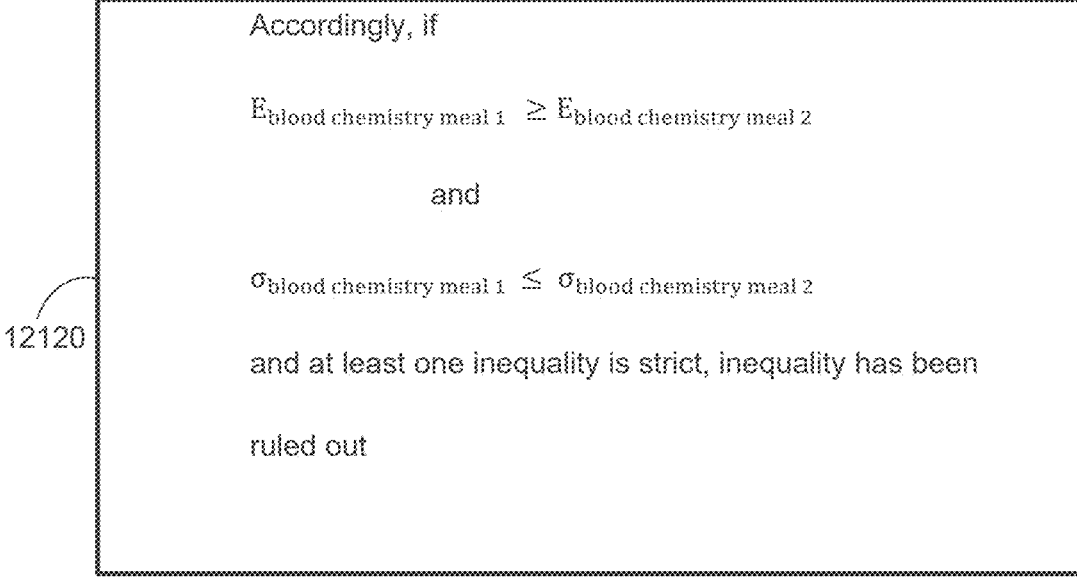

The embodiment of the method and system in FIG. 121A represents the tradeoff between the standard deviation of biomarker, blood, carbon and emission contribution or reduction, saliva, hair, urine, stool, fingernail, height, weight and skin sampling analysis chemistry of a drug or meal and the expected return of the blood, saliva, hair, urine, stool, fingernail, height, carbon and emission contribution or reduction, weight and skin sampling analysis chemistry of a drug or meal 12110. Meal or Drug or Ingredient combination M 12110 is preferred by Foodie and Emissions or users with a high term A index value 12010 to any alternative meal in quadrant IV 12010 because the expected value of the blood chemistry of the meal is expected to be equal to or greater than any meal in quadrant IV and a standard deviation of the meal blood chemistry is smaller than any drug or meal combination in that quadrant. Conversely, any meal or drug M in quadrant I is preferable to meal or drug M 12010 because its expected blood chemistry is higher than or equal to meal M 12010 and the standard deviation of the blood chemistry of the meal or drug M is equal to or smaller than meal or drug M 12010. FIG. 120B represents the inequality condition. Accordingly, if the expected value of the blood chemistry of a certain meal 1 is greater than or equal to the expected value of the blood chemistry of a certain meal 2 12020 and the standard deviation of the blood chemistry of a certain meal or drug 1 is less than or equal to the standard deviation of the blood chemistry of a certain meal or drug 2 12020, at least one inequality is strict which rules out inequality 12020.

Figures 122A, 122B:
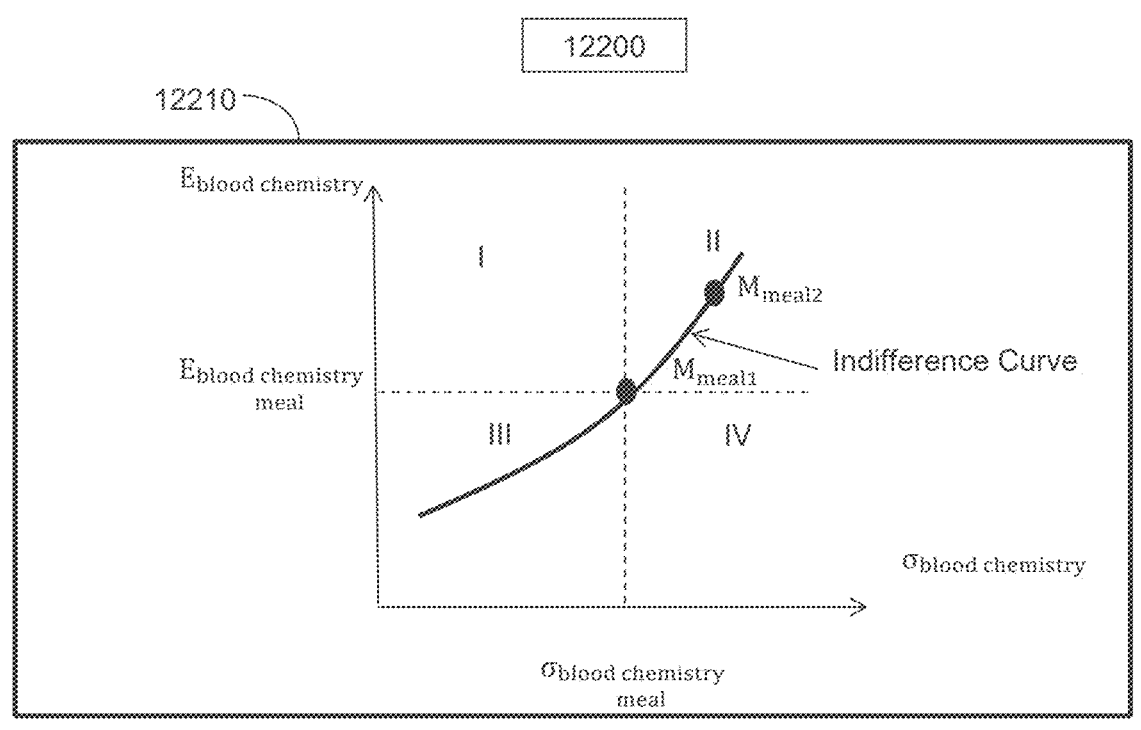

The embodiment of the method and system in FIG. 122A supposes a user, claim plaintiff or Foodie and Emission identifies all the drug combinations or meals that are equally attractive from a utility (carbon and emission contribution or reduction) and blood chemistry perspective to meal or drug M1 12210, starting at point meal or drug M1 12210, an increase in standard deviation of the blood chemistry of the meal lowers utility and must be compensated for by an increase in the expected value of the blood chemistry. In some embodiments, thus meal, drug, or implant M2 is equally desirable to the claim plaintiff or user or Foodie and Emission as meal or drug M1 along the indifference curve 12210. Foodie and Emissions are equally attracted to meals with higher expected value of blood chemistry and higher standard deviation of blood chemistry as compared to meals with lower expected value of blood chemistry and lower standard deviation of blood chemistry along the indifference curve 12210. Equally desirable drug combinations or meals lie on the indifference meal curve that connects all meals or drugs or implants with the same utility value 12210.

The embodiment of the method and system in FIG. 122B examines meals along a claim plaintiff, user or Foodie and Emissions indifference curve with utility values of several possible meals or drug or implant combinations for a claim plaintiff, user or Foodie and Emission with a term A index value of 4. 12220. The table of combinations of meals 12220 illustrates as one embodiment an expected value of blood chemistry of a meal or drug index of 10 and a standard deviation of the blood chemistry of the meal of 20% 12220. In some embodiments, accordingly the biomarker score or Foodie and Emission Score or utility function is therefore 10 minus 0.005 multiplied by 4 multiplied by 400 equals 2 as a utility score. FIG. 122B also illustrates 3 additional examples of various expected values of meal blood chemistry and standard deviation of a meals blood chemistry 12220.

FIG. 120A, FIG. 120B, FIG. 121A, FIG. 121B, FIG. 122A, FIG. 122B discuss the blood chemistry of a meal for a particular claim plaintiff, user or Foodie and Emission. Such meals, implants or drug combinations are composed of various types of ingredients. In some embodiments, claim plaintiffs, users, Foodie and Emissions may eat or ingest single ingredients, drugs, implants, meals, or carbon related to the ingestions or implants which combine ingredients. In some embodiments, adding a certain ingredient increased the utility of a Foodie and Emission's blood chemistry, while in some embodiments adding an ingredient decreases the utility. In many contexts, "Health Food" offsets the effects of "Unhealthy Food." In one embodiment, a drug such as statins may reduce cholesterol but reduce platelet count or cause diarrhea or constipation. In one embodiment, dark statin ingredient chemical structure is a power source of antioxidants which raises the utility of the blood chemistry. In one embodiment, statin ingredient chemical structure may raise HDL cholesterol and protect LDL Cholesterol against oxidization. In another embodiment, too much statin ingredient chemical structure may lower the utility of blood chemistry as it is high in saturated fat and sugar. In another embodiment, excessive sugar spikes the blood glucose chemistry which contributes to calories that do not have much nutrient value for the blood chemistry utility function which puts as risk weight gain and other health complications. In one implementation of the method and system, a claim plaintiff, user or Foodie and Emission may think it is counterintuitive adding a seemingly indulgent ingredient or recipe that may actually increase the blood chemistry performance as it can reduce the build-up of unwanted attributes and reduce the risk or standard deviation of the Foodie and Emission's blood chemistry towards and unwanted outcome. Although statin ingredient chemical structure in and of itself may have an uncertain outcome and a negative effect on blood chemistry. Statin ingredient chemical structure combined with other ingredients and recipes may have an overall benefit towards blood chemistry. The helpful effects come from a negative correlation of individual ingredients. The negative correlation has the effect of smoothing blood chemistry variance for a certain Foodie and Emission user. In some embodiments, carbon or emissions may be a carcinogen or co-carcinogen, in other words, carbon or emission make a known carcinogen such as nicotine more carcinogenic when it enters the body as measured by a plurality of biomarkers, in such case, the utility of the carbon or emission credit value may contribute to the optimization utility and cause a reweighting the inputs. In some embodiments, carbon or emissions tied to food ingestion such as animal products which have a high carbon footprint as compared to a plant which actually has a negative carbon footprint whereby it absorbs pollutants may be compared and valued to estimate the quantity or value of the generated carbon or emission credit which may be verified by the blockchain or epichain. Further, in some embodiments, carbon or emission credits or claims may have an increased or decreased correlation to the ingestion portfolio and thereby have a negative or positive contribution to the utility equation and rankings 12220.

The embodiment of the method and system in FIG. 123A examines one exemplary probability distribution of a particular ingredient affecting the blood chemistry of a Foodie and Emission or user 12310. State 1 probability of the opioid ingredient chemical structure is 0.5 in table 12310 and the expected value of the opioid ingredient chemical structure is to increase the blood chemistry by 25% towards the target blood chemistry range 12310, State 2 probability of the opioid ingredient chemical structure is 0.3 in table 12310 and the expected value of the opioid ingredient chemical structure is to increase the blood chemistry by 10% towards the target blood chemistry range 12310, State 3 probability of the opioid ingredient chemical structure is 0.2 in table 12310 and the expected value of the opioid ingredient chemical structure is to decrease the blood chemistry by 25% towards the target blood chemistry range 12310. In some embodiments, accordingly the effect on the claim plaintiff, user, or Foodie and Emission's blood chemistry is the mean or expected return on blood chemistry of the ingredient is a probability weighted average of expected return on blood chemistry in all scenarios 12320. Calling Pr(s) the probability scenario s and r(s) the blood chemistry return in scenario s, we may write the expected return E(r) of the ingredient on blood chemistry, as is done in 12320. In FIG. 123B applying the formula of expected return of opioid ingredient chemical structure on blood chemistry 12320 with the three possible scenarios in 12310 the expected return of opioid ingredient chemical structure on blood chemistry of the claim plaintiff, user, or Foodie and Emission is 10.5% toward the target range in example 12320. The embodiment of the method and system in FIG. 123C illustrates the variance and standard deviation of opioid ingredient chemical structure on blood chemistry is 357.25 for variance and 18.99% for standard deviation 12330. In some embodiments, the carbon footprint of opioids may be considered, the environmental effects (eg, CO2 equivalent ('CO2 e') emissions and water use) of producing 100 mg of morphine. All aspects of morphine production from poppy farming, pelletizing, bulk morphine manufacture through to final formulation. Industry-sourced and inventory-sourced databases were used for most inputs. Morphine sulfate (100 mg in 100 mL) had a climate change effect of 204 g $CO_2$ e (95% Cl 189 to 280 g $CO_2$ e), approximating the $CO_2$ e emissions of driving an average car 1 km. and Water use was 7.8 L (95% Cl 6.7- to 9.0 L), primarily stemming from farming (6.7 L). All other environmental effects were minor and several orders of magnitude less than $CO_2$ e emissions and water use. Almost 90% of $CO_2$ e emissions occurred during the final stages of 100 mg of morphine manufacture. Morphine's packaging contributed 95 g $CO_2$ e, which accounted for 46% of the total $CO_2$ e (95% Cl 82 to 155 g $CO_2$ e). Mixing, filling and sterilization of 100 mg morphine bags added a further 86 g $CO_2$ e, which accounted for 42% (95% Cl 80 to 92 g $CO_2$ e). Poppy farming (6 g $CO_2$ e, 3%), pelletizing and manufacturing (18 g $CO_2$ e, 9%) made smaller contributions to $CO_2$ emissions. In some embodiments, the environmental effects of growing opium poppies and manufacturing bulk morphine were small. The final stages of morphine production, particularly sterilization and packaging, contributed to almost 90% of morphine's carbon footprint. In some embodiments, focused measures to improve the energy efficiency and sources for drug sterilization and packaging could be explored as these are relevant to all drugs. Such comparisons of the environmental effects of the production of other drugs and between oral and intravenous preparations may be considered in their relative contributions under models in FIG. 123A and FIG. 123B and FIG. 123C.

In some embodiments, exemplary embodiments of scenario probabilities vary amongst blood types and composites, so the method and system is not limited to a single set of weights, but rather the system learns new weights using neural network probability weightings with iterative feedback from biomarker sampling to ascertain recursive effects of food chemistry onto blood chemistry.

In an exemplary embodiment in FIG. 124A, the blood chemistry of a vector of ingredients is the weighted average of the biomarker or blood chemistry of each individual ingredient, so the expected value of the biomarker or blood chemistry of the meal is the weighted average of the blood chemistry of each individual ingredient 12410. In the exemplary two ingredient combination of opioid ingredient chemical structure and statin ingredient chemical structure in 1810, the expected value of the combined blood chemistry is 7.75% toward the target blood chemistry range. The weight of an ingredient may be represented to incorporate serving size and calorie count as part of the measure 1810 of how ingredients affect blood chemistry.

In an exemplary embodiment in FIG. 18B, the standard deviation of the blood chemistry of the combined ingredients including carbon and emissions is represented in 1820.

Because the variance reduction in the combination since the foods were not perfectly correlated, the exemplary implementation of the method and system illustrates that a Foodie and Emission or User may be better off in their blood chemistry by adding ingredients which have a negative correlation yet positive expected value gain to blood chemistry because the variance of the blood chemistry has been reduced. To quantify the diversification of various drug and implant and food ingredients we discuss the terms of covariance and correlation. The covariance measures how much the blood chemistry of two ingredients or meals move in tandem. A positive covariance means the ingredients move together with respect to the effects on blood chemistry. A negative covariance means the ingredients move inversely with their effect on blood chemistry. To measure covariance, we look at surprises of deviations to blood chemistry in each scenario. In the following implementation of the method and system as stated in 12430 the product will be positive if the blood chemistry of the two ingredients move together across scenarios, that is, if both ingredients exceed their expectations on effect on blood chemistry or both ingredients fall short together. If the ingredients effect on blood chemistry move in such a way that when Opioid ingredient chemical structure has a positive effect on blood chemistry and statin ingredient chemical structure has a negative effect on blood chemistry, then the product of the equation in 12430 would be negative. Equation 12440 in FIG. 124D is thus a good measure of how the two ingredients move together to effect blood chemistry across all scenarios which is defined as the covariance.

In an exemplary embodiment in FIG. 125A, an easier statistic to interpret than covariance is the correlation coefficient which scales the covariance to a value between negative 1 (perfect negative correlation) and positive 1 (perfect positive correlation). The correlation coefficient between two ingredients equals their covariance divided by the product of the standard deviations. In FIG. 125A, using the Greek letter rho, we find in equation 12510 the formula for correlation in an exemplary embodiment. The correlation equation 12510 can be written to solve for covariance or correlation. Studying equation 12510, one may observe that foods which have a perfect correlation term of 1, have their expected value of blood chemistry as just the weighted average of the any two ingredients. If the correlation term in 1910 has a negative value, then the combination of ingredients lowers the standard deviation of the combined ingredients. The mathematics of equations 12510 and 12520 show that drugs or implants or foods can have offsetting effects which can help overall target blood chemistry readings and health. Combinations of ingredients where the ingredients are not perfectly correlated always offer a better combination to reduce blood chemistry volatility while moving more efficiently toward target ranges.

In an exemplary embodiment in FIG. 125B, the impact of the covariance of individual ingredients on blood chemistry is apparent in the following formula 12520 for biomarker or blood chemistry variance.

The most fundamental decision of a claim plaintiff, user or Foodie and Emission is how much of each drug or food should one eat? And how will it affect my health and blood chemistry. Therefore, one implementation of the method and system covers the blood chemistry tradeoff between combinations of ingredients or dishes or various portfolios of ingredients or recipes or meals or prepared dishes or restaurant entrees.

In an exemplary embodiment in FIG. 125C, recalling the biomarker score or Foodie and Emission Score or Utility equation of a user 12010, the Foodie and Emission attempts to maximize his or her utility level or Foodie and Emission score by choosing the best allocation of a portfolio of ingredients or menu selection written as equation 12530. Note that to anyone skilled in the art the negative scenario could be similarly modeled to optimize for the worst or most negative influence on biomarkers or most harmful influence.

Constructing the optimal portfolio of ingredients or a drug combination or recipe or menu or meal is a complicated statistical task. The principle that the method and system follow is the same used to construct a simple two ingredient recipe or combination in an exemplary scenario. To understand the formula for the variance of a portfolio of ingredients more clearly, we must recall that the covariance of an ingredient with itself is the variance of that ingredient such as written in FIG. 126A. Wing1 and Wing2 12610 are short for the weight associated with ingredient or meal 1 and ingredient or meal 2. The matrix 12610 is simply the bordered covariance matrix of the two ingredients or meals.

In the embodiment of the method and system in FIG. 126B, the descriptive statistics for two ingredients are listed as the expected value and standard deviation as well as covariance and correlation between the exemplary ingredients 12620. The parameters for the joint probability distribution of returns are shown in FIG. 126B.

In other embodiments of the method and system in FIG. 126A and FIG. 126B illustrate an exemplary scenario of experiment with different proportions to observe the effect on the expected blood chemistry and variance of blood chemistry. Suppose the proportion of the meal weight of opioid ingredient chemical structure is changed. The effect on the blood chemistry is plotted in FIG. 126A. When the proportion of the meal that is opioid ingredient chemical structure varies from a weight of zero to one, the effect on blood chemistry change toward the target goes from 13% (expected blood chemistry of statin ingredient chemical structure) to 8% (expected blood chemistry of opioid ingredient chemical structure). Of course, varying proportions of a meal also has an effect on the standard deviation of blood chemistry. FIG. 126B presents various standard deviation for various weights of opioid ingredient chemical structure and statin ingredient chemical structure 12620.

Figures 127A, 127B:
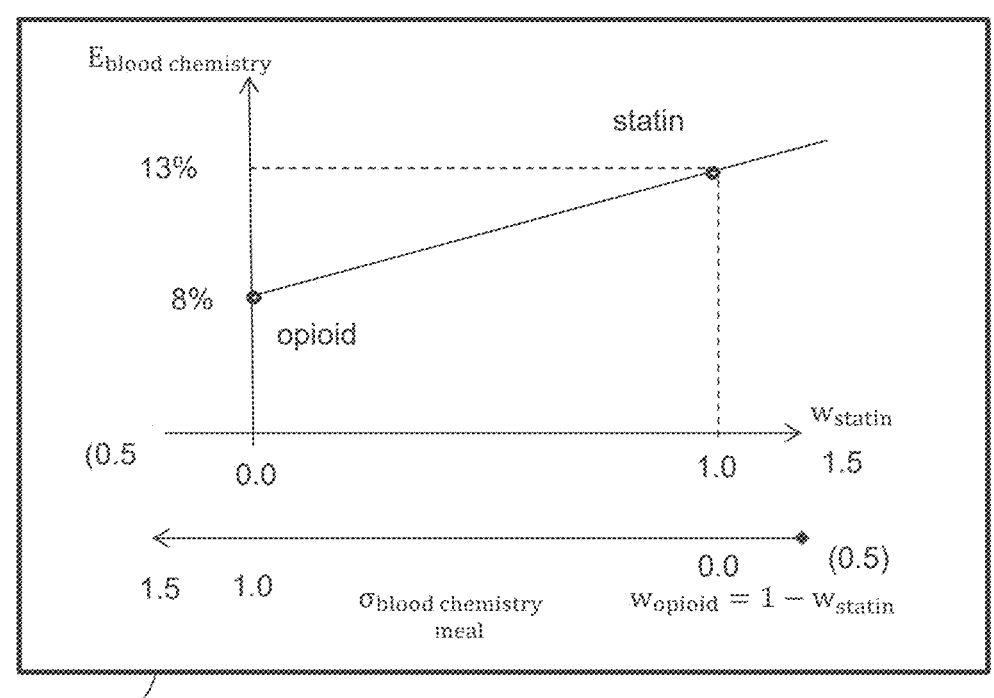

In the exemplary case of the meal combination blood chemistry standard deviation when correlation rho is at 0.30 in FIG. 127A. In some embodiments, the thick curved black line labeled rho=0.3 in FIG. 12710. Note that the combined meal blood chemistry of opioid ingredient chemical structure and statin ingredient chemical structure is a minimum variance combination that has a standard deviation smaller than that of either opioid ingredient chemical structure or statin ingredient chemical structure as individual ingredients. FIG. 127A highlights the effect of ingredient combinations lowering overall standard deviation. The other three lines in FIG. 127A show how blood chemistry standard deviation varies for other values of the correlation coefficient, holding the variances of the ingredients constant. The dotted curve where rho=0 in FIG. 127A depicts the standard deviation of blood chemistry with uncorrelated ingredients. With the lower correlation between the two ingredients, combination is more effective and blood chemistry standard deviation is lower. We can see that the minimum standard deviation of the meal combination in table 12720 shows a value of 10.29% when rho=0. Finally, the upside down triangular broken dotted line represents the potential case where rho=−1 and the ingredients are perfectly negatively correlated 12710. In the rho=−1 case 12710, the solution for the minimum variance combination is an opioid ingredient chemical structure weight of 0.625 and a statin ingredient chemical structure weight of 0.375 in FIG. 127A. The method and system can combine FIG. 127A and FIG. 127A to demonstrate the relationship between the ingredients combination's level of standard deviation to blood chemistry and the expected improvement or decline in expected blood chemistry given the ingredient combination parameters 12720.

The embodiment illustrated in FIG. 127B shows for any pair of ingredients or meals which may be illustrated for an exemplary case, but not limited to the exemplary case w(statin ingredient chemical structure) and w(opioid ingredient chemical structure), the resulting pairs of combinations from 12710 and 12720 and 12710 are plotted in 12720. The solid curved line in 12720 labeled with rho=0.3 shows the combination opportunity set while correlation equals 0.3. The name opportunity set is used because it shows the combination of expected blood chemistry and standard deviation of blood chemistry of all combinations that can be constructed from the two available ingredients. The broken dotted lines show the combination opportunity set for the other values of the correlation coefficient. The line farthest to the right, which is the straight line connecting the combinations where the term rho equals one, shows there are no benefits to blood chemistry from combinations between ingredients where the correlation between the two ingredients is perfectly positive or where the term rho equals one. The opportunity set is not "pushed" to the northwest. The curved dotted line to the left of the curved solid line where the term rho equals zero shows that there are greater benefits to biomarker or blood chemistry when the correlation coefficient between the two ingredients is zero than when the correlation coefficient is positive 12720. Finally, the broken line where the term rho equals negative one shows the effect of perfectly negative correlation between ingredients. The combination opportunity set is linear but offers the perfect offset between ingredients to move toward target blood chemistry 12720. In summary, although the expected blood chemistry of any combination of ingredients is simply the weighted average of the ingredients expected blood chemistry, this is not true for the combination of ingredients standard deviation. Potential benefits from combinations of ingredients arise when correlation is less than perfectly positive. The lower the correlation coefficient, the greater the potential benefit of combinations. In the extreme case of perfect negative correlation between ingredients, the method and system show a perfect offset to blood chemistry, and we can construct a zero-variance combination of ingredients 12720.

In another embodiment, suppose the exemplary case where the claim plaintiff, or user or Foodie and Emission wishes to select the optimal combination from the opportunity set. The best combination will depend upon the Foodie and Emission's preferences and aversion to the standard deviation of ingredients. Combinations of ingredients to the northeast in FIG. 127B provide higher movements towards expected target blood chemistry but impose greater levels of volatility of ingredients on blood chemistry. In some embodiments, the best trade-off among these choices is a matter of personal preference. In other embodiments, Foodie and Emission's with greater desire to avoid volatility in their blood chemistry will prefer combinations of ingredients in the southwest quadrant of the diagram 12710, with lower expected movement toward target blood chemistry, but lower standard deviation of blood chemistry 12720.

Figure 128A:
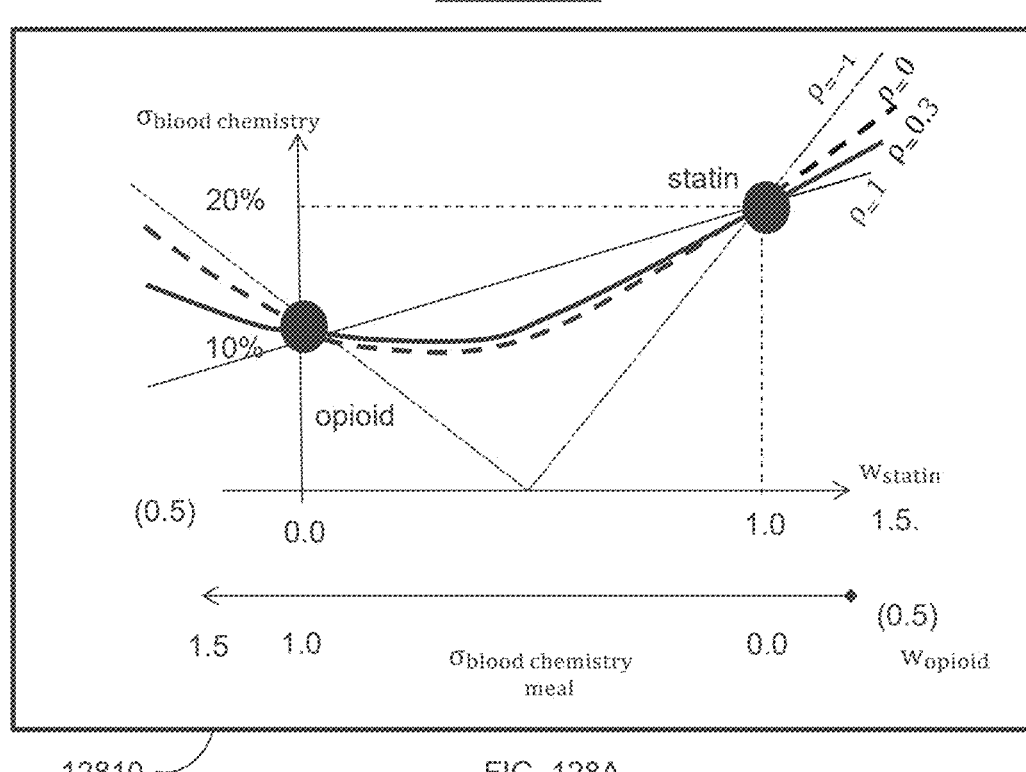
Figure 128B:
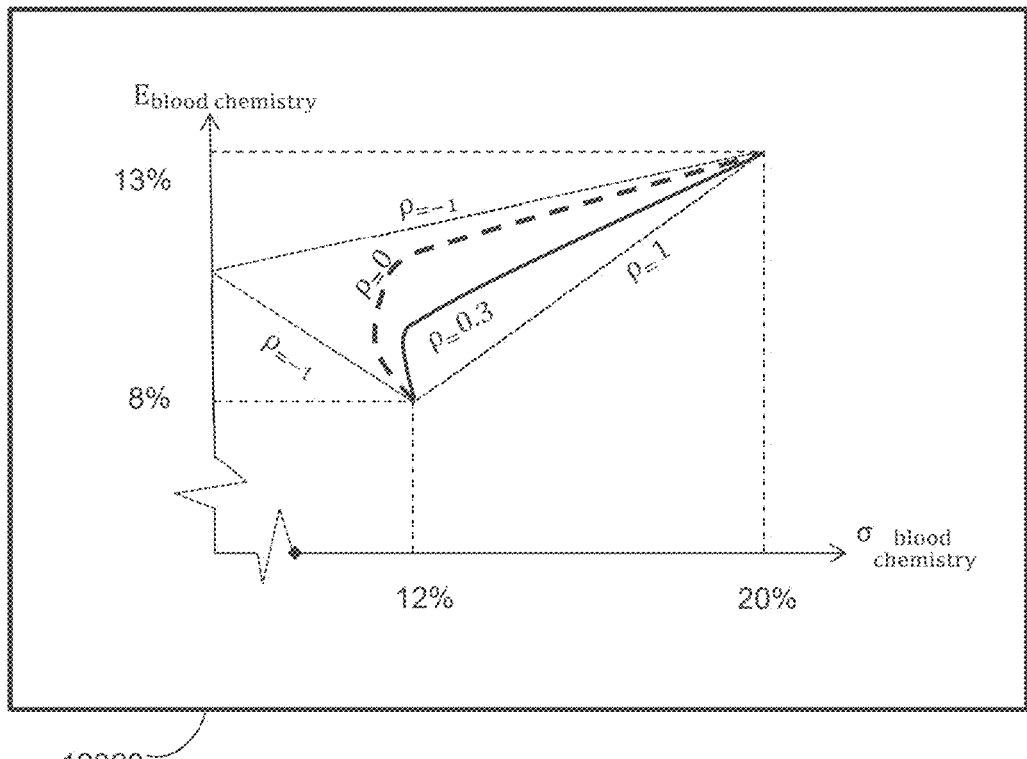
Figures 129A, 129B:
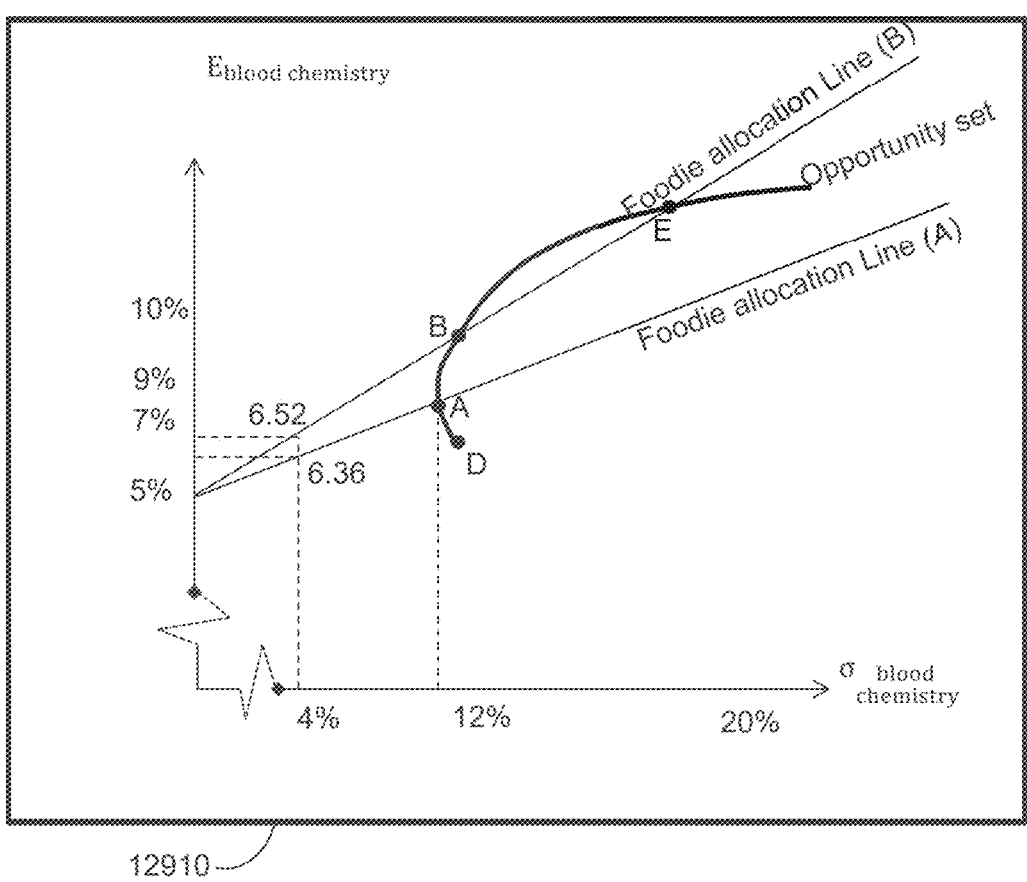

In the embodiment illustrated in FIG. 128B, most Foodie's recognize the really critical decision is how to divvy up their selection amongst ingredients or drug combinations or carbon and emission or meal combinations. In the embodiment of the method and system in FIG. 129A, the exemplary diagram is a graphical solution. FIG. 129A shows the opportunity set generated from the joint probability distribution of the combination of ingredients opioid ingredient chemical structure and statin ingredient chemical structure using the data from FIG. 127B. In some embodiments, two possible allocation lines are drawn and labeled "Foodie and Emission allocation line." The first Foodie and Emission allocation line (A) is drawn through the minimum variance ingredient combination point A which is divided as 82% opioid ingredient chemical structure and 18% statin ingredient chemical structure. The ingredient combination has an expected target blood chemistry movement of 8.9% and its standard deviation is 11.45% blood chemistry 2310. The reward to variability ratio or slope of the Foodie and Emission allocation line combining a zero variance ingredient (which may be certain types of water) with opioid ingredient chemical structure and statin ingredient chemical structure with the aforementioned weights of 82% opioid ingredient chemical structure and 18% statin ingredient chemical structure, forms an equation listed in FIG. 129B. In some embodiments, accordingly the exemplary slope 12920 of Foodie and Emission Allocation Line (A) is 0.34. Considering the embodiment in FIG. 129A of Foodie and Emission allocation line (B), the ingredient combination was 70% opioid ingredient chemical structure and 30% statin ingredient chemical structure, the expected movement towards target blood chemistry is 9.5%. In some embodiments, thus the reward to variability ration or slope of Foodie and Emission allocation line(B) is 9.5 minus 5 divided by 11.7 which equals 0.38 or a steeper slope as illustrated in FIG. 129A. If the Foodie and Emission allocation line (B) has a better reward to variability ratio than the Foodie and Emission allocation line (A), then for any level of standard deviation that a Foodie and Emission is willing to bear, the expected target blood chemistry movement is higher with the combination of point B. FIG. 129B illustrates the aforementioned exemplary case, showing that Foodie and Emission allocation line (B) intersection with the opportunity set at point B is above the Foodie and Emission allocation line (A) intersection with the opportunity set point A. In this case, point B allocation combination dominates point A allocation combination. In fact, the difference between the reward to variability ratio is the difference between the two Foodie and Emission allocation line (A) and (B) slopes 12920. The difference between the two Foodie and Emission allocation line slopes is 0.38–0.34=0.04. This means that the Foodie and Emission gets four extra basis points of expected blood chemistry movement toward the target with Foodie and Emission allocation line (B) for each percentage point increase in standard deviation of blood chemistry 12910. If the Foodie and Emission is willing to bear a standard deviation of blood chemistry of 4%, the Foodie and Emission can achieve a 5.36% (5+4×0.34) expected blood chemistry movement to the target range along Foodie and Emission allocation line (A) and with Foodie and Emission allocation line (B) the Foodie and Emission can achieve an expected movement of blood chemistry to the target of 6.52% (5+4×0.38) 12910. Why stop at point B? In some embodiments, the Foodie and Emission can continue to ratchet up the Foodie and Emission allocation line until it ultimately reaches the point of tangency with the Opportunity set 12910. This aforementioned exemplary scenario in FIG. 129A must yield the Foodie and Emission allocation line with the highest feasible reward to variability ratio.

In some embodiments, the embodiment illustrated in exemplary scenario FIG. 130A shows the highest sloping Foodie and Emission allocation line (C) at point P intersecting with the opportunity set. Point P is the tangency combination of ingredients where the expected blood chemistry target movement is the highest relative to the opportunity set and standard deviation of ingredients or meal combinations 13010. The optimal combination or allocation of ingredients is labeled point P. At Point P, the expected blood chemistry movement to the target is 11% while the standard deviation of point P is 14.2%. In practice, we obtain the solution to the method and system with a computer program with instructions to perform the calculations for the Foodie and Emission 13010. The method process to obtain the solution to the problem of the optimal mix of ingredients or drug combinations or implants or dish combinations of weight opioid ingredient chemical structure and weight statin ingredient chemical structure or any other combination of ingredients is the objective of the method and system. In some embodiments, node rankings from the food and beverage database may be determined by the relative ranking of the ratio of expected blood chemistry target to the opportunity set and standard deviation of the ingredients and meal combinations 13010.

In some embodiments, there are many approaches toward optimization which are covered under method and system to optimize blood chemistry through food ingredients which may be utilized for computational efficiency, but the method and system may use as one approach of many approaches where the method finds the weights for various ingredients that result in the highest slope of the Foodie and Emission allocation line (C) 13010. In other words, the method and system may find the weights that result in the variable combination with the highest reward to variability ratio. In some embodiments, therefore the objective function of the method and system may maximize the slope of the Foodie and Emission allocation line for any possible combination of ingredients 13010. In some embodiments, thus the objective function of the method and system may show the slope as the ratio of the expected blood chemistry of the combination of ingredients less the blood chemistry of a zero standard deviation blood chemistry ingredient (perhaps water) divided by the standard deviation of the combination of ingredients illustrated in FIG. 130B. For the combination of ingredients with just two ingredients, the expected blood chemistry movement toward the target and standard deviation of blood chemistry of the combination of ingredients is illustrated in FIG. 130B. When the method and system maximize the objective function which is the slope of the Foodie and Emission allocation line subject to the constraint that the combination weights sum to one or one hundred percent 13020. In some embodiments, in other words the weight of the opioid ingredient chemical structure plus the weight of the statin ingredient chemical structure must sum to one. Accordingly, the method and system may solve a mathematical problem formulated as FIG. 131A which is the standard problem in calculus. Maximize the slope of the Foodie and Emission allocation line subject to the condition that the sum of the weight of all the ingredients will sum to one.

In the embodiment case illustrated in FIG. 131B, the exemplary case may include two ingredients or meal combinations, but the system and method are able to process any amount of ingredients or meal combinations with an extension of the calculus equations 13110. In the exemplary case of only two ingredients, FIG. 131 B illustrates the solution for the weights of the optimal blood chemistry combination of ingredients. In some embodiments, data from 12910, 12920, 12910, 13010, 13020, 13110 have been substituted in to give the weights of opioid ingredient chemical structure and statin ingredient chemical structure in FIG. 131B an exemplary case. The expected blood chemistry has moved 11% toward the target blood chemistry which incorporates the optimal weights for opioid ingredient chemical structure and statin ingredient chemical structure in this exemplary case 13010 and the standard deviation is 14.2% in FIG. 130A. The Foodie and Emission allocation line using the optimal combination in 13110 and 13120 has a slope of 0.42=(11–5)/14.2 which is the reward to variability ratio of blood chemistry. Notice how the slope of the Foodie and Emission allocation line exceeds the slope of Foodie and Emission allocation line (B) and Foodie and Emission allocation line (A) in FIG. 129A as it must if it is to be the slope of the best feasible Foodie and Emission allocation line. A Foodie and Emission with a coefficient term A in FIG. 122A equal to 4 would then make a combination as follows in FIG. 131C. In some embodiments, thus the Foodie and Emission would select 74.39% of her/his food allocation in the combination of opioid ingredient chemical structure and statin ingredient chemical structure and 25.61% in water or an ingredient which has zero standard deviation to blood chemistry 13130. Of the 74.39% of the food ingredient selection, 40% of the 74.39% or (0.4×0.7439=0.2976) would go to opioid ingredient chemical structure and 60% of 74.39% or (0.60×0.7439=0.4463) would go toward statin ingredient chemical structure. In some embodiments, the graphical solution of the equations in FIG. 131A, FIG. 131 B and FIG. 131C is illustrated in FIG. 132A.

Once the specific two ingredient case has been explained for the method and system, generalizing the embodiment to the case of many ingredients is straightforward. The summarization of steps is outlined in FIG. 132B.

In some embodiments of FIG. 132A illustrates a combination of ingredients for the optimal combination in the form of a pie chart. Before moving on it is important to understand that the two ingredients described could be meals or combinations of ingredients. In some embodiments, accordingly the method and system may consider the blood chemistry characteristics of single ingredients or combinations of ingredients which can then form an ingredient as a meal which would function as an ingredient which characteristics such as expected blood chemistry, variance and covariance and correlation. In some embodiments, accordingly there can be diversification within ingredients as some ingredients are combinations of ingredients.

In some embodiments, now we can generalize the two ingredient embodiment of the method and system to the case of many ingredients alongside water or an ingredient with near zero blood chemistry variance or standard deviation. In some embodiments, as in the case of the two ingredient embodiment, the problem is solved by the method and system in three parts. First, we identify the expected blood chemistry contribution of the ingredient and standard deviation of that ingredient contribution to blood chemistry. Second, the method and system identify the optimal combination of ingredients by finding the combination weights that result in the steepest Foodie and Emission allocation line. Last, the method and system may choose an appropriate complete combination by mixing the combination of water or a zero blood chemistry standard deviation ingredient with the combination of ingredients that carry various standard deviation and correlations. The ingredient opportunities available to the Foodie and Emission must be determined in the method and system. These ingredient opportunities are summarized by the minimum variance blood chemistry frontier of ingredients. In some embodiments, this frontier is a graph of the lowest possible combination variances that can be attained for a given combination of expected blood chemistry contribution. Given the set of data for expected blood chemistry contribution, variances and covariance's of blood chemistry and expected covariance's of blood chemistry of combinations, we can calculate the minimum blood chemistry variance combination for any targeted blood chemistry contribution. IN some embodiments, performing such as calculation for many such expected blood chemistry combinations results in a paring between expected blood chemistry contributions and minimum variance blood chemistry contribution that offer the expected blood chemistry contributions. The plot of these expected blood chemistry contribution and standard deviation pairs are presented in FIG. 133B. Notice that all ingredients lie to the right of the frontier. This tells us that combinations that consist only of a single ingredient are inefficient relative to combinations. Adding many ingredients leads to combinations with higher expected blood chemistry contribution and lower standard deviations 13320. All the combinations in FIG. 133B that lie on the minimum variance frontier from the global minimum variance portfolio and upward, provide the best expected blood chemistry contribution and standard deviation of blood chemistry combinations and thus are candidates for the optimal combination 13320. In some embodiments, the part of the frontier that lies above the global minimum variance combination is called the efficient frontier 13320. In some embodiments, for any combination on the lower portion of the minimum variance frontier, there is a combination with the same standard deviation of blood chemistry, but higher expected blood chemistry contribution positioned directly above it. Hence the bottom part of the minimum variance frontier is inefficient.

The second part of the optimization plan involves water or a zero standard deviation blood chemistry ingredient. As before, the method and system search for the Foodie and Emission allocation line with the highest reward to variability ratio (that is the steepest slope) as shown in FIG. 132A. The Foodie and Emission allocation line that is supported by the optimal combination point P 13210, is, as before, the combination that is tangent to the efficient frontier. This Foodie and Emission allocation line dominates all alternative feasible lines. Therefore, combination P in FIG. 132A is the optimal ingredient combination.

In some embodiments, finally, the last part of the embodiment of the method and system, the Foodie and Emission choses the appropriate mix between the optimal ingredient combination and a zero blood chemistry variance ingredient which may include water. In FIG. 132A, the point where Foodie and Emission allocation line (C) has a zero standard deviation value is where the expected blood chemistry target movement is 5% or point F 2610.

In some embodiments, now let us consider in the method and system each part of the combination construction problem in more detail. In the first part of the Foodie and Emission problem, the analysis of the expected blood chemistry of the ingredient, the Foodie and Emission needs as inputs, a set of estimates of expected blood chemistry target movement for each ingredient and a set of estimates for the covariance matrix which the method and system provide for the Foodie and Emission through the system application.

In some embodiments, suppose that the time period of the analysis for the combination of ingredients between biomarker tests was one year. In some embodiments, therefore all calculations and estimates pertain to a one year plan under the method and system. The database system contains the variable n ingredients where n could be any amount of ingredients. As of now, time zero, we observed the expected biomarker chemistry of the ingredients such that each ingredient is given the variable label i and an index number of n at time zero. Then the system and method determine how the ingredient effects the Foodie and Emissions blood chemistry at the end of one year or time equal to one year. The covariance's of the ingredients effects on blood chemistry are usually estimated from historical data for both the Foodie and Emission and from Foodie and Emission users in the database with similar characteristics. Through the method and system, the Foodie and Emission is now armed with the n estimates of the expected effect on blood chemistry of each ingredient and then the n× n estimates in the covariance matrix in which the n diagonal elements are estimates of the variances of each ingredient and then the n squared minus n equals n multiplied by the quantity of n minus 1 off diagonal elements are the estimates of the covariances between each pair of ingredient blood chemistries. We know that each covariance appears twice in the aforementioned table, so actually we have $n(n-1)/2$ different covariance estimates. In some embodiments, if the claim plaintiff, user or Foodie and Emission user considers 50 ingredients or meal combinations, the method and system needs to provide 50 estimates of expected blood chemistry results for each respective ingredient or meal combination and $(50\times49)/2=1,225$ estimates of covariance's which is a daunting task without the assistance of the method and system computer application program. Once these estimates are compiled by the method and system, the expected blood chemistry and variance of any combination of ingredients with weights for any of the respective ingredients can be calculated by the general formulas in FIG. 134A.

Figure 133A:
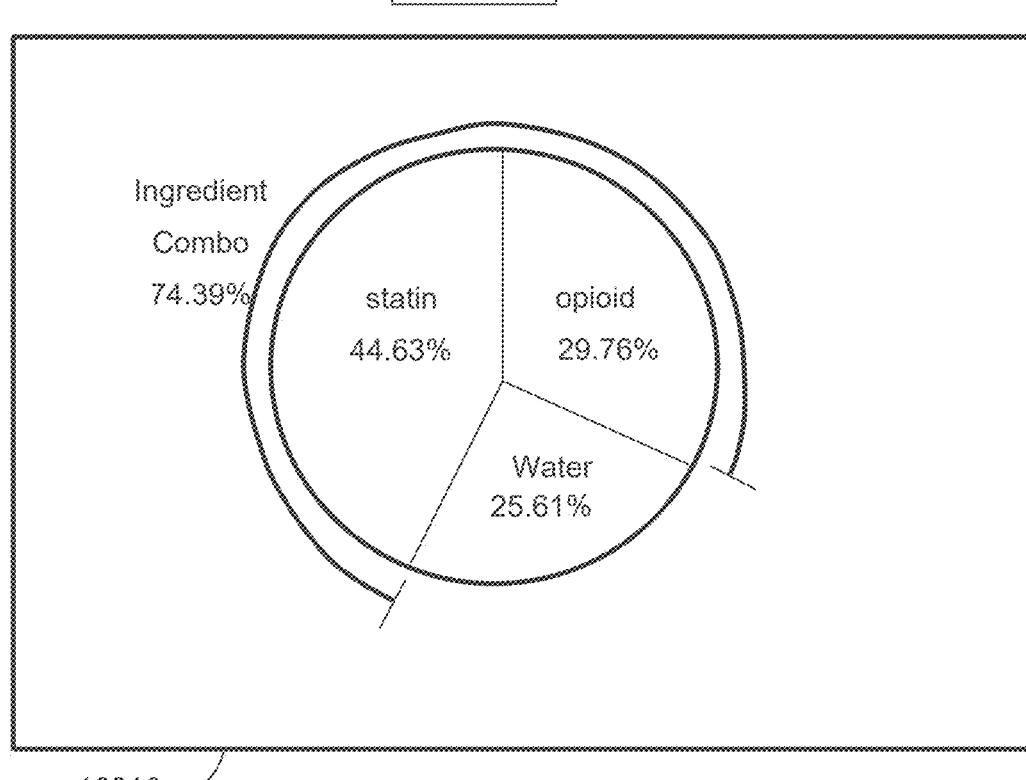
Figure 133B:
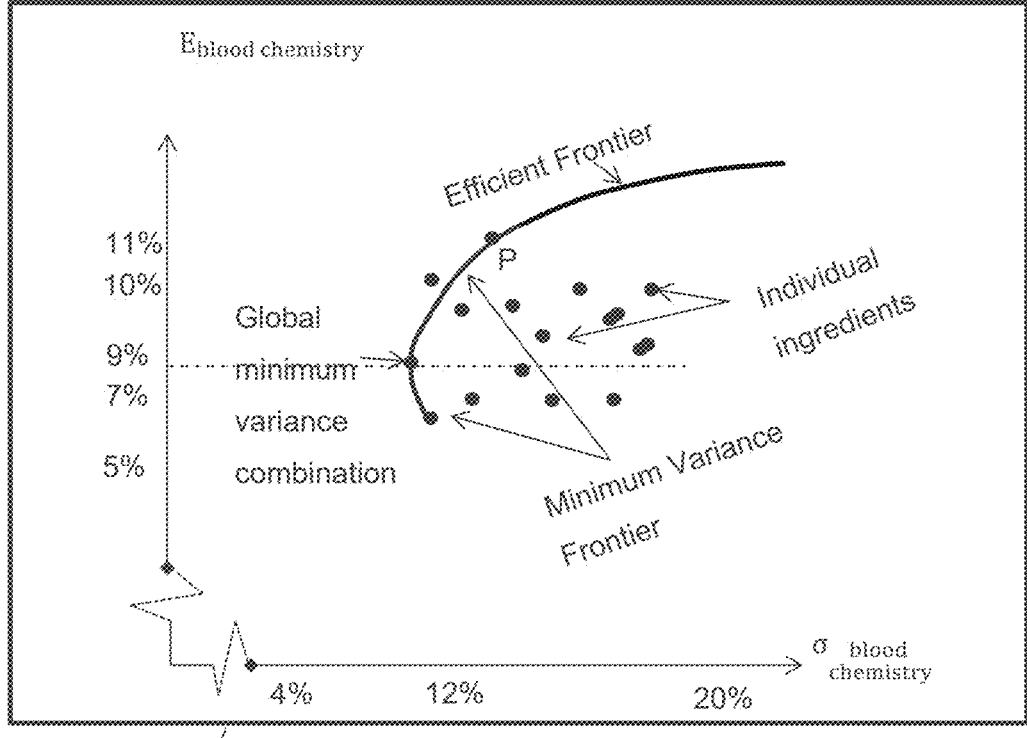
Figures 134A, 134B:
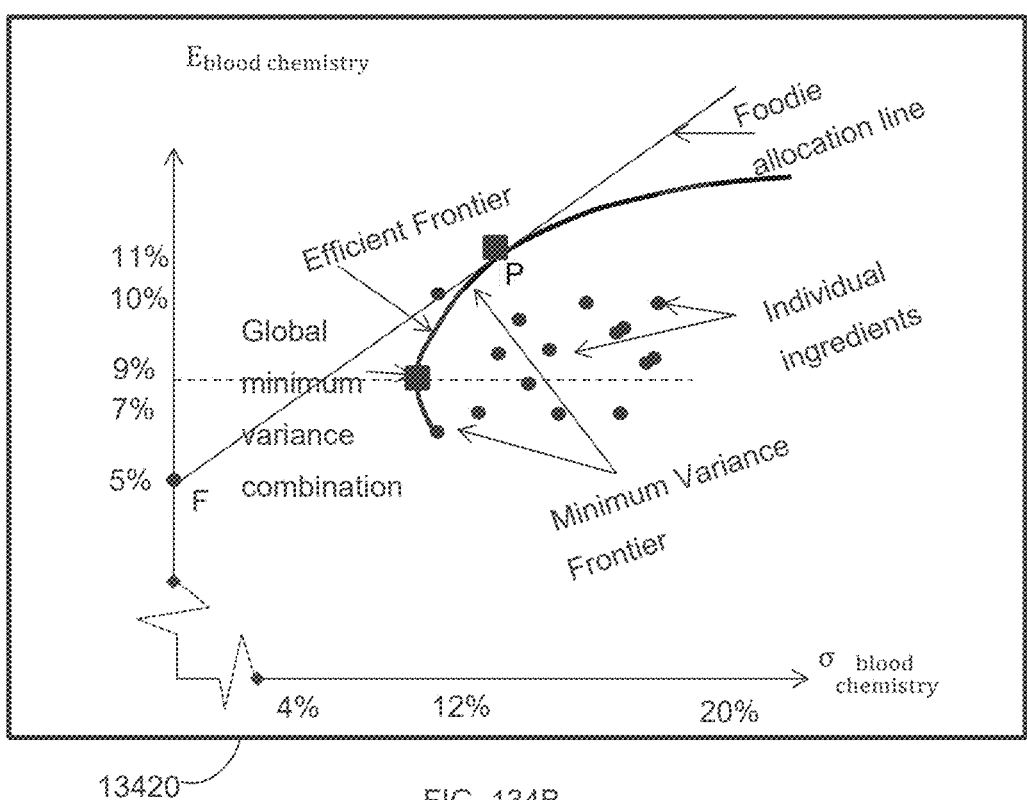

The general embodiment of an exemplary case of the method and system in FIG. 134A states the expected blood chemistry toward the target blood chemistry of each ingredient and the variance of the blood chemistry of each ingredient such that the weights of each ingredient can be calculated 13310. While many people say to "eat a wide variety of food," "take your medication," "eat a balanced diet," or "don't put all your eggs in one basket," no method or system has attempted to accurately quantify these statements in such a way that mathematics and science can be used to easily make a map for eating. The system and method have coined the phrase "as GPS is to driving, Foodie and Emission Body or the blood and saliva and biomarkers to drug and food algorithms are to eating." In some embodiments, no longer will Foodie and Emissions or user guess at how drugs or nutrition is affecting their blood and overall health, math and science will map their progress with a quantitative method and system. In some embodiments, further the asymmetric information gap can be narrowed from the securitization or financial market auction with the emission or emission offset and emission or emission offset geolocation claim exchange units with their ranked node outcomes from the aforementioned equations. The principle behind the method and system is that a Foodie and Emission can quantify the set of ingredient combinations that give the highest blood chemistry result to maximize human health and productivity. Alternatively, the efficient frontier in FIG. 133B is the set of ingredient combinations that minimize the variance of blood chemistry for any target blood chemistry. In some embodiments, In some embodiments, node rankings from the food and beverage database may be determined by the relative ranking of the ratio of expected blood chemistry target to the opportunity set and standard deviation of the drug ingredients, ingredients and meal combinations which are represented by the plurality of meals or recipe combinations that are points with expected blood chemistry values and blood chemistry variances in the opportunity set from the search input term 13320. The result is the most efficient method empirically and quantitatively to consume food for human health.

In some embodiments, the points marked by rectangles in the exemplary embodiment in FIG. 134B are the result of variance—minimization calculations in the method and system. First, we draw the constraint, that is, a horizontal line at the level of required expected blood chemistry target. We then look for the combination of ingredients (point P) with the lowest standard deviation that plots on the Foodie and Emission allocation line 13420. We then discard the bottom of the minimum variance frontier below the global minimum variance combination as it is inefficient 13420 and points above the global minimum variance combination have higher blood chemistry contribution to the target, but a similar standard deviation. Restating the solution that the method and system has completed thus far. The estimate generated by the Foodie and Emission utilizing the method and system transformed ingredients and ingredient combinations into a set of expected blood chemistry statistics toward the user's blood chemistry and a covariance matrix of how the ingredients are correlated. This group of estimates shall be called the input list. This input list is then fed into the optimization system and method. Before we proceed to the second step of choosing the optimal combination of ingredients for blood or saliva chemistry, some Foodie and Emissions may have additional constraints. For example, many Foodie and Emissions have allergies which preclude certain food ingredient types. The list of potential constraints is large, and the method and system allows for the addition of constraints in the optimization method and system. Foodie and Emission users of the system and method may tailor the efficient set of ingredients to conform to any desire of the Foodie and Emission. Of course, each constraint carries a price tag in the sense that an efficient frontier constructed subject to extra constraints may offer a reward to variability ratio inferior to that of a less constrained set. The Foodie and Emission is made aware of this cost through the system and method application and should carefully consider constraints that are not mandated by law or allergies.

In some embodiments, proceeding to step two in the method and system, this step introduces water or a zero variance blood chemistry ingredient that has positive blood chemistry attributes. As before we ratchet up the Foodie and Emission allocation line by selecting different combinations of ingredients until combination P is reached 13420 which is the tangency point of a line from point F to the efficient frontier 13420. Ingredient combination P maximizes the reward to variability ratio, the slope of the Foodie and Emission allocation line from point F to combinations on the efficient frontier set 13420.

In some embodiments, the method and system embodiment of the general exemplary case may be written in one form as in FIG. 135. In some embodiments, vectors are used to capture variable d inputs or as many inputs as are required to weight in FIG. 135. In some embodiments, the method as system may use other techniques to express combination blood and saliva expected target chemistry and variances, but it is convenient to handle large combinations of ingredients in matrix form in FIG. 29.

In some embodiments, the method and system embodiment in FIG. 136, FIG. 137 and FIG. 138 illustrate one exemplary entry in the system database which measures the nutrition content and standard deviation toward blood and saliva chemistry for egg, yolk, raw, frozen or pasteurized. The method and system database for drugs and food 10840 may have a mixture of United States Department of Agriculture data and proprietary merchant or cook food data that has higher degrees of differentiation in nutrition levels.

Figure 139:
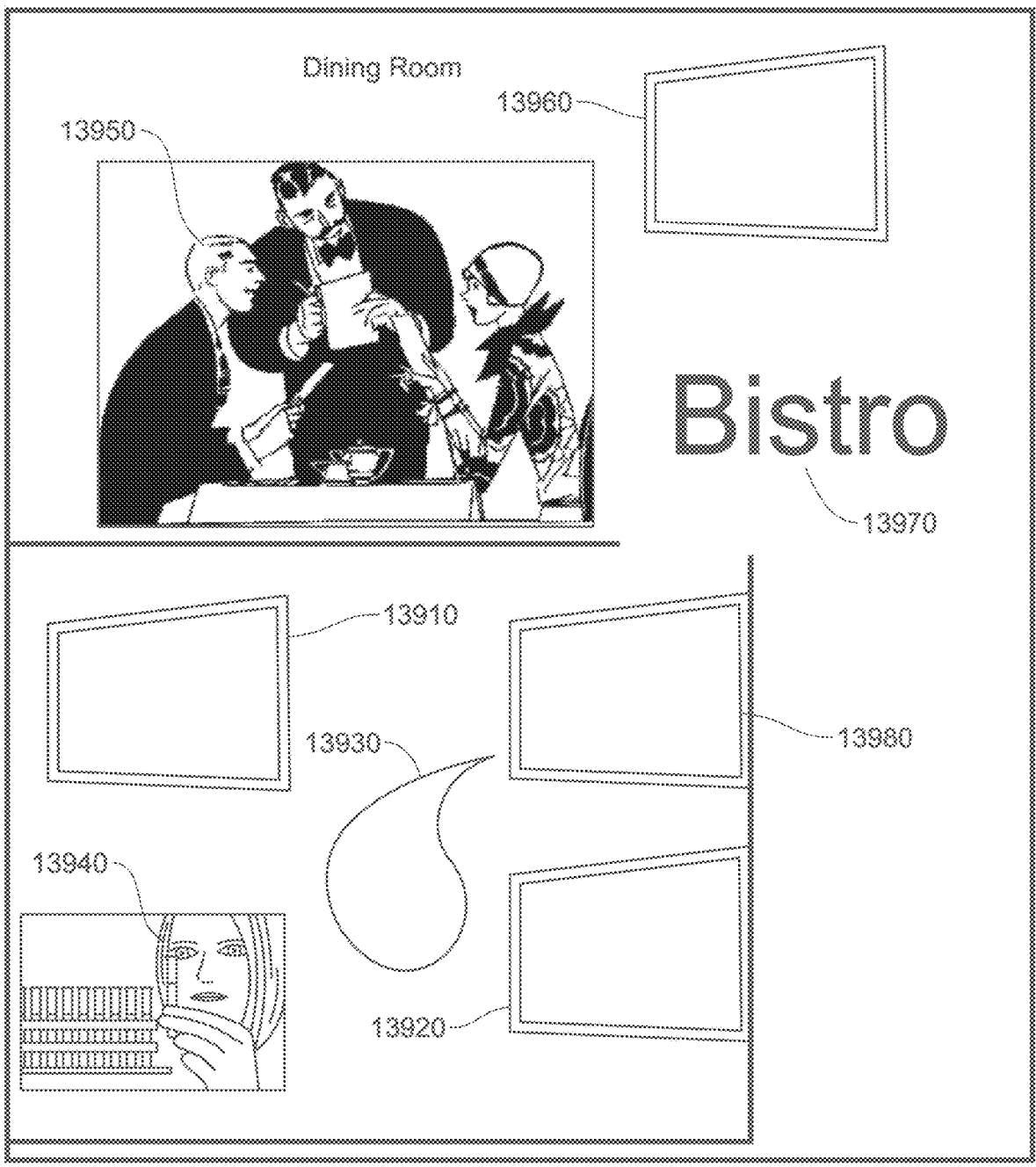
FIG. 139 illustrates an ingestion and evaluation sequence configuration in accordance with implementations of various techniques described herein.

In some embodiments, the method and system embodiment illustrated in FIG. 139 may be one of many claim testing and distribution and education channels where a retail concept store combines a drug and food database laboratory and a dining experience for the Foodie and Emission or user. In some embodiments, a Foodie and Emission may walk into the door 13910 of the retail experience and be given an opportunity to move into the blood laboratory 13930 where they will be given appetizers in a high tech learning center blood lab 13930. Monitor screens or projection devices both in 2D and 3D and mixed reality or augmented reality may project visualizations of blood chemistry interactions with food chemistry 13920. After the lab technician secures a blood and saliva sample from the Foodie and Emission 13940, the user may go into the dining room 13950. In some embodiments, in the dining room of the concept retail experience 13950 Foodie and Emission experts will assist Foodie and Emissions with menu selection of blood and saliva optimized food 3360. While FIG. 139 illustrates a retail concept store for the method and system, the method and system may have many outlets such as any hospital, biomarker lab, pharmacy, blood lab, doctors office, grocery store, restaurant, computing device or food or drug distribution point.

Figure 140:
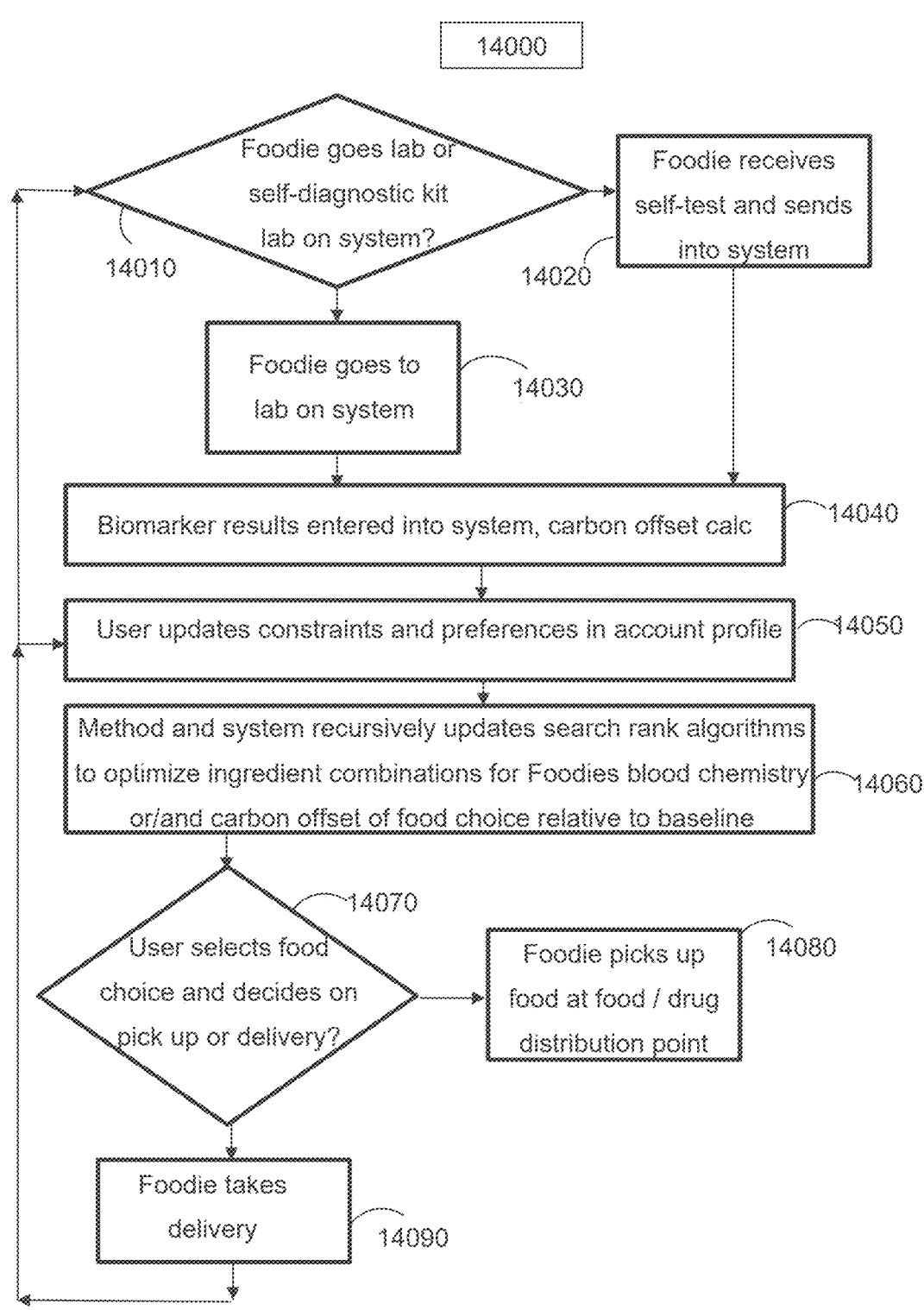
FIG. 140 illustrates a node ranking flow chart for chemical or food ingestion in accordance with implementations of various techniques described herein.

In some embodiments, the flow chart illustrated in FIG. 140 for an exemplary scenario of the method and system, a Foodie and Emission goes to a lab or orders a self-diagnostic kit 14010. Depending on the Foodie and Emissions decision 14010 the Foodie and Emission either sends in self-test to system 3420 or the lab sends in the results to the system 14030. The blood and/or saliva or biomarker samples are then entered into the blood and saliva database 14040. The user or Foodie and Emission interacts with the system and method to update or select constraints and preferences in their account profile on the system 14050. The method and system recursively updates the algorithm weights and selection combination ingredients based on the optimization program from the system and method based on the Foodie and Emissions blood and saliva chemistry 14060. The claim plaintiff, or user or Foodie and Emission or user then selects either pick up at a drug or food distribution point (pharmacy, grocery store, convenience store, restaurant or other food distribution point) or selects delivery to a point the user desires 14070. The user or Foodie and Emission may take delivery 14090 or pick up the food at a drug or food distribution point 3480.

Figure 141:
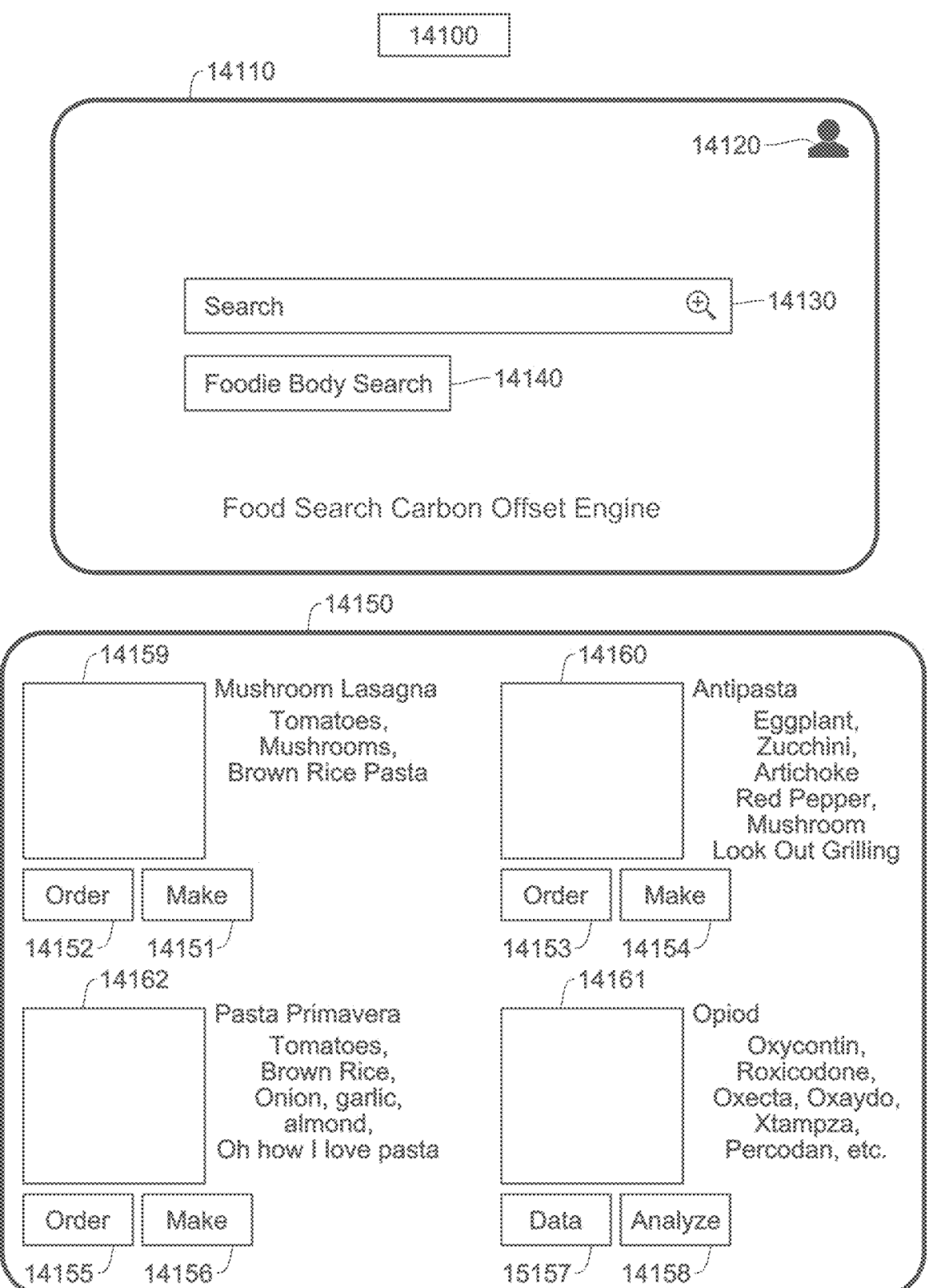

In some embodiments, FIG. 141 illustrates a drug and food and beverage and implant database search interface 14110 in accordance with some embodiments. In some embodiments, the user 14120 profile may have uploaded biomarker data into their user profile or signed an agreement for a lab or physician or other medical provider to release their biomarker data to the biomarker database 10820. In some embodiments the user 14120 may input a searchable term or sequence of terms into the search database interface input window 14130. The searchable term or searchable term sequence input window 14130 may suggest similar input terms based on the Foodie and Emission opportunity set of highest (or lowest to give the most negative) ratio of blood chemistry contribution to blood chemistry variance or location or other constraints. In some embodiments, the user may use voice interface, visual interface, gesture interface or type input and button interface 14140 to instantiate the query of node ranked food and beverage items from the food and beverage database 10840 in a category based on drug or food type, ethnicity, style, flavor, location, nutrition, health, variety and delivery of prepared and raw ingredients. In some embodiments by way of example but not limiting by example, the user 14120 may have entered "Italian" as the search term into the search interface input window 14130 and the resulting output interface 14150 may rank a plurality of biomarker ranked food and beverage options based on the highest ratio of blood chemistry contribution to blood chemistry variance or location or other constraints of the exemplary user 14120. In some embodiments for a specific user 14120, mushroom lasagna 14159 may be the highest ratio of blood chemistry contribution to blood chemistry variance in the opportunity set node ranked database for a search input category such as Italian. In some embodiments, the user 14120 may select the Make button 14151 to perform instructions to display a how to ingredient recipe and how to ingredient video of the food or beverage recipe. In some embodiments, the user 14120 may select the Order button 14152 to either pick up the food or beverage combination at a distribution point or have the food or beverage combination delivered to a specified location. In some embodiments, a partial ingredient list, picture, audio, and food score may accompany an additional specific food or beverage combination such as antipasta 14160 with partial ingredients of eggplant, zucchini, artichoke, red pepper, mushroom and a plurality of other ingredients that may be displayed on further drill down search database options. In some embodiments for a specific user 14120, antipasta 14160 may be the second highest ratio of blood chemistry contribution to blood chemistry variance in the opportunity set node ranked database for a search input category such as Italian. In some embodiments, the user 14120 may select the Make button 14154 to perform instructions to display a how to ingredient recipe and how to ingredient video of the food or beverage recipe. In some embodiments, the user 14120 may select the Order button 14153 to either pick up the food or beverage combination at a distribution point or have the food or beverage combination delivered to a specified location. In some embodiments, a partial ingredient list, picture, audio, and food score may accompany a specific food or beverage combination such as antipasta 14160 with partial ingredients of eggplant, zucchini, artichoke, red pepper, mushroom and a plurality of other ingredients that may be displayed on further drill down search database options. In some embodiments, a partial ingredient list, picture, audio, and food score may accompany an additional specific food or beverage combination such as pasta primavera 14162 with partial ingredients of tomatoes, brown rice, onion, garlic, almond and a plurality of other ingredients that may be displayed on further drill down search database options. In some embodiments for a specific user 14120, pasta primavera 14160 may be the third highest ratio of blood chemistry contribution to blood chemistry variance in the opportunity set node ranked database for a search input category such as Italian. In some embodiments, the user 14120 may select the Make button 14156 to perform instructions to display a how to ingredient recipe and how to ingredient video of the food or beverage recipe. In some embodiments, the user 14120 may select the Order button 14155 to either pick up the food or beverage combination at a distribution point or have the food or beverage combination delivered to a specified location. In some embodiments, a partial ingredient list, picture, audio, and food score may accompany a specific food or beverage combination such as pasta primavera 14162 with partial ingredients of tomatoes, brown rice, onion, garlic, almond and a plurality of other ingredients that may be displayed on further drill down search database options. In some embodiments for a specific user 14120, opioids 14161 may be the fourth highest ratio of blood chemistry contribution to blood chemistry variance in the opportunity set node ranked database for a search input category such as pain killer. In some embodiments, the user 14120 may select the Make button 14158 to perform instructions to display a how to ingredient recipe and how to ingredient video of the drug or food or beverage recipe. In some embodiments, the user 14120 may select the Order button 14157 to either pick up the drug or food or beverage combination at a distribution point or have the food or beverage combination delivered to a specified location. In some embodiments, a partial ingredient list, picture, audio, and food and emission score may accompany a specific food or beverage combination such as opioids 14161 with partial brands of oxycontin, toxicodone, oxecta, oxaydo, xtampza, percodan and a plurality of other ingredients that may be displayed on further drill down search database options.

FIG. 142 illustrates a drug and food and beverage database search interface 14210 in accordance with some embodiments with additional drill down to a specific search selection. In some embodiments, search engine exemplary logo, Foodie and Emission body 14220 or another exemplary logo may be displayed. In some embodiments, an exemplary search input window 14230 may allow a user additional search input or input variation from a current search term and drug and food or beverage combination. In some embodiments, the search input visual or audio interface window 14230 may be instantiated from a search term button or an optimize button 14240. In some embodiments, a picture of the drill down drug or food or beverage combination such as mushroom lasagna 14270 may be displayed with a text or audio title 14280. In some embodiments, detailed ingredient lists may accompany the food or beverage combination title 14280. In some embodiments, an ingredient quantity list 14291 and instructions may accompany the selection. In some embodiments a preparation instruction or cooking or chef video may accompany the selection 14290. In some embodiments, a list of participating food or beverage distribution locations 14250 may accompany the food or beverage combination with an option to order from the food distribution location 14250 or receive delivery. In some embodiments, an option to order the food or beverage combination may accompany the selection to order from a pharmacy or restaurant or receive delivery 14260.

Figure 143:
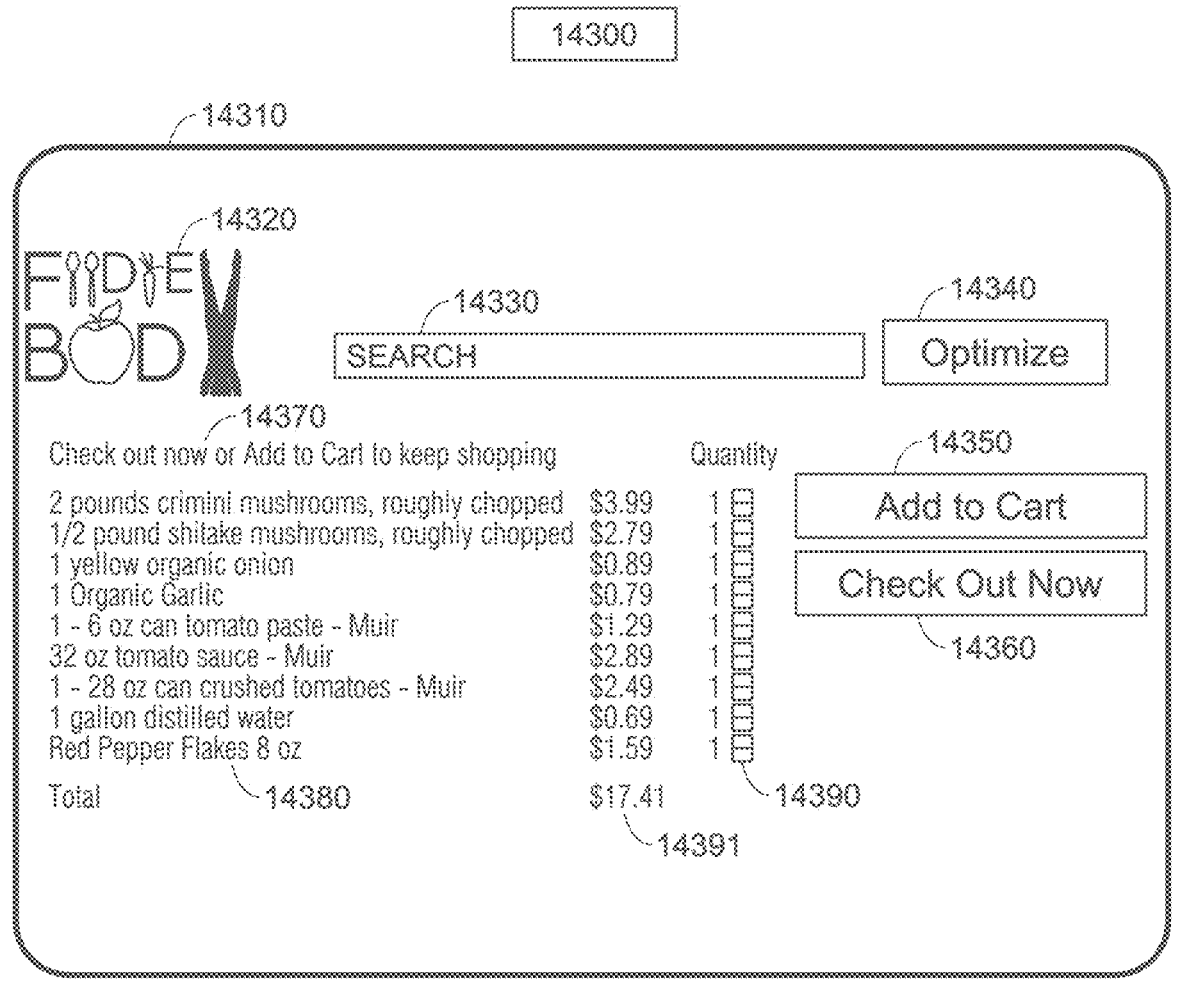
Figure 144:
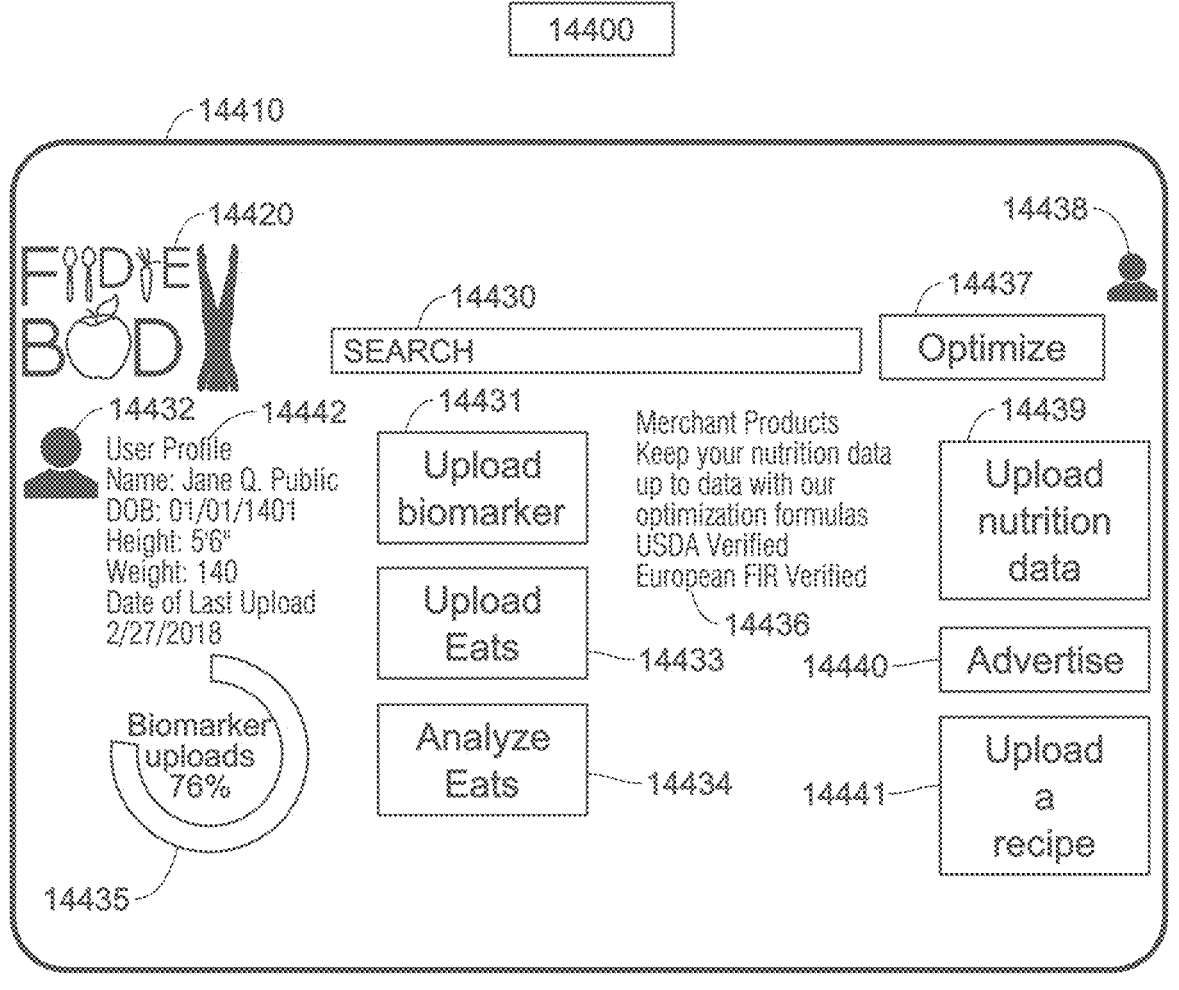

FIG. 143 illustrates a food and beverage database search interface 14310 in accordance with some embodiments with additional drill down to a specific search selection. In some embodiments, the recipe interface 14310 may be converted into an order quantity interface 14310 for a specific food and beverage combination. In some embodiments, search engine exemplary logo, Foodie and Emission body 14320 or another exemplary logo may be displayed. In some embodiments, an exemplary search input window 14330 may allow a user additional search input or input variation from a current search term and food or beverage combination. In some embodiments, the search input visual or audio interface window 14330 may be instantiated from a search term button or an optimize button 14340. In some embodiments, the recipe or food combination list 3691 is converted to a check out ready order list 14370, 14380 by associating the recipe quantity with unit sizes at the food or beverage distribution location. In some embodiments, prescription or recipe order sizes 14390 may be modified to higher or lower quantities 14390 to serve the customer selection along with information on unit pricing 14391. In some embodiments, an add to cart button 14350 may allow for further shopping or check out now button options 14360 for order conclusion and confirmation.

FIG. 14400 illustrates a food and beverage database search interface 14410 in accordance with some embodiments with user biomarker information and options to modify user 14438 biomarker data or upload merchant seller data 14436 to the marketplace. In some embodiments, the user profile 14432 includes name, date of birth, height, weight, most current upload date, and a plurality of other data 14442. In some embodiments, the percentage of available biomarker uploads included for a specific user profile is indicated 14435. In some embodiments, search engine exemplary logo, Foodie and Emission body 14420 or another exemplary logo may be displayed. In some embodiments, an exemplary search input window 14430 may allow a user additional search input or input variation from a current search term and food or beverage combination. In some embodiments, the search input visual or audio interface window 14430 may be instantiated from a search term button or an optimize button 3837. In some embodiments, a user 14438 or 14432 may update their profile by uploading additional biomarker information with the upload biomarker button 14431. In some embodiments, the user 14432 or 14438 may upload additional eating or consumption data 14433 from a plurality of search, audio, photo, visual or network inputs. In some embodiments, the user 14432 or 14438 may analyze eating and biomarker data by pushing the analyze button 14434. In some embodiments, merchants may upload products 14436 that conform to proprietary standards, the standards of USDA verified, or European FIR verified 14436. In some embodiments, merchants my upload products and nutrition data through the upload nutrition data button 14439. In some embodiments, the merchant or user 14432 or 14438 may advertise on the search engine and marketplace method and system of biomarker optimized food and beverage search 14430. In some embodiments, a user 14432 or 14438 may upload a recipe 14441 to the method and system for optimization on the biomarker network and network algorithms. In some embodiments, the search engine and optimization network allows a marketplace for users to contribute recipe content 14441, cooking content 14441, chef preparation content 14441, biomarker content 14431, nutrition content 14439 and user profile 14432 and merchant profile content 14436.

Figure 145:
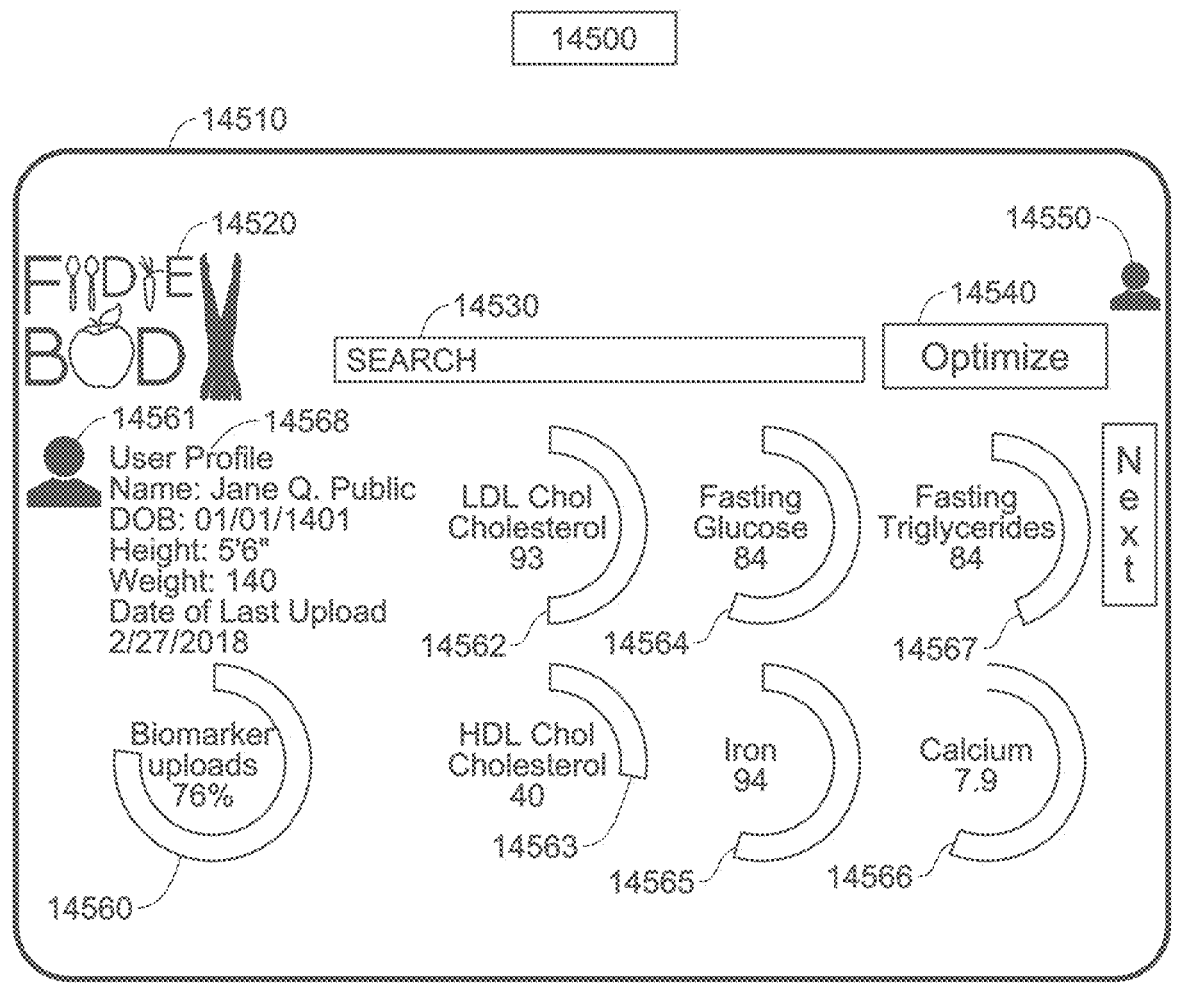

FIG. 145 illustrates a drug and food and beverage and emission database search interface 14510 in accordance with some embodiments with user biomarker information and options to modify user biomarker uploads as well as monitor biomarker performance contemporaneously and over time in time series to the marketplace and biomarker search engine. In some embodiments, the percentage of available biomarker uploads included for a specific user profile 14561 is indicated 14560. In some embodiments, search engine exemplary logo, Foodie and Emission body 14520 or another exemplary logo may be displayed. In some embodiments, an exemplary search input window 14530 may allow a user 14550 additional search input or input variation from a current search term and food or beverage combination. In some embodiments, the search input visual or audio interface window 14530 may be instantiated from a search term button or an optimize button 14540. In some embodiments, the user profile data 14568 may include a superset or subset of name, date of birth, height, weight, date of last upload or other biomarker data 14568. In some embodiments, the percentage of available biomarker upload data fields utilized 14560 by a user 14561 may be displayed. In some embodiments, user 14561 LDL cholesterol levels may be shown for analysis 14562, fasting glucose levels 14564, fasting triglyceride levels 14567, HDL cholesterol levels 14563, iron levels 14565, calcium levels 14566 and a plurality of other biomarkers may be accessed through the continuation to next biomarker data 14510. In some embodiments, over 800 biomarkers are utilized from various measurable biomarker chemistry sources which change due to food and beverage input into the body. In some embodiments, biomarker chemistry may be measured by graph or scan data to represent changes in the body in magnetic resonance imaging tests, echocardiogram tests, nuclear perfusion studies, positron emission tomography tests or thousands of other biomarker scan and chemistry tests where data may be measured with numeric representations.

Figure 146:
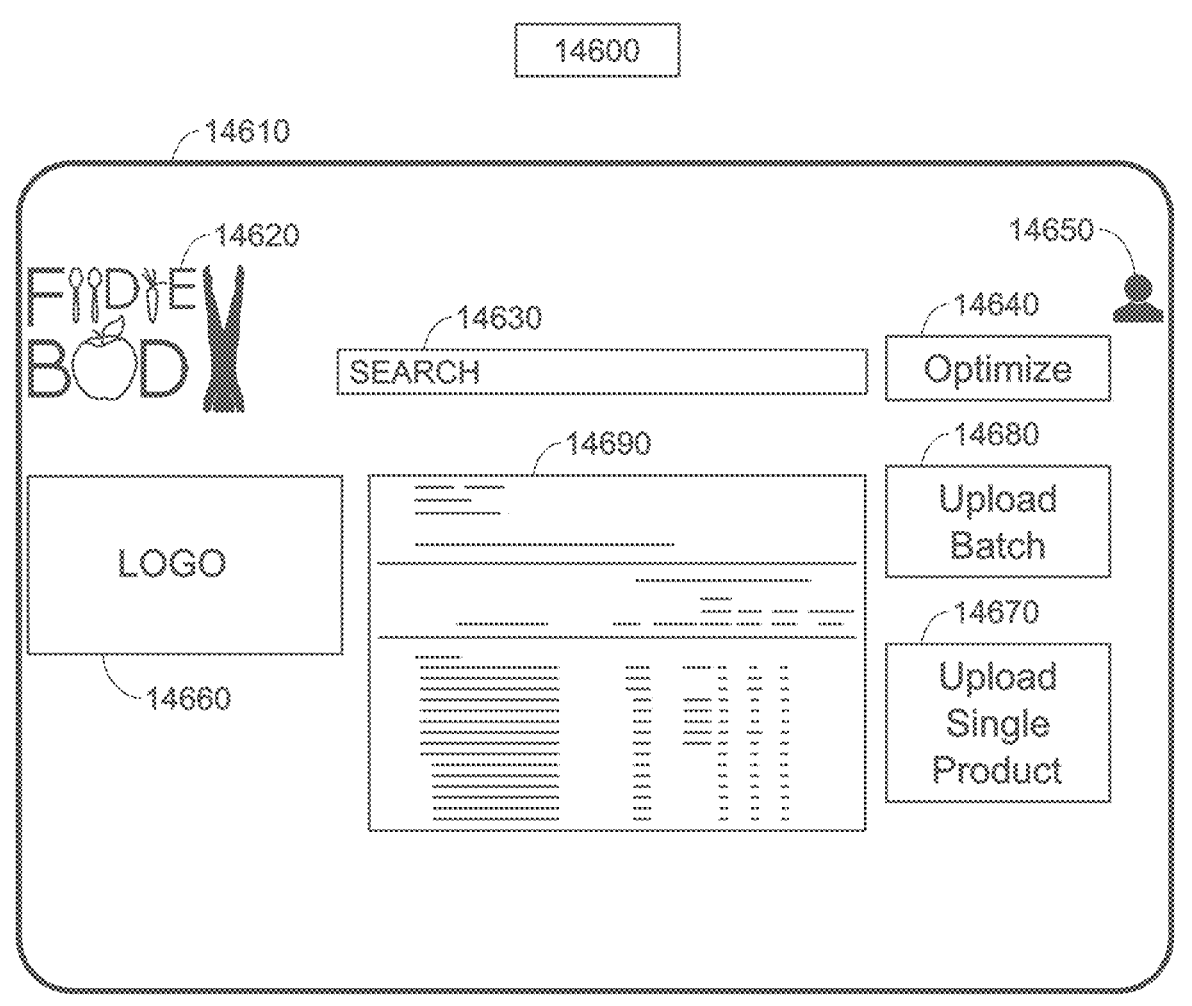

FIG. 146 illustrates a food and beverage and emission database search interface 14610 in accordance with some embodiments with merchant nutrition 14690 and product upload 14670 or batch product upload 14680 for participation in the biomarker search engine for food and beverages. In some embodiments, search engine exemplary logo, Foodie and Emission body 14620 or another exemplary logo may be displayed. In some embodiments, an exemplary search input window 14630 may allow a user 14650 additional search input 4030 or input variation from a current search term and food or beverage combination. In some embodiments, the search input visual or audio interface window 14630 may be instantiated from a search term button or an optimize button 14640. In some embodiments, an exemplary food or beverage distribution vendor or supplier 4060 may be displayed for their account 14650 to upload nutrition information for entire batches 14680 or single products 14670. In some embodiments, vendors 14660 may license the method and system to participate in the search for drug, food, beverages, and emissions based on a plurality of biomarker data of individual users.

Figure 147:
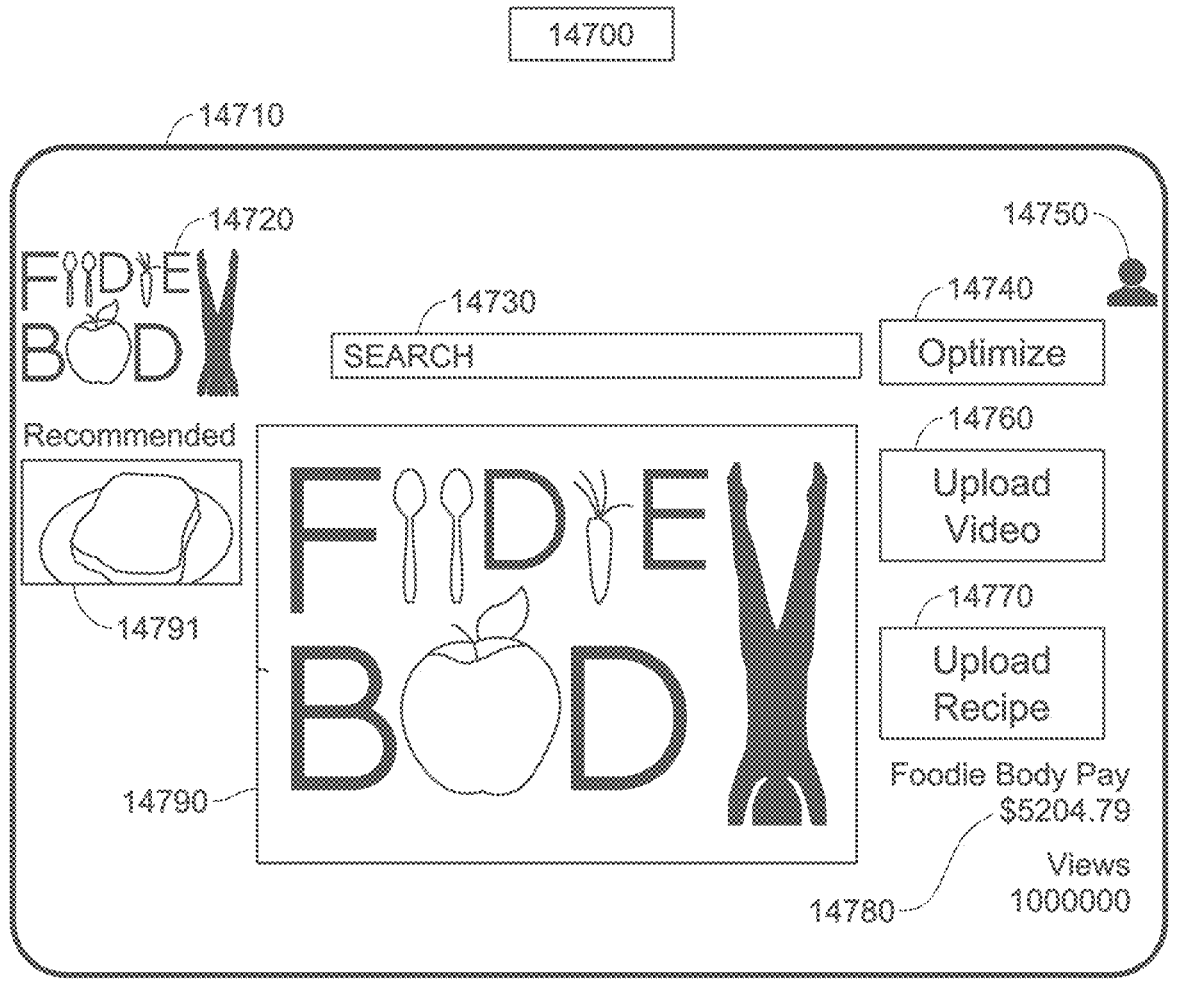

FIG. 147 illustrates a drug and food and beverage database search interface 14710 in accordance with some embodiments with recipe or cooking content videos 14790 for the biomarker based search engine for food and beverages. In some embodiments, search engine exemplary logo, Foodie and Emission body 14720 or another exemplary logo may be displayed. In some embodiments, an exemplary search input window 14730 may allow a user 14750 additional search input 14730 or input variation from a current search term and food or beverage combination. In some embodiments, the method and system may recommend additional food and recipe videos 14791 based on popularity, linked recipe types, efficient ratios of blood chemistry expected values to blood variance values in the opportunity set. In some embodiments, the user 14750 may upload a video 14760 with cooking content and recipe content that has been optimized for the user's biomarkers. In some embodiments, the user may upload recipes and nutrition data to the network for ranking in the search node ranking database or related video ranked node database with nutrition data of the underlying recipe from the food database 10840. In some embodiments, the user 14750 may receive rewards such as Foodie and Emission body pay 14780 for videos that are popular or receive high views 14780 because they are well done with efficient blood chemistry values to blood chemistry variance as a ratio.

Figure 148:
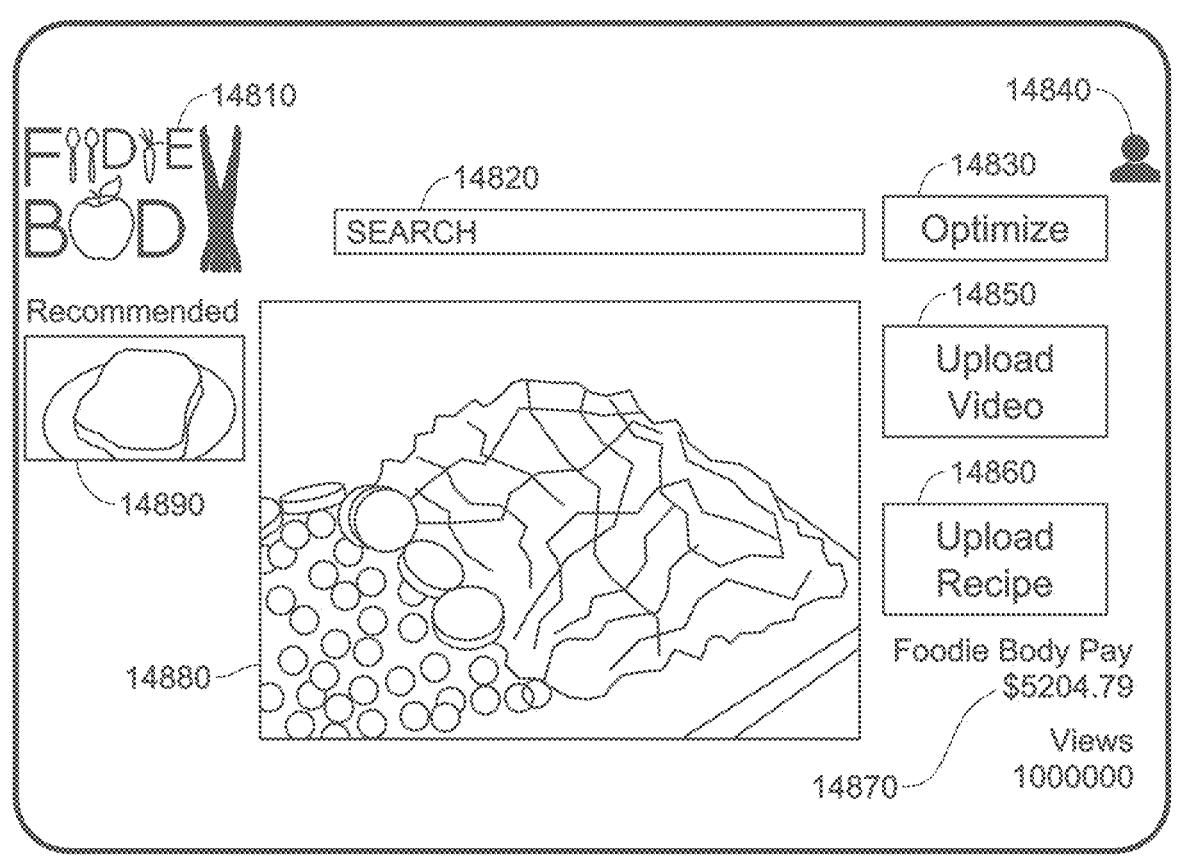

FIG. 148 illustrates a drug and food and beverage database search interface 148 in accordance with some embodiments with additional recipe or cooking content videos 14880 for the biomarker based search engine for drugs and food and beverages. In some embodiments, search engine exemplary logo, Foodie and Emission body 14810 or another exemplary logo may be displayed. In some embodiments, an exemplary search input window 14820 may allow a user 14840 additional search input 14820 or input variation from a current search term and food or beverage combination video 14880. In some embodiments, the method and system may recommend additional food and recipe videos 14890 based on popularity, linked recipe types, efficient ratios of blood chemistry expected values to blood variance values in the opportunity set. In some embodiments, the user 14840 may upload a video 14850 with cooking content and recipe content that has been optimized for the user's biomarkers. In some embodiments, the user 14840 may upload recipes and nutrition data 14860 to the network for ranking in the search node ranking database or related video ranked node database with nutrition data of the underlying recipe from the food database 10840. In some embodiments, the user 14840 may receive rewards such as Foodie and Emission body pay or claim pay 14870 for videos that are popular or receive high views 14870 because they are well done with efficient blood chemistry values to blood chemistry variance as a ratio.

Figure 149:
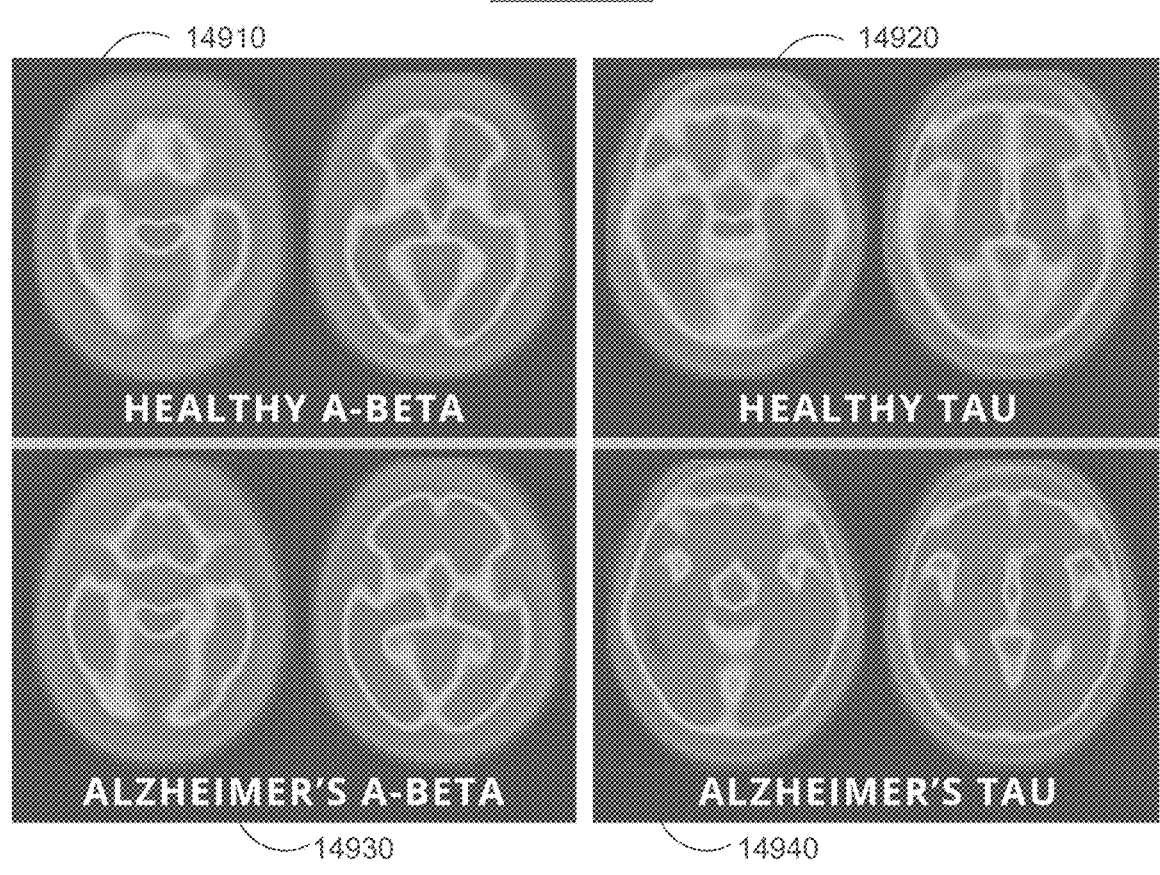
FIG. 149 illustrates a positron emission tomography output in accordance with implementations of various techniques described herein.

FIG. 149 illustrates a positron emission tomography output 14900 with a plurality of various conditions such as a health brain with low levels of beta amyloid 14910, high levels of beta-amyloid 14930 and resulting Alzheimer's, healthy levels of hyperphosphorylated protein tau 14920 and no resulting Alzheimer's and high levels of hyperphosphorylated protein tau 14940 with resulting Alzheimer's. In some embodiments, carbon or emissions may be a co-contributory factor. In some embodiments, data is transformed with progressive machine learning equation fitting models including but not limited to linear regression, logistic regression, linear discriminant analysis, classification or regression trees, naïve bayes, k nearest neighbors, leaning vector quantization, support vector machines, bagging and random forest, boosting and adaboost models to update best fit historical equations for a user's time series data of biomarker panels considering food and beverage consumption. In some embodiments, exemplary models may include but are not limited to the following machine learning model outputs such as Alzheimer's indicator equation 14950 beta amyloid plaque level equaling 141.76 plus 63.46 multiplied by X sub i index which represents cholesterol intake less the quantity of 12.96 X squared sub i index which represents cholesterol intake plus 0.93 multiplied by X cubed sub i, where X is again the level of cholesterol intake over time period i. In some embodiments, exemplary models may include but are not limited to the following machine learning model outputs such as Alzheimer's indicator equation 14960 hyperphosphorylated protein tau level equaling 11.76 plus 66.6 multiplied by X sub i index which represents cholesterol intake less the quantity of 1.21 X squared sub i index which represents cholesterol intake plus 0.32 multiplied by X cubed sub i, where X is again the level of cholesterol intake over time period i. In some embodiments, exemplary models may include but are not limited to the following machine learning model outputs such as Alzheimer's indicator equation 14970 neurofibrillary tangles level equaling 8.88 plus 15.47 multiplied by X sub i index which represents cholesterol intake less the quantity of 2.06 X squared sub i index which represents cholesterol intake plus 0.10 multiplied by X cubed sub i, where X is again the level of cholesterol intake over time period i. In some embodiments, exemplary models may include but are not limited to the following machine learning model outputs such as Alzheimer's indicator equation 14980 ApoE3 beta amyloid plaques level equaling 1.2 plus dummy variable D sub 0 which indicates the presence of the ApoE3 gene plus 63.46 multiplied by X sub i index which represents cholesterol intake less the quantity of 12.96 X squared sub i index which represents cholesterol intake plus 0.93 multiplied by X cubed sub i, where X is again the level of cholesterol intake over time period i. In some embodiments, machine learning models continue to iterate model fitting until error minimization has been achieved and therefore, model fitting in the method is not limited to equations 14950, 14960, 14970, 14980, but rather the method to fit models to minimize the error terms in obtaining the food and beverage sequences which maximize the ratio of the biomarker chemistry value improvement over the variance of the biomarker chemistry resulting in the most efficient path to health improvement as measured by biomarker analysis as well as the node ranking of a plurality of search category food and beverage items as defined by their ranking of maximizing the ratio of biomarker chemistry improvement over the variance of the biomarker chemistry improvement. In some embodiments, the machine learning model fitting technique and resulting node ranking of food and beverage sequences which maximize the ratio of the biomarker chemistry value improvement over the variance of the biomarker chemistry improvement resulting in the most efficient path to health improvement as measured by biomarker analysis may be applied to any biomarker indicator of health condition such as Alzheimer's, heart disease, echocardiogram, nuclear perfusion studies, magnetic resonance imaging, hemoglobin A1C diabetes test, glycohemoglobin test, leukocyte antigen HLA-DQ2 or HLA-DQ8 tests, TSH thyroid stimulating hormone or total T4 free thyroxine, free T4, total T3, free T3, reverse T3, anti TPO ab, anti thyroglobulin Ab, broad thyroid panels, iron, vitamin D, vitamin b12, magnesium, calcium, complete metabolic panels, complete blood count, homocysteine, hsCRO inflammatory marker, homocysteine level, amino acid levels, white blood cell count, red blood cell count, hemoglobin, hematocrit, mean corpuscular volume, platelet count, LDL low density lipoprotein cholesterol, HDL high density lipoprotein cholesterol, sodium, potassium, chloride, carbon dioxide, blood urea nitrogen, creatine, glucose, total protein, albumin, bilirubin, alkaline phosphatase, aspartate aminotransferase, alanine aminotransferase, methylmalonic acid, glycated hemoglobin, prothrombin time, international normalized ratio (prothrombin time), brain natriuretic peptide, ferritin, bone marrow biopsy, barium enema, bone scan, breast MRI, colonoscopy, computed tomography scan, digital rectal exam, hypercholesterolemia, atherosclerotic plaque level, plasma level, endoscopy, fecal occult blood tests, mammography, MUGA scan, pap test, sigmoidoscopy, circulating tumor cell, flow cytometry, cytogenetic analysis, immunophenotyping, fluorescence in situ hybridization, karyotype test, polymerase chain reaction, white cell differential, general biopsies with change analysis, narcotic tests, chemical test indicator variables or any biomarker test.

FIG. 150 illustrates a low density lipoprotein LDL cholesterol output 15000 over time series between two points in time with the user eating foods and beverages recommended by the search engine that node ranks the ratio of biomarker chemistry change over biomarker chemistry variance during the time period from a starting point at time of t=0 before changing diet to items recommended by search engine. In some embodiments, the biomarker of low density lipoprotein LDL cholesterol may be measured over time 15010 as the user eats the search items node ranked by the method. In some embodiments, machine learning models may fit the user relationship of cholesterol in food and beverages to low density lipoprotein with the equation 15011 where low density protein equals negative 1.2 multiplied by the natural log of X sub i, where X is the level of cholesterol in food and beverages ingested between time period t=0 and t=i plus 140+a dummy variable □ sub 0 that may indicate the presence of phytosterols, soluble fibers, phospholipids, stearic acid or other cholesterol absorption inhibitors. In some embodiments, each biomarker time series represented in the machine learning model 15010 may have different best fit models for each user as each model is generated from time series of users or users with similar characteristics as a proxy until appropriate time series may be logged in the biomarker database server 10820. In some embodiments, calcium biomarkers may be measured from a base state of time equaling zero 15020 before the user commences use of the method to maximize the biomarker ratio or ratio sequence of biomarker value contribution over biomarker variance contribution in the node ranked database which may be utilized in search engine results. In some embodiments, the biomarker calcium contribution may be measured by calcium biomarker sub i equals 1.3 multiplied by the natural log of X sub i, where X is the food or beverage contribution to the biomarker in the form of calcium plus 8.8. In some embodiments, the users may be represented by time series in the graph 15020 each having their own minimization of error machine learning model in accordance with then the maximization of the ratio of biomarker value contribution over biomarker variance contribution in the node ranked claim database.

Figure 151A:
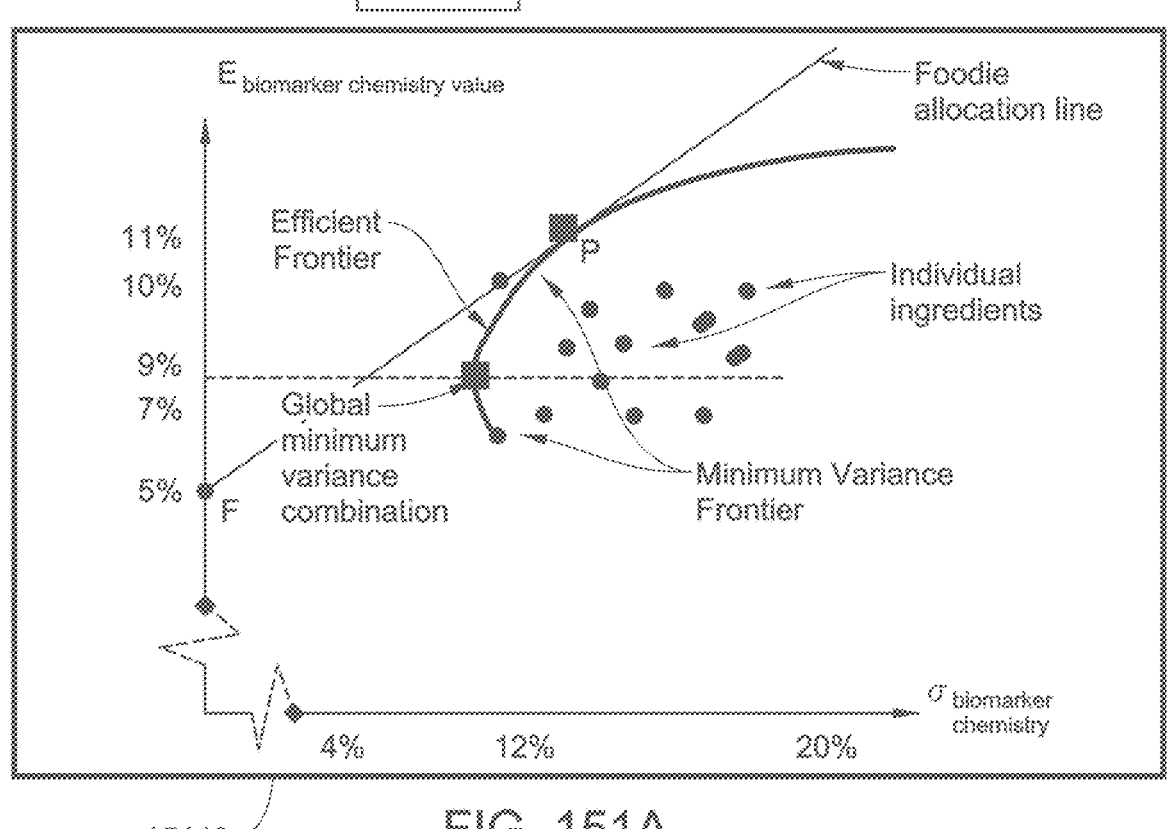
FIGS. 151A and 151B illustrate a ranking formulation configuration in accordance with implementations of various techniques described herein.
Figure 151B:
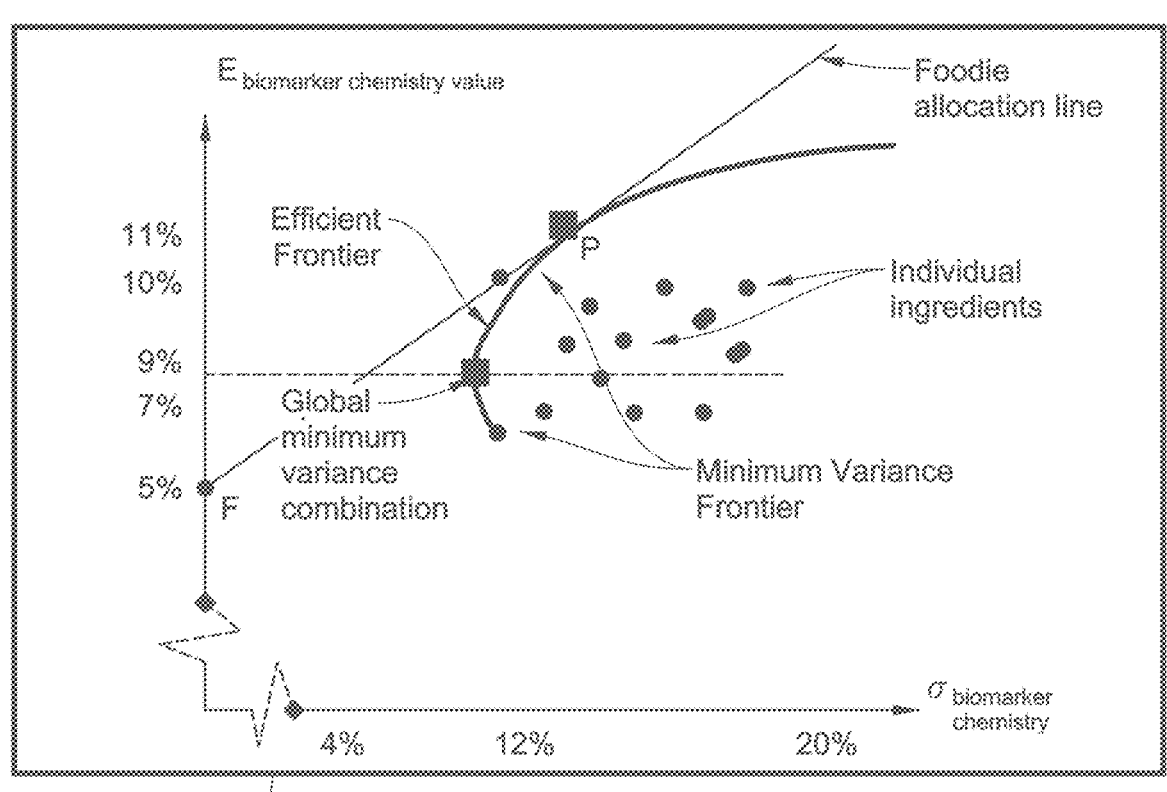

FIG. 151 illustrates an exemplary embodiment of the plaintiff claim user or Foodie and Emission allocation line relative to the opportunity set of food and beverage combinations 15100 as ranked by the node food and beverage node database server 10840. In some embodiments, the expected value of the biomarker chemistry value is represented by the vertical Y axis as the contribution of food or beverage to the representative biomarker or vector of biomarkers in N dimensional space 15110. In some embodiments, the variance of the biomarker chemistry value is represented by the X horizontal axis in N dimensional space 15110. In some embodiments, portfolios of various drug and food and beverage combinations, recipes, meals, restaurant or food ordered deliveries are shown at various levels which may be node ranked in a database based on the ratio of expected contribution of biomarker chemistry contribution value to a target over the variance of the biomarker chemistry value contribution. In some embodiments, an optimal or most efficient food and beverage combination represented by point P in diagram 15110 may be achieved at the highest point where the Foodie and Emission allocation line matches the minimum variance frontier for the plurality of various drug and food and beverage combinations for a specific user. In some embodiments, the general framework 15110 may select a vector or matrix of food combinations and a vector and matrix of biomarkers which may be fundamentally different than another vector and matrix of biomarkers or food and beverage combinations represented in model 15120. In some embodiments, node ranked food and beverage combinations based on the efficiency ratio of expected biomarker value contribution over variance of biomarker value considering the Foodie and Emission allocation line and efficient minimum variance frontier may be updated based on machine learning model updates for minimization of errors in food and beverage combination contribution to biomarker values.

Figure 152:
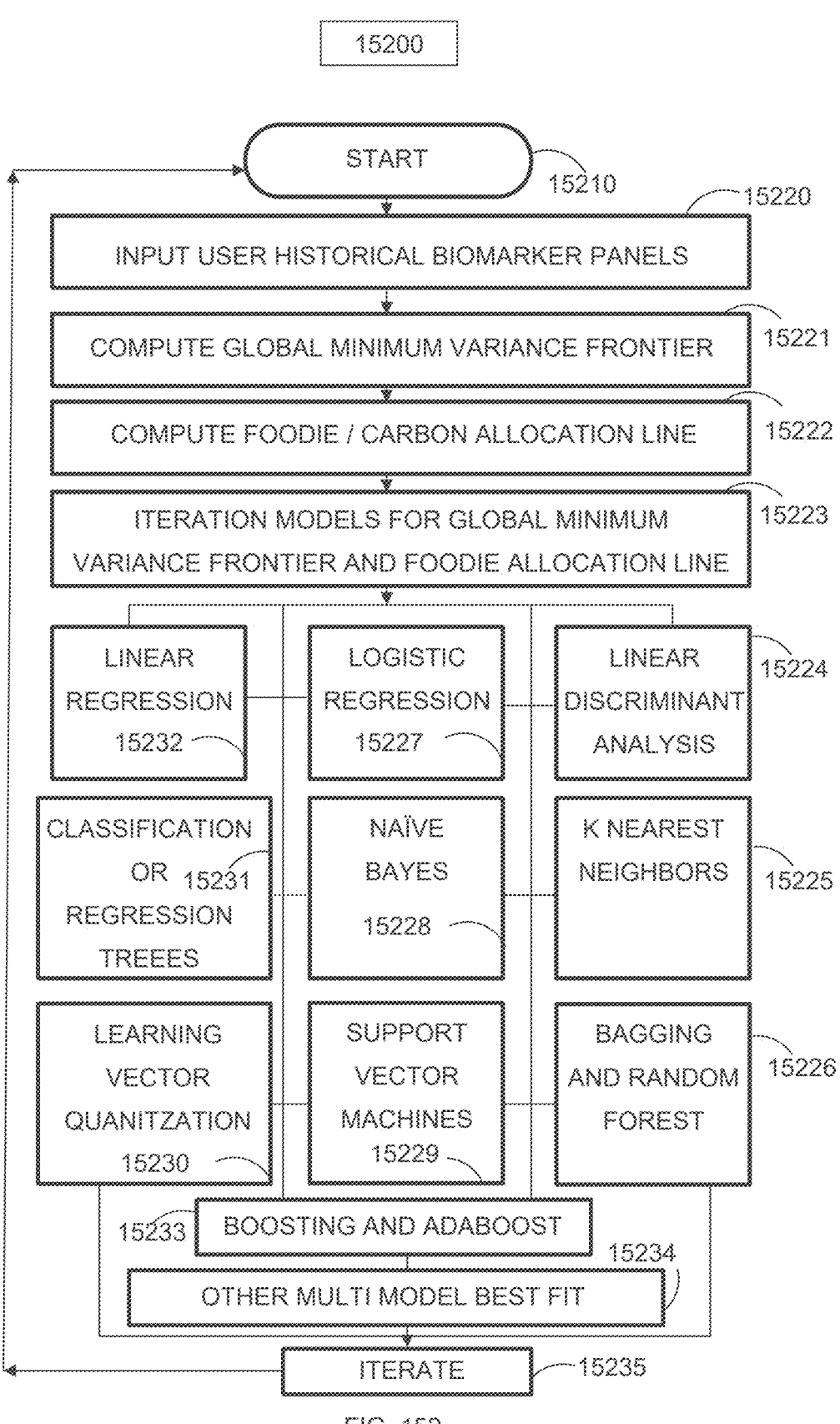
FIG. 152 illustrates a node ranking flow chart for biomarker or accident discovery data in accordance with implementations of various techniques described herein.

FIG. 152 illustrates an exemplary embodiment of a flow chart construction of the iterative loop for constructing sets of biomarker panels 15220, drug and food and beverage contribution to biomarker global minimum variance frontiers and portfolios 15221, Foodie and Emission allocation lines 15222, machine learning models 15232, 15227, 15224, 15231, 15228, 15225, 15230, 15229, 15226, 15233, 15234 to test historical datasets of user food and beverage interaction with biomarker values which form the basis of the method to node rank food and beverage combinations for users 15200. In some embodiments, the user 10810 obtains self test or lab test biomarkers and updates the system 4620 to form the basis of a time series or comparison data for comparable users. In some embodiments, the computation of the global minimum variance frontier of drug and food and beverage contributions to biomarker values and variance of biomarker values to form ratios of biomarker value contribution over variance of biomarker contributions in the node ranked database for food and beverage combinations 15221. In some embodiments, the Foodie and Emission allocation line is constructed based on a plurality of utility attributes of the user such as but not limited to flavor, ethnicity, location, style, hunger, genetics or other utility characteristics 15222. In some embodiments, the search input may then instruct the system to iterate the Foodie and Emission allocation line over a minimum variance frontier of drug and food and beverage combination categories 15223. In some embodiments, the machine learning models determine the best fit by minimizing errors of a plurality of functions 15224 for food and beverage contribution to expected biomarker values of users and the resulting maximization of the ratio of expected biomarker contribution value over expected biomarker contribution variance and then node ranking lower from the highest ratio value in accordance with the Foodie and Emission allocation line 15222 and minimum variance frontier 15221. In some embodiments, machine learning best fit models determining food and beverage contribution to biomarker values or ratio of biomarker values over variance of biomarker value may be comprised of but not limited to linear regression 15232, logistic regression 15227, linear discriminant analysis 15224, classification or regression trees 15231, naïve bayes 15228, k nearest neighbors 15225, learning vector quantization 15230, support vector machines 15229, bagging and random forest 15226, boosting and adaboost 15233, ARIMA processes, Box-Jenkins, posterior density functions, natural conjugate prior, recursion, Bayesian pretest, ridge regression, independent stochastic regressors, general stochastic regression models, general nonlinear hypothesis, LaGrange multiplier test, Likelihood ratio test, autoregressive processes, moving average processes, ARMA processes, GLS, EGLS, NLS, ML estimation, AR(1), AR(2), Wald test, Durbin-Watson test, King's locally optimal bounds, Geary's sign change test, MA(1), Monte Carlo, finite distributed lags, almon distributed lag, polynomial spline distributed lag, Shiller's distributed lag, Harmonic Lag, gamma distributed lag, exponential lag, heteroscedastic specifications, Breusch-Pagan Test, Barlett Test, Godfeld Quandt test, Szroeters Class of tests, Whites Test, nonparametric tests, vector ARMA processes, ARMAX models, vector autoregressive processes, path analysis, binary choice models, multinomial logit, multinomial probit, truncated samples, two stage models, Amemiya's principle model, simultaneous equation model, piecewise regression, seasonality models, Akaike information Criterion, Jeffrey-Bayes Posterior odds ratio, conditional mean, Stein-Rule formulation model, Cox test model, J test model, quasi-Newton method model, Gauss method model, gradient method model, Marquardt's method model, Gauss-Seidel model, Grid Search, reparameterization model, penalty function model, augmented Lagrangian method model, Kalman Filter model or other models for use in determining food and beverage contribution to biomarkers in construction of a ratio to place the expected contribution value of the biomarker over the variance of the biomarker contribution value for a node ranked database for food and beverage combinations. In some embodiments, each of the aforementioned processes and transformations are then iterated continuously 15235 based on updates to machine learning fit models, food and beverage inputs, biomarker test results, computation of minimum variance frontiers, computation of Foodie and Emission allocation lines, plaintiff claim user lines or other model updates.

Figure 153:
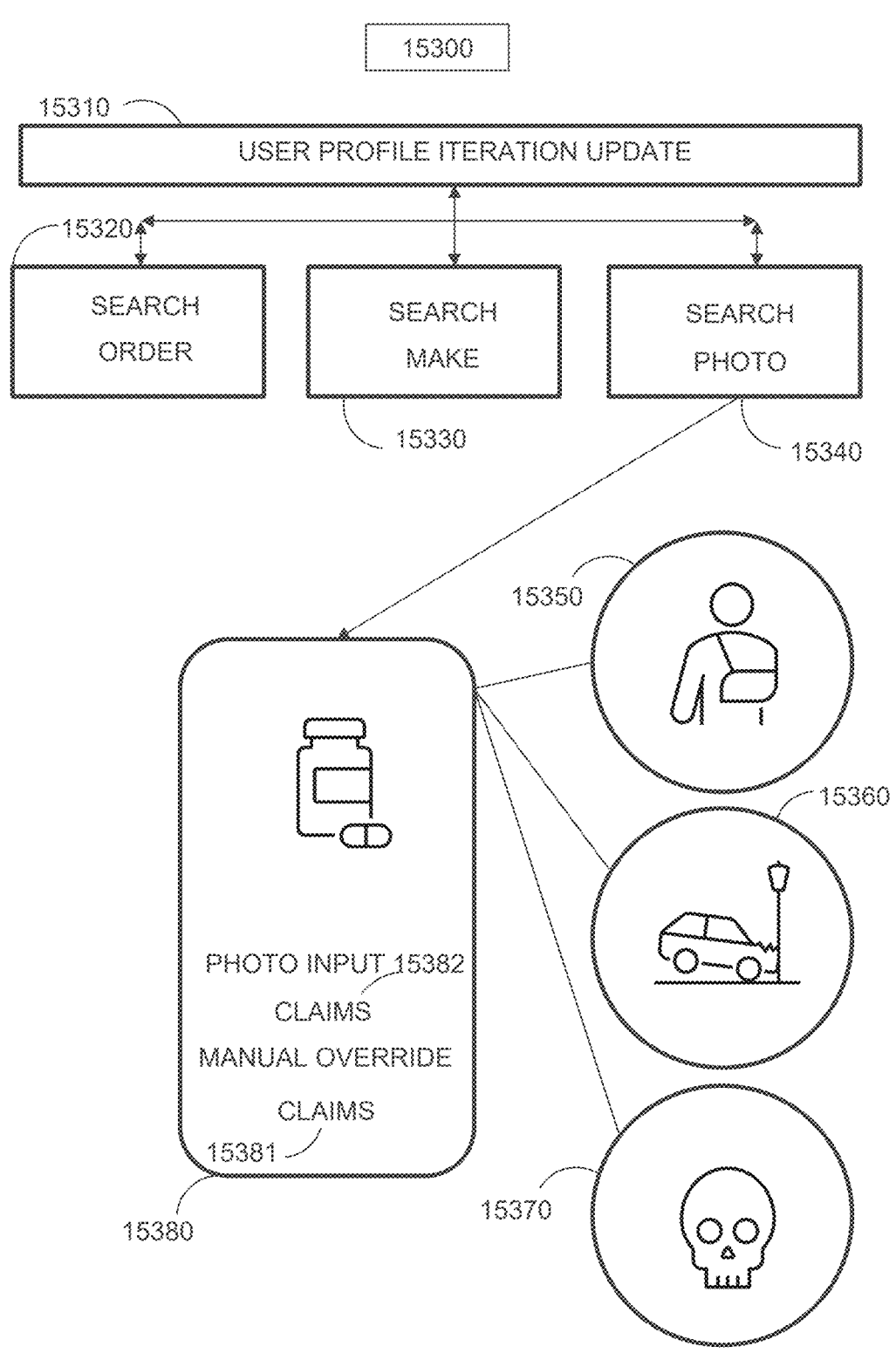
FIG. 153 illustrates a user profile iteration interface to biomarkers in which the various technologies described herein may be incorporated and practiced.

FIG. 153 illustrates an exemplary embodiment of a user profile iteration update from a search order 15320, search for making a prescription or recipe 15330, or search from photo 15340, audio or visual recognition of drugs, implants, foods or beverages. In some embodiments, a CPU device 15380 with visual, photo, recognition, voice or other interface may update from a plurality of inputs including, but not limited to, visual scan recognition of ingredients or food or beverage 15382. In some embodiments, a manual override 15381 may allow the user to update the search or order of food and beverage to update the user profile intake of drugs or food and beverage. In some embodiments a sequence of foods 15350, 15360, 15370 may be input into the system by a user using the CPU device 15380. In some embodiments, food and beverage search, ordering, making of recipes, audio interface, scan interface or photo interface 15382 may update the user profile 15310 with food and beverage combinations 15350 to the system may estimate user performance between biomarker test periods.

Figure 154:
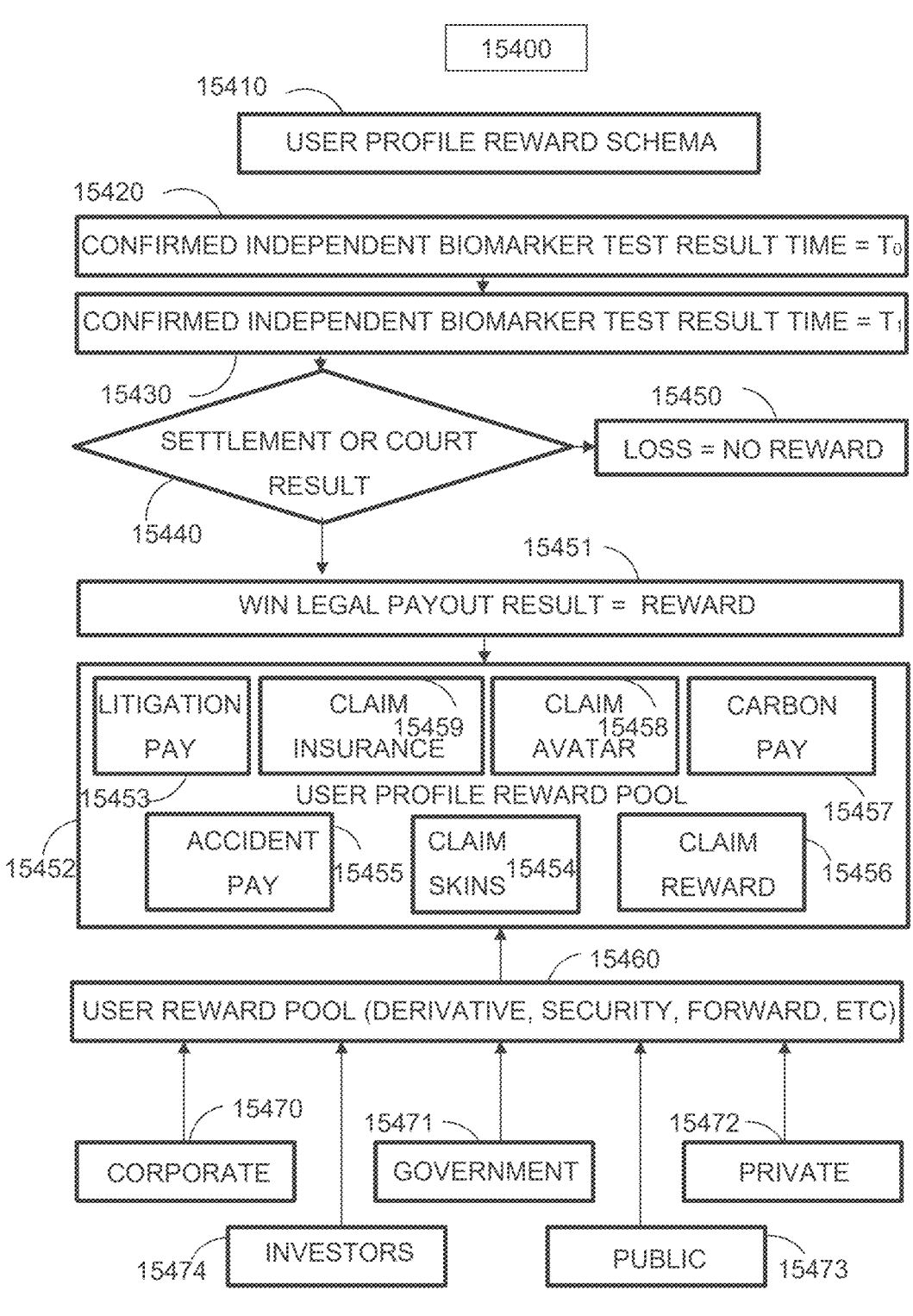
FIG. 154 illustrates a flow chart for claim payouts in which the various technologies described herein may be incorporated and practiced.

FIG. 154 illustrates an exemplary user profile reward schema for confirmed biomarker improvements for target biomarker input in the system as a result of drug and food and beverage combination improvements to the user 15400. In some embodiments, it is well known that diets do not work or they are unsustainable, it is also well known that companies or governments usually do not pay or incentivize people with any significant reward to eat well with the opportunity independently confirmed and rewarded by an independent biomarker measurement lab or facility. In some embodiments, it is also well known that pharmaceutical companies take advantage of users with less information and give them drugs that are not needed or provide bodily harm such as the opioid epidemic. In some embodiments, a typical user profile reward schema 15410 may include a baseline biomarker test on time t=0 confirmed by an independent test or lab 15420. In some embodiments, a user may perform or be evaluated by a second biomarker test or lab at time t=1 15430. In some embodiments, a reward may be given to the user based on achieving a specified biomarker test level over a period or time which may include one time period or a sequence of time periods or other combinations of time. In some embodiments, the biomarker test result or digital epichain result or settlement result 15440 is performed or evaluated by an independent biomarker lab and digital epichain. In some embodiments, if the biomarker target value was not achieved, no reward is given to the user or a penalty may be given in the form of emission or emission offset fees for the claim 15450. In some embodiments, if the target biomarker test result is achieved or a digital epichain case or settlement was achieved 15451, a reward may be given 15452. In some embodiments, rewards 4852 may include but are not limited to emission or emission offset pay 4853, claim insurance 15459, claim avatar 15458, emission or emission offset pay 15457, travel pay 15455, claim skins 15454, claim reward 15456 or other rewards 15452. In some embodiments, the user profile award pool 15460 may be comprised of but not limited to corporates 15470, government 15471, private sector 15472, other entities 15474, public entities 15473. In some embodiments, the reward pool 4860 may be calculated in conjunction with performance of reducing an employers insurance payout, government insurance payout or other payouts due to high health care costs which have been avoided or reduced, pharmaceutical company fraud, other claim fraud, infringement, environmental benefits, pollution reduction, based on improved biomarker performance or any other metric chosen by an entity contributing to the reward pool. In some embodiments the user profile reward schema 15410 may be updated instantly or over time.

Figure 155:
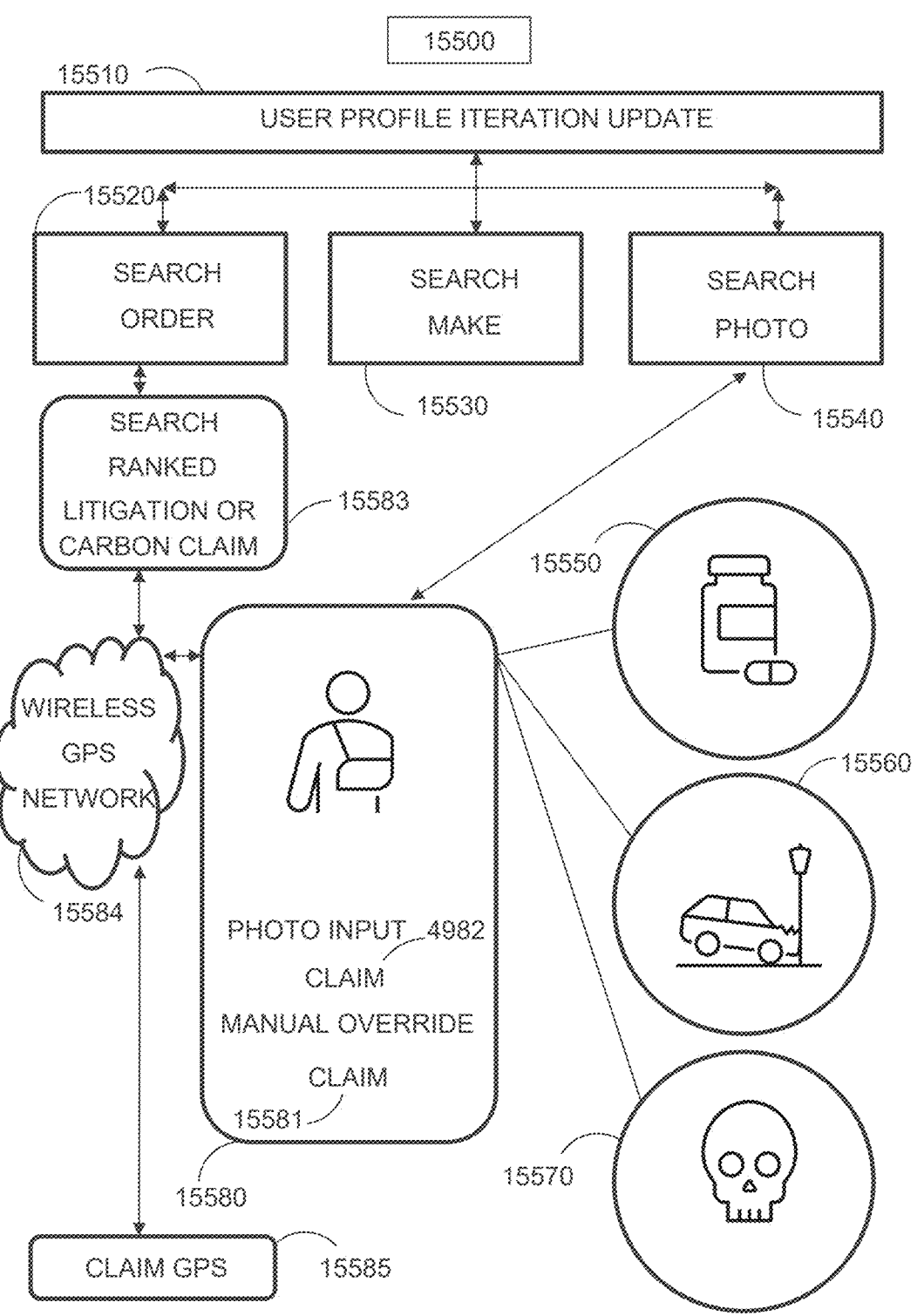
FIG. 155 illustrates a user profile iteration interface to biomarker and location data in which the various technologies described herein may be incorporated and practiced.

FIG. 155 illustrates an exemplary user iteration update 15510 based on search order input 15520, search that was made form a searched recipe 15530 considering carbon or emission contribution, search from an audio or visual or photo input 15540 from a CPU device 15580. In some embodiments, the user CPU device 4980 may update with a food distribution point menu 15583 with node ranked search results based on the user's location from a wireless GPS network 15585. In some embodiments, the food distribution point may be a restaurant 15585 or any drug or food distribution establishment. In some embodiments, the user GPS location of the CPU device 15580 may improve the speed or feature display to pre-update ranked menu offerings 15583 based on node ranking from the food and beverage contribution to biomarker contribution to a target. In some embodiments, the food and beverage contribution may be the food and beverage contribution to the biomarker change or optimized by the ratio of the biomarker contribution value over the variance of the biomarker contribution value considering the Foodie and Emission allocation line and minimum variance frontier of the drug or food and beverage contribution to the biomarker.

Figure 156:
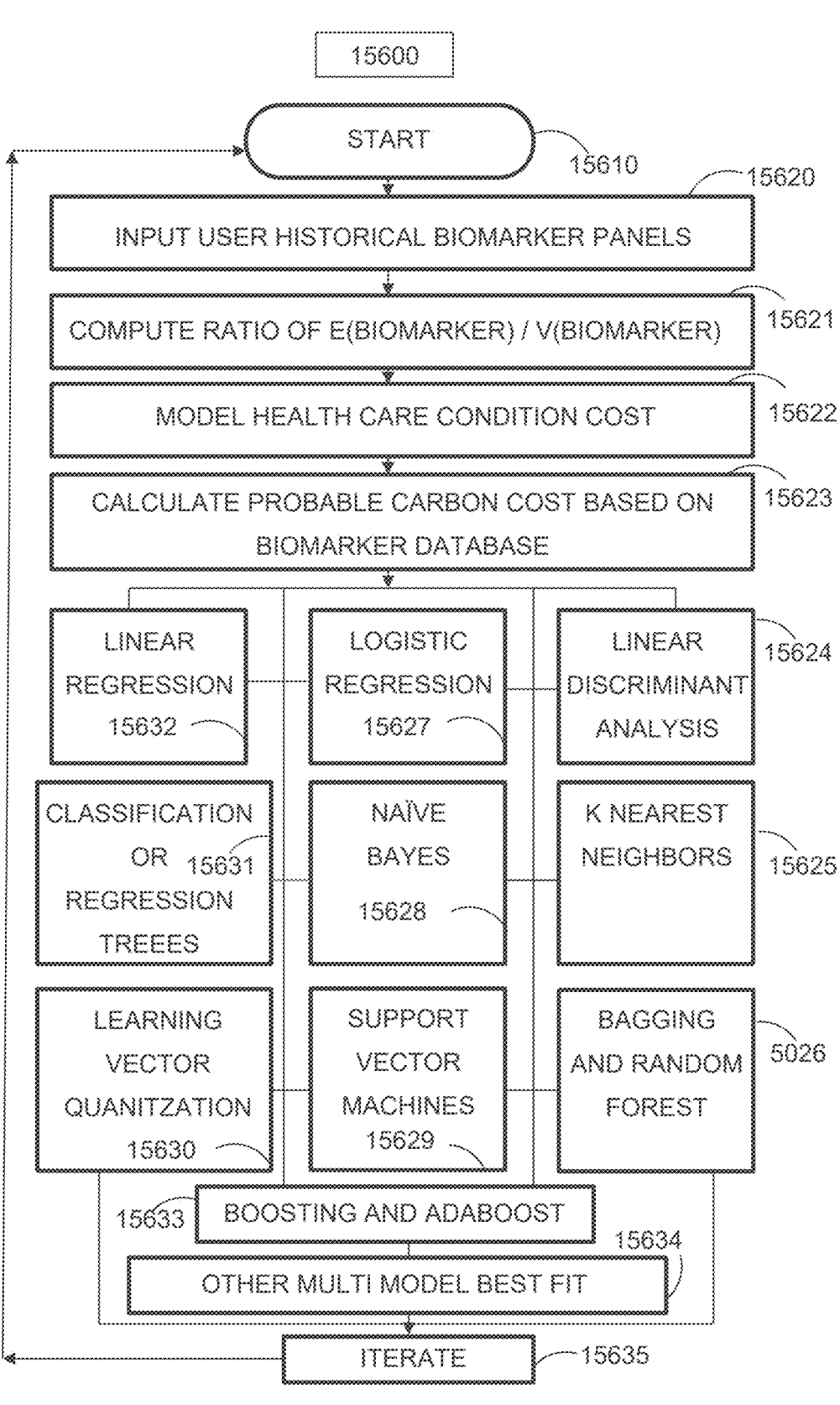
FIG. 156 illustrates a flow chart for claim and insurance payouts in which the various technologies described herein may be incorporated and practiced.

FIG. 156 illustrates an exemplary machine learning model using the biomarker time series data to price health insurance or price emission or emission offset claims 15600. In some embodiments, the process of pricing health insurance starts 15610 with the user inputting historical biomarker panels 15620. In some embodiments, the search node ranking and scoring may be derived from the computation of the expected value of the biomarker contribution from food or beverage combinations divided by the variance of the biomarker contribution from food or beverage combinations 15621. In some embodiments, actuary tables or tables of health care cost 15622 of various health conditions may be stored as a general table in the biomarker database 10820. In some embodiments, machine learning models may best fit minimizing the errors of health care costs from the table of health care costs 15622 in the biomarker database 10820 compared to a time series of biomarkers 15620 and probabilities health care costs are needed for a user. In some embodiments, health care cost models may be fit against biomarker samples and panels with linear regression 15632, logistic regression 15627, linear discriminant analysis 15624, classification or regression trees 15631, naïve bayes 15628, k nearest neighbors 15625, learning vector quantitation 15630, support vector machines 15629, bagging and random forest 15626, boosting and adaboost models 15633, other best fit models may include, but are not limited to, ARIMA processes, Box-Jenkins, posterior density functions, natural conjugate prior, recursion, Bayesian pretest, ridge regression, independent stochastic regressors, general stochastic regression models, general non-linear hypothesis, LaGrange multiplier test, Likelihood ratio test, autoregressive processes, moving average processes, ARMA processes, GLS, EGLS, NLS, ML estimation, AR(1), AR(2), Wald test, Durbin-Watson test, King's locally optimal bounds, Geary's sign change test, MA(1), Monte Carlo, finite distributed lags, almon distributed lag, polynomial spline distributed lag, Shiller's distributed lag, Harmonic Lag, gamma distributed lag, exponential lag, heteroscedastic specifications, Breusch-Pagan Test, Barlett Test, Godfeld Quandt test, Szroeters Class of tests, Whites Test, nonparametric tests, vector ARMA processes, ARMAX models, vector autoregressive processes, path analysis, binary choice models, multinomial logit, multinomial probit, truncated samples, two stage models, Amemiya's principle model, simultaneous equation model, piecewise regression, seasonality models, Akaike information Criterion, Jeffrey-Bayes Posterior odds ratio, conditional mean, Stein-Rule formulation model, Cox test model, J test model, quasi-Newton method model, Gauss method model, gradient method model, Marquardt's method model, Gauss-Seidel model, Grid Search, reparameterization model, penalty function model, augmented Lagrangian method model, Kalman Filter model or other models 15634. In some embodiments, the overall insurance pricing process may be iterated 15635 over many times and time period combinations. In some embodiments, probabilities of health conditions may be updated given user interaction with the plurality of interfaces of the food and beverage node rankings, searching, scoring and consumption patterns. In some embodiments, by example, but not limiting by example, annual health care costs of a type II diabetes user may be $14,000 USD each year as a cost to the employer. In some embodiments, the user may submit biomarker data to the method and system and use the node ranking system for selecting food and beverage choices. In some embodiments, the type II diabetes condition may be reversed eliminating the $14,000 annual health cost of the condition. In some embodiments the reward schema 15400 may pay the user $4,000 as a reward from an employer for reversing the type II diabetes condition through verified test results 15440 over a period of time. In some embodiments, machine learning models may calculate the reduced medical costs of the user and provide outputs which price insurance based or emission or emission offset claims on biomarker patterns from the method and system considering but not limited to the following models of linear regression 15632, logistic regression 15627, linear discriminant analysis 15624, classification or regression trees 15631, naïve bayes 15628, k nearest neighbors 15625, learning vector quantitation 15630, support vector machines 15629, bagging and random forest 15626, boosting and adaboost models 15633, other best fit models may include, but are not limited to, ARIMA processes, Box-Jenkins, posterior density functions, natural conjugate prior, recursion, Bayesian pretest, ridge regression, independent stochastic regressors, general stochastic regression models, general non-linear hypothesis, LaGrange multiplier test, Likelihood ratio test, autoregressive processes, moving average processes, ARMA processes, GLS, EGLS, NLS, ML estimation, AR(1), AR(2), Wald test, Durbin-Watson test, King's locally optimal bounds, Geary's sign change test, MA(1), Monte Carlo, finite distributed lags, almon distributed lag, polynomial spline distributed lag, Shiller's distributed lag, Harmonic Lag, gamma distributed lag, exponential lag, heteroscedastic specifications, Breusch-Pagan Test, Barlett Test, Godfeld Quandt test, Szroeters Class of tests, Whites Test, nonparametric tests, vector ARMA processes, ARMAX models, vector autoregressive processes, path analysis, binary choice models, multinomial logit, multinomial probit, truncated samples, two stage models, Amemiya's principle model, simultaneous equation model, piecewise regression, seasonality models, Akaike information Criterion, Jeffrey-Bayes Posterior odds ratio, conditional mean, Stein-Rule formulation model, Cox test model, J test model, quasi-Newton method model, Gauss method model, gradient method model, Marquardt's method model, Gauss-Seidel model, Grid Search, reparameterization model, penalty function model, augmented Lagrangian method model, Kalman Filter model or other models 15634.

FIG. 157 illustrates an exemplary Medicare Secondary Payer Recovery Portal, Benefits Coordination Recovery Center as well as data sources for the securitization of an emission or emission offset or emission or emission offset geolocation claim unit 15700. In some embodiments, Medicare Secondary Payer Claims have a recovery portal run by the government 15710 as well as a benefits coordination and recovery center 15720. In some embodiments, the Medicare Secondary Payer Claims have not been linked to primary payer data such as motor vehicle crash reports 15750 or personal health records 15760 or electronic health records 15770 or dietary and medication ingestion data 15780. In some embodiments, further there are no viable crash reports where the system uses the novel crash device report 160000 to fill in data gaps and more quickly ascertain relevant claim data that is not available from other resources.

Figure 158:
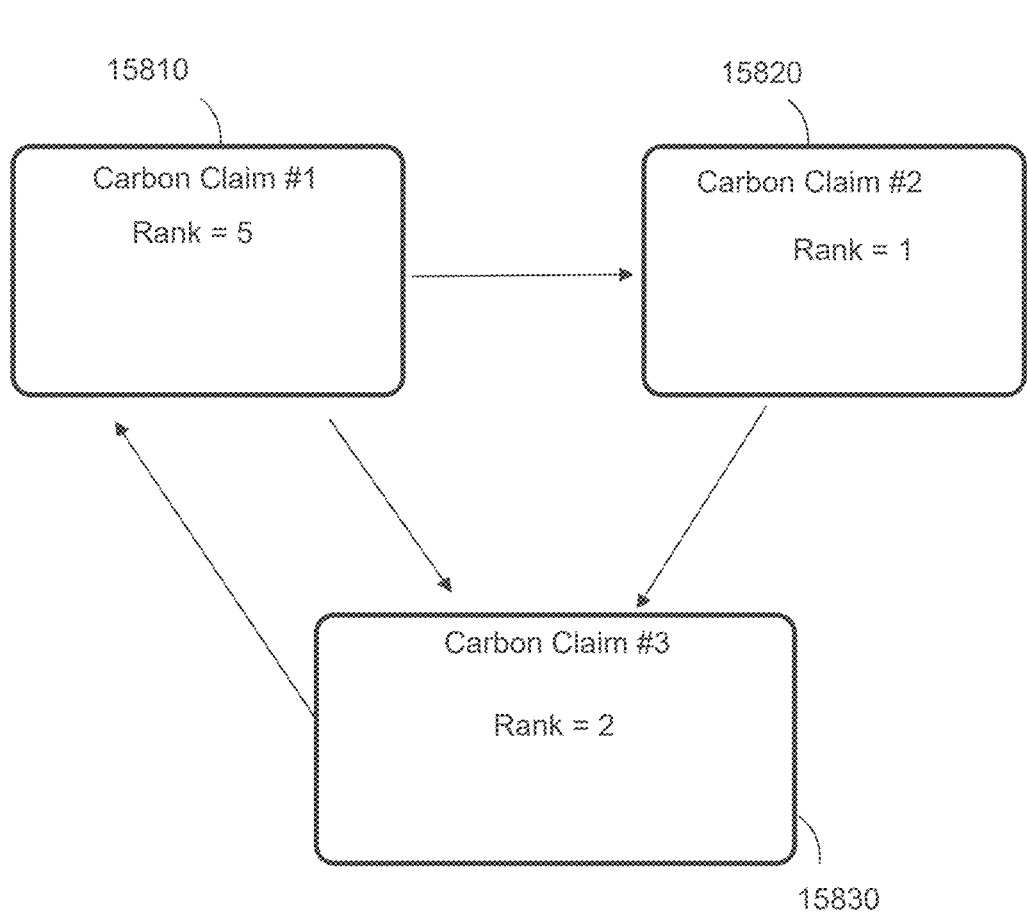
FIG. 158 illustrates claim ranking from a plurality of objective functions in which the various technologies described herein may be incorporated and practiced.

FIG. 158 illustrate an exemplary plurality of carbon or emission credit or claims that may be node ranked from the ratio based biomarker algorithms 13500 or crash reports 16000 or other data sources including, but not limited to, vehicle crash reports 15750 or personal health records 15760 or electronic health records 15770 or dietary and medication ingestion data 15780.

Figure 159:
FIG. 159 illustrates claim ranking from a plurality of objective function vectors in which the various technologies described herein may be incorporated and practiced.

FIG. 159 illustrate an exemplary iteration process for node ranking the plurality of claim data by looping over the nodes and updating with ratio based biomarker algorithms 13500 or crash reports 16000 or other data sources including, but not limited to, vehicle crash reports 15750 or personal health records 15760 or electronic health records 15770 or dietary and medication ingestion data 15780.

FIG. 160 illustrates an exemplary algorithm to take the device data and ascertain a crash report to process a claim which will then be converted into an emission claim or carbon credit geolocation claim unit for trading on the exchange 16000. In some embodiments the device may instantiate instructions to log continuous speeds 16010 in a GPS speed change loop 10620 which may then node rank speed changes with weightings of the amount of the speed change as a deceleration ratio in corroboration from the speed of the change in the accelerometer 16030 as well as logging pictures and video from the camera on the navigation device 16040 as well as logging sound data from the microphone and audio 16050 on the device which continuously loop to node rank simultaneous data events which then are transmitted to the claim data processor 16060 and are logged in the claim database. In some embodiments, the claim data processor may instantiate instructions to send a claim notification from the claim notification manager to various claim plaintiffs or users who may wish to start a claim with the device and method data. In some embodiments, the GPS speed acceleration or deceleration may be calculated in the relative incremental carbon contribution or reduction in the overall utility equation and node ranked outputs. In some embodiments, the claim notification manager 16080 may send notifications over the network 16085 with GPS position data 16086 to log data in the claim database 16070 and send a notification to the user with the portable multifunction device 16090. In some embodiments, the exemplary algorithm to log crash or travel data may be augmented with navigation system data 16095 or game data 3600 or other data sources to include in the emission claim or carbon credit geolocation claim unit blockchain for trading on the emission claim or carbon credit geolocation claim unit exchange.

Figure 161:
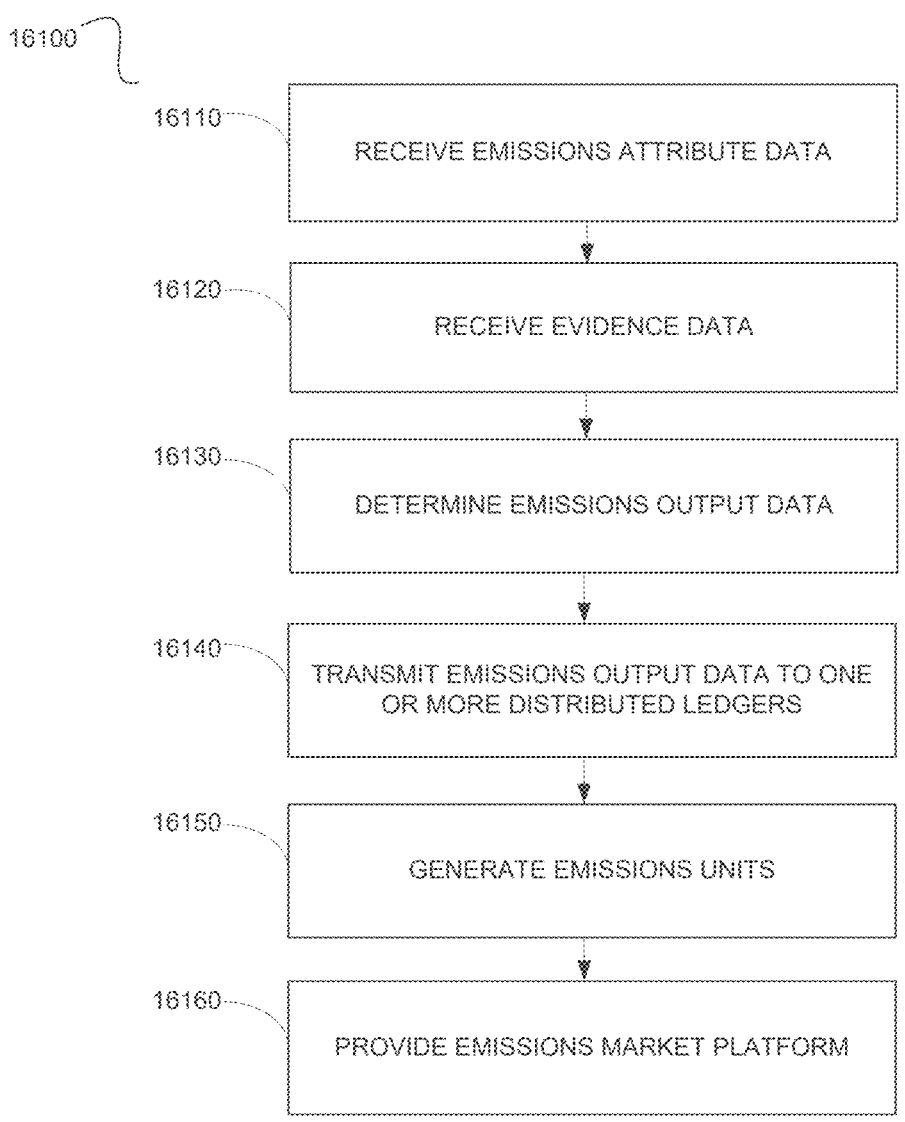
FIG. 161 illustrates a flow diagram in accordance with implementations of various techniques described herein.

FIG. 161 illustrates a flow diagram of a method 16100 for providing an emissions market platform in accordance with implementations of various techniques described herein. In one implementation, method 16100 may be at least partially performed by a computing system, such as the computing systems discussed herein. It should be understood that while method 16100 indicates a particular order of execution of operations, in some implementations, certain portions of the operations might be executed in a different order. Further, in some implementations, additional operations or steps may be added to the method 16100. Likewise, some operations or steps may be omitted.

At block 16110, the computing system may be configured to receive emissions attribute data from a plurality of users for a plurality of emissions objects, where a respective emissions object may be associated with a respective emissions output. Further, the respective emissions object may be associated with a respective user, where the emissions attribute data for the respective emissions object may include data corresponding to an object type for the respective emissions object.

At block 16120, the computing system may be configured to receive evidence data from the plurality of users for the plurality of emissions objects. In particular, the evidence data may include location data determined using a respective device of the respective user, where the location data may be associated with the respective emissions object, and where the respective device may be configured to transmit the device data to one or more distributed ledger.

At block 16130, the computing system may be configured to determine emissions output data for the plurality of emissions objects based on the emissions attribute data and the evidence data. In particular, the emissions output data for the respective emissions object may include data corresponding to the respective emissions output.

At block 16140, the computing system may be configured to transmit the emissions output data to the one or more distributed ledgers. At block 16150, the computing system may be configured to generate a plurality of emissions units for the plurality of users based on the emissions output data, where a respective emissions unit for the respective user corresponds to the respective emissions output/footprint. At block 16160, the computing system may be configured to provide an emissions market platform to the plurality of users for trading the plurality of emissions units.

Figure 162:
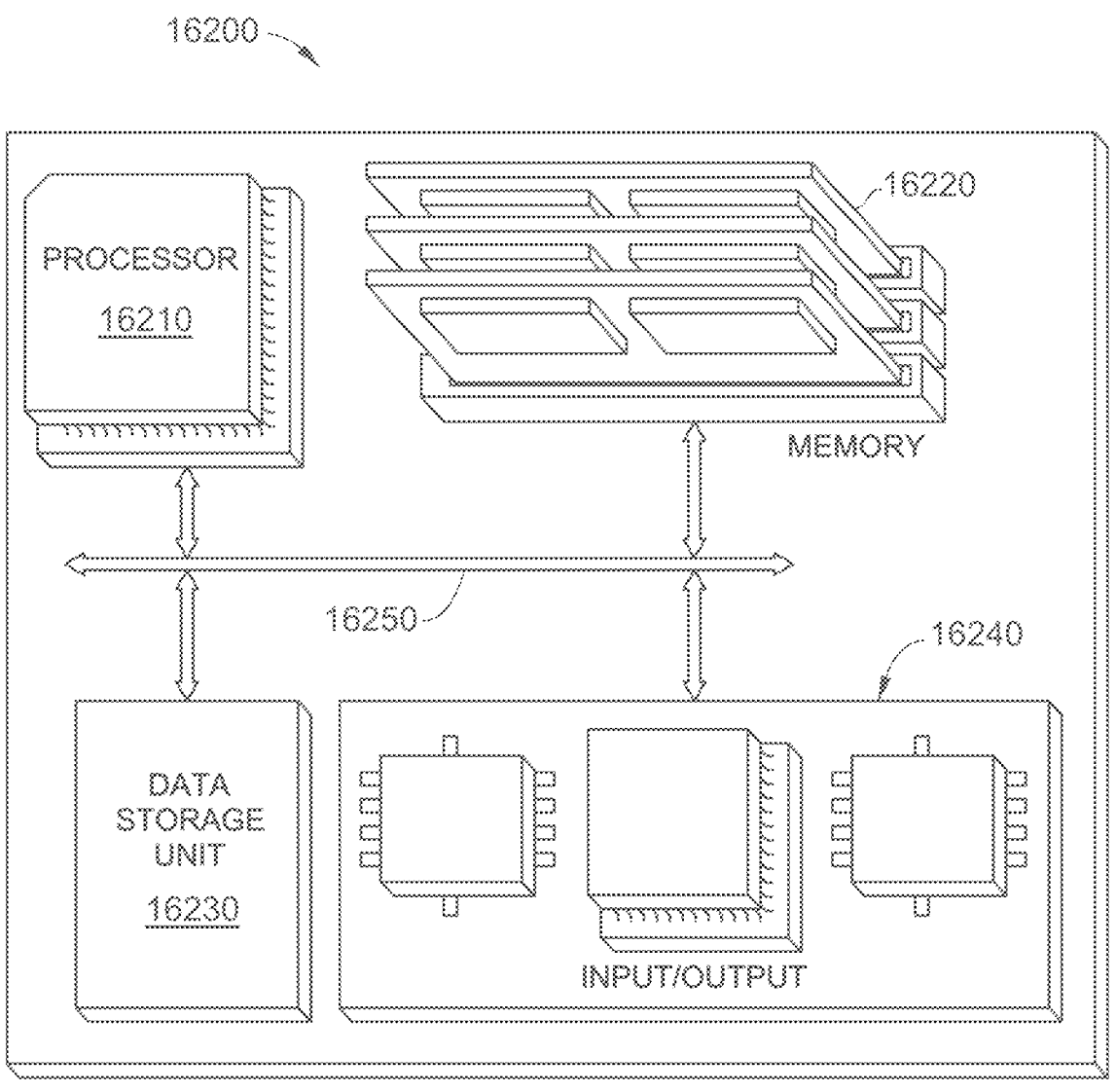
FIG. 162 illustrates a schematic diagram of a computing system in which the various technologies described herein may be incorporated and practiced.

FIG. 162 illustrates a block diagram of a hardware configuration 16200 in which one or more various technologies described herein may be incorporated and practiced. The hardware configuration 16200 can be used to implement the computing systems discussed above (e.g., the computing devices mentioned above). The hardware configuration 16200 can include a processor 16210, a memory 16220, a storage device 16230, and an input/output device 16240. Each of the components 16210, 16220, 16230, and 16240 can, for example, be interconnected using a system bus 16250. The processor 16210 can be capable of processing instructions for execution within the hardware configuration 16200. In one implementation, the processor 16210 can be a single-threaded processor. In another implementation, the processor 16210 can be a multi-threaded processor. The processor 16210 can be capable of processing instructions stored in the memory 16220 or on the storage device 16230.

The memory 16220 can store information within the hardware configuration 16200. In one implementation, the memory 16220 can be a computer-readable medium. In one implementation, the memory 16220 can be a volatile memory unit. In another implementation, the memory 16220 can be a non-volatile memory unit.

In some implementations, the storage device 16230 can be capable of providing mass storage for the hardware configuration 16200. In one implementation, the storage device 16230 can be a computer-readable medium. In various different implementations, the storage device 16230 can, for example, include a hard disk device/drive, an optical disk device, flash memory or some other large capacity storage device. In other implementations, the storage device 16230 can be a device external to the hardware configuration 16200. Various implementations for the memory 16220 and/or the storage device 16230 are further discussed below.

The input/output device 16240 can provide input/output operations for the hardware configuration 16200. In one implementation, the input/output device 16240 can include one or more display system interfaces, sensors and/or data transfer ports.

The subject matter of this disclosure, and/or components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine, e.g., a machine programmed to perform the processes described herein. The processes and logic flows can also be performed by, and apparatus can also be implemented as, special purpose logic circuitry, e.g., an FPGA (field programmable gate array) or an ASIC (application specific integrated circuit).

Computer readable media (e.g., memory 16220 and/or the storage device 16230) suitable for storing computer program instructions and data may include all forms of non-volatile memory, media, and memory devices, including, by way of example, any semiconductor memory devices (e.g., EPROM, EEPROM, solid state memory devices, and flash memory devices); any magnetic disks (e.g., internal hard disks or removable disks); any magneto optical disks; and any CD-ROM and DVD-ROM disks. The processor and the memory can be supplemented by, or incorporated in, special purpose logic circuitry.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving emissions attribute data from a plurality of users for a plurality of emissions objects, wherein a respective emissions object is associated with a respective emissions output, wherein the respective emissions object is associated with a respective user, and wherein the emissions attribute data for the respective emissions object comprises data corresponding to an object type for the respective emissions object;
receiving evidence data from the plurality of users for the plurality of emissions objects, wherein the evidence data from the respective user for the respective emissions object comprises:
location data determined using a respective device of the respective user,
wherein the location data correspond to a plurality of locations of the respective device determined using a satellite navigation system during a transportation associated with the respective emissions object, and wherein the respective device is configured to transmit the evidence data to one or more distributed ledgers;
determining emissions output data for the plurality of emissions objects based on the emissions attribute data and the evidence data, wherein the emissions output data for the respective emissions object comprises data corresponding to the respective emissions output;
transmitting the emissions output data to the one or more distributed ledgers;
generating a plurality of emissions units for the plurality of users based on the emissions output data, wherein a respective emissions unit for the respective user corresponds to the respective emissions output; and
providing an emissions market platform to the plurality of users for trading the plurality of emissions units, wherein:
the emissions market platform corresponds to market depth data, and
the market depth data comprises data indicating at least a bid price or offer price provided by a respective user for a respective emissions unit.

2. The method of claim 1, wherein the respective emissions object comprises a good or an activity associated with the respective emissions output.

3. The method of claim 1, wherein the emissions attribute data for the respective emissions object further comprises data corresponding to object quantity, object identification, user identification, or combinations thereof.

4. The method of claim 1, wherein the evidence data comprises device data corresponding to accelerometer data, satellite navigation data, Internet of Things data, timestamp data, tracking objects data, recorded video data, photographic data, audio data, cellular data, wide area network data, local area network data, financial temperature sensor data, magnetic field sensor data, neural sensor data, proximity sensor data, sound wave data, relative humidity sensor data, optical wave data, breathing pattern data, ultrasound data, pressure sensor data, photograph metadata, video metadata, internet protocol address data, weather device data, traffic device data, map device data, atmosphere device data, advertising data, advertising metadata, map routing data, supervisory control and data acquisition data, customer relationship management data, enterprise resource planning data, social network data, enterprise asset management data, water meter sensor data, eye movement data, biomarker data, chemical drug data, food data, unmanned aircraft sensor data, geographical information system data, wearable device data, biomarker data, applications data, or combinations thereof.

5. The method of claim 1, wherein the one or more distributed ledgers comprise one or more blockchains.

6. The method of claim 1, wherein the plurality of emissions units corresponds to a plurality of emissions credits for the plurality of users.

7. The method of claim 1, wherein the respective emissions unit for the respective user corresponds to a permit to produce an output of emissions equal to the respective emissions output.

8. The method of claim 1, wherein providing the emissions market platform to the plurality of users comprises:

receiving market depth data from the plurality of users, wherein the market depth data comprises data indicating a plurality of bid prices and a plurality of offer prices for the plurality of emissions units; and transmitting the market depth data to the plurality of users.

9. The method of claim 8, wherein the market depth data further comprises first data from a first user of the plurality of users, and wherein the first data indicates a first bid price or a first offer price for a first emissions unit of the plurality of emissions units, and wherein the first bid price corresponds to an emissions offset.

10. The method of claim 9, further comprising:

receiving transaction input data from a second user of the plurality of users, wherein the transaction input data comprises data indicating an acceptance by the second user of the first bid price or the first offer price for the first virtual transportation capacity unit.

11. A computing system, comprising:

one or more processors; and at least one memory comprising program instructions executable by the one or more processors to:

receive emissions attribute data from a plurality of users for a plurality of emissions objects, wherein a respective emissions object is associated with a respective emissions output, wherein the respective emissions object is associated with a respective user, and wherein the emissions attribute data for the respective emissions object comprises data corresponding to an object type for the respective emissions object;

receive evidence data from the plurality of users for the plurality of emissions objects, wherein the evidence data from the respective user for the respective emissions object comprises:

location data determined using a respective device of the respective user, wherein the location data correspond to a plurality of locations of the respective device determined using a satellite navigation system during a transportation associated with the respective emissions object, and wherein the respective device is configured to transmit the evidence data to one or more distributed ledgers;

determine emissions output data for the plurality of emissions objects based on the emissions attribute data and the evidence data, wherein the emissions output data for the respective emissions object comprises data corresponding to the respective emissions output;

transmit the emissions output data to the one or more distributed ledgers;

generate a plurality of emissions units for the plurality of users based on the emissions output data, wherein a respective emissions unit for the respective user corresponds to the respective emissions output; and provide an emissions market platform to the plurality of users for trading the plurality of emissions units, wherein:

the emissions market platform corresponds to market depth data, and the market depth data comprises data indicating at least a bid price or offer price provided by a respective user for a respective emissions unit.

12. The computing system of claim 11, the respective emissions object comprises a good or an activity associated with the respective emissions output.

13. The computing system of claim 11, wherein the emissions attribute data for the respective emissions object further comprises data corresponding to object quantity, object identification, user identification, or combinations thereof.

14. The computing system of claim 11, wherein the evidence data comprises device data corresponding to accelerometer data, satellite navigation data, Internet of Things data, timestamp data, tracking objects data, recorded video data, photographic data, audio data, cellular data, wide area network data, local area network data, financial temperature sensor data, magnetic field sensor data, neural sensor data, proximity sensor data, sound wave data, relative humidity sensor data, optical wave data, breathing pattern data, ultrasound data, pressure sensor data, photograph metadata, video metadata, internet protocol address data, weather device data, traffic device data, map device data, atmosphere device data, advertising data, advertising metadata, map routing data, supervisory control and data acquisition data, customer relationship management data, enterprise resource planning data, social network data, enterprise asset management data, water meter sensor data, eye movement data, biomarker data, chemical drug data, food data, unmanned aircraft sensor data, geographical information system data, wearable device data, biomarker data, applications data, or combinations thereof.

15. The computing system of claim 11, wherein the one or more distributed ledgers comprise one or more blockchains.

16. The computing system of claim 11, wherein the plurality of emissions units corresponds to a plurality of emissions credits for the plurality of users.

17. The computing system of claim 11, wherein a respective emissions unit for the respective user corresponds to a permit to produce an output of emissions equal to the respective emissions output.

18. A non-transitory computer-readable medium having stored thereon a plurality of computer-executable instructions which, when executed by a computer, cause the computer to:

receive emissions attribute data from a plurality of users for a plurality of emissions objects, wherein a respective emissions object is associated with a respective emissions output, wherein the respective emissions object is associated with a respective user, and wherein the emissions attribute data for the respective emissions object comprises data corresponding to an object type for the respective emissions object;

receive evidence data from the plurality of users for the plurality of emissions objects, wherein the evidence data from the respective user for the respective emissions object comprises:

location data determined using a respective device of the respective user, wherein the location data correspond to a plurality of locations of the respective device determined using a satellite navigation system during a transportation associated with the respective emissions object, and wherein the respective device is configured to transmit the evidence data to one or more distributed ledgers;

determine emissions output data for the plurality of emissions objects based on the emissions attribute data and the evidence data, wherein the emissions output data for the respective emissions object comprises data corresponding to the respective emissions output;

transmit the emissions output data to the one or more distributed ledgers;

generate a plurality of emissions units for the plurality of users based on the emissions output data, wherein a respective emissions unit for the respective user corresponds to the respective emissions output; and provide an emissions market platform to the plurality of users for trading the plurality of emissions units, wherein:

the emissions market platform corresponds to market depth data, and the market depth data comprises data indicating at least a bid price or offer price provided by a respective user for a respective emissions unit.

19. The non-transitory computer-readable medium of claim 18, wherein the emissions attribute data for the respective emissions object further comprises data corresponding to object quantity, object identification, user identification, or combinations thereof.

20. The non-transitory computer-readable medium of claim 18, wherein the evidence data comprises device data corresponding to accelerometer data, satellite navigation data, Internet of Things data, timestamp data, tracking objects data, recorded video data, photographic data, audio data, cellular data, wide area network data, local area network data, financial temperature sensor data, magnetic field sensor data, neural sensor data, proximity sensor data, sound wave data, relative humidity sensor data, optical wave data, breathing pattern data, ultrasound data, pressure sensor data, photograph metadata, video metadata, internet protocol address data, weather device data, traffic device data, map device data, atmosphere device data, advertising data, advertising metadata, map routing data, supervisory control and data acquisition data, customer relationship management data, enterprise resource planning data, social network data, enterprise asset management data, water meter sensor data, eye movement data, biomarker data, chemical drug data, food data, unmanned aircraft sensor data, geographical information system data, wearable device data, biomarker data, applications data, or combinations thereof.

* * * * *